(12) United States Patent
Frank et al.

(10) Patent No.: US 10,198,505 B2
(45) Date of Patent: Feb. 5, 2019

(54) PERSONALIZED EXPERIENCE SCORES BASED ON MEASUREMENTS OF AFFECTIVE RESPONSE

(71) Applicant: Affectomatics Ltd., Kiryat Tivon (IL)

(72) Inventors: Ari M Frank, Haifa (IL); Gil Thieberger, Kiryat Tivon (IL)

(73) Assignee: Affectomatics Ltd., Kiryat Tivon (IL)

( * ) Notice: Subject to any disclaimer, the term of this patent is extended or adjusted under 35 U.S.C. 154(b) by 560 days.

(21) Appl. No.: 14/833,035

(22) Filed: Aug. 21, 2015

(65) Prior Publication Data

US 2016/0055236 A1 Feb. 25, 2016

Related U.S. Application Data

(60) Provisional application No. 62/040,345, filed on Aug. 21, 2014, provisional application No. 62/040,355, filed on Aug. 21, 2014, provisional application No. 62/040,358, filed on Aug. 21, 2014.

(51) Int. Cl.
| | |
|---|---|
| *G06F 17/30* | (2006.01) |
| *G06Q 30/02* | (2012.01) |
| *G06F 17/27* | (2006.01) |
| *G06F 17/28* | (2006.01) |

(52) U.S. Cl.
CPC ...... *G06F 17/30702* (2013.01); *G06F 17/278* (2013.01); *G06F 17/279* (2013.01); *G06F 17/2881* (2013.01); *G06Q 30/02* (2013.01)

(58) Field of Classification Search
CPC ......... G06F 17/30702; G06F 17/30864; G06F 17/279; G06F 17/2881; G06F 17/278
See application file for complete search history.

(56) References Cited

U.S. PATENT DOCUMENTS

| | | |
|---|---|---|
| 6,904,408 B1 | 6/2005 | McCarthy et al. |
| 7,450,003 B2 | 11/2008 | Weber et al. |
| 8,010,663 B2 | 8/2011 | Firminger et al. |
| 8,126,220 B2 | 2/2012 | Greig |
| 8,208,943 B2 | 6/2012 | Petersen et al. |
| 8,296,172 B2 | 10/2012 | Marci et al. |
| 8,327,395 B2 | 12/2012 | Lee et al. |

(Continued)

FOREIGN PATENT DOCUMENTS

WO WO 2014074426 5/2014

OTHER PUBLICATIONS

Alajmi, Nouf, et al. "Shopmobia: An emotion-based shop rating system." Affective Computing and Intelligent Interaction (ACII), 2013 Humaine Association Conference on. IEEE, 2013.

(Continued)

*Primary Examiner* — Scott A. Waldron
*Assistant Examiner* — Fatima P Mina
(74) *Attorney, Agent, or Firm* — Active Knowledge Ltd.

(57) ABSTRACT

This disclosure describes systems, methods, and computer program products that may be used to provide crowd-based scores for experiences, which are computed based on measurements of affective response of multiple users who had the experiences. The measurements of affective response may be collected using a wide array of sensors that measure physiological signals and/or behavioral cues. Additionally, the scores may be personalized for a certain user based on similarities between a profile of the certain user and profiles of the multiple users.

19 Claims, 43 Drawing Sheets

(56) References Cited

U.S. PATENT DOCUMENTS

| | | | |
|---|---|---|---|
| 8,364,395 B2 | 1/2013 | French et al. | |
| 8,533,187 B2 | 9/2013 | Brewington et al. | |
| 8,539,359 B2 | 9/2013 | Rapaport et al. | |
| 8,676,230 B2 | 3/2014 | Alexander et al. | |
| 8,700,009 B2 | 4/2014 | Quy | |
| 8,719,198 B2 | 5/2014 | Zheng et al. | |
| 8,762,102 B2 | 6/2014 | Yuen et al. | |
| 8,764,652 B2 | 7/2014 | Lee et al. | |
| 8,775,186 B2 | 7/2014 | Shin et al. | |
| 8,781,991 B2 | 7/2014 | Lee | |
| 8,782,681 B2 | 7/2014 | Lee et al. | |
| 8,812,690 B1* | 8/2014 | Ramesh | G06F 17/30893 705/319 |
| 8,965,498 B2 | 2/2015 | Katra et al. | |
| 9,026,476 B2 | 5/2015 | Bist | |
| 9,106,958 B2 | 8/2015 | el Kaliouby et al. | |
| 9,165,216 B2 | 10/2015 | Angell et al. | |
| 9,196,173 B2 | 11/2015 | Bak et al. | |
| 9,384,494 B2 | 7/2016 | Gomi et al. | |
| 9,396,492 B2 | 7/2016 | Schiff et al. | |
| 2004/0153355 A1* | 8/2004 | Deering | G06Q 10/06393 705/7.39 |
| 2004/0210661 A1 | 10/2004 | Thompson | |
| 2008/0071771 A1* | 3/2008 | Venkataraman | G06F 17/30713 |
| 2008/0295126 A1 | 11/2008 | Lee et al. | |
| 2009/0131764 A1 | 5/2009 | Lee et al. | |
| 2009/0193344 A1 | 7/2009 | Smyers | |
| 2010/0004977 A1 | 1/2010 | Marci et al. | |
| 2010/0250554 A1 | 9/2010 | Shu | |
| 2010/0281497 A1* | 11/2010 | Miyazaki | G06F 17/30032 725/14 |
| 2011/0046502 A1 | 2/2011 | Pradeep et al. | |
| 2011/0106750 A1 | 5/2011 | Pradeep et al. | |
| 2012/0089605 A1* | 4/2012 | Bangalore | G06F 17/30976 707/737 |
| 2012/0124122 A1 | 5/2012 | el Kaliouby et al. | |
| 2012/0203725 A1 | 8/2012 | Stoica | |
| 2012/0239506 A1* | 9/2012 | Saunders | G06Q 30/02 705/14.67 |
| 2012/0290266 A1 | 11/2012 | Jain et al. | |
| 2012/0316456 A1 | 12/2012 | Rahman et al. | |
| 2013/0019187 A1 | 1/2013 | Hind et al. | |
| 2013/0024203 A1 | 1/2013 | Flores et al. | |
| 2013/0080260 A1 | 3/2013 | French et al. | |
| 2013/0103624 A1* | 4/2013 | Thieberger | G06N 99/005 706/12 |
| 2013/0173413 A1 | 7/2013 | Page et al. | |
| 2013/0263167 A1* | 10/2013 | Parthasarathy | H04L 41/5067 725/14 |
| 2014/0136432 A1* | 5/2014 | Fallows | G06Q 30/0282 705/319 |
| 2014/0164376 A1* | 6/2014 | Yang | G06F 17/3071 707/737 |
| 2014/0200463 A1 | 7/2014 | el Kaliouby et al. | |
| 2014/0250200 A1 | 9/2014 | Geurts et al. | |
| 2014/0280529 A1 | 9/2014 | Davis et al. | |
| 2014/0336796 A1* | 11/2014 | Agnew | A43B 3/0005 700/91 |
| 2014/0350349 A1 | 11/2014 | Geurts et al. | |
| 2014/0366049 A1 | 12/2014 | Lehtiniemi et al. | |
| 2015/0058416 A1 | 2/2015 | Felt | |
| 2015/0112983 A1 | 4/2015 | Srivastava et al. | |
| 2015/0142553 A1 | 5/2015 | Kodra et al. | |
| 2015/0289800 A1 | 10/2015 | Pacione et al. | |
| 2015/0313530 A1 | 11/2015 | Kodra et al. | |
| 2015/0323337 A1 | 11/2015 | Aiello et al. | |

OTHER PUBLICATIONS

Al-Barrak, et al. "A mobile brain sensing system for recommending third places." Proceedings of the 2013 ACM conference on Pervasive and ubiquitous computing adjunct publication. ACM, 2013.

Baig, et al. "Crowd Emotion Detection Using Dynamic Probabilistic Models", In Proceedings of 13th International Conference on Simulation of Adaptive Behavior, SAB 2014, Jul. 22-25, 2014, pp. 328-337.

Banaee, et al. "Data mining for wearable sensors in health monitoring systems: a review of recent trends and challenges." Sensors 13.12 (2013): 17472-17500.

Eckstein, Miguel P., et al. "Neural decoding of collective wisdom with multi-brain computing." NeuroImage 59.1 (2012): 94-108.

El Mawass, et al. "A supermarket stress map." Proceedings of the 2013 ACM conference on Pervasive and ubiquitous computing adjunct publication. ACM, 2013.

Gartner, G. "Openemotionmap.org—Emotional response to space as an additional concept in cartography." Int Arch Photogramm Remote Sens Spat Inf Sci (ISPRS) 39.B4 (2012): 473-476.

Huang, H., et al. "Considering Affective Responses towards Environments for Enhancing Location Based Services." The International Archives of Photogrammetry, Remote Sensing and Spatial Information Sciences 40.4 (2014): 93.

Klettner, Silvia, et al. "Crowdsourcing affective responses to space." Kartographische Nachrichten 2.3 (2013): 66-72.

Lin, Cheng-Yu, et al. "A comfort measuring system for public transportation systems using participatory phone sensing." ACM PhoneSense (2010).

Mody, et al. "WiMo: location-based emotion tagging." Proceedings of the 8th international Conference on Mobile and Ubiquitous Multimedia. ACM, 2009.

Zheng, et al. "Learning travel recommendations from user-generated GPS traces." ACM Transactions on Intelligent Systems and Technology (TIST) 2.1 (2011): 2.

* cited by examiner

PERSONALIZED EXPERIENCE SCORES BASED ON MEASUREMENTS OF AFFECTIVE RESPONSE

CROSS-REFERENCE TO RELATED APPLICATIONS

This Application claims the benefit of U.S. Provisional Patent Applications Nos. 62/040,345 and 62/040,355 and 62/040,358, all of which filed on Aug. 21, 2015.

BACKGROUND

Wearable and mobile computing devices are both very popular and widely available to many people these days. Such devices now include a wide array of sensors that may be used to measure the environment as well as the people who use the devices. This enables collection of large amounts of data, about the users, which may include measurements of their affective response (e.g., physiological signals and behavioral cues). Such measurements may be taken throughout the day while having many different experiences. While logging this data is becoming more prevalent (e.g., through life-logging), leveraging this data for useful applications is not widely done.

SUMMARY

This disclosure describes various crowd-based affective response applications. In particular, many of the embodiments described herein involve applications that utilize measurements of affective response in order to capture the wisdom of the crowd. Embodiments described in this disclosure include systems, methods, and computer program products that may be used for a wide range of applications such as scoring experiences, ranking experiences, generating alerts, and/or learning various functions of affective response to experiences.

Experiences that may be evaluated with teachings in this disclosure include a wide range of day-to-day experiences that people are likely to have. Some examples of experiences include: visiting locations (e.g., vacation destinations, restaurants, or hotels), consuming digital content (e.g., TV, movies, or games), having social interactions (both in the physical world and virtual worlds), exercising, playing, learning, commuting, shopping, eating, and various other experiences that may be part of the day-to-day life.

BRIEF DESCRIPTION OF THE DRAWINGS

The embodiments are herein described, by way of example only, with reference to the accompanying drawings. In the drawings.

DETAILED DESCRIPTION

Figure 1:
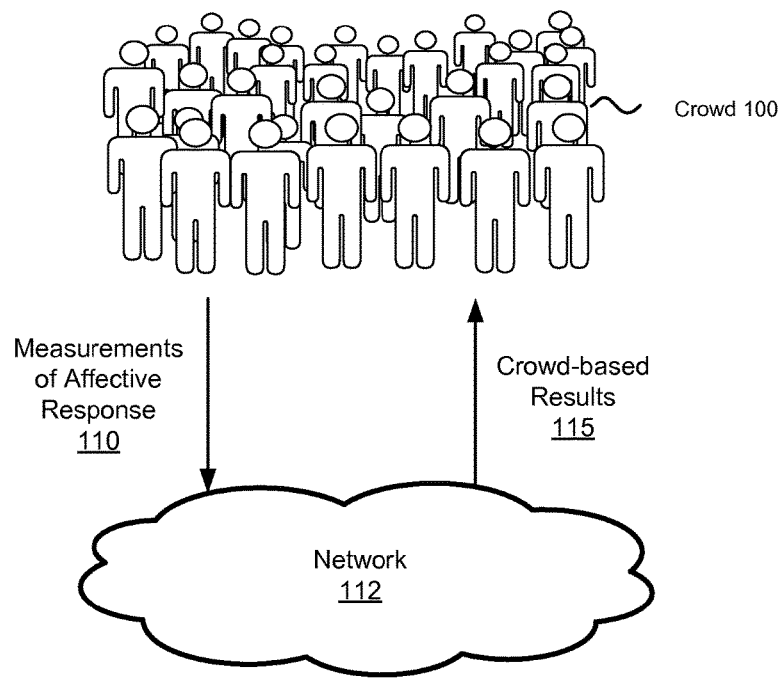
FIG. 1 illustrates one embodiment of an architecture that may be used to compute crowd-based results based on measurements of affective response.

A measurement of affective response of a user refers is obtained by measuring a physiological signal of the user and/or a behavioral cue of the user. A measurement of affective response may include one or more raw values and/or processed values (e.g., resulting from filtration, calibration, and/or feature extraction). Measuring affective response may be done utilizing various existing, and/or yet to be invented, measurement devices such as sensors. Optionally, any device that takes a measurement of a physiological signal of a user and/or of a behavioral cue of a user, may be considered a sensor. A sensor may be coupled to the body of a user in various ways. For example, a sensor may be a device that is implanted in the user's body, attached to the user's body, embedded in an item carried and/or worn by the user (e.g., a sensor may be embedded in a smartphone, smartwatch, and/or clothing), and/or remote from the user (e.g., a camera taking images of the user). Additional information regarding sensors may be found in this disclosure at least in Section 1—Sensors.

Herein, "affect" and "affective response" refer to physiological and/or behavioral manifestation of an entity's emotional state. The manifestation of an entity's emotional state may be referred to herein as an "emotional response", and may be used interchangeably with the term "affective response". Affective response typically refers to values obtained from measurements and/or observations of an entity, while emotional states are typically predicted from models and/or reported by the entity feeling the emotions. For example, according to how terms are typically used herein, one might say that a person's emotional state may be determined based on measurements of the person's affective response. In addition, the terms "state" and "response", when used in phrases such as "emotional state" or "emotional response", may be used herein interchangeably. However, in the way the terms are typically used, the term "state" is used to designate a condition which a user is in, and the term "response" is used to describe an expression of the user due to the condition the user is in and/or due to a change in the condition the user is in.

It is to be noted that as used herein in this disclosure, a "measurement of affective response" may comprise one or more values describing a physiological signal and/or behavioral cue of a user which were obtained utilizing a sensor.

Optionally, this data may be also referred to as a "raw" measurement of affective response. Thus, for example, a measurement of affective response may be represented by any type of value returned by a sensor, such as a heart rate, a brainwave pattern, an image of a facial expression, etc.

Additionally, as used herein a "measurement of affective response" may refer to a product of processing of the one or more values describing a physiological signal and/or behavioral cue of a user (i.e., a product of the processing of the raw measurements data). The processing of the one or more values may involve one or more of the following operations: normalization, filtering, feature extraction, image processing, compression, encryption, and/or any other techniques described further in the disclosure and/or that are known in the art and may be applied to measurement data. Optionally, a measurement of affective response may be a value that describes an extent and/or quality of an affective response (e.g., a value indicating positive or negative affective response such as a level of happiness on a scale of 1 to 10, and/or any other value that may be derived from processing of the one or more values).

It is to be noted that since both raw data and processed data may be considered measurements of affective response, it is possible to derive a measurement of affective response (e.g., a result of processing raw measurement data) from another measurement of affective response (e.g., a raw value obtained from a sensor). Similarly, in some embodiments, a measurement of affective response may be derived from multiple measurements of affective response. For example, the measurement may be a result of processing of the multiple measurements.

In some embodiments, a measurement of affective response may be referred to as an "affective value" which, as used in this disclosure, is a value generated utilizing a module, function, estimator, and/or predictor based on an input comprising the one or more values describing a physiological signal and/or behavioral cue of a user, which are in either a raw or processed form, as described above. As such, in some embodiments, an affective value may be a value representing one or more measurements of affective response. Optionally, an affective value represents multiple measurements of affective response of a user taken over a period of time. An affective value may represent how the user felt while utilizing a product (e.g., based on multiple measurements taken over a period of an hour while using the product), or how the user felt during a vacation (e.g., the affective value is based on multiple measurements of affective response of the user taken over a week-long period during which the user was on the vacation).

In some embodiments, measurements of affective response of a user are primarily unsolicited, i.e., the user is not explicitly requested to initiate and/or participate in the process of measuring. Thus, measurements of affective response of a user may be considered passive in the sense that it is possible that the user will not be notified when the measurements are taken, and/or the user may not be aware that measurements are being taken. Additional discussion regarding measurements of affective response and affective values may be found in this disclosure at least in Section 2—Measurements of Affective Response.

Embodiments described herein may involve computing a representative value from a plurality of measurements of affective response of one or more users who had an experience; such a value may be referred to herein as "a score for an experience", an "experience score", or simply a "score" for short. Optionally, when the score is derived from measurements of multiple users, it may be considered a "crowd-based score" and/or an "aggregate score". Optionally, when an experience score is computed for a certain user or a certain group of users, such that different users or different groups of users may receive scores with different values, the experience score may be referred to as a "personalized score", "personal score", and the like. In a similar fashion, in some embodiments, experiences may be ranked and/or compared based on a plurality of measurements of affective response of users who had the experiences. A form of comparison of experiences, such as an ordering of experiences (or a partial ordering of the experiences), may be referred to herein as a "ranking" of the experiences. Optionally, when a ranking is computed for a certain user or a certain group of users, such that different users or different groups of users may receive different rankings, the ranking be referred to as a "personalized ranking", "personal ranking", and the like.

Additionally, a score and/or ranking computed based on measurements of affective response that involve a certain type of experience may be referred to based on the type of experience. For example, a score for a location may be referred to as a "location score", a ranking of hotels may be referred to as a "hotel ranking", etc. Also when the score, ranking, and/or function parameters that are computed based on measurements refer to a certain type of affective response, the score, ranking, and/or function parameters may be referred to according to the type of affective response. For example, a score may be referred to as a "satisfaction score" or "comfort score". In another example, a function that describes satisfaction from a vacation may be referred to as "a satisfaction function" or "satisfaction curve".

Herein, when it is stated that a score, ranking, and/or function parameters are computed based on measurements of affective response, it means that the score, ranking, and/or function parameters have their value set based on the measurements and possibly other measurements of affective response and/or other types of data. For example, a score computed based on a measurement of affective response may also be computed based on other data that is used to set the value of the score (e.g., a manual rating, data derived from semantic analysis of a communication, and/or a demographic statistic of a user). Additionally, computing the score may be based on a value computed from a previous measurement of the user (e.g., a baseline affective response value described further below).

An experience, as used herein, involves something that happens to a user and/or that the user does, which may affect the physiological and/or emotional state of the user in a manner that may be detected by measuring the affective response of the user. Optionally, experiences may belong to different groups and/or types such as being at a location, consuming certain content, having a social interaction (e.g., in the physical world or a virtual world), exercising, traveling a certain route, consuming a substance, and/or utilizing a product. In some embodiments, experiences may involve activity in the physical world (e.g., spending time at a hotel) and/or activity in virtual environments (e.g., spending time in a virtual world or in a virtual chat room). In some embodiments, an experience is something a user actively chooses and is aware of; for example, the user chooses to take a vacation. While in other embodiments, an experience may be something that happens to the user, of which the user may not be aware. For example, a user may consume food that unbeknownst to the user contains a certain additive; this example may correspond to an experience of consuming the additive even if the user is not aware that he/she is consuming it. A user may have the same experience multiple times during different periods. For example, the experience of being at school may happen to certain users every weekday except for holidays. Each time a user has an experience, this may be considered an "event". Each event has a corresponding experience and a corresponding user (who had the corresponding experience). Additionally, an event may be referred to as being an "instantiation" of an experience and the time during which an instantiation of an event takes place may be referred to herein as the "instantiation period" of the event. Optionally, an event may have a corresponding measurement of affective response, which is a measurement of the corresponding user to having the corresponding experience (during the instantiation of the event or shortly after it).

Determining whether different events correspond to the same experience or to different experiences may depend on the embodiment that is examined. For example, in one embodiment, an event involving a user that rides a bike in the city is considered to correspond to a different experience than an event in which a user goes mountain biking. However, in another embodiment, these two events may be considered to correspond to the same experience (e.g., the experience of riding a bike). Similarly, in some embodiments, there is reference to a type of experience. In this case too, determining a type of an experience may depend on the embodiment. For example, in one embodiment, going to a movie and riding a bike in the park are considered to be different types of experiences (e.g., these may be considered experiences of the types "consuming content" and "exercising", respectively). However, in another embodiment both experiences may be considered to be of the type "recreational activity". Further details regarding experiences and events may be found at least in Sections 3—Experiences, 4—Events and 5—Identifying Events.

In some embodiments, a module that computes a score from measurements of affective response of one or more users to an experience is called a "scoring module". If the computed score represents an aftereffect, which is based on a difference between measurements taken before and after having an experience, the scoring module may be referred to as an "aftereffect scoring module". Additionally, a module that computes a ranking for experiences, such as by forming an ordering or a partial ordering of the experiences, may be referred to herein as a "ranking module". And if the ranking is done based on aftereffects of the experiences, the ranking module may be referred to as an "aftereffect ranking module". Optionally, a ranking module may utilize a scoring module to compute the ranking. Optionally, a full ranking of items (e.g., experiences, locations, or meals) is an ordering of the items that corresponds to a permutation, such that each item that is ranked has a unique rank. Thus, in a full ranking for every pair of different items from among the items, the first item of the pair may be ranked higher or lower than the second item of the pair, but not ranked the same as the second item. A partial ranking of items is a partial ordering of the items, such that for at least one pair of the items, the first item is ranked higher than the second item (a partial ranking may involve ranking only some of the experiences).

Various embodiments described herein utilize systems whose architecture includes a plurality of sensors and a plurality of user interfaces. This architecture supports various forms of crowd-based recommendation systems in which users may receive information, such as suggestions and/or alerts, which are determined based on measurements of affective response collected by the sensors. In some embodiments, being crowd-based means that the measurements of affective response are taken from a plurality of users, such as at least three, ten, one hundred, or more users. In such embodiments, it is possible that the recipients of information generated from the measurements may not be the same users from whom the measurements were taken.

Figures 2A, 2B, 2C:
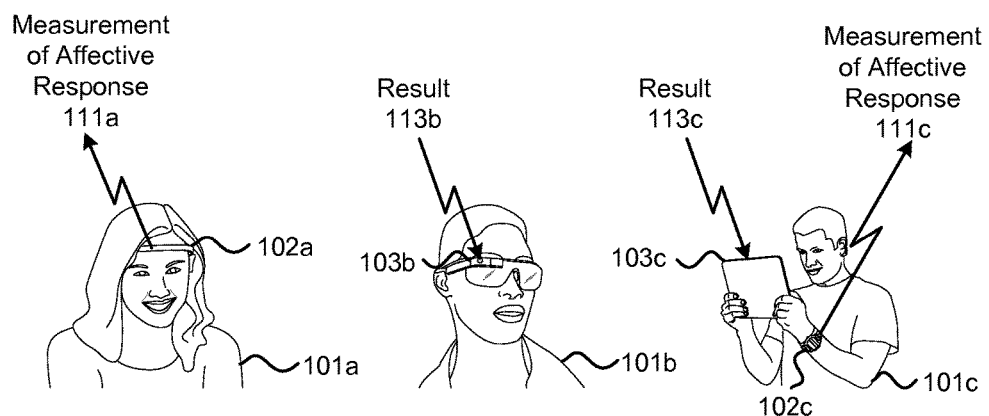
FIG. 2a, FIG. 2b, and FIG. 2c illustrate cases in which a sensor and/or a user interface are coupled to a user.

FIG. 1 illustrates one embodiment of an architecture that includes sensors and user interfaces, as described above. The crowd 100 of users comprises at least some individual users who have sensors coupled to them. For example, FIG. 2a and FIG. 2c illustrate cases in which a sensor is coupled to a user. The sensors take the measurements 110 of affective response, which are transmitted via a network 112. Optionally, the measurements 110 are sent to one or more servers that host modules belonging to one or more of the systems described in various embodiments in this disclosure (e.g., systems that compute scores for experiences, rank experiences, generate alerts for experiences, and/or learn parameters of functions that describe affective response).

A plurality of sensors may be used, in various embodiments described herein, to take the measurements of affective response of the plurality of users. Each sensor of the plurality of sensors (e.g., the sensor 102a) may be a sensor that captures a physiological signal and/or a behavioral cue. Optionally, a measurement of affective response of a user is typically taken by a specific sensor related to the user (e.g., a sensor attached to the body of the user and/or embedded in a device of the user). Optionally, some sensors may take measurements of more than one user (e.g., the sensors may be cameras taking images of multiple users). Optionally, the measurements taken of each user are of the same type (e.g., the measurements of all users include heart rate and skin conductivity measurements). Optionally, different types of measurements may be taken from different users. For example, for some users the measurements may include brainwave activity captured with EEG and heart rate, while for other users the measurements may include only heart rate values.

The network 112 represents one or more networks used to carry the measurements 110 and/or crowd-based results 115 computed based on measurements. It is to be noted that the measurements 110 and/or crowd-based results 115 need not be transmitted via the same network components. Additionally, different portions of the measurements 110 (e.g., measurements of different individual users) may be transmitted using different network components or different network routes. In a similar fashion, the crowd-based results 115 may be transmitted to different users utilizing different network components and/or different network routes.

Herein, a network, such as the network 112, may refer to various types of communication networks, including, but not limited to, a local area network (LAN), a wide area network (WAN), Ethernet, intranet, the Internet, a fiber communication network, a wired communication network, a wireless communication network, and/or a combination thereof.

In some embodiments, the measurements 110 of affective response are transmitted via the network 112 to one or more servers. Each of the one or more servers includes at least one processor and memory. Optionally, the one or more servers are cloud-based servers. Optionally, some of the measurements 110 are stored and transmitted in batches (e.g., stored on a device of a user being measured). Additionally or alternatively, some of the measurements are broadcast within seconds of being taken (e.g., via Wi-Fi transmissions). Optionally, some measurements of a user may be processed prior to being transmitted (e.g., by a device and/or software agent of the user). Optionally, some measurements of a user may be sent as raw data, essentially in the same form as received from a sensor used to measure the user. Optionally, some of the sensors used to measure a user may include a transmitter that may transmit measurements of affective response, while others may forward the measurements to another device capable of transmitting them (e.g., a smartphone belonging to a user).

Depending on the embodiment being considered, the crowd-based results 115 may include various types of values that may be computed by systems described in this disclosure based on measurements of affective response. For example, the crowd-based results 115 may refer to scores for experiences (e.g., score 164), notifications about affective response to experiences (e.g., notification 188 or notification 210), recommendations regarding experiences (e.g., recommendation 179 or recommendation 215), and/or various rankings of experiences (e.g., ranking 232, ranking 254).

In some embodiments, the crowd-based results 115 that are computed based on the measurements 110 include a single value or a single set of values that is provided to each user that receives the crowd-based results 115. In such a case, the crowd-based results 115 may be considered general crowd-based results, since each user who receives a result computed based on the measurements 110 receives essentially the same thing. In other embodiments, the crowd-based results 115 that are computed based on the measurements 110 include various values and/or various sets of values that are provided to users that receive the crowd-based results 115. In this case, the crowd-based results 115 may be considered personalized crowd-based results, since a user who receives a result computed based on the measurements 110 may receive a result that is different from the result received by another user. Optionally, personalized results are obtained utilizing an output produced by personalization module 130.

An individual user 101, belonging to the crowd 100, may contribute a measurement of affective response to the measurements 110 and/or may receive a result from among the various types of the crowd-based results 115 described in this disclosure. This may lead to various possibilities involving what users contribute and/or receive in an architecture of a system such as the one illustrated in FIG. 1.

In some embodiments, at least some of the users from the crowd 100 contribute measurements of affective response (as part of the measurements 110), but do not receive results computed based on the measurements they contributed. An example of such a scenario is illustrated in FIG. 2a, where a user 101a is coupled to a sensor 102a (which in this illustration measures brainwave activity via EEG) and contributes a measurement 111a of affective response, but does not receive a result computed based on the measurement 111a.

In a somewhat reverse situation to the one described above, in some embodiments, at least some of the users from the crowd 100 receive a result from among the crowd-based results 115, but do not contribute any of the measurements of affective response used to compute the result they receive. An example of such a scenario is illustrated in FIG. 2b, where a user 101b is coupled to a user interface 103b (which in this illustration are augmented reality glasses) that presents a result 113b, which may be, for example, a score for an experience. However, in this illustration, the user 101b does not provide a measurement of affective response that is used for the generation of the result 113b.

And in some embodiments, at least some of the users from the crowd 100 contribute measurements of affective response (as part of the measurements 110), and receive a result, from among the crowd-based results 115, computed based on the measurements they contributed. An example of such a scenario is illustrated in FIG. 2c, where a user 101c is coupled to a sensor 102c (which in this illustration is a smartwatch that measures heart rate and skin conductance) and contributes a measurement 111c of affective response. Additionally, the user 101c has a user interface 103c (which in this illustration is a tablet computer) that presents a result 113c, which may be for example a ranking of multiple experiences generated utilizing the measurement 111c that the user 101c provided.

A "user interface", as the term is used in this disclosure, may include various components that may be characterized as being hardware, software, and/or firmware. In some examples, hardware components may include various forms of displays (e.g., screens, monitors, virtual reality displays, augmented reality displays, hologram displays), speakers, scent generating devices, and/or haptic feedback devices (e.g., devices that generate heat and/or pressure sensed by the user). In other examples, software components may include various programs that render images, video, maps, graphs, diagrams, augmented annotations (to appear on images of a real environment), and/or video depicting a virtual environment. In still other examples, firmware may include various software written to persistent memory devices, such as drivers for generating images on displays and/or for generating sound using speakers. In some embodiments, a user interface may be a single device located at one location, e.g., a smart phone and/or a wearable device. In other embodiments, a user interface may include various components that are distributed over various locations. For example, a user interface may include both certain display hardware (which may be part of a device of the user) and certain software elements used to render images, which may be stored and run on a remote server.

It is to be noted that, though FIG. 2a to FIG. 2c illustrate cases in which users have a single sensor device coupled to them and/or a single user interface, the concepts described above in the discussion about FIG. 2a to FIG. 2c may be naturally extended to cases where users have multiple sensors coupled to them (of the various types described in this disclosure or others) and/or multiple user interfaces (of the various types described in this disclosure or others).

Additionally, it is to be noted that users may contribute measurements at one time and receive results at another (which were not computed from the measurements they contributed). Thus, for example, the user 101a in FIG. 2a might have contributed a measurement to compute a score for an experience on one day, and received a score for that experience (or another experience) on her smartwatch (not depicted) on another day. Similarly, the user 101b in FIG. 2b may have sensors embedded in his clothing (not depicted) and might be contributing measurements of affective response to compute a score for an experience the user 101b is having, while the result 113b that the user 101b received, is not based on any of the measurements the user 101b is currently contributing.

In this disclosure, a crowd of users is often designated by the reference numeral 100. The reference numeral 100 is used to designate a general crowd of users. Typically, a crowd of users in this disclosure includes at least three users, but may include more users. For example, in different embodiments, the number of users in the crowd 100 falls into one of the following ranges: 3 to 9, 10 to 24, 25-99, 100-999, 1000-9999, 10000-99999, 100000-1000000, and more than one million users. Additionally, the reference numeral 100 is used to designate users having a general experience, which may involve one or more instances of the various types of experiences described in this disclosure. For example, the crowd 100 may include users that are at a certain location, users engaging in a certain activity, users utilizing a certain product, and/or users consuming a certain substance.

When a crowd is designated with another reference numeral (other than 100), this typically signals that the crowd has a certain characteristic. A different reference numeral for a crowd may be used when describing embodiments that involve specific experiences. For example, in an embodiment that describes a system that ranks experiences, the crowd may be referred to by the reference numeral 100. However, in an embodiment that describes ranking of locations, the crowd may be designated by another reference numeral, since in this embodiment, the users in the crowd have a certain characteristic (they are at locations), rather than being a more general crowd of users who are having one or more experiences, which may be any of the experiences described in this disclosure.

In a similar fashion, measurements of affective response are often designated by the reference numeral 110. The reference numeral 110 is used to designate measurements of affective response of users belonging to the crowd 100. Thus, the reference numeral 110 is typically used to designate measurements of affective response in embodiments that involve users having one or more experiences, which may be any of the experiences described in this disclosure.

Unless indicated otherwise when describing a certain embodiment, the one or more experiences may be of various types of experiences described in this disclosure. In one example, an experience from among the one or more experiences may involve one or more of the following: spending time at a certain location, consuming certain digital content, having a social interaction with a certain entity in the physical world, having a social interaction with a certain entity in a virtual world, viewing a certain live performance, performing a certain exercise, traveling a certain route, spending time in an environment characterized by a certain environmental condition, shopping, and going on a social outing with people. In another example, an experience from among the one more experiences may be characterized via various attributes and/or combinations of attributes such as an experience involving engaging in a certain activity at a certain location, an experience involving visiting a certain location for a certain duration, and so on. Additional information regarding the types of experiences users may have may be found at least in Section 3—Experiences.

In various embodiments described herein, measurements of affective response, such as the measurements 110 and/or measurements referred to by other reference numerals, may include measurements of multiple users, such as at least ten users, but in some embodiments may include measurements of other numbers of users (e.g., less than ten). Optionally, the number of users who contribute measurements to the measurements 110 may fall into one of the following ranges: 3-9, 10-24, 25-99, 100-999, 1000-9999, 10000-99999, 100000-1000000, or more than one million users.

In different embodiments, measurements of affective response, such as the measurements 110 and/or measurements referred to by other reference numerals, may be taken during different periods of time. In one embodiment, measurements may be taken over a long period, such as at least a day, at least a week, at least a month, and/or a period of at least a year. When it is said that measurements were taken over a certain period such as at least a day, it means that the measurements include at least a first measurement and a second measurement such that the first measurement was taken at least a day before the second measurement. In another embodiment, measurements may be taken within a certain period of time, and/or a certain portion of the measurements may be taken within a certain period of time. For example, the measurements may all be taken during a certain period of six hours. In another example, at least 25% of the measurements are taken within a period of an hour.

In embodiments described herein, measurements of affective response, such as the measurements 110 and/or measurements referred to by other reference numerals, are taken utilizing sensors coupled to the users. A measurement of affective response of a user, taken utilizing a sensor coupled to the user, includes at least one of the following: a value representing a physiological signal of the user, and a value representing a behavioral cue of the user. Optionally, a measurement of affective response corresponding to an event in which a user has an experience is based on values acquired by measuring the user with the sensor during at least three different non-overlapping periods while the user has the experience corresponding to the event. Additional information regarding how measurements of affective response may be obtained from values captured by sensors may be found in this disclosure at least in Section 2—Measurements of Affective Response.

When measurements of affective response are designated with a reference numeral that is different from 110, this typically signals that the measurements have a certain characteristic, such as being measurements of users having a specific experience. For example, in an embodiment that describes a system that scores experiences, the measurements of affective response used to compute scores may be referred to by the reference numeral 110. However, in an embodiment that describes scoring hotels, the measurements may be designated by another reference numeral, since in this embodiment, the measurements are of users that have a certain characteristic (they are at a hotel), rather than being measurements of a general crowd of users who are having one or more experiences that may be any of the experiences described in this disclosure. Despite the use of a different reference numeral, because in this disclosure they represent a general form of measurements of affective response (to possibly any experience described in this disclosure), properties of the measurements 110 as described in this disclosure may be typically assumed to be true for measurements of affective response designated by other reference numerals, unless indicated otherwise.

Results obtained based on measurements of affective response may also be designated with different reference numerals in different embodiments. When the embodiment involves a non-specific experience, which may be any of the experiences described in this disclosure, the results may be designated with certain reference numerals (e.g., the score 164, the notification 188, or the recommendation 179). When other reference numerals are used to designate the same type of results, this typically signals that the results have a certain characteristic, such as being a score for a location, rather than a score for a non-specific experience. When a result has a certain characteristic, such as corresponding to a certain type of experience, it may be referred to according to the type of experience. Thus for example, the score for the location may be referred to as a "location score" and may optionally be designated with a different reference numeral than the one used for a score for a non-specific experience.

Figure 3:
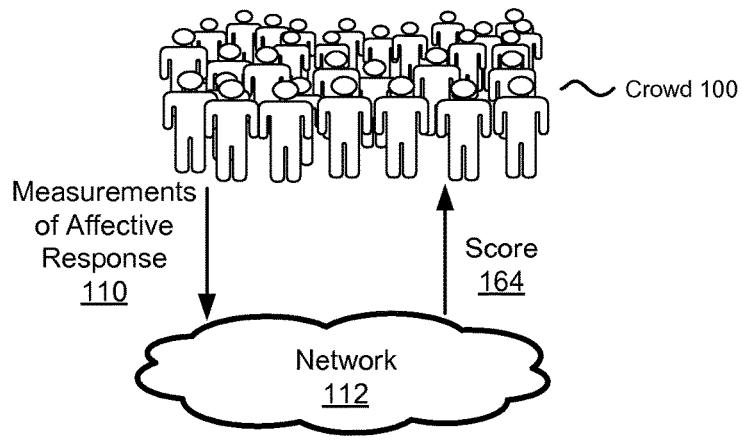
FIG. 3 illustrates one embodiment of a system configured to compute an experience score for a certain experience.

FIG. 1 illustrates an architecture that may be utilized for various embodiments involving acquisition of measurements of affective response and reporting of results computed based on the measurements. One example of a utilization of such an architecture is given in FIG. 3, which illustrates one embodiment of a system configured to compute an experience score 164 for a certain experience. The system computes the score 164 based on measurements 110 of affective response utilizing at least sensors and user interfaces. The sensors are utilized to take the measurements 110, which include measurements of at least ten users from the crowd 100, each of which is coupled to a sensor such as the sensors 102a and/or 102c. Optionally, at least some of the sensors are configured to take measurements of physiological signals of the at least ten users. Additionally or alternatively, at least some of the sensors are configured to take measurements of behavioral cues of the at least ten users.

Each measurement of the user is taken by a sensor coupled to the user, while the user has the certain experience or shortly after. Optionally, "shortly after" refers to a time that is at most ten minutes after the user finishes having the certain experience. Optionally, the measurements may be transmitted via network 112 to one or more servers that are configured to compute a score for the certain experience based on the measurements 110. Optionally, the servers are configured to compute scores for experiences based on measurements of affective response, such as the system illustrated in FIG. 4.

The user interfaces are configured to receive data, via the network 112, describing the experience score computed based on the measurements 110. Optionally, the experience score 164 represents the affective response of the at least ten users to having the certain experience. The user interfaces are configured to report the experience score to at least some of the users belonging to the crowd 100. Optionally, at least some users who are reported the score 164 via user interfaces are users who contributed measurements to the measurements 110 which were used to compute the score 164. Optionally, at least some users who are reported the score 164 via user interfaces are users who did not contribute to the measurements 110.

It is to be noted that stating that a score is computed based on measurements, such as the statement above mentioning "the experience score computed based on the measurements 110", is not meant to imply that all of the measurements are used in the computation of the score. When a score is computed based on measurements it means that at least some of the measurements, but not necessarily all of the measurements, are used to compute the score. Some of the measurements may be irrelevant for the computation of the score for a variety of reasons, and therefore are not used to compute the score. For example, some of the measurements may involve experiences that are different from the experience for which the score is computed, may involve users not selected to contribute measurements (e.g., filtered out due to their profiles being dissimilar to a profile of a certain user), and/or some of the measurements may have been taken at a time that is not relevant for the score (e.g., older measurements might not be used when computing a score corresponding to a later time). Thus, the above statement "the experience score computed based on the measurements 110" should be interpreted as the experience score computed based on some, but not necessarily all, of the measurements 110.

As discussed in further detail in users 11—Sensors, various types of sensors may be utilized in order to take measurements of affective response, such as the measurements 110 and/or measurements of affective response designated by other numeral references. Following are various examples of sensors that may be coupled to users, which are used to take measurements of the users. In one example, a sensor used to take a measurement of affective response of a user is implanted in the body of a user. In another example, a sensor used to take a measurement of affective response of a user is embedded in a device used by the user. In yet another example, a sensor used to take a measurement of a user may be embedded in an object worn by the user, which may be at least one of the following: a clothing item, footwear, a piece of jewelry, and a wearable artifact. In still another example, a sensor used to take a measurement of a user may be a sensor that is not in physical contact with the user, such as an image capturing device used to take a measurement that includes one or more images of the user.

In some embodiments, some of the users who contribute to the measurements 110 may have a device that includes both a sensor that may be used to take a measurement of affective response and a user interface that may be used to present a result computed based on the measurements 110, such as the score 164. Optionally, each such device is configured to receive a measurement of affective response taken with the sensor embedded in the device, and to transmit the measurement. The device may also be configured to receive data describing the experience score and to forward it for presentation via the user interface.

Reporting a result computed based on measurements of affective response, such as the score 164, via a user interface may be done in various ways in different embodiments. In one embodiment, the score is reported by presenting, on a display of a device of a user (e.g., a smartphone's screen, augmented reality glasses) an indication of the score 164 and/or the certain experience. For example, the indication may be a numerical value, a textual value, an image, and/or video. Optionally, the indication is presented as an alert issued if the score reaches a certain predetermined threshold. Optionally, the indication is given as a recommendation generated by a recommender module such as recommender module 178. In another embodiment, the score 164 may be reported via a voice signal and/or a haptic signal (e.g., via vibrations of a device carried by the user). In some embodiments, reporting the score 164 to a user is done by a software agent operating on behalf of the user, which communicates with the user via a user interface.

In some embodiments, along with presenting information, e.g. about a score such as the score 164, the user interfaces may present information related to the significance of the information, such as a significance level (e.g., p-value, q-value, or false discovery rate), information related to the number of users and/or measurements (the sample size) which were used for determining the information, and/or confidence intervals indicating the variability of the data.

Figure 4:
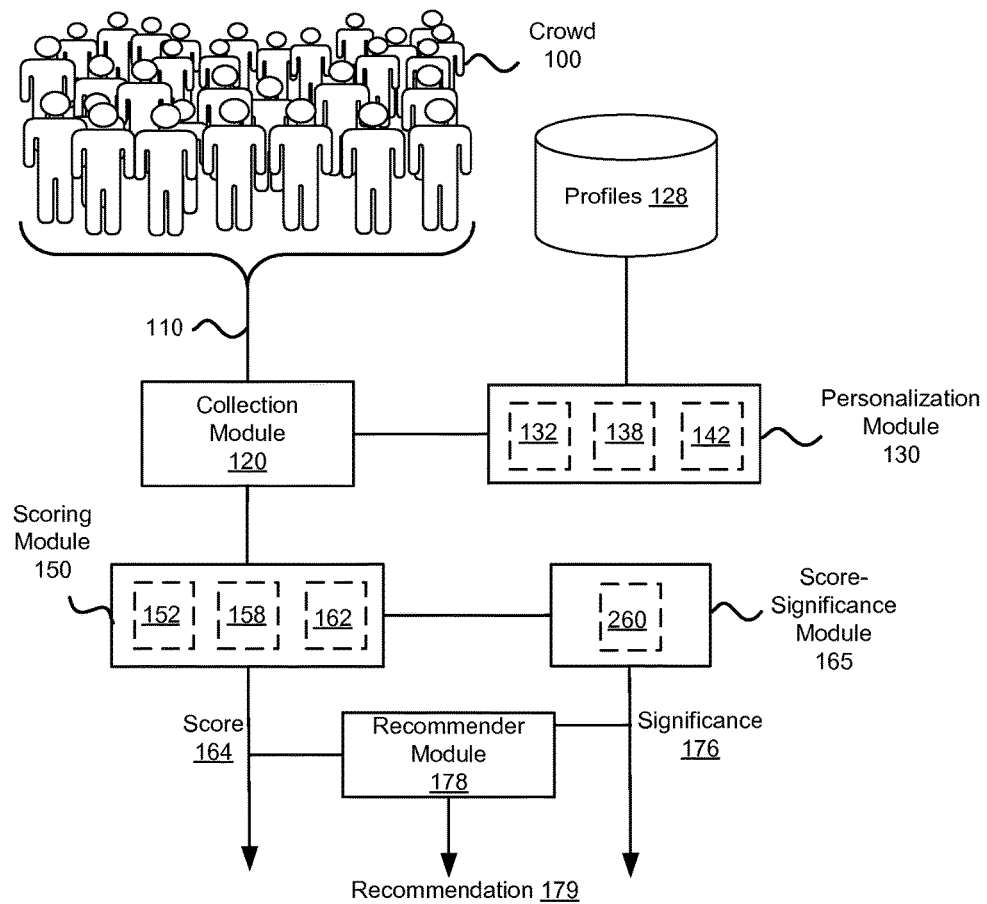
FIG. 4 illustrates one embodiment of a system configured to compute scores for experiences.

FIG. 4 illustrates one embodiment of a system configured to compute scores for experiences. A system that computes a score for an experience includes at least a collection module (e.g., collection module 120) and a scoring module (e.g., scoring module 150). Optionally, such a system may also include additional modules such as the personalization module 130, score-significance module 165, and/or recommender module 178. The illustrated system includes modules that may optionally be found in other embodiments described in this disclosure. This system, like other systems described in this disclosure, includes at least a memory 402 and a processor 401. The memory 402 stores computer executable modules described below, and the processor 401 executes the computer executable modules stored in the memory 402.

The collection module 120 is configured to receive the measurements 110. Optionally, at least some of the measurements 110 may be processed in various ways prior to being received by the collection module 120. For example, at least some of the measurements 110 may be compressed and/or encrypted.

The collection module 120 is also configured to forward at least some of the measurements 110 to the scoring module 150. Optionally, at least some of the measurements 110 undergo processing before they are received by the scoring module 150. Optionally, at least some of the processing is performed via programs that may be considered software agents operating on behalf of the users who provided the measurements 110.

The scoring module 150 is configured to receive at least some of the measurements 110 of affective response from the crowd 100 of users, and to compute a score 164 based on the measurements 110. At least some of the measurements 110 may correspond to a certain experience, i.e., they are measurements of at least some of the users from the crowd 100 taken in temporal proximity to when those users had the certain experience and represent the affective response of those users to the certain experience. Herein "temporal proximity" means nearness in time. For example, at least some of the measurements 110 are taken while users are having the certain experience and/or shortly after that. Additional discussion of what constitutes "temporal proximity" may be found at least in Section 2—Measurements of Affective Response.

A scoring module, such as scoring module 150, may utilize one or more types of scoring approaches that may optionally involve one more other modules. In one example, the scoring module 150 utilizes modules that perform statistical tests on measurements in order to compute the score 164, such as statistical test module 152 and/or statistical test module 158. In another example, the scoring module 150 utilizes arithmetic scorer 162 to compute the score 164.

Figure 9:
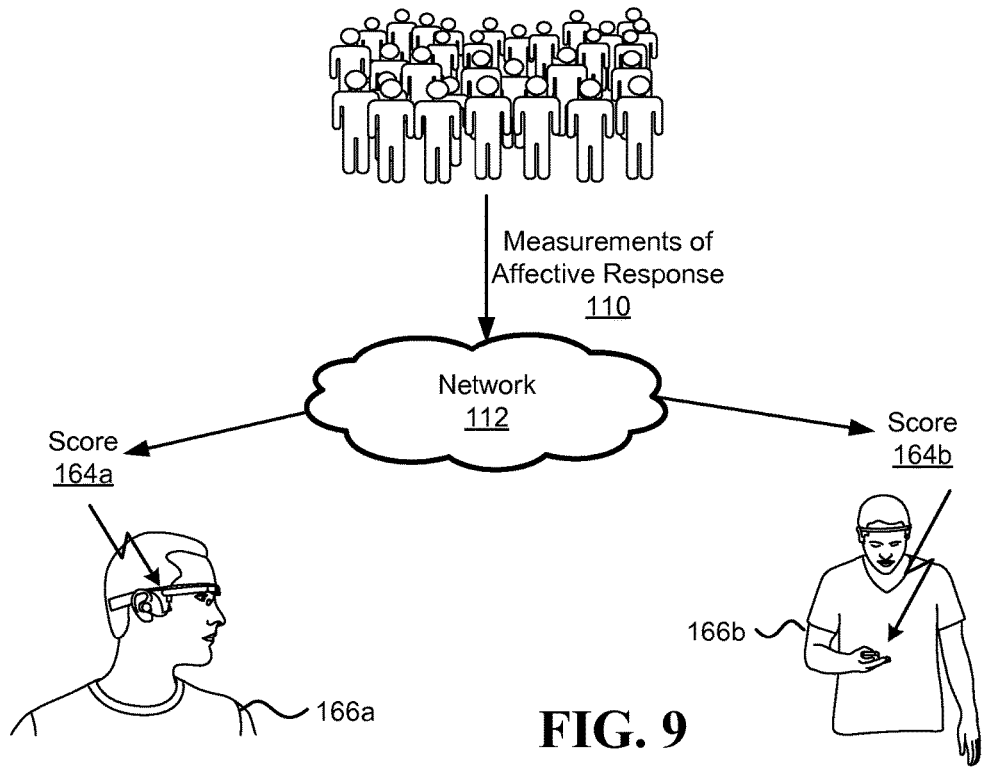
FIG. 9 illustrates one embodiment where the measurements of affective response are provided via network to a system that computes personalized scores for experiences.

In one embodiment, a score computed by a scoring module, such as scoring module 150, may be considered a personalized score for a certain user and/or for a certain group of users. Optionally, the personalized score is generated by providing the personalization module 130 with a profile of the certain user (or a profile corresponding to the certain group of users). The personalization module 130 compares a provided profile to profiles from among the profiles 128, which include profiles of at least some of the users belonging to the crowd 100, in order to determine similarities between the provided profile and the profiles of at least some of the users belonging to the crowd 100. Based on the similarities, the personalization module 130 produces an output indicative of a selection and/or weighting of at least some of the measurements 110. By providing the scoring module 150 with outputs indicative of different selections and/or weightings of measurements from among the measurements 110, it is possible that the scoring module 150 may compute different scores corresponding to the selections and/or weightings of the measurements 110, which are described in the outputs, as illustrated in FIG. 9.

It is to be noted that in this disclosure, profiles of users belonging to the crowd 100 are typically designated by the reference numeral 128. This is not intended to mean that in all embodiments all the profiles of the users belonging to the crowd 100 are the same, rather, that the profiles 128 are profiles of users from the crowd 100, and hence may include any information described in this disclosure as possibly being included in a profile. Thus, using the reference numeral 128 for profiles signals that these profiles are for users who have an experience which may be of any type of experience described in this disclosure.

Additionally, in embodiments described herein there may be various ways in which the personalization module 130 may obtain a profile of a certain user and/or profiles of other users (e.g., profiles 128). In one embodiment, the personalization module 130 requests and/or receives profiles sent to it by other entities (e.g., by users, software agents operating on behalf of users, or entities storing information belonging to profiles of users). In another embodiment, the personalization module 130 may itself store and/or maintain information from profiles of users.

In one embodiment, the score 164 may be provided to the recommender module 178, which may utilize the score 164 to generate recommendation 179, which may be provided to a user (e.g., by presenting an indication regarding the experience on a user interface used by the user). Optionally, the recommender module 178 is configured to recommend the experience for which the score 164 is computed, based on the value of the score 164, in a manner that belongs to a set comprising first and second manners, as described below. When the score 164 reaches a predetermined threshold, the experience is recommended in the first manner, and when the score 164 does not reach the predetermined threshold, the experience is recommended in the second manner, which involves a weaker recommendation than a recommendation given when recommending in the first manner.

Herein, a predetermined threshold is a fixed value and/or a value determined at any time before performing a calculation that compares a score with the predetermined threshold. Furthermore, a threshold may also be considered a predetermined threshold when the threshold involves a value that needs to be reached (in order for the threshold to be reached), and logic used to compute the value is known before starting the computations used to determine whether the value is reached (i.e., before starting the computations to determine whether the predetermined threshold is reached). Examples of what may be considered the logic mentioned above include circuitry, computer code, and/or steps of an algorithm. In addition, a predetermined threshold is reached by a value if the value equals the predetermined threshold or exceeds it. Similarly, a value does not reach the predetermined threshold (i.e., the predetermined threshold is not reached) if the value is below the predetermined threshold.

In one embodiment, the manner in which the recommendation 179 is given may also be determined based on a significance computed for the score 164, such as significance 176 computed by score-significance module 165. Optionally, the significance 176 refers to a statistical significance of the score 164, which is computed based on various characteristics of the score 164 and/or the measurements used to compute the score 164. Optionally, when the significance 176 is below a predetermined significance level (e.g., a p-value that is above a certain value) the recommendation is made in the second manner.

A recommender module, such as the recommender module 178 or other recommender modules described in this disclosure (e.g., recommender modules designated by reference numerals 214, 235, 267, 343, or others), is a module that is configured to recommend an experience based on the value of a crowd-based result computed for the experience. For example, recommender module 178 is configured to recommend an experience based on a score computed for the experience based on measurements of affective response of users who had the experience.

Depending on the value of the crowd-based result computed for an experience, a recommender module may recommend the experience in various manners. In particular, the recommender module may recommend an experience in a manner that belongs to a set including first and second manners. Typically, in this disclosure, when a recommender module recommends an experience in the first manner, the recommender provides a stronger recommendation for the experience, compared to a recommendation for the experience that the recommender module provides when recommending in the second manner. Typically, if the crowd-based result indicates a sufficiently strong (or positive) affective response to an experience, the experience is recommended the first manner. Optionally, if the result indicates a weaker affective response to an experience, which is not sufficiently strong (or positive), the experience is recommended in the second manner.

In some embodiments, a recommender module, such as recommender module 178, is configured to recommend an experience via a display of a user interface. In such embodiments, recommending an experience in the first manner may involve one or more of the following: (i) utilizing a larger icon to represent the experience on a display of the user interface, compared to the size of the icon utilized to represent the experience on the display when recommending in the second manner; (ii) presenting images representing the experience for a longer duration on the display, compared to the duration during which images representing the experience are presented when recommending in the second manner; (iii) utilizing a certain visual effect when presenting the experience on the display, which is not utilized when presenting the experience on the display when recommending the experience in the second manner; and (iv) presenting certain information related to the experience on the display, which is not presented when recommending the experience in the second manner.

In some embodiments, a recommender module, such as recommender module 178, is configured to recommend an experience to a user by sending the user a notification about the experience. In such embodiments, recommending an experience in the first manner may involve one or more of the following: (i) sending the notification to a user about the experience at a higher frequency than the frequency the notification about the experience is sent to the user when recommending the experience in the second manner; (ii) sending the notification to a larger number of users compared to the number of users the notification is sent to when recommending the experience in the second manner; and (iii) on average, sending the notification about the experience sooner than it is sent when recommending the experience in the second manner.

In some embodiments, significance of a score, such as the score 164, may be computed by the score-significance module 165. Optionally, significance of a score, such as the significance 176 of the score 164, may represent various types of values derived from statistical tests, such as p-values, q-values, and false discovery rates (FDRs). Additionally or alternatively, significance may be expressed as ranges, error-bars, and/or confidence intervals.

In one embodiment, significance of a crowd-based result, such as significance of the score 164, significance of a ranking of experiences, significance of parameters of a function, etc., is determined based on characteristics of the measurements used to compute the result. For example, the more measurements and/or users who contributed measurements to computation of a result, the more significant the result may be considered. Thus, in one example, if the number of measurements and/or number of users who contributed measurements used to compute the score 164 exceeds a predetermined threshold, the significance 176 indicates that the score 164 is significant, otherwise, the significance 176 indicates that is score 164 is not significant.

In another embodiment, significance of a score for an experience, such as the score 164, is determined based on parameters of a distribution of scores for the experience. For example, the score-significance module 165 may compute a distribution of scores based on historical scores for the experience, each computed based on previously collected sets of measurements of affective response. In this embodiment, the significance 176 may represent a p-value assigned to the score 164 based on the distribution.

In another embodiment, significance of a score for an experience, such as the score 164, is determined by comparing the score 164 to another score for the experience. Optionally, the significance assigned to the score 164 is based on the significance of the difference between the score 164 and the other score as determined utilizing one or more of the statistical approaches described below. Optionally, the other score to which the score is compared is an average of other scores (e.g., computed for various other experiences) and/or an average of historical scores (e.g., computed for the experience). Optionally, determining the significance of such a comparison is done utilizing the score-difference evaluator module 260.

In yet another embodiment, significance of a score for an experience, such as the score 164, may be determined by a resampling approach, which may be used to learn a distribution of scores for the experience. This distribution may be utilized to determine the significance of the score (e.g., by assigning a p-value to the score). Additional information regarding resampling and/or other approaches for determining significance may be found in this disclosure at least in Section 10—Determining Significance of Results.

In one embodiment, a computer-implemented method for computing a score for a certain experience based on measurements of affective response, includes the following steps: In step 1, receiving, by a system comprising a processor and memory, measurements of affective response of at least ten users taken at most ten minutes after the users had the certain experience; and In step 2, computing, by the system, the experience score based on the measurements; wherein the experience score represents the affective response of the at least ten users to having the certain experience.

In one embodiment, a non-transitory computer-readable medium has instructions stored thereon that, in response to execution by a system including a processor and memory, causes the system to perform operations comprising: receiving measurements of affective response of at least ten users taken at most ten minutes after the users had a certain experience; and computing an experience score based on the measurements; wherein the experience score represents the affective response of the at least ten users to having the certain experience.

In one embodiment, a system configured to report a score for a certain experience based on measurements of affective response, comprises: sensors configured to take measurements of affective response of users; the measurements comprising measurements of affective response of at least ten users taken at most ten minutes after the users had the certain experience; and user interfaces configured to receive data describing the experience score; wherein the experience score is computed based on the measurements of the at least ten users and represents the affective response of the at least ten users to having the certain experience; wherein the user interfaces are further configured to report the experience score.

In one embodiment, a method for reporting a score for a certain experience based on measurements of affective response comprises the following step: taking measurements of affective response of users with sensors; the measurements comprising measurements of affective response of at least ten users taken at most ten minutes after the users had the certain experience; receiving data describing the experience score; wherein the experience score is computed based on the measurements of the at least ten users and represents the affective response of the at least ten users to having the certain experience; and reporting the experience score via user interfaces.

In one embodiment, a non-transitory computer-readable medium has instructions stored thereon that, in response to execution by a system including a processor and memory, cause the system to perform operations comprising: taking measurements of affective response of users with sensors; the measurements comprising measurements of affective response of at least ten users taken at most ten minutes after the users had a certain experience; receiving data describing an experience score; wherein the experience score is computed based on the measurements of the at least ten users and represents the affective response of the at least ten users to having the certain experience; and reporting the experience score via user interfaces.

In one embodiment, a device configured to take measurements of affective response and to report crowd-based experience scores comprises: a sensor configured to take a measurement of affective response of a user to having a certain experience; a transmitter configured to transmit the measurement; a receiver configured to receive data describing an experience score computed based on measurements of affective response of at least three users, taken at most ten minutes after the at least three users had the certain experience; and wherein the measurement of the user is one of the measurements of the at least three users; and a user interface configured to present the experience score to the user.

In one embodiment, a method for taking measurements of affective response and to report crowd-based experience scores comprises the following steps: taking, by a sensor, a measurement of affective response of a user to having a certain experience; transmitting the measurement of affective response; receiving data describing an experience score computed based on measurements of at least three users, taken at most ten minutes after the at least three users had the certain experience; and wherein the measurement of the user is one of the measurements of the at least three users; and reporting the experience score to the user via a user interface.

In one embodiment, a non-transitory computer-readable medium has instructions stored thereon that, in response to execution by a system including a processor and memory, cause the system to perform operations comprising: taking a measurement of affective response of a user with a sensor coupled to the user; receiving data describing an experience score that represents an affective response of at least three users to having a certain experience; wherein the experience score is computed based on measurements of affective response of the at least three users, taken at most ten minutes after the at least three users had the certain experience; and wherein the measurement of the user is one of the measurements of the at least three users; and reporting the experience score to the user via a user interface.

Various embodiments described herein include a collection module, such as the collection module 120, which is configured to receive measurements of affective response of users. In embodiments described herein, measurements received by the collection module, which may be the measurements 110 and/or measurements of affective response designated by another reference numeral, are typically forwarded to other modules to produce a crowd-based result (e.g., scoring module 150, ranking module 220, function learning module 280, and the like). The measurements received by the collection module need not be the same measurements provided to the modules. For example, the measurements provided to the modules may undergo various forms of processing prior to being received by the modules. Additionally, the measurements provided to the modules may not necessarily include all the measurements received by the collection module. For example, the collection module may receive certain measurements that are not required for computation of a crowd-based result (e.g., they involve an experience that is not being scored or ranked at the time).

The collection module 120 may receive and/or provide to other modules measurements collected over various time frames. For example, in some embodiments, measurements of affective response provided by the collection module to other modules (e.g., scoring module 150), are taken over a certain period that extends for at least an hour, a day, a month, or at least a year. For example, when the measurements extend for a period of at least a day, they include at least a first measurement and a second measurement, such that the first measurement is taken at least 24 hours before the second measurement is taken. In other embodiments, at least a certain portion of the measurements of affective response utilized by other modules to compute crowd-based results are taken within a certain period of time. For example, the certain portion may include at least 25%, at least 50%, or at least 90% of the measurements. Furthermore, in this example, the certain period of time may include various windows of time, spanning periods such as at most one minute, at most 10 minutes, at most 30 minutes, at most an hour, at most 4 hours, at most a day, or at most a week.

In some embodiments, a collection module, such as collection module 120, may be considered a module that organizes and/or pre-processes measurements to be used for computing crowd-based results. Optionally, the collection module 120 has an interface that allows other modules to request certain types of measurements, such as measurements involving users who had a certain experience, measurements of users who have certain characteristics (e.g., certain profile attributes), measurements taken during certain times, and/or measurements taken utilizing certain types of sensors and/or operation parameters.

In embodiments described herein, the collection module 120 may be implemented in various ways. In some embodiments, the collection module 120 may be an independent module, while in other modules it may be a module that is part of another module (e.g., it may be a component of scoring module 150). In one example, the collection module 120 includes hardware, such as a processor and memory, and includes interfaces that maintain communication routes with users (e.g., via their devices, in order to receive measurements) and/or with other modules (e.g., in order to receive requests and/or provide measurements). In another example, the collection module 120 may be implemented as, and/or be included as part of, a software module that can run on a general purpose server and/or in a distributed fashion (e.g., the collection module 120 may include modules that run on devices of users).

There are various ways in which the collection module may receive the measurements of affective response. Following are some examples of approaches that may be implemented in embodiments described herein.

In one embodiment, the collection module receives at least some of the measurements directly from the users of whom the measurements are taken. In one example, the measurements are streamed from devices of the users as they are acquired (e.g., a user's smartphone may transmit measurements acquired by one or more sensors measuring the user). In another example, a software agent operating on behalf of the user may routinely transmit descriptions of events, where each event includes a measurement and a description of a user and/or an experience the user had.

In another embodiment, the collection module is configured to retrieve at least some of the measurements from one or more databases that store measurements of affective response of users. Optionally, the one or more databases are part of the collection module. In one example, the one or more databases may involve distributed storage (e.g., cloud-based storage). In another example, the one or more databases may involve decentralized storage (e.g., utilizing blockchain-based systems). Optionally, the collection module submits to the one or more databases queries involving selection criteria which may include: a type of an experience, a location the experience took place, a timeframe during which the experience took place, an identity of one or more users who had the experience, and/or one or more characteristics corresponding to the users or to the experience. Optionally, the measurements comprise results returned from querying the one or more databases with the queries.

In yet another embodiment, the collection module is configured to receive at least some of the measurements from software agents operating on behalf of the users of whom the measurements are taken. In one example, the software agents receive requests for measurements corresponding to events having certain characteristics. Based on the characteristics, a software agent may determine whether the software agent has, and/or may obtain, data corresponding to events that are relevant to the query. In one example, a characteristic of a relevant event may relate to the user corresponding to the event (e.g., the user has certain demographic characteristics or is in a certain situation of interest). In another example, a characteristic of a relevant event may relate to the experience corresponding to the event (e.g., the characteristic may indicate a certain type of experience). In yet another example, a characteristic of a relevant event may relate to the measurement corresponding to the event (e.g., the measurement is taken utilizing a certain type of sensor and/or is taken at least for a certain duration). And in still another example, a characteristic of a relevant event may relate to a duration corresponding to the event, e.g., a certain time window during which the measurement was taken, such as during the preceding day or week.

After receiving a request, a software agent operating on behalf of a user may determine whether to provide information to the collection module and/or to what extent to provide information to the collection module.

When responding to a request for measurements, a software agent may provide data acquired at different times. In one example, the software agent may provide data that was previously recorded, e.g., data corresponding to events that transpired in the past (e.g., during the day preceding the request, the month preceding the request, and even a year or more preceding the request). In another example, the software agent may provide data that is being acquired at the time, e.g., measurements of the user are streamed while the user is having an experience that is relevant to the request. In yet another example, a request for measurements may be stored and fulfilled in the future when the software agent determines that an event relevant to the request has occurred.

A software agent may provide data in various forms. In one embodiment, the software agent may provide raw measurement values. Additionally or alternatively, the software agent may provide processed measurement values, processed in one or more ways as explained above. In some embodiments, in addition to measurements, the software agent may provide information related to events corresponding to the measurements, such as characteristics of the user corresponding to an event, characteristics of the experience corresponding to the event, and/or specifics of the instantiation of the event.

In one embodiment, providing measurements by a software agent involves transmitting, by a device of the user, measurements and/or other related data to the collection module. For example, the transmitted data may be stored on a device of a user (e.g., a smartphone or a wearable computer device). In another embodiment, providing measurements by a software agent involves transmitting an address, an authorization code, and/or an encryption key that may be utilized by the collection module to retrieve data stored in a remote location, and/or with the collection module. In yet another embodiment, providing measurements by the software agent may involve transmitting instructions to other modules or entities that instruct them to provide the collection module with the measurements.

One of the roles the collection module 120 may perform in some embodiments is to organize and/or process measurements of affective response. Section 2—Measurements of Affective Response describes various forms of processing that may be performed, which include, in particular, computing affective values (e.g., with an emotional state estimator) and/or normalizing the measurements with respect to baseline affective response values.

Figure 5A:
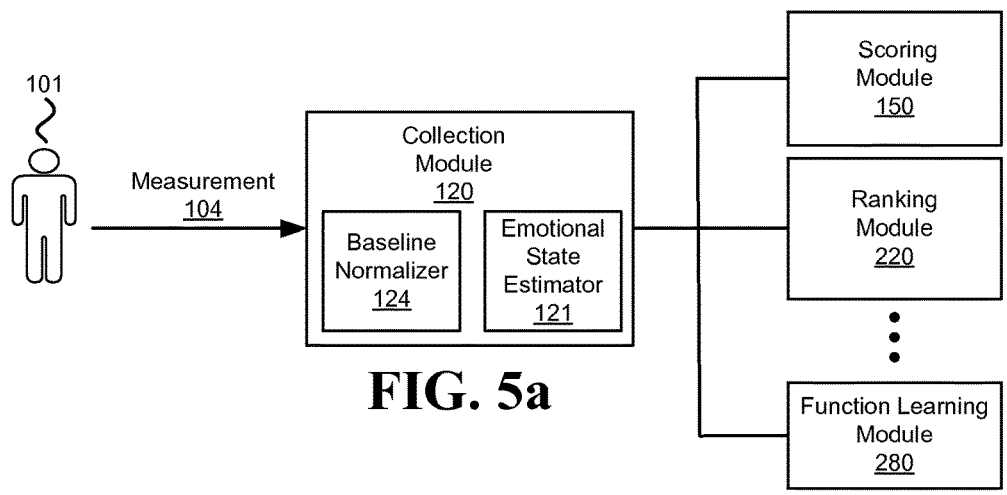
FIG. 5a and FIG. 5b illustrate different scenarios in which the bulk of processing of measurements of affective response is done either by a collection module or by a software agent.
Figure 5B:
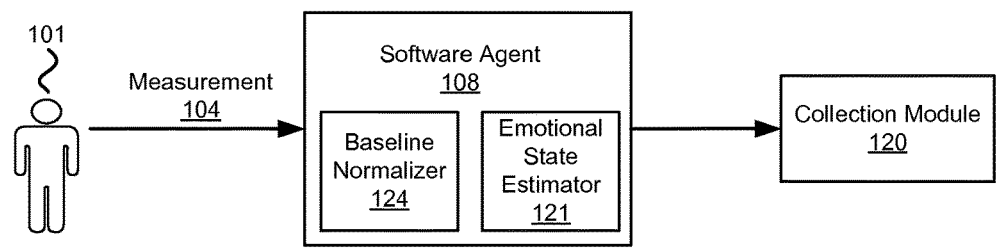

Depending on the embodiment, the processing of measurements of affective response of users may be done in a centralized manner, by the collection module 120, or in a distributed manner, e.g., by software agents operating on behalf of the users. Thus, in some embodiments, various processing methods described in this disclosure are performed in part or in full by the collection module 120, while in others the processing is done in part or in full by the software agents. FIG. 5a and FIG. 5b illustrate different scenarios that may occur in embodiments described herein, in which the bulk of the processing of measurements of affective response is done either by the collection module 120 or by a software agent 108.

FIG. 5a illustrates one embodiment in which the collection module 120 does at least some, if not most, of the processing of measurements of affective response that may be provided to various modules in order to compute crowd-based results. The user 101 provides measurement 104 of affective response to the collection module 120. Optionally, the measurement 104 may be a raw measurement (i.e., it includes values essentially as they were received from a sensor) and/or a partially processed measurement (e.g., subjected to certain filtration and/or noise removal procedures). In this embodiment, the collection module 120 may include various modules that may be used to process measurements such as Emotional State Estimator (ESE) 121 and/or baseline normalizer 124. Optionally, in addition to, or instead of, the ESE 121 and/or the baseline normalizer 124, the collection module 120 may include other modules that perform other types of processing of measurements. For example, the collection module 120 may include modules that compute other forms of affective values described in Section 2—Measurements of Affective Response and/or modules that perform various forms of preprocessing of raw data. In this embodiment, the measurement provided to other modules by the collection module 120 may be considered a processed value and/or an affective value. For example, it may be an affective value representing emotional state 105 and/or normalized measurement 106.

FIG. 5b illustrates one embodiment in which the software agent 108 does at least some, if not most, of the processing of measurements of affective response of the user 101. The user 101 provides measurement 104 of affective response to the software agent 108 which operates on behalf of the user. Optionally, the measurement 104 may be a raw measurement (i.e., it includes values essentially as they were received from a sensor) and/or a partially processed measurement (e.g., subjected to certain filtration and/or noise removal procedures). In this embodiment, the software agent 108 may include various modules that may be used to process measurements such as ESE 121 and/or baseline normalizer 124. Optionally, in addition to, or instead of, the ESE 121 and/or the baseline normalizer 124, the software agent 108 may include other modules that perform other types of processing of measurements. For example, the software agent 108 may include modules that compute other forms of affective values described in Section 2—Measurements of Affective Response and/or modules that perform various forms of preprocessing of raw data. In this embodiment, the measurement provided to the collection module 120 may be considered a processed value and/or an affective value. For example, it may be an affective value representing emotional state 105 and/or normalized measurement 106.

Figure 6:
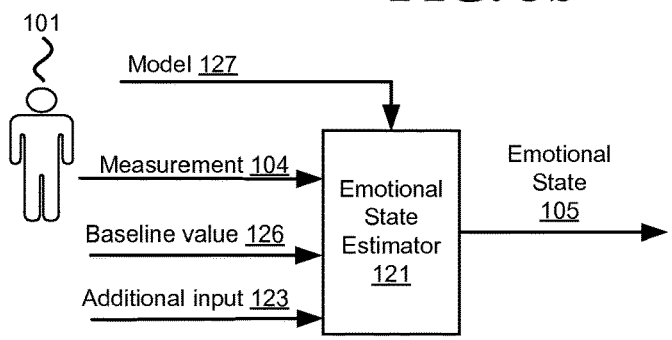
FIG. 6 illustrates one embodiment of the Emotional State Estimator (ESE)

FIG. 6 illustrates one embodiment of the Emotional State Estimator (ESE) 121. In FIG. 6, the user 101 provides a measurement 104 of affective response to the ESE 121. Optionally, the ESE 121 may receive other inputs such as a baseline affective response value 126 and/or additional inputs 123 which may include contextual data about the measurement e.g., a situation the user was in at the time and/or contextual information about the experience to which the measurement 104 corresponds. Optionally, the emotional state estimator may utilize model 127 in order to estimate the emotional state 105 of the user 101 based on the measurement 104. Optionally, the model 127 is a general model, e.g., which is trained on data collected from multiple users. Alternatively, the model 127 may be a personal model of the user 101, e.g., trained on data collected from the user 101. Additional information regarding how emotional states may be estimated and/or represented as affective values may be found in this disclosure at least in Section 2—Measurements of Affective Response.

Figure 7:
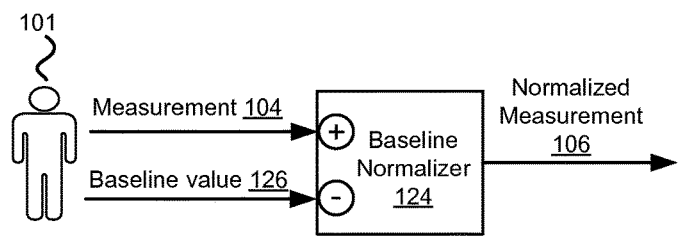
FIG. 7 illustrates one embodiment of a baseline normalizer.

FIG. 7 illustrates one embodiment of the baseline normalizer 124. In this embodiment, the user 101 provides a measurement 104 of affective response and the baseline affective response value 126, and the baseline normalizer 124 computes the normalized measurement 106.

In one embodiment, normalizing a measurement of affective response utilizing a baseline affective response value involves subtracting the baseline affective response value from the measurement. Thus, after normalizing with respect to the baseline, the measurement becomes a relative value, reflecting a difference from the baseline. In another embodiment, normalizing a measurement with respect to a baseline involves computing a value based on the baseline and the measurement such as an average of both (e.g., geometric or arithmetic average).

In some embodiments, a baseline affective response value of a user refers to a value that may represent an affective response of the user under typical conditions. Optionally, a baseline affective response value of a user, that is relevant to a certain time, is obtained utilizing one or more measurements of affective response of the user taken prior to a certain time. For example, a baseline corresponding to a certain time may be based on measurements taken during a window spanning a few minutes, hours, or days prior to the certain time. Additionally or alternatively, a baseline affective response value of a user may be predicted utilizing a model trained on measurements of affective response of the user and/or other users. In some embodiments, a baseline affective response value may correspond to a certain situation, and represent a typical affective response of a user when in the certain situation. Additional discussion regarding baselines, how they are computed, and how they may be utilized may be found in Section 2—Measurements of Affective Response, and elsewhere in this disclosure.

In some embodiments, processing of measurements of affective response, performed by the software agent 108 and/or the collection module 120, may involve weighting and/or selection of the measurements. For example, at least some of the measurements 110 may be weighted such that the measurements of each user have the same weight (e.g., so as not to give a user with many measurements more influence on the computed score). In another example, measurements are weighted according to the time they were taken, for instance, by giving higher weights to more recent measurements (thus enabling a result computed based on the measurements 110 to be more biased towards the current state rather than an historical one). Optionally, measurements with a weight that is below a predetermined threshold and/or have a weight of zero, are not forwarded to other modules in order to be utilized for computing crowd-based results.

Various embodiments described herein may include a module that computes a score for an experience based on measurements of affective response of users who had the experience (e.g., the measurements may correspond to events in which users have the experience). Examples of scoring modules include scoring module 150, dynamic scoring module 180, and aftereffect scoring module 302.

In some embodiments, a score computed by a scoring module is computed solely based on measurements corresponding to events in which users have the experience. In other embodiments, a score computed by a scoring module may be computed based on the measurements and other values, such as baseline affective response values or prior measurements. In one example, a score computed by scoring module 150 is computed based on prior measurements, taken before users have an experience, and contemporaneous measurements, taken while the users have the experience. This score may reflect how the users feel about the experience. In another example, a score computed by the aftereffect scoring module 302 is computed based on prior and subsequent measurements. The prior measurements are taken before users finish having an experience, and the subsequent measurements are taken a certain time after the users finish having the experience. Optionally, this score may be an aftereffect score, reflecting a residual influence an experience had on users, which lasts after the users finish the experience. For example, an aftereffect may correspond to how relaxed and/or reenergized people may feel after having a vacation at a certain destination.

When measurements of affective response correspond to a certain experience, e.g., they are taken while and/or shortly after users have the certain experience, a score computed based on the measurements may be indicative of an extent of the affective response users had to the certain experience. For example, measurements of affective response of users taken while the users were at a certain location may be used to compute a score that is indicative of the affective response of the users to being in the certain location. Optionally, the score may be indicative of the quality of the experience and/or of the emotional response users had to the experience (e.g., the score may express a level of enjoyment from having the experience).

In one embodiment, a score computed by a scoring module, such as the score 164, may include a value representing a quality of the certain experience as determined based on the measurements 110. Optionally, the score includes a value that is at least one of the following: a physiological signal, a behavioral cue, an emotional state, and an affective value. Optionally, the score includes a value that is a function of measurements of at least five users. Optionally, the score is indicative of significance of a hypothesis that the at least five users had a certain affective response. In one example, the certain affective response is manifested through changes to values of at least one of the following: measurements of physiological signals, and measurements of behavioral cues. Optionally, the changes to the values are manifestations of an increase or decrease, to at least a certain extent, in a level of at least one of the following emotions: pain, anxiety, annoyance, stress, aggression, aggravation, fear, sadness, drowsiness, apathy, anger, happiness, content, calmness, attentiveness, affection, and excitement. Additional information regarding scores for experiences, and in particular, the different values they may assume in embodiments described in this disclosure may be found in this disclosure at least in Section 6—Experience Scores.

In order to compute a score, scoring modules may utilize various types of scoring approaches. One example of a scoring approach involves generating a score from a statistical test, such as the scoring approach used by the statistical test module 152 and/or statistical test module 158. Another example of a scoring approach involves generating a score utilizing an arithmetic function, such as a function that may be employed by the arithmetic scorer 162.

Figure 8A:
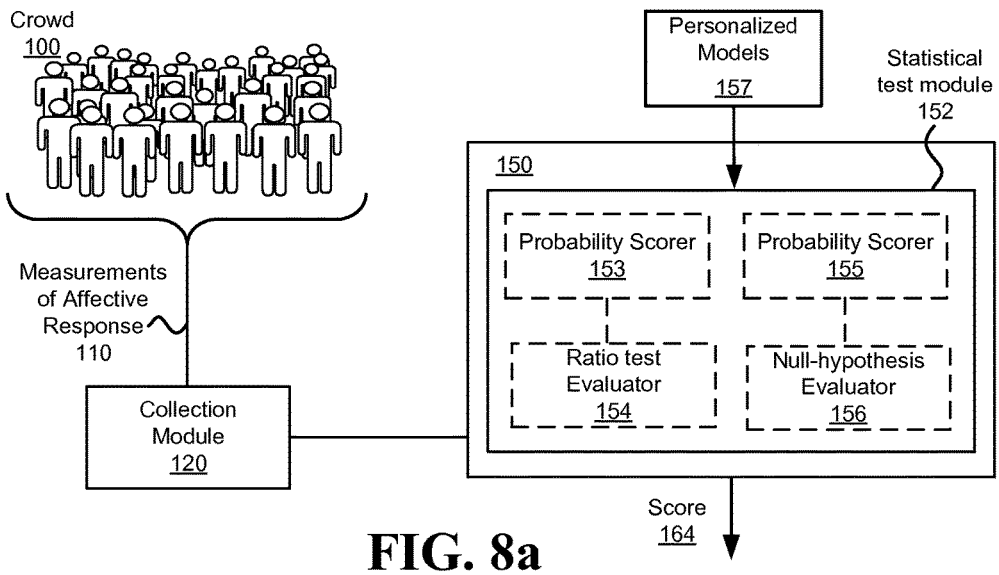
FIG. 8a, FIG. 8b, and FIG. 8c illustrate various embodiments of a scoring module.
Figure 8B:
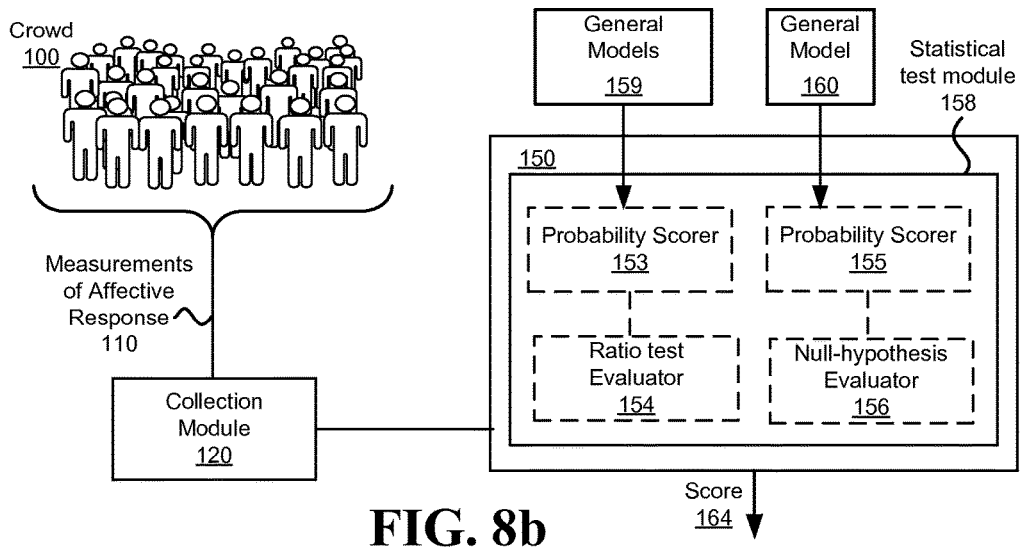

FIG. 8a and FIG. 8b each illustrate one embodiment in which a scoring module (scoring module 150 in the illustrated embodiments) utilizes a statistical test module to compute a score for an experience (score 164 in the illustrated embodiments). In FIG. 8a, the statistical test module is statistical test module 152, while in FIG. 8b, the statistical test module is statistical test module 158. The statistical test modules 152 and 158 include similar internal components, but differ based on models they utilize to compute statistical tests. The statistical test module 152 utilizes personalized models 157 while the statistical test module 158 utilizes general models 159 (which include a first model and a second model).

In one embodiment, a personalized model of a user is trained on data comprising measurements of affective response of the user. It thus may be more suitable to interpret measurements of the user. For example, it may describe specifics of the characteristic values of the user's affective response that may be measured when the user is in certain emotional states. Optionally, a personalized model of a user is received from a software agent operating on behalf of the user. Optionally, the software agent may collect data used to train the personalized model of the user by monitoring the user. Optionally, a personalized model of a user is trained on measurements taken while the user had various experiences, which may be different than the experience for which a score is computed by the scoring module in FIG. 8a. Optionally, the various types of experiences include experience types that are different from the experience type of the experience whose score is being computed by the scoring module. In contrast to a personalized model, a general model, such as a model from among the general models 159, is trained from data collected from multiple users and may not even be trained on measurements of any specific user whose measurement is used to compute a score.

In some embodiments, the statistical test modules 152 and 158 each may perform at least one of two different statistical tests in order to compute a score based on a set of measurements of users: a hypothesis test, and a test involving rejection of a null hypothesis.

In some embodiments, performing a hypothesis test utilizing statistical test module 152, is done utilizing a probability scorer 153 and a hypothesis ratio evaluator 154. The probability scorer 153 is configured to compute for each measurement of a user, from among the users who provided measurements to compute the score, first and second corresponding values, which are indicative of respective first and second probabilities of observing the measurement based on respective first and second personalized models of the user. Optionally, the first and second personalized models of the users are from among the personalized models 157. Optionally, the first and second personalized models are trained on data comprising measurements of affective response of the user taken when the user had positive and non-positive affective responses, respectively. For example, the first model might have been trained on measurements of the user while the user was happy, satisfied, and/or comfortable, while the second model might have been trained on measurements of affective response taken while the user was in a neutral emotional state or a negative emotional state (e.g., angry, agitated, uncomfortable). Optionally, the higher the probability of observing a measurement based on a model, the more it is likely that the user was in the emotional state corresponding to the model.

The hypothesis ratio evaluator 154 is configured to determine the significance level for a hypothesisbased on a ratio between a first set of values comprising the first value corresponding to each of the measurements, and a second set of values comprising the second value corresponding to each of the measurements. Optionally, the hypothesis supports an assumption that, on average, the users who contributed measurements to the computation of the score had a positive affective response to the experience. Optionally, the non-positive affective response is a manifestation of a neutral emotional state or a negative emotional state. Thus, if the measurements used to compute the score are better explained by the first model of each user (corresponding to the positive emotional response), then the ratio computed by the hypothesis ratio evaluator 154 will be positive and/or large. The greater the value of the ratio, the more the score will indicate that the hypothesis is true and that the measurements of the users represent a positive affective response to the experience. However, if the measurements were not positive it is likely that the ratio will be negative and/or small, representing that the hypothesis should be rejected in favor of a competing hypothesis that states that the users had a non-positive affective response to the experience. Optionally, a score computed based on the ratio is proportional to the logarithm of the ratio. Thus, the stronger the notion to accept the hypothesis based on the hypothesis test, the greater the computed score.

In some embodiments, performing a hypothesis test utilizing statistical test module 158, is done in a similar fashion to the description given above for performing the same test with the statistical test module 152, but rather than using the personalized models 157, the general models 159 are used instead. When using the statistical test module 158, the probability scorer 153 is configured to compute for each measurement of a user, from among the users who provided measurements to compute the score, first and second corresponding values, which are indicative of respective first and second probabilities of observing the measurement based on respective first and second models belonging to the general models 159. Optionally, the first and second models are trained on data comprising measurements of affective response of users taken while the users had positive and non-positive affective responses, respectively.

The hypothesis ratio evaluator 154 is configured to determine the significance level for a hypothesis based on a ratio between a first set of values comprising the first value corresponding to each of the measurements, and a second set of values comprising the second value corresponding to each of the measurements. Optionally, the hypothesis supports an assumption that, on average, the users who contributed measurements to the computation of the score had a positive affective response to the experience. Optionally, the non-positive affective response is a manifestation of a neutral emotional state or a negative emotional state. Thus, if the measurements used to compute the score are better explained by the first model from the general models 159 (which corresponds to the positive emotional response), then the ratio computed by the hypothesis ratio evaluator 154 will be positive.

In one embodiment, the hypothesis is a supposition and/or proposed explanation used for evaluating the measurements of affective response. By stating that the hypothesis supports an assumption it is meant that according to the hypothesis, the evidence (e.g., the measurements of affective response and/or baseline affective response values) exhibit values that correspond to the supposition and/or proposed explanation.

In one embodiment, the hypothesis ratio evaluator 154 utilizes a log-likelihood test to determine, based on the first and second sets of values, whether the hypothesis should be accepted and/or the significance level of accepting the hypothesis. If the distribution of the log-likelihood ratio corresponding to a particular null and alternative hypothesis can be explicitly determined, then it can directly be used to form decision regions (to accept/reject the null hypothesis). Alternatively or additionally, one may utilize Wilk's theorem which states that as the sample size approaches infinity, the test statistic $-\log(\Lambda)$, with $\Lambda$ being the log-likelihood value, will be $\chi^2$-distributed. Optionally, the score is computed by a scoring module that utilizes a hypothesis test is proportional to the test statistic $-\log(\Lambda)$.

In some embodiments, performing a statistical test that involves rejecting a null hypothesis utilizing statistical test module 152, is done utilizing a probability scorer 155 and a null-hypothesis evaluator 156. The probability scorer 155 is configured to compute, for each measurement of a user, from among the users who provided measurements to compute the score, a probability of observing the measurement based on a personalized model of the user. Optionally, the personalized model of the user is trained on training data comprising measurements of affective response of the user taken while the user had a certain affective response. Optionally, the certain affective response is manifested by changes to values of at least one of the following: measurements of physiological signals, and measurements of behavioral cues. Optionally, the changes to the values are manifestations of an increase or decrease, to at least a certain extent, in a level of at least one of the following emotions: happiness, content, calmness, attentiveness, affection, tenderness, excitement, pain, anxiety, annoyance, stress, aggression, fear, sadness, drowsiness, apathy, and anger.

The null-hypothesis evaluator 156 is configured to determine the significance level for a hypothesis based on probabilities computed by the probability scorer 155 for the measurements of the users who contributed measurements for the computation of the score. Optionally, the hypothesis is a null hypothesis that supports an assumption that the users who contributed measurements of affective response to the computation of the score had the certain affective response when their measurements were taken, and the significance level corresponds to a statistical significance of rejecting the null hypothesis. Optionally, the certain affective response is a neutral affective response. Optionally, the score is computed based on the significance which is expressed as a probability, such as a p-value. For example, the score may be proportional to the logarithm of the p-value.

In one example, the certain affective response corresponds to a manifestation of a negative emotional state. Thus, the stronger the rejection of the null hypothesis, the less likely it is that the users who contributed the measurements were in fact in a negative emotional state, and thus, the more positive the score may be (e.g., if expressed as a log of a p-value of the null hypothesis).

In some embodiments, performing a statistical test that involves rejecting a null hypothesis utilizing statistical test module 158, is done in a similar fashion to the description given above for performing the same test with the statistical test module 152, but rather than using the personalized models 157, the general model 160 is used instead.

The probability scorer 155 is configured to compute, for each measurement of a user, from among the users who provided measurements to compute the score, a probability of observing the measurement based on the general model 160. Optionally, the general model 160 is trained on training data comprising measurements of affective response of users taken while the users had the certain affective response.

The null-hypothesis evaluator 156 is configured to determine the significance level for a hypothesis based on probabilities computed by the probability scorer 155 for the measurements of the users who contributed measurements for the computation of the score. Optionally, the hypothesis is a null hypothesis that supports an assumption that the at least ten users had the certain affective response when their measurements were taken, and the significance level corresponds to a statistical significance of rejecting the null hypothesis.

In some embodiments, a statistical test module such as the statistical test modules 152 and/or 158 are configured to determine whether the significance level for a hypothesis reaches a certain level. Optionally, the significance level reaching the certain level indicates at least one of the following: a p-value computed for the hypothesis equals, or is below, a certain p-value, and a false discovery rate computed for the hypothesis equals, or is below, a certain rate. Optionally, the certain p-value is a value greater than 0 and below 0.33, and the certain rate is a value greater than 0 and below 0.33.

In some cases, the fact that significance for a hypothesis is computed based on measurements of a plurality of users increases the statistical significance of the results of a test of the hypothesis. For example, if the hypothesis is tested based on fewer users, a significance of the hypothesis is likely to be smaller than when it is tested based on measurements of a larger number of users. Thus, it may be possible, for example, for a first significance level for a hypothesis computed based on measurements of at least ten users to reach a certain level. However, on average, a second significance level for the hypothesis, computed based on the measurements of affective response of a randomly selected group of less than five users out of the at least ten users, will not reach the certain level. Optionally, the fact the second significance level does not reach the certain level indicates at least one of the following: a p-value computed for the hypothesis is above the certain p-value, and a false discovery rate computed for the hypothesis is above the certain rate.

Figure 8C:
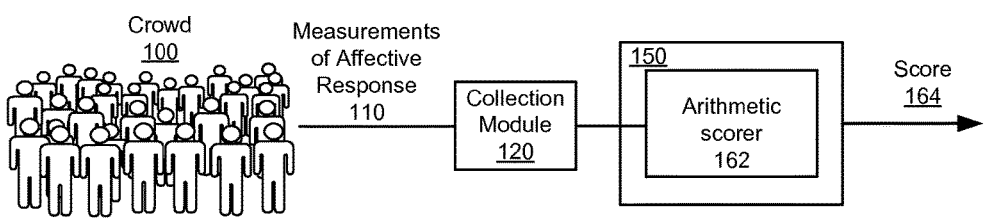

FIG. 8c illustrates one embodiment in which a scoring module utilizes the arithmetic scorer 162 in order to compute a score for an experience. The arithmetic scorer 162 receives measurements of affective response from the collection module 120 and computes the score 164 by applying one or more arithmetic functions to the measurements. Optionally, the arithmetic function is a predetermined arithmetic function. For example, the logic of the function is known prior to when the function is applied to the measurements. Optionally, a score computed by the arithmetic function is expressed as a measurement value which is greater than the minimum of the measurements used to compute the score and lower than the maximum of the measurements used to compute the score. In one embodiment, applying the predetermined arithmetic function to the measurements comprises computing at least one of the following: a weighted average of the measurements, a geometric mean of the measurements, and a harmonic mean of the measurements. In another embodiment, the predetermined arithmetic function involves applying mathematical operations dictated by a machine learning model (e.g., a regression model). In some embodiments, the predetermined arithmetic function applied by the arithmetic scorer 162 is executed by a set of instructions that implements operations performed by a machine learning-based predictor that receives the measurements used to compute a score as input.

In some embodiments, a scoring module may compute a score for an experience based on measurements that have associated weights. In one example, the weights may be determined based on the age of the measurements (e.g., when the scoring module is the dynamic scoring module 180). In another example, the weights may be assigned by the personalization module 130, and/or may be determined based on an output generated by the personalization module 130, in order for the scoring module to compute a personalized score. The scoring modules described above can easily be adapted by one skilled in the art in order to accommodate weights. For example, the statistical test modules may utilize weighted versions of the hypothesis test (i.e., a weighted version of the likelihood ratio test and/or the test for rejection of a null hypothesis). Additionally, many arithmetic functions that are used to compute scores can be easily adapted to a case where measurements have associated weights. For example, instead of a score being computed as a regular arithmetic average, it may be computed as a weighted average.

Herein a weighted average of a plurality of measurements may be any function that can be described as a dot-product between a vector of real-valued coefficients and a vector of the measurements. Optionally, the function may give at least some of the measurements a different weight (i.e., at least some of the measurements may have different valued corresponding coefficients).

In one embodiment, a computer-implemented method for determining significance of a hypothesis that having an experience is associated with experiencing a certain affective response comprises the following steps: receiving, by a system comprising a processor and memory, measurements of affective response of at least ten users; wherein each measurement of a user corresponds to an event in which the user had the experience; computing, by the system, for each measurement of a user, first and second values, which are indicative of respective first and second probabilities of observing the measurement based on respective first and second personalized models of the user; wherein the first and second personalized models are trained on data comprising measurements of affective response of the user taken when the user had positive and negative affective responses, respectively; and determining, by the system, a significance level for the hypothesis, computed based on a first set of values comprising the first value computed for each of the measurements and a second set of values comprising the second value computed for each of the measurements; wherein the hypothesis supports an assumption that, on average, the at least ten users had a positive affective response to the experience.

In one embodiment, a non-transitory computer-readable medium has instructions stored thereon that, in response to execution by a system including a processor and memory, causes the system to perform operations comprising: receiving measurements of affective response of at least ten users; wherein each measurement of a user corresponds to an event in which the user had a certain experience; computing for each measurement of a user, first and second values, which are indicative of respective first and second probabilities of observing the measurement based on respective first and second personalized models of the user; wherein the first and second personalized models are trained on data comprising measurements of affective response of the user taken when the user had positive and negative affective responses, respectively; and determining a significance level for a hypothesis, computed based on a first set of values comprising the first value computed for each of the measurements and a second set of values comprising the second value computed for each of the measurements; wherein the hypothesis supports an assumption that, on average, the at least ten users had a positive affective response to the experience.

In one embodiment, a system configured to report significance of a hypothesis that having an experience is associated with experiencing a certain affective response comprises: sensors configured to take measurements of affective response of users; the measurements comprising measurements of affective response of at least ten users, with each measurement of a user corresponding to an event in which the user had the experience; and user interfaces configured to receive data describing a significance level for an hypothesis that supports an assumption that, on average, the at least ten users had a positive affective response to the experience; wherein the significance level is computed based on first and second sets of values; wherein the first set of values comprises, for each measurement of a user, a value indicative of a probability of observing the measurement according to a first personalized model of the user, and the second set of values comprises, for each measurement of a user, a value indicative of a probability of observing the measurement according to a second personalized model of the user; and wherein the first and second personalized models of a user are trained on data comprising measurements of affective response of the user, taken when the user had positive and negative affective responses, respectively; and the user interfaces are further configured to report the significance level for the hypothesis.

In one embodiment, a method for reporting significance of a hypothesis that having an experience is associated with experiencing a certain affective response comprises the following steps: taking measurements of affective response of users with sensors coupled to the users; the measurements comprising measurements of affective response of at least ten users, with each measurement of a user corresponding to an event in which the user had the experience; and receiving data describing a significance level for an hypothesis that supports an assumption that, on average, the at least ten users had a positive affective response to the experience; wherein the significance level is computed based on first and second sets of values; wherein the first set of values comprises, for each measurement of a user, a value indicative of a probability of observing the measurement according to a first personalized model of the user, and the second set of values comprises, for each measurement of a user, a value indicative of a probability of observing the measurement according to a second personalized model of the user; and wherein the first and second personalized models of a user are trained on data comprising measurements of affective response of the user, taken when the user had positive and negative affective responses, respectively; and reporting the significance level for the hypothesis via user interfaces.

In one embodiment, a non-transitory computer-readable medium has instructions stored thereon that, in response to execution by a system including a processor and memory, cause the system to perform operations comprising: taking measurements of affective response of users with sensors coupled to the users; the measurements comprising measurements of affective response of at least ten users, with each measurement of a user corresponding to an event in which the user had a certain experience; and receiving data describing a significance level for an hypothesis that supports an assumption that, on average, the at least ten users had a positive affective response to the certain experience; wherein the significance level is computed based on first and second sets of values; wherein the first set of values comprises, for each measurement of a user, a value indicative of a probability of observing the measurement according to a first personalized model of the user, and the second set of values comprises, for each measurement of a user, a value indicative of a probability of observing the measurement according to a second personalized model of the user; and wherein the first and second personalized models of a user are trained on data comprising measurements of affective response of the user, taken when the user had positive and negative affective responses, respectively; and reporting the significance level for the hypothesis via user interfaces.

The crowd-based results generated in some embodiments described in this disclosure may be personalized results. In particular, when scores are computed for experiences, by various systems such as illustrated in FIG. 4, in some embodiments, the same set of measurements may be used to compute different scores for different users. Such a scenario is illustrated in FIG. 9, where the measurements 110 of affective response are provided via network 112 to a system that computes personalized scores for experiences. The network 112 also forwards to two different users 166a and 166b respective scores 164a and 164b which have different values. Optionally, the two users 166a and 166b receive an indication of their respective scores essentially at the same time, such as at most within a few minutes of each other.

Figure 10A:
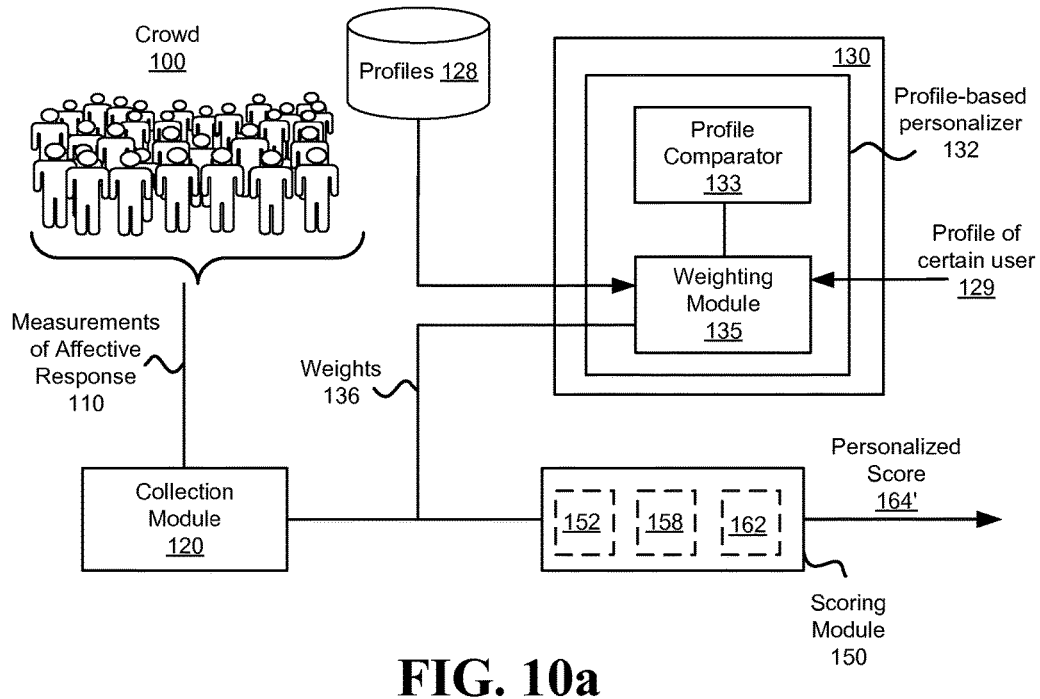
FIG. 10a, FIG. 10b, and FIG. 10c illustrate various embodiments of the personalization module.
Figure 10B:
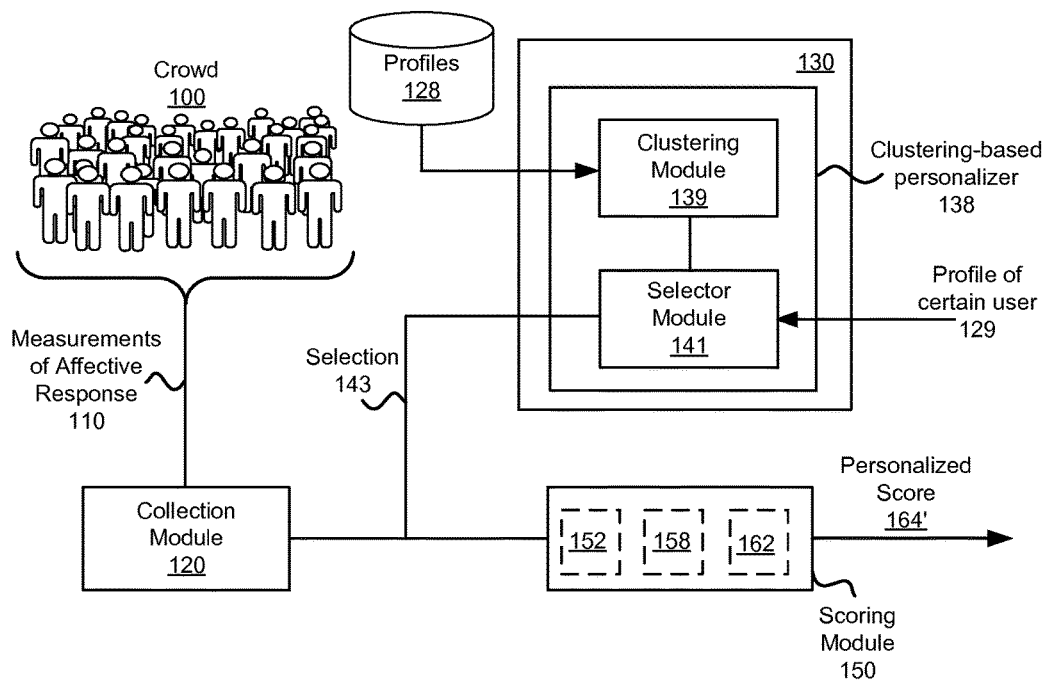
Figure 10C:
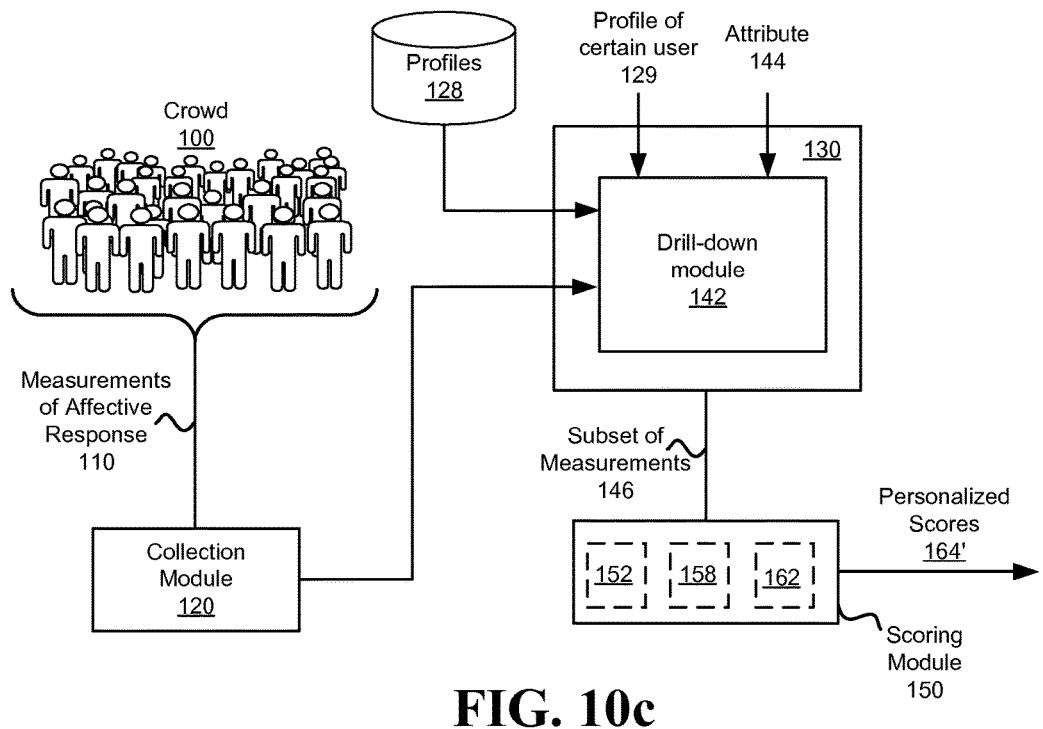

The personalization module 130 is utilized in order to generate personalized crowd-based results in some embodiments described in this disclosure. Depending on the embodiment, personalization module 130 may have different components and/or different types of interactions with other system modules, such as scoring modules, ranking modules, function learning modules, etc. FIG. 10a to FIG. 10c illustrate various configurations according to which personalization module 130 may be used in a system illustrated by FIG. 4. However, the teachings regarding how the different types of components of the personalization module 130 operate and influence the generation of crowd-based results are applicable to other modules, systems, and embodiments described in this disclosure.

FIG. 10a illustrates one embodiment of a system configured to utilize comparison of profiles of users to compute personalized scores for an experience based on measurements of affective response of the users who have the experience. The system includes at least the collection module 120, the personalization module 130, and the scoring module 150. In this embodiment, the personalization module 130 utilizes profile-based personalizer 132 which comprises profile comparator 133 and weighting module 135.

The collection module 120 is configured to receive measurements 110 of affective response, which in this embodiment include measurements of at least ten users. Each measurement of a user, from among the measurements of the at least ten users, corresponds to an event in which the user has the experience.

The profile comparator 133 is configured to compute a value indicative of an extent of a similarity between a pair of profiles of users. Optionally, a profile of a user includes information that describes one or more of the following: an indication of an experience the user had, a demographic characteristic of the user, a genetic characteristic of the user, a static attribute describing the body of the user, a medical condition of the user, an indication of a content item consumed by the user, and a feature value derived from semantic analysis of a communication of the user. The profile comparator 133 does not always return the same result when comparing various pairs of profiles. For example, there are at least first and second pairs of profiles, such that for the first pair of profiles, the profile comparator 133 computes a first value indicative of a first similarity between the first pair of profiles, and for the second pair of profiles, the profile comparator 133 computes a second value indicative of a second similarity between the second pair of profiles.

The weighting module 135 is configured to receive a profile 129 of a certain user and the profiles 128, which comprise profiles of the at least ten users and to generate an output that is indicative of weights 136 for the measurements of the at least ten users. Optionally, the weight for a measurement of a user, from among the at least ten users, is proportional to a similarity computed by the profile comparator 133 between a pair of profiles that includes the profile of the user and the profile 129, such that a weight generated for a measurement of a user whose profile is more similar to the profile 129 is higher than a weight generated for a measurement of a user whose profile is less similar to the profile 129. The weighting module 135 does not always generate the same output for all profiles of certain users that are provided to it. That is, there are at least a certain first user and a certain second user, who have different profiles, for which the weighting module 135 produces respective first and second outputs that are different. Optionally, the first output is indicative of a first weighting for a measurement from among the measurements of the at least ten users, and the second output is indicative of a second weighting, which is different from the first weighting, for the measurement from among the measurements of the at least ten users.

Herein, a weight of a measurement determines how much the measurement's value influences a value computed based on the measurement. For example, when computing a score based on multiple measurements that include first and second measurements, if the first measurement has a higher weight than the second measurement, it will not have a lesser influence on the value of the score than the influence of the second measurement on the value of the score. Optionally, the influence of the first measurement on the value of the score will be greater than the influence of the second measurement on the value of the score.

It is to be noted that in this disclosure, a profile of a certain user, such as profile 129, may not necessarily correspond to a real person and/or be derived from data of a single real person. In some embodiments, a profile of a certain user may be a profile of a representative user, which has information in it corresponding to attribute values that may characterize one or more people for whom a crowd-based result is computed.

The scoring module 150 is configured to compute a score 164', for the experience, for the certain user based on the measurements and weights 136, which were computed based on the profile 129 of the certain user. In this case, the score 164' may be considered a personalized score for the certain user.

When computing scores, the scoring module 150 takes into account the weightings generated by the weighting module 135 based on the profile 129. That is, it does not compute the same scores for all weightings (and/or outputs that are indicative of the weightings). In particular, at least for the certain first user and the certain second user, who have different profiles and different outputs generated by the weighting module 135, the scoring module computes different scores. Optionally, when computing a score for the certain first user, a certain measurement has a first weight, and when computing a score for the certain second user, the certain measurement has a second weight that is different from the first weight.

In one embodiment, the scoring module 150 may utilize the weights 136 directly by weighting the measurements used to compute a score. For example, if the score 164' represents an average of the measurements, it may be computed using a weighted average instead of a regular arithmetic average. In another embodiment, the scoring module 150 may end up utilizing the weights 136 indirectly. For example, the weights may be provided to the collection module 120, which may determine based on the weights, which of the measurements 110 should be provided to the scoring module 150. In one example, the collection module 120 may provide only measurements for which associated weights determined by weighting module 135 reach a certain minimal weight.

Herein a profile of a user may involve various forms of information storage and/or retrieval. The use of the term "profile" is not intended to mean that all the information in a profile is stored at a single location. A profile may be a collection of data records stored at various locations and/or held by various entities. Additionally, stating that a profile of a user has certain information does not imply that the information is specifically stored in a certain memory or media; rather, it may imply that the information may be obtained, e.g., by querying certain systems and/or performing computations on demand. In one example, at least some of the information in a profile of a user is stored and/or disseminated by a software agent operating on behalf of the user. In different embodiments, a profile of a user may include various forms of information as elaborated on below.

In one embodiment, a profile of a user may include indications of experiences the user had. This information may include a log of experiences the user had and/or statistics derived from such a log. Information related to experiences the user had may include, for an event in which the user had an experience, attributes such as the type of experience, the duration of the experience, the location in which the user had the experience, the cost of the experience, and/or other parameters related to such an event. The profile may also include values summarizing such information, such as indications of how many times and/or how often a user has certain experiences.

In another embodiment, a profile of a user may include demographic data about the user. This information may include attributes such as age, gender, income, address, occupation, religious affiliation, political affiliation, hobbies, memberships in clubs and/or associations, and/or other attributes of the like.

In yet another embodiment, a profile of a user may include medical information about the user. The medical information may include data about properties such as age, weight, and/or diagnosed medical conditions. Additionally or alternatively, the profile may include information relating to genotypes of the user (e.g., single nucleotide polymorphisms) and/or phenotypic markers. Optionally, medical information about the user involves static attributes, or attributes whose values change very slowly (which may also be considered static). For example, genotypic data may be considered static, while weight and diagnosed medical conditions change slowly and may also be considered static. Such information pertains to a general state of the user, and does not describe the state of the user at specific time and/or when the user performs a certain activity.

The static information mentioned above may be contrasted with dynamic medical data, such as data obtained from measurements of affective response. For example, heart rate measured at a certain time, brainwave activity measured with EEG, and/or images of a user used to capture a facial expression, may be considered dynamic data. In some embodiments, a profile of a user does not include dynamic medical information. In particular, in some embodiments, a profile of a user does not include measurements of affective response and/or information derived from measurements of affective response. For example, in some embodiments, a profile of a user does not include data gathered by one or more of the sensors described in Section 1—Sensors, and/or information derived from such data.

Content a user generates and/or consumes may also be represented in a profile of a user. In one embodiment, a profile of a user may include data describing content items a user consumed (e.g., movies, music, websites, games, and/or virtual reality experiences). In another embodiment, a profile of a user may include data describing content the user generated such as images taken by the user with a camera, posts on a social network, conversations (e.g., text, voice, and/or video). Optionally, a profile may include both indications of content generated and/or consumed (e.g., files containing the content and/or pointer to the content such as URLs). Additionally or alternatively, the profile may include feature values derived from the content such as indications of various characteristics of the content (e.g., types of content, emotions expressed in the content, and the like). Optionally, the profile may include feature values derived from semantic analysis of a communication of the user. Examples of semantic analysis include: (i) Latent Semantic Analysis (LSA) or latent semantic indexing of text in order to associate a segment of content with concepts and/or categories corresponding to its meaning; and (ii) utilization of lexicons that associate words and/or phrases with core emotions, which may assist in determining which emotions are expressed in a communication.

There are various ways in which profile comparator 133 may compute similarities between profiles. Optionally, the profile comparator 133 may utilize a procedure that evaluates pairs of profiles independently to determine the similarity between them. Alternatively, the profile comparator 133 may utilize a procedure that evaluates similarity between multiple profiles simultaneously (e.g., produce a matrix of similarities between all pairs of profiles).

It is to be noted that when computing similarity between profiles, the profile comparator 133 may rely on a subset of the information in the profiles in order to determine similarity between the profiles. In particular, in some embodiments, a similarity determined by the profile comparator 133 may rely on the values of a small number of attributes or even on values of a single attribute. For example, in one embodiment, the profile comparator 133 may determine similarity between profiles users based solely on the age of the users as indicated in the profiles.

In one embodiment, profiles of users are represented as vectors of values that include at least some of the information in the profiles. In this embodiment, the profile comparator 133 may determine similarity between profiles by using a measure such as a dot product between the vector representations of the profiles, the Hamming distance between the vector representations of the profiles, and/or using a distance metric such as Euclidean distance between the vector representations of the profiles.

In another embodiment, profiles of users may be clustered by the profile comparator 133 into clusters using one or more clustering algorithms that are known in the art (e.g., k-means, hierarchical clustering, or distribution-based Expectation-Maximization). Optionally, profiles that fall within the same cluster are considered similar to each other, while profiles that fall in different clusters are not considered similar to each other. Optionally, the number of clusters is fixed ahead of time or is proportionate to the number of profiles. Alternatively, the number of clusters may vary and depend on criteria determined from the clustering (e.g., ratio between inter-cluster and intra-cluster distances). Optionally, a profile of a first user that falls into the same cluster to which the profile of a certain user belongs is given a higher weight than a profile of a second user, which falls into a different cluster than the one to which the profile of the certain user belongs. Optionally, the higher weight given to the profile of the first user mans that a measurement of the first user is given a higher weight than a measurement of the second user, when computing a personalized score for the certain user.

In yet another embodiment, the profile comparator 133 may determine similarity between profiles by utilizing a predictor trained on data that includes samples and their corresponding labels. Each sample includes feature values derived from a certain pair of profiles of users, and the sample's corresponding label is indicative of the similarity between the certain pair of profiles. Optionally, a label indicating similarity between profiles may be determined by manual evaluation. Optionally, a label indicating similarity between profiles may be determined based on the presence of the profiles in the same cluster (as determined by a clustering algorithm) and/or based on results of a distance function applied to the profiles. Optionally, pairs of profiles that are not similar may be randomly selected. In one example, given a pair of profiles, the predictor returns a value indicative of whether they are considered similar or not.

FIG. 10b illustrates one embodiment of a system configured to utilize clustering of profiles of users to compute personalized experience scores based on measurements of affective response of the users. The system includes at least the collection module 120, the personalization module 130, and the scoring module 150. In this embodiment, the personalization module 130 utilizes clustering-based personalizer 138 which comprises clustering module 139 and selector module 141.

The collection module 120 is configured to receive measurements 110 of affective response, which in this embodiment include measurements of at least ten users. Each measurement of a user, from among the measurements of the at least ten users, corresponds to an event in which the user has an experience.

The clustering module 139 is configured to receive the profiles 128 of the at least ten users, and to cluster the at least ten users into clusters based on profile similarity, with each cluster comprising a single user or multiple users with similar profiles. Optionally, the clustering module 139 may utilize the profile comparator 133 in order to determine similarity between profiles. There are various clustering algorithms known in the art which may be utilized by the clustering module 139 to cluster users. Some examples include hierarchical clustering, partition-based clustering (e.g., k-means), and clustering utilizing an Expectation-Maximization algorithm.

The selector module 141 is configured to receive a profile 129 of a certain user, and based on the profile, to select a subset comprising at most half of the clusters of users. Optionally, the selection of the subset is such that on average, the profile 129 is more similar to a profile of a user who is a member of a cluster in the subset, than it is to a profile of a user, from among the at least ten users, who is not a member of any of the clusters in the subset.

Additionally, the selector module 141 is also configured to select at least eight users from among the users belonging to clusters in the subset. Optionally, the selector module 141 generates an output that is indicative of a selection 143 of the at least eight users. For example, the selection 143 may indicate identities of the at least eight users, or it may identify cluster representatives of clusters to which the at least eight users belong. Herein, a cluster representative represents other members of the cluster. The cluster representative may be one of the members of the cluster chosen to represent the other members or an average of the members of the cluster (e.g., a cluster centroid). In the latter case, a measurement of the representative of the cluster may be obtained based on a function of the measurements of the members it represents (e.g., an average of their measurements).

It is to be noted that the selector module 141 does not generate the same output for all profiles of certain users that are provided to it. That is, there are at least a certain first user and a certain second user, who have different profiles, for which the selector module 141 produces respective first and second outputs that are different. Optionally, the first output is indicative of a first selection of at least eight users from among the at least ten users, and the second output is indicative of a second selection of at least eight users from among the at least ten users, which is different from the first selection. For example, the first selection may include a user that is not included in the second selection.

The selection 143 may be provided to the collection module 120 and/or to the scoring module 150. For example, the collection module 120 may utilize the selection 143 to filter, select, and/or weight measurements of certain users, which it forwards to the scoring module 150. As explained below, the scoring module 150 may also utilize the selection 143 to perform similar actions of selecting, filtering and/or weighting measurements from among the measurements of the at least ten users which are available for it to compute the score 164'.

The scoring module 150 is configured to compute a score 164', for the experience, for the certain user based on the measurements of the at least eight users. In this case, the score 164' may be considered a personalized score for the certain user. When computing the scores, the scoring module 150 takes into account the selections generated by the selector module 141 based on the profile 129. In particular, at least for the certain first user and the certain second user, who have different profiles and different outputs generated by the selector module 141, the scoring module 150 computes different scores.

It is to be noted that the scoring module 150 may compute the score 164' based on a selection 143 in various ways. In one example, the scoring module 150 may utilize measurements of the at least eight users in a similar way to the way it computes a score based on measurements of at least ten users. However, in this case it would leave out measurements of users not in the selection 143, and only use the measurements of the at least eight users. In another example, the scoring module 150 may compute the score 164' by associating a higher weight to measurements of users that are among the at least eight users, compared to the weight it associates with measurements of users from among the at least ten users who are not among the at least eight users. In yet another example, the scoring module 150 may compute the score 164' based on measurements of one or more cluster representatives of the clusters to which the at least eight users belong.

FIG. 10c illustrates one embodiment of a system configured to utilize comparison of profiles of users to compute personalized experience scores based on measurements 110 of affective response of the users. The system includes at least the collection module 120, the personalization module 130, and the scoring module 150. In this embodiment, the personalization module 130 includes drill-down module 142.

In one embodiment, the drill-down module 142 serves as a filtering layer that may be part of the collection module 120 or situated after it. The drill-down module 142 receives an attribute 144 and/or a profile 129 of a certain user, and filters and/or weights the measurements of the at least ten users according to the attribute 144 and/or the profile 129 in different ways. The drill-down module 142 provides the scoring module 150 with a subset 146 of the measurement of the at least ten users, which the scoring module 150 may utilize to compute the score 164'. Thus, a drill-down may be considered a refining of a result (e.g., a score) based on a selection or weighting of the measurements according to a certain criterion.

In one example, the drill-down is performed by selecting for the subset 146 measurements of users that include the attribute 144 or have a value corresponding to a range associated with the attribute 144. For example, the attribute 144 may correspond to a certain gender and/or age group of users. In other examples, the attribute 144 may correspond to any attribute that may be included in the profiles 128. For example, the drill-down module 142 may select for the subset 146 measurements of users who have certain hobbies, have consumed certain digital content, and/or have eaten at certain restaurants.

In another example, the drill-down module 142 selects measurements of the subset 146 based on the profile 129. The drill-down module 142 may take a value of a certain attribute from the profile 129 and filter users and/or measurements based on the value of the certain attribute. Optionally, the drill-down module 142 receives an indication of which attribute to use to perform a drill-down via the attribute 144, and a certain value and/or range of values based on a value of that attribute in the profile 129. For example, the attribute 144 may indicate to perform a drill-down based on a favorite computer game, and the profile 129 includes an indication of the favorite computer game of the certain user, which is then used to filter the measurements of the at least ten users to include measurements of users who also play the certain computer game and/or for whom the certain computer game is also a favorite.

The scoring module 150 is configured, in one embodiment, to compute the score 164' based on the measurements in the subset 146. Optionally, the subset 146 includes measurements of at least five users from among the at least ten users.

In some embodiments, systems that generate personalized crowd-based results, such as the systems illustrated in FIG. 10a to FIG. 10c may produce different results for different users based on different personalized results for the users. For example, in some embodiments, a recommender module, such as recommender module 178, may recommend an experience differently to different users because the different users received a different score for the same experience (even though the scores for the different users were computed based on the same set of measurements of at least ten users). In particular, a first user may have a first score computed for an experience while a second user may have a second score computed for the experience. The first score is such that it reaches a predetermined threshold, while the second score is lower, and does not reach the predetermined threshold. Consequently, the recommender module 178 may recommend the experience to the first user in a first manner, and to the second user in a second manner, which involves a recommendation that is not as strong as a recommendation that is made when recommending in the first manner. This may be the case, despite the first and second scores being computed around the same time and/or based on the same measurements.

In one embodiment, a computer-implemented method for utilizing profiles of users to compute personalized experience scores based on measurements of affective response of the users comprises the following steps: receiving, by a system comprising a processor and memory, measurements of affective response of at least ten users; wherein each measurement of a user corresponds to an event in which the user has the experience; receiving a profile of a first user, a profile of a second user, and profiles of the at least ten users; generating a first output indicative of similarities between the profile of the first user and the profiles of the at least ten users; generating a second output indicative of similarities between the profile of the second user and the profiles of the at least ten users; computing a first experience score for the first user based on the measurements and the first output; computing a second experience score for the second user based on the measurements and the second output; wherein the profiles of the first and second users are different, and the second experience score is different from the first experience score. Optionally, the first experience score reaches a predetermined threshold, while the second experience score does not reach the predetermined threshold; and further comprising recommending a certain experience to the first user in a manner that is stronger than the manner of recommending the certain experience to the second user.

The systems illustrated in FIG. 4 and FIG. 10a to FIG. 10c may be readily adapted to generate crowd-based results for specific types of experiences. Following are descriptions of various system that are configured to generate personalized scores for experiences that involve travelling in vehicles, wearing clothing items, utilizing electronic devices, eating food items, or eating out at restaurants.

Different vehicles provide different traveling experiences. Some traveling experiences are more comfortable for the traveler than others are. One way to compute a comfort score for traveling in a vehicle (whether as the driver or as the passenger) is to measure the affective response of travelers while traveling in the vehicle by acquiring measurements of various users having various characteristics, it is possible to leverage the crowd in order to produce crowd based comfort scores for vehicles.

Figure 11:
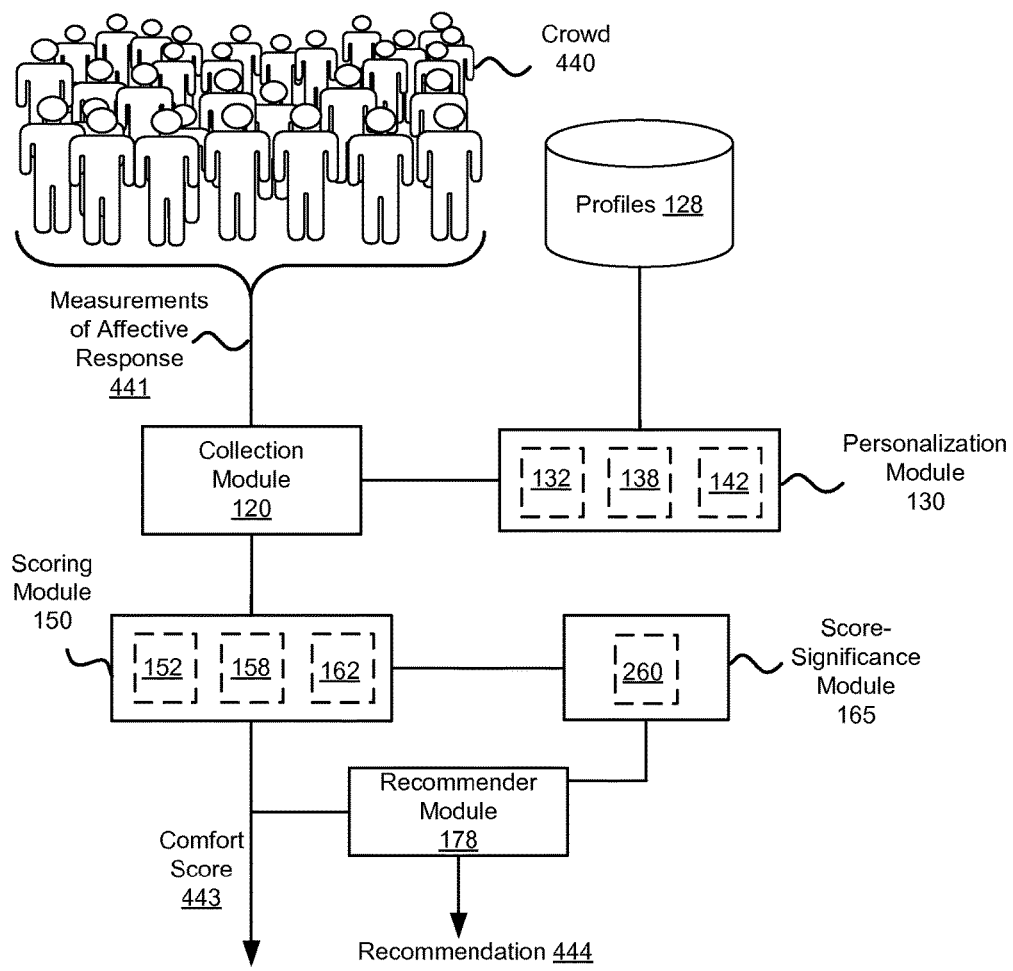
FIG. 11 illustrates one embodiment of a system configured to utilize profiles of travelers to compute personalized comfort scores for traveling in a certain type of vehicle.

FIG. 11 illustrates one embodiment of a system configured to utilize profiles of travelers to compute personalized comfort scores for traveling in a certain type of vehicle based on measurements of affective response of the travelers. The system includes at least the collection module 120, the personalization module 130, and the scoring module 150.

The collection module 120 is configured to receive measurements 441 of affective response of travelers 440. The measurements 441 include measurements of at least ten travelers, and each measurement of a traveler is taken with a sensor coupled to the traveler, while the traveler travels in a vehicle that is of the certain type. Measuring a measurement of a traveler may involve acquiring multiple values with a sensor. In one example, each measurement of a traveler is based on values acquired by the sensor during at least three different non-overlapping periods while the traveler travels in the vehicle that is of the certain type. In another example, a traveler travels in the vehicle that is of the certain type during more than 30 minutes, and each measurement of the traveler is based on values acquired by the sensor during at least five different non-overlapping periods that are spread over the more than 30 minutes.

In one embodiment, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

In another embodiment, the vehicle is a car, and the type of the car is set according to one or more of the following car classifications: cost of the car, mean time between failures (MTBF) of the car, identity of the manufacturer of the car, classification based on a brand associated with the car, and the model of the car.

The personalization module 130 is configured to receive a profile of a certain traveler and profiles 442 of the at least ten travelers, and to generate an output indicative of similarities between the profile of the certain traveler and the profiles 442 of the at least ten travelers.

The scoring module is configured to compute a comfort score 443 for the certain vehicle type, which is personalized for the certain traveler based on the measurements 441 and the output. In one example, a comfort score for a vehicle is a rating of 1 to 5 stars. In another example, a comfort score for a vehicle is a rating between 0 and 100. The system illustrated in FIG. 11 provides different results for at least some of the travelers. That is, for at least a certain first traveler and a certain second traveler, who have different profiles, the scoring module computes, for the certain type of vehicle, respective first and second comfort scores that are different. Optionally, the first comfort score is computed based on at least one measurement that is not utilized for computing the second comfort score. Optionally, a measurement utilized to compute both the first and second comfort scores has a first weight when utilized to compute the first comfort score and the measurement has a second weight, different from the first weight, when utilized to compute the second comfort score.

In one example, a profile of the certain first traveler indicates that the first traveler is a male aged 20-40 years old who weighs 200-300 lbs., and the profile of the certain second traveler indicates that the certain second traveler is a woman aged 50-70 years old who weighs 100-170 lbs., and the difference between the first and second comfort scores is above 10%.

In another example, a profile of a traveler comprises information that describes one or more of the following: an indication of the preferred seating location of the traveler in the vehicle, an indication of the traveler's sensitivity to the sun, an indication of the traveler's sensitivity to noise, attitude toward vehicle manufacturers, a demographic characteristic of the traveler, a genetic characteristic of the traveler, a static attribute describing the body of the traveler, and a medical condition of the traveler.

In one embodiment, the recommender module 178 makes a recommendation 444 of a vehicle to a traveler in a manner that belongs to a set comprising first and second manners based on the comfort score 443 computed for the traveler. When recommending a vehicle in the first manner, the recommender module provides a stronger recommendation for the vehicle, compared to a recommendation for the vehicle that the recommender module provides when recommending in the second manner. The recommender module 178 is further configured to: recommend the vehicle in the first manner when a comfort score for the vehicle reaches a predetermined threshold, and to recommend the vehicle in the second manner when the comfort score does not reach the predetermined threshold. Responsive to the first comfort score reaching the predetermined threshold, the certain type of vehicle is recommended, by the recommender module 178, to the certain first traveler in the first manner, and responsive to the second comfort score not reaching the predetermined threshold, the certain type of vehicle is recommended, by the recommender module 178, to the certain second traveler in the second manner.

Different clothes provide different levels of comfort experiences. One way to compute a comfort score for wearing certain) is to measure the affective response of people while they wear the clothes. Collecting such measurements from multiple people can be leveraged to generate crowd-based scores.

Figure 12:
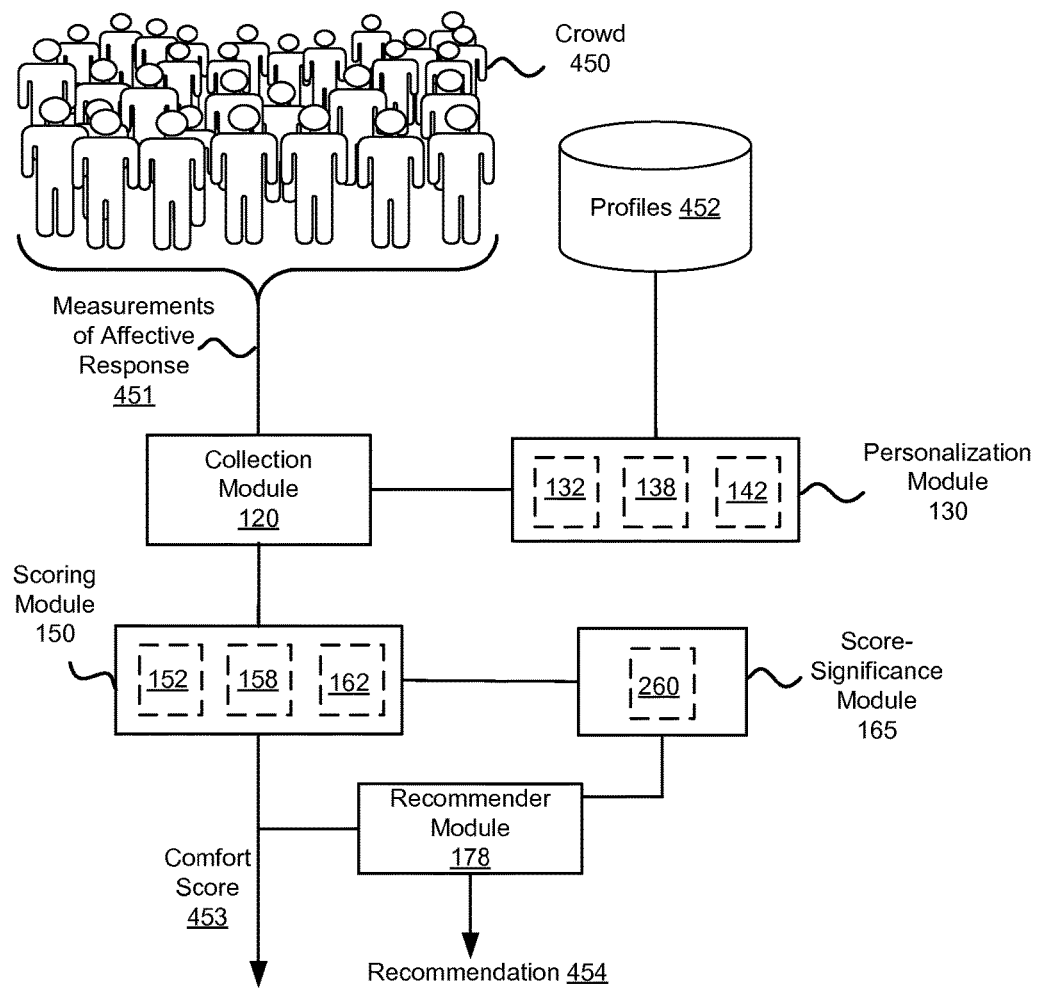
FIG. 12 illustrates one embodiment of a system configured to utilize profiles of users to compute personalized comfort scores for wearing a certain type of clothing item.

FIG. 12 illustrates one embodiment of a system configured to utilize profiles of users to compute personalized comfort scores for wearing a certain type of clothing item based on measurements of affective response of the users. The system includes at least the collection module 120, the personalization module 130, and the scoring module 150.

The collection module 120 is configured to receive measurements 451 of affective response of users 450. The measurements 451 include measurements of at least ten users, and each measurement of a user is taken with a sensor coupled to the user, while the user wears a clothing item that is of the certain type. Optionally, each measurement of a user is based on values acquired by the sensor during at least three different non-overlapping periods while the user wears the clothing item that is of the certain type. Optionally, the user wears the clothing item that is of the certain type during more than 3 hours, and each measurement of the user is based on values acquired by the sensor during at least five different non-overlapping periods that are spread over the more than 3 hours.

There may be different ways to characterize clothing types. In one example, clothing items are categorized into types based on one or more of the following classifications: outerwear, underwear, tops, skirts, dresses, jackets, pants, shorts, coats, lingerie, shoes, and wearable accessories. In another example, clothing items are categorized into types based on one or more of the following classifications: cost of the clothing item, identity of the manufacturer of the clothing item, classification based on a brand associated with the clothing item, and model of the clothing item.

The personalization module 130 is configured to receive a profile of a certain user and profiles 452 of the at least ten users, and to generate an output indicative of similarities between the profile of the certain user and the profiles 452 of the at least ten users. Optionally, a profile of a user comprises information that describes one or more of the following properties of the user: skin tone, weight, height, sensitivity to certain fabrics, preferences regarding use of animal byproducts, attitude toward brands, a demographic characteristic of the user, a genetic characteristic of the user, a static attribute describing the body of the user, and a medical condition of the user.

The scoring module 150 is configured to compute a comfort score 453 for the certain type of clothing item, which is personalized for the certain user based on the measurements 451 and the output. In one example, a comfort score may be a numerical rating (e.g., a rating on a scale 1 to 5 or a scale of 0 to 100). The system illustrated in FIG. 12 provides different results for at least some of the users. That is, for at least a certain first user and a certain second user, who have different profiles, the scoring module computes respective first and second comfort scores that are different. Optionally, the first comfort score is computed based on at least one measurement that is not utilized for computing the second comfort score. Optionally, a measurement utilized to compute both the first and second comfort scores has a first weight when utilized to compute the first comfort score and the measurement has a second weight, different from the first weight, when utilized to compute the second comfort score.

In one example, a profile of the certain first user indicates that the first user is a woman aged 20-30 years old who weighs who weighs 130-160 lbs., and the profile of the certain second user indicates that the certain second user is a woman aged 50-60 years old who weighs 100-130 lbs., and the difference between the first and second comfort scores is above 10%.

In one embodiment, the recommender module 178 makes a recommendation 454 of the clothing item to a user in a manner that belongs to a set comprising first and second manners based on the comfort score 453 computed for the user. When recommending a clothing item in the first manner, the recommender module 178 provides a stronger recommendation for the clothing item, compared to a recommendation for the clothing item that the recommender module 178 provides when recommending in the second manner. The recommender module 178 is further configured to: recommend the clothing item in the first manner when a comfort score for the clothing item reaches a predetermined threshold, and to recommend the clothing item in the second manner when the comfort score does not reach the predetermined threshold. Responsive to the first comfort score reaching the predetermined threshold, the clothing item of the certain type is recommended, by the recommender module 178, to the certain first user in the first manner, and responsive to the second comfort score not reaching the predetermined threshold, the clothing item of the certain type is recommended, by the recommender module 178, to the certain second user in the second manner.

The quality of an experience of using an electronic device can vary. One way to determine how whether a device provide a good user experience is to compute a satisfaction score from using the device based on measurements of affective response of users who use the device.

Figure 13:
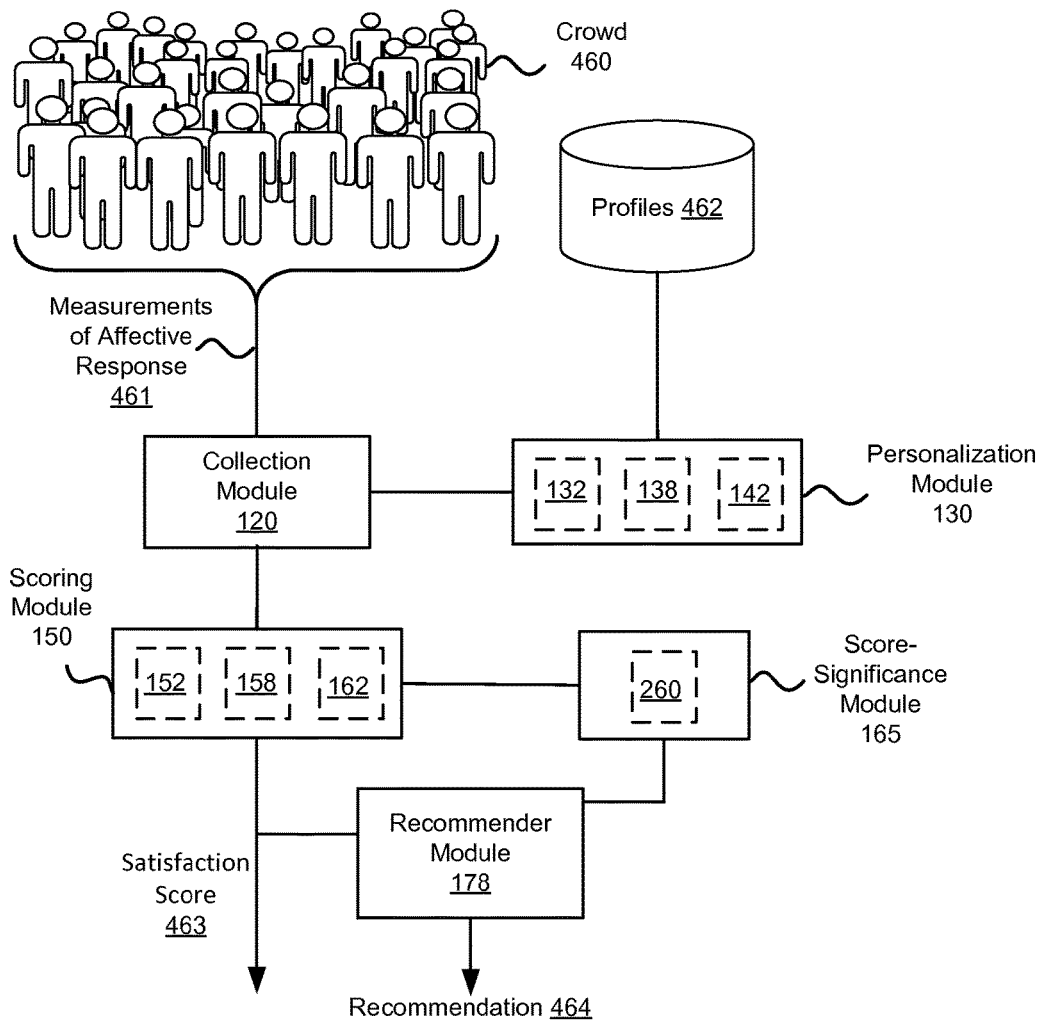
FIG. 13 illustrates one embodiment of a system configured to utilize profiles of users to compute personalized satisfaction scores for a certain type of electronic device.

FIG. 13 illustrates one embodiment of a system configured to utilize profiles of users to compute personalized satisfaction scores for a certain type of electronic device based on measurements of affective response of the users. The system includes at least the collection module 120, the personalization module 130, and the scoring module 150.

The collection module 120 is configured to receive measurements 461 of affective response of users 460. The measurements 461 include measurements of at least ten users, and each measurement of a user is taken with a sensor coupled to the user, while the user interacts with an electronic device that is of the certain type. Optionally, each measurement of a user is based on values acquired by the sensor during at least three different non-overlapping periods while interacts with an electronic device that is of the certain type.

There may be different ways to characterize types of electronic devices.

In one example, electronic devices are categorized into types based on one or more of the following classifications: functionality of the electronic devices, physical properties of the electronic devices, power consumption of the electronic device, durability of the electronic devices, and mean time to failure (MTTF) of the electronic devices. In another example, electronic devices are categorized into types based on one or more of the following classifications: cost of the electronic devices, identity of the manufacturer of the electronic devices, classification based on a brand associated with the electronic devices, and the model of the electronic devices.

The personalization module 130 is configured to receive a profile of a certain user and profiles 462 of the at least ten users, and to generate an output indicative of similarities between the profile of the certain user and the profiles 462 of the at least ten users. Optionally, a profile of a user comprises information that describes one or more of the following properties of the user: attitude toward brands, a demographic characteristic of the user, a genetic characteristic of the user, a static attribute describing the body of the user, and a medical condition of the user.

The scoring module 150 is configured to compute a satisfaction score 463 for the certain type of electronic device, which is personalized for the certain user based on the measurements 461 and the output. In one example, a satisfaction score may be a numerical rating (e.g., a rating on a scale 1 to 5 or a scale of 0 to 100). The system illustrated in FIG. 13 provides different results for at least some of the users. That is, for at least a certain first user and a certain second user, who have different profiles, the scoring module computes respective first and second satisfaction scores that are different.

Optionally, the first satisfaction score is computed based on at least one measurement that is not utilized for computing the second satisfaction score. Optionally, a measurement utilized to compute both the first and second satisfaction scores has a first weight when utilized to compute the first satisfaction score and the measurement has a second weight, different from the first weight, when utilized to compute the second satisfaction score.

In one example, a profile of the certain first user indicates that the first user is a woman aged 30-50 years old who works at a law firm, and the profile of the certain second user indicates that the certain second user is a boy aged 10-15 years old, and the difference between the first and second satisfaction scores is above 10%.

In one embodiment, the recommender module 178 makes a recommendation 464 of an electronic device to a user in a manner that belongs to a set comprising first and second manners based on the satisfaction score 463 computed for the user. When recommending an electronic device in the first manner, the recommender module 178 provides a stronger recommendation for the electronic device, compared to a recommendation for the electronic device that the recommender module 178 provides when recommending in the second manner. The recommender module 178 is further configured to: recommend the electronic device in the first manner when a satisfaction score for the electronic device reaches a predetermined threshold, and to recommend the electronic device in the second manner when the satisfaction score does not reach the predetermined threshold. Responsive to the first satisfaction score reaching the predetermined threshold, the electronic device of the certain type is recommended, by the recommender module 178, to the certain first user in the first manner, and responsive to the second satisfaction score not reaching the predetermined threshold, the electronic device of the certain type is recommended, by the recommender module 178, to the certain second user in the second manner.

Figure 14:
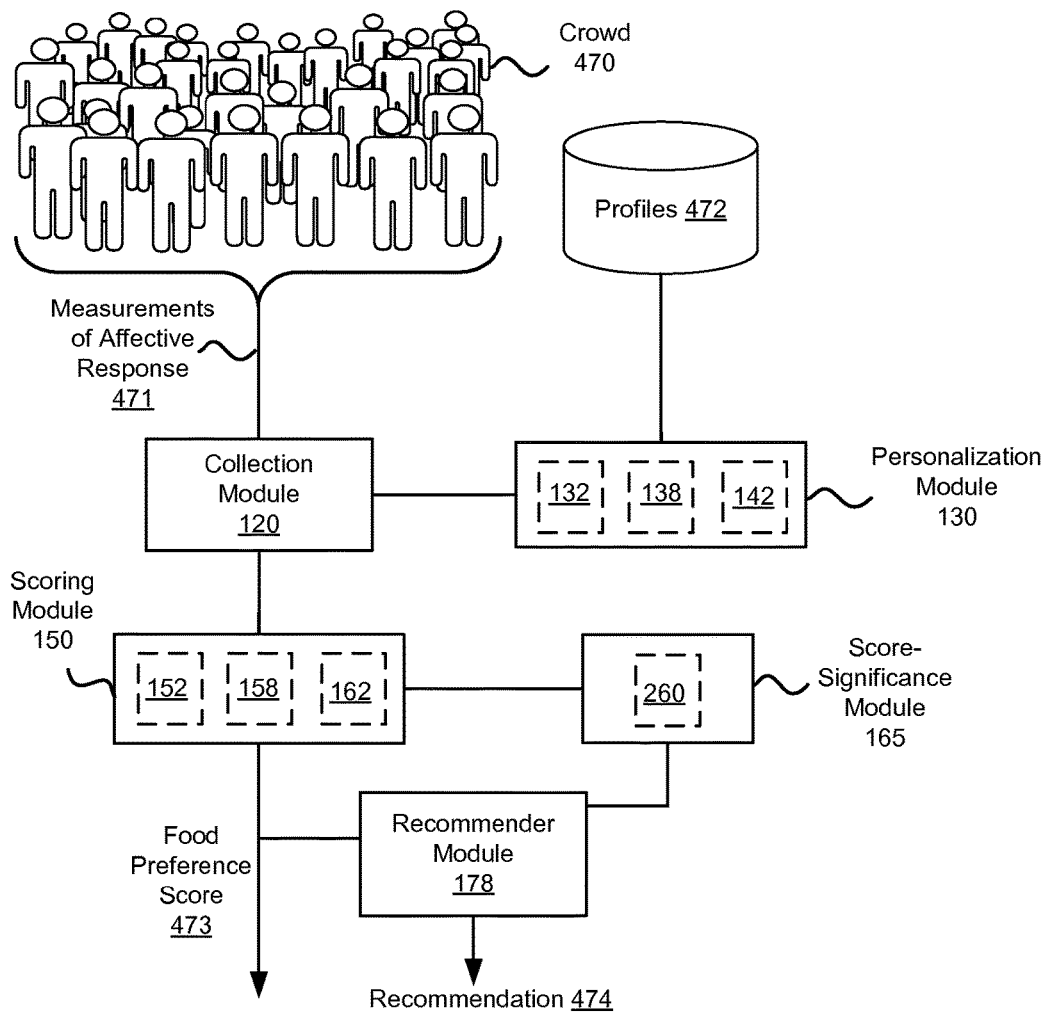
FIG. 14 illustrates one embodiment of a system configured to utilize profiles of users to compute personalized preference scores for a certain type of food.

FIG. 14 illustrates one embodiment of a system configured to utilize profiles of users to compute personalized preference scores for a certain type of food based on measurements of affective response of the users. The system includes at least the collection module 120, the personalization module 130, and the scoring module 150.

The collection module 120 is configured to receive measurements 471 of affective response of users 470. The measurements 471 include measurements of at least ten users, and each measurement of a user is taken with a sensor coupled to the user, while consumes a certain type of food. Optionally, consuming the certain type of food involves at least one of eating the certain type of food and drinking the certain type of food. Optionally, each measurement of a user is based on values acquired by the sensor during at least three different non-overlapping periods while the user consumed the certain type of food. Optionally, the user consumes the certain type of food during more than five minutes, and each measurement of a user is based on values acquired by the sensor during at least five different non-overlapping periods that are spread over the more than five minutes.

There may be different ways to characterize types of food. Optionally, food is categorized into types based on one or more of the following classifications or combinations thereof: (i) comfort food, fast food, junk food, natural food, organic food, slow food, and whole food, (ii) fruits, grains, vegetables, and protein, (iii) plant or animal source, (iv) extent to which the food is genetically modified, (v) way of preparing the food, (vi) identities of the food manufacturers, (vii) brands associated with the food, (viii) food price, (ix) existence of food substances related to food allergy, and (x) diet related properties of the food.

The personalization module 130 is configured to receive a profile of a certain user and profiles 472 of the at least ten users, and to generate an output indicative of similarities between the profile of the certain user and the profiles 472 of the at least ten users. Optionally, a profile of a user comprises information that describes one or more of the following properties of the user: sensitivity to certain food substances, known food allergies, preferences regarding use of animal source food, attitude toward brands, a demographic characteristic of the user, a genetic characteristic of the user, a static attribute describing the body of the user, a medical condition of the user, and attitude toward certain types of food.

The scoring module 150 is configured to compute a food preference score 473 for the certain type of food, which is personalized for the certain user based on the measurements 471 and the output. In one example, a food preference score may be a numerical rating (e.g., a rating on a scale 1 to 5 or a scale of 0 to 100). The system illustrated in FIG. 14 provides different results for at least some of the users. That is, for at least a certain first user and a certain second user, who have different profiles, the scoring module computes respective first and second food preference scores that are different.

Optionally, the first food preference score is computed based on at least one measurement that is not utilized for computing the second food preference score. Optionally, a measurement utilized to compute both the first and second food preference scores has a first weight when utilized to compute the first food preference score and the measurement has a second weight, different from the first weight, when utilized to compute the second food preference score.

In one embodiment, the collection module 120 is configured to receive additional measurements of affective response of the at least ten users. Optionally, each additional measurement of a user is taken with the sensor, at most four hour after the user finished consuming the certain type of food. Optionally, the scoring module 150 is further configured to compute the food preference score for the certain user also based on the additional measurements.

In one embodiment, the recommender module 178 makes a recommendation 474 of food to a user in a manner that belongs to a set comprising first and second manners based on the food preference score 473 computed for the user. When recommending food in the first manner, the recommender module 178 provides a stronger recommendation for the food, compared to a recommendation for the food that the recommender module 178 provides when recommending in the second manner. The recommender module 178 is further configured to: recommend the food in the first manner when a food preference score for the food reaches a predetermined threshold, and to recommend the food in the second manner when the food preference score does not reach the predetermined threshold. Responsive to the first food preference score reaching the predetermined threshold, the certain type of food is recommended, by the recommender module 178, to the certain first user in the first manner, and responsive to the second food preference score not reaching the predetermined threshold, the electronic device of the certain type is recommended, by the recommender module 178, to the certain second user in the second manner.

Figure 15:
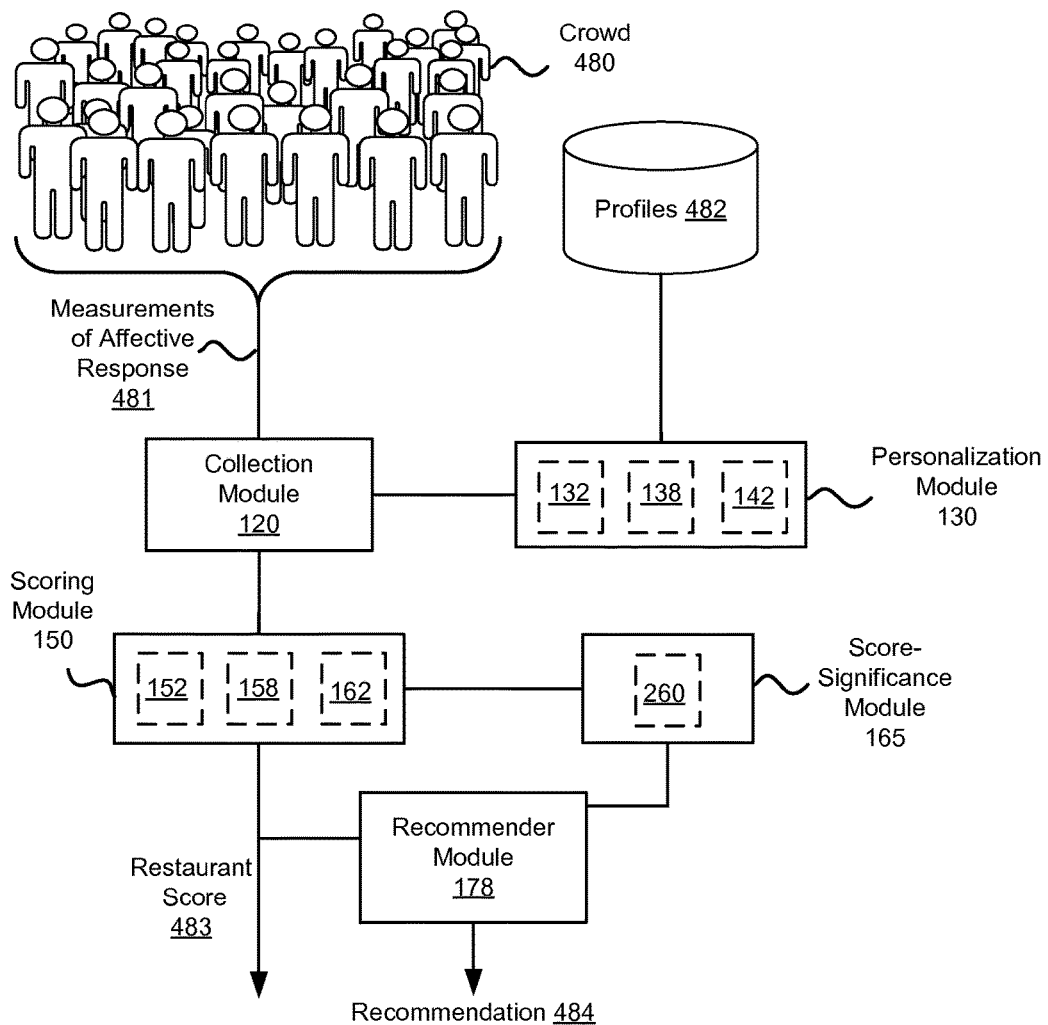
FIG. 15 illustrates one embodiment of a system configured to utilize profiles of users to compute personalized restaurant scores.

FIG. 15 illustrates one embodiment of a system configured to utilize profiles of users to compute personalized restaurant scores for restaurants based on measurements of affective response of diners at the users. The system includes at least the collection module 120, the personalization module 130, and the scoring module 150.

The collection module 120 is configured to receive measurements 481 of affective response of users 870. The measurements 481 include measurements of at least ten users, and each measurement of a user is taken with a sensor coupled to the user, while dining at the restaurant. Optionally, the measurements of affective response of the at least ten users are taken when the at least ten users eat the same type of dish at the restaurant. Optionally, the user dines at the restaurant during more than 30 minutes, and each measurement of a user is based on values acquired by the sensor during at least five different non-overlapping periods that are spread over the more than 30 minutes.

The personalization module 130 is configured to receive a profile of a certain user and profiles 872 of the at least ten users, and to generate an output indicative of similarities between the profile of the certain user and the profiles 482 of the at least ten users. Optionally, a profile of a user comprises information that describes one or more of the following properties of the user: sensitivity to certain food substances, known food allergies, preferences regarding use of animal source food, preferred seating location at the restaurant, an indication of the user's sensitivity to environmental noise, attitude toward brands, a demographic characteristic of the user, a genetic characteristic of the user, a static attribute describing the body of the user, a medical condition of the user, and attitude toward certain types of food.

The scoring module 150 is configured to compute a restaurant score 483 for the restaurant, which is personalized for the certain user based on the measurements 481 and the output. In one example, a restaurant score may be a numerical rating (e.g., a rating on a scale 1 to 5 or a scale of 0 to 100). The system illustrated in FIG. 15 provides different results for at least some of the users. That is, for at least a certain first user and a certain second user, who have different profiles, the scoring module computes respective first and second restaurant scores that are different.

Optionally, the first restaurant score is computed based on at least one measurement that is not utilized for computing the second restaurant score. Optionally, a measurement utilized to compute both the first and second restaurant scores has a first weight when utilized to compute the first restaurant score and the measurement has a second weight, different from the first weight, when utilized to compute the second restaurant score.

In one embodiment, the collection module 120 is configured to receive additional measurements of affective response of the at least ten users. Optionally, each additional measurement of a user is taken with the sensor, at most four hour after the user finished dining at the restaurant. Optionally, the scoring module 150 is further configured to compute the restaurant score for the certain user also based on the additional measurements.

In one embodiment, the recommender module 178 makes a recommendation 484 of a restaurant in a manner that belongs to a set comprising first and second manners based on the restaurant score 483 computed for the user. When recommending a restaurant in the first manner, the recommender module 178 provides a stronger recommendation for the restaurant, compared to a recommendation for the restaurant that the recommender module 178 provides when recommending in the second manner. The recommender module 178 is further configured to: recommend the restaurant in the first manner when a restaurant score for the food reaches a predetermined threshold, and to recommend the restaurant in the second manner when the restaurant score does not reach the predetermined threshold. Responsive to the first restaurant score reaching the predetermined threshold, the restaurant is recommended, by the recommender module 178, to the certain first user in the first manner, and responsive to the restaurant score not reaching the predetermined threshold, the restaurant is recommended, by the recommender module 178, to the certain second user in the second manner.

Figure 16A:
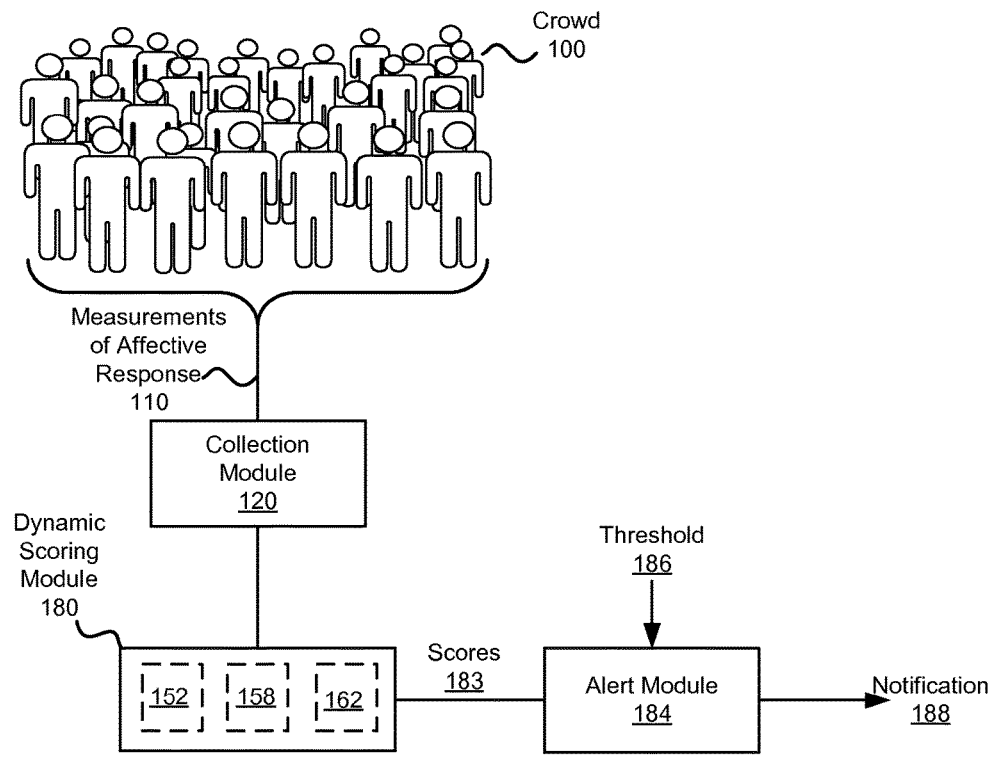
FIG. 16a illustrates one embodiment of a system configured to dynamically alert about affective response to an experience.

FIG. 16*a* illustrates one embodiment of a system configured to dynamically alert about affective response to an experience. The system includes at least the collection module 120, the dynamic scoring module 180, and an alert module 184.

The collection module 120 is configured to receive measurements 110 of affective response, which in this embodiment include measurements of at least ten users. Each measurement of a user, from among the measurements of the at least ten users, corresponds to an event in which the user has the experience.

The dynamic scoring module 180 is configured to compute scores 183 for the experience based on the measurements 110. The dynamic scoring module may utilize similar modules to the ones utilizes by scoring module 150. For example, the dynamic scoring module may utilize the statistical test module 152, the statistical test module 158, and/or the arithmetic scorer 162.

When a scoring module is referred to as being "dynamic", it is done to emphasize a temporal relationship between a score computed by the dynamic scoring module 180 and when the measurements used to compute the score were taken. For example, each score computed by the dynamic scoring module 180 corresponds to a time t. The score is computed based on measurements that were taken at a time that is no later than t. The measurements also include a certain number of measurements that were taken not long before t. For example, the certain number of measurements were taken at most a first period before t, where depending on the embodiment, the first period may be one day, twelve hours, four hours, two hours, one hour, thirty minutes, or some other period that is shorter than a day. Having measurements taken not long before t may make the score computed by the dynamic scoring module 180 reflect affective response of users to the experience as it was experienced not long before t. Thus, for example, if the quality of the experience changes over time, this dynamic nature of the scores may be reflected in the scores computed by the dynamic scoring module 180.

In one embodiment, a score computed by the dynamic scoring module 180, such as one of the scores 183, is computed based on measurements of at least five users taken at a time that is at most a first period before a time t to which the score corresponds, and not later than that time t.

The alert module 184 is a module that evaluates the scores 183 in order to determine whether to issue an alert in the form of notification 188. If a score for the experience, from among the scores 183, which corresponds to a certain time, reaches a predetermined threshold 186, the alert module 184 may forward the notification 188. The notification 188 is indicative of the score for the experience reaching the predetermined threshold, and is forwarded by the alert module no later than a second period after the certain time. Optionally, both the first and the second periods are shorter than twelve hours. In one example, the first period is shorter than four hours and the second period is shorter than two hours. In another example, both the first and the second periods are shorter than one hour.

The alert module 184 is configured to operate so it is not forced to always have a constant behavior, such as constantly issue alerts or constantly refrain from issuing alerts. In particular, for a certain period of time that includes times to which individual scores from the scores 183 correspond, there are at least a certain first time $t_1$ and a certain second time $t_2$, such that a score corresponding to $t_1$ does not reach the predetermined threshold 186 and a score corresponding to $t_2$ reaches the predetermined threshold. Additionally, $t_2 > t_1$, and the score corresponding to $t_2$ is computed based on at least one measurement taken after $t_1$.

Reaching the predetermined threshold 186 may signal different occurrences in different embodiments, depending on what the value of the threshold 186 represents. In one embodiment, when a score computed based on measurements of affective response of certain users reaches the predetermined threshold 186 that may indicate that, on average, the certain users had a positive affective response when their measurements were taken. In another embodiment, when a score computed based on measurements of affective response of certain users reaches the predetermined threshold 186 that may indicate that, on average, the certain users had a negative affective response when their measurements were taken. Thus, in some embodiments, the alert module 184 may be utilized to issue notifications when a score computed for the experience indicates that people who recently had the experience (and may still be having it) enjoyed it. Receiving such a notification may be interpreted as a recommendation to join the experience. Additionally or alternatively, the alert module 184 may be utilized to issue notifications when a score computed for the experience indicates that people who recently had the experience did not enjoy it (when it was previously enjoyed), which may serve as warning that something is wrong with the experience. Such notifications may be useful for various applications such as selecting what clubs, parties, and/or stores to go to, based on measurements of affective response of people that are there (or have recently been there).

In one embodiment, the alert module 184 may issue notifications that may cancel alerts. For example, the alert module 184 may be configured to determine whether, after a score corresponding to a certain time reaches the predetermined threshold 186, a second score corresponding to a later time occurring after the certain time falls below the predetermined threshold 186. Responsive to the second score falling below the predetermined threshold 186, the alert module 184 may forward, no later than the second period after the later time, a notification indicative of the score falling below the predetermined threshold 186.

Figure 16B:
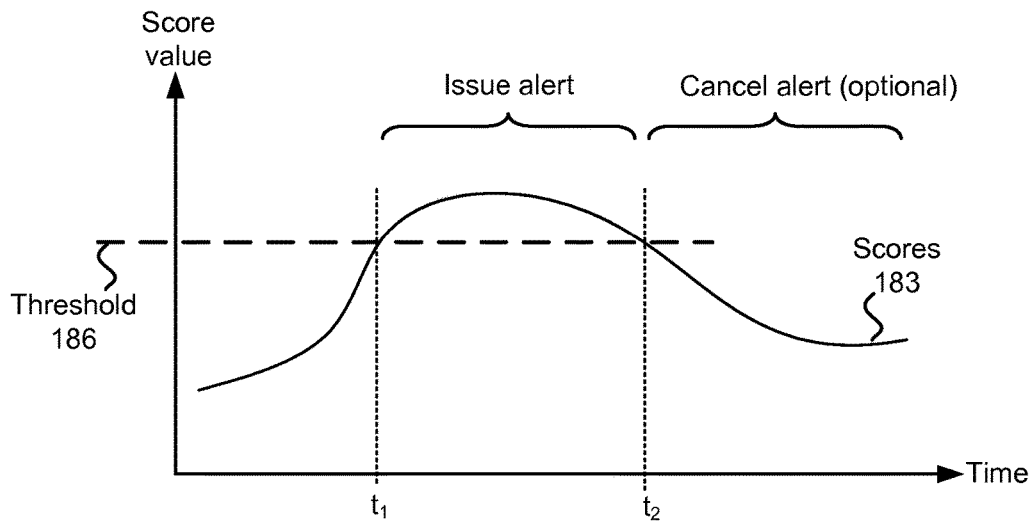
FIG. 16b illustrates how alerts may be issued using the dynamic scoring module and the alert module.

FIG. 16b illustrates how alerts may be issued using the dynamic scoring module 180 and the alert module 184. The figure illustrates how the values of the scores 183 change over time. At time $t_1$ the scores reach the predetermined threshold 186. Following that time (up to the second period after $t_1$), an alert may be issued by forwarding a notification. At time $t_2$ the scores 183 start to fall below the predetermined threshold 186, in which case the alert may optionally be cancelled by issuing another notification.

In one embodiment, the predetermined threshold 186 is preset (e.g., a constant embedded in computer code used to implement the alert module 184). In another embodiment, the alert module 184 is configured to receive the predetermined threshold 186 from an external source. In one example, the external source may be a certain user, e.g., through adjustment of settings of a mobile app that receives notifications from the alert module 184. In another example, the external source may be a software agent operating on behalf of the certain user. Thus, it may be possible for the alert module to tailor its behavior based on user settings. An embodiment involving a system that may receive similar user input is also presented in FIG. 19a.

In order to maintain a dynamic nature of scores computed by the dynamic scoring module 180, the dynamic scoring module may assign weights to measurements it uses to compute a score corresponding to a time t, based on how long before the time t the measurements were taken. Typically, this involves giving a higher weight to more recent measurements (i.e., taken closer to the time t). Such a weighting may be done in different ways.

Figure 17A:
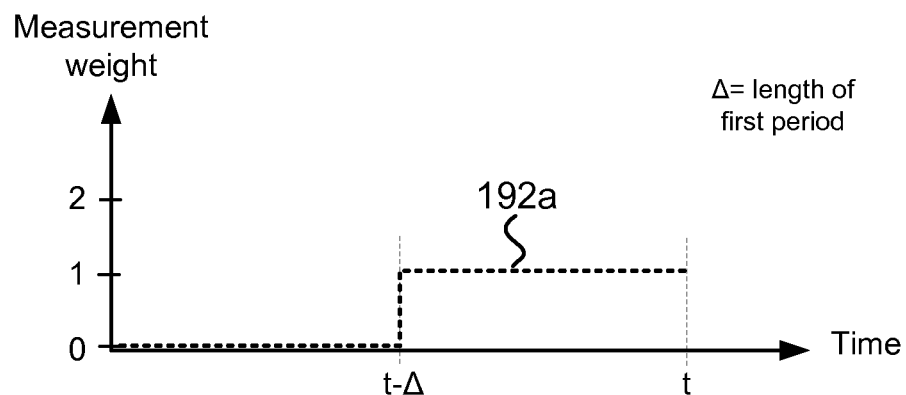
FIG. 17a and FIG. 17b illustrate weightings of measurements.

In one embodiment, measurements taken earlier than the first period before the time t are not utilized by the dynamic scoring module 180 to compute the score corresponding to t. This emulates a sliding window approach, which filters out measurements that are too old. Weighting of measurements according to this approach is illustrated in FIG. 17a, in which the "window" corresponding to the time t is the period between t and $t-\Delta$. The graph 192a shows that measurements taken within the window have a certain weight, while measurements taken prior to $t-\Delta$ (and thus are not in the window) have a weight of zero.

Figure 17B:
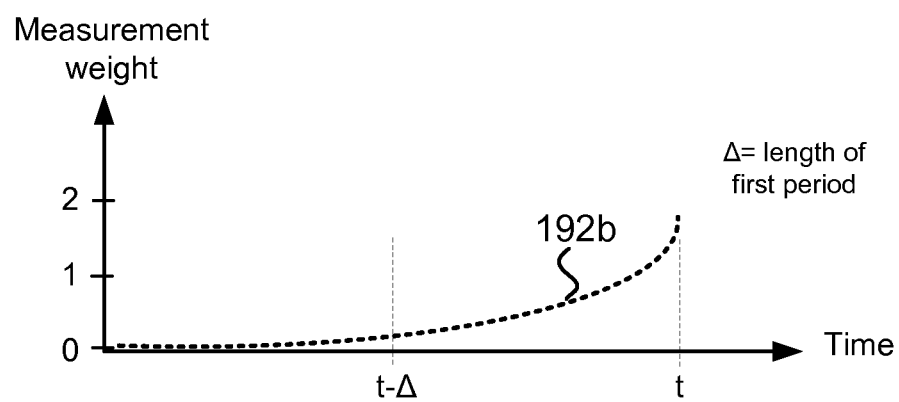

In another embodiment, the dynamic scoring module 180 is configured to assign weights to measurements used to compute the score corresponding to the time t, using a function that decreases with the length of the period since t. Examples of such function may be exponential decay function or other function such as assigning measurements a weight that is proportional to $1/(t-t')$, where t' is the time the measurement was taken. Applying such a decreasing weight means that an average of weights assigned to measurements taken earlier than the first period before t is lower than an average of weights assigned to measurements taken later than the first period before t. Weighting of measurements according to this approach is illustrated in FIG. 17b. The graph 192b illustrates how the weight for measurements decreases as the gap between when the measurements were taken and the time t increases.

In one embodiment, a score corresponding to a certain time is computed by the dynamic scoring module 180 based on measurements of at least five users. Optionally, the at least five users have the experience at a certain location, and a notification sent by the alert module 184 is indicative of the certain location. For example, the notification specifies the certain location and/or presents an image depicting the certain location and/or provides instructions on how to reach the certain location. Optionally, map-displaying module 240 is utilized to present the notification by presenting on a display: a map comprising a description of an environment that comprises a certain location, and an annotation overlaid on the map, which indicates at least one of: the score corresponding to the certain time, the certain time, the experience, and the certain location.

In one embodiment, a computer-implemented method for dynamically alerting about affective response to an experience comprises the following steps: receiving, by a system comprising a processor and memory, measurements of affective response of users; wherein each measurement of a user corresponds to an event in which the user has the experience; computing a first score for the experience, which corresponds to a time $t_1$, based on a first set of measurements of at least five of the users, taken at a time that is at most a first period before $t_1$, and not later than $t_1$; computing a second score for the experience, which corresponds to a time $t_2$, based on a second set of measurements of at least five of the users, taken at a time that is at most the first period before $t_2$, and not later than $t_2$; wherein $t_2 > t_1$, and the second score is computed based on at least one measurement taken after $t_1$; determining that the first score does not reach a predetermined threshold, and refraining from forwarding, at a time between $t_1$ and a second period after $t_1$, a notification indicative of the first score reaching the predetermined threshold; wherein both the first and second periods are shorter than twelve hours; determining that the second score does reach the predetermined threshold, and forwarding, no later than the second period after $t_2$, a notification indicative of the second score reaching the predetermined threshold.

Optionally, the method further comprises receiving a profile of a first user, a profile of a second user which is different from the profile of the first user, and profiles of the users; generating a first output indicative of similarities between the profile of the first user and the profiles of the users; generating a second output indicative of similarities between the profile of the second user and the profiles of the users; computing a third score for the experience for the first user based on the first output and the first set of measurements; computing a fourth score for the experience for the second user based on the second output and the first set of measurements; determining that the third score reaches the predetermined threshold while the fourth score does not reach the predetermined threshold; and forwarding to the first user, no later than the second period after $t_1$, a notification indicative of the third score reaching the predetermined threshold.

Optionally, the method further comprises receiving the predetermined threshold from at least one of: a certain user, and a software agent operating on behalf of the certain user; calculating a score for the experience corresponding to a certain time; and responsive to the score reaching the predetermined threshold, forwarding a notification to the certain user, no later than a second period after the certain time.

Optionally, the method further comprises not utilizing measurements taken earlier than the first period before t1 to compute the first score.

Optionally, the method further comprises assigning weights to measurements used to compute the first score such that an average of weights assigned to measurements taken earlier than the first period before $t_1$ is lower than an average of weights assigned to measurements taken later than the first period before $t_1$.

Systems like the one illustrated in FIG. 16a may be utilized to generate personalized alerts for certain users, such that the notifications regarding a score for an experience corresponding to a time t may be sent to one user but not to another. Such personalization may be achieved in different ways.

In one embodiment, the dynamic scoring module 180 generates personalized scores for certain users, thus different users may have different scores computed for them that correspond to the time t. Thus, the score computed for one user may reach the predetermined threshold 186 while the score for another user might not reach the predetermined threshold 186. Consequently, the system may behave differently, with the different users, as far as the forwarding of notifications is concerned. This approach for personalization of alerts is illustrated in FIG. 18a.

Figure 19A:
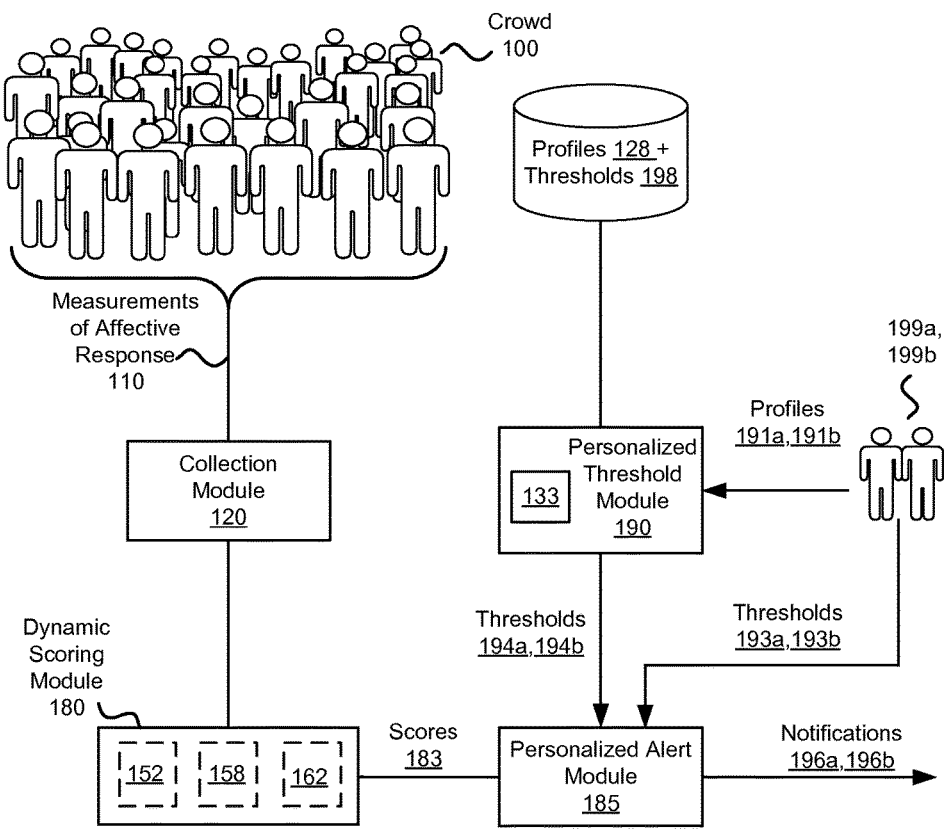
FIG. 19a illustrates one embodiment of a system configured to generate personalized alert about an experience.

In another embodiment, the alert module 184 may receive different thresholds for different users. Thus a score corresponding to the time t may reach one user's predetermined threshold, but not another user's predetermined threshold. Consequently, the system may behave differently, with the different users, as far as the forwarding of notifications is concerned. This approach for personalization of alerts is illustrated in FIG. 19a.

Figure 18A:
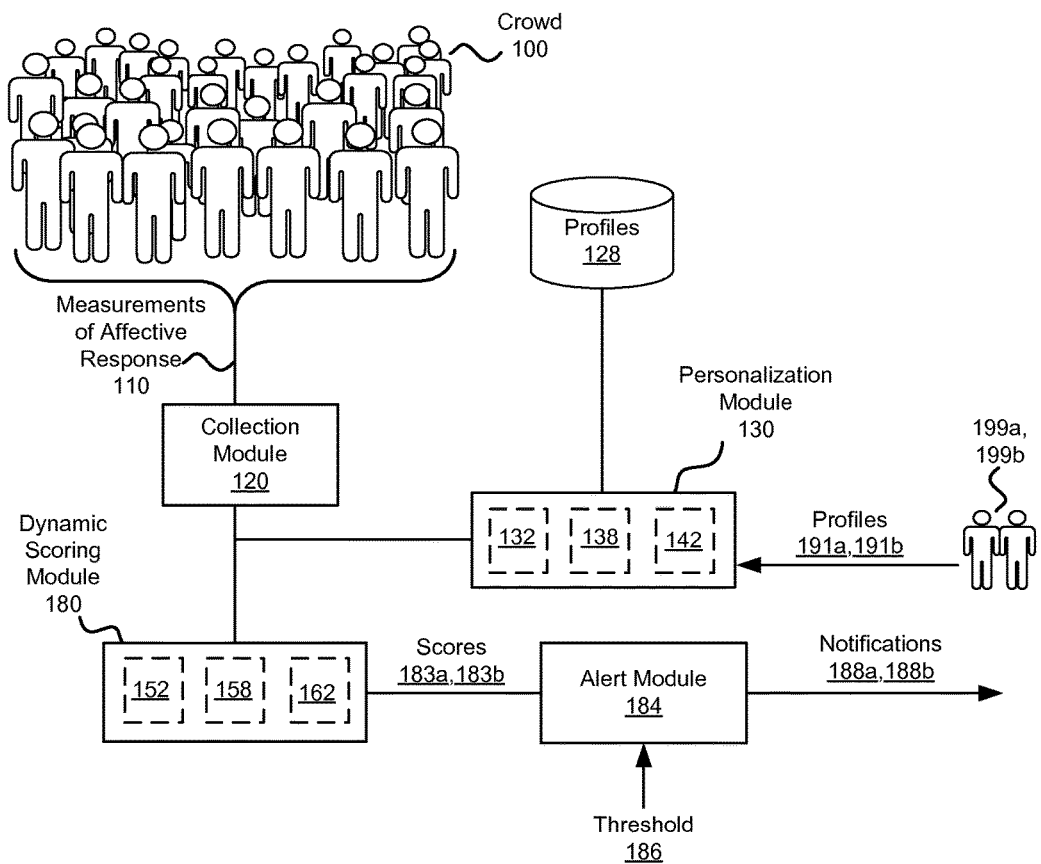
FIG. 18a illustrates one embodiment of a system configured to utilize profiles of users to generate personalized alerts about an experience.

FIG. 18a illustrates one embodiment of a system configured to utilize profiles of users to generate personalized alerts about an experience. The system includes at least the collection module 120, the personalization module 130, the dynamic scoring module 180, and the alert module 184.

In one embodiment, the collection module 120 is configured to receive the measurements 110. The measurements 110 in this embodiment include measurements of users who had the experience. The personalization module 130 is configured to receive a profile of a certain user and at least some of the profiles 128, and to generate an output indicative of similarities between the profile of the certain user and the at least some of the profiles. The dynamic scoring module 180, in this embodiment, is configured to compute scores for the experience for a certain user based on at least some of the measurements 110 and the output. In one example, the output for the user may identify a subset of users who have similar profiles to the certain user, and the dynamic scoring module 180 may compute the scores for the certain user based on measurements of those users. In another example, the output generated for the certain user by the personalization module 130 may include weights for measurements that may be used to compute scores, and the dynamic scoring module 180 may utilize those weights when computing the scores for the certain user.

It is to be noted that in some cases, certain measurements from among the measurements 110 may be weighted twice: once based on a weight provided by the personalization module 130 (e.g., based on profile similarity), and a second time based on the time the measurements were taken (e.g., a decaying weight as described above). Implementing such double weighting may be done in various ways; one simple approach that may be used to accommodate two weights for a measurement is to multiply the two weights.

Figure 18B:
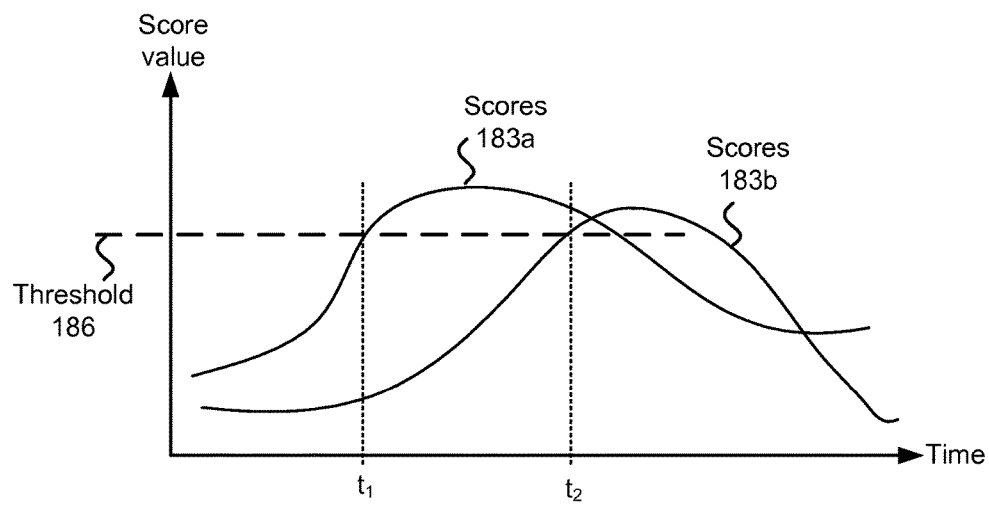
FIG. 18b illustrates how different scores reach a threshold at different times.

FIG. 18a also illustrates a scenario in which personalized alerts may be generated differently for different users. In one embodiment, a certain first user 199a and a certain second user 199b have different profiles 191a and 191b, respectively. The personalization module 130 generates different outputs for the certain first user and the certain second user, which cause the dynamic scoring module 180 to compute different sets of scores, denoted scores 183a and scores 183b, respectively. The difference between the scores 183a and 183b is illustrated in FIG. 18b, which illustrates how a score for the certain first user 199a reaches the predetermined threshold 186 at a time $t_1$, but a score corresponding to $t_1$ that is computed for the certain second user 199b, is below the predetermined threshold 186. At a time $t_2 > t_1$ a score computed for the certain second user 199b reaches the predetermined threshold 186. Optionally, the score computed for the certain second user 199b, which corresponds to the time $t_2$ is computed based on at least one measurement taken after $t_1$. Thus, the alert module 184 may generate different respective notifications 188a and 188b for the certain first and second users 199a and 199b. For example, the alert module may send the notification 188a before the time $t_2$, while it does not send the notification 188b until after that time.

FIG. 19a illustrates one embodiment of a system configured to generate personalized alerts about an experience. The system includes at least the collection module 120, the dynamic scoring module 180, and a personalized alert module 185.

The personalized alert module 185 is similar to the alert module 184. However, personalized alert module 185 is able to receive different predetermined thresholds for different respective users. This enables the personalized alert module 185 to trigger different alerts at different times for the different users based on the same scores 183 computed by the dynamic scoring module 180. Thus, the personalized alert module 185 is configured to receive a predetermined threshold corresponding to a certain user, and to determine whether a score corresponding to a certain time reaches the predetermined threshold. Similarly to alert module 184, responsive to the score reaching the predetermined threshold, the personalized alert module 185 forwards to the certain user, no later than a second period after the certain time, a notification indicative of the score reaching the predetermined threshold. Optionally, both the first and the second periods are shorter than twelve hours. In one example, the first period is shorter than four hours and the second period is shorter than two hours. In another example, both the first and the second periods are shorter than one hour.

The predetermined threshold corresponding to the certain user may be provided in different ways to the personalized alert module 185. In one embodiment, the predetermined threshold corresponding to the certain user is provided by at least one of: the certain user (e.g., by changing settings in an app that controls alerts), and a software agent operating on behalf of the certain user. In another embodiment, the predetermined threshold corresponding to the certain user may be received from personalized threshold setting module 190 which is configured to receive a profile of the certain user and to determine the threshold corresponding to the certain user based on information in the profile. Optionally, this may be done by comparing the profile of the certain user to profiles from among the profiles 128 and corresponding thresholds 198. For example, the profile comparator 133 may be utilized to identify profiles from among the profiles 128 that are similar to the profile of the certain user, and based on the thresholds corresponding to the similar profiles, the personalized threshold corresponding to the certain user may be computed (e.g., by averaging the thresholds corresponding to the profiles that are found to be similar).

FIG. 19a also illustrates a scenario in which personalized alerts may be generated differently for different users such as the certain first user 199a and the certain second user 199b. In one example, the certain first user 199a and the certain second user 199b may provide respective thresholds 193a and 193b to the personalized alert module 185. In another example, based on different respective profiles 191a and 191b of the certain first user 199a and the certain second user 199b, the personalized threshold setting module 190 may generate thresholds 194a and 194b for the certain first user 199a and the certain second user 199b, respectively. These thresholds may also be provided to the personalized alert module 185. When the predetermined threshold corresponding to the certain first user 199a is lower than the predetermined threshold corresponding to the certain second user 199b, this can lead to different generation of alerts for the users based on the same scores 183.

Figure 19B:
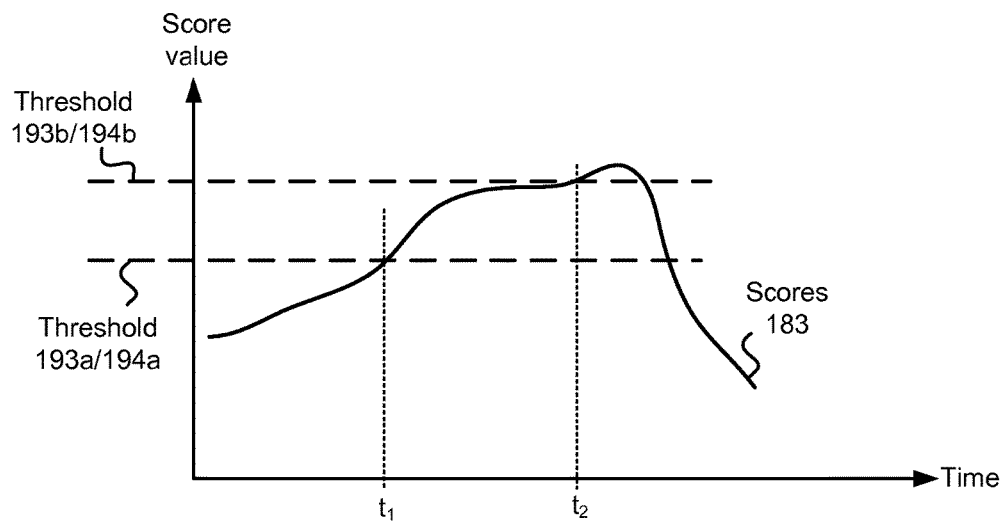
FIG. 19b illustrates how scores cross different thresholds at different times.

The different issuing of alerts based on different predetermined thresholds for different users is illustrated in FIG. 19b, which describes how a score from among the scores 183 reaches a first predetermined threshold corresponding to the certain first user 199a at a time $t_1$ but, at that same time, the score is below a second predetermined threshold corresponding to the certain second user 199b. However, another score from among the scores 183 which corresponds to a time $t_2 > t_1$ reaches the second predetermined threshold. Thus, the personalized alert module 185 may forward to the certain first user 199a notification 196a after $t_1$ and forward to the certain second user 199b notification 196b after $t_2$. Optionally, the personalized alert module 185 does not forward a notification to the certain second user indicative that a score corresponding to a time t' reaches the second predetermined threshold, where $t_1 \leq t' < t_2$.

The dynamic scoring module 180 may be utilized, in some embodiments, to generate projections for scores for an experience based on measurements of affective response. The projected scores may correspond to future times, i.e., times that occur after the measurements were taken. Optionally, the projections are made by computing scores based on the measurements, and observing a trend in the scores which is utilized to project the scores for the future times. The projected scores may be utilized to generate alerts about trends of affective response to experiences and/or to make recommendations for experiences based on trends of affective response.

Figure 20A:
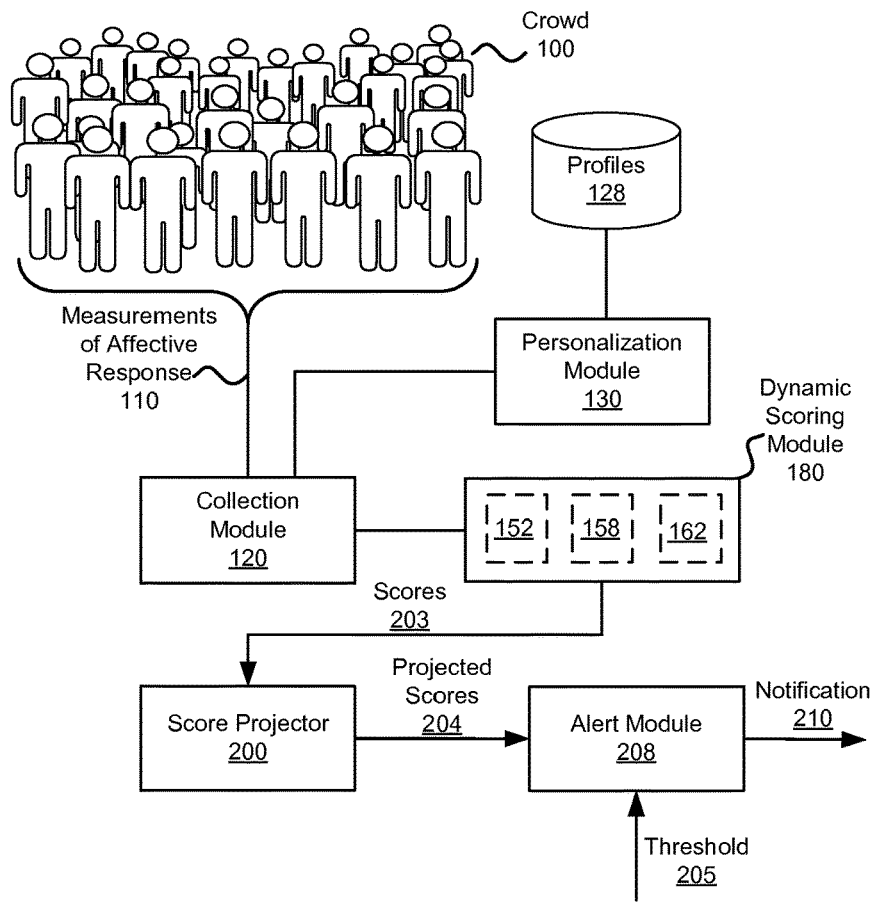
FIG. 20a illustrates one embodiment of a system configured to dynamically alert about projected affective response to an experience.

FIG. 20a illustrates one embodiment of a system configured to dynamically alert about projected affective response to an experience. The system includes at least the collection module 120, the dynamic scoring module 180, score projector module 200, and alert module 208.

The collection module 120 is configured to receive measurements corresponding to events involving the experience (i.e., the user corresponding to the event had the experience).

The dynamic scoring module is configured to compute scores 203 based on the measurements corresponding to the events. Each score from among the scores 203 corresponds to a certain time and is computed based on a subset of the measurements comprising measurements that were taken at a time that is at most a certain period before the certain time, and is not after the certain time. The scores 203 include at least scores $S_1$ and $S_2$, which correspond to times $t_1$ and $t_2$, respectively. The time $t_2$ is after $t_1$, and $S_2 > S_1$. Additionally, $S_2$ is below predetermined threshold 205. Optionally, $S_2$ is computed based on at least one measurement that was taken after $t_1$.

The score projector module 200 is configured to compute projected scores 204 corresponding to future times, based on the scores 203. Each projected score for the experience corresponds to a certain future time, and is computed based on a trend determined from a plurality of scores, from among the scores 203, each of which corresponding to the experience and to a certain time before the certain future time. For example, the score projector module 200 may compute a projected score $S_3$ corresponding to a time $t_3 > t_2$, based on a trend determined based on at least $S_1$ and $S_2$ (and possibly other scores from among the scores 203 corresponding to a time that is earlier than the certain time before the certain future time). In this example, the projected score $S_3$ may reach the predetermined threshold.

Figure 20B:
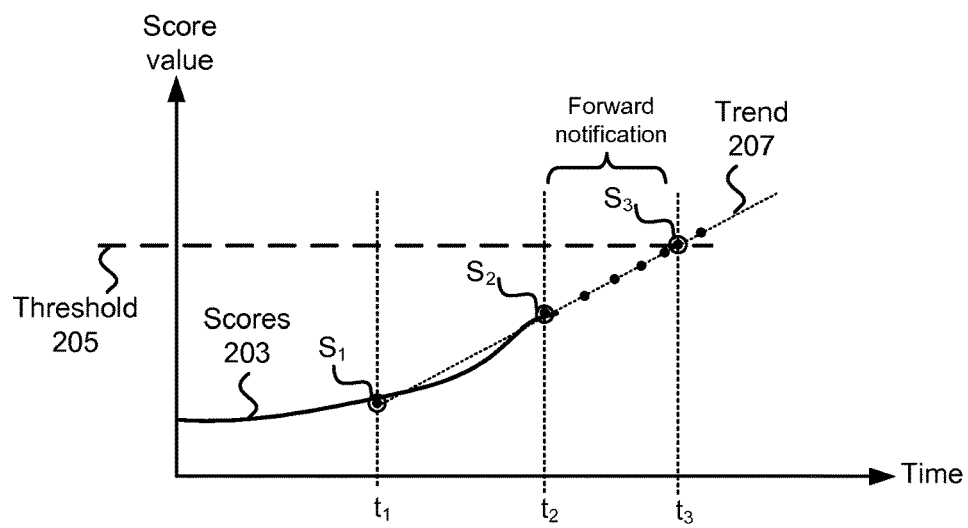
FIG. 20b illustrates a projected trend.

There are various analytical methods known in the art with which a trend may be learned from time series data and utilized for projections. In one example, the score projector module 200 is configured to determine a trend based on $S_1$, $S_2$, $t_1$, and $t_2$, and to utilize the trend to project the score $S_3$ corresponding to the time $t_3$. In one example, the trend is described by a slope of a line learned from $S_1$, $S_2$, $t_1$, and $t_2$ (and possibly other points involving scores and corresponding times). Optionally, the score $S_3$ is determined by extrapolation and finding the value of the trend line at the time $t_3$ and using it as the projected score $S_3$. Optionally, the time $t_3$ is selected such that the trend intersects with a line representing the predetermined threshold 205. This process is illustrated in FIG. 20b, where a trend 207 is learned from $S_1$, $S_2$, $t_1$, and $t_2$ and $t_3$ is the time in which the projected score based on the trend 207 reaches the predetermined threshold 205. In other examples, various linear regression methods may be utilized to learn a trend and project scores through extrapolation.

Other projection methods may rely on historical data. For example, distributions of future scores may be learned based on trends of previous scores. Thus, historical data may be used to learn a distribution function for the value of $S_3$ at the time $t_3$ given that at times $t_1$ and $t_2$ which are before $t_3$, the respective scores were $S_1$ and $S_2$. Given such a distribution, the projected score $S_3$ may be a statistic of the distribution such as its mean or mode.

Learning from historical data may also be done utilizing a predictor, which is trained on previous data involving scores computed by the dynamic scoring module 180. In order to train the predictor, training samples involving statistics of scores up to a time t may be used to generate a sample. The label for the sample may be a score that is computed at a time t+A (which is also available since the predictor is trained on historical data). There are various machine learning algorithms that may be used to implement such a predictor (e.g., neural networks, Bayesian networks, support vectors for regressions, and more). After training such a predictor, it may be utilized in order to project a score $S_3$ that corresponds to time $t_3$ based on scores $S_1$ and $S_2$ (and possibly other data).

In one embodiment, the score projector module 200 is further configured to assign weights to scores when computing a projected score corresponding to a certain future time based on the scores. Optionally, the weights are assigned such that scores corresponding to recent times are weighted higher than scores corresponding to earlier times. Optionally, when computing $S_3$, the score projector module 200 assigns a higher weight to $S_2$ than the weight it assigns to $S_1$. In one example, the score projector module 200 may utilize such weights to perform a projection using weighted least squares regression.

The alert module 208 is configured to forward notifications related to the projected scores 204. Optionally, the notifications are indicative of times when a projected score is to reach and/or exceed the predetermined threshold 205. In one example, responsive to $S_3$ reaching the predetermined threshold 205, the alert module 208 forwards, at a time prior to the time $t_3$, notification 210 which is indicative of $S_3$ reaching the predetermined threshold 205. Additionally, in this example, the alert module 208 may refrain from forwarding a notification indicative of a score $S_4$ reaching the predetermined threshold 205, where $S_4$ is computed based on $S_1$ and $S_2$, and corresponds to a time $t_4$, where $t_2 < t_4 < t_3$.

Depending on the value of the predetermined threshold 205 and/or the type of values it represents, reaching the predetermined threshold 205 may mean different things. In one example, $S_3$ reaching the predetermined threshold 205 is indicative that, on average, at the time $t_3$, users will have a positive affective response to the experience. In another example, $S_3$ reaching the predetermined threshold 205 may be indicative of the opposite, i.e., that on average, at the time $t_3$, users will have a negative affective response to the experience.

In one embodiment, the alert module 208 is further configured to determine whether a trend changes, and thus whether certain alerts that have been issued (e.g., through forwarding a notification) should be altered or cancelled based on fresher projections. For example, the alert module 208 may determine that a score $S_5$ corresponding to a time $t_5 > t_3$ falls below the predetermined threshold 205, and responsive to $S_5$ falling below the predetermined threshold 205, forward, prior to the time $t_5$, a notification indicative of $S_5$ falling below the predetermined threshold 205.

In one embodiment, the system illustrated in FIG. 20a may include personalization module 130, which may generate an output used to personalize the scores generated by the dynamic scoring module 180. This may enable the alerts generated by the alert module 208 to be personalized alerts for a certain user. For example, a score for a certain first user projected for a certain time may reach the predetermined threshold, while a score projected for a second user for the certain time may not reach the predetermined threshold. Thus, the first user will be issued an alert corresponding to the certain time, while the second user will not be issued such an alert.

In one embodiment, the experience corresponds to a certain location (e.g., the users whose measurements are used to compute at least some of the scores 203 have the experience at the certain location). Optionally, a notification sent by the alert module 208 is indicative of the certain location. For example, the notification specifies the certain location and/or presents an image depicting the certain location and/or provides instructions on how to reach the certain location. Optionally, map-displaying module 240 is utilized to present the notification by presenting on a display: a map comprising a description of an environment that comprises a certain location, and an annotation overlaid on the map, which indicates at least one of: the score corresponding to the certain future time, the certain future time, the experience, and the certain location.

In one embodiment, a computer-implemented method for dynamically alerting about projected affective response to an experience comprises the following steps: receiving, by a system comprising a processor and memory, measurements of affective response of users; wherein each measurement of a user corresponds to an event in which the user has the experience; computing scores for the experience based on the measurements; wherein each score corresponds to a certain time and is computed based on a subset of the measurements comprising measurements that were taken at a time that is at most a certain period before the certain time, and is not after the certain time; and wherein the computing of the scores comprises computing at least scores $S_1$ and $S_2$ corresponding to times $t_1$ and $t_2$, respectively, wherein $t_2 > t_1$, $S_2 > S_1$, and $S_2$ is below a predetermined threshold; computing a projected score for the experience, for a certain future time based on a trend determined from a plurality of scores, each of which corresponding to the experience and to a certain time before the certain future time; wherein the computing of the projected score comprises computing a projected score $S_3$ corresponding to a time $t_3>t_2$, based on a trend determined based on $S_1$ and $S_2$; determining that $S_3$ reaches the predetermined threshold; and forwarding a notification indicative of $S_3$ reaching the predetermined threshold.

Optionally, the method further comprises not utilizing measurements taken earlier than the certain period before the certain time for computing a score corresponding to the certain time. Optionally, the method further comprises assigning weights to measurements used to compute a score corresponding to a certain time, such that an average of the weights assigned to measurements taken earlier than the certain period before the certain time is lower than an average of weights assigned to measurements taken after the certain period before the certain time; and utilizing the weights for the computing of the score corresponding to the certain time.

Figure 21A:
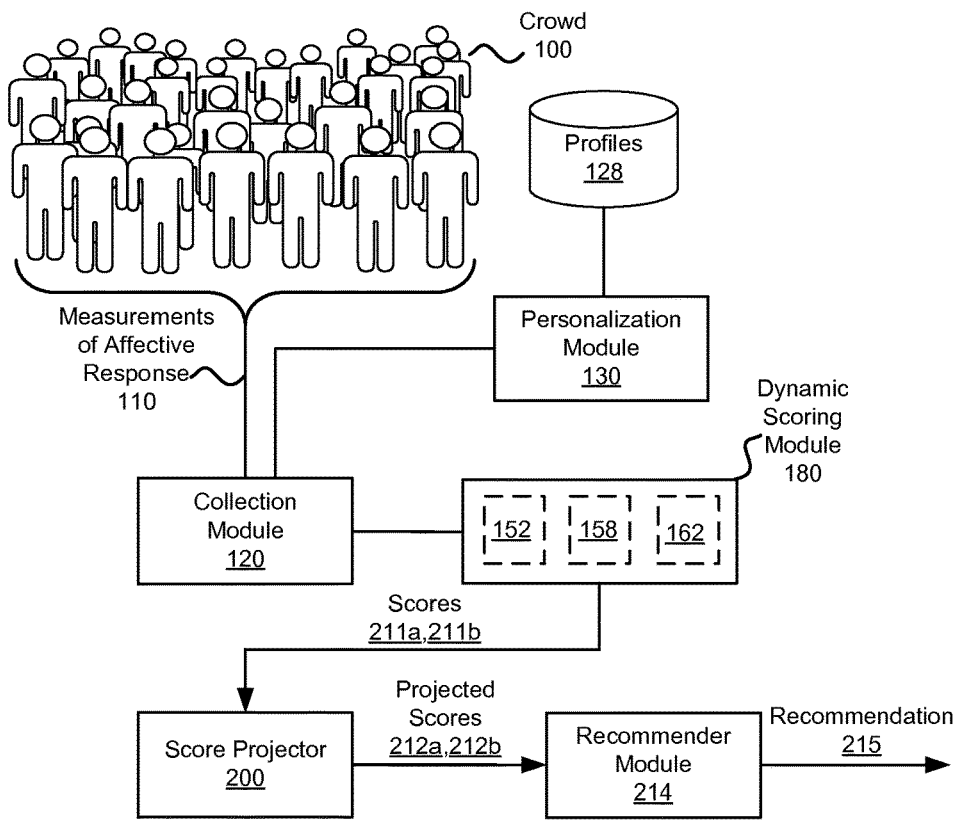
FIG. 21a illustrates one embodiment of a system configured to project affective response to experiences and make recommendations accordingly.

Projected scores may also be utilized to recommend experiences to users to have in a future time. FIG. 21a illustrates one embodiment of a system configured to project affective response to experiences and make recommendations accordingly. The system includes at least the collection module 120, the dynamic scoring module 180, the score projector module 200, and recommender module 214.

In the illustrated embodiment, the collection module 120 is configured to receive measurements corresponding to events involving first and second experience (i.e., the user corresponding to the event had the first experience and/or the second experience). The dynamic scoring module 180 computes scores 211a for the first experience and scores 211b for the second experience. When computing a score for an experience from among the first and second experiences, the dynamic scoring module utilizes a subset of the measurements comprising measurements of users who had the experience, and the measurements in the subset are taken at a time that is at most a certain period before the certain time, and is not after the certain time. Optionally, the certain period is shorter than at least one of the following durations: one minute, ten minutes, one hour, four hours, twelve hours, one day, one week, one month, and one year.

In one embodiment, the dynamic scoring module 180 computes at least the following scores: a score $S_1$ corresponding to a time $t_1$ and to the first experience; a score $S_2$ corresponding to a time $t_2$ and to the second experience; a score $S_3$ corresponding to a time $t_3$ and to the first experience; and a score $S_4$ corresponding to a time $t_4$ and to the second experience. Where $t_3>t_1$, $t_4>t_1$, $t_3>t_2$, $t_4>t_2$, $S_3>S_1$, $S_2>S_4$, and $S_4>S_3$. Optionally, at least one of the following constraints is true: (i) $t_5>t_4$ and $t_6>t_3$, and (ii) $t_5=t_6$.

Figure 21B:
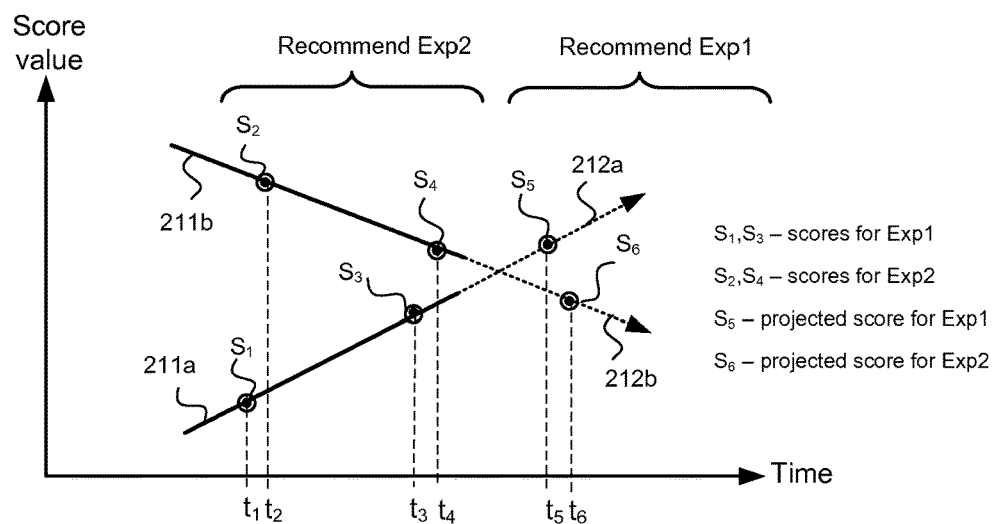
FIG. 21b illustrates projected scores.

The scores $S_1$ to $S_4$ (possibly with other data) may be utilized to learn trends of the affective response to the first and second experiences, by the score projector module 200. FIG. 21b illustrates the scores mentioned above and the trends that may be learned from them.

In one embodiment, the score projector module 200 is configured to compute projected scores 212a and 212b based on the scores 211a and 211b, respectively. Where each projected score corresponds to a future time and an experience from among the first and second experiences and is computed based on a trend determined from a plurality of scores. Based on the scores $S_1$ to $S_4$ described above, the score projector module may compute the following scores: a projected score $S_5$, corresponding to the first experience and to a time $t_5>t_3$, which is computed based on a trend determined based on $S_1$ and $S_3$; and a projected score $S_6$, corresponding to the second experience and to a time $t_6>t_4$, which is computed based on a trend determined based on $S_2$ and $S_4$. Additionally, the projected score $S_5$ is greater than the projected score $S_6$.

The recommender module 214 is configured to recommend an experience, from among the first and second experiences, for a future time based on projected scores corresponding to the future time. The recommendation is done such that based on the scores $S_5$ and $S_6$ and the fact that $S_5$ is greater than $S_6$, the recommender module 214 recommends the first experience for a time t, where $t_5>t>t_4$. Thus the recommendation is made based on projected scores that represent a trend in the future, even though at the time the recommendation is made, the scores show the opposite of the recommendation (i.e., at $t_4$, the score for the second experience is still higher than the score for the first experience).

In one embodiment, the recommender module 214 is further configured to recommend an experience to a user to have in a certain time in the future in a manner that belongs to a set comprising first and second manners. Optionally, when recommending the experience in the first manner, the recommender module 214 provides a stronger recommendation for the experience, compared to a recommendation for the experience that the recommender module 214 provides when recommending in the second manner. With reference to the discussion above, for a time t, $t_5>t>t_4$, the recommender module 214 recommends the first experience in the first manner and recommends the second experience in the second manner.

In one embodiment, the first and second experiences correspond to first and second locations. Optionally, map-displaying module 240 is utilized to present on a display: a map comprising a description of an environment that comprises the first and second locations, and an annotation overlaid on the map indicating at least one of: $S_5$, $S_6$, and an indication that $S_5>S_6$.

In one embodiment, a computer-implemented method for projecting affective response to experiences comprises the following steps: receiving, by a system comprising a processor and memory, measurements of affective response of users; wherein each measurement of a user corresponds to an event in which the user has a first experience or a second experience; computing scores based on the measurements; wherein each score corresponds to a time and to an experience from among the first and second experiences, and each score is computed based on a subset of the measurements comprising measurements of users who had the experience, and the measurements in the subset are taken at a time that is at most a certain period before the certain time, and is not after the certain time; wherein the computing of the scores includes computing at least the following scores: a score $S_1$ corresponding to a time $t_1$ and to the first experience; a score $S_2$ corresponding to a time $t_2$ and to the second experience; a score $S_3$ corresponding to a time $t_3$ and to the first experience; and a score $S_4$ corresponding to a time $t_4$ and to the second experience; and wherein $t_3>t_1$, $t_4>t_1$, $t_3>t_2$, $t_4>t_2$, $S_3>S_1$, $S_2>S_4$, and $S_4>S_3$; and computing projected scores based on the scores; wherein each projected score corresponds to a future time and an experience from among the first and second experiences and is computed based on a trend determined from a plurality of scores; wherein the computing of the projected scores includes computing the following projected scores: a projected score $S_5$, corresponding to the first experience and to a time $t_5>t_3$, based on a trend determined based on $S_1$ and $S_3$; and a projected score $S_6$, corresponding to the second experience and to a time $t_6>t_4$, based on a trend determined based on $S_2$ and $S_4$; wherein $S_5>S_6$; and recommending the first experience at a time t, where $t_5>t>t_4$.

Optionally, the method further comprises recommending an experience to a user to have in a certain time in the future in a manner that belongs to a set comprising first and second manners; wherein recommending the experience in the first manner comprises providing a stronger recommendation for the experience, compared to recommending the experience in the second manner; and for a time t, $t_5>t>t_4$, further comprising recommending the first experience in the first manner and recommending the second experience in the second manner.

Figure 22:
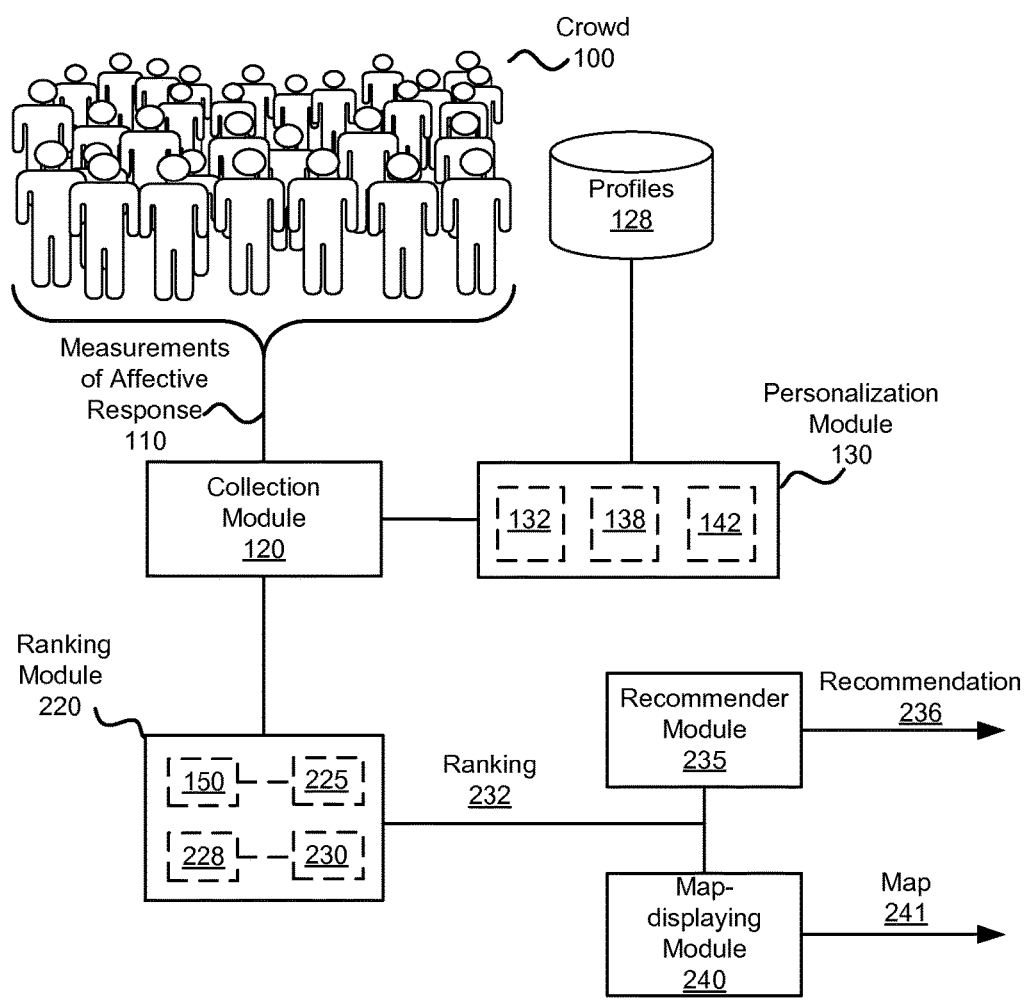
FIG. 22 illustrates one embodiment of a system configured to rank experiences based on measurements of affective response of users.

Another crowd-based result that may be generated based on measurements of affective response involves ranking of experiences. FIG. 22 illustrates one embodiment of a system configured to rank experiences based on measurements of affective response of users. The system includes at least the collection module 120 and the ranking module 220. This system, like other systems described in this disclosure, includes at least a memory 402 and a processor 401. The memory 402 stores computer executable modules described below, and the processor 401 executes the computer executable modules stored in the memory 402.

The collection module 120 is configured to receive the measurements 110. Optionally, at least some of the measurements 110 may be processed in various ways prior to being received by the collection module 120. For example, at least some of the measurements 110 may be compressed and/or encrypted.

The collection module 120 is also configured to forward at least some of the measurements 110 to the ranking module 220. Optionally, at least some of the measurements 110 undergo processing before they are received by the ranking module 220. Optionally, at least some of the processing is performed via programs that may be considered software agents operating on behalf of the users who provided the measurements 110.

In one embodiment, measurements received by the ranking module 220 include measurements of affective response of users to a plurality of experiences. Optionally, for each experience of the plurality of experiences, the measurements received by the ranking module include measurements of at least five users who had the experience, and the measurements of the at least five users were taken while the users had the experience or shortly after that time. The ranking module 220 is configured to rank the plurality of experiences based on the measurements, such that, a first experience from among the plurality of experiences is ranked higher than a second experience from among the plurality of experiences.

There are different approaches to ranking experiences which may be utilized in embodiments described herein. In some embodiments, experiences may be ranked based on scores computed for the experiences. In such embodiments, the ranking module may include the scoring module 150 and a score-based rank determining module 225. Ranking experiences using these modules is described in more detail in the discussion related to FIG. 24. In other embodiments, experiences may be ranked based on preferences generated from measurements. In such embodiments, an alternative embodiment of the ranking module 220 includes preference generator module 228 and preference-based rank determining module 230. Ranking experiences using these modules is described in further detail in the discussion related to FIG. 25.

Figure 23A:
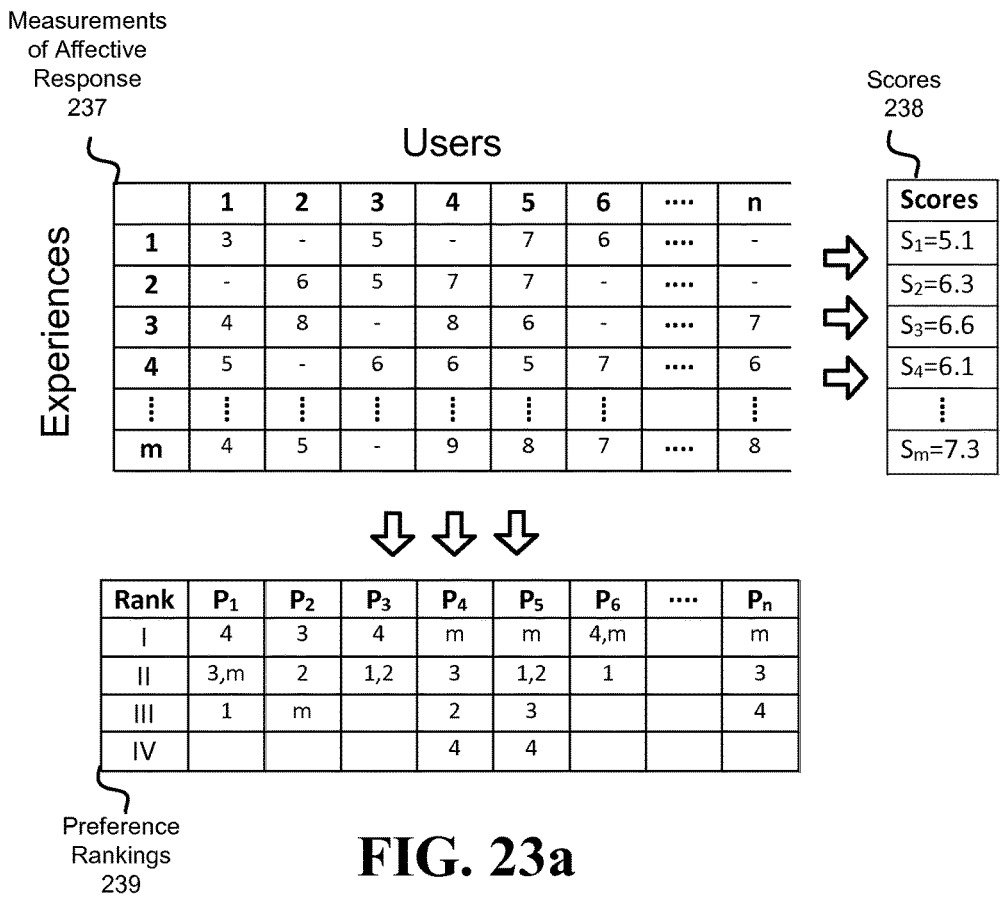
FIG. 23a and FIG. 23b illustrate different ranking approaches.
Figure 23B:
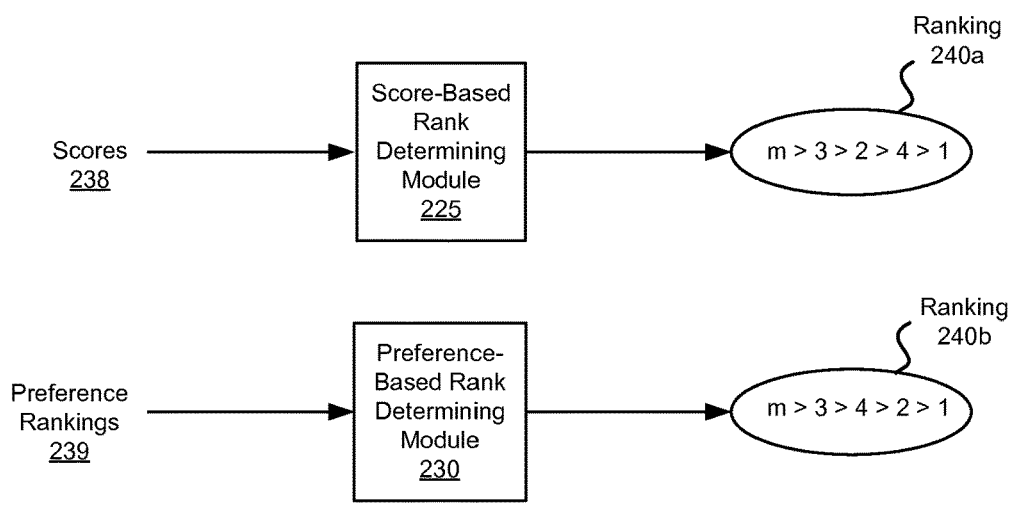

The difference between the approaches is illustrated in FIG. 23a. The table in the illustrated figure represents values 237 of measurements of affective response of n users to m experiences. For the purpose of the illustration, the affective response of a user to an experience is represented with a number from 1 to 10, with 10 representing the most positive value of affective response. Note that some of the cells in the table are empty, indicating that each user might have provided measurements to some of the m experiences. In this figure, score-based ranking is represented as ranking based on the rows. In score-based ranking scores 238 are computed from each of the rows, and then the experiences may be ranked based on the magnitude of their corresponding scores. In contrast, preference-based ranking, may be viewed as ranking based on analysis of the columns. That is, preference rankings 239 represent a personal ranking for each of the n users towards some, but not necessarily all, of the m experiences. These n rankings may then be consolidated, e.g., utilizing a method that satisfies the Condorcet criterion, which is explained below. It is to be noted that the different approaches may yield different rankings, based on the same set of measurements of affective response, as illustrated in FIG. 23b, which shows the generation of two different rankings 204a and 240b, based on the values 237 of measurements of affective response.

In some embodiments, the personalization module 130 may be utilized in order to personalize rankings of experiences for certain users. Optionally, this may be done utilizing the output generated by the personalization module 130 when given a profile of a certain user, and profiles of at least some of the users who provided measurements that are used to rank the experiences. Optionally, when generating personalized rankings for experiences, there are at least a certain first user and a certain second user, who have different profiles, for which the ranking module 220 ranks the first and second experiences from among the plurality of experiences differently, such that for the certain first user, the first experience is ranked above the second experience, and for the certain second user, the second experience is ranked above the first experience.

In some embodiments, the recommender module 235 is utilized to recommend an experience to a user, from among the plurality of experiences ranked by the ranking module 220, in a manner that belongs to a set comprising first and second manners. Optionally, when recommending an experience in the first manner, the recommender module provides a stronger recommendation for the experience, compared to a recommendation for the experience that the recommender module 235 provides when recommending in the second manner. In one embodiment, based on a ranking of the plurality of experiences in which an experience is ranked at least at a predetermined rank, the recommender module is configured to recommend the experience in the first manner. Optionally, if the experience is ranked lower than the certain rank, the recommender module 235 recommends the experience in the second manner. Optionally, the certain rank is one of the following: the first rank (i.e., top ranked experience), the second rank, or the third rank. Optionally, the certain rank equals at most half of the number of experiences in the plurality of experiences. Additional discussion regarding recommendations in the first and second manners may be found at least in the discussion about recommender module 178; recommender module 235 may employ first and second manners of recommendation in the same way the recommender module 178 does so.

In some embodiments, when the plurality of experiences correspond to locations, map-displaying module 240 may be utilized to present a ranking and/or recommendation based on a ranking to a user. Optionally, map 241 may display an image describing the locations and annotations describing at least some experiences from among the plurality of experiences and their respective ranks.

In one embodiment, a computer-implemented method for ranking experiences based on measurements of affective response of users comprises the following steps: receiving, by a system comprising a processor and memory, the measurements of affective response of the users to a plurality of experiences; wherein for each experience of the plurality of experiences, the measurements comprise measurements of at least five users who had the experience; and calculating a first ranking that ranks the plurality of experiences based on the measurements, such that, a first experience from among the plurality of experiences is ranked higher than a second experience from among the plurality of experiences.

Optionally, the method further comprises computing scores for the plurality of experiences; wherein, for each experience from among the plurality of experiences, computing a score is based on the measurements of the at least five users who had the experience; and wherein the first ranking is based on magnitudes of the scores; wherein the experience score computed for the first experience is higher than the experience score computed for the second experience.

Optionally, the method further comprises generating a plurality of preference rankings for the experiences; wherein each preference ranking is determined based on a subset of the measurements, and comprises a ranking of at least two of the experiences, such that one of the at least two experiences is ranked ahead of another experience from among the at least two experiences; and calculating a second ranking that ranks the experiences based on the plurality of the preference rankings utilizing a method that satisfies the Condorcet criterion; and wherein the first ranking is based on the second ranking.

Figure 24:
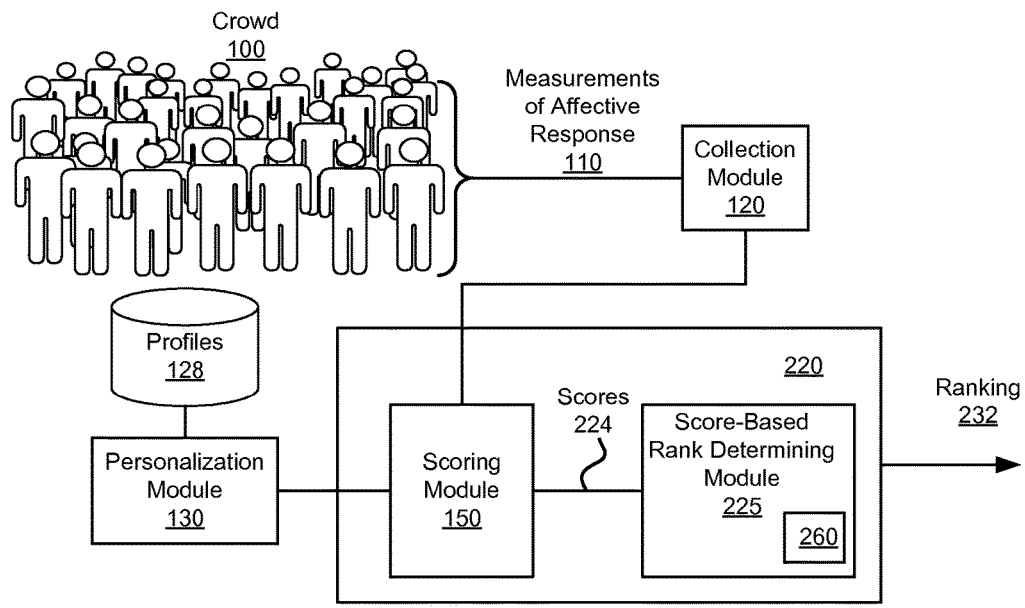
FIG. 24 illustrates one embodiment of a system configured to rank experiences using scores computed for the experiences.

FIG. 24 illustrates one embodiment of a system configured to rank experiences using scores computed for the experiences based on measurements of affective response. The figure illustrates one alternative embodiment for the ranking module 220, in which the ranking module 220 includes the scoring module 150 and the score-based rank determining module 225.

The scoring module 150 is configured to compute scores 224 for the experiences. Where for each experience from among the experiences, the scoring module computes a score based on the measurements of the at least five users who had the experience (i.e., the measurements were taken while the at least five users had the experience and/or shortly after that time).

The score-based rank determining module 225 is configured to rank the experiences based on the scores 224 computed for the experiences, such that a first experience is ranked higher than a second experience when the score computed for the first experience is higher than the score computed for the second experience. In some cases experiences may receive the same rank, e.g., if they have the same score computed for them, or the significance of the difference between the scores is below a predetermined threshold.

In one embodiment, the score-based rank determining module 225 utilizes score-difference evaluator module 260 which is configured to determine significance of a difference between scores of third and fourth experiences. Optionally, the score-difference evaluator module 260 utilizes a statistical test involving the measurements of the users who had the third and fourth experiences in order to determine the significance. Optionally, the score-based rank determining module 225 is further configured to give the same rank to the third and fourth experiences when the significance of the difference is below the predetermined threshold.

In some embodiments, the personalization module 130 may be utilized in order to generate for a certain user personalized rankings of the experience. Depending on the embodiment of the personalization module 130, the personalization of the ranking module 220 when it includes the scoring module 150 and the score-based rank determining module 225, may be done in different ways, as explained below.

In one embodiment, the personalization module 130 includes the profile comparator 133 and the weighting module 135, and given a profile of a certain user it compares the profile to other profiles of users who contributed measurements to computation of scores for the experiences being ranked, and produces an output indicative of a weighting for the measurements. Optionally, the scoring module 150 utilizes the output in order to compute scores for the experience. Optionally, the scoring module computes each score of an experience from among the experiences being ranked, based on measurements of at least eight users who had the experience and their corresponding weights that were determined by the weighting module 135. Given that in this embodiment, the scores received by the score-based rank determining module 225 are personalized for the certain user, the resulting ranking of the experiences may also be considered personalized for the certain user.

In another embodiment, the personalization module 130 includes the clustering module 139 and the selector module 141. The clustering module 139 receives profiles of users who contributed measurements to computation of scores for the experiences and clusters those users into clusters based on profile similarity, with each cluster comprising a single user or multiple users with similar profiles. The selector module 141 receives a profile of the certain user, and based on the profile, selects a subset comprising at most half of the clusters. Additionally, the selector module is further configured to select at least eight users from among the users belonging to clusters in the subset. In this embodiment, the scoring module 150 is configured to compute scores for the experiences based on measurements of at least five users, from among the at least eight users, who had the experience. Since these scores may be considered personalized for the certain user, the resulting ranking of the experiences may also be considered personalized for the certain user.

Figure 25:
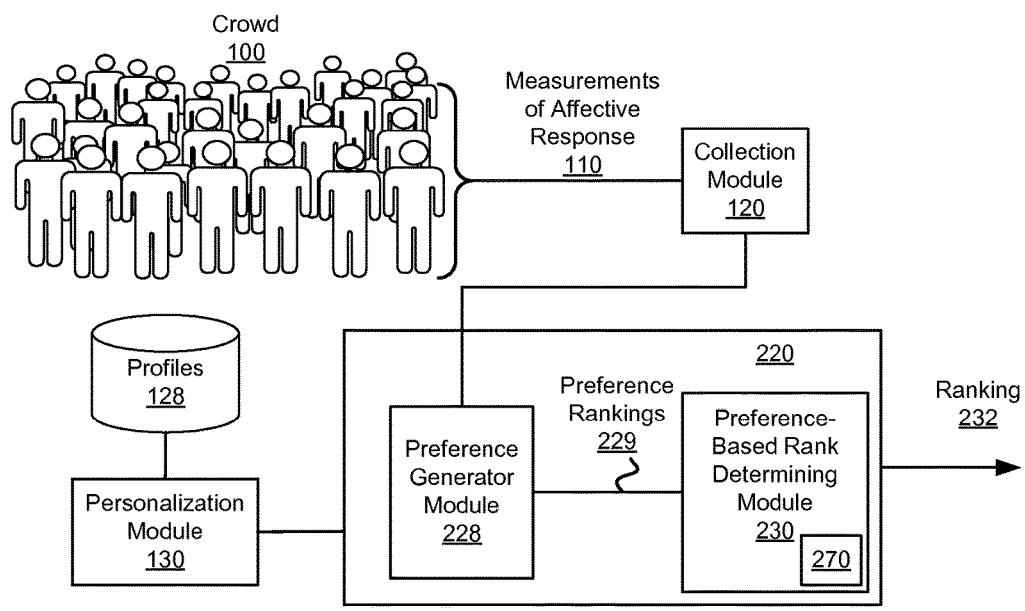
FIG. 25 illustrates one embodiment of a system configured to rank experiences using preference rankings determined based on measurements of affective response.

FIG. 25 illustrates one embodiment of a system configured to rank experiences using preference rankings determined based on measurements of affective response. The figure illustrates on alternative embodiment for the ranking module 220, in which the ranking module 220 includes preference generator module 228 and preference-based rank determining module 230.

The preference generator module 228 is configured to generate a plurality of preference rankings 229 for the experiences. Optionally, each preference ranking is determined based on a subset of the measurements 110, and comprises a ranking of at least two of the experiences, such that one of the at least two experiences is ranked ahead of another experience from among the at least two experiences. Optionally, a majority of the measurements comprised in each subset of the measurements that is used to generate a preference ranking are measurements of a single user. Optionally, each subset of the measurements that is used to generate a preference ranking consists measurements of a single user. Optionally, a majority of the measurements comprised in each subset of the measurements that is used to generate a preference ranking are measurements of similar users. In one embodiment, the profile comparator 133 is utilized to determine which users are similar based on their profiles. Optionally, on average most users are not considered similar to any given user.

The preference-based rank determining module 230 is configured to rank the experiences based on the plurality of the preference rankings utilizing a method that satisfies the Condorcet criterion. Optionally, a method that satisfies the Condorcet criterion ranks a certain experience higher than each experience belonging to a set of other experiences, if, for each other experience belonging to the set of other experiences, the number of preference rankings that rank the certain experience higher than the other experience is larger than the number of preference rankings that rank the other experience higher than the certain experience. Some examples or ranking methods known in the art, which satisfy the Condorcet criterion and may be used by the preference-based rank determining module 230 include: ranked pairs methods, Kemeny-Young methods, Schulze methods, and Copeland's method. Further discussion regarding various methods that satisfy the Condorcet criterion may be found in this disclosure at least in Section 7—Ranking Experiences.

In one embodiment, the preference-based rank determining module 230 assigns two or more experiences with the same rank if they are tied according to the method that satisfies the Condorcet criterion. In another embodiment, the preference-based rank determining module 230 may resolve ties if two or more experiences are tied according to the method that satisfies the Condorcet criterion.

In one embodiment, the preference-based rank determining module 230 is configured to give the same rank to the first and second experiences when the significance of the difference between first and second subsets of measurements corresponding to the first and second experiences, respectively, is below a predetermined threshold. Optionally, the significance is determined utilizing difference-significance evaluator module 270.

In some embodiments, the personalization module 130 may be utilized in order to generate for a certain user personalized rankings of the experience. Depending on the embodiment of the personalization module 130, the personalization of the ranking module 220, when it includes the preference generator module 228 and the preference-based rank determining module 230 may be done in different ways, as explained below.

In one embodiment, the personalization module 130 includes the profile comparator 133 and the weighting module 135, and given a profile of a certain user it compares the profile to other profiles of users who contributed measurements to computation of scores for the experiences being ranked, and produces an output indicative of a weighting for the measurements. Optionally, in this embodiment, the preference generator module 228 generates each preference ranking based on a subset of the measurements and the weights for the measurements belonging to the subset. This may be done, by treating each measurement as a weighted vote instead of all measurements having the same weight (as in typical preference-based ranking methods). Given that in this embodiment, the preference rankings received by the preference-based rank determining module 230 are personalized for the certain user, the resulting ranking of the experiences may also be considered personalized for the certain user.

In another embodiment, the personalization module 130 includes the clustering module 139 and the selector module 141. The clustering module 139 receives profiles of users who contributed measurements to computation of scores for the experiences and clusters those users into clusters based on profile similarity, with each cluster comprising a single user or multiple users with similar profiles. The selector module 141 receives a profile of the certain user, and based on the profile, selects a subset comprising at most half of the clusters. Additionally, the selector module is further configured to select at least eight users from among the users belonging to clusters in the subset. Optionally, in this embodiment, the preference generator module 228 generates each preference ranking based on a subset of the measurements that comprises the at least eight users, who had the experience. Since these scores may be considered personalized for the certain user, the resulting ranking of the experiences may also be considered personalized for the certain user. Given that in this embodiment, the preference rankings received by the preference-based rank determining module 230 are personalized for the certain user, the resulting ranking of the experiences may also be considered personalized for the certain user.

In one embodiment, a computer-implemented method for utilizing profiles of users to compute personalized rankings of experiences based on measurements of affective response of the users comprises the following steps: receiving, by a system comprising a processor and memory, measurements of affective response of the users to a plurality of experiences; wherein for each experience of the plurality of experiences, the measurements comprise measurements of at least eight users who had the experience; receiving a profile of a first user, a profile of a second user, and profiles of the users; wherein the profiles of the first and second users are different; generating a first output indicative of similarities between the profile of the first user and the profiles of the users; generating a second output indicative of similarities between the profile of the second user and the profiles of the users; ranking the plurality of experiences for the first user based on the first output and the measurements; and ranking the plurality of experiences for the second user based on the second output and the measurements; wherein the rankings for the first and second users rank differently first and second experiences from among the plurality of experiences, such that for the first user, the first experience is ranked above the second experience, and for the second user, the second experience is ranked above the first experience.

Figure 26A:
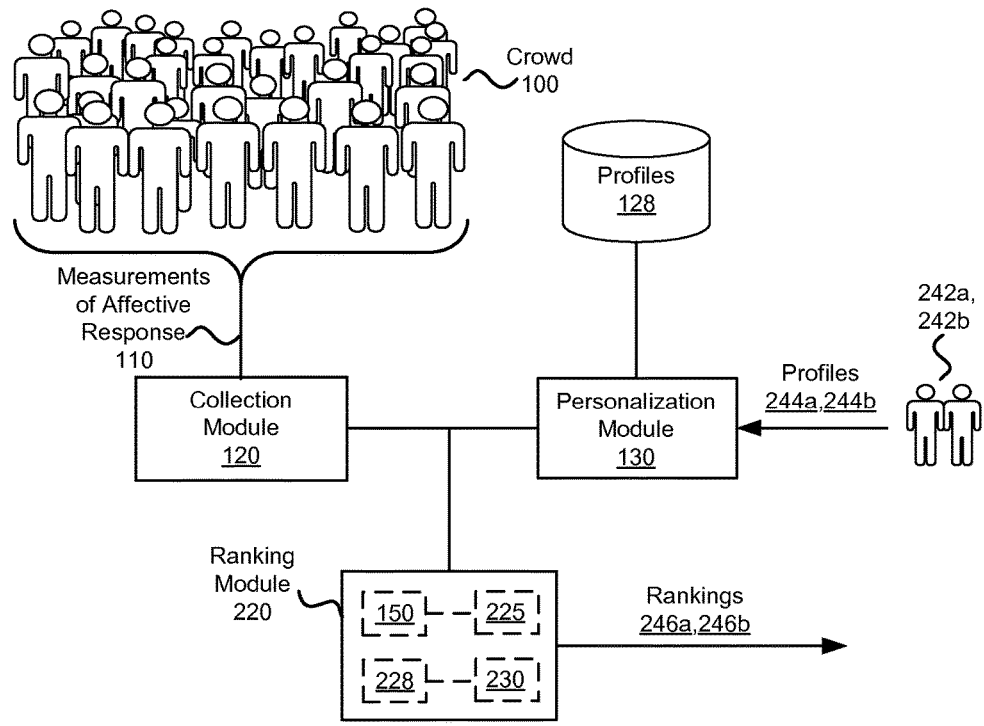
FIG. 26a and FIG. 26b illustrate one embodiment in which the personalization module may be utilized to generate personalized rankings.
Figure 26B:
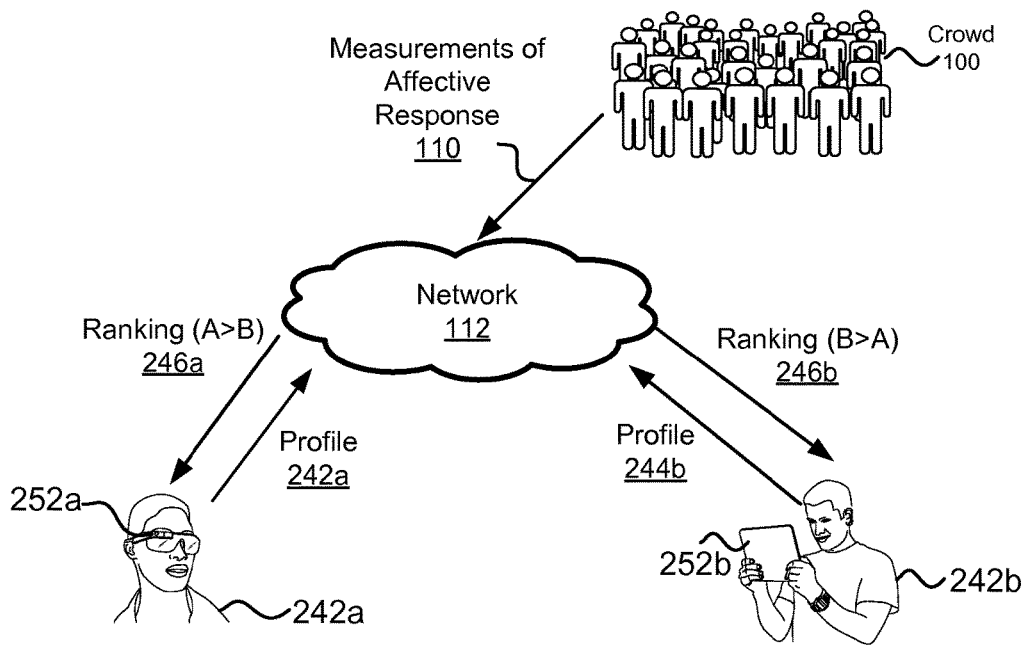

FIG. 26a and FIG. 26b illustrate one embodiment in which the personalization module 130 may be utilized to generate personalized rankings. A certain first user 242a and a certain second user 242b each provide their profiles to the personalization module 130 (these are profiles 244a and 244b, respectively). Based on different outputs generated by the personalization module 130 for the profiles 244a and 244b, the ranking module 220 generates rankings 246a and 246b for the certain first user 242a and the certain second user 242b, respectively. In the ranking 246a, a first experience (A) is ranked above a second experience (B), while in the ranking 246b, it is the other way around. Consequently, the certain first user 242a may receive a different result on his user interface 252a than the result the certain second user 242b receives on his user interface 252b. For example, the certain first user 242a may receive a recommendation to have experience A, while the certain second user 242b may receive a recommendation to have experience B.

Figure 27A:
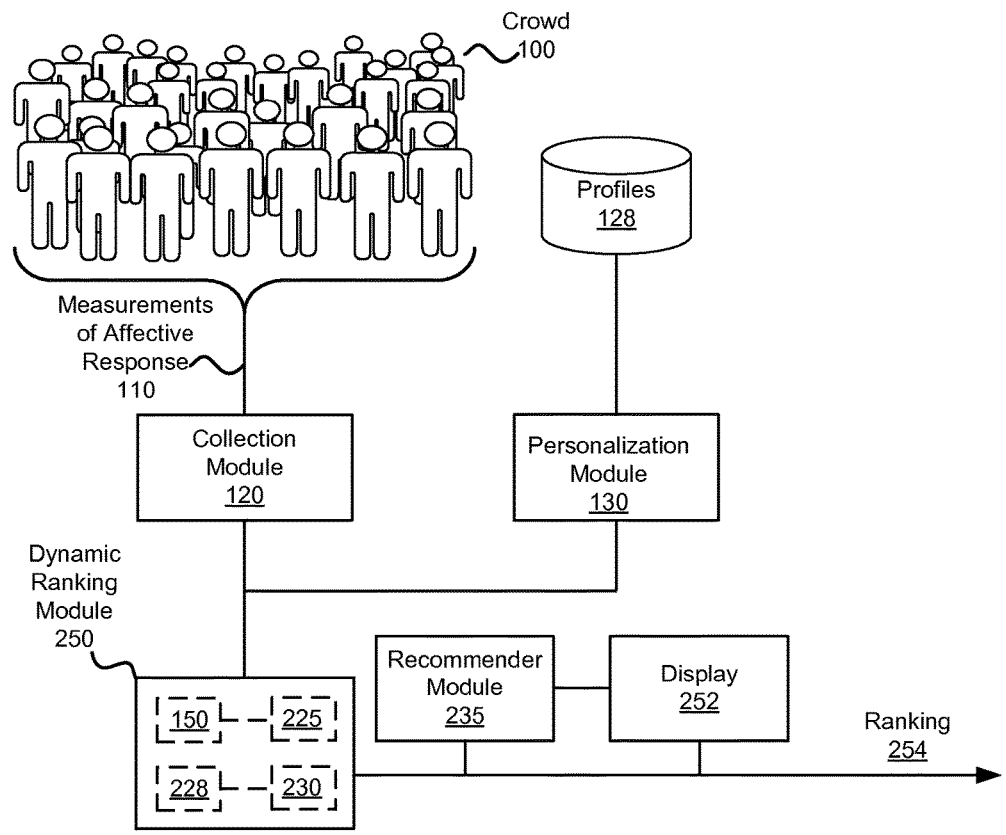
FIG. 27a illustrates one embodiment of a system configured to dynamically rank experiences based on affective response of users.

FIG. 27a illustrates one embodiment of a system configured to dynamically rank experiences based on affective response of users. The system includes at least the collection module 120 and the dynamic ranking module 250.

In the illustrated embodiment, the collection module 120 is configured to receive measurements 110 comprising measurements of affective response of the users to a plurality of experiences. For each experience of the plurality of experiences, the measurements 110 include measurements of at least ten users who had the experience.

Figure 27B:
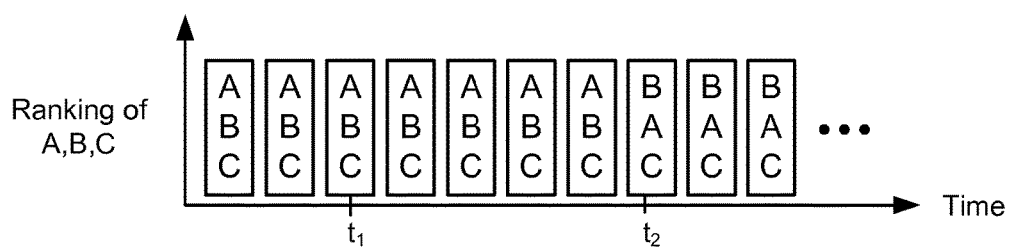
FIG. 27b illustrates changes to ranking of experiences over time.

The dynamic ranking module 250 is configured to generate rankings of the plurality of experiences. Each ranking corresponds to a certain time and is generated based on a subset of the measurements of affective response of the users that comprises measurements taken at a time that is at most a certain period before the certain time, and is not after the certain time. The dynamic nature of the rankings is manifested in differences in rankings corresponding to different times. For example, the dynamic ranking module 250 generates at least a first ranking corresponding to a certain first time, in which a first experience from among the plurality of experiences is ranked above a second experience from among the plurality of experiences, and a second ranking corresponding to a certain second time, in which the second experience is ranked above the first experience. In this example, the certain second time is after the certain first time, and the second ranking is computed based on at least one measurement taken after the certain first time. FIG. 27b illustrates such a scenario where three experiences are ranks A, B, and C; until the time $t_1$, A is ranked ahead of B and C, but after the time $t_2$, A and B switch ranks, and B is ranked ahead of A.

In order to maintain a dynamic nature of rankings computed by the dynamic ranking module 250, the dynamic ranking module 250 may assign weights to measurements it uses to compute a ranking corresponding to a time t, based on how long before the time t the measurements were taken. Typically, this involves giving a higher weight to more recent measurements (i.e., taken closer to the time t). Such a weighting may be done in different ways.

In one embodiment, measurements taken earlier than the first period before the time t are not utilized by the dynamic ranking module 250 to compute the ranking corresponding to t. Doing so emulates a sliding window approach, which filters out measurements that are too old. Weighting of measurements according to this approach is illustrated in FIG. 17a, in which the "window" corresponding to the time t is the period between t and t–Δ. The graph 192a shows that measurements taken within the window have a certain weight, while measurements taken prior to t–Δ (and thus are not in the window) have a weight of zero.

In another embodiment, the dynamic ranking module 250 is configured to assign weights to measurements used to compute the ranking corresponding to the time t, using a function that decreases with the length of the period since t. Examples of such function may be exponential decay function or other function such as assigning measurements a weight that is proportional to 1/(t–t'), where t' is the time the measurement was taken. Applying such a decreasing weight means that an average of weights assigned to measurements taken earlier than the first period before t is lower than an average of weights assigned to measurements taken later than the first period before t. Weighting of measurements according to this approach is illustrated in FIG. 17b. The graph 192b illustrates how the weight for measurements decreases as the gap between when the measurements were taken and the time t increases.

Similar to the ranking module 220, dynamic ranking module 250 may be implemented in different embodiments using different modules in order to utilize either a score-based approach to ranking or a preference-based approach.

In one embodiment, the dynamic ranking module 250 includes a dynamic scoring module 180 configured to compute scores for the plurality of the experiences. Alternatively, it may include scoring module 150. The difference between the two implementations may stem from which module performs the weighting of the measurements. If the dynamic ranking module 250 does it, the dynamic ranking module 250 may include scoring module 150, otherwise, the dynamic scoring module 180 may be relied upon to weight the measurements based on the time they were taken. Each score computed by either of the scoring modules corresponds to a certain time, and is computed based on measurements of at least five of the users from a subset of the measurements of the users that comprises measurements taken at a time that is at most the certain period before the certain time, and is not after the certain time. Additionally, the dynamic ranking module 250 includes, in this embodiment the score-based rank determining module 225, which can utilize scores computed by the dynamic scoring module 180 and/or scoring module 150 to rank the experiences. The ranking 254 of the plurality of experiences corresponding to the certain time, which is generated by the dynamic ranking module 250, is based on a ranking generated by the score-based rank determining module 225.

In one embodiment, the dynamic ranking module 250 includes the preference generator module 228 and preference-based rank determining module 230. Each preference ranking is generated by the preference generator module 228 based on a subset of the measurements of the users that comprises measurements taken at a time that is at most the certain period before the certain time, and comprises a ranking of at least two experiences, such that one of the at least two experiences is ranked ahead of another experience from among the at least two experiences. The preference-based rank determining module 230 ranks the plurality of the experiences based on the plurality of the preference rankings utilizing a method that satisfies the Condorcet criterion. The ranking 254 of the plurality of experiences corresponding to the certain time, which is generated by the dynamic ranking module 250, is based on the ranking generated by the preference-based rank determining module 230. The ranking of the plurality of experiences by the preference-based rank determining module 230 is such that a certain experience, which in a pair-wise comparison with other experiences is preferred over each of the other experiences, is not ranked below any of the other experiences. Optionally, the certain experience is ranked above each of the other experiences.

In one embodiment, recommender module 235 is configured to recommend an experience to a user, based on the ranking 254, in a manner that belongs to a set comprising first and second manners. When recommending an experience in the first manner, the recommender module 235 provides a stronger recommendation for the experience, compared to a recommendation for the experience that the recommender module 235 provides when recommending in the second manner. The recommender module 235 is further configured to: recommend the experience in the first manner when the experience is ranked at least at a predetermined rank, and to recommend the experience in the second manner when the experience is ranked below the predetermined rank. During a period that ends before the certain second time, the first experience is recommended in the first manner and the second experience is recommended in the second manner. However, during a period that starts after the certain second time, the first experience is recommended in the second manner and the second experience is recommended in the first manner.

In some embodiments, a recommendation made by the recommender module 235 and/or the ranking 254 may be presented to a user via display 252 which may be any type of graphical user interface, such as a tablet screen and/or an augmented reality head-mounted display. In one embodiment, the first and second experiences correspond to first and second locations, respectively. For example, the first experience takes place at the first location and the second experience takes place at the second location. Optionally, the display 252 may be a map-displaying module configured to present on a display: a map comprising a description of an environment that comprises the first and second locations, and an annotation overlaid on the map indicating at least one of the following: a first score computed for the first experience, a second score computed for the second experience, a rank of the first experience, a rank of the second experience, an indication of a relative ranking of the first and second experiences, the certain time, the first location, and the second location.

In one embodiment, a computer-implemented method for dynamically ranking of experiences based on affective response of users comprises the following steps: receiving, by a system comprising a processor and memory, measurements of affective response of the users to a plurality of experiences; wherein for each experience of the plurality of experiences, the measurements comprise measurements of at least ten users who had the experience; and generating a first ranking of the plurality of experiences, which corresponds to a certain first time, based on a first subset of the measurements of the users that comprises measurements taken at a first time that is at most a predetermined period before the certain first time, and is not after the certain first time; generating a second ranking of the plurality of experiences, which corresponds to a certain second time that is after the certain first time, based on a second subset of the measurements of the users that comprises measurements taken at a second time that is at most a predetermined period before the certain second time, and is not after the certain second time; wherein in the first ranking, a first experience from among the plurality of experiences is ranked above a second experience from among the plurality of experiences, and in the second ranking, the second experience is ranked above the first experience; and wherein the second ranking is computed based on at least one measurement taken after the certain first time.

Figure 28A:
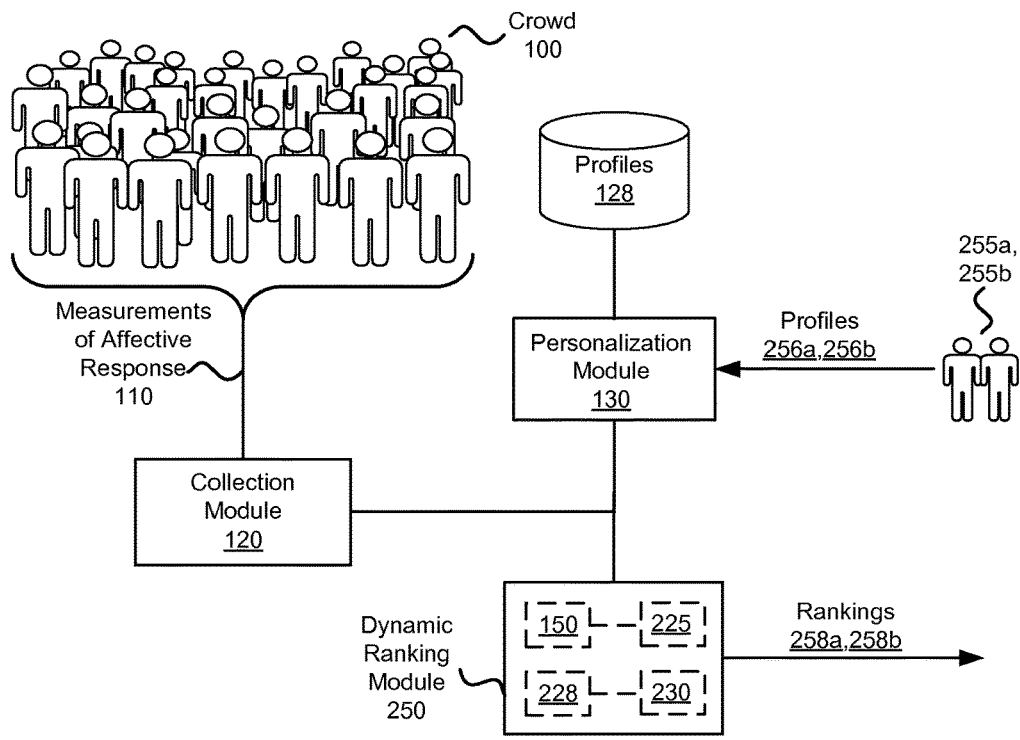
FIG. 28a illustrates personalization of dynamic rankings.
Figure 28B:
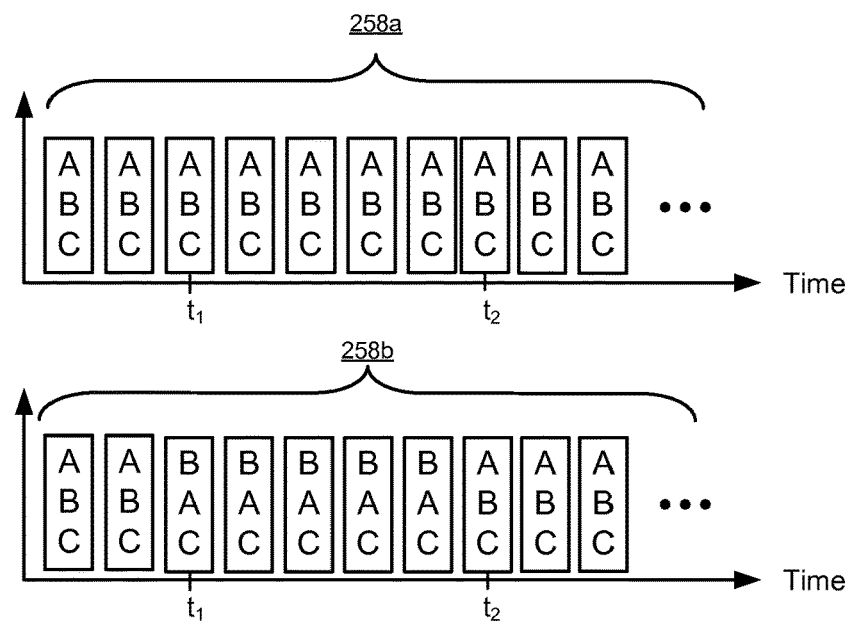
FIG. 28b illustrates different rankings.

In some embodiments, personalization module 130 may be utilized to generate personalized dynamic rankings of experiences, as illustrated in FIG. 28a. Having an output generated by the personalization module 130 being based on comparing a profile of a certain user to profiles, from among the profiles 128, of users who contributed measurements to computation of rankings can lead to it that different users may receive different rankings computed by the dynamic ranking module 250. This is illustrated in the FIG. 28a by rankings a certain first user 255a and a certain second user 255b receive. The certain first user 255a and the certain second user 255b have respective different profiles 256a and 256b. The personalization module 130 generates for them different outputs which, depending on how the dynamic ranking module 250 is implemented, may be utilized by the scoring module 150 and/or the preference generating module 228 in order to compute different scores and/or to generate different preference rankings, respectively. The dynamic ranking module 250 produces rankings 258a for the certain first user, and rankings 258b for the second user, which are different from each other, as illustrated in FIG. 28b. In FIG. 28b, the rankings 258a include a first ranking corresponding to the time $t_1$, in which experience A is ranked above experience B, however in the rankings 258b the ranking corresponding to the time $t_1$ ranks experience B above the experience A.

In one embodiment, a computer-implemented method for dynamically generating personal rankings of experiences based on affective response of users comprises the following steps: receiving, by a system comprising a processor and memory, measurements of affective response of users to a plurality of experiences comprising first and second experiences; wherein for each experience of the plurality of experiences, the measurements comprise measurements of at least ten of the users who had the experience; receiving a profile of a first user, a profile of a second user, and profiles of the users; wherein the first and second users have different profiles; generating a first output indicative of similarities between the profile of the first user and the profiles of the users, and generating a second output indicative of similarities between the profile of the second user and the profiles of the users; generating, for the first user, a first ranking of the plurality of experiences based on the first output and a subset of the measurements of the users that comprises measurements taken at a time that is at most a certain period before the certain time, and is not after the certain time; and generating, for the second user, a second ranking of the plurality of experiences based on the second output and the subset of the measurements of the users that comprises measurements taken at the time that is at most the certain period before the certain time, and is not after the certain time; wherein according to the first ranking the first experience is ranked above the second experience, and according to the second ranking the second experience is ranked above the first experience.

Figure 29:
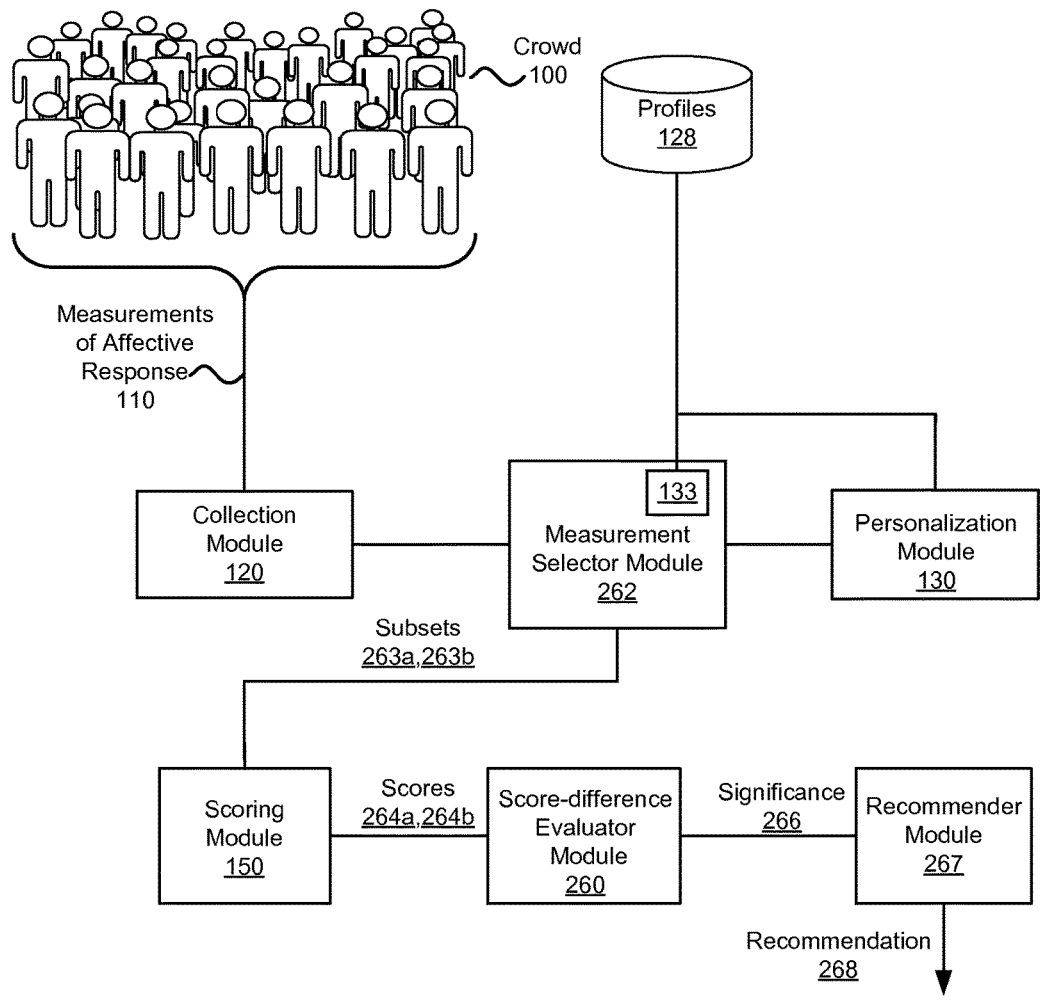
FIG. 29 and FIG. 30 illustrate embodiments in which affective response to experiences may be compared utilizing statistical means.
Figure 30:
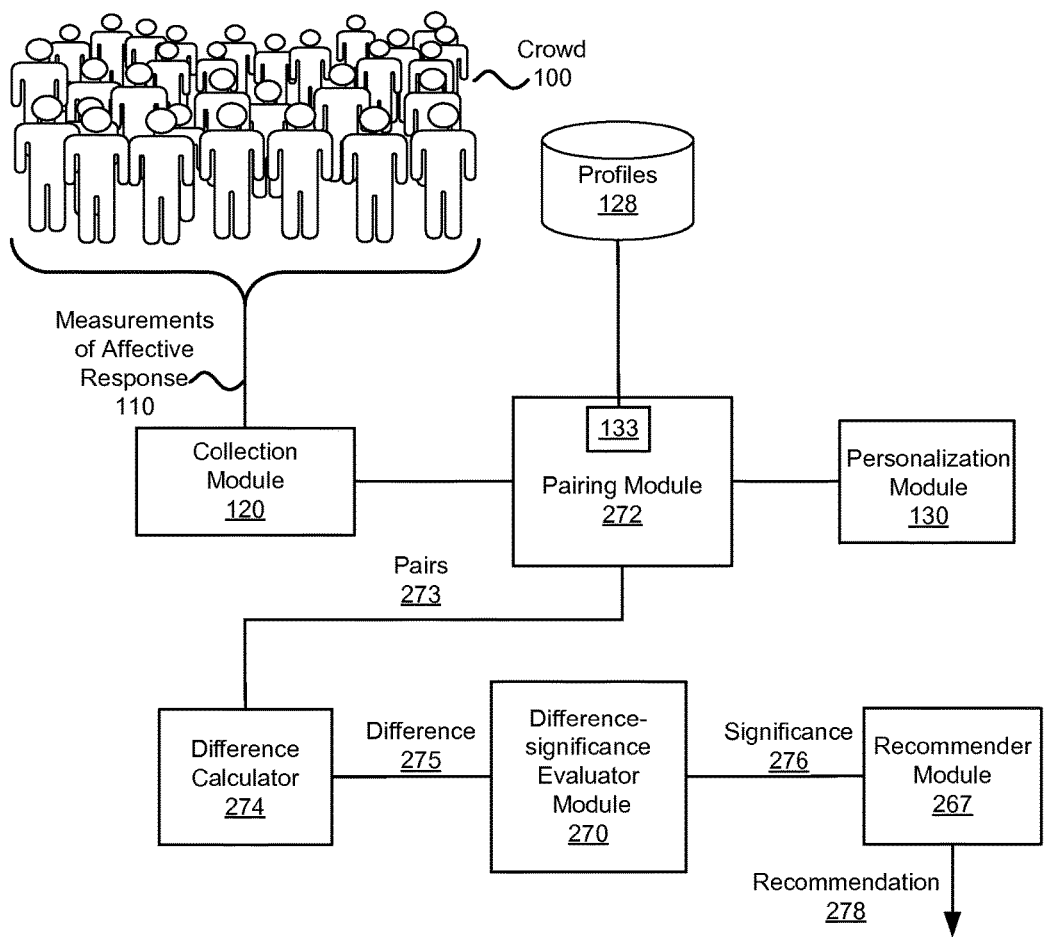

FIG. 29 and FIG. 30 illustrate embodiments in which affective response to experiences may be compared utilizing statistical means. Various statistical means that may be relevant to the system illustrated in these figures are mentioned in further detail in this disclosure at least in Section 10—Determining Significance of Results.

FIG. 29 illustrates one embodiment of a system configured to evaluate significance of a difference between scores for experiences. The system includes at least the collection module 120, a measurement selector module 262, the scoring module 150, and the score-difference evaluator 260.

The collection module 120 is configured to receive measurements 110 of affective response of users that include measurements corresponding to events involving first and second experiences. The measurement selector module 262 is configured to select a first subset 263a of the measurements corresponding to events involving the first experience, and a second subset 263b of the measurements corresponding to events involving the second experience. Optionally, each of the first and second subsets comprises measurements of at least eight users. The scoring module 150 computes a first score 264a for the first experience, based on the first subset 263a, and a second score 264b for the second experience, based on the second subset 263b.

The score-difference evaluator module 260 is configured to determine significance 266 of a difference between the first and second experience scores using a statistical test involving the first and second subsets. In some cases, the significance of the difference between the first and second experience scores depends on the number of users whose measurements are used to compute a score. In one example, the significance 266 of the difference between the first score 264a and the second score 264b reaches a certain level, but on average, a second significance of a difference between a third score computed from a third subset of measurements, and a fourth score computed from a fourth subset of measurements, does not reach the certain level. In this example, the third and fourth subsets are generated by randomly selecting half of the measurements in the first subset 263a and the second subset 263b, respectively.

Determining the significance 266 may be done in various ways. In one embodiment, the statistical test used by the score-difference evaluator module 260 involves a permutation test. Optionally, the significance 266 is based on a p-value corresponding to observing a difference that is at least as large as the difference between the first and second scores (264a and 264b), if the first and second subsets (263a and 263b) are shuffled such that the measurements collected from the first and second subsets are redistributed to those subsets randomly.

In another embodiment, the statistical test comprises a test that determines significance of a hypothesis that supports at least one of the following assumptions: that the first and second subsets (263a and 263b) are sampled from the same underlying distribution, and that a parameter of a first distribution from which the measurements in the first subset 263a are sampled is the same as a parameter of a second distribution from which the measurements in the second subset 263b are sampled. Various approaches may be utilized to determine the significance of the above hypothesis. For example, the significance of the hypothesis may be determined based on at least one of: a nonparametric test that compares between the measurements in the first subset 263a and the measurements in the second subset 263b, and a parametric test that compares between the measurements in the first subset 263a and the measurements in the second subset 263b. Optionally, the parametric test that compares between the measurements in the first subset 263a and the measurements in the second subset 263b determines significance of a hypothesis that the mean of measurements in the first subset is the same as the mean of measurements in the second subset. Optionally, the parametric test is a t-test or a form of Welch's test.

In one embodiment, the first and second subsets of the measurements comprise measurements of at least eight users who had both the first and second experiences. Additionally, for each of the at least eight users who had both experiences, the first subset 263a comprises a first measurement of the user, corresponding to an event in which the user had the first experience, and the second subset 263b comprises a second measurement of the user, corresponding to an event in which the user had the second experience.

In one embodiment, the measurement selector module 262 is configured to receive profiles of the users, from among the profiles 128, and to utilize the profile comparator 133 and the profiles to identify at least eight pairs of events. Each pair of events, from among the eight pairs of events, involves a first event in which a first user had the first experience and a second event in which a second user had the second experience. Additionally, the similarity between a profile of first user and a profile of the second user reaches a predetermined threshold, the first subset 263a comprises a measurement corresponding to the first event, and the second subset 263b comprises a measurement corresponding to the second event. Optionally, each pair of events, of the at least eight pairs of events, involves events with comparable instantiation periods. Optionally, a pair of events has comparable instantiation periods when the pair involves a first event in which a first user had the first experience and a second event in which a second user had the second experience, and the first user had the first experience for a duration that is at least half, and at most double, the duration the second user had the second experience.

In one embodiment, the personalization module 130 may be utilized to compute personalized scores for certain users. Thus, the score-difference evaluator module 260 may determine the significance of a difference between scores for an experience personalized for a certain user. This may lead to scenarios where a difference between scores for two experiences is more significant for a certain first user, than it is for a certain second user.

The significance 266 may be utilized to determine how to treat the scores 264a and 264b. Optionally, if the significance between the two scores is not high enough, the two scores may be treated essentially the same even if one is higher than the other. In one example, a ranking module may rank two experiences with the same rank if the significance of a difference between scores computed for the two experiences does not reach a certain level. In another example, recommendation made for experiences may depend on the significance 266. For example, the recommender module 267, is configured to recommend an experience to a user in a manner that belongs to a set comprising first and second manners. Optionally, when recommending an experience in the first manner, the recommender module provides a stronger recommendation for the experience, compared to a recommendation for the experience that the recommender module provides when recommending in the second manner. In one embodiment, the recommender module is configured to recommend the first and second experiences as follows: when the significance 266 is below a predetermined level, the first and second experiences are both recommend in the second manner; when the significance 266 is not below the predetermined level and the first experience score is greater than the second experience score, the first experience is recommended in the first manner and the second experience is recommended in the second manner; and when the significance 266 is not below the predetermined level and the first experience score is lower than the second experience score, the first experience is recommended in the second manner and the second experience is recommended in the first manner.

FIG. 30 illustrates one embodiment of a system configured to evaluate significance of a difference between measurements of affective response to experiences. The system includes at least the collection module 120, a pairing module 272, a difference calculator 274, and the difference-significance evaluator module 270.

The collection module 120 is configured to receive measurements 110 of affective response of users that include measurements corresponding to events involving first and second experiences. The pairing module 272 is configured to select pairs 273 from among the events; each pair comprises a first event involving a first user who had the first experience and a second event involving a second user who had the second experience. Optionally, the first user and the second user are the same user.

The difference calculator 274 is configured to compute a weighted difference 275, which is a function of differences between a first subset comprising the measurements corresponding to the first events of the pairs and a second subset comprising the measurements corresponding to the second events of the pairs. Optionally, each of the first and second subsets comprises measurements of at least eight users.

The difference-significance evaluator module 270 is configured to determine significance 276 of the weighted difference 275 using a statistical test involving the first and second subsets. In one example, the significance 276 of the weighted difference 275 reaches a certain level, but on average, a second significance of a weighted difference between third and fourth subsets does not reach the certain level. In this example, the third subset comprises the measurements corresponding to the first events of a randomly selected group of half of the pairs 273, and the fourth subset comprises the measurements corresponding to the second events of the randomly selected group of half of the pairs 273.

Determining the significance 266 may be done in various ways. In one embodiment, the statistical test comprises a permutation test. Optionally, the significance 276 is based on a p-value corresponding to observing a weighted difference that is at least as large as the weighted difference if the first and second subsets are shuffled such that the measurements collected from the first and second subsets are redistributed to those subsets randomly.

In another embodiment, the statistical test comprises a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled. Optionally, the significance of the hypothesis is determined based on at least one of: a nonparametric test that compares between the measurements in the first subset and the measurements in the second subset, and a parametric test that compares between the measurements in the first subset and the measurements in the second subset. Optionally, the parametric test that compares between the measurements in the first subset and the measurements in the second subset determines significance of a hypothesis that the mean of measurements in the first subset is the same as the mean of measurements in the second subset.

In one embodiment, the first and second subsets of the measurements comprise measurements of at least eight users who had both the first and second experiences. Additionally, for each of the at least eight users who had both experiences, the first subset comprises a first measurement of the user, corresponding to an event in which the user had the first experience, and the second subset comprises a second measurement of the user, corresponding to an event in which the user had the second experience.

In one embodiment, the pairing module 272 is configured to receive profiles of the users and to utilize the profile comparator 133 and the profiles to identify at least eight pairs of events; each pair of events involves a first event in which a first user had the first experience and a second event in which a second user had the second experience; and wherein the similarity between a profile of first user and a profile of the second user reaches a predetermined threshold, the first subset comprises a measurement corresponding to the first event and the second subset comprises a measurement corresponding to the second event. Optionally, each pair of events, of the at least eight pairs of events, involves events with comparable instantiation periods. Optionally, a pair of events has comparable instantiation periods when the pair involves a first event in which a first user had the first experience and a second event in which a second user had the second experience, and the first user had the first experience for a duration that is at least half, and at most double, the duration the second user had the second experience.

It is to be noted that pairing measurements, e.g., in order to compare between two options such as locations, meals, or products may have an advantage of removing noise from the comparison. Thus, this may enable in some embodiments, the comparison to be more accurate. By selecting pairs of measurements that have similarities (but differ on the aspect being tested), it is likely that the difference between the pairs of measurements is due to the aspect being tested, and not due to other aspects not being considered (since the pairs of measurements are assumed to be similar with respect to the other aspects). Creating pairs of measurements for comparison is often a practice utilized in conjunction with significance determination via tests such as a t-test.

Various embodiments described herein involve presenting crowd-based results that may involve locations. For example, the results may include scores or rankings of experiences that take place at certain location and/or scores or rankings of the locations themselves. In some embodiments, map-displaying module 240 may be utilized to display such crowd-based results on a display.

In one embodiment, the map-displaying module presents on a display information regarding first and second experiences corresponding to first and second location respectively. The map-displaying module presents on a display: a map comprising a description of an environment that comprises first and second locations, and an annotation overlaid on the map indicating at least one of: a first score computed for the first experience, a second score computed for the second experience, a rank of the first experience, and a rank of the second experience.

In one embodiment, a description of the environment comprises one or more of the following: a two-dimensional image representing the environment, a three-dimensional image representing the environment, an augmented reality representation of the environment, and a virtual reality representation of the environment. Optionally, the annotation comprises at least one of the following: images representing the first and second locations, and text identifying the first and second locations. Optionally, the annotation comprises one or more descriptors, each presented at a position on the map. Optionally, each descriptor, from among the one or more descriptors, corresponds to an experience, and is indicative of at least one of the following: the location with which the experience is associated, a type of experience to which the experience belongs, an experience score computed for the experience, a rank of the experience. Optionally, the descriptor comprises at least one of the following: text, an image, a visual effect, a video sequence, an animation, and a hologram.

In one embodiment, a descriptor corresponding to the first experience is located on the map at a position that is closer to a position on the map that corresponds to the first location than it is to a position on the map that corresponds to the second location. Additionally or alternatively, a descriptor corresponding to the first experience is visibly linked to a position on the map that corresponds to the first location.

In one embodiment, the map-displaying module is further configured to present on the display an experience in a manner belonging to a set comprising at least a first manner and a second manner. Optionally, presenting an experience in the first manner comprises one or more of the following: (i) utilizing a larger descriptor to represent the experience, compared to a descriptor utilized when presenting the experience in the second manner; (ii) presenting a descriptor representing the experience for a longer duration on the display, compared to the duration during which a descriptor representing the experience is presented when presenting the experience in the second manner; (iii) utilizing a certain visual effect when presenting a descriptor representing the experience, which is not utilized when presenting a descriptor that represents the experience when presenting the experience in the second manner; and (iv) utilizing a descriptor that comprises certain information related to the experience, which is not comprised in a descriptor that represents the experience when presenting the experience in the second manner. Optionally, the first experience is presented in the first manner and the second experience is presented in the second manner. Optionally, when presenting an experience in the second manner, no descriptor corresponding to the second location is comprised in the annotation.

The affective response to an experience may depend on when a person has it. For example, going on a vacation during a holiday weekend may be less relaxing than going during the week. In another example, a certain area of town may be more pleasant to visit in the evening compared to visiting it in the morning. In some embodiments, measurements of affective response are utilized to learn when to have experiences.

Figure 31A:
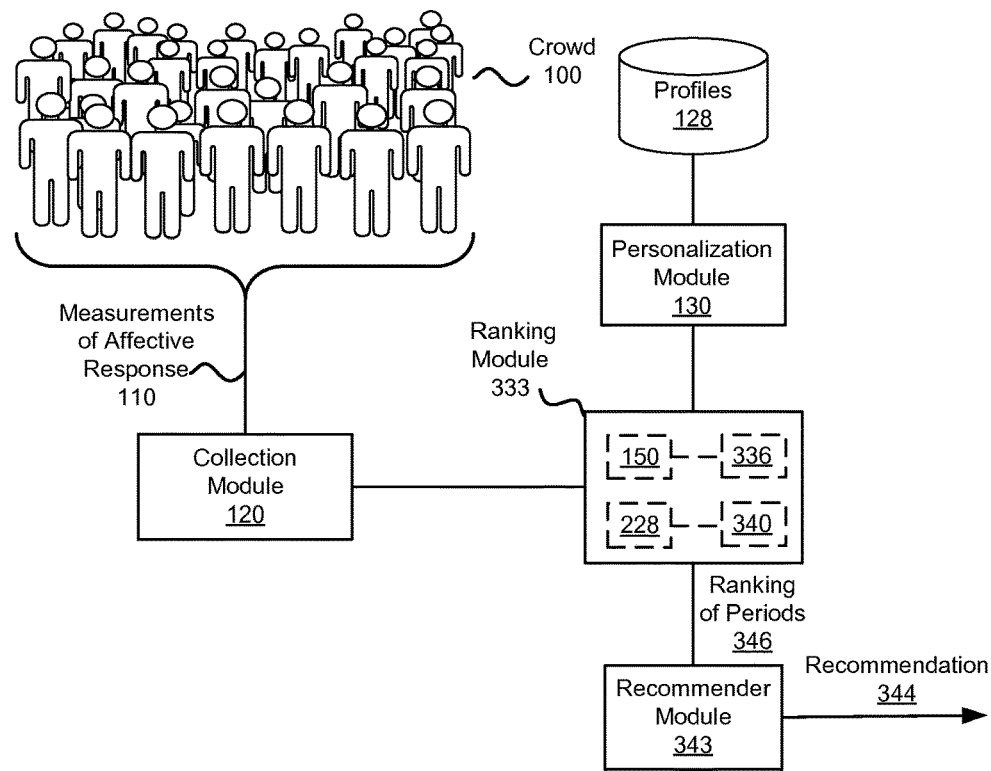
FIG. 31a illustrates one embodiment of a system configured to rank periods during which to have an experience based on measurements of affective response.

FIG. 31a illustrates one embodiment of a system configured to rank periods during which to have an experience based on measurements of affective response. The system includes at least the collection module 120 and a ranking module 333.

The collection module 120 receives measurements 110 of affective response. In this embodiment, the measurements 110 include measurements of affective response of at least ten users, where each user has the experience at some time during a periodic unit of time, and a measurement of the user is taken by a sensor coupled to the user while the user has the experience.

Herein a periodic unit of time is a unit of time that repeats itself regularly. In one example, the periodic unit of time is a day, and each of the at least ten users has the experience during a certain hour of the day. In another example, the periodic unit of time is a week, and each of the at least ten users has the experience during a certain day of the week. In still another example, the periodic unit of time is a year, and each of the at least ten users has the experience during a time that is at least one of the following: a certain month of the year, and a certain holiday that occurs annually.

The ranking module 333 is configured to generate ranking 346 of periods of time to have the experience based on the measurements 110, such that, having the experience during the first portion of the periodic unit of time is ranked above having the experience during the second portion of the periodic unit of time. Additionally, the measurements 110 include measurements of at least five users who had the experience during the first portion, and measurements of at least five users who had the experience during the second portion. Optionally, having the experience during the first portion of the periodic unit of time being ranked above having the experience during the second portion of the periodic unit of time is indicative that, on average, the measurements of the at least five users who have the experience during the first portion are more positive than measurements of the at least five users who have the experience during the second portion. Additionally or alternatively, having the experience during the first portion of the periodic unit of time being ranked above having the experience during the second portion of the periodic unit of time is indicative that, a first score computed based on measurements of the at least five users who had the experience during the first portion is greater than a second score computed based on the measurements of the at least five users who had the experience during the second portion.

In one embodiment, the ranking module 333 is configured to rank the periods using a score-based approach and comprises the scoring module 150, which computes scores for the experience, which correspond to portions of the periodic unit of time. A score corresponding to a certain portion of the periodic unit of time is computed based on the measurements of the at least five users who had the experience during the certain portion of the periodic unit of time. Additionally, in this embodiment, the ranking module 333 comprises score-based rank determining module 336, which is configured to rank periods of the periodic unit of time in which to have the experience based on their respective scores, such that a period with a higher score is ranked ahead of a period with a lower score.

In one embodiment, the ranking module 333 is configured to rank the periods using a preference-based approach and comprises the preference generator module 228 which is configured to generate a plurality of preference rankings, with each preference ranking being indicative of ranks of at least two portions of the periodic unit of time during which to have the experience. For each preference ranking, at least one portion, of the at least two portions, is ranked above another portion of the at least two portions. Additionally, each preference ranking is determined based on a subset of the measurements 110 comprising a measurement of a first user who has the experience during the one portion and a measurement of a second user who has the experience during the other portion. Optionally, the first user and the second user are the same. Optionally, the first user and the second user have similar profiles, as determined based on a comparison performed by the profile comparator 133. Additionally, in this embodiment, the ranking module 333 includes preference-based rank determining module 340 which is configured to rank periods to have the experience based on the plurality of the preference rankings utilizing a method that satisfies the Condorcet criterion. The ranking of periods by the preference-based rank determining module 340 is such that a certain period, which in a pair-wise comparison with other periods is preferred over each of the other periods, is not ranked below of any of the other periods. Optionally, the certain experience is ranked above each of the other periods.

In one embodiment, the system illustrated in FIG. 31a includes the personalization module 130 which is configured to receive a profile of a certain user and profiles of users belonging to a set comprising at least five users who have the experience during the first portion and at least five users who have the experience during the second portion, and to generate an output indicative of similarities between the profile of the certain user and the profiles of the users from the set of users. The ranking module 333 is further configured to rank the periods to have the experience based on the output. For at least a certain first user and a certain second user, who have different profiles, the ranking module ranks times to have the experience differently, such that for the certain first user, having the experience during the first portion of the periodic unit of time is ranked above having the experience during the second portion of the periodic unit of time, and for the certain second user, having the experience during the second portion of the periodic unit of time is ranked above having the experience during the first portion of the periodic unit of time.

Figure 31B:
FIG. 31b illustrates a user interface which displays a ranking and recommendation based on the ranking.

In one embodiment, the ranking 346 is provided to recommender module 343 that forwards a recommendation to a user to have the experience in the first portion of the periodic unit of time. FIG. 31b illustrates a user interface which displays the ranking 346 and the recommendation 344 based on the ranking. In this illustration, the periodic unit of time is a year, and portions of the periodic unit of time correspond to months in the year. The experience at hand is a visit to Paris.

Herein an aftereffect may refer to a residual emotional response a user has after having an experience. For example, an aftereffect of a vacation may be how a user feels one week after coming back from the vacation (e.g., was the vacation relaxing and did it enable the user to "recharge batteries"). In another example, an aftereffect of interacting with a service provider reflects how a user feels after the interaction is over (e.g., is the user satisfied or is the user upset even though the service provider is not in sight?).

Some embodiments described herein involve measurement of aftereffects to various experiences such as visiting a location for a certain duration. Other embodiments described herein involve measurement of aftereffects to various experiences such as interacting with a service provider. Other embodiments described herein involve measurement of aftereffects to various experiences such as utilizing a product. Other embodiments described herein involve measurement of aftereffects to various experiences such as consuming a substance (e.g., eating a food item).

Some embodiments described herein involve the comparison of aftereffects to consuming food (also referred to herein as a "food item"). Herein, food may include one or more items from a set comprising edible items, beverages, snacks, and meals. For example, a food may be one or more of the following: an apple, a chicken nugget, a sandwich, a bag of chips, a cup of coffee, a cocktail, a happy meal, a burrito, a full course meal, and an item on a menu at a restaurant. Optionally, consuming the food may be done by eating and/or drinking it. In some embodiments, an aftereffect to consuming food may correspond to an affective response to the food. For example, an aftereffect to food may correspond to the level of alertness of a user who consumed the food. Thus, according to this example, a system may rank beverages based on the level of alertness of users that consume them. For instance, in this example the beverages may be energy drinks and/or caffeinated drinks. Additionally or alternatively, the system may determine the difference between the levels of alertness to consuming the two beverages (and/or determine the significance of the difference). Additionally or alternatively, the system may compare the alertness level at different times after consuming a beverage. Additionally or alternatively, the system may determine a time-dependent trend of the alertness level after consuming a beverage. In another example, an aftereffect to food may correspond to the level of comfort of a user who consumed the food. Thus, according to this example, a system may rank food items based on the level of comfort of users that consume them. For example, a ranking of food items may indicate whether the users are content with a certain food item, or does it cause them to suffer from indigestion, gas, heartburn, and/or other food-related problems. In this example the food may be dishes served at a restaurant. Additionally or alternatively, the system may determine the difference between the levels of comfort to consuming the two dishes (and/or determine the significance of the difference). Additionally or alternatively, the system may compare the comfort level at different times after consuming a dish. Additionally or alternatively, the system may determine a time-dependent trend of the comfort level after consuming a dish.

One way in which aftereffects may be determined is by measuring users before and after they finish having an experience, in order to assess how the experience changed their affective response. Such measurements are referred to as prior and subsequent measurements. Optionally, a prior measurement may be taken before having an experience (e.g., before leaving to go on a vacation) and a subsequent measurement is taken after having the experience (e.g., after returning from it). Typically, a difference between a subsequent measurement and a prior measurement, of a user who had an experience, is indicative of an aftereffect of the experience on the user. In the example with the vacation, the aftereffect may indicate how relaxing the vacation was for the user. In some cases, the prior measurement may be taken while the user has the experience.

Figure 32:
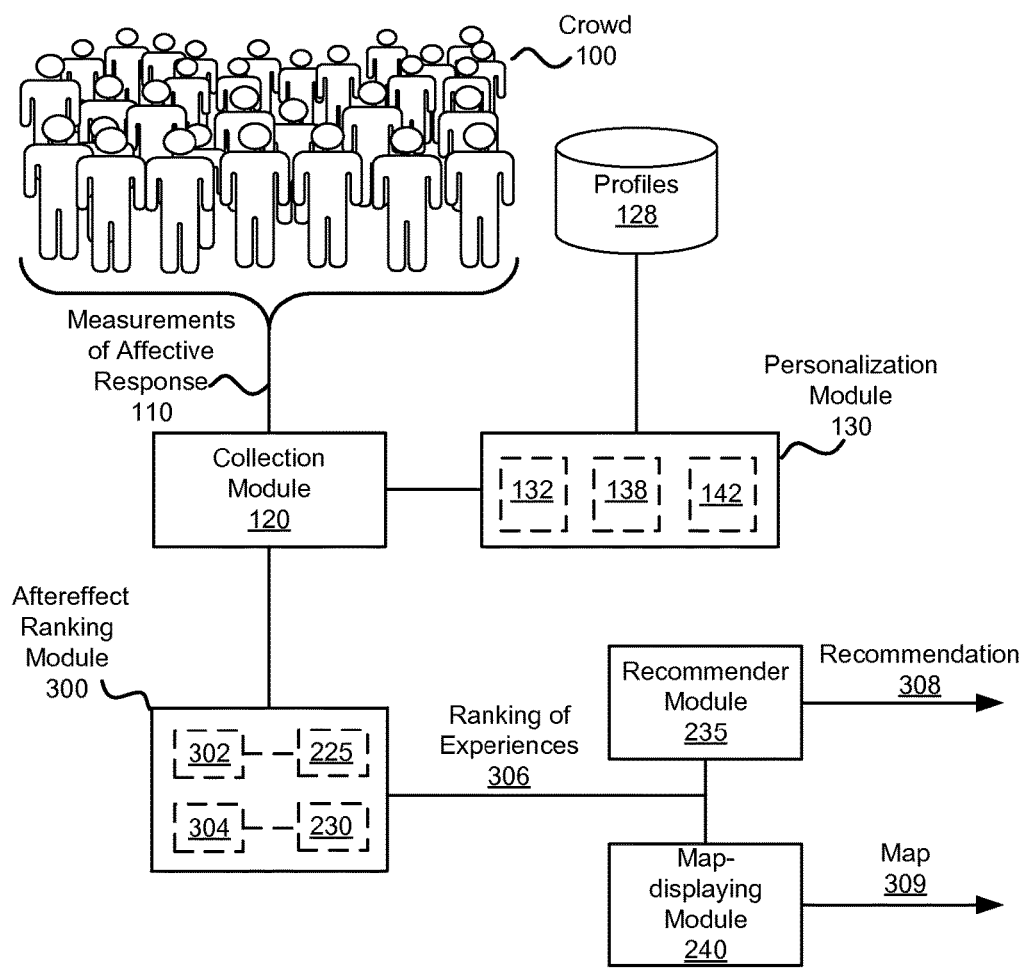
FIG. 32 illustrates one embodiment of a system configured to rank experiences based on aftereffects determined from measurements of affective response of users.

FIG. 32 illustrates one embodiment of a system configured to rank experiences based on aftereffects determined from measurements of affective response of users. The system includes at least the collection module 120 and an aftereffect ranking module 300.

The collection module 120 is configured to receive the measurements 110 of affective response of users to experiences. In this embodiment, the measurements comprise, for each experience from among the experiences, prior and subsequent measurements of at least five users who had the experience. A prior measurement of a user is taken before the user finishes having the experience, and a subsequent measurement of the user is taken at least ten minutes after the user finishes having the experience. Optionally, the prior measurement is taken before the user starts having the experience. Optionally, the subsequent measurement is taken less than one day after the user finished having the experience, and before the user has an additional experience of the same type.

The aftereffect ranking module 300 is configured to generate a ranking 306 of the experiences based on the measurements, such that, for at least first and second experiences from among the experiences, the aftereffect of the first experience is greater than the aftereffect of the second experience, and the first experience is ranked above the second experience. Optionally, having the first experience being ranked above the second experience is indicative that, on average, a difference between the subsequent measurements and the prior measurements of the at least five users who had the first experience is greater than a difference between the subsequent and the prior measurements of the at least five users who had the second experience. Optionally, having the first experience being ranked above the second experience is indicative that, a first aftereffect score computed based on the prior and subsequent measurements of the at least five users who had the first experience is greater than a second aftereffect score computed based on the prior and subsequent measurements of the at least five users who had the second experience.

In one embodiment, the aftereffect ranking module 300 is configured to rank experiences using a score-based approach. In this embodiment, the aftereffect ranking module 300 comprises aftereffect scoring module 302, which is configured to compute aftereffect scores for the experiences. An aftereffect score for an experience is computed based on prior and subsequent measurements of the at least five users who had the experience. Additionally, the aftereffect ranking module 300 includes the score-based rank determining module 225, which is configured to rank the experiences based on their respective aftereffect scores such that an experience with a higher aftereffect score is not ranked lower than an experience with a lower aftereffect score, and the first experience has a higher corresponding aftereffect score than the second experience.

In another embodiment, the aftereffect ranking module 300 is configured to rank experiences using a preference-based approach. In this embodiment, the aftereffect ranking module 300 comprises a preference generator module 304 that is configured to generate a plurality of preference rankings. Each preference ranking is indicative of ranks of at least two of the experiences, such that one experience, of the at least two experiences, is ranked above another experience of the at least two experiences. Additionally, each preference ranking is determined based on a subset comprising at least a pair of prior and subsequent measurements of a user who had the one experience and at least a pair of prior and subsequent measurements of a user who had the other experience. Optionally, a majority of the measurements comprised in each subset of the measurements that is used to generate a preference ranking are prior and subsequent measurements of a single user. Optionally, all of the measurements comprised in each subset of the measurements that is used to generate a preference ranking are prior and subsequent measurements of a single user. Optionally, a majority of the measurements comprised in each subset of the measurements that is used to generate a preference ranking are prior and subsequent measurements of similar users as determined based on the profile comparator 133. Additionally, the aftereffect ranking module 300 comprises the preference-based rank determining module 230, which is configured to rank the experiences based on the plurality of the preference rankings utilizing a method that satisfies the Condorcet criterion. The ranking of experiences by the preference-based rank determining module 230 is such that a certain experience, which in a pair-wise comparison with other experiences is preferred over each of the other experiences, is not ranked below of any of the other experiences. Optionally, the certain experience is ranked above each of the other experiences.

In one embodiment, the recommender module 235 utilizes the ranking 306 to make recommendation 308 in which the first experience is recommended in a first manner (which involves a stronger recommendation than a recommendation made by the recommender module when making a recommendation in the second manner).

In one embodiment, the first and second experiences correspond to first and second locations. For example, the first and second experiences involve visiting the first and second locations, respectively. In this embodiment, the map-displaying module is configured to present a result obtained from the ranking 306 on a map that includes annotations of the first and second locations, and an indication that the first location has a higher aftereffect score than the second location.

Figure 33A:
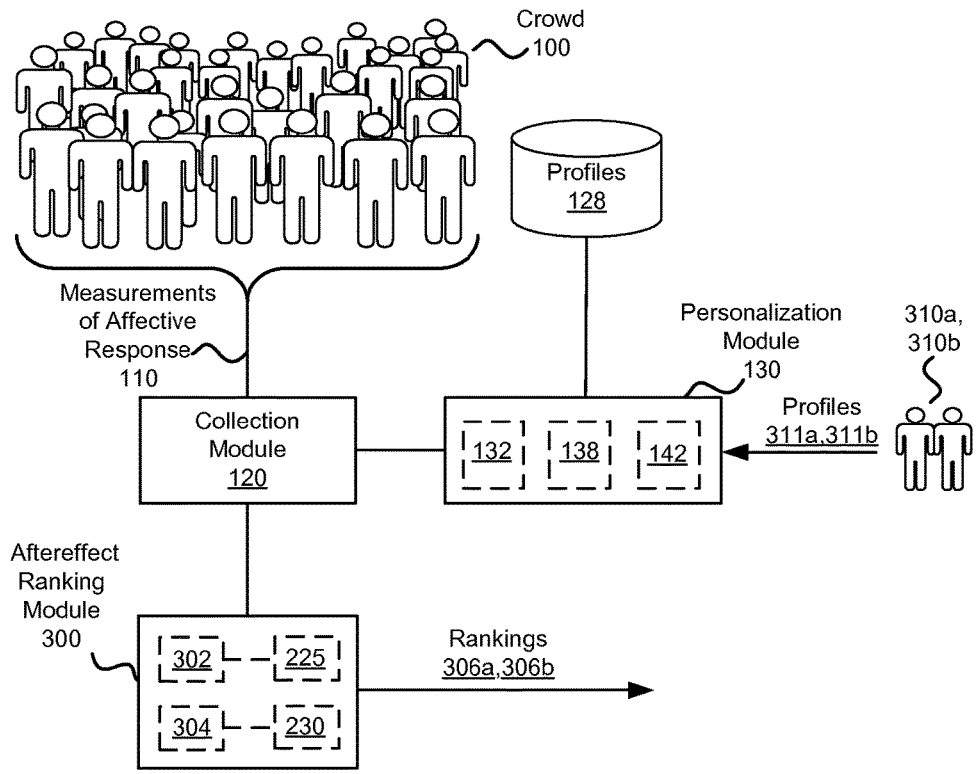
FIG. 33a and FIG. 33b illustrate how output generated by the personalization module, when it receives profiles of certain users, may be used to produce different rankings of experiences for different users.
Figure 33B:
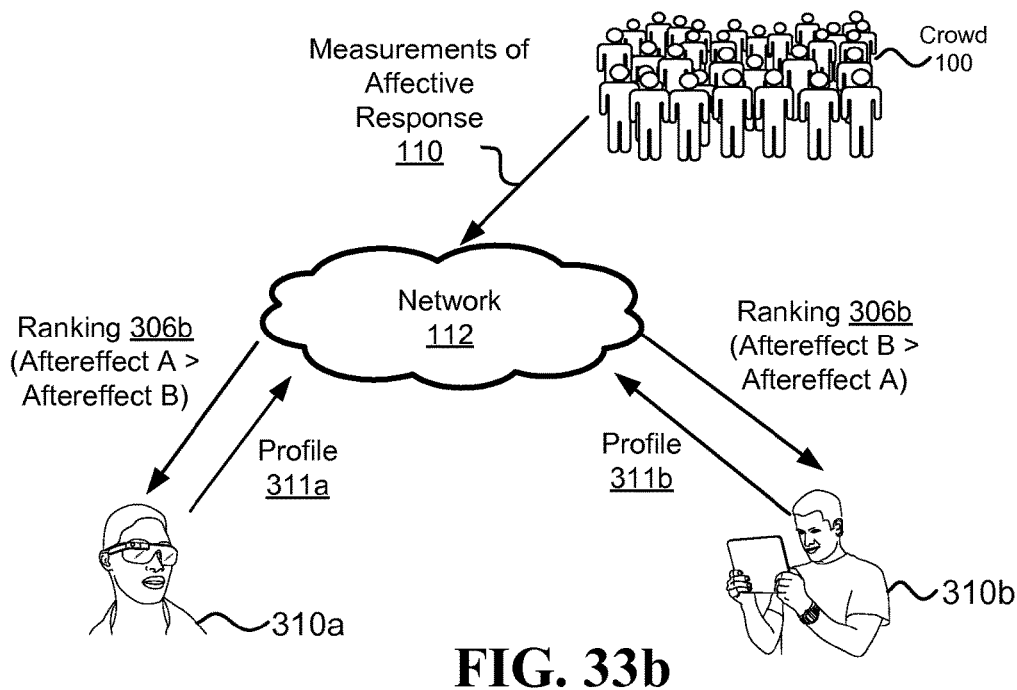

In some embodiments, the personalization module 130 may be utilized in order to generate personalized rankings of experiences based on their aftereffects. FIG. 33a and FIG. 33b illustrate how the output generated by the personalization module when it receives profiles of certain users can enable the system illustrated in FIG. 32 to produce different rankings for different users. A certain first user 310a and a certain second user 310b have corresponding profiles 311a and 311b, which are different from each other. The personalization module 130 produces different outputs based on the profiles 311a and 311b. Consequently, the aftereffect ranking module 300 generates different rankings 306a and 306b for the certain first user 310a and the certain second user 310b, respectively. Optionally, in the ranking 306a, the first experience (A) has a higher aftereffect than the second experience (B), and in the ranking 306b, it is the other way around.

Figure 34:
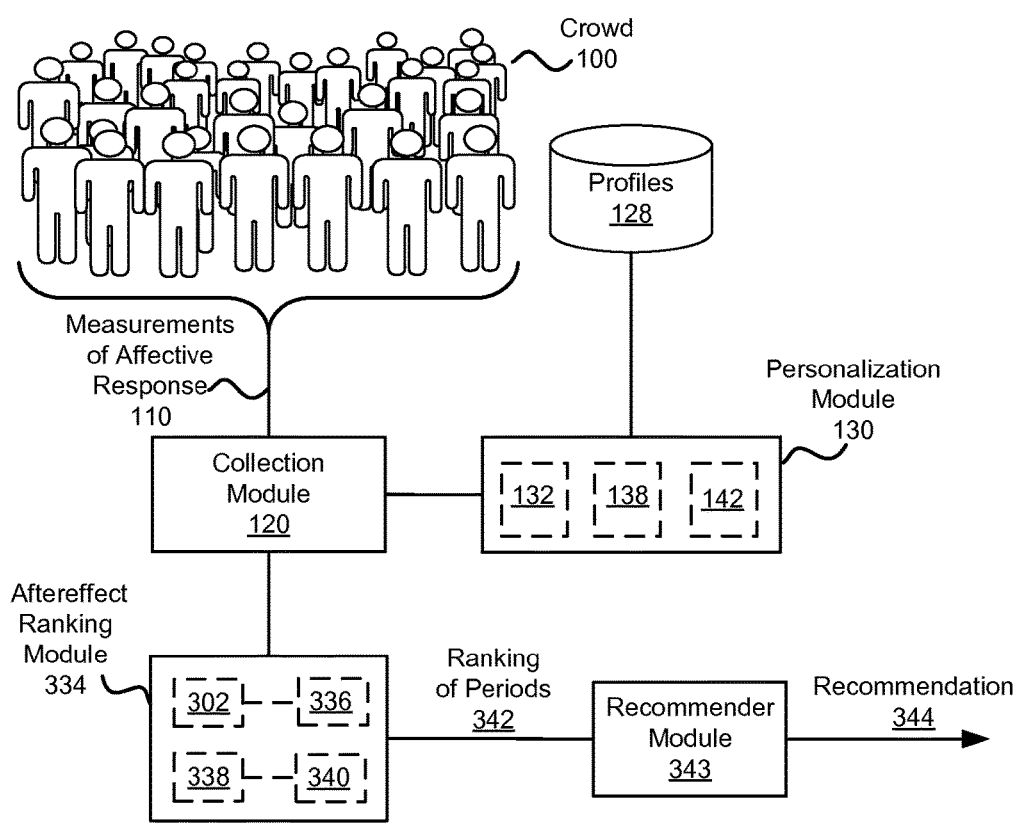
FIG. 34 illustrates one embodiment of a system configured to rank periods to have an experience based on expected aftereffect values.

FIG. 34 illustrates one embodiment of a system configured to rank periods to have an experience based on expected aftereffect values. The system includes at least the collection module 120 and aftereffect ranking module 334.

The collection module 120 receives measurements 110 of affective response. In this embodiment, the measurements 110 include prior and subsequent measurements of affective response of at least ten users, where each user has the experience at some time during a periodic unit of time. A prior measurement is taken before the user finishes having the experience, and a subsequent measurement taken at least ten minutes after the user finishes having the experience. Optionally, the prior measurement is taken before the user starts having the experience. Optionally, a difference between a subsequent measurement and a prior measurement of a user who had the experience is indicative of an aftereffect of the experience on the user. In this embodiment, measurements 110 comprise prior and subsequent measurements of at least five users who have the experience during a first portion of the periodic unit of time and prior and subsequent measurements of at least five users who have the experience during a second portion of the periodic unit of time that is different from the first period.

In one example, the periodic unit of time is a day, and each of the at least ten users has the experience during a certain hour of the day. In another example, the periodic unit of time is a week, and each of the at least ten users has the experience during a certain day of the week. In still another example, the periodic unit of time is a year, and each of the at least ten users has the experience during a time that is at least one of the following: a certain month of the year, and a certain holiday that occurs annually.

The aftereffect ranking module 334 is configured to generate ranking 342 of periods of time to have the experience based on aftereffects indicated by the measurements 110, such that, having the experience during the first portion of the periodic unit of time is ranked above having the experience during the second portion of the periodic unit of time. Optionally, having the experience during the first portion of the periodic unit of time being ranked above having the experience during the second portion of the periodic unit of time is indicative that, on average, a difference between the subsequent measurements and the prior measurements of the at least five users who have the experience during the first portion is greater than a difference between the subsequent and the prior measurements of the at least five users who have the experience during the second portion. Optionally, having the experience during the first portion of the periodic unit of time being ranked above having the experience during the second portion of the periodic unit of time is indicative that, a first aftereffect score computed based on the prior and subsequent measurements of the at least five users who have the experience during the first portion is greater than a second aftereffect score computed based on the prior and subsequent measurements of the at least five users who have the experience during the second portion.

In one embodiment, the aftereffect ranking module 334 is configured to rank the periods using a score-based approach and comprises the aftereffect scoring module 302, which is configured to compute aftereffect scores for the experience, with each score corresponding to a portion of the periodic unit of time. Each aftereffect score corresponding to a certain portion of the periodic unit of time is computed based on prior and subsequent measurements of the at least five users who have the experience during the certain portion of the periodic unit of time. Additionally, the aftereffect ranking module 300 includes the score-based rank determining module 336, which is configured to rank periods to have the experience based on their respective aftereffect scores, such that a period with a higher aftereffect score is not ranked lower than a period with a lower aftereffect score, and the period corresponding to the first portion of the periodic unit of time has a higher corresponding aftereffect score than the period corresponding to the second portion of the periodic unit of time.

In another embodiment, the aftereffect ranking module 334 is configured to rank the periods using a preference-based approach. In this embodiment, the aftereffect ranking module 334 comprises a preference generator module 338 that is configured to generate a plurality of preference rankings. Each preference ranking is indicative of ranks of at least two portions of the periodic unit of time during which to have the experience, such that one portion, of the at least two portions, is ranked above another portion of the at least two portions. The preference ranking is determined based on a subset comprising at least a pair of prior and subsequent measurements of a user who has the experience during the one portion and at least a pair of prior and subsequent measurements of a user who has the experience during the other portion. Optionally, all of the measurements comprised in each subset of the measurements that is used to generate a preference ranking are prior and subsequent measurements of a single user. Optionally, a majority of the measurements comprised in each subset of the measurements that is used to generate a preference ranking are prior and subsequent measurements of similar users as determined based on the profile comparator 133. Additionally, the aftereffect ranking module 334 comprises a preference-based rank determining module 340 that is configured to rank periods of time to have the experience based on the plurality of the preference rankings utilizing a method that satisfies the Condorcet criterion. The ranking of periods of time by the preference-based rank determining module 230 is such that a certain portion of the periodic unit of time, which in a pair-wise comparison with other portions of the periodic unit of time is preferred over each of the other portions, is not ranked below of any of the other portions. Optionally, the certain portion of the periodic unit of time is ranked above each of the other portions.

In some embodiments, the personalization module 130 may be utilized in order to generate personalized rankings of periods to have the experience based on their aftereffects. Optionally, the aftereffect ranking module 334 is configured to rank the periods to have the experience based on an output generated by the personalization module. For at least some of the users, personalized rankings generated based on their profiles are different. In particular, for at least a certain first user and a certain second user, who have different profiles, the aftereffect ranking module 334 ranks times to have the experience differently, such that for the certain first user, having the experience during the first portion of the periodic unit of time is ranked above having the experience during the second portion of the periodic unit of time. For the certain second user it is the other way around, having the experience during the second portion of the periodic unit of time is ranked above having the experience during the first portion of the periodic unit of time.

In one embodiment, the recommender module 343 utilizes the ranking 342 to make recommendation 344 in which the first period is recommended in a first manner (which involves a stronger recommendation than a recommendation made by the recommender module when making a recommendation in the second manner).

Some embodiments in this disclosure involve functions of affective response that are learned based on measurements of affective response. These functions typically describe a relationship between affective response related to an experience and a parametric value. In one example, the affective response related to experience may be the affective response of users to the experience. In another example, the affective response related to the experience may be an aftereffect of the experience.

In embodiments described herein various types of parameters may be utilized for generating functions of affective response. In one example, the function may be a temporal one involving a duration. Thus, a function of affective response may describe a relationship between expected affective response of to an experience and the duration one has the experience. Another temporal parameters may be related to the duration after an experience. For example, another function may describe a relationship between the time that has elapsed since having an experience and the extent of the aftereffect of the experience. In one example, a parameter of a function may correspond to a period during which an experience is experienced (e.g., the time of day, day of the week, etc.). In another example, a parameter of a function may relate to the extent an experience has been previously experienced. In yet another example, the parameter may describe an environmental parameter (e.g., temperature); thus a function may describe the relationship between the temperature outside and how much people enjoy having certain experiences (for different temperatures).

Functions whose parameters are learned based on measurements of affective response may be considered to be in the form $f(x)=y$, where y is an affective value (e.g., corresponding to a score for an experience), and x is a parameter upon which the score may depend (e.g., one of the parameters mentioned above). In one example, "x" represents a duration of having an experience, thus the function $f(x)=y$ may represent affective response to an experience as a function of how long people have the experience.

It is to be noted that in the following discussion, "x" and "y" are used in their common mathematical notation roles. In descriptions of embodiments elsewhere in this disclosure, other notation may be used. Continuing the example given above, the "x" values may be replaced with "$\Delta t$" (e.g., to represent a duration of time), and the "y" values may be replaced with "v" (e.g., to represent an affective value).

Typically, a function of the form $f(x)=y$ is capable of providing values of y for at least two different values of the x in the function. Each function of the form $f(x)=y$ that is learned based on measurements of affective response may be characterized by one or more function parameters that may be utilized to describe the function. The function may not necessarily describe correspond y values) to all, or even many, parameter values; however, in this disclosure it is assumed that a function that is learned from measurements of affective response describes functions values for at least two different parameter values. For example, with a representation of functions as a (possibly infinite) set of pairs of the form (x,y), functions described in this disclosure are represented by at least to pairs two pairs $(x_1,y_1)$ and $(x_2,y_2)$, such that $x_1 \neq x_2$. Optionally, some functions in this disclosure may be assumed to be non-constant; in such a case, an additional assumption may be made that also $y_1 \neq y_2$.

It is to be noted that the functions learned based on measurements of affective response are not limited to functions of a single dimensional input. In some embodiments, the functions may involve multidimensional inputs.

Learning a function based on measurements of affective response may be done in this disclosure by a function learning module. Optionally, the data provided to the function learning module comprises pairs of training points of the form (x,y), where y is derived from a measurement of affective response and x is the corresponding value of the parameter upon which the function depends (e.g., x may be a duration of the experience to which the measurement corresponds). Since the data for the function learning module in embodiments described herein typically comes from multiple users, the function that is learned may be considered a crowd-based result.

Figure 36A:
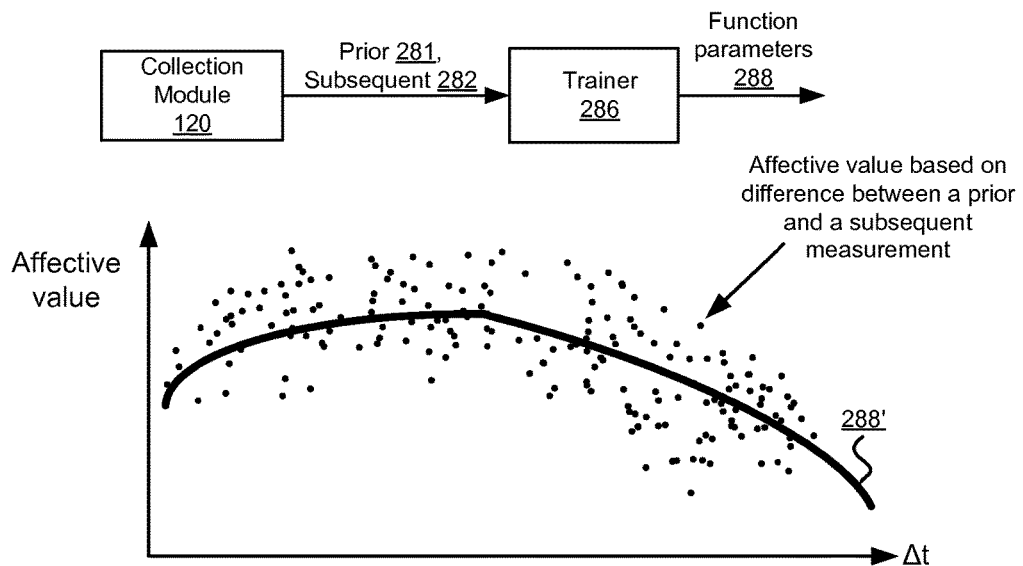
FIG. 36a illustrates one embodiment in which the machine learning-based trainer module is utilized to learn a function representing an expected aftereffect of an experience.

In some embodiments, the function learning module utilizes an algorithm for training a predictor to learn the parameters of a function of the form f(x)=y. Learning such parameters is typically performed by machine learning-based trainer 286, which typically utilizes a training algorithm to train a model for a machine learning-based predictor used predicts values of the function for different values of the input parameter ("x"). Section 8—Predictors and Emotional State Estimators, includes additional information regarding various approaches known in the art that may be utilized to train a machine learning-based predictor to compute a function of the form f(x)=y. Some examples of predictors that may be used include regression models, neural networks, nearest neighbor predictors, support vector machines for regression, and/or decision trees. FIG. 36a illustrates one embodiment in which the machine learning-based trainer 286 is utilized to learn a function representing an expected aftereffect of an experience after different periods of time have elapsed since the experience ended. Machine learning-based trainer 286 receives the prior measurements 281 and subsequent measurements 282 (and/or a result computed based on the difference between prior measurements and subsequent measurements). The output of the machine learning-based trainer 286 are function parameters 288 (which are illustrated by the function curve 288' they describe). Machine learning-based trainer 286 is utilized is a similar fashion in other embodiments in this disclosure that involve learning other types of functions (with possibly other types of input data).

In some embodiments, some of the measurements of affective response used to train the model may have associated weights (e.g., due to weighting based on the age of the measurements and/or weights from an output of the personalization module 130). Learning a function when the training data is weighted is commonly known in the art, and the machine learning-based trainer 286 may be easily configured to handle such data if needed.

In other embodiments, the function learning module may utilize a binning approach, in which measurements are placed in bins based on their corresponding values, and the value y corresponding to measurements in the bin is typically a score computed based on the measurements in the bin, e.g., an experience score. Placing measurements into bins is typically done by a binning module, which examines a value associated with a measurement and places it based on that value in one or more bins. For example, a binning module may place measurements into one hour bins representing the (rounded) hour during which they were taken. It is to be noted that, in some embodiments, multiple measurements may have the same associated parameter value and be placed in a bin together. For example, a set comprising a prior and a subsequent measurement may be placed in a bin based on a single associated value (e.g., when used to compute an aftereffect the single value may be the time that had elapsed since having an experience).

The number of bins in which measurements are placed may vary between embodiments. However, typically the number of bins is at least two. Additionally, bins need not have the same size. In some embodiments, bins may have different sizes (e.g., a first bin may correspond to a period of one hour, while a second bin may correspond to a period of two hours).

In some embodiments, different bins may overlap, thus they may each include measurements with similar or even identical corresponding parameters values ("x" values). In other embodiments, bin do not overlap. Optionally, the different bins in which measurements may be placed may represent a partition of the space of values of the parameters (i.e., a partitioning of possible "x" values).

Figure 36B:
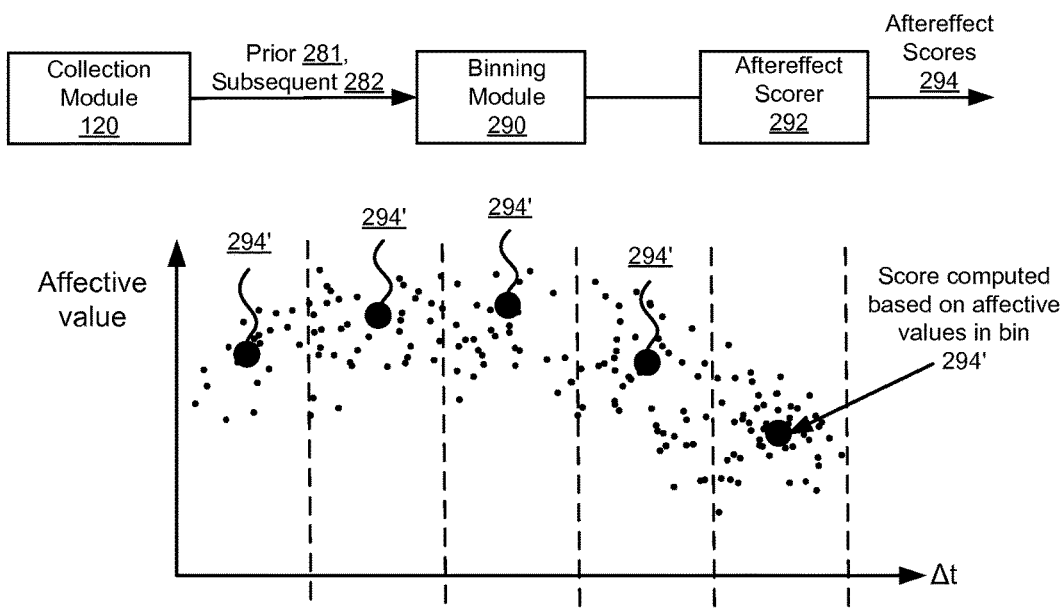
FIG. 36b illustrates one embodiment in which the binning module and aftereffect scoring module are utilized to separate measurements of affective response into bins in order to compute aftereffect scores.

FIG. 36b illustrates one embodiment in which the binning module 290 and aftereffect scoring module 292 are utilized to separate measurements of affective response into bins in order to compute aftereffect scores 294, where each bin's score 294' is computed based on the measurements in the bin.

In embodiments described herein, boundaries of bins and/or scores computed for the bins are also considered function parameters since they may be utilized by a function to provide a value for a new input (by determining to which bin it should belong and returning a function value based on the score corresponding to that bin).

In some embodiments, some of the measurements of affective response used to compute scores for bins may have associated weights (e.g., due to weighting based on the age of the measurements and/or weights from an output of the personalization module 130). Scoring modules described in this embodiment are capable of utilizing such score when computing scores for bins.

In some embodiments, a function whose parameters are learned by a function learning module may be displayed on a display 252 configured to render a representation of the function. For example, the function may be rendered as a graph, plot, and/or any other image that represents values given by the function and/or parameters of the function. Optionally, when presenting personalize functions $F_1$ and $F_2$ to different users, a rendered representation of the function $F_1$ that is forwarded to a certain first user is different from a rendered representation of the function $F_2$ that is forwarded to a certain second user.

In some embodiments, function comparator module 284 may receive two or more descriptions of functions and generate a comparison between the two or more functions. In one embodiment, a description of a function may include one or more values of parameters that describe the function, such as parameters of the function that were learned by the machine learning-based trainer 286. For example, the description of the function may include values of regression coefficients used by the function. In another embodiment, a description of a function may include one or more values of the function for certain input parameters and/or statistics regarding values the function gives to certain input parameters. In one example, the description of the function may include values such as pairs of the form (x,y) representing the function. In another example, the description may include statistics such as the average value y the function gives for certain ranges of x.

The function comparator module 284 may evaluate and optionally report various aspects of the functions. In one embodiment, the function comparator may indicate which function has a higher (or lower) value within a certain range and/or which function has a higher (or lower) integral value over the certain range. Optionally, the certain range may include parameter values up to a certain x value, it may include parameter values from a certain value x and on, and/or include parameter values within specified boundaries (e.g., between certain parameter values $x_1$ and $x_2$).

Figure 35A:
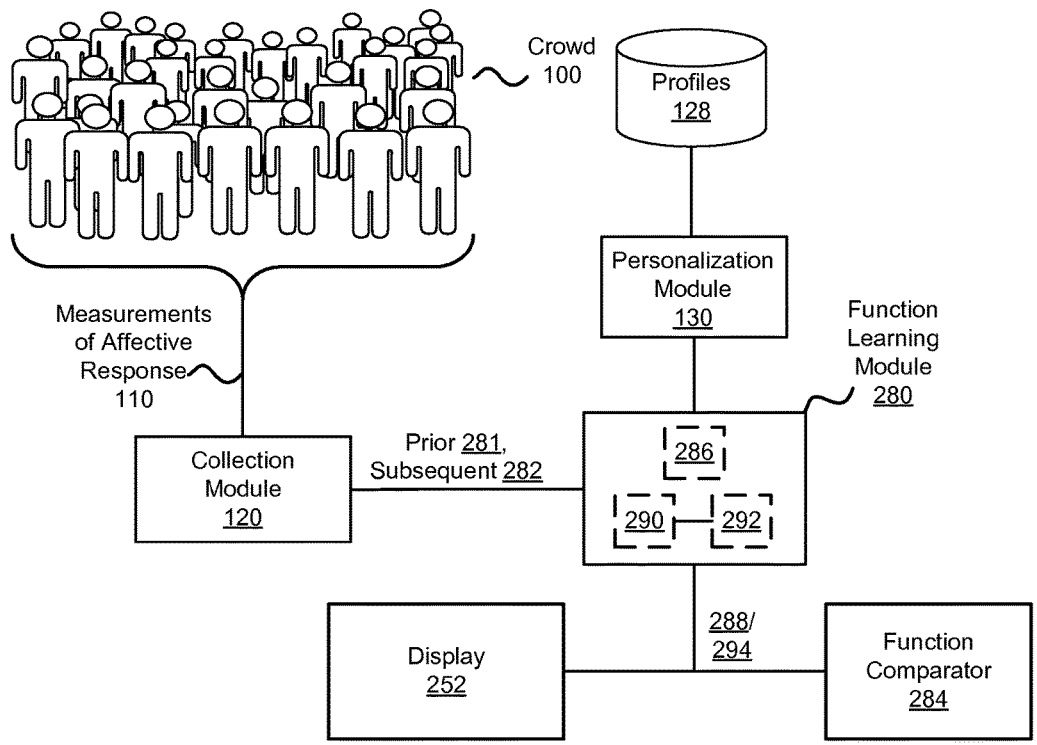
FIG. 35a illustrates one embodiment of a system configured to learn a function of an aftereffect of an experience.

FIG. 35a illustrates one embodiment of a system configured to learn a function of an aftereffect of an experience. The system includes at least collection module 120 and function learning module 280.

The collection module 120 is configured to receive measurements 110 of affective response of users. The measurements 110 are taken utilizing sensors coupled to the users. In this embodiment, the measurements include prior and subsequent measurements of at least ten users who had the experience. A prior measurement of a user is taken before the user finishes the experience, and a subsequent measurement of the user is taken after elapsing of a duration of at least ten minutes after the user finishes the experience. Optionally, the prior measurement of the user is taken before the user starts having the experience. Optionally, the measurements comprise multiple subsequent measurements of a user who had the experience, taken at different times after the user had the experience.

Figure 35B:
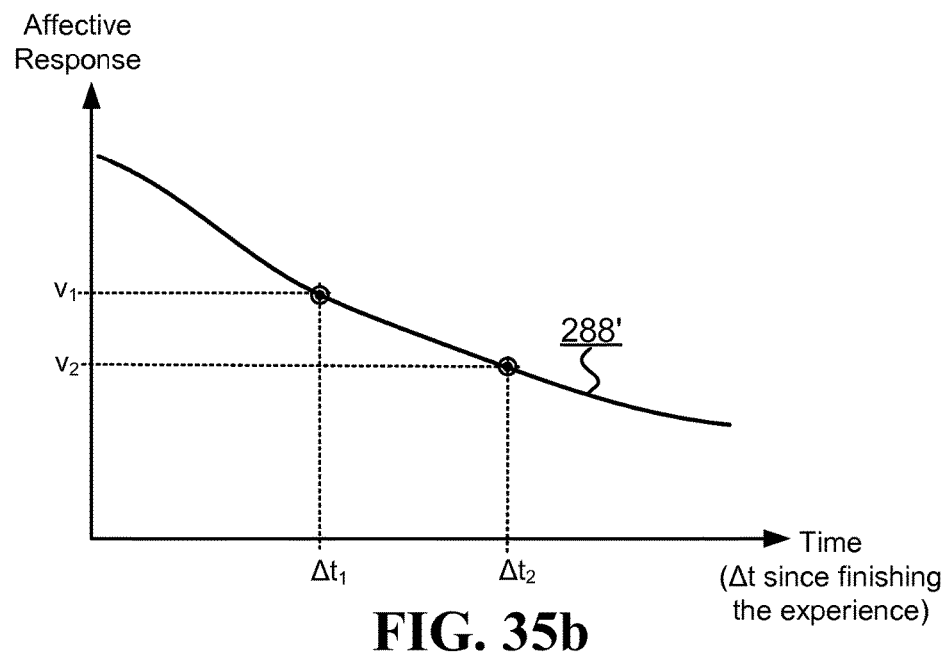
FIG. 35b illustrates an example of an aftereffect function.

The function learning module 280 is configured to utilize the prior and subsequent measurements to learn an aftereffect function that describes values of expected affective response after different durations since finishing the experience (the function may be represented by a model comprising parameters 288 and/or aftereffect scores 294, described below). FIG. 35b illustrates an example of an aftereffect function learned by the function learning module 280. The function is depicted as a graph of the function curve 288', which is indicative of values of the function at points of time representing a value of the aftereffect at different durations since finishing the experience. Optionally, an aftereffect function learned by the function learning module is at least indicative of values $v_1$ and $v_2$ of expected affective response after durations $\Delta t_1$ and $\Delta t_2$ since finishing the experience, respectively. Optionally, these function points are such that $\Delta t_1 \neq \Delta t_2$ and $v_1 \neq v_2$. FIG. 35b also illustrates such a pairs of function points $(\Delta t_1, v_1)$ and $(\Delta t_2, v_2)$ for which $\Delta t_1 \neq \Delta t_2$ and $v_1 \neq v_2$.

In one embodiment, the function learning module 280 utilizes machine learning-based trainer 286, which utilizes the prior and subsequent measurements to train a model 288 for a predictor configured to predict a value of affective response of a user based on an input indicative of a duration that elapsed since the user finished having the experience. When the trained predictor is provided inputs indicative of the durations $\Delta t_1$ and $\Delta t_2$, the predictor predicts the values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 280 may utilize the binning module 290, which is configured to assign subsequent measurements 282 (along with their corresponding prior measurements) to a plurality of bins based durations corresponding to subsequent measurements 282. A duration corresponding to a subsequent measurement of a user is the duration that elapsed between when the user finished having the experience and when the subsequent measurement is taken. Additionally, each bin of the plurality of bins corresponds to a range of durations corresponding to subsequent measurements. Additionally, in this embodiment, the function learning module 280 utilizes the aftereffect scoring module 292, which is configured to compute a plurality of aftereffect scores 294 corresponding to the plurality of bins. An aftereffect score corresponding to a bin is computed based on prior and subsequent measurements of at least five users, from the at least ten users, selected such that durations corresponding to the subsequent measurements of the at least five users fall within the range corresponding to the bin. Additionally, $\Delta t_1$ falls within a range of durations corresponding to a first bin, $\Delta t_2$ falls within a range of durations corresponding to a second bin, which is different from the first bin, and the values $v_1$ and $v_2$ mentioned above are the aftereffect scores corresponding to the first and second bins, respectively.

In one embodiment, an aftereffect score for an experience is indicative of an extent of feeling at least one of the following emotions: pain, anxiety, annoyance, stress, aggression, aggravation, fear, sadness, drowsiness, apathy, anger, happiness, content, calmness, attentiveness, affection, and excitement.

Prior measurements may be utilized in various ways by the function learning module 280, which may slightly change what is represented by the aftereffect function. In one embodiment, a prior measurement of a user is utilized to compute a baseline affective response value for the user. The aftereffect function is indicative of an expected difference between the subsequent measurements of the at least ten users and baseline affective response values for the at least ten users. In another embodiment, the aftereffect function is indicative of an expected difference between the subsequent measurements of the at least ten users and the prior measurements of the at least ten users.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 280 is further configured to utilize the output to learn an aftereffect function personalized for the certain user that describes values of expected affective response at different durations after finishing the experience. The personalized functions are not the same for all users. That is, for at least a certain first user and a certain second user, who have different profiles, the function learning module learns different aftereffect functions, denoted $F_1$ and $F_2$, respectively. $F_1$ is indicative of values $v_1$ and $v_2$ of expected affective responses after durations $\Delta t_1$ and $\Delta t_2$ since finishing the experience, respectively, and $F_2$ is indicative of values $v_3$ and $v_4$ of expected affective responses after the durations $\Delta t_1$ and $\Delta t_2$ since finishing the experience, respectively. Additionally, $\Delta t_1 \neq \Delta t_2$, $v_1 \neq v_2$, $v_3 \neq v_4$, and $v_1 \neq v_3$.

Figure 37:
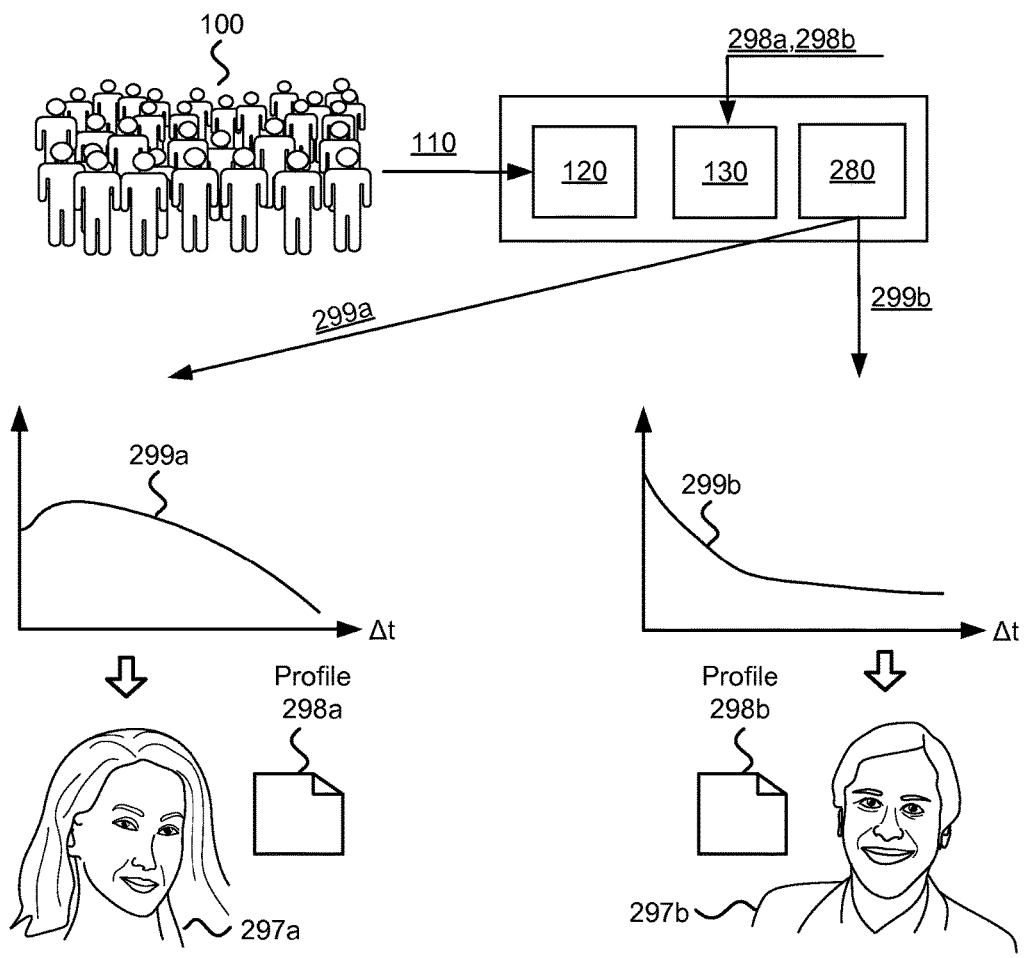
FIG. 37 illustrates personalized functions generated for different users.

FIG. 37 illustrates such a scenario where personalized functions are generated for different users. In this illustration, certain first user 297a and certain second user 297b have different profiles 298a and 298b, respectively. Given these profiles, the personalization module 130 generates different outputs that are utilized by the function learning module to learn functions 299a and 299b for the certain first user 297a and the certain second user 297b, respectively. The different functions indicate different expected aftereffect trends; namely, that the aftereffect of the certain second user 297b initially falls much quicker than the aftereffect of the certain first user 297a.

In one embodiment, the function comparator module 284 is configured to receive descriptions of first and second aftereffect functions that describe values of expected affective response at different durations after finishing respective first and second experiences. The function comparator module 284 is further configured to compare the first and second functions and to provide an indication of at least one of the following: (i) the experience from amongst the first and second experiences for which the average aftereffect, from the time of finishing the respective experience until a certain duration $\Delta t$, is greatest; (ii) the experience from amongst the first and second experiences for which the average aftereffect, from a time starting at a certain duration $\Delta t$ after finishing the respective experience and onwards, is greatest; and (iii) the experience from amongst the first and second experiences for which at a time corresponding to elapsing of a certain duration $\Delta t$ since finishing the respective experience, the corresponding aftereffect is greatest.

Figure 38A:
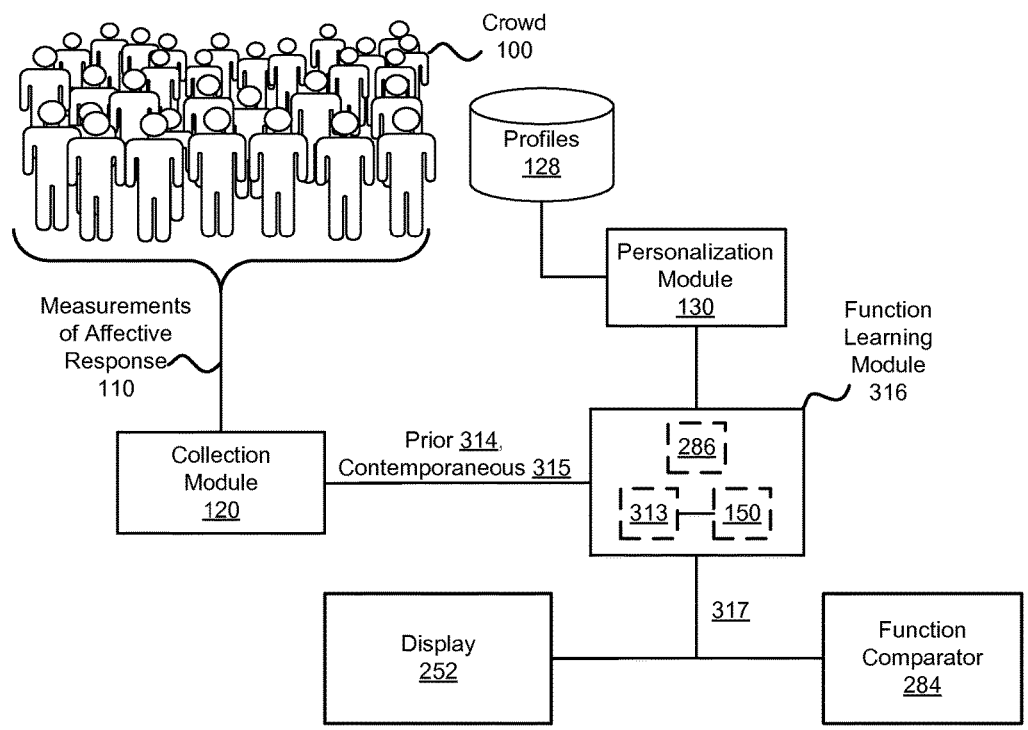
FIG. 38a illustrates one embodiment of a system configured to learn a function describing a relationship between a duration of an experience and an affective response to the experience.

FIG. 38a illustrates one embodiment of a system configured to learn a function describing a relationship between a duration of an experience and an affective response to the experience. The system includes at least collection module 120 and function learning module 316.

The collection module 120 is configured to receive measurements 110 of affective response of users. The measurements 110 are taken utilizing sensors coupled to the users. In this embodiment, the measurements 110 include prior 314 and contemporaneous 315 measurements of affective response of at least ten users who have the experience. A prior measurement of a user is taken before the user starts having the experience, and a contemporaneous measurement of the user is taken between a time the user starts having the experience and a time that is at most ten minutes after the user finishes having the experience. Optionally, the measurements comprise multiple contemporaneous measurements of a user who has the experience, taken at different times after the user started having the experience.

Figure 38B:
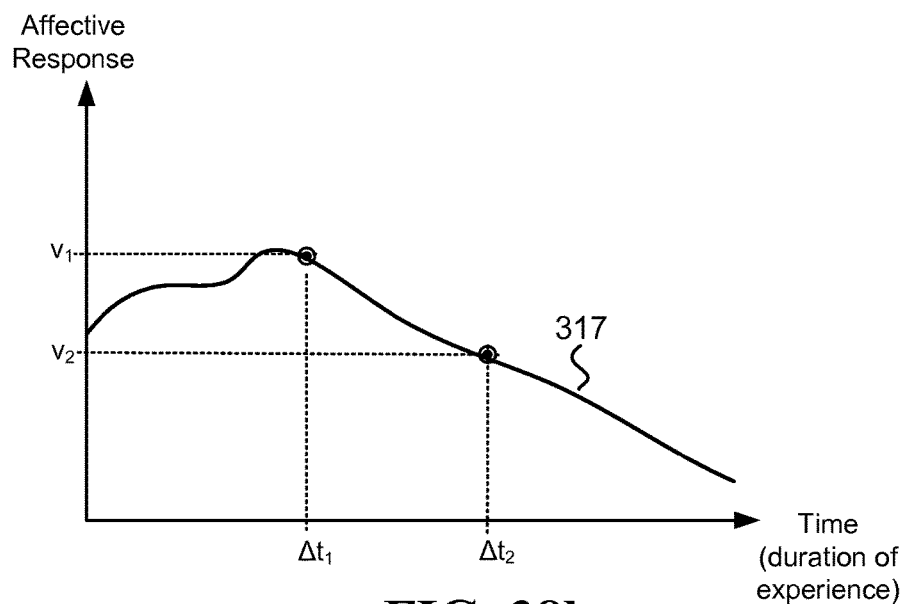
FIG. 38b illustrates a function representing affective response to an experience.

The function learning module 316 is configured to utilize the prior 314 and contemporaneous 315 measurements to learn function 317 that describes, for different durations, values of expected affective response corresponding to having the experience for the different durations. Optionally, the function 317 learned by the function learning module is at least indicative of values $v_1$ and $v_2$ of expected affective response corresponding to having the experience for durations $\Delta t_1$ and $\Delta t_2$, respectively. Additionally, $\Delta t_1 \neq \Delta t_2$ and $v_1 \neq v_2$. FIG. 38b illustrates the function 317 and its values $v_1$ and $v_2$ at the corresponding respective durations $\Delta t_1$ and $\Delta t_2$.

In one embodiment, affective response corresponding to having the experience is indicative of an extent of feeling at least one of the following emotions: pain, anxiety, annoyance, stress, aggression, aggravation, fear, sadness, drowsiness, apathy, anger, happiness, content, calmness, attentiveness, affection, and excitement.

In one embodiment, the function learning module 316 utilizes the machine learning-based trainer 286, which utilizes the prior and contemporaneous measurements to train a model for a predictor configured to predict a value of affective response of a user based on an input indicative of a duration that elapsed since the user started having the experience. When the trained predictor is provided inputs indicative of the durations $\Delta t_1$ and $\Delta t_2$, the predictor predicts the values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 316 may utilize binning module 313, which is configured to assign prior and contemporaneous measurements of users to a plurality of bins based on durations corresponding to the contemporaneous measurements. A duration corresponding to a contemporaneous measurement of a user is the duration that elapsed between when the user started having the experience and when the contemporaneous measurement is taken, and each bin corresponds to a range of durations corresponding to contemporaneous measurements. Additionally, in this embodiment, the function learning module 316 may utilize the scoring module 150 to compute a plurality of scores corresponding to the plurality of bins. A score corresponding to a bin is computed based on prior and contemporaneous measurements of at least five users, from the at least ten users, selected such that durations corresponding to the contemporaneous measurements of the at least five users fall within the range corresponding to the bin. Additionally, $\Delta t_1$ falls within a range of durations corresponding to a first bin, $\Delta t_2$ falls within a range of durations corresponding to a second bin, which is different from the first bin, and the values $v_1$ and $v_2$ are the scores corresponding to the first and second bins, respectively.

Prior measurements may be utilized in various ways by the function learning module 316, which may slightly change what is represented by the function. In one embodiment, a prior measurement of a user is utilized to compute a baseline affective response value for the user. The function is indicative of an expected difference between the contemporaneous measurements of the at least ten users and baseline affective response values for the at least ten users. In another embodiment, the function is indicative of an expected difference between the contemporaneous measurements of the at least ten users and the prior measurements of the at least ten users.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 316 may be configured to utilize the output to learn a personalized function for the certain user that describes, for different durations, values of expected affective response after having the experience for the different durations. The personalized functions are not the same for all users. That is, at least a certain first user and a certain second user, who have different profiles, the function learning module learns different functions, denoted $F_1$ and $F_2$, respectively. $F_1$ is indicative of values $v_1$ and $v_2$ of expected affective response corresponding to having the experience for durations $\Delta t_1$ and $\Delta t_2$, respectively, and $F_2$ is indicative of values $v_3$ and $v_4$ of expected affective response corresponding to having the experience for the durations $\Delta t_1$ and $\Delta t_2$, respectively. And additionally, $\Delta t_1 \Delta t_2$, $v_1 \neq v_2$, $v_3 \neq v_4$, and $v_1 \neq v_3$.

Figure 39:
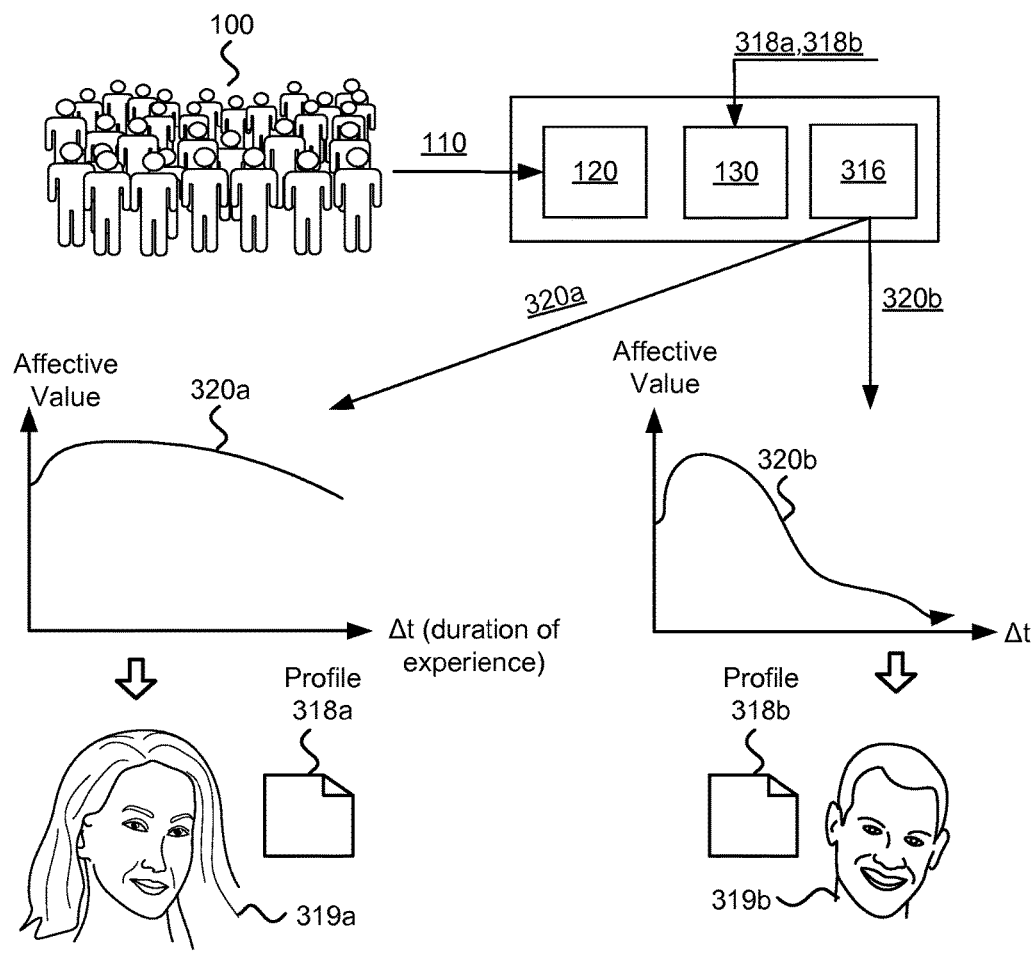
FIG. 39 illustrates a scenario where personalized functions are generated for different users.

FIG. 39 illustrates such a scenario where personalized functions are generated for different users. In this illustration, certain first user 319a and certain second user 319b have different profiles 318a and 318b, respectively. Given these profiles, the personalization module 130 generates different outputs that are utilized by the function learning module to learn functions 320a and 320b for the certain first user 319a and the certain second user 319b, respectively. The different functions indicate different expected affective response trends; namely, that the affective response of the certain second user 297b tapers off when the user has the experience for a longer duration while the certain first user 297a has a more positive affective response to longer durations of the experience.

In one embodiment, the function comparator module 284 is configured to receive descriptions of first and second aftereffect functions that describe values of expected affective response to having respective first and second experiences for different durations. The function comparator module 284 is further configured to compare the first and second functions and to provide an indication of at least one of the following: (i) the experience from amongst the first and second experiences for which the average affective response to having the respective experience, for a duration that is at most a certain duration $\Delta t$, is greatest; (ii) the experience from amongst the first and second experiences for which the average affective response to having the respective experience, for a duration that is at least a certain duration $\Delta t$, is greatest; and (iii) the experience from amongst the first and second experiences for which the affective response to having the respective experience, for a certain duration $\Delta t$, is greatest.

Figure 40A:
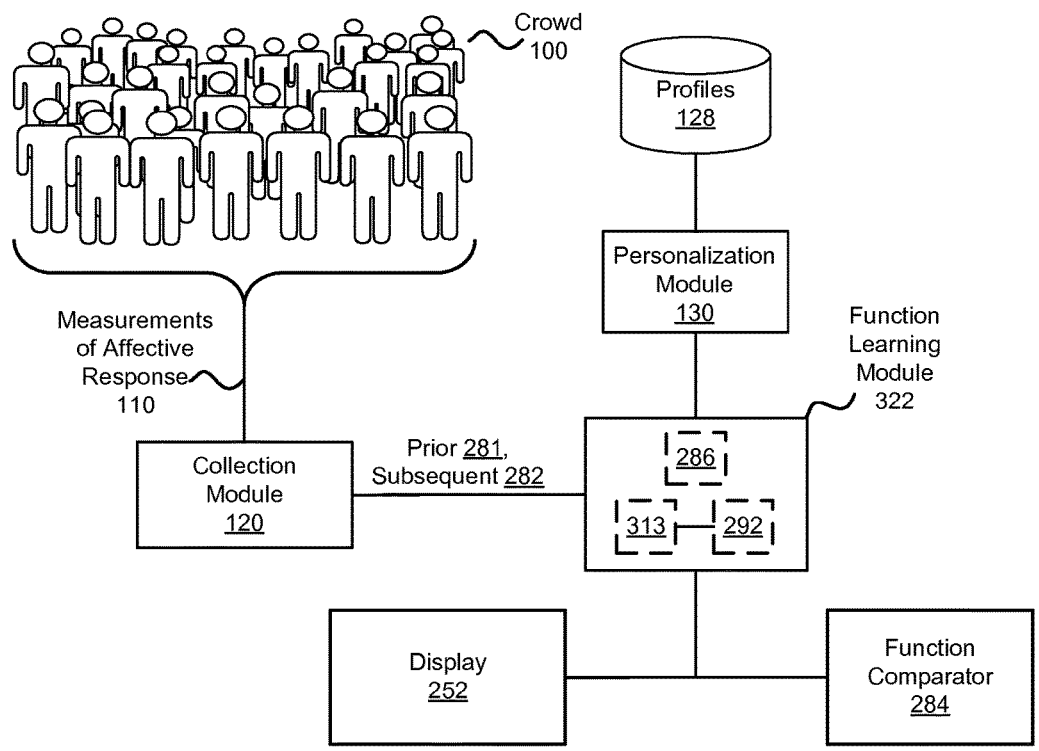
FIG. 40a illustrates one embodiment of a system configured to learn a relationship between a duration of an experience and an aftereffect of the experience.

FIG. 40a illustrates one embodiment of a system configured to learn a relationship between a duration of an experience and an aftereffect of the experience. The system includes at least collection module 120 and function learning module 322.

The collection module 120 is configured to receive measurements 110 of affective response of users. The measurements 110 are taken utilizing sensors coupled to the users. In this embodiment, the measurements 110 include prior 281 and subsequent 282 measurements of affective response of at least ten users. Each user has the experience for a duration, a prior measurement of a user is taken before the user finishes having the experience, and a subsequent measurement of the user is taken at least ten minutes after the user finishes having the experience. Optionally, a difference between a subsequent measurement and a prior measurement of a user who had the experience is indicative of an aftereffect of the experience on the user.

The function learning module 322 is configured to utilize the prior and subsequent measurements to learn a function that describes, for different durations, values of expected affective responses corresponding to extents of aftereffects of the experience after having the experience for the different durations. Optionally, the function learned by the function learning module is at least indicative of values $v_1$ and $v_2$ corresponding to expected extents of aftereffects to having the experience for durations $\Delta t_1$ and $\Delta t_2$, respectively. And additionally, $\Delta t_1 \neq \Delta t_2$ and $v_1 \neq v_2$.

Figure 40B:
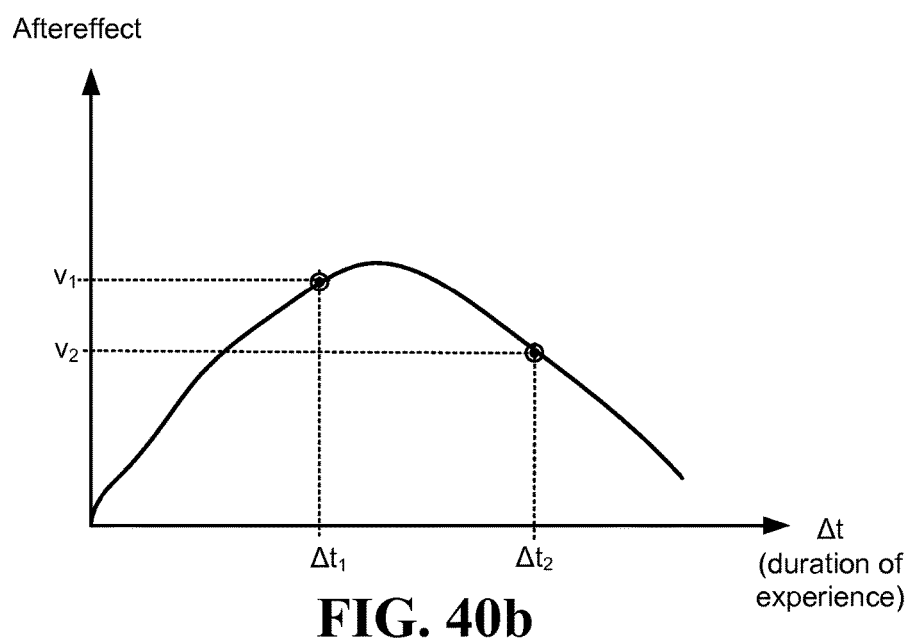
FIG. 40b illustrates an example of the function representing an aftereffect of an experience.

FIG. 40b illustrates an example of the function learned by the learning module. The figure illustrates changes in the aftereffect based on duration of the experience; the aftereffect increases with the length of the duration $\Delta t$, but only until a certain point, after which increasing the duration reduces the aftereffect.

In one embodiment, the function learning module 322 utilizes the machine learning-based trainer 286. Machine learning-based trainer 286 utilizes the prior and subsequent measurements to train a model for a predictor configured to predict a value of affective response of a user based on an input indicative of a duration that elapsed since the user started having the experience. Responsive to being provided inputs indicative of the durations $\Delta t_1$ and $\Delta t_2$, the predictor predicts the values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 322 may utilize binning module 313, which is configured to assign prior and subsequent measurements of users to a plurality of bins based on durations during which the users had the experience. Additionally, function learning module 322 comprises the aftereffect scoring module 292, which is configured to compute a plurality of scores corresponding to a plurality of bins, with each bin corresponding to a range of durations for having the experience. Each score corresponding to a bin is computed based on prior and subsequent measurements of at least five users, from the at least ten users, for whom durations during which they have the experience fall within the range corresponding to the bin. Continuing the example given above, $\Delta t_1$ falls within a range of durations corresponding to a first bin, $\Delta t_2$ falls within a range of durations corresponding to a second bin, which is different from the first bin, and the values $v_1$ and $v_2$ are the scores corresponding to the first and second bins, respectively.

Prior measurements may be utilized in various ways by the function learning module 322, which may slightly change what is represented by the function. In one embodiment, a prior measurement of a user is utilized to compute a baseline affective response value for the user. The function is indicative of an expected difference between the subsequent measurements of the at least ten users and baseline affective response values for the at least ten users. In another embodiment, the function is indicative of an expected difference between the subsequent measurements of the at least ten users and the prior measurements of the at least ten users.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 322 may be configured to utilize the output to learn a personalized function for the certain user that describes, for different durations, values of expected affective response corresponding to extents of aftereffects of the experience after having the experience for the different durations. The personalized functions are not the same for all users. That is, for at least a certain first user and a certain second user, who have different profiles, the function learning module learns different functions, denoted $F_1$ and $F_2$, respectively. $F_1$ is indicative of values v1 and $v_2$ of expected extents of aftereffects to having the experience for durations $\Delta t_1$ and $\Delta t_2$, respectively, and $F_2$ is indicative of values $v_3$ and $v_4$ of expected extents of aftereffects to having the experience for durations $\Delta t_1$ and $\Delta t_2$, respectively. And additionally, $\Delta t_1 \neq \Delta t_2$, $v_1 \neq v_2$, $v_3 \neq v_4$, and $v_1 \neq v_3$.

Figure 41A:
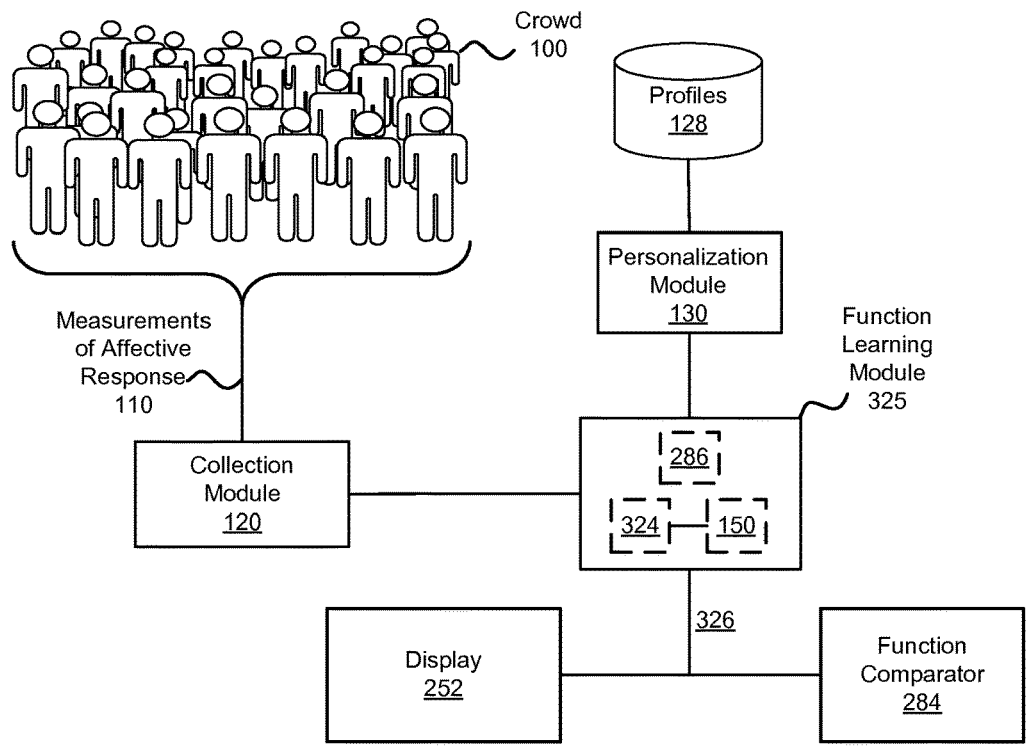
FIG. 41a illustrates one embodiment of a system configured to learn a function of periodic affective response to an experience.

FIG. 41a illustrates one embodiment of a system configured to learn a function of periodic affective response to an experience. The system includes at least collection module 120 and function learning module 325.

The collection module 120 is configured to receive measurements 110 of affective response of users. The measurements 110 are taken utilizing sensors coupled to the users. In this embodiment, the measurements 110 include measurements of affective response of at least ten users. Each user has the experience at some time during a periodic unit of time, and a measurement of the user is taken by a sensor coupled to the user while the user has the experience. Optionally, the measurements comprise multiple measurements of a user who has the experience, taken at different times during the periodic unit of time.

Figure 41B:
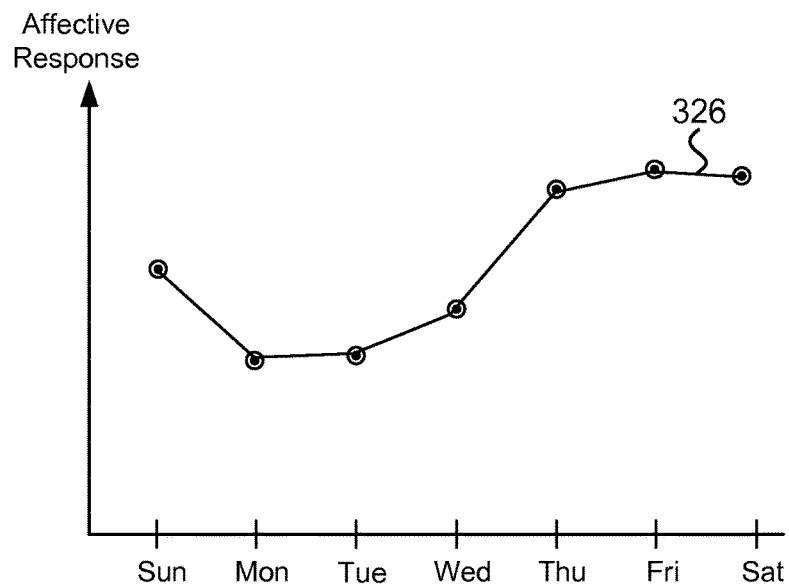
FIG. 41b illustrates an example of affective response to an experience when having it on different days of the week.

The function learning module 325 is configured to utilize the measurements to learn a function 326 that describes expected affective response to the experience when having the experience at different times in the periodic unit of time. FIG. 41b illustrates an example of affective response to an experience when having it on different days of the week (e.g., how do people enjoy going out down town on different days).

In one embodiment, the function 326 learned by the function learning module is at least indicative of values $v_1$ and $v_2$ of expected affective response to the experience when having the experience at times $t_1$ and $t_2$ during the periodic unit of time, respectively. And additionally, $t_1 \neq t_2$ and $v_1 \neq v_2$. In one example, the periodic unit of time is a day, and $t_1$ corresponds to a time during the morning and $t_2$ corresponds to a time during the evening. In another example, the periodic unit of time is a week, and $t_1$ corresponds to some time on Tuesday and $t_2$ corresponds to a time during the weekend. And in another example, the periodic unit of time is a year, and $t_1$ corresponds to a time during the summer and $t_2$ corresponds to a time during the winter.

In one embodiment, the function learning module 325 utilizes the machine learning-based trainer 286. Machine learning-based trainer 286 utilizes the measurements to train a model for a predictor configured to predict a value of affective response of a user based on an input indicative of a time during the periodic unit of time. Responsive to being provided inputs indicative of the times $t_1$ and $t_2$, the predictor predicts the values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 325 may utilize binning module 324, which is configured to assign measurements of users to a plurality of bins based on when in the periodic unit of time the measurements were taken, with each bin corresponding to a range of times in the periodic unit of time. Additionally, the function learning module 325 may utilize the scoring module 150, which is configured to compute a plurality of scores corresponding to the plurality of bins. Each score corresponding to a bin is computed based on measurements of at least five users, from the at least ten users, which were taken at a time that falls within the range corresponding to the bin. Continuing the example above, $t_1$ falls within a range of times corresponding to a first bin, $t_2$ falls within a range of times corresponding to a second bin, which is different from the first bin, and the values $v_1$ and $v_2$ are the scores corresponding to the first and second bins, respectively.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 325 may be configured to utilize the output to learn a personalized function for the certain user that describes expected affective response when having the experience at different times in the periodic unit of time. The personalized functions are not the same for all users. That is, for at least a certain first user and a certain second user, who have different profiles, the function learning module learns different functions, denoted $F_1$ and $F_2$, respectively. $F_1$ is indicative of values $v_1$ and $v_2$ of expected affective responses to having the experience at times $t_1$ and $t_2$ during the periodic unit of time, respectively, and $F_2$ is indicative of values $v_3$ and $v_4$ of expected affective responses to the having the experience at times $t_1$ and $t_2$, respectively. And additionally, $t_1 \neq t_2$, $v_1 \neq v_2$, $v_3 \neq v_4$, and $v_1 \neq v_3$.

In one embodiment, the function comparator module 284 is configured to receive descriptions of first and second functions of periodic affective response to having first and second experiences, respectively. The function comparator module is further configured to compare the first and second functions and to provide an indication of at least one of the following: (i) the experience from amongst the first and second experiences for which the average affective response to having the respective experience throughout the periodic unit of time is greatest; and (ii) the experience, from amongst the first and second experiences, for which the affective response to having the respective experience at a certain time t in the periodic unit of time is greatest.

Figure 42A:
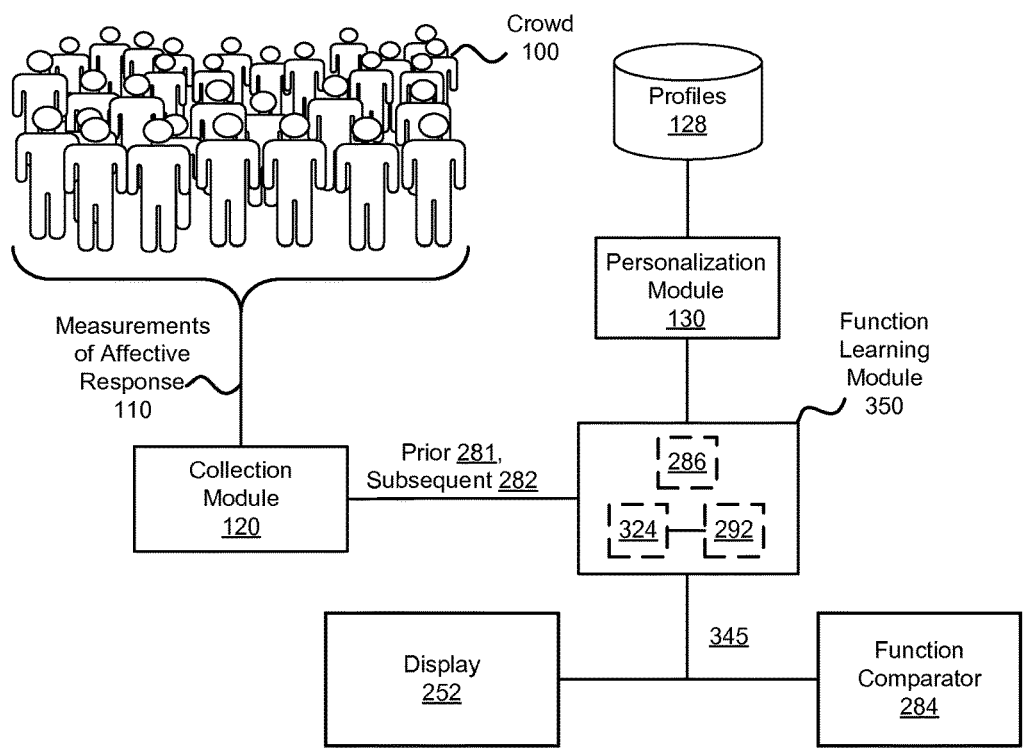
FIG. 42a illustrates one embodiment of a system configured to learn a relationship between a period during which a user has an experience and an aftereffect of the experience.

FIG. 42a illustrates one embodiment of a system configured to learn a relationship between a period during which one has an experience and an aftereffect of the experience. The system includes at least collection module 120 and function learning module 350.

The collection module 120 is configured to receive measurements 110 of affective response of users. The measurements 110 are taken utilizing sensors coupled to the users. In this embodiment, the measurements 110 include prior 281 and subsequent 282 measurements of affective response of at least ten users. Each user has the experience at some time during a periodic unit of time, a prior measurement is taken before the user finishes having the experience, and a subsequent measurement taken at least ten minutes after the user finishes having the experience. Optionally, a difference between a subsequent measurement and a prior measurement of a user who had the experience is indicative of an aftereffect of the experience on the user. Optionally, measurements comprise multiple subsequent measurements of a user who has the experience, taken at different times after the user has the experience.

Figure 42B:
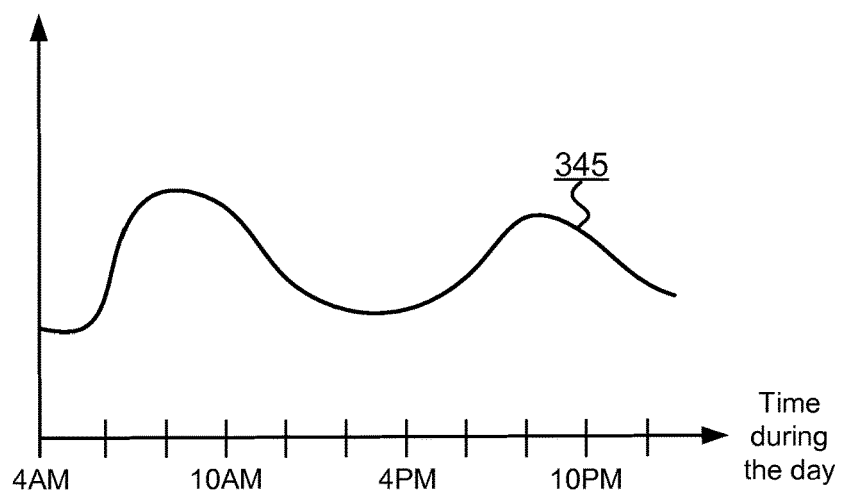
FIG. 42b illustrates an example of a function which describes the aftereffect of an experience as a function of the time during the day.

The function learning module 350 is configured to utilize the prior and subsequent measurements to learn the function 345 of the periodic aftereffect, which describes, for different times in the periodic unit of time, expected aftereffects of the experience due to having the experience at the different times. Optionally, the function learned by the function learning module is at least indicative of values $v_1$ and $v_2$ of expected aftereffects due to having the experience at times $t_1$ and $t_2$ in the periodic unit of time, respectively. And additionally, $t_1 \neq t_2$ and $v_1 \neq v_2$. FIG. 42b illustrates an example of the function 345 which describes the aftereffect (relaxation from walking in the park), as a function of the time during the day.

In one embodiment, the function learning module 350 utilizes the machine learning-based trainer 286. Machine learning-based trainer 286 utilizes the prior and subsequent measurements to train a model for a predictor configured to predict a value of affective response of a user based on an input indicative of a time during the periodic unit of time during which a user has the experience. Responsive to being provided inputs indicative of the times $t_1$ and $t_2$, the predictor predicts the values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 350 may utilize binning module 324, which is configured to assign prior and subsequent measurements of affective response of users who have the experience to a plurality of bins based on when in the periodic unit of time the users have the experience, where each bin corresponds to a portion of the periodic unit of time. Additionally, the function learning module 350 may utilize the aftereffect scoring module 292 to compute a plurality of aftereffect scores corresponding to the plurality of bins. An aftereffect score corresponding to a bin is computed based on prior and subsequent measurements of at least five users, from the at least ten users, who have the experience at a time that falls within the portion of the periodic unit of time that corresponds to the bin. Continuing the example above, $t_1$ falls within a portion of the periodic unit of time corresponding to a first bin, $t_2$ falls within a portion of the periodic unit of time corresponding to a second bin, which is different from the first bin, and the values $v_1$ and $v_2$ are the aftereffect scores corresponding to the first and second bins, respectively.

In one embodiment, the function comparator module 284 is configured to receive descriptions of first and second functions of the periodic aftereffect of first and second experiences, respectively. The function comparator module is further configured to compare the first and second functions and to provide an indication of at least one of the following: (i) the experience from amongst the first and second experiences for which the aftereffect throughout the periodic unit of time is greatest; and (ii) the experience, from amongst the first and second experiences, for which the aftereffect after having the respective experience at a certain time t in the periodic unit of time is greatest.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 350 may be configured to utilize the output to learn a personalized function for the certain user that describes expected affective response when having the experience at different times in the periodic unit of time. The personalized functions are not the same for all users. That is, for at least a certain first user and a certain second user, who have different profiles, the function learning module learns different functions, denoted $F_1$ and $F_2$, respectively. $F_1$ is indicative of values $v_1$ and $v_2$ of expected affective responses to having the experience at times $t_1$ and $t_2$ during the periodic unit of time, respectively, and $F_2$ is indicative of values $v_3$ and $v_4$ of expected affective responses to the having the experience at times $t_1$ and $t_2$, respectively. And additionally, $t_1 \neq t_2$, $v_1 \neq v_2$, $v_3 \neq v_4$, and $v_1 \neq v_3$.

Figure 43A:
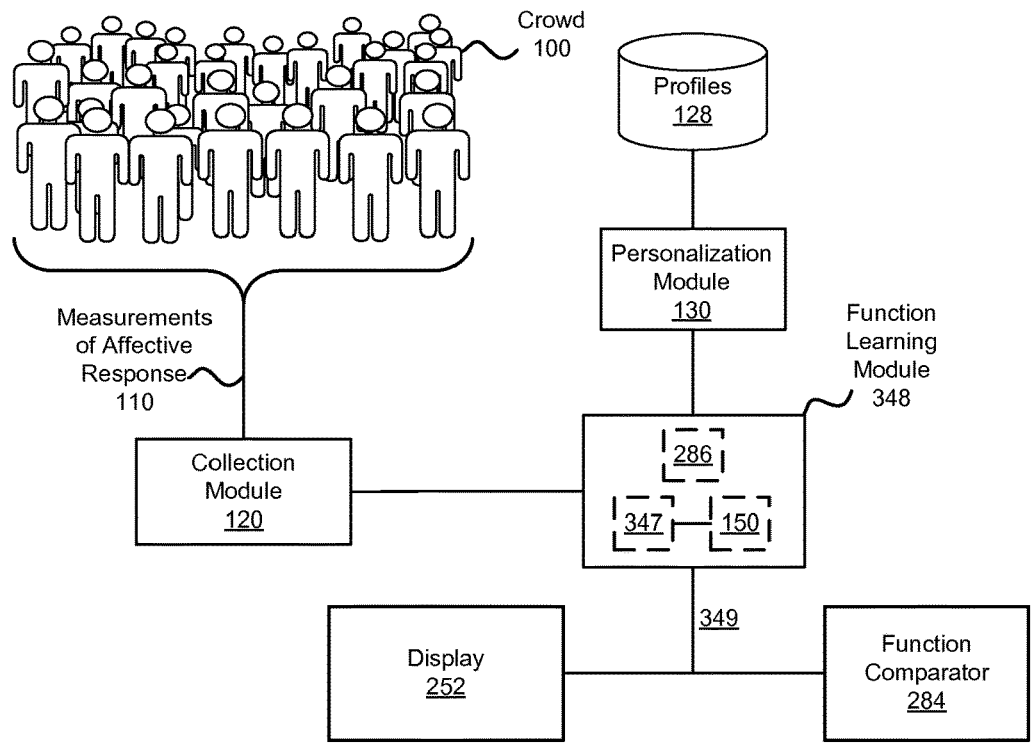
FIG. 43a illustrates one embodiment of a system configured to learn a relationship between repetitions of an experience and affective response to the experience.

FIG. 43a illustrates one embodiment of a system configured to learn a relationship between repetitions of an experience and affective response to the experience. In one example, the experience involves utilizing a product. In another example, the experience involves engaging in an activity (e.g., playing a computer game). In yet another example, the experience involves visiting a location. The system includes at least the collection module 120 and the function learning module 348.

The collection module 120 is configured to receive measurements 110 of affective response of users. The measurements 110 are taken utilizing sensors coupled to the users. In this embodiment, the measurements 110 include measurements of affective response of at least ten users. Each measurement of a user is taken while the user experiences the experience, and is associated with a value indicative of an extent to which the user had previously experienced the experience. In one example, a value of an extent to which a user had experienced the experience before is a value that is indicative of time that had elapsed since the user first had the experience. In another example, a value of an extent to which a user had experienced the experience before is a value that is indicative of a number of times the user had already had the experience before. In yet another example, a value of an extent to which a user had experienced the experience before is a value that is indicative of a number of hours spent by the user having the experience, since having it for the first time (e.g., the number of hours a user has already played a certain game).

Figure 43B:
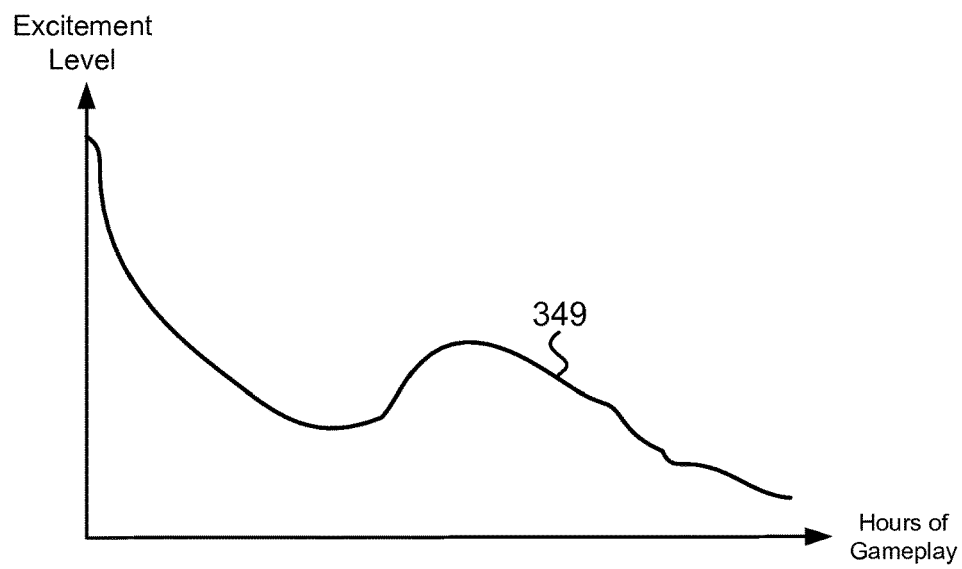
FIG. 43b illustrates an example of the function, in which there are changes in the excitement from playing a game after having previously played the game for various hours.

The function learning module 348 is configured to utilize the measurements and their associated values to learn function 349, which describes, for different extents to which a user had experienced the experience, an expected affective response to experiencing the experience again. Optionally, the function is indicative of values $v_1$ and $v_2$ of expected affective response corresponding to certain extents $e_1$ and $e_2$, respectively. Additionally, $v_1$ describes an expected affective response to experiencing the experience again, after it had been experienced to the certain extent $e_1$, and $v_2$ describes an expected affective response to experiencing the experience again, after it had been experienced to the certain extent $e_2$. And additionally, $e_1 \neq e_2$ and $v_1 \neq v_2$. FIG. 43b illustrates an example of the function 349, in which there are changes in the excitement from playing a game for many hours. Initial excitement withers, until some event like discovery of new levels increases interest for a while, but following that, the excitement continues to decline.

In one embodiment, the function learning module 348 utilizes the machine learning-based trainer 286, which is configured to utilize the measurements to train a model for a predictor configured to predict a value of affective response of a user based on an input indicative of a certain extent to which a user had previously experienced the experience. Responsive to being provided inputs indicative of the certain extents $e_1$ and $e_2$, the predictor predicts the affective response values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 348 may utilize binning module 347, which is configured to assign measurements of affective response of users to a plurality of bins based on the values associated with the measurements; each bin corresponds to a certain range of extents of previously experiencing the experience. Additionally, the function learning module 348 may utilize the scoring module 150 which is configured to compute a plurality of scores corresponding to the plurality of bins. A score corresponding to a bin is computed based on measurements of at least five users, from the at least ten users, for which the associated values fall within the range corresponding to the bin. Additionally, $e_1$ falls within a range of extents corresponding to a first bin, $e_2$ falls within a range of extents corresponding to a second bin, which is different from the first bin, and the values $v_1$ and $v_2$ are the scores corresponding to the first and second bins, respectively.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 348 is further configured to utilize the output to learn a function, personalized for the certain user, based on the measurements and their associated values. For at least a certain first user and a certain second user, who have different profiles, the function learning module learns different functions, denoted $F_1$ and $F_2$, respectively. $F_1$ is indicative of values $v_1$ and $v_2$ of expected affective response to experiencing the experience again, after the experience had been experienced to certain extents $e_1$ and $e_2$, respectively, and $F_2$ is indicative of values $v_3$ and $v_4$ of expected affective response to experiencing the experience again, after the experience had been experienced before to the certain extents $e_1$ and $e_2$, respectively. And additionally, $e_1 \neq e_2$, $v_1 \neq v_2$, $v_3 \neq v_4$, and $v_1 \neq v_3$.

Figure 44:
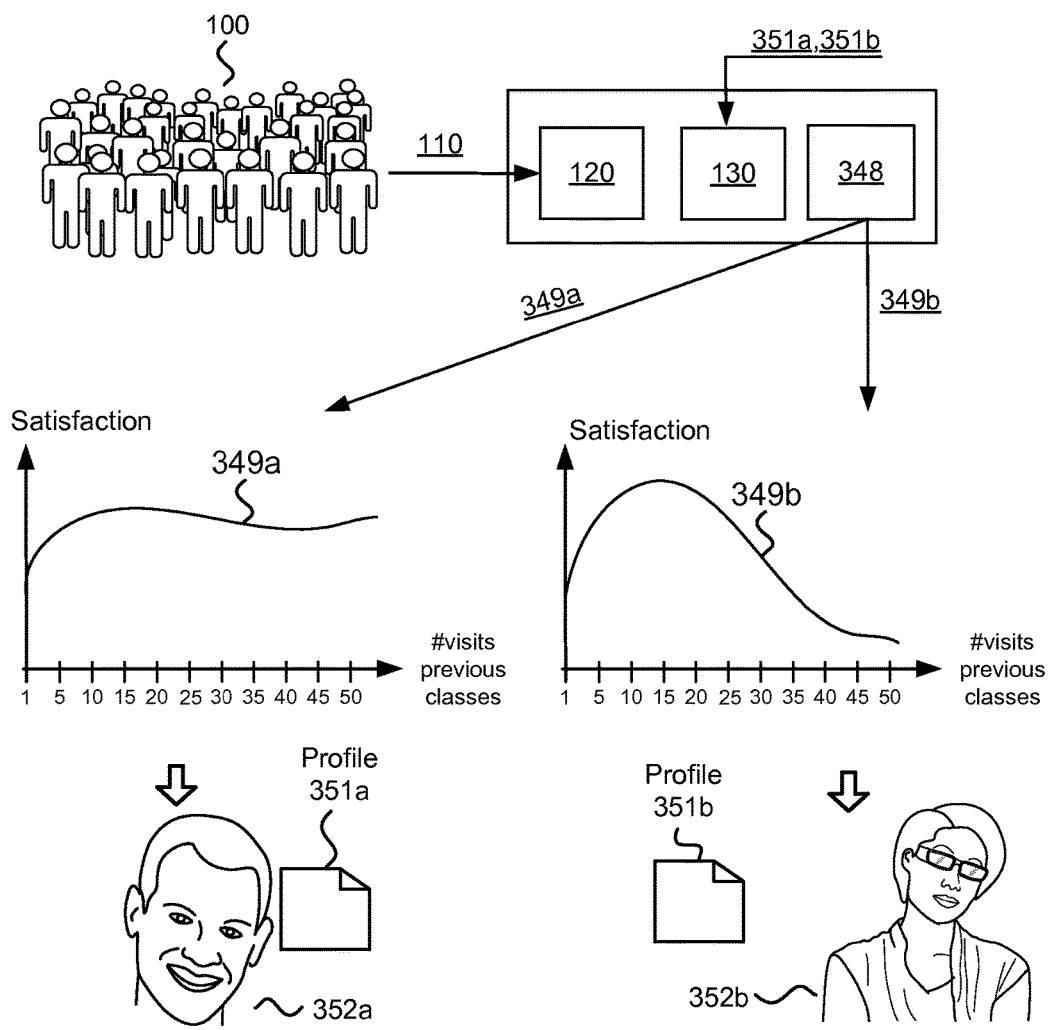
FIG. 44 illustrates a scenario where personalized functions are generated for different users, with each function describing satisfaction from an experience after different extents of previously having the experience.

FIG. 44 illustrates such a scenario where personalized functions are generated for different users. In this illustration, certain first user 352a and certain second user 352b have different profiles 351a and 351b, respectively. Given these profiles, the personalization module 130 generates different outputs that are utilized by the function learning module to learn functions 349a and 349b for the certain first user 352a and the certain second user 352b, respectively. The different functions indicate different affective response trends. For example, the graph may show the certain second user 352b is likely to get bored from the experience faster than the certain first user 352a after having the experience multiple times.

Figure 45A:
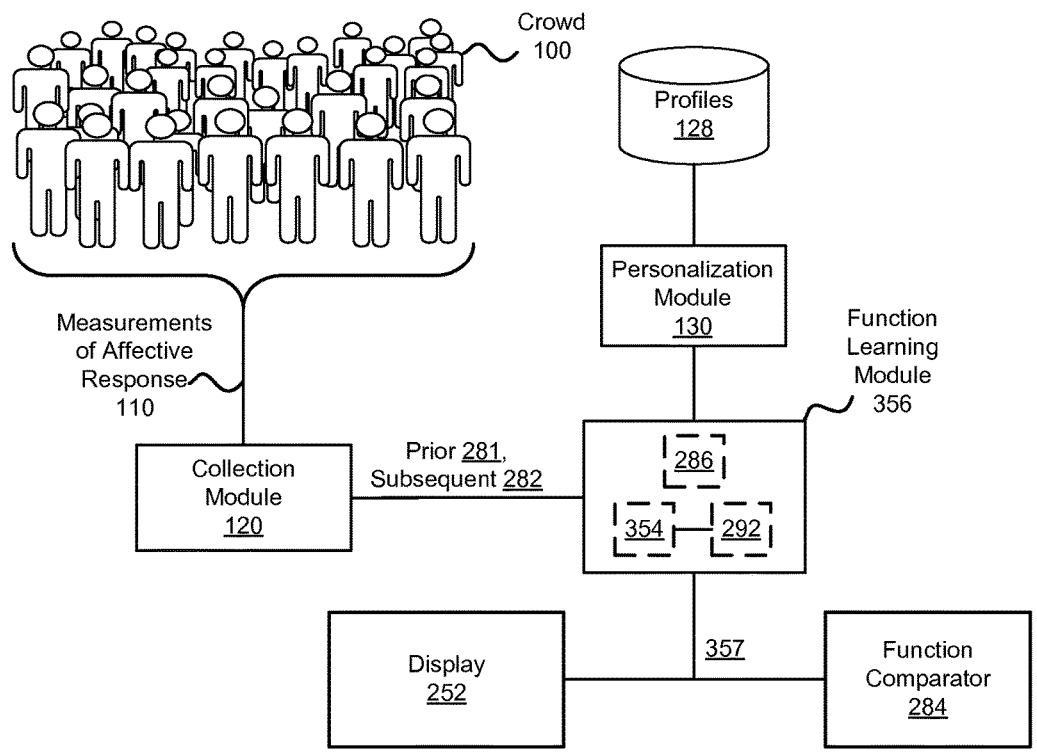
FIG. 45a illustrates one embodiment of a system configured to learn a relationship between repetitions of an experience and an aftereffect of the experience.

FIG. 45a illustrates one embodiment of a system configured to learn a relationship between repetitions of an experience and an aftereffect of the experience. The system includes at least collection module 120 and function learning module 356.

The collection module 120 is configured to receive measurements 110 of affective response of users. The measurements 110 are taken utilizing sensors coupled to the users. In this embodiment, the measurements 110 include prior 281 and subsequent 282 measurements of affective response of at least ten users who had the experience. A prior measurement is taken before the user finishes having the experience, and a subsequent measurement taken at least ten minutes after the user finishes having the experience. Optionally, a difference between a subsequent measurement and a prior measurement of a user who had the experience is indicative of an aftereffect of the experience on the user. Optionally, the measurements comprise multiple subsequent measurements of a user who had the experience, taken at different times after the user had the experience. Additionally, the prior measurement and the subsequent measurement are associated with a value indicative of an extent to which the user had previously experienced the experience.

Figure 45B:
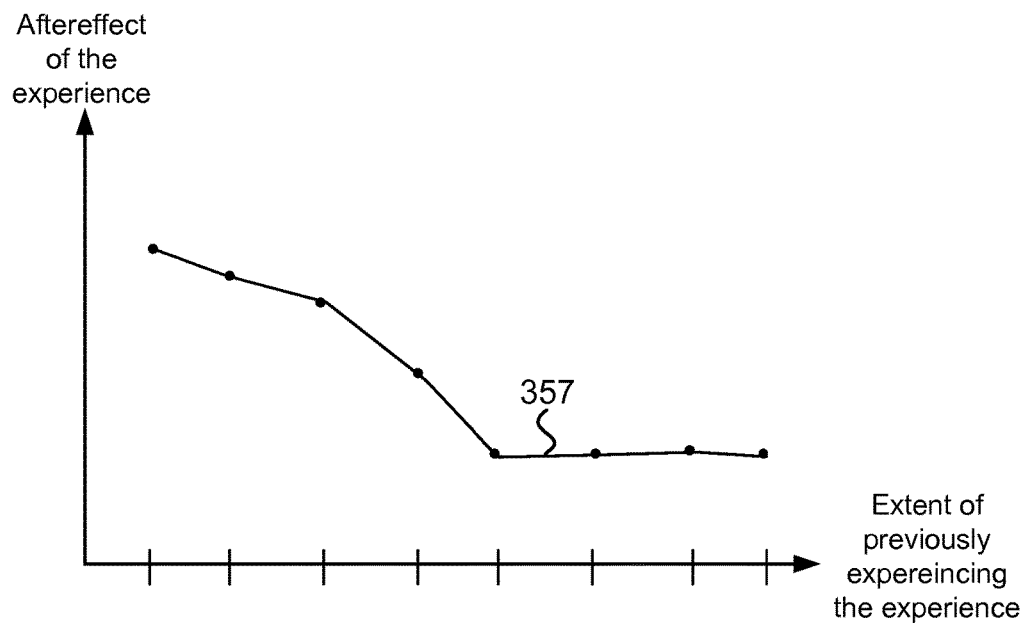
FIG. 45b illustrates an example of a function which shows how an aftereffect tapers off after a certain extent of repeating the experience.

The function learning module 356 is configured to learn a function 357 based on the prior and subsequent measurements and their associated values. The function 357 describes, for different extents to which a user had experienced the experience, an expected aftereffect due to experiencing the experience again. Optionally, the function learned by the function learning module is at least indicative of values $v_1$ and $v_2$ of expected aftereffects due to experiencing the experience again, after the experience had been experienced to certain extents $e_1$ and $e_2$, respectively. And additionally, $e_1 \neq e_2$ and $v_1 \neq v_2$. FIG. 45b illustrates an example of the function 357 which shows how an aftereffect (e.g., after a treatment) tapers off after a certain extent of repeating the experience.

In one embodiment, the function learning module 357 utilizes the machine learning-based trainer 286 that is configured to utilize the prior and subsequent measurements to train a model for a predictor configured to predict a value of an aftereffect of the experience on a user has after experiencing the experience again, based on an input indicative of a certain extent to which the user had previously experienced the experience. Responsive to being provided inputs indicative of the certain extents $e_1$ and $e_2$, the predictor predicts the values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 357 may utilize binning module 354, which is configured to assign prior and subsequent measurements of affective response of users to a plurality of bins based on the values associated with the measurements; each bin corresponds to a certain range of values of extents of previously experiencing the experience. Additionally, the function learning module 357 may utilize the aftereffect scoring module 292 to compute a plurality of aftereffect scores corresponding to the plurality of bins. An aftereffect score corresponding to a bin is computed based on prior and subsequent measurements of at least five users, from the at least ten users, for which the associated values fall within the range corresponding to the bin. Additionally, $e_1$ falls within a range of extents corresponding to a first bin, $e_2$ falls within a range of extents corresponding to a second bin, which is different from the first bin, and the values $v_1$ and $v_2$ are the aftereffect scores corresponding to the first and second bins, respectively.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 357 may be configured to utilize the output to learn a function, which is personalized for the certain user, and describes, for different extents to which the experience had already been had, an expected aftereffect after having the experience again, after it had already been had to a certain extent. The personalized functions are not the same for all users. That is, for at least a certain first user and a certain second user, who have different profiles, the function learning module learns different functions, denoted $F_1$ and $F_2$, respectively. $F_1$ is indicative of values $v_1$ and $v_2$ of expected aftereffects to experiencing the experience again, after the experience had been experienced to certain extents $e_1$ and $e_2$, respectively. $F_2$ is indicative of values $v_3$ and $v_4$ of expected aftereffects response to experiencing the experience again, after the experience had been experienced before to the certain extents $e_1$ and $e_2$, respectively. And additionally, $e_1 \neq e_2$, $v_1 \neq v_2$, $v_3 \neq v_4$, and $v_1 \neq v_3$.

In one embodiment, the function comparator module 284 is configured to receive descriptions of first and second functions of aftereffects to having respective first and second experiences after having experienced them before to different extents. The function comparator module is further configured to compare the first and second functions and to provide an indication of at least one of the following: (i) the experience from amongst the first and second experiences for which the average expected aftereffect to having the respective experience again, after having experienced the experience before at most to a certain extent e, is greatest; (ii) the experience from amongst the first and second experiences for which the average expected aftereffect to having the respective experience again, after having experienced the experience before at least to a certain extent e, is greatest; and (iii) the experience from amongst the first and second experiences for which the expected aftereffect to having the respective experience again, after having experienced the experience before to a certain extent e, is greatest.

Figure 46A:
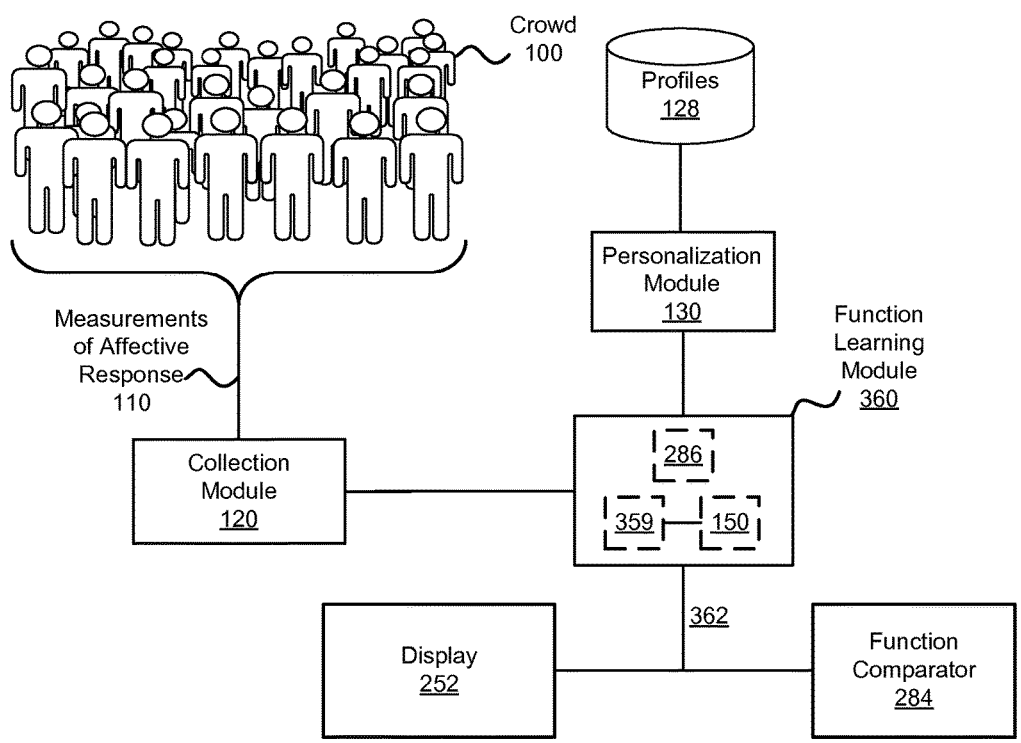
FIG. 46a illustrates one embodiment of a system configured to learn a relationship between an environmental parameter and affective response to an experience.

FIG. 46a illustrates one embodiment of a system configured to learn a relationship between an environmental parameter and affective response to an experience. The system includes at least the collection module 120 and the function learning module 360.

The collection module 120 is configured to receive measurements 110 of affective response that include measurements of affective response of at least ten users. Each measurement of the user is taken by a sensor coupled to the user, while the user has the experience, and is associated with a value of the environmental parameter that characterizes an environment in which the user has the experience. Optionally, the environmental parameter describes at least one of the following: a temperature of the environment, a level of precipitation in the environment, a degree of air pollution in the environment, wind speed in the environment, an extent at which the environment is overcast, a degree to which the environment is crowded with people, and a noise level at the environment.

Figure 46B:
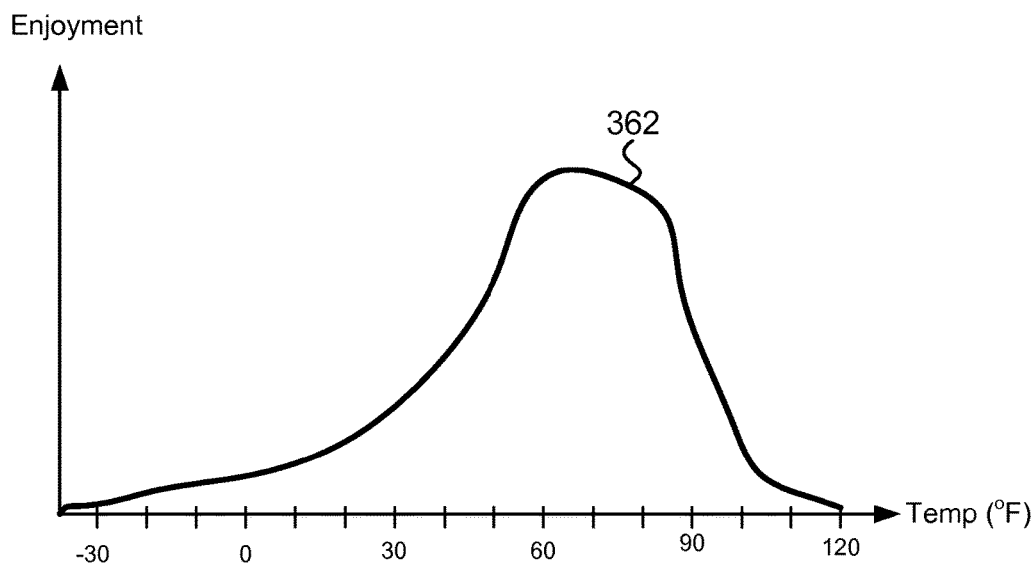
FIG. 46b illustrates an example of a function, which describes how enjoyment from the experience depends on the temperature.

The function learning module 360 is configured to utilize the measurements and their associated values to learn a function 362 that describes expected affective responses to having the experience in environments characterized by different values of the environmental parameter. Optionally, the function 362 is indicative of values $v_1$ and $v_2$ of expected affective response corresponding to having the experience in environments characterized by the environmental parameter having values $p_1$ and $p_2$, respectively. Additionally, $p_1 \neq p_2$ and $v_1 \neq v_2$. FIG. 46b illustrates an example of the function 362, which describes how enjoyment from the experience (e.g., an outside activity) depends on the temperature, such that the more extreme the temperature the lower the enjoyment level from the experience.

In one embodiment, the function learning module 360 utilizes the machine learning-based trainer 286. The machine learning-based trainer 286 utilizes the measurements and their associated values to train a model for a predictor configured to predict a value of affective response of a user who has the experience in an environment, based on an input indicative of a value of the environmental parameter that characterizes the environment. Responsive to being provided inputs indicative of the values $p_1$ and $p_2$, the predictor predicts the values $v_1$ and $v_2$, respectively. Optionally, the model is at least one of the following: a regression model, a model utilized by a neural network, a nearest neighbor model, a model for a support vector machine for regression, and a model utilized by a decision tree.

In an alternative embodiment, the function learning module 360 may utilize binning module 359, which is configured to assign measurements of affective response of users to a plurality of bins based on the values associated with the measurements; each bin corresponding to a range of values of the environmental parameter. Additionally, the function learning module 360 may utilize the scoring module 150 to compute a plurality of scores corresponding to a plurality of bins. A score corresponding to a bin is computed based on measurements of at least five users, from the at least ten users, for whom the associated values fall within the range corresponding to the bin. Continuing the example above, $p_1$ falls within a range values corresponding to a first bin, $p_2$ falls within a range of values corresponding to a second bin, which is different from the first bin, and the values $v_1$ and $v_2$ are the scores corresponding to the first and second bins, respectively.

In some embodiments, the personalization module 130 may be utilized to learn personalized functions for different users utilizing profiles of the different users. Given a profile of a certain user, the personalization module 130 generates an output indicative of similarities between the profile of the certain user and the profiles from among the profiles 128 of the at least ten users. The function learning module 360 may be configured to utilize the output to learn a personalized function for the certain user that expected affective responses to having the experience in environments characterized by different values of the environmental parameter. The personalized functions are not the same for all users. That is, at least a certain first user and a certain second user, who have different profiles, the function learning module learns different functions, denoted $F_1$ and $F_2$, respectively. $F_1$ is indicative of values $v_1$ and $v_2$ of expected affective response corresponding to having the experience in environments characterized by the environmental parameter having values $p_1$ and $p_2$, respectively, and $F_2$ is indicative of values $v_3$ and $v_4$ of expected affective response corresponding to having the experience in environments characterized by the environmental parameter having the values $p_1$ and $p_2$, respectively. And additionally, $p_1 \neq p_2$, $v_1 \neq v_2$, $v_3 \neq v_4$, and $v_1 \neq v_3$.

Figure 47:
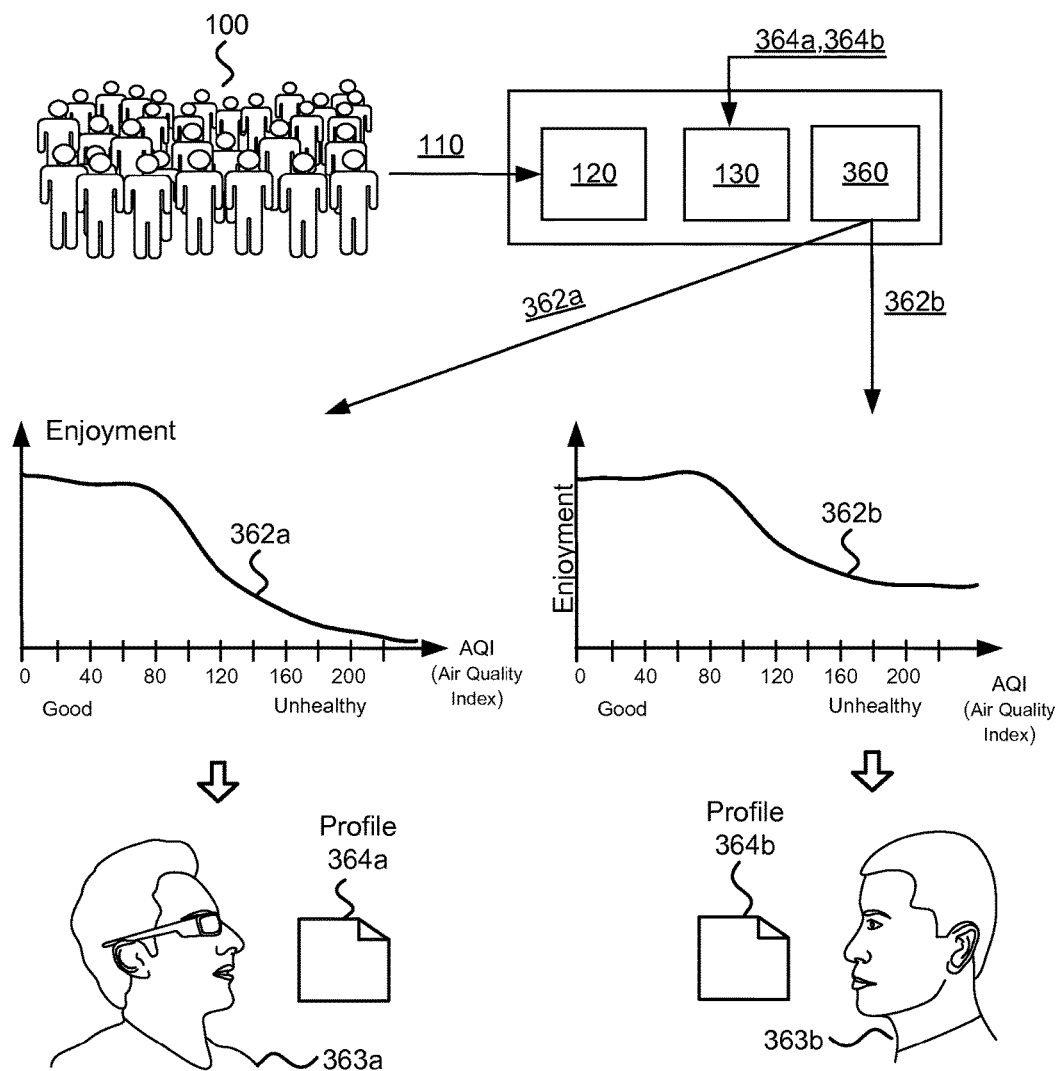
FIG. 47 illustrates a scenario where personalized functions describing enjoyment from an experience under various environmental conditions are generated for different users.

FIG. 47 illustrates such a scenario where personalized functions describing enjoyment from an experience under various environmental conditions are generated for different users. In this illustration, certain first user 363a and certain second user 363b have different profiles 364a and 364b, respectively. Given these profiles, the personalization module 130 generates different outputs that are utilized by the function learning module to learn functions 362a and 362b for the certain first user 363a and the certain second user 363b, respectively. The different functions indicate different expected affective response trends due to the environmental parameter. In this example, the environmental parameter is the Air Quality Index (AQI). Based on his profile, the certain first user 363a is predicted to be sensitive to air quality and thus will likely not enjoy outdoor activities when the AQI is high. Based on the different graphs, it may be concluded that the certain second user 363b is not expected to be as sensitive to air quality as the certain first user 363a.

In one embodiment, the function comparator module configured to receive descriptions of first and second functions describing expected affective responses to having respective first and second experiences in environments characterized by different values of the environmental parameter. The function comparator module 284 is further configured to compare the first and second functions and to provide an indication of at least one of the following: (i) the experience from amongst the first and second experiences, for which the average expected affective response to having the respective experience in an environment characterized by the environmental having a value that is at most a certain value p; (ii) the experience from amongst the first and second experiences, for which the average expected affective response to having the respective experience in an environment characterized by the environmental having a value that is at least a certain value p; and (iii) the experience from amongst the first and second experiences, for which the average expected affective response to having the respective experience in an environment characterized by the environmental having a certain value p, is greatest.

Exemplary Embodiments

Following are some non-limiting examples of embodiments that may be implemented based on the teachings of this disclosure. In particular, some embodiments described below exemplify how some of the systems and methods described above may be utilized to generate crowd-based results for many of the types of experiences mentioned in this disclosure. Additional information regarding some of the different types of experiences mentioned in embodiments below may be found at least in Section 3—Experiences in this disclosure.

In one embodiment, a system configured to dynamically alert about locations associated with negative affective response, includes:

a memory storing computer executable modules; and a processor configured to execute the computer executable modules; the computer executable modules including:

a collection module configured to receive measurements of affective response of users; wherein each user spent at least one minute in at least one location from among a plurality of locations, and the measurements include one or more measurements of the user taken with a sensor coupled to the user after the user arrives at the location;

a dynamic scoring module configured to compute scores for the plurality of locations; wherein each score corresponds to a time t, and is computed based on measurements of at least five of the users taken at most a certain period Δt before the time t, and no later than the time t; and wherein each of the at least five users spent at least one minute at the location after the time t−Δt;

a significance module configured to compute significance levels of the scores for the plurality of the locations;

an alert module configured to: evaluate the scores and significance levels, and to determine whether one or more of the following conditions are met for a location from among the plurality of locations: a score for the location corresponding to the time t reaches a predetermined threshold, and a significance of the score reaches a predetermined level; wherein responsive to at least one of the above conditions being met, the alert module is further configured to forward, no later than one day after the time t, a notification indicative of at least one of the conditions being met for the location; and wherein a score for a location reaching the predetermined threshold is indicative that, on average, users whose measurements were used to compute the score had a negative affective response when their measurements were taken.

Optionally, for at least a certain location, a first time $t_1$, and a second time $t_2$, a score for the location corresponds to $t_1$ does not reach the predetermined threshold, and a score for the location that corresponds to $t_2$ reaches the predetermined threshold; and wherein $t_2$ is after $t_1$, and the score for the location that corresponds to $t_2$ is computed based on at least one measurement taken after $t_1$.

Optionally, the statistical test includes a permutation test.

Optionally, the significance is based on a p-value corresponding to observing a difference that is at least as large as the difference between the first and second experience scores if the first and second subsets are shuffled such that the measurements collected from the first and second subsets are redistributed to those subsets randomly.

Optionally, the plurality of locations includes one or more of the following: a city, a country, and a continent.

Optionally, the plurality of locations include one or more of the following: a park, a public building, an office building, a mall, an airport, a train station, a subway station, and a port.

Optionally, the plurality of locations include one or more rooms in a building.

Optionally, the statistical test includes a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled.

Optionally, the significance of the hypothesis is determined based on at least one of: a nonparametric test that compares between the measurements in the first subset and the measurements in the second subset, and a parametric test that compares between the measurements in the first subset and the measurements in the second subset.

Optionally, the parametric test that compares between the measurements in the first subset and the measurements in the second subset determines significance of a hypothesis that the mean of measurements in the first subset is the same as the mean of measurements in the second subset.

Optionally, measurements taken earlier than t−Δt are not utilized by the dynamic scoring module to compute a score corresponding to the time t.

The system further includes a baseline normalizer configured to receive baseline affective response values of the users and to normalize the measurements of affective response with respect to the baseline affective response values.

Optionally, a measurement of affective response of a user used to compute a score for a location corresponding to time t is normalized with respect to a baseline affective response value that is based on a previous measurement of affective response of the user taken prior to the time t−Δt.

Optionally, a certain measurement of affective response of a user used to compute a score for a location corresponding to time t is normalized with respect to a baseline affective response value that is based on a previous measurement of affective response of the user taken before the time the user arrived at the location and before the certain measurement was taken.

Optionally, the dynamic scoring module is further configured to assign weights to measurements used to compute a score corresponding to the time t, such that an average of weights assigned to measurements whose value is more negative than the median of the measurements used to compute the score, is higher than an average of weights assigned to measurements whose value is not more negative than the median.

Optionally, the dynamic scoring module is further configured to assign weights to measurements used to compute a score corresponding to the time t, such that an average of weights assigned to measurements taken before t−Δt is lower than an average of weights assigned to measurements taken after t−Δt; wherein the dynamic scoring module is further configured to utilize the weights to compute the score corresponding to the certain time.

Optionally, the dynamic scoring module is further configured to assign weights to measurements used to compute a score corresponding to the time t, such that for a value Δt'<Δt, an average of weights assigned to measurements taken before t−Δt', is higher than an average of weights assigned to measurements taken after t−Δt'; wherein the dynamic scoring module is further configured to utilize the weights to compute the score corresponding to the certain time.

The system further includes a map-displaying module configured to present on a display: a map including a description of an environment that at least some of the plurality of locations, and an annotation overlaid on the map indicating at least one of: one or more scores corresponding to the time t, one or more locations for which.

Optionally, a measurement of affective response of a user, taken utilizing a sensor coupled to the user, includes at least one of the following: a value representing a physiological signal of the user, and a value representing a behavioral cue of the user.

Optionally, the measurement of affective response of the user, taken utilizing the sensor coupled to the user, event is based on values acquired by measuring the user with the sensor during at least three different non-overlapping periods while the user was at the location.

In one embodiment, a system configured to compute a location score for a location based on measurements of affective response, includes:

a memory storing computer executable modules; and a processor configured to execute the computer executable modules; the computer executable modules including:

a collection module configured to receive measurements of affective response of users, taken utilizing sensors coupled to the users; the measurements including measurements of at least ten users; wherein each measurement of a user corresponds to an event in which the user is at a location; and a scoring module configured to compute the location score based on the measurements.

Optionally, a measurement of affective response of a user, taken utilizing a sensor coupled to the user, includes at least one of the following: a value representing a physiological signal of the user and a value representing a behavioral cue of the user.

Optionally, measurement of affective response corresponding to an event is based on values acquired by measuring the user corresponding to the event with the sensor during at least three different non-overlapping periods while the user was at the location corresponding to the event.

The system further includes a personalization module configured to receive a profile of a certain user and profiles of the at least ten users, and to generate an output indicative of similarities between the profile of the certain user and the profiles of the at least ten users; wherein the scoring module is further configured to compute a location score for the certain user based on the measurements and the output; wherein, for at least a certain first user and a certain second user, who have different profiles, the scoring module computes respective first and second location scores that are different.

Optionally, at least 25% of the measurements of the at least ten users are taken within a period of one hour.

Optionally, the scoring module is further configured to receive weights for the measurements of affective response and to utilize the weights to compute the location score; wherein the weights include first and second weights for first and second measurements from among the measurements of affective response, respectively; and wherein the first weight is different from the second weight.

The system further includes a baseline normalizer module configured to receive baseline affective response values for the at least ten users and the measurements of affective response of the at least ten users, and to normalize the measurements with respect to the baseline affective response values.

The system further includes a baseline value predictor configured to predict the baseline affective response values for the at least ten users.

Optionally, the baseline value predictor is further configured to receive an indication of a certain situation of a user and to predict, based on the indication, a situation-dependent baseline affective response value for the user, which corresponds to the certain situation.

Optionally, the location score includes a value representing a quality of the location as determined based on the measurements of the at least ten users.

Optionally, the location score includes a value that is at least one of the following types: a physiological signal, a behavioral cue, an emotional state, and an affective value.

Optionally, the location score includes a value that is a function of the at least ten measurements.

Optionally, the location score is indicative of significance of an hypothesis that the at least ten users had a certain affective response.

Optionally, experiencing the certain affective response causes changes to values of at least one of measurements of physiological signals and measurements of behavioral cues, and wherein the changes to values correspond to an increase, to at least a certain extent, in a level of at least one of the following emotions: pain, anxiety, annoyance, stress, aggression, aggravation, fear, sadness, drowsiness, apathy, anger, happiness, content, calmness, attentiveness, affection, and excitement.

The system further includes utilizing an emotional state estimator from a measurement of affective response to detect the increase, of at least the certain extent, in the level of at least one of the emotions.

Optionally, the location is at least one of: a certain continent, a certain country, a certain city, a certain resort, a certain park, a certain hotel, a certain spa, a certain cruise line, a certain entertainment establishment, and a certain restaurant.

Optionally, the location exists in the physical world and occupies a space of at least 5 cubic meters.

Optionally, the location is a virtual environment in a virtual world, with at least one instantiation of the virtual environment stored in a memory of a computer; wherein a user is considered to be in a virtual environment by virtue of having a value stored in the memory of the computer indicating presence of a representation of the user in the virtual environment.

Optionally, the location involves engaging in a certain activity in the location; wherein the certain activity belongs to a set including exercise activities, recreational activities, shopping related activities, dining related activities, consuming digital content, resting, playing games, visiting a location in the physical world, interacting in a virtual environment, and receiving services; and wherein the certain location belongs to a set including locations that are of one or more of the following types: countries of the world, cities in the world, neighborhoods in cities, parks, beaches, stadiums, hotels, restaurants, theaters, night clubs, bars, shopping malls, stores, theme parks, museums, zoos, spas, health clubs, exercise clubs, clinics, and hospitals.

Optionally, the user stays at the location for a certain period of time; wherein the certain location belongs to a set including locations that are of one or more of the following types: cities, neighborhoods, parks, beaches, restaurants, theaters, night clubs, bars, shopping malls, stores, theme parks, museums, zoos, spas, health clubs, exercise clubs, clinics, and hospitals; and wherein the certain period of time is a recurring period of time including at least one of: a certain hour during the day, a certain day of the week, a certain day of the month, and a certain holiday; and wherein the certain location belongs to a set including locations that are of one or more of the following types: continents, countries, cities, parks, beaches, theme parks, museums, and zoos; and wherein the certain period is a recurring period of time includes at least one of: a season of the year, a month of the year, and a certain holiday.

Optionally, the user stays at the location for a certain duration, and the location belongs to a set including locations that are of one or more of the following types: cities, neighborhoods, parks, beaches, restaurants, theaters, night clubs, bars, shopping malls, stores, theme parks, museums, zoos, spas, health clubs, and exercise clubs; and wherein the certain duration is longer than 5 minutes and shorter than a week.

Optionally, the user stays at the location for a certain duration, and the location belongs to a set including locations that are of one or more of the following types: continents, countries, cities, parks, hotels, cruise ships, and resorts; and wherein the certain duration is longer than an hour and shorter than two months.

Optionally, staying at the location involves engaging in a certain activity during a certain period of time; wherein the certain activity belongs to a set including exercise activities, recreational activities, work related activities, household related activities, shopping related activities, dining related activities, consuming digital content, playing games, studying, resting, visiting a location in the physical world, interacting in a virtual environment, and receiving services.

Optionally, staying at the location involves engaging in a certain activity during a certain period of time; wherein the certain period of time is a recurring period of time including at least one of: a certain hour during the day, a certain day of the week, a certain day of the month, and a certain holiday.

Optionally, staying at the location involves engaging in a certain activity for a certain duration; wherein the certain activity belongs to a set including exercise activities, recreational activities, work related activities, household related activities, shopping related activities, dining related activities, consuming digital content, playing games, visiting a location in the physical world, interacting in a virtual environment, studying, resting, and receiving services; and wherein the certain duration is longer than one minute and shorter than one day.

The system further includes a statistical test-based significance module configured to compute a significance level of a hypothesis about the measurements of the at least ten users utilizing personalized models of the at least ten users; wherein a personalized model of a user is trained on data including measurements of affective response of the user; and wherein the location score is computed based on the significance level.

The system further includes a statistical test-based significance module configured to compute a significance level of a hypothesis about the measurements of the at least ten users utilizing a model trained on data including measurements of affective response of a group of users; and wherein the location score is computed based on the significance level.

Optionally, the location score is computed using a predetermined arithmetic function applied to the measurements.

Optionally, the location score has a value that is greater than the minimum of the measurements and lower than the maximum of the measurements.

Optionally, applying the predetermined arithmetic function to the measurements includes computing at least one of the following: a weighted average of the measurements, a geometric mean of the measurements, and a harmonic mean of the measurements.

The system further includes a recommender module configured to recommend, based on the location score, a location to a user in a manner that belongs to a set including first and second manners; wherein when recommending a location in the first manner, the recommender module provides a stronger recommendation for the location, compared to a recommendation for the location that the recommender module provides when recommending in the second manner.

Optionally, the recommender module is further configured to: recommend the location in the first manner when a location score for the location reaches a predetermined threshold, and to recommend the location in the second manner when the location score does not reach the predetermined threshold.

Optionally, the recommender module is further configured to recommend a location via a display of a user interface; and wherein recommending in the first manner includes one or more of the following: (i) utilizing a larger icon to represent the location on a display of the user interface, compared to the size of the icon utilized to represent the location on the display when recommending in the second manner; (ii) presenting images representing the location for a longer duration on the display, compared to the duration during which images representing the location are presented when recommending in the second manner; (iii) utilizing a certain visual effect when presenting the location on the display, which is not utilized when presenting the location on the display when recommending the location in the second manner; and (iv) presenting certain information related to the location on the display, which is not presented when recommending the location in the second manner.

Optionally, the recommender module is further configured to recommend a location to a user by sending the user a notification about the location; and wherein recommending in the first manner includes one or more of the following: (i) sending the notification to a user about the location at a higher frequency than the frequency the notification about the location is sent to the user when recommending the location in the second manner; (ii) sending the notification to a larger number of users compared to the number of users the notification is sent to when recommending the location in the second manner; and (iii) on average, sending the notification about the location sooner than it is sent when recommending the location in the second manner.

Optionally, the at least ten users consist a number of users that falls into one of the following ranges: 10-24, 25-99, 100-999, 1000-9999, 10000-99999, 100000-1000000, and more than one million.

Optionally, the measurements of the at least ten users include first and second measurements, such that the first measurement is taken at least 24 hours before the second measurement is taken.

In one embodiment, a computer-implemented method for computing a location score for a certain location based on measurements of affective response, includes:

receiving, by a system including a processor and memory, measurements of affective response of at least ten users; wherein each measurement of a user is taken at most ten minutes after leaving the certain location; and computing, by the system, the location score based on the measurements; wherein the location score represents the affective response of the at least ten users to visiting the certain location.

The method further includes receiving, by the system, baseline affective response value for the at least ten users, and normalizing the measurements of the at least ten users with respect to the baseline affective response values.

The method further includes receiving, by the system, a profile of a certain user and profiles of at least some of the at least ten users, computing similarities between the profile of the certain user and a profile of each of the at least some of the at least ten users, weighting the measurements of the at least ten users based on the similarities, and utilizing the weights for computing the location score.

The method further includes utilizing sensors for taking the measurements of the at least ten users; wherein each sensor is coupled to a user, and a measurement of a sensor coupled to a user includes at least one of the following: a measurement of a physiological signal of the user and a measurement of a behavioral cue of the user.

The method further includes collecting, by the system, at least 25% of the measurements of the at least ten users within a period of one hour.

In one embodiment, a non-transitory computer-readable medium has instructions stored thereon. In response to execution by a system including a processor and memory, the instructions cause the system to perform operations including:

receiving measurements of affective response of at least ten users; wherein each measurement of a user is taken at most ten minutes after leaving the certain location; and computing a location score based on the measurements; wherein the location score represents the affective response of the at least ten users to visiting the certain location.

In one embodiment, a system configured to report a location score for a certain location based on measurements of affective response, includes:

sensors configured to take measurements of affective response of users; the measurements including measurements of affective response of at least ten users; wherein each measurement of a user is taken at most ten minutes after leaving the certain location; and user interfaces configured to receive data describing the location score; wherein the location score is computed based on the measurements of the at least ten users and represents the affective response of the at least ten users to visiting the certain location; and the user interfaces are further configured to report the location score.

Optionally, the sensors include a sensor implanted in the body of a user from among the at least ten users.

Optionally, the sensors include a sensor embedded in a device used by a user from among the at least ten users.

Optionally, at least some of the sensors are embedded in at least one of: clothing items, footwear, jewelry items, and wearable artifacts.

Optionally, the sensors include a sensor that is not in physical contact with the user of whom the sensor takes a measurement of affective response.

Optionally, the sensor is an image capturing device used to take a measurement of affective response of a user including one or more images of the user.

Optionally, at least some of the sensors are configured to take measurements of physiological signals of the at least ten users.

Optionally, at least some of the sensors are configured to take measurements of behavioral cues of the at least ten users.

Optionally, the at least ten users include a user that receives an indication of the location scores via a user interface from among the user interfaces.

The system further includes a device coupled to a sensor from among the sensors and to a user interface from among the user interfaces; wherein the device is configured to receive a measurement taken with the sensor, and to transmit the measurement; and wherein the device is further configured to receive data describing the location score and to forward it for presentation via the user interface.

Optionally, the at least ten users consist a number of users that falls into one of the following ranges: 10 to 24, 25-99, 100-999, 1000-9999, 10000-99999, 100000-1000000, and more than one million.

Optionally, the measurements of the at least ten users include first and second measurements, such that the first measurement is taken at least 24 hours before the second measurement is taken.

Optionally, at least 25% of the measurements of the at least ten users are taken within a period of one hour.

Optionally, the location score includes a value representing a quality of the certain location as determined based on the measurement of the at least ten users.

Optionally, the location score includes a value that is at least one of the following types: a physiological signal, a behavioral cue, an emotional state, and an affective value.

Optionally, the location score includes a value that is a function of the at least ten measurements.

Optionally, the location score is indicative of significance of an hypothesis that the users had a certain affective response.

Optionally, experiencing the certain affective response causes changes to values of at least one of measurements of physiological signals and measurements of behavioral cues, and wherein the changes to values correspond to an increase, to at least a certain extent, in a level of at least one of the following emotions: pain, anxiety, annoyance, stress, aggression, aggravation, fear, sadness, drowsiness, apathy, anger, happiness, content, calmness, attentiveness, affection, and excitement.

The system further includes utilizing an emotional state estimator from a measurement of affective response to detect the increase, of at least the certain extent, in level of at least one of the emotions.

The system further includes a software agent, executed by a processor, configured to receive a baseline affective response value for a user and a measurement of affective response of the user and to normalize the measurement with respect to the baseline affective response value.

A method for reporting a location score for a certain location based on measurements of affective response, includes:

taking measurements of affective response of users with sensors; the measurements including measurements of affective response of at least ten users; wherein each measurement of a user is taken at most ten minutes after leaving the certain location;

receiving data describing the location score; wherein the location score is computed based on the measurements of the at least ten users and represents the affective response of the at least ten users to visiting the certain location; and reporting the location score via user interfaces.

The method further includes taking at least 25% of the measurements of the at least ten users within a period of one hour.

The method further includes receiving a profile of a certain user and profiles of at least some of the at least ten users, computing similarities between the profile of the certain user and a profile of each of the at least some of the at least ten users, weighting the measurements of the at least ten users based on the similarities, and utilizing the weights for computing the location score.

The method further includes receiving baseline affective response value for at least some of the at least ten users, measurements of affective response of the at least some of the at least ten users, and normalizing the measurements of the at least some of the at least ten users with respect to the baseline affective response values.

In one embodiment, a non-transitory computer-readable medium has instructions stored thereon. In response to execution by a system including a processor and memory, the instructions cause the system to perform operations including:

taking measurements of affective response of users with sensors; the measurements including measurements of affective response of at least ten users; wherein each measurement of a user is taken at most ten minutes after leaving the certain location;

receiving data describing a location score; wherein the location score is computed based on the measurements of the at least ten users and represents the affective response of the at least ten users to visiting the certain location; and reporting the location score via user interfaces.

The computer-readable medium further includes additional instructions that, in response to execution, cause the system to perform operations including: receiving baseline affective response value for at least some of the at least ten users, measurements of affective response of the at least some of the at least ten users, and normalizing the measurements of the at least some of the at least ten users with respect to the baseline affective response values.

Optionally, reporting the location score is done within a period of one hour from taking the measurements of affective response of the at least ten users.

A device configured to take measurements of affective response and to report crowd-based location scores, includes:

a sensor configured to take a measurement of affective response of a user to visiting a certain location;

a transmitter configured to transmit the measurement;

a receiver configured to receive data describing a location score computed based on measurements of affective response of at least three users; wherein each measurement of a user is taken at most ten minutes after leaving the certain location; and wherein the measurement of the user is one of the measurements of the at least three users; and a user interface configured to present the location score to the user.

Optionally, the at least three users visit the certain location at the same time.

Optionally, the sensor is implanted in the body of the user.

Optionally, the sensor is embedded in a device used by the user.

Optionally, the sensor is embedded in at least one of: clothing items, footwear, jewelry items, and wearable artifacts.

Optionally, the sensor is an image capturing device.

Optionally, the at least ten users consist a number of users that falls into one of the following ranges: 10 to 24, 25-99, 100-999, 1000-9999, 10000-99999, 100000-1000000, and more than one million.

Optionally, the measurements of the at least ten users include first and second measurements, such that the first measurement is taken at least 24 hours before the second measurement is taken.

A method for taking measurements of affective response and to report crowd-based location scores, includes:

taking, by a sensor, a measurement of affective response of a user to visiting a certain location;

transmitting the measurement of affective response;

receiving data describing a location score computed based on measurements of at least three users; wherein each measurement of a user is taken at most ten minutes after leaving the certain location; and wherein the measurement of the user is one of the measurements of the at least three users; and reporting the location score to the user via a user interface.

The method further includes taking the measurements of the at least three users within a period of ten minutes.

The method further includes receiving a profile of a certain user and profiles of at least three users, computing similarities between the profile of the certain user and a profile of each of the at least three users, weighting the measurements of the at least three users based on the similarities, and utilizing the weights for computing the location score.

The method further includes receiving baseline affective response value for the at least three users, measurements of affective response of the at least three users, and normalizing the measurements of the at least some of the at least three users with respect to the baseline affective response values.

In one embodiment, a non-transitory computer-readable medium has instructions stored thereon. In response to execution by a system including a processor and memory, the instructions cause the system to perform operations including:

taking a measurement of affective response of a user with a sensor coupled to the user;

receiving data describing a location score that represents an affective response of at least three users to visiting a certain location; wherein the location score is computed based on measurements of affective response of the at least three users; wherein each measurement of a user is taken at most ten minutes after leaving the certain location; and wherein the measurement of the user is one of the measurements of the at least three users; and reporting the location score to the user via a user interface.

The computer-readable medium further includes additional instructions that, in response to execution, cause the system to perform operations including receiving a baseline affective response value for the user and the measurement of affective response of the user, and to normalizing the measurement with respect to the baseline affective response value.

Optionally, reporting the location score is done within a period of one hour from taking the measurement of affective response of the user.

In one embodiment, a system configured to utilize profiles of users to compute personalized location scores based on measurements of affective response of the users, includes:

a memory storing computer executable modules; and a processor configured to execute the computer executable modules; the computer executable modules including:

a collection module configured to receive measurements of affective response of at least ten users; wherein each measurement of a user corresponds to an event in which the user is at a location;

a personalization module configured to receive a profile of a certain user and profiles of the at least ten users, and to generate an output indicative of similarities between the profile of the certain user and the profiles of the at least ten users; and a scoring module configured to compute a location score for the certain user based on the measurements and the output; wherein, for at least a certain first user and a certain second user, who have different profiles, the scoring module computes respective first and second location scores that are different.

Optionally, a profile of a user includes information that describes one or more of the following: an indication of an experience the user had, a demographic characteristic of the user, a genetic characteristic of the user, a static attribute describing the body of the user, a medical condition of the user, an indication of a content item consumed by the user, and a feature value derived from semantic analysis of communications of the user.

Optionally, a profile of a user includes information that describes one or more of the following: an indication of an experience the user had, a demographic characteristic of the user, a genetic characteristic of the user, a static attribute describing the body of the user, a medical condition of the user, an indication of a content item consumed by the user, and a feature value derived from semantic analysis of communications of the user.

Optionally, the first location score is computed based on at least one measurement that is not utilized for computing the second location score.

Optionally, a measurement utilized to compute both the first and second location scores has a first weight when utilized to compute the first location score and the measurement has a second weight, different from the first weight, when utilized to compute the second location score.

The system further includes a recommender module configured to recommend a location to a user in a manner that belongs to a set including first and second manners; wherein when recommending a location in the first manner, the recommender module provides a stronger recommendation for the location, compared to a recommendation for the location that the recommender module provides when recommending in the second manner.

Optionally, the recommender module is further configured to: recommend the location in the first manner when a location score for the location reaches a predetermined threshold, and to recommend the location in the second manner when the location score does not reach the predetermined threshold.

Optionally, responsive to the first location score reaching the predetermined threshold, the location is recommended, by the recommender module, to the certain first user in the first manner; and wherein responsive to the second location score not reaching the predetermined threshold, the location is recommended, by the recommender module, to the certain second user in the second manner.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the location score is computed based on the measurements of the at least ten users and the weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the location score is computed based on measurements of the at least eight users.

In one embodiment, a computer-implemented method for utilizing profiles of users to compute personalized location scores based on measurements of affective response of the users, includes:

receiving, by a system including a processor and memory, measurements of affective response of at least ten users; wherein each measurement of a user corresponds to an event in which the user is at a location;

receiving a profile of a certain user and profiles of the at least ten users, and generating an output indicative of similarities between the profile of the certain user and the profiles of the at least ten users; and computing a location score for the certain user based on the measurements and the output; wherein, for at least a certain first user and a certain second user, who have different profiles, the computed respective first and second location scores are different.

The method further includes computing the first location score based on at least one measurement that is not utilized for computing the second location score.

The method further includes weighting a measurement utilized to compute both the first and second location scores with a first weight when utilized to compute the first location score and with a second weight, different from the first weight, when utilized to compute the second location score.

The method further includes recommending a location to a user in a manner that belongs to a set including first and second manners; wherein when recommending a location in the first manner, the recommender module provides a stronger recommendation for the location, compared to a recommendation for the location that the recommender module provides when recommending in the second manner.

The method further includes recommending the location in the first manner when a location score for the location reaches a predetermined threshold, and recommending the location in the second manner when the location score does not reach the predetermined threshold.

Optionally, responsive to the first location score reaching the predetermined threshold, recommending the location to the certain first user in the first manner; and wherein responsive to the second location score not reaching the predetermined threshold, recommending the location to the certain second user in the second manner.

In one embodiment, a system configured to dynamically alert about affective response corresponding to being at a location, includes:

a memory storing computer executable modules; and a processor configured to execute the computer executable modules; the computer executable modules including:

a collection module configured to receive measurements of affective response of users; wherein each measurement of a user corresponds to an event in which the user is at the location;

a dynamic scoring module configured to compute scores for the location; wherein each score corresponds to a time t, and is computed based on measurements of at least five of the users taken at a time that is at most a first period before t, and not later than t; and an alert module configured to determine whether a score corresponding to a certain time reaches a predetermined threshold, and responsive to the score reaching the predetermined threshold, to forward, no later than a second period after the certain time, a notification indicative of the score for the location reaching the predetermined threshold; wherein both the first and second periods are shorter than twelve hours; wherein for at least a certain first time $t_1$ and a certain second time $t_2$, a score corresponding to $t_1$ does not reach the predetermined threshold and a score corresponding to $t_2$ reaches the predetermined threshold; and wherein $t_2 > t_1$, and the score corresponding to $t_2$ is computed based on at least one measurement taken after $t_1$.

The system further includes a map-displaying module configured to present on a display: a map including a description of an environment that includes the location, and an annotation overlaid on the map and indicating at least one of: the score corresponding to the certain time, the certain time, and the location.

Optionally, the locations are places that provide entertainment belonging to a set including one or more of the following: clubs, pubs, movie theaters, theaters, casinos, stadiums, and concert venues.

Optionally, the locations are a places of business belonging to a set including one or more of the following: stores, booths, shopping malls, shopping centers, markets, supermarket, beauty salon, spas, and hospital clinics.

Optionally, the notification is forwarded to a first recipient whose distance from the located is below a distant-threshold, and the notification is not forwarded to a second recipient whose distance from the located is above the distant-threshold.

The system further includes a personalization module configured to receive a profile of a certain user and profiles of the users, and to generate an output indicative of similarities between the profile of the certain user and the profiles of the users; wherein the dynamic scoring module is further configured to compute scores for the location for a certain user based on the output and the measurements of at least five of the users taken at a time that is at most a first period before t, and not later than t; and wherein for at least a certain first user and a certain second user, who have different profiles, the dynamic scoring module computes different respective first and second scores corresponding to a certain time; and wherein the first score reaches the predetermined threshold while the second score does not reach the predetermined threshold.

Optionally, the alert module is further configured to receive the predetermined threshold from at least one of: a certain user, and a software agent operating on behalf of the certain user; and wherein responsive to the score corresponding to the certain time reaching the predetermined threshold, the alert module forwards the notification to the certain user, no later than a second period after the certain time.

Optionally, a score computed based on measurements of affective response of certain users reaching the predetermined threshold is indicative that, on average, the certain users had a positive affective response when their measurements were taken.

Optionally, a score computed based on measurements of affective response of certain users reaching the predetermined threshold is indicative that, on average, the certain users had a negative emotional state when their measurements were taken.

Optionally, the first period is shorter than four hours and the second period is shorter than two hours.

Optionally, both the first and the second periods are shorter than one hour.

Optionally, measurements taken earlier than the first period before the time t are not utilized by the dynamic scoring module to compute the score corresponding to t.

Optionally, the dynamic scoring module is further configured to assign weights to measurements used to compute the score corresponding to the time t, such that an average of weights assigned to measurements taken earlier than the first period before t is lower than an average of weights assigned to measurements taken later than the first period before t; wherein the dynamic scoring module is further configured to utilize the weights to compute the score corresponding to t.

Optionally, the alert module is further configured to determine whether, after a score corresponding to a certain time reaches the predetermined threshold, a second score corresponding to a later time occurring after the certain time falls below the predetermined threshold, and responsive to the second score falling below the predetermined threshold, to forward, no later than the second period after the later time, a notification indicative of the score falling below the predetermined threshold.

Optionally, the measurements of affective response of the users are taken utilizing sensors coupled to the users; wherein a measurement of affective response of a user, taken utilizing a sensor coupled to the user, includes at least one of the following: a value representing a physiological signal of the user and a value representing a behavioral cue of the user.

Optionally, measurement of affective response corresponding to an event is based on values acquired by measuring the user corresponding to the event with the sensor during at least three different non-overlapping periods while the user is at the location corresponding to the event.

A method for dynamically alerting about affective response corresponding to being at a location, includes:

receiving, by a system including a processor and memory, measurements of affective response of users; wherein each measurement of a user corresponds to an event in which the user is at the location;

computing scores for the location, each score corresponds to a time t, based on measurements of at least five of the users taken at a time that is at most a first period before t, and not later than t; and determining whether a score corresponding to a certain time reaches a predetermined threshold, and responsive to the score reaching the predetermined threshold, forwarding, no later than a second period after the certain time, a notification indicative of the score for the location reaching the predetermined threshold;

wherein both the first and second periods are shorter than twelve hours; wherein for at least a certain first time $t_1$ and a certain second time $t_2$, a score corresponding to $t_1$ does not reach the predetermined threshold and a score corresponding to $t_2$ reaches the predetermined threshold; and wherein $t_2 > t_1$; and computing the score corresponding to $t_2$ based on at least one measurement taken after $t_1$.

The method further includes presenting on a display: a map including a description of an environment that includes the location, and an annotation overlaid on the map and indicating at least one of: the score corresponding to the certain time, the certain time, and the location.

The method further includes forwarding the notification to a first recipient whose distance from the located is below a distant-threshold, and not forwarding the notification to a second recipient whose distance from the located is above the distant-threshold.

The method further includes receiving a profile of a certain user and profiles of the users, and generating an output indicative of similarities between the profile of the certain user and the profiles of the users; and further including computing scores for the location for a certain user based on the output and the measurements of at least five of the users taken at a time that is at most a first period before t, and not later than t; and wherein for at least a certain first user and a certain second user, who have different profiles, computing different respective first and second scores corresponding to a certain time; and wherein the first score reaches the predetermined threshold while the second score does not reach the predetermined threshold.

The method further includes receiving the predetermined threshold from at least one of: a certain user, and a software agent operating on behalf of the certain user; and wherein responsive to the score corresponding to the certain time reaching the predetermined threshold, forwarding the notification to the certain user, no later than a second period after the certain time.

The method further includes not utilizing measurements taken earlier than the first period before the time t for computing the score corresponding to t.

The method further includes assigning weights to measurements used to compute the score corresponding to the time t, such that an average of weights assigned to measurements taken earlier than the first period before t is lower than an average of weights assigned to measurements taken later than the first period before t; and further including utilizing the weights for computing the score corresponding to t.

The method further includes determining whether, after a score corresponding to a certain time reaches the predetermined threshold, a second score corresponding to a later time occurring after the certain time falls below the predetermined threshold, and responsive to the second score falling below the predetermined threshold, forwarding, no later than the second period after the later time, a notification indicative of the score falling below the predetermined threshold.

Optionally, the measurements of affective response of the users are received from sensors coupled to the users; wherein a measurement of affective response of a user, taken utilizing a sensor coupled to the user, includes at least one of the following: a value representing a physiological signal of the user and a value representing a behavioral cue of the user.

The method further includes acquiring measurement of affective response corresponding to an event, by measuring the user corresponding to the event, with the sensor during at least three different non-overlapping periods while the user is at the location corresponding to the event.

In one embodiment, a system configured to alert about a hot sale at a store, includes:

a memory storing computer executable modules; and a processor configured to execute the computer executable modules; the computer executable modules including:

a collection module configured to receive measurements of affective response of buyers; wherein each measurement of a buyer corresponds to an event in which the buyer is at the store;

a dynamic scoring module configured to compute scores for the store; wherein each score corresponds to a time t, and is computed based on measurements of at least five of the buyers taken at a time that is at most a first period before t, and not later than t; and an alert module configured to determine whether a score corresponding to a certain time reaches a predetermined threshold, and responsive to the score reaching the predetermined threshold, to forward, no later than a second period after the certain time, a notification indicative of the score for the store reaching the predetermined threshold; wherein both the first and second periods are shorter than three days; wherein for at least a certain first time $t_1$ and a certain second time $t_2$ that is less than a week after $t_1$, a score corresponding to $t_1$ does not reach the predetermined threshold and a score corresponding to $t_2$ reaches the predetermined threshold; and wherein the score corresponding to $t_2$ is computed based on at least one measurement taken after $t_1$.

The system further includes a map-displaying module configured to present on a display: a map including a description of an environment that includes the location, and an annotation overlaid on the map and indicating at least one of: the score corresponding to the certain time, the certain time, and the location.

Optionally, reaching the predetermined threshold means a hot sale, and the processor is further configured to provide to a user a coupon related to the hot sale alert; wherein the user is not one of the buyers whose measurements of affective response were used by the alert module to determine that the score corresponding to the certain time reaches the predetermined threshold.

Optionally, reaching the predetermined threshold means a hot sale, and the processor is further configured to accompany the presentation of the hot sale alert, to a user, with an image and/or a video taken by at least one of the buyers whose measurements of affective response were used by the alert module to determine that the score corresponding to the certain time reaches the predetermined threshold.

A method for alerting about a hot sale at a store, includes:

receiving measurements of affective response of buyers; wherein each measurement of a buyer corresponds to an event in which the buyer is at the store;

computing scores for the store, each score corresponds to a time t, based on measurements of at least five of the buyers taken at a time that is at most a first period before t, and not later than t; and determining whether a score corresponding to a certain time reaches a predetermined threshold, and responsive to the score reaching the predetermined threshold, forwarding, no later than a second period after the certain time, a notification indicative of the score for the store reaching the predetermined threshold; wherein both the first and second periods are shorter than three days; wherein for at least a certain first time $t_1$ and a certain second time $t_2$ that is less than a week after $t_1$, a score corresponding to $t_1$ does not reach the predetermined threshold and a score corresponding to $t_2$ reaches the predetermined threshold; and computing the score corresponding to $t_2$ based on at least one measurement taken after $t_1$.

The method further includes presenting on a display: a map including a description of an environment that includes the location, and an annotation overlaid on the map and indicating at least one of: the score corresponding to the certain time, the certain time, and the location.

Optionally, reaching the predetermined threshold means a hot sale, and further including providing to a user a coupon related to the hot sale alert; wherein the user is not one of the buyers whose measurements of affective response were used by the alert module to determine that the score corresponding to the certain time reaches the predetermined threshold.

Optionally, reaching the predetermined threshold means a hot sale, and further including accompanying the presentation of the hot sale alert, to a user, with an image and/or a video taken by at least one of the buyers whose measurements of affective response were used by the alert module to determine that the score corresponding to the certain time reaches the predetermined threshold.

In one embodiment, a system configured to utilize profiles of users to generate personalized alerts about a location, includes:

a memory storing computer executable modules; and a processor configured to execute the computer executable modules; the computer executable modules including:

a collection module configured to receive measurements of affective response of users; wherein each measurement of a user corresponds to an event in which the user is at the location;

a personalization module configured to receive a profile of a certain user and profiles of the users, and to generate an output indicative of similarities between the profile of the certain user and the profiles of the users;

a dynamic scoring module configured to compute scores for the location for a certain user; wherein each score corresponds to a time t, and is computed based on the output and measurements of at least five of the users taken at a time that is at most a first period before t, and not later than t; and an alert module configured to determine whether a score for a certain user, which corresponds to a certain time, reaches a predetermined threshold, and responsive to the score reaching the predetermined threshold, to forward to the certain user, no later than a second period after the certain time, a notification indicative of the score reaching the predetermined threshold; wherein both the first and the second periods are shorter than twelve hours; wherein for at least a certain first user and a certain second user, who have different profiles, the dynamic scoring module computes different respective first and second scores corresponding to a certain time $t_1$; and wherein the first score reaches the predetermined threshold while the second score does not reach the predetermined threshold.

Optionally, there is a social event at the location, and the notification is forward to the certain user when it is predicted that measurements of affective response of users at the social event reach a level that interests the user.

Optionally, there is a trade show cabin at the location, and the notification is forward to the certain user when it is predicted that measurements of affective response of users at the cabin reach a level that interests the user.

Optionally, for at least a certain second time $t_2 > t_1$, an additional score corresponding to the certain time $t_2$ and computed for the certain second user reaches the predetermined threshold; and wherein the additional score is computed based on at least one measurement taken after $t_1$.

Optionally, a score computed based on measurements of affective response of certain users reaching the predetermined threshold is indicative that, on average, the certain users had a positive affective response when their measurements were taken.

Optionally, a score computed based on measurements of affective response of certain users reaching the predetermined threshold is indicative that, on average, the certain users had a negative affective response when their measurements were taken.

Optionally, the first period is shorter than four hours and the second period is shorter than two hours.

Optionally, both the first and the second periods are shorter than one hour.

Optionally, measurements taken earlier than the first period before the time t are not utilized by the dynamic scoring module to compute the score corresponding to t.

Optionally, the dynamic scoring module is further configured to assign weights to measurements used to compute a score corresponding to the time t, such that an average of weights assigned to measurements taken earlier than the first period before t is lower than an average of weights assigned to measurements taken after the first period before t; wherein the dynamic scoring module is further configured to utilize the weights to compute the score corresponding to t.

Optionally, the alert module is further configured to determine whether an additional score corresponding to a later time, which is after the time t, falls below the predetermined threshold, and responsive to the additional score falling below the predetermined threshold, to forward, no later than the second period after the later time, a notification indicative of the additional score falling below the predetermined threshold.

Optionally, the measurements of the users are taken utilizing sensors coupled to the users; wherein a measurement of affective response of a user, taken utilizing a sensor coupled to the user, includes at least one of the following: a value representing a physiological signal of the user and a value representing a behavioral cue of the user.

Optionally, measurement of affective response corresponding to an event is based on values acquired by measuring the user corresponding to the event with the sensor coupled to the user during at least three different non-overlapping periods while the user is at the location corresponding to the event.

A method for utilizing profiles of users to generate personalized alerts about a location, includes:

receiving measurements of affective response of users; wherein each measurement of a user corresponds to an event in which the user is at the location;

receiving profiles of users;

receiving a first profile of a first user, and generating a first output indicative of similarities between the first profile and the profiles;

receiving a second profile of a second user, which is different from the first profile, and generating a second output indicative of similarities between the second profile and the profiles; wherein the second output is different from the first output;

computing a first score for the location for the first user, which corresponds to a time $t_1$, based on the first output and a first set of measurements of at least five of the users, taken at a time that is at most a first period before $t_1$, and not later than $t_1$;

computing a second score for the location for the second user, which corresponds to $t_1$, based on the second output and a second set of measurements of at least five of the users, taken at a time that is at most the first period before $t_1$, and not later than $t_1$;

determining that the first score reaches a predetermined threshold, and forwarding to the first user, no later than a second period after $t_1$, a notification indicative of the first score reaching the predetermined threshold; and determining that the second score does not reach the predetermined threshold, and refraining from forwarding to the second user, at a time between $t_1$ and the second period after $t_1$, a notification indicative of the second score reaching the predetermined threshold.

Optionally, there is a social event at the location, and forwarding the notification to the certain user when it is predicted that measurements of affective response of users at the social event reach a level that interests the user.

Optionally, there is a trade show cabin at the location, and forwarding the notification to the certain user when it is predicted that measurements of affective response of users at the cabin reach a level that interests the user.

Optionally, for at least a certain second time $t_2 > t_1$, computing an additional score corresponding to the certain time $t_2$ for the certain second user reaches the predetermined threshold; and computing the additional score based on at least one measurement taken after $t_1$.

The method further includes not utilizing measurements taken earlier than the first period before the time t for computing the score corresponding to t.

The method further includes assigning weights to measurements used to compute a score corresponding to the time t, such that an average of weights assigned to measurements taken earlier than the first period before t is lower than an average of weights assigned to measurements taken after the first period before t; and further including utilizing the weights for computing the score corresponding to t.

The method further includes determining whether an additional score corresponding to a later time, which is after the time t, falls below the predetermined threshold, and responsive to the additional score falling below the predetermined threshold, forwarding, no later than the second period after the later time, a notification indicative of the additional score falling below the predetermined threshold.

The method further includes utilizing sensors coupled to the users for taking the measurements of affective response of the users; wherein a measurement of affective response of a user, taken utilizing a sensor coupled to the user, includes at least one of the following: a value representing a physiological signal of the user and a value representing a behavioral cue of the user.

Optionally, taking measurement of affective response corresponding to an event is based on acquiring values by measuring the user corresponding to the event with the sensor coupled to the user during at least three different non-overlapping periods while the user is at the location corresponding to the event.

In one embodiment, a system configured to generate personalized alerts about a location, includes:

a memory storing computer executable modules; and a processor configured to execute the computer executable modules; the computer executable modules including:

a collection module configured to receive measurements of affective response of users; wherein each measurement of a user corresponds to an event in which the user is at the location;

a dynamic scoring module configured to compute scores for the location; wherein each score corresponds to a time t, and is computed based on measurements of at least five of the users taken at a time that is at most a first period before t, and not later than t; and a personalized alert module configured to receive a predetermined threshold corresponding to a certain user, and to determine whether a score corresponding to a certain time reaches the predetermined threshold, and responsive to the score reaching the predetermined threshold, to forward to the certain user, no later than a second period after the certain time, a notification indicative of the score reaching the predetermined threshold;

wherein both the first and second periods are shorter than twelve hours;

wherein for at least a certain first user and a certain second user, with corresponding first and second predetermined thresholds, respectively, the personalized alert module forwards alerts differently;

wherein the first predetermined threshold is lower than the second predetermined threshold and a first score corresponding to a time $t_1$ reaches the first predetermined threshold, but does not reach the second predetermined threshold; and a second score corresponding to a time $t_2 > t_1$ reaches the second predetermined threshold;

and wherein the personalized alert module forwards to the certain first user a first notification indicative of the first score reaching the first predetermined threshold, and forwards to the certain second user a second notification indicative of the second score reaching the second predetermined threshold; and wherein the first notification is forwarded before the second notification is forwarded.

Optionally, the location is a store in a shopping mall, and the notification forwarded to the certain first user indicates that the certain first user might enjoy visiting the store.

Optionally, the distance of the certain first user from the location is below a first predetermined threshold; the distance of the certain second user from the location is below a second predetermined threshold; the distance of a certain third user, who is similar to the certain first user, from the location is above the first predetermined threshold; and the distance of a certain fourth user, who is similar to the certain second user, from the location is above the second predetermined threshold; and wherein the personalized alert module does not forward to the certain third and fourth users personalized alerts about the location.

Optionally, the dynamic alert module does not forward an alert to the certain second user indicative that a score corresponding to a time t' reaches the second predetermined threshold, where $t_1 < t' < t_2$.

Optionally, the first notification is forwarded before $t_2$.

Optionally, a score computed based on measurements of affective response of certain users reaching the predetermined threshold is indicative that, on average, the certain users had a positive affective response when their measurements were taken.

Optionally, a score computed based on measurements of affective response of certain users reaching the predetermined threshold is indicative that, on average, the certain users had a negative affective response when their measurements were taken.

Optionally, the first period is shorter than four hours and the second period is shorter than two hours.

Optionally, both the first and the second periods are shorter than one hour.

Optionally, the predetermined threshold corresponding to the certain user is provided by at least one of: the certain user, a software agent operating on behalf of the certain user.

The system further includes a personalized threshold setting module configured to receive a profile of the certain user and to determine the threshold corresponding to the certain user based on information in the profile.

The system further includes a profile comparator module configured to compute a value indicative of an extent of a similarity between a pair of profiles of users; wherein the threshold setting modules is further configured to receive profiles of users and predetermined threshold corresponding to the users and to determine the predetermined threshold corresponding to the certain user based on predetermined thresholds corresponding to users who have a profile that is similar to the profile of the certain user.

Optionally, measurements taken earlier than the first period before the time t are not utilized by the dynamic scoring module to compute the score corresponding to t.

Optionally, the dynamic scoring module is further configured to assign weights to measurements used to compute the score corresponding to the time t, such that an average of weights assigned to measurements taken earlier than the first period before t is lower than an average of weights assigned to measurements taken after the first period before t; wherein the dynamic scoring module is further configured to utilize the weights to compute the score corresponding to t.

Optionally, the alert module is further configured to determine whether an additional score corresponding to a later time, which is after the certain time, falls below the predetermined threshold, and responsive to the additional score falling below the predetermined threshold, to forward, no later than the second period after the later time, a notification indicative of the additional score falling below the predetermined threshold.

Optionally, the measurements of the users are taken utilizing sensors coupled to the users; wherein a measurement of affective response of a user, taken utilizing a sensor coupled to the user, includes at least one of the following: a value representing a physiological signal of the user and a value representing a behavioral cue of the user.

Optionally, measurement of affective response corresponding to an event is based on values acquired by measuring the user corresponding to the event with the sensor coupled to the user during at least three different non-overlapping periods while the user is at the location corresponding to the event.

A method for generating personalized alert about a location, includes:

receiving measurements of affective response of users; wherein each measurement of a user corresponds to an event in which the user is at the location;

computing scores for the location; wherein each score corresponds to a time t, and is computed based on measurements of at least five of the users taken at a time that is at most a first period before t, and not later than t; and a personalized alert module configured to receive a predetermined threshold corresponding to a certain user, and to determine whether a score corresponding to a certain time reaches the predetermined threshold, and responsive to the score reaching the predetermined threshold, to forward to the certain user, no later than a second period after the certain time, a notification indicative of the score reaching the predetermined threshold;

wherein both the first and second periods are shorter than twelve hours;

wherein for at least a certain first user and a certain second user, with corresponding first and second predetermined thresholds, respectively, the personalized alert module forwards alerts differently;

wherein the first predetermined threshold is lower than the second predetermined threshold and a first score corresponding to a time $t_1$ reaches the first predetermined threshold, but does not reach the second predetermined threshold; and a second score corresponding to a time $t_2 > t_1$ reaches the second predetermined threshold;

and wherein the personalized alert module forwards to the certain first user a first notification indicative of the first score reaching the first predetermined threshold, and forwards to the certain second user a second notification indicative of the second score reaching the second predetermined threshold; and wherein the first notification is forwarded before the second notification is forwarded.

Optionally, the location is a store in a shopping mall, and the notification forwarded to the certain first user indicates that the certain first user might enjoy visiting the store.

Optionally, the distance of the certain first user from the location is below a first predetermined threshold; the distance of the certain second user from the location is below a second predetermined threshold; the distance of a certain third user, who is similar to the certain first user, from the location is above the first predetermined threshold; and the distance of a certain fourth user, who is similar to the certain second user, from the location is above the second predetermined threshold; and wherein the personalized alert module does not forward to the certain third and fourth users personalized alerts about the location.

The method further includes providing the predetermined threshold corresponding to the certain user by at least one of: the certain user, a software agent operating on behalf of the certain user.

The method further includes receiving a profile of the certain user and determining the threshold corresponding to the certain user based on information in the profile.

The method further includes computing a value indicative of an extent of a similarity between a pair of profiles of users; and further including receiving profiles of users and predetermined threshold corresponding to the users and determining the predetermined threshold corresponding to the certain user based on predetermined thresholds corresponding to users who have a profile that is similar to the profile of the certain user.

The method further includes assigning weights to measurements used to compute the score corresponding to the time t, such that an average of weights assigned to measurements taken earlier than the first period before t is lower than an average of weights assigned to measurements taken after the first period before t; and further including utilizing the weights for computing the score corresponding to t.

The method further includes determining whether an additional score corresponding to a later time, which is after the certain time, falls below the predetermined threshold, and responsive to the additional score falling below the predetermined threshold, for forwarding, no later than the second period after the later time, a notification indicative of the additional score falling below the predetermined threshold.

The method further includes taking the measurements of the users utilizing sensors coupled to the users; wherein a measurement of affective response of a user, taken utilizing a sensor coupled to the user, includes at least one of the following: a value representing a physiological signal of the user and a value representing a behavioral cue of the user.

Optionally, measurement of affective response corresponding to an event is based on values acquired by measuring the user corresponding to the event with the sensor coupled to the user during at least three different non-overlapping periods while the user is at the location corresponding to the event.

In one embodiment, a system configured to dynamically alert about projected affective response corresponding to being at a location, includes:

a memory storing computer executable modules; and a processor configured to execute the computer executable modules; the computer executable modules including:

a collection module configured to receive measurements of affective response of users; wherein each measurement of a user corresponds to an event in which the user is at the location;

a dynamic scoring module configured to compute scores for the location based on the measurements; wherein each score corresponds to a certain time and is computed based on a subset of the measurements including measurements that were taken at a time that is at most a certain period before the certain time, and is not after the certain time; and wherein the dynamic scoring module computes at least scores $S_1$ and $S_2$ corresponding to times $t_1$ and $t_2$, respectively; and wherein $t_2 > t_1$, $S_2 > S_1$, and $S_2$ is below a predetermined threshold;

a score projector module configured to compute a projected score for the location for a certain future time based on a trend determined from a plurality of scores, each of which corresponding to the location and to a certain time before the certain future time; wherein the score projector module computes a projected score $S_3$ corresponding to a time $t_3 > t_2$, based on a trend determined based on $S_1$ and $S_2$; and wherein $S_3$ reaches the predetermined threshold; and an alert module configured to forward notifications related to projected scores; wherein responsive to $S_3$ reaching the predetermined threshold, the alert module is configured to forward, prior to the time $t_3$, a notification indicative of $S_3$ reaching the predetermined threshold.

Optionally, the location is a place that provides entertainment belonging to a set including one or more of the following: a club, a pub, a movie theater, a theater, a casino, a stadium, and a concert venue.

Optionally, $t_3 - t_2$ is more than 30 minutes, and reaching the predetermined threshold means that the recipient of the notification is expected to be interested in receiving the notification about the place that provides entertainment, while not reaching the predetermined threshold means that the recipient of the notification is not expected to be interested in receiving the notification about the place that provides entertainment.

Optionally, the location is a travel destinations belonging to a set including one or more of the following: a continent, a country, a county, a city, a resort, and a neighborhood.

Optionally, $t_3 - t_2$ is more than 3 days, and reaching the predetermined threshold means that the recipient of the notification is expected to be interested in receiving the notification about the vacation destination, while not reaching the predetermined threshold means that the recipient of the notification is not expected to be interested in receiving the notification about the vacation destination.

Optionally, the location is a places of business belonging to a set including one or more of the following: a store, a booth, a shopping mall, a shopping center, a market, a supermarket, a beauty salon, a spa, and a hospital clinic.

Optionally, $t_3 - t_2$ is more than one hour, and reaching the predetermined threshold means that the recipient of the notification is expected to be interested in receiving the notification about the place of business, while not reaching the predetermined threshold means that the recipient of the notification is not expected to be interested in receiving the notification about the place of business.

Optionally, the alert module does not forward a notification indicative of a score $S_4$ reaching the predetermined threshold; and wherein $S_4$ is computed based on $S_1$ and $S_2$, and correspond to a time $t_4$, where $t_2 < t_4 < t_3$.

Optionally, $S_2$ is computed based on at least one measurement that was taken after $t_1$.

Optionally, the score projector is configured to determine a trend based on $S_1$, $S_2$, $t_1$, and $t_2$, and to utilize the trend to project the score $S_3$ corresponding to the time $t_3$.

Optionally, $S_3$ represents a mean of a distribution of scores for the time $t_3$, wherein the distribution is computed based on $S_1$ and $S_2$ and trends based on previously computed sets of scores and their corresponding times.

Optionally, $S_3$ reaching the predetermined threshold is indicative that, on average, at the time $t_3$, users will have a positive affective response corresponding to being at the location.

Optionally, $S_3$ reaching the predetermined threshold is indicative that, on average, at the time $t_3$, users will have a negative affective response corresponding to being at the location.

Optionally, measurements taken earlier than the certain period before the certain time are not utilized by the dynamic scoring module to compute a score corresponding the certain time.

Optionally, the dynamic scoring module is further configured to assign weights to measurements used to compute a score corresponding to a certain time, such that an average of the weights assigned to measurements taken earlier than the certain period before the certain time is lower than an average of weights assigned to measurements taken after the certain period before the certain time; wherein the dynamic scoring module is further configured to utilize the weights to compute the score corresponding to the certain time.

Optionally, the score projector module is further configured to assign weights to scores when computing a projected score corresponding to a certain future time based on the scores; wherein the weights are assigned such that scores corresponding to recent times are weighted higher than scores corresponding to earlier times; and wherein when computing $S_3$, the score projector module assigns a higher weight to $S_2$ than the weight it assigns to $S_1$.

Optionally, the alert module is further configured to determine whether a score $S_5$ corresponding to a time $t_5 > t_3$ falls below the predetermined threshold, and responsive to $S_5$ falling below the predetermined threshold, to forward, prior to the time $t_5$, a notification indicative of $S_5$ falling below the predetermined threshold.

Optionally, the measurements of the users are taken utilizing sensors coupled to the users; wherein a measurement of affective response of a user, taken utilizing a sensor coupled to the user, includes at least one of the following: a value representing a physiological signal of the user and a value representing a behavioral cue of the user.

Optionally, measurement of affective response corresponding to an event is based on values acquired by measuring the user corresponding to the event with the sensor during at least three different non-overlapping periods while the user is at the location corresponding to the event.

The system further includes a personalization module configured to receive a profile of a certain user and profiles of the users, and to generate an output indicative of similarities between the profile of the certain user and the profiles of the users;

wherein the dynamic scoring module is further configured to compute a score for the certain user, which corresponds to a certain time, based on a subset of measurements and the output; wherein, for at least a certain first user and a certain second user, who have different profiles, the dynamic scoring module computes respective certain first and certain second scores that correspond to the same location and to the same certain time, and that are certain first and second scores are different.

In one embodiment, a system configured to project affective response corresponding to being at locations, includes:

a memory storing computer executable modules; and a processor configured to execute the computer executable modules; the computer executable modules including:

a collection module configured to receive measurements of affective response of users; wherein each measurement of a user corresponds to an event in which the user is at a first location or a second location;

a dynamic scoring module configured to compute scores based on the measurements; wherein each score corresponds to a time and to a location from among the first and second locations, and each score is computed based on a subset of the measurements including measurements of users who are at the location, and the measurements in the subset are taken at a time that is at most a certain period before the certain time, and is not after the certain time;

wherein the dynamic scoring module computes at least the following scores: a score $S_1$ corresponding to a time $t_1$ and to the first location; a score $S_2$ corresponding to a time $t_2$ and to the second location; a score $S_3$ corresponding to a time $t_3$ and to the first location; and a score $S_4$ corresponding to a time $t_4$ and to the second location; and wherein $t_3>t_1$, $t_4>t_1$, $t_3>t_2$, $t_4>t_2$, $S_3>S_1$, $S_2>S_4$, and $S_4>S_3$; and a score projector module configured to compute projected scores based on the scores; wherein each projected score corresponds to a future time and a location from among the first and second locations and is computed based on a trend determined from a plurality of scores;

wherein the score projector module computes:

a projected score $S_5$, corresponding to the first location and to a time $t_5>t_3$, based on a trend determined based on $S_1$ and $S_3$; and a projected score $S_6$, corresponding to the second location and to a time $t_6>t_4$, based on a trend determined based on $S_2$ and $S_4$;

wherein $S_5>S_6$; and a recommender module configured to recommend being in a location, from among the first and second locations, for a future time based on projected scores corresponding to the future time; wherein responsive to $S_5$ being greater than $S_6$, the recommender module recommends being in the first location at a time t, where $t_5>t>t_4$.

Optionally, the locations are places that provide entertainment belonging to a set including one or more of the following: clubs, pubs, movie theaters, theaters, casinos, stadiums, and concert venues.

Optionally, the recommender module is further configured to recommend a location to a user to being in a certain time in the future in a manner that belongs to a set including first and second manners; wherein when recommending the location in the first manner, the recommender module provides a stronger recommendation for the location, compared to a recommendation for the location that the recommender module provides when recommending in the second manner; and wherein for a time t, $t_5>t>t_4$, the recommender module recommends the first location in the first manner and recommends the second location in the second manner.

Optionally, at least one of the following constraints is true: (i) $t_5>t_4$ and $t_6>t_3$, and (ii) $t_5=t_6$.

Optionally, the certain period is shorter than at least one of the following durations: one minute, ten minutes, one hour, four hours, twelve hours, one day, one week, one month, and one year.

Optionally, measurements taken earlier than the certain period before the certain time are not utilized by the dynamic scoring module to compute a score corresponding the certain time.

Optionally, the dynamic scoring module is further configured to assign weights to measurements used to compute a score corresponding to a certain time, such that an average of weights assigned to measurements taken earlier than the certain period before the certain time is lower than an average of weights assigned to measurements taken after the certain period before the certain time; wherein the dynamic scoring module is further configured to utilize the weights to compute the score corresponding to the certain time.

Optionally, the score projector module is further configured to assign weights to scores when computing a projected score corresponding to a certain future time based on the scores; wherein the weights are assigned such that scores corresponding to recent times are weighted higher than scores corresponding to earlier times; and wherein when computing $S_5$, the score projector module assigns a higher weight to $S_3$ than the weight it assigns to $S_1$, and when computing $S_6$, the score projector module assigns a higher weight to $S_4$ than the weight it assigns to $S_2$.

The system further includes a map-displaying module configured to present on a display: a map including a description of an environment that includes the first and second locations, and an annotation overlaid on the map and indicating at least one of: $S_5$, $S_6$, and an indication that $S_5>S_6$.

Optionally, the description of the environment includes one or more of: a two-dimensional image representing the environment, a three-dimensional image representing the environment, an augmented reality representation of the environment, and a virtual reality representation of the environment; and wherein the annotation includes at least one of: images representing the first and second locations, and text identifying the first and second locations.

Optionally, the dynamic scoring module includes a statistical test-based significance module configured to compute a significance level of a hypothesis about a subset of measurements of users utilizing personalized models of the users; wherein a personalized model of a user is trained on data including measurements of affective response of the user; and wherein a score computed based on a subset of measurements is computed based on the significance level computed for the hypothesis about the subset of measurements.

Optionally, the dynamic scoring module includes a statistical test-based significance module configured to compute a significance level of a hypothesis about a subset of measurements of users utilizing a model trained on data including measurements of affective response of users; and wherein a score computed based on a subset of measurements is computed based on the significance level computed for the hypothesis about the subset of measurements.

Optionally, the dynamic scoring module includes an arithmetic function-based scoring module that is configured to compute a score from measurements using a predetermined arithmetic function applied to the measurements; and wherein a score computed based on a subset of measurements is the score computed by the arithmetic function-based scoring module when given an input based on the subset of measurements.

The system further includes a personalization module configured to receive a profile of a certain user and profiles of the users, and to generate an output indicative of similarities between the profile of the certain user and the profiles of the users; wherein the dynamic scoring module is further configured to compute a score for the certain user, which corresponds to a certain time, based on a subset of measurements and the output; wherein, for at least a certain first user and a certain second user, who have different profiles, the dynamic scoring module computes respective certain first and certain second scores that correspond to the same location and to the same certain time, and that are certain first and second scores are different.

In one embodiment, a system configured to rank hotel facilities based on measurements of affective response of users staying at the hotels, includes:

a memory storing computer executable modules; and a processor configured to execute the computer executable modules; the computer executable modules including:

a collection module configured to receive measurements of affective response of at least ten users; wherein each measurement of a user, is taken by a sensor coupled to the user, while the user utilizes a hotel facility from among a plurality of hotel facilities; wherein measurement of affective response corresponding to an event of utilizing a hotel facility is based on values acquired by measuring the user corresponding to the event with the sensor during at least three different non-overlapping periods while the user utilized the hotel facility corresponding to the event; and wherein for each hotel facility from among the plurality of hotel facilities, the measurements include measurements of at least five users who utilized the hotel facility; and a ranking module configured to rank the plurality of hotel facilities based on the measurements, such that, at least a first hotel facility from among the plurality of hotels is ranked higher than a second hotel facility from among the plurality of hotels; wherein, on average, the measurements of the at least five users who utilized the first hotel facility are more positive than the measurements of the at least five users who utilized the second hotel facility.

Optionally, the plurality of hotel facilities include facilities of first and second types at a first hotel, and facilities of the first and second types at a second hotel; and wherein the facility of the first type at the first hotel is ranked above the facility of the first type at the second hotel, and the facility of the second type at the second hotel is ranked above the facility of the second type at the first hotel.

The system further includes a verification module configured to verify that the at least ten users are actually staying at the hotels by authorizing the at least ten users with at least one of the following software systems: a hotel management system, a hotel ordering system, a financial system used to pay to the hotel, and a security system deployed in the hotel.

In one embodiment, a system configured to rank locations based on measurements of affective response of users to being at the locations, includes:

a memory storing computer executable modules; and a processor configured to execute the computer executable modules; the computer executable modules including:

a collection module configured to receive measurements of affective response of at least ten users; wherein each measurement of a user, is taken by a sensor coupled to the user, while the user is at a location from among a plurality of locations; wherein measurement of affective response corresponding to an event of being at a location is based on values acquired by measuring the user corresponding to the event with the sensor during at least three different non-overlapping periods while the user is at the location corresponding to the event; and wherein for each location from among the plurality of locations, the measurements include measurements of at least five users who are at the location;

a ranking module configured to rank the plurality of locations based on the measurements, such that, at least a first location from among the plurality of locations is ranked higher than a second location from among the plurality of locations; wherein, on average, the measurements of the at least five users who are at the first location are more positive than the measurements of the at least five users who are at the second location.

In one embodiment, a system configured to rank locations based on measurements of affective response of users, includes:

a memory storing computer executable modules; and a processor configured to execute the computer executable modules; the computer executable modules including:

a collection module configured to receive the measurements of affective response of the users to being at a plurality of locations; wherein for each location of the plurality of locations, the measurements include measurements of at least five users who were at the location;

a ranking module configured to rank the plurality of locations based on the measurements, such that, a first location from among the plurality of locations is ranked higher than a second location from among the plurality of locations.

Optionally, the locations are travel destinations belonging to a set including one or more of the following: continents, countries, counties, cities, resorts, and neighborhoods.

Optionally, the locations are places that provide entertainment belonging to a set including one or more of the following: clubs, pubs, movie theaters, theaters, casinos, stadiums, and concert venues.

Optionally, the locations are a places of business belonging to a set including one or more of the following: stores, booths, shopping malls, shopping centers, markets, supermarkets, beauty salons, spas, and hospital clinics, laundromat, banks, courier service offices, and restaurants.

Optionally, the ranking module includes:

a scoring module configured to compute scores for the plurality of locations; wherein, for each location from among the plurality of locations, the scoring module computes a score based on the measurements of the at least five users who were at the location; and a score-based ranking module configured to rank the plurality of locations based on the magnitudes of the scores; wherein the location score computed for the first location is higher than the location score computed for the second location;

and wherein the ranking of the plurality of locations by the ranking module is based on a ranking generated by the score-based ranking module.

Optionally, the ranking module includes:

a preference generator module configured to generate a plurality of preference rankings for the locations; wherein each preference ranking is determined based on a subset of the measurements, and includes a ranking of at least two of the locations, such that one of the at least two locations is ranked ahead of another location from among the at least two locations; and a preference-based ranking module configured to rank the locations based on the plurality of the preference rankings utilizing a method that satisfies the Condorcet criterion;

and wherein the ranking of the plurality of locations by the ranking module is based on a ranking generated by the preference-based ranking module.

The system further includes a personalization module configured to receive a profile of a certain user and profiles of at least some of the users, and to generate an output indicative of similarities between the profile of the certain user and the profiles of a least some of the users; wherein the ranking module is further configured to utilize the output to rank the plurality of locations; and wherein, for at least a certain first user and a certain second user, who have different profiles, the ranking module ranks third and fourth locations from among the plurality of locations differently, such that for the certain first user, the third location is ranked above the fourth location, and for the certain second user, the fourth location is ranked above the third location.

Optionally, at the first location the users engage in a first activity, and at the second location the users engage in a second activity; wherein the first activity is different from the second activity and the first location is different from the second location.

Optionally, the first activity and the second activity belong to a set including exercise activities, recreational activities, shopping related activities, dining related activities, viewing shows, resting, playing games, visiting a location in the physical world, interacting in a virtual environment, and receiving services.

Optionally, the first location and second location have different addresses.

Optionally, the first location and the second location occupy different regions on a map.

Optionally, a user cannot simultaneously be both at the first location and at the second location.

Optionally, the first location and the second location belong to a set including locations that are of one or more of the following types: countries of the world, cities in the world, neighborhoods in cities, private houses, parks, beaches, stadiums, hotels, restaurants, theaters, night clubs, bars, shopping malls, stores, theme parks, museums, zoos, spas, health clubs, exercise clubs, clinics, and hospitals.

Optionally, the measurements of affective response are received from users being at a first location during a first period, and from users being at a second location during a second period; wherein the first location is different from the second location and the first period is different from the second period.

Optionally, the first location and the second location belong to a set including locations that are of one or more of the following types: cities, neighborhoods, parks, beaches, restaurants, theaters, night clubs, bars, shopping malls, stores, theme parks, museums, zoos, spas, health clubs, exercise clubs, clinics, and hospitals; and wherein the first and second periods are each a different recurring period of time that corresponds to at least one of: a certain hour during the day, a certain day during the week, a certain day of the month, and a holiday.

Optionally, the first and second locations belong to a set of locations including locations that are of one or more of the following types: continents, countries, cities, parks, beaches, theme parks, museums, and zoos; and wherein the first and second periods each correspond to a different recurring period of time including at least one of: a season of the year, a month of the year, and a certain holiday.

Optionally, the measurements of affective response are received from users being at a first location for a first duration, and from users being at a second location for a second duration; wherein the first location is different from the second location and the first duration is different from the second duration.

Optionally, the first and second durations correspond to first and second ranges of lengths of time; and wherein the first and second ranges do not overlap or the overlap between the first and second ranges includes less than 50% of either of the first and second ranges.

Optionally, the first duration is at least 50% longer than the second duration.

Optionally, the first location and the second location belong to a set including locations that are of one or more of the following types: cities, neighborhoods, parks, beaches, restaurants, theaters, night clubs, bars, shopping malls, stores, theme parks, museums, zoos, spas, health clubs, and exercise clubs; and wherein the maximum of the first and second durations is longer than 5 minutes and shorter than a week.

Optionally, the first location and the second location belong to a set including locations that are of one or more of the following types: continents, countries, cities, parks, hotels, cruise ships, and resorts; and wherein the maximum of the first and second durations is between an hour and two months.

Optionally, on average, the measurements of the at least five users who were at the first location are more positive or more negative than the measurements of the at least five users who were at the second location.

Optionally, third and fourth locations, from among the plurality of locations, are given the same rank by the ranking module.

The system further includes a recommender module configured to recommend a location to a user in a manner that belongs to a set including first and second manners; wherein when recommending a location in the first manner, the recommender module provides a stronger recommendation for the location, compared to a recommendation for the location that the recommender module provides when recommending in the second manner; wherein the recommender module is further configured to: recommend the location in the first manner when the location is ranked at least at a predetermined rank, and to recommend the location in the second manner when the location is ranked below the predetermined rank.

Optionally, responsive to the first location being ranked the same as the predetermined rank, or above it, the first location is recommended in the first manner; and wherein responsive to the second location being ranked below the predetermined rank, the second location is recommended in the second manner.

In one embodiment, a system configured to utilize profiles of users to compute personalized rankings of experiences based on measurements of affective response of the users, includes:

a memory storing computer executable modules; and a processor configured to execute the computer executable modules; the computer executable modules including:

a collection module configured to receive measurements of affective response of at least ten users; wherein each measurement of a user, is taken by a sensor coupled to the user, while the user utilizes a hotel facility from among a plurality of hotel facilities;

a personalization module configured to receive a profile of a certain user and profiles of the users, and to generate an output indicative of similarities between the profile of the certain user and the profiles of the users; and a ranking module configured to rank the plurality of hotel facilities based on the output and measurements; wherein, for at least a certain first user and a certain second user, who have different profiles, the ranking module ranks first and second hotel facilities from among the plurality of hotel facilities differently, such that for the certain first user, the first hotel facility is ranked above the second hotel facility, and for the certain second user, the second hotel facility is ranked above the first hotel facility.

In one embodiment, a system configured to utilize profiles of users to compute personalized rankings of locations based on measurements of affective response of the users to being at the locations, includes:

a memory storing computer executable modules; and a processor configured to execute the computer executable modules; the computer executable modules including:

a collection module configured to receive measurements of affective response of the users to being at a plurality of locations; wherein for each location of the plurality of locations, the measurements include measurements of at least eight users who were at the location;

a personalization module configured to receive a profile of a certain user and profiles of the users, and to generate an output indicative of similarities between the profile of the certain user and the profiles of the users; and a ranking module configured to rank the plurality of locations utilizing the output and at least some of the measurements; wherein, for at least a certain first user and a certain second user, who have different profiles, the ranking module ranks first and second locations from among the plurality of locations differently, such that for the certain first user, the first location is ranked above the second location, and for the certain second user, the second location is ranked above the first location.

Optionally, the locations are travel destinations belonging to a set including one or more of the following: continents, countries, counties, cities, resorts, and neighborhoods.

Optionally, the locations are places that provide entertainment belonging to a set including one or more of the following: clubs, pubs, movie theaters, theaters, casinos, stadiums, and concert venues.

Optionally, the locations are a places of business belonging to a set including one or more of the following: stores, booths, shopping malls, shopping centers, markets, supermarkets, beauty salons, spas, and hospital clinics, laundromat, banks, courier service offices, and restaurants.

Optionally, the personalization module includes:

a profile comparator module configured to compute a value indicative of an extent of a similarity between a pair of profiles of users; and a weighting module configured to receive a profile of a certain user and profiles of the users and to generate weights for the measurements of the users; wherein the weight for a measurement of a user is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the output is indicative of the weights for the measurements of the users.

Optionally, the ranking module includes:

a scoring module configured to compute location scores for the plurality of locations; wherein, for each location from among the plurality of locations, the scoring module computes a location score based on the measurements of the at least eight users who were at the location and the weights for the measurements of the at least eight users; and a score-based ranking module configured to rank the locations based on the location scores computed for the locations, such that one location is ranked higher than another location when a location score computed for the one location is higher than a location score computed for the other location;

and wherein the ranking of the plurality of locations by the ranking module is based on a ranking generated by the score-based ranking module.

Optionally, the ranking module includes:

a preference generator module configured to generate a plurality of preference rankings for the locations; wherein each preference ranking is determined based on a subset of the measurements and the weights for the measurements belonging to the subset, and includes a ranking of at least two of the locations, such that one of the at least two locations is ranked ahead of another location from among the at least two locations;

a preference-based ranking module configured to rank the locations based on the plurality of the preference rankings utilizing a method that satisfies the Condorcet criterion.

and wherein the ranking of the plurality of locations by the ranking module is based on a ranking generated by the preference-based ranking module.

Optionally, the personalization module includes:

a clustering module configured to receive the profiles of the users, and to cluster the users into clusters based on profile similarity, with each cluster including a single user or multiple users with similar profiles;

a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the output is indicative of the at least eight users.

Optionally, the ranking module includes:

a scoring module configured to compute scores for the plurality of locations; wherein, for each location from among the plurality of locations, the scoring module computes a score based on measurements of at least five users, from among the at least eight users, who were at the location; and a score-based ranking module configured to rank the locations based on the scores, such that one location is ranked higher than another location when a score computed for the one location is higher than a score computed for the other location;

and wherein the ranking of the plurality of locations by the ranking module is based on a ranking generated by the score-based ranking module.

Optionally, the ranking module includes:

a preference generator module configured to generate a plurality of preference rankings for the locations; wherein each preference ranking is determined based on a subset of the measurements of the at least eight users, and includes a ranking of at least two of the locations, such that one of the at least two locations is ranked ahead of another location from among the at least two locations;

a preference-based ranking module configured to rank the locations based on the plurality of the preference rankings utilizing a method that satisfies the Condorcet criterion;

and wherein the ranking of the plurality of locations by the ranking module is based on a ranking generated by the preference-based ranking module.

Optionally, on average, the measurements of the at least eight users who were at the first location are more positive or more negative than the measurements of the at least eight users who were at the second location.

Optionally, third and fourth locations, from among the plurality of locations, are given the same rank by the ranking module.

The system further includes a recommender module configured to recommend a location to a user in a manner that belongs to a set including first and second manners; wherein when recommending a location in the first manner, the recommender module provides a stronger recommendation for the location, compared to a recommendation for the location that the recommender module provides when recommending in the second manner; wherein the recommender module is further configured to: recommend the location in the first manner when the location is ranked at least at a predetermined rank, and to recommend the location in the second manner when the location is ranked below the predetermined rank.

Optionally, the first location is recommended to the certain first user in the first manner and to the certain second user in the second manner; and wherein the second location is recommended to the certain first user in the second manner and to the certain first user in the first manner.

In one embodiment, a system configured to dynamically rank plurality of locations based on affective response of users, includes:

a memory storing computer executable modules; and a processor configured to execute the computer executable modules; the computer executable modules including:

a collection module configured to receive measurements of affective response of the users while being at the plurality of locations; wherein for each location of the plurality of locations, the measurements include measurements of at least ten users who were at the location; and a dynamic ranking module configured to generate rankings of the plurality of locations; wherein each ranking corresponds to a certain time and is generated based on a subset of the measurements of the users that includes measurements taken at a time that is at most a certain period before the certain time, and is not after the certain time;

wherein in a first ranking corresponding to a certain first time, a first location from among the plurality of locations is ranked above a second location from among the plurality of locations, and in a second ranking corresponding to a certain second time, the second location is ranked above the first location; and wherein the certain second time is after the certain first time, and the second ranking is computed based on at least one measurement taken after the certain first time.

Optionally, the plurality of locations are travel destinations belonging to a set including one or more of the following: continents, countries, counties, cities, resorts, and neighborhoods.

Optionally, the plurality of locations are places that provide entertainment belonging to a set including one or more of the following: clubs, pubs, movie theaters, theaters, casinos, stadiums, and concert venues.

Optionally, the plurality of locations are a places of business belonging to a set including one or more of the following: stores, booths, shopping malls, shopping centers, markets, supermarkets, beauty salons, spas, and hospital clinics, laundromat, banks, courier service offices, and restaurants.

Optionally, measurements taken earlier than the certain period before the certain time are not utilized by the dynamic ranking module to generate the ranking corresponding to the certain time.

Optionally, the dynamic ranking module is further configured to assign weights to measurements used to compute a ranking corresponding to a certain time, such that an average of weights assigned to measurements taken earlier than the certain period before the certain time is lower than an average of weights assigned to measurements taken after the certain period before the certain time; wherein the dynamic ranking module is further configured to utilize the weights to generate the ranking corresponding to the certain time.

The system further includes a map-displaying module configured to present on a display: a map including a description of an environment that includes the first and second locations, and an annotation overlaid on the map and indicating at least one of: a first location score computed for the first location, a second location score computed for the second location, a rank of the first location, and a rank of the second location.

The system further includes a recommender module configured to recommend a location to a user in a manner that belongs to a set including first and second manners; wherein when recommending a location in the first manner, the recommender module provides a stronger recommendation for the location, compared to a recommendation for the location that the recommender module provides when recommending in the second manner; and wherein the recommender module is further configured to: recommend the location in the first manner when the location is ranked at least at a predetermined rank, and to recommend the location in the second manner when the location is ranked below the predetermined rank.

Optionally, during a period that ends before the certain second time, the first location is recommended in the first manner and the second location is recommended in the second manner; and wherein during a period that starts after the certain second time, the first location is recommended in the second manner and the second location is recommended in the first manner.

Optionally, the dynamic ranking module includes:

a dynamic scoring module configured to compute scores for the plurality of the locations; wherein each score corresponds to a certain time, and is computed based on measurements of at least five of the users from the subset of the measurements of the users that includes measurements taken at a time that is at most the certain period before the certain time, and is not after the certain time;

a score-based ranking module configured to rank the plurality of locations based on the magnitudes of the scores, such that one location is ranked higher than another location when a score computed for the one location is higher than a score computed for the other location;

and wherein the ranking of the plurality of locations corresponding to the certain time, which is generated by the dynamic ranking module, is based on a ranking generated by the score-based ranking module.

Optionally, the ranking module includes:

a preference generator module configured to generate a plurality of preference rankings for the locations; wherein each preference ranking is determined based on the subset of the measurements of the users that includes measurements taken at a time that is at most the certain period before the certain time, and includes a ranking of at least two of the locations, such that one of the at least two locations is ranked ahead of another location from among the at least two locations; and a preference-based ranking module configured to rank the locations based on the plurality of the preference rankings utilizing a method that satisfies the Condorcet criterion;

and wherein the ranking of the plurality of locations corresponding to the certain time, which is generated by the dynamic ranking module, is based on a ranking generated by the preference-based ranking module.

In one embodiment, a system configured to dynamically generate personal rankings of a plurality of locations based on affective response of users, includes:

a memory storing computer executable modules; and a processor configured to execute the computer executable modules; the computer executable modules including:

a collection module configured to receive measurements of affective response of the users while being at the plurality of locations including first and second locations; wherein for each location of the plurality of locations, the measurements include measurements of at least ten of the users who were at the location;

a personalization module configured to receive a profile of a certain user and profiles of the users, and to generate an output indicative of similarities between the profile of the certain user and the profiles of the users; and a dynamic ranking module configured to generate, for the certain user, rankings of the plurality of locations; wherein each ranking corresponds to a certain time and is generated based on the output and a subset of the measurements of the users that includes measurements taken at a time that is at most a certain period before the certain time, and is not after the certain time;

wherein for at least a certain first user and a certain second user, who have different profiles, the dynamic ranking module generates the following rankings corresponding to the certain time: a first ranking, for the certain first user, in which the first location is ranked above the second location, and a second ranking, for the certain second user, in which the second location is ranked above the first location.

Optionally, in an additional ranking generated by the dynamic ranking module, which is for the certain second user and corresponds to a certain second time, the first location is ranked above the second location; and wherein the certain second time is after the certain time, and the additional ranking is computed based on at least one measurement taken after the certain time.

Optionally, measurements taken earlier than the certain period before the certain time are not utilized by the dynamic ranking module to generate the rankings corresponding to the certain time.

Optionally, the dynamic ranking module is further configured to assign weights to measurements used to compute a ranking corresponding to a certain time, such that an average of weights assigned to measurements taken earlier than the certain period before the certain time is lower than an average of weights assigned to measurements taken after the certain period before the certain time; wherein the dynamic ranking module is further configured to utilize the weights to generate the ranking corresponding to the certain time.

The system further includes a map-displaying module configured to present on a display: a map including a description of an environment that includes the first and second locations, and an annotation overlaid on the map and indicating at least one of: a first location score computed for the first location, a second location score computed for the second location, a rank of the first location, a rank of the second location, an indication of a relative ranking of the first and second locations, the certain time, the first location, and the second location.

The system further includes a recommender module configured to recommend a location to a user in a manner that belongs to a set including first and second manners; wherein when recommending a location in the first manner, the recommender module provides a stronger recommendation for the location, compared to a recommendation for the location that the recommender module provides when recommending in the second manner; and wherein the recommender module is further configured to: recommend the location in the first manner when the location is ranked at least at a predetermined rank, and to recommend the location in the second manner when the location is ranked below the predetermined rank.

Optionally, to the certain first user, the first location is recommended in the first manner and the second location is recommended in the second manner, and to the certain second user, the first location is recommended in the second manner, and the second location is recommended in first manner.

Optionally, the dynamic ranking module includes:

a dynamic scoring module configured to compute scores for the plurality of the locations; wherein each score corresponds to a certain time, and is computed based on the output and measurements of at least five of the users from the subset of the measurements of the users that includes measurements taken at a time that is at most the certain period before the certain time, and is not after the certain time; and a score-based ranking module configured to rank the plurality of locations based on the magnitudes of the scores, such that one location is ranked higher than another location when a score computed for the one location is higher than a score computed for the other location;

and wherein the ranking of the plurality of locations, which is for the certain user and corresponds to the certain time, is based on a ranking generated by the score-based ranking module.

Optionally, the dynamic ranking module includes:

a preference generator module configured to generate a plurality of preference rankings for the plurality of locations; wherein each preference ranking is determined based on the output and the subset of the measurements of the users that includes measurements taken at a time that is at most the certain period before the certain time, and is not after the certain time; and wherein each preference ranking includes a ranking of at least two locations of the plurality of the locations, such that one of the at least two locations is ranked ahead of another location from among the at least two locations; and a preference-based ranking module configured to rank the locations based on the plurality of the preference rankings utilizing a method that satisfies the Condorcet criterion;

and wherein the ranking of the plurality of locations, which is for the certain user and corresponds to the certain time, is based on a ranking generated by the preference-based ranking module.

In one embodiment, a system configured to evaluate significance of a difference between location scores, includes:

a memory storing computer executable modules; and a processor configured to execute the computer executable modules; the computer executable modules including:

a collection module configured to receive measurements of affective response of users to being at locations; wherein each measurement of a user corresponds to an event in which the user is at a location belonging to a set including first and second locations;

a measurement selector module configured to select first and second subsets of the measurements corresponding to events involving the first and second locations, respectively; wherein each of the first and second subsets includes measurements of at least eight users;

a scoring module configured to compute first and second location scores based on the first and second subsets of the measurements, respectively; and a score-difference evaluator module configured to determine significance of a difference between the first and second location scores using a statistical test involving the first and second subsets.

The system further includes a recommender module configured to recommend a location to a user in a manner that belongs to a set including first and second manners; wherein when recommending a location in the first manner, the recommender module provides a stronger recommendation for the location, compared to a recommendation for the location that the recommender module provides when recommending in the second manner.

Optionally, the recommender module is further configured to recommend the first and second locations as follows:

when the significance is below a predetermined level, the first and second locations are both recommend in the second manner;

when the significance is not below the predetermined level and the first location score is greater than the second location score, the first location is recommended in the first manner and the second location is recommended in the second manner;

and when the significance is not below the predetermined level and the first location score is lower than the second location score, the first location is recommended in the second manner and the second location is recommended in the first manner.

Optionally, significance of the difference between the first location score and the second location score reaches a certain level, but on average, a second significance of a difference between a third location score computed from a third subset of measurements, and a fourth location score computed from a fourth subset of measurements, does not reach the certain level; wherein the third and fourth subsets are generated by randomly selecting half of the measurements in the first and second subsets, respectively.

Optionally, the statistical test includes a permutation test.

Optionally, the significance is based on a p-value corresponding to observing a difference that is at least as large as the difference between the first and second location scores if the first and second subsets are shuffled such that the measurements collected from the first and second subsets are redistributed to those subsets randomly.

Optionally, the statistical test includes a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled.

Optionally, the significance of the hypothesis is determined based on at least one of: a nonparametric test that compares between the measurements in the first subset and the measurements in the second subset, and a parametric that compares between the measurements in the first subset and the measurements in the second subset.

Optionally, the parametric that compares between the measurements in the first subset and the measurements in the second subset determines significance of a hypothesis that the mean of measurements in the first subset is the same as the mean of measurements in the second subset.

Optionally, the first and second subsets of the measurements include measurements of at least eight users who were both at the first and second locations; wherein, for each of the at least eight users who were at both locations, the first subset includes a first measurement of the user, corresponding to an event in which the user was at the first location, and the second subset includes a second measurement of the user, corresponding to an event in which the user was at the second location.

The system further includes a profile comparator module configured to compute a value indicative of an extent of a similarity between a pair of profiles of users;

wherein the measurement selector module is further configured to receive profiles of the users and to utilize the profile comparator and the profiles to identify at least eight pairs of events; wherein each pair of events involves a first event in which a first user was at the first location and a second event in which a second user was at the second location; and wherein the similarity between a profile of first user and a profile of the second user reaches a predetermined threshold, the first subset includes a measurement corresponding to the first event and the second subset includes a measurement corresponding to the second event.

Optionally, each pair of events, of the at least eight pairs of events, involves events with comparable instantiation periods; wherein a pair of events has comparable instantiation periods when the pair involves a first event in which a first user was at the first location and a second event in which a second user was at the second location, and the first user was at the first location for a duration that is at least half, and at most double, the duration the second user was at the second location.

The system further includes a personalization module configured to receive a profile of a certain user and profiles of at least some of the users, and to generate an output indicative of similarities between the profile of the certain user and the profiles of the at least some of the users;

wherein the scoring module is further configured to compute a location score for the first location for the certain user based on the measurements and the output; wherein, for at least a certain first user and a certain second user, who have different profiles, the scoring module computes different location scores for the first location.

In one embodiment, a system configured to evaluate significance of a difference between measurements of affective response corresponding to being at locations, includes:

a memory storing computer executable modules; and a processor configured to execute the computer executable modules; the computer executable modules including:

a collection module configured to receive measurements of affective response of users corresponding to events; wherein each measurement of a user corresponds to an event in which the user was at a location belonging to a set including first and second locations;

a pairing module configured to select pairs from among the events; wherein each pair includes a first event involving a first user who was at the first location and a second event involving a second user who was at the second location;

a difference calculator configured to compute a weighted difference, which is a function of differences between a first subset including the measurements corresponding to the first events of the pairs and a second subset including the measurements corresponding to the second events of the pairs; wherein each of the first and second subsets includes measurements of at least eight users; and a difference-significance evaluator configured to determine significance of the weighted difference using a statistical test involving the first and second subsets.

The system further includes a recommender module configured to recommend a location to a user in a manner that belongs to a set including first and second manners; wherein when recommending a location in the first manner, the recommender module provides a stronger recommendation for the location, compared to a recommendation for the location that the recommender module provides when recommending in the second manner.

Optionally, the recommender module is further configured to recommend the first and second locations as follows:

when the significance is below a predetermined level, the first and second locations are both recommend in the second manner;

when the significance is not below the predetermined level and the weighted difference is positive, the first location is recommended in the first manner and the second location is recommended in the second manner;

and when the significance is not below the predetermined level and the weighted difference is negative, the first location is recommended in the second manner and the second location is recommended in the first manner.

Optionally, significance of the weighted difference reaches a certain level, but on average, a second significance of a weighted difference between third and fourth subsets; wherein the third subset includes the measurements corresponding to the first events of a randomly selected group of half of the pairs, and the fourth subset includes the measurements corresponding to the second events of the randomly selected group of half of the pairs.

Optionally, the statistical test includes a permutation test.

Optionally, the significance is based on a p-value corresponding to observing a weighted difference that is at least as large as the weighted difference if the first and second subsets are shuffled such that the measurements collected from the first and second subsets are redistributed to those subsets randomly.

Optionally, the statistical test includes a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled.

Optionally, the significance of the hypothesis is determined based on at least one of: a nonparametric test that compares between the measurements in the first subset and the measurements in the second subset, and a parametric that compares between the measurements in the first subset and the measurements in the second subset.

Optionally, the parametric that compares between the measurements in the first subset and the measurements in the second subset determines significance of a hypothesis that the mean of measurements in the first subset is the same as the mean of measurements in the second subset.

The system further includes a profile comparator module configured to compute a value indicative of an extent of a similarity between a pair of profiles of users;

wherein the pairing module is further configured to receive profiles of the users and to utilize the profile comparator and the profiles to identify at least eight pairs of events; wherein each pair of events involves a first event in which a first user was at the first location and a second event in which a second user was at the second location; and wherein the similarity between a profile of first user and a profile of the second user reaches a predetermined threshold, the first subset includes a measurement corresponding to the first event and the second subset includes a measurement corresponding to the second event.

Optionally, each pair of events, of the at least eight pairs of events, involves events with comparable instantiation periods; wherein a pair of events has comparable instantiation periods when the pair involves a first event in which a first user was at the first location and a second event in which a second user was at the second location, and the first user was at the first location for a duration that is at least half, and at most double, the duration the second user was at the second location.

The system further includes:

a profile comparator module configured to compute a value indicative of an extent of a similarity between a pair of profiles of users; and a weighting module configured to receive a profile of a certain user and profiles of the users and to generate the weights for the measurements of the users; wherein a weight for a measurement of a user is proportional to the extent of a similarity computed by the profile comparator between a pair including a profile of the user and a profile of the certain user, such that a weight generated for a measurement of a user whose profile is more similar to the profile of the certain user is higher than a weight generated for a measurement of a user whose profile is less similar to the profile of the certain user;

and wherein the difference calculator is further configured to utilize the weights to compute the weighted difference; wherein, for at least a certain first user and a certain second user, who have different profiles, the difference calculator computes first and second weighted differences, based on first and second sets of weights for the measurements, generated for the certain first and certain second users, respectively; and wherein the first weighted difference is different from the second weighted difference and the significance of the first weighted difference is different from the significance of the second weighted difference.

In one embodiment, a system configured to present on a map locations and affective response corresponding to being at the locations, includes:

a memory storing computer executable modules; and a processor configured to execute the computer executable modules; the computer executable modules including:

a collection module configured to receive measurements of affective response of users while being at the locations; wherein each location from among the locations belongs to a set including first and second locations, and the measurements include measurements of at least five users who were at the location;

a ranking module configured to rank the locations based on the measurements, such that the first location is ranked higher than the second location; and a map-displaying module configured to present on a display: a map including a description of an environment that includes the first and second locations, and an annotation overlaid on the map and indicating at least one of: a first location score computed for the first location, a second location score computed for the second location, a rank of the first location, and a rank of the second location.

Optionally, description of the environment includes one or more of: a two-dimensional image representing the environment, a three-dimensional image representing the environment, an augmented reality representation of the environment, and a virtual reality representation of the environment; and wherein the annotation includes at least one of: images representing the first and second locations, and text identifying the first and second locations.

Optionally, the annotation includes one or more descriptors, each presented at a position on the map; wherein each descriptor, from among the one or more descriptors, corresponds to a location from among the locations, and is indicative of at least one of the following: a type of activity to have at the location, a rank of the location; and wherein the descriptor includes at least one of the following: text, an image, a visual effect, a video sequence, an animation, and a hologram.

Optionally, the map-displaying module is further configured to present on the display the location in a manner belonging to a set including at least a first manner and a second manner; and wherein presenting a location in the first manner includes one or more of the following: (i) utilizing a larger descriptor to represent the location, compared to the a descriptor utilized when presenting the location in the second manner; (ii) presenting a descriptor representing the location for a longer duration on the display, compared to the duration during which a descriptor representing the location is presented when presenting the location in the second manner; (iii) utilizing a certain visual effect when presenting a descriptor representing the location, which is not utilized when presenting a descriptor that represents the location when presenting the location in the second manner; and (iv) utilizing a descriptor that includes certain information related to the location, which is included in a descriptor that represents the location when presenting the location in the second manner;

and wherein the first location is presented in the first manner and the second location is presented in the second manner.

Optionally, when presenting a location in the second manner, no descriptor corresponding to the second location is included in the annotation.

In one embodiment, a system configured to present annotations on a map indicative of personalized ranking of locations, includes:

a memory storing computer executable modules; and a processor configured to execute the computer executable modules; the computer executable modules including:

a collection module configured to receive measurements of affective response of users while being at the locations; wherein each location from among the locations belongs to a set including first and second locations, and the measurements include measurements of at least five users who were at the location;

a personalization module configured to receive a profile of a certain user and profiles of the users, and to generate an output indicative of similarities between the profile of the certain user and the profiles of the users;

a ranking module configured to rank the locations utilizing the output and at least some of the measurements; wherein, for at least a certain first user and a certain second user, who have different profiles, the ranking module ranks a first location and a second location from among the locations differently, such that for the certain first user the first location is ranked above the second location, and for the certain second user the second location is ranked above the first location; and a map-displaying module configured to present on a display: a map including a description of an environment that includes the first and second locations, and an annotation overlaid on the map and indicating a ranking of the first and second locations; wherein the annotation presented on a display of the certain first user indicates that the first location is ranked above the second location, and the annotation presented on a display of the certain second user indicates that the second location is ranked above the first location.

Optionally, description of the environment includes one or more of: a two-dimensional image representing the environment, a three-dimensional image representing the environment, an augmented reality representation of the environment, and a virtual reality representation of the environment; and wherein the annotation includes at least one of: images representing the first and second locations, and text identifying the first and second locations.

Optionally, the annotation includes one or more descriptors, each presented at a position on the map; wherein each descriptor, from among the one or more descriptors, corresponds to a location from among the plurality of locations, and is indicative of at least one of the following: the location, a type of activity to have at the location, and a location score computed for the location; and wherein the descriptor includes at least one of the following: text, an image, a visual effect, a video sequence, an animation, and a hologram.

Optionally, the map-displaying module is further configured to present on the display the location in a manner belonging to a set including at least a first manner and a second manner; and wherein presenting a location in the first manner includes one or more of the following: (i) utilizing a larger descriptor to represent the location, compared to the size utilized when presenting the location in the second manner; (ii) presenting a descriptor representing the location for a longer duration on the display, compared to the duration during which a descriptor representing the location is presented when presenting the location in the second manner; (iii) utilizing a descriptor that includes a certain visual effect, which is not utilized in a descriptor that represents the location when presenting the location in the second manner; and (iv) utilizing a descriptor that includes certain information related to the location, which is included in a descriptor that represents the location when presenting the location in the second manner;

and wherein on the display of the certain first user, the first location is presented in the first manner, the second location is presented on the display in the second manner, and on the display of the certain second user, the first location is presented in the second manner the second location is presented on the display in the first manner.

Optionally, when presenting a location in the second manner, no descriptor corresponding to the second location is included in the annotation.

Optionally, the personalization module includes:

a profile comparator module configured to compute a value indicative of an extent of a similarity between a pair of profiles of users; and a weighting module configured to receive a profile of a certain user and profiles of the users and to generate weights for the measurements of the users; wherein a weight for a measurement of a user is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the output is indicative of the weights.

Optionally, the ranking module includes:

a scoring module configured to compute location scores for the plurality of locations; wherein, for each location from among the plurality of locations, the scoring module computes a location score based on the measurements of the at least five users who were at the location and their corresponding weights; and a score-based ranking module configured to rank the locations based on the location scores computed for the locations, such that a first location is ranked higher than a second location when the location score computed for the first location is higher than the location score computed for the second location;

and wherein the ranking of the plurality of locations by the ranking module is based on a ranking generated by the score-based ranking module.

Optionally, the ranking module includes:

a preference generator module configured to generate a plurality of preference rankings for the locations; wherein each preference ranking is determined based on a subset of the measurements, and includes a ranking of at least two of the locations, such that one of the at least two locations is ranked ahead of another location from among the at least two locations;

a preference-based ranking module configured to rank the locations based on the plurality of the preference rankings and the weights, utilizing a method that satisfies the Condorcet criterion.

and wherein the ranking of the plurality of locations by the ranking module is based on a ranking generated by the preference-based ranking module.

Optionally, the personalization module includes:

a clustering module configured to receive the profiles of the users, and to cluster the users into clusters based on profile similarity, with each cluster including a single user or multiple users with similar profiles;

a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the output is indicative of the at least eight users.

Optionally, the ranking module includes:

a scoring module configured to compute location scores for the plurality of locations; wherein, for each location from among the plurality of locations, the scoring module computes a location score based on the measurements of at least five users, from among the at least eight users, who were at the location; and a score-based ranking module configured to rank the locations based on the location scores computed for the locations, such that a first location is ranked higher than a second location when the location score computed for the first location is higher than the location score computed for the second location;

and wherein the ranking of the plurality of locations by the ranking module is based on a ranking generated by the score-based ranking module.

Optionally, the ranking module includes:

a preference generator module configured to generate a plurality of preference rankings for the locations; wherein each preference ranking is determined based on a subset of the measurements of the at least eight users, and includes a ranking of at least two of the locations, such that one of the at least two locations is ranked ahead of another location from among the at least two locations;

a preference-based ranking module configured to rank the locations based on the plurality of the preference rankings utilizing a method that satisfies the Condorcet criterion;

and wherein the ranking of the plurality of locations by the ranking module is based on a ranking generated by the preference-based ranking module.

In one embodiment, a system configured to learn a function of an aftereffect resulting from being at a location, includes:

a memory storing computer executable modules; and a processor configured to execute the computer executable modules; the computer executable modules including:

a collection module configured to receive measurements of affective response of users taken utilizing sensors coupled to the at least ten users; the measurements including prior and subsequent measurements of at least ten users who were at the location; wherein a prior measurement of a user is taken before the user left the location, and a subsequent measurement of the user is taken after elapsing of a duration of at least ten minutes after the user left the location; and a function learning module configured to utilize the prior and subsequent measurements to learn an aftereffect function that describes values of expected affective response after different durations since leaving the location.

Optionally, the aftereffect function is at least indicative of values $v_1$ and $v_2$ of expected affective response after durations $\Delta t_1$ and $\Delta t_2$ since leaving the location, respectively; wherein $\Delta t_1 \neq \Delta t_2$ and $v_1 \neq v_2$.

Optionally, the function learning module includes a machine learning-based trainer that is configured to utilize the prior and subsequent measurements to train a model for a predictor configured to predict a value of affective response of a user based on an input indicative of a duration that elapsed since the user left the location; and wherein responsive to being provided inputs indicative of the durations $\Delta t_1$ and $\Delta t_2$, the predictor predicts the values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign subsequent measurements to a plurality of bins based durations corresponding to subsequent measurements; wherein a duration corresponding to a subsequent measurement of a user is the duration that elapsed between when the user left the location and when the subsequent measurement is taken, and each bin corresponds to a range of durations corresponding to subsequent measurements; and an aftereffect scoring module configured to compute a plurality of aftereffect scores corresponding to the plurality of bins; wherein an aftereffect score corresponding to a bin is computed based on prior and subsequent measurements of at least five users, from the at least ten users, selected such that durations corresponding to the subsequent measurements of the at least five users fall within the range corresponding to the bin; and wherein $\Delta t_1$ falls within a range of durations corresponding to a first bin, $\Delta t_2$ falls within a range of durations corresponding to a second bin, which is different from the first bin, and the values $v_1$ and $v_2$ are the aftereffect scores corresponding to the first and second bins, respectively.

Optionally, the aftereffect scoring module includes a statistical test-based significance module configured to compute a significance level of a hypothesis about measurements of users utilizing personalized models of the users; wherein a personalized model of a user is trained on data including measurements of affective response of the user; and wherein a score computed based on a subset of measurements is computed based on the significance level computed for the hypothesis about the subset of measurements.

Optionally, the aftereffect scoring module includes a statistical test-based significance module configured to compute a significance level of a hypothesis about a subset of measurements of users utilizing a model trained on data including measurements of affective response of users; and wherein a score computed based on a subset of measurements is computed based on the significance level computed for the hypothesis about the subset of measurements.

Optionally, the aftereffect scoring module includes an arithmetic function-based scoring module that is configured to compute a score from measurements using a predetermined arithmetic function applied to the measurements; and wherein a score computed based on a subset of measurements is the score computed by the arithmetic function-based scoring module when given an input based on the subset of measurements.

Optionally, an aftereffect score for a location is indicative of an extent of feeling at least one of the following emotions: pain, anxiety, annoyance, stress, aggression, aggravation, fear, sadness, drowsiness, apathy, anger, happiness, content, calmness, attentiveness, affection, and excitement.

Optionally, a prior measurement of a user is utilized to compute a baseline affective response value for the user; and wherein the aftereffect function is indicative of an expected difference between the subsequent measurements of the at least ten users and baseline affective response values for the at least ten users.

Optionally, the aftereffect function is indicative of an expected difference between the subsequent measurements of the at least ten users and the prior measurements of the at least ten users.

Optionally, the prior measurement of the user is taken before the user arrived at the location.

Optionally, the measurements include multiple subsequent measurements of a user who was at the location, taken at different times after the user left the location.

Optionally, a measurement of affective response of a user, taken utilizing a sensor coupled to the user, includes at least one of: a value representing a physiological signal of the user, and a value representing a behavioral cue of the user.

The system further includes a display module configured to render a representation of the aftereffect function.

The system further includes a personalization module configured to receive a profile of a certain user and profiles of the at least ten users, and to generate an output indicative of similarities between the profile of the certain user and the profiles of the at least ten users;

wherein the function learning module is further configured to utilize the output to learn an aftereffect function personalized for the certain user that describes values of expected affective response at different durations after leaving the location;

and wherein for at least a certain first user and a certain second user, who have different profiles, the function learning module learns different aftereffect functions, denoted $F_1$ and $F_2$, respectively; wherein $F_1$ is indicative of values $v_1$ and $v_2$ of expected affective responses after durations $\Delta t_1$ and $\Delta t_2$ since leaving the location, respectively, and $F_2$ is indicative of values $v_3$ and $v_4$ of expected affective responses after the durations $\Delta t_1$ and $\Delta t_2$ since leaving the location, respectively; and wherein $\Delta t_1 \neq \Delta t_2$, $v_1 \neq v_2$, $v_3 \neq v_4$, and $v_1 \neq v_3$.

The system further includes a function comparator module configured to receive descriptions of first and second aftereffect functions that describe values of expected affective response at different durations after leaving respective first and second locations; the function comparator module is further configured to compare the first and second functions and to provide an indication of at least one of the following: (i) the location from amongst the first and second locations for which the average aftereffect, from the time of leaving the respective location until a certain duration $\Delta t$, is greatest; (ii) the location from amongst the first and second locations for which the average aftereffect, from a time starting at a certain duration $\Delta t$ after leaving the respective location and onwards, is greatest; and (iii) the location from amongst the first and second locations for which at a time corresponding to elapsing of a certain duration $\Delta t$ since leaving the respective location, the corresponding aftereffect is greatest.

In one embodiment, a system configured to learn a personalized function of an aftereffect resulting from being at a location, includes:

a memory storing computer executable modules; and a processor configured to execute the computer executable modules; the computer executable modules including:

a collection module configured to receive prior and subsequent measurements of affective response of at least ten users who were at the location; wherein a prior measurement of a user is taken before the user left the location, and a subsequent measurement of the user is taken after elapsing of a duration of at least ten minutes after the user left the location;

a personalization module configured to receive a profile of a certain user and profiles of the at least ten users, and to generate an output indicative of similarities between the profile of the certain user and the profiles of the at least ten users; and a function learning module configured to utilize the prior and subsequent measurements to learn an aftereffect function, personalized for the certain user, which describes values of expected affective response after different durations since leaving the location; wherein for at least a certain first user and a certain second user, who have different profiles, the function learning module learns different aftereffect functions, denoted $F_1$ and $F_2$, respectively; wherein $F_1$ is indicative of values $v_1$ and $v_2$ of expected affective responses after durations $\Delta t_1$ and $\Delta t_2$ since leaving the location, respectively, and $F_2$ is indicative of values $v_3$ and $v_4$ of expected affective responses after the durations $\Delta t_1$ and $\Delta t_2$ since leaving the location, respectively; and wherein $\Delta t_1 \neq \Delta t_2$, $v_1 \neq v_2$, $v_3 \neq v_4$, and $v_1 \neq v_3$.

Optionally, a profile of a user includes information that describes one or more of the following: a demographic characteristic of the user, a genetic characteristic of the user, a static attribute describing the body of the user, a medical condition of the user, an indication of a content item consumed by the user, and a feature value derived from semantic analysis of communications of the user.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the aftereffect function personalized for the certain user is computed based on the prior and subsequent measurements of the at least ten users and their corresponding weights.

Optionally, the personalization module includes:

a clustering module configured to receive profiles of the at least ten users, and to cluster the users in to clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and the aftereffect function personalized for the certain user is computed based on the prior and subsequent measurements of the at least eight users.

The system further includes a reporting module configured to render a representation of an aftereffect function personalized for a certain user and to forward it to a user interface used by the certain user; and wherein a rendered representation of the aftereffect function $F_1$ that is forwarded to certain first user is different from a rendered representation of the aftereffect function $F_2$ that is forwarded to the certain second user.

In one embodiment, a system configured to rank locations based on aftereffects determined from measurements of affective response of users, includes:

a memory storing computer executable modules; and a processor configured to execute the computer executable modules; the computer executable modules including:

a collection module configured to receive measurements of affective response of users while and after being at locations; wherein the measurements include, for each location from among the locations, prior and subsequent measurements of at least five users who were at the location; and wherein a prior measurement of a user is taken before the user left the location, and a subsequent measurement of the user is taken at least ten minutes after the user left the location; and an aftereffect-based ranking module configured to rank the locations based on the measurements, such that, for at least first and second locations from among the locations, the aftereffect resulting from being at the first location is greater than the aftereffect resulting from being at the second location, and the first location is ranked above the second location; and wherein a difference between a subsequent measurement and a prior measurement, of a user who left a location, is indicative of an aftereffect on the user resulting from being at the location.

Optionally, the first location being ranked above the second location is indicative that, on average, a difference between the subsequent measurements and the prior measurements of the at least five users who were at the first location is greater than a difference between the subsequent and the prior measurements of the at least five users who were at the second location.

Optionally, the first location being ranked above the second location is indicative that, a first aftereffect score computed based on the prior and subsequent measurements of the at least five users who were at the first location is greater than a second aftereffect score computed based on the prior and subsequent measurements of the at least five users who were at the second location.

Optionally, the prior measurement of the user who is at a location is taken before the user arrived at the location.

Optionally, the subsequent measurement is taken less than one day after the user left the location, and before the user returns to the location.

Optionally, the aftereffect ranking module includes:

an aftereffect scoring module configured to compute aftereffect scores for the locations; wherein an aftereffect score resulting from being at a location is computed based on prior and subsequent measurements of the at least five users who were at the location; and a score-based ranking module configured to rank the locations based on their respective aftereffect scores;

and wherein the ranking of the locations by the aftereffect-based ranking module is based on a ranking generated by the score-based ranking module.

Optionally, the aftereffect-based ranking module includes:

a preference generator module configured to generate a plurality of preference rankings; wherein each preference ranking is indicative of ranks of at least two of the locations, such that one location, of the at least two locations, is ranked above another location of the at least two locations; and wherein the preference ranking is determined based on a subset including at least a pair of prior and subsequent measurements of a user who was at the one location and at least a pair of prior and subsequent measurements of a user who was at the other location; and a preference-based ranking module configured to rank the locations based on the plurality of the preference rankings utilizing a method that satisfies the Condorcet criterion;

and wherein the ranking of the locations by the aftereffect-based ranking module is based on a ranking generated by the preference-based ranking module.

In one embodiment, a system configured to rank locations based on aftereffects determined from measurements of affective response of users, includes:

a memory storing computer executable modules; and a processor configured to execute the computer executable modules; the computer executable modules including:

a collection module configured to receive measurements of affective response of users while and after being at locations; wherein the measurements include, for each location from among the locations, prior and subsequent measurements of at least five users who were at the location; and wherein a prior measurement of a user is taken before the user left the location, and a subsequent measurement of the user is taken at least ten minutes after the user left the location;

a personalization module configured to receive a profile of a certain user and profiles of the users, and to generate an output indicative of similarities between the profile of the certain user and the profiles of the users; and an aftereffect-based ranking module configured to rank the locations based on the output and at least some of the measurements, such that, for at least two of the locations, the aftereffect resulting from being at one of the locations is greater than the aftereffect resulting from being at the other location, and the one of the locations is ranked above the other location;

wherein a difference between a subsequent measurement and a prior measurement of a user who left a location is indicative of an aftereffect on the user resulting from being at the location;

and wherein, for at least a certain first user and a certain second user, who have different profiles, the aftereffect-based ranking module ranks first and second locations from among the locations differently, such that for the certain first user, the first location is ranked above the second location, and for the certain second user, the second location is ranked above the first location.

Optionally, the personalization module includes:

a profile comparator module configured to compute a value indicative of an extent of a similarity between a pair of profiles of users; and a weighting module configured to receive a profile of a certain user and profiles of the users and to generate weights for the measurements of the users; wherein the weight for a measurement of a user is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the output is indicative of the weights for the measurements of the users.

Optionally, the aftereffect-based ranking module includes:

an aftereffect scoring module configured to compute aftereffect scores for the locations; wherein an aftereffect score for a location is computed based on prior and subsequent measurements of the at least five of the users who were at the location and their corresponding weights; and a score-based ranking module configured to rank the locations based on their respective aftereffect scores such that, for at least first and second locations from among the locations, the first location has a higher aftereffect score than the second location and the first location is ranked above the second location;

and wherein the ranking of the locations by the ranking module is based on a ranking generated by the score-based ranking module.

Optionally, the aftereffect-based ranking module includes:

a preference generator module configured to generate a plurality of preference rankings; wherein each preference ranking is indicative of ranks of at least two of the locations, such that one location, of the at least two locations, is ranked above another location of the at least two locations; and wherein the preference ranking is determined based on: a subset including at least a pair of prior and subsequent measurements of a user who was at the one location and at least a pair of prior and subsequent measurements of a user who was at the other location, and weights corresponding to the measurements in the subset; and a preference-based ranking module configured to rank the locations based on the plurality of the preference rankings utilizing a method that satisfies the Condorcet criterion;

and wherein the ranking of the locations by the ranking module is based on a ranking generated by the preference-based ranking module.

Optionally, the personalization module includes:

a clustering module configured to receive the profiles of the at least users, and to cluster the users into clusters based on profile similarity, with each cluster including a single user or multiple users with similar profiles;

a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the output is indicative of the at least eight users.

Optionally, the aftereffect-based ranking module includes:

an aftereffect scoring module configured to compute aftereffect scores for the locations; wherein an aftereffect score for a location is computed based on prior and subsequent measurements of the at least five users who were at the location, from among the at least eight users; and a score-based ranking module configured to rank the locations based on their respective aftereffect scores such that, for at least first and second locations from among the locations, the first location has a higher aftereffect score than the second location, and the first location is ranked above the second location;

and wherein the ranking of the locations by the ranking module is based on a ranking generated by the score-based ranking module.

Optionally, the aftereffect-based ranking module includes:

a preference generator module configured to generate a plurality of preference rankings; wherein each preference ranking is indicative of ranks of at least two of the locations, such that one location, of the at least two locations, is ranked above another location of the at least two locations; and wherein the preference ranking is determined based on a subset including at least a pair of prior and subsequent measurements of a user who was at the one location and at least a pair of prior and subsequent measurements of a user who was at the other location;

a preference-based ranking module configured to rank the locations based on the plurality of the preference rankings utilizing a method that satisfies the Condorcet criterion;

and wherein the ranking of the locations by the aftereffect-based ranking module is based on a ranking generated by the preference-based ranking module.

The system further includes a recommender module configured to recommend a location to a user, based on its rank, in a manner that belongs to a set including first and second manners; wherein when recommending a location in the first manner, the recommender module provides a stronger recommendation for the location, compared to a recommendation for the location that the recommender module provides when recommending in the second manner; and wherein the recommender module is further configured to: recommend the location in the first manner when the location is ranked at least at a predetermined rank, and to recommend the location in the second manner when the location is ranked below the predetermined rank.

Optionally, the first location is recommended to the certain first user in the first manner and to the certain second user in the second manner; and wherein the second location is recommended to the certain first user in the second manner and to the certain first user in the first manner.

In one embodiment, a system configured to learn a relationship between duration of being at a location and an affective response corresponding to being at the location, includes:

a memory storing computer executable modules; and a processor configured to execute the computer executable modules; the computer executable modules including:

a collection module configured to receive prior and contemporaneous measurements of affective response of at least ten users who were at the location; wherein a prior measurement of a user is taken before the user arrived at the location, and a contemporaneous measurement of the user is taken between a time the user arrived at the location and a time that is at most ten minutes after the user left the location; and a function learning module configured to utilize the prior and contemporaneous measurements to learn a function that describes, for different durations, values of expected affective response corresponding to being at the location for the different durations.

Optionally, the function is indicative of values $v_1$ and $v_2$ of expected affective response corresponding to being at the location for durations $\Delta t_1$ and $\Delta t_2$, respectively; wherein $\Delta t_1 \Delta t_2$ and $v_1 \neq v_2$.

Optionally, the function learning module includes a machine learning-based trainer that is configured to utilize the prior and contemporaneous measurements to train a model for a predictor configured to predict a value of affective response of a user based on an input indicative of a duration that elapsed since the user arrived at the location; and wherein responsive to being provided inputs indicative of the durations $\Delta t_1$ and $\Delta t_2$, the predictor predicts the values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign prior and contemporaneous measurements of users to a plurality of bins based durations corresponding to the contemporaneous measurements; wherein a duration corresponding to a contemporaneous measurement of a user is the duration that elapsed between when the user arrived at the location and when the contemporaneous measurement is taken, and each bin corresponds to a range of durations corresponding to contemporaneous measurements; and a scoring module configured to compute a plurality of scores corresponding to the plurality of bins; wherein a score corresponding to a bin is computed based on prior and contemporaneous measurements of at least five users, from the at least ten users, selected such that durations corresponding to the contemporaneous measurements of the at least five users fall within the range corresponding to the bin; and wherein $\Delta t_1$ falls within a range of durations corresponding to a first bin, $\Delta t_2$ falls within a range of durations corresponding to a second bin, which is different from the first bin, and the values $v_1$ and $v_2$ are the scores corresponding to the first and second bins, respectively.

Optionally, the scoring module includes a statistical test-based significance module configured to compute a significance level of a hypothesis about measurements of users utilizing personalized models of the users; wherein a personalized model of a user is trained on data including measurements of affective response of the user; and wherein a score computed for a bin is based on a significance level computed for the hypothesis about measurements whose durations fall within the range corresponding to the bin.

Optionally, the scoring module includes a statistical test-based significance module configured to compute a significance level of a hypothesis about a subset of measurements of users utilizing a model trained on data including measurements of affective response of users; and wherein a score computed for a bin is based on a significance level computed for the hypothesis about measurements whose durations fall within the range corresponding to the bin.

Optionally, the scoring module includes an arithmetic function-based scoring module that is configured to compute a score from measurements using a predetermined arithmetic function applied to the measurements; and wherein a score computed for a bin is the score computed by the arithmetic function-based scoring module when given an input based on measurements whose durations fall within the range corresponding to the bin.

Optionally, the measurements include multiple contemporaneous measurements of a user who is at the location, taken at different times after the user arrived at the location.

Optionally, a prior measurement of a user is utilized to compute a baseline affective response value for the user; and wherein the function is indicative of an expected differences between the contemporaneous measurements of the at least ten users and baseline affective response values for the at least ten users.

Optionally, the function is indicative of an expected difference between the contemporaneous measurements of the at least ten users and the prior measurements of the at least ten users.

Optionally, the prior and contemporaneous measurements of affective response of the at least ten users are taken utilizing sensors coupled to the at least ten users; wherein a measurement of affective response of a user, taken utilizing a sensor coupled to the user, includes at least one of: a value representing a physiological signal of the user, and a value representing a behavioral cue of the user.

The system further includes a display module configured to render a representation of the function.

The system further includes a personalization module configured to receive a profile of a certain user and profiles of the at least ten users, and to generate an output indicative of similarities between the profile of the certain user and the profiles of the at least ten users;

wherein the function learning module is further configured to utilize the output to learn a personalized function for the certain user that describes, for different durations, values of expected affective response after being at the location for the different durations;

and wherein for at least a certain first user and a certain second user, who have different profiles, the function learning module learns different functions, denoted $F_1$ and $F_2$, respectively; wherein $F_1$ is indicative of values $v_1$ and $v_2$ of expected affective response corresponding to being at the location for durations $\Delta t_1$ and $\Delta t_2$, respectively, and $F_2$ is indicative of values $v_3$ and $v_4$ of expected affective response corresponding to being at the location for the durations $\Delta t_1$ and $\Delta t_2$, respectively; and wherein $\Delta t_1 \neq \Delta t_2$, $v_1 \neq v_2$, $v_3 \neq v_4$, and $v_1 \neq v_3$.

Optionally, an affective value for a location is indicative of an extent of feeling at least one of the following emotions while being at the location: pain, anxiety, annoyance, stress, aggression, aggravation, fear, sadness, drowsiness, apathy, anger, happiness, content, calmness, attentiveness, affection, and excitement.

The system further includes a function comparator module configured to receive descriptions of first and second functions that describe values of expected affective response corresponding to being at respective first and second locations for different durations; the function comparator module is further configured to compare the first and second functions and to provide an indication of at least one of the following: (i) the location from amongst the first and second locations for which the average affective response corresponding to being at the respective location, for a duration that is at most a certain duration $\Delta t$, is greatest; (ii) the location from amongst the first and second locations for which the average affective response corresponding to being at the respective location, for a duration that is at least a certain duration $\Delta t$, is greatest; and (iii) the location from amongst the first and second locations for which the affective response corresponding to being at the respective location, for a certain duration $\Delta t$, is greatest.

In one embodiment, a system configured to learn a personalized function describing a relationship between a duration of being at a location and an affective response corresponding to being at the location, includes:

a memory storing computer executable modules; and a processor configured to execute the computer executable modules; the computer executable modules including:

a collection module configured to receive prior and contemporaneous measurements of affective response of at least ten users who are at the location; wherein a prior measurement of a user is taken before the user arrived at the location, and a contemporaneous measurement of the user is taken between a time the user arrived at the location and a time that is at most ten minutes after the user left the location;

a personalization module configured to receive a profile of a certain user and profiles of the at least ten users, and to generate an output indicative of similarities between the profile of the certain user and the profiles of the at least ten users; and a function learning module configured to utilize the prior and contemporaneous measurements to learn a function, personalized for the certain user, which describes, for different durations, values of expected affective response corresponding to being at the location for the different durations; wherein for at least a certain first user and a certain second user, who have different profiles, the function learning module learns different functions, denoted $F_1$ and $F_2$, respectively; wherein $F_1$ is indicative of values $v_1$ and $v_2$ of expected affective response corresponding to being at the location for durations $\Delta t_1$ and $\Delta t_2$, respectively, and $F_2$ is indicative of values $v_3$ and $v_4$ of expected affective response corresponding to being at the location for the durations $\Delta t_1$ and $\Delta t_2$, respectively; and wherein $\Delta t_1 \neq \Delta t_2$, $v_1 \neq v_2$, $v_3 \neq v_4$, and $v_1 \neq v_3$.

Optionally, a profile of a user includes information that describes one or more of the following: a demographic characteristic of the user, a genetic characteristic of the user, a static attribute describing the body of the user, a medical condition of the user, an indication of a content item consumed by the user, and a feature value derived from semantic analysis of communications of the user.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the function personalized for the certain user is computed based on the prior and contemporaneous measurements of the at least ten users and their corresponding weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and the function personalized for the certain user is computed based on the prior and contemporaneous measurements of the at least eight users.

The system further includes a reporting module configured to render a representation of a function personalized for a certain user and to forward it to a user interface used by the certain user; and wherein a rendered representation of the function $F_1$ that is forwarded to the certain first user is different from a rendered representation of the function $F_2$ that is forwarded to the certain second user.

In one embodiment, a system configured to learn a relationship between a duration of being at a location and an aftereffect resulting from being at the location, includes:

a memory storing computer executable modules; and a processor configured to execute the computer executable modules; the computer executable modules including:

a collection module configured to receive prior and subsequent measurements of affective response of at least ten users; wherein each user was at the location for a duration, a prior measurement of the user is taken before the user left the location, and a subsequent measurement of the user is taken at least ten minutes after the user left the location; and a function learning module configured to utilize the prior and subsequent measurements to learn a function that describes, for different durations, values of expected affective responses corresponding to extents of aftereffects resulting from being at the location, after being at the location for the different durations; wherein a difference between a subsequent measurement and a prior measurement of a user who was at the location is indicative of an aftereffect on the user resulting from being at the location.

Optionally, the function is indicative of values $v_1$ and $v_2$ corresponding to expected extents of aftereffects resulting from being at the location for durations $\Delta t_1$ and $\Delta t_2$, respectively; wherein $\Delta t_1 \neq \Delta t_2$ and $v_1 \neq v_2$.

Optionally, the function learning module includes a machine learning-based trainer that is configured to utilize the prior and subsequent measurements to train a model for a predictor configured to predict a value of affective response of a user based on an input indicative of a duration that elapsed since the user arrived at the location; and wherein responsive to being provided inputs indicative of the durations $\Delta t_1$ and $\Delta t_2$, the predictor predicts the values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes an aftereffect scoring module configured to compute a plurality of scores corresponding to a plurality of bins, with each bin corresponding to a range of durations for being at the location; and wherein a score corresponding to a bin is computed based on prior and subsequent measurements of at least five users, from the at least ten users, for whom durations during which they are at the location fall within the range corresponding to the bin; and wherein $\Delta t_1$ falls within a range of durations corresponding to a first bin, $\Delta t_2$ falls within a range of durations corresponding to a second bin, which is different from the first bin, and the values $v_1$ and $v_2$ are the scores corresponding to the first and second bins, respectively.

Optionally, the aftereffect scoring module includes a statistical test-based significance module configured to compute a significance level of a hypothesis about measurements of users utilizing personalized models of the users; wherein a personalized model of a user is trained on data including measurements of affective response of the user; and wherein a score computed for a bin is based on a significance level computed for the hypothesis about measurements corresponding to durations which fall within the range corresponding to the bin.

Optionally, the aftereffect scoring module includes a statistical test-based significance module configured to compute a significance level of a hypothesis about a subset of measurements of users utilizing a model trained on data including measurements of affective response of users; and wherein a score computed for a bin is based on a significance level computed for the hypothesis about measurements corresponding to durations which fall within the range corresponding to the bin.

Optionally, the aftereffect scoring module includes an arithmetic function-based scoring module that is configured to compute a score from measurements using a predetermined arithmetic function applied to the measurements; and wherein a score computed for a bin is the score computed by the arithmetic function-based scoring module when given an input based on measurements whose durations fall within the range corresponding to the bin.

Optionally, an aftereffect score of a location is indicative of an extent of feeling at least one of the following emotions after being at the location: pain, anxiety, annoyance, stress, aggression, aggravation, fear, sadness, drowsiness, apathy, anger, happiness, content, calmness, attentiveness, affection, and excitement.

Optionally, a prior measurement of a user is utilized to compute a baseline affective response value for the user; and wherein the function is indicative of an expected differences between the subsequent measurements of the at least ten users and baseline affective response values for the at least ten users.

Optionally, the function is indicative of an expected difference between the subsequent measurements of the at least ten users and the prior measurements of the at least ten users.

Optionally, the prior and subsequent measurements of affective response of the at least ten users are taken utilizing sensors coupled to the at least ten users; wherein a measurement of affective response of a user, taken utilizing a sensor coupled to the user, includes at least one of: a value representing a physiological signal of the user, and a value representing a behavioral cue of the user.

The system further includes a display module configured to render a representation of the function.

The system further includes a personalization module configured to receive a profile of a certain user and profiles of the at least ten users, and to generate an output indicative of similarities between the profile of the certain user and the profiles of the at least ten users; wherein the function learning module is further configured to utilize the output to learn a function personalized for the certain user that describes, for different durations, values of expected affective response corresponding to extents of aftereffects resulting from being at the location after having the experience for the different durations; and wherein for at least a certain first user and a certain second user, who have different profiles, the function learning module learns different functions, denoted $F_1$ and $F_2$, respectively; wherein $F_1$ is indicative of values $v1$ and $v_2$ of expected extents of aftereffects resulting from being at the location for durations $\Delta t_1$ and $\Delta t_2$, respectively, and $F_2$ is indicative of values $v_3$ and $v_4$ of expected extents of aftereffects resulting from being at the location for durations $\Delta t_1$ and $\Delta t_2$, respectively; and wherein $\Delta t_1 \neq \Delta t_2$, $v_1 \neq v_2$, $v_3 \neq v_4$, and $v_1 \neq v_3$.

In one embodiment, a system configured to learn a function of periodic affective response corresponding to being at a location, includes:

a memory storing computer executable modules; and a processor configured to execute the computer executable modules; the computer executable modules including:

a collection module configured to receive measurements of affective response of at least ten users; wherein each user is at the location at some time during a periodic unit of time, and a measurement of the user is taken by a sensor coupled to the user while the user is at the location; and a function learning module configured to utilize the measurements to learn a function that describes expected affective response corresponding to being at the location when being at the location at different times in the periodic unit of time.

Optionally, the function is indicative of values $v_1$ and $v_2$ of expected affective response corresponding to being at the location when being at the location at times $t_1$ and $t_2$ during the periodic unit of time, respectively; wherein $t_1 \neq t_2$ and $v_1 \neq v_2$.

Optionally, the periodic unit of time is a day, and $t_1$ corresponds to a time during the morning and $t_2$ corresponds to a time during the evening.

Optionally, the periodic unit of time is a week, and $t_1$ corresponds to some time on Tuesday and $t_2$ corresponds to a time during the weekend.

Optionally, the periodic unit of time is a year, and $t_1$ corresponds to a time during the summer and $t_2$ corresponds to a time during the winter.

Optionally, the function learning module includes a machine learning-based trainer that is configured to utilize the measurements to train a model for a predictor configured to predict a value of affective response of a user based on an input indicative of a time during the periodic unit of time; and wherein responsive to being provided inputs indicative of the times $t_1$ and $t_2$, the predictor predicts the values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign measurements of users to a plurality of bins based on when in the periodic unit of time the measurements were taken; wherein each bin corresponding to a range of times in the periodic unit of time; and a scoring module configured to compute a plurality of scores corresponding to the plurality of bins; wherein a score corresponding to a bin is computed based on measurements of at least five users, from the at least ten users, which were taken at a time that falls within the range corresponding to the bin; and wherein $t_1$ falls within a range of times corresponding to a first bin, $t_2$ falls within a range of times corresponding to a second bin, which is different from the first bin, and the values $v_1$ and $v_2$ are the scores corresponding to the first and second bins, respectively.

Optionally, the scoring module includes a statistical test-based significance module configured to compute a significance level of a hypothesis about measurements of users utilizing personalized models of the users; wherein a personalized model of a user is trained on data including measurements of affective response of the user; and wherein a score computed for a bin is based on a significance level computed for the hypothesis about measurements whose corresponding times fall within the range corresponding to the bin.

Optionally, the scoring module includes a statistical test-based significance module configured to compute a significance level of a hypothesis about a subset of measurements of users utilizing a model trained on data including measurements of affective response of users; and wherein a score computed for a bin is based on a significance level computed for the hypothesis about measurements whose corresponding times fall within the range corresponding to the bin.

Optionally, the scoring module includes an arithmetic function-based scoring module that is configured to compute a score from measurements using a predetermined arithmetic function applied to the measurements; and wherein a score computed for a bin is the score computed by the arithmetic function-based scoring module when given an input based on measurements whose corresponding times fall within the range corresponding to the bin.

Optionally, the measurements include multiple measurements of a user who is at the location, taken at different times during the periodic unit of time.

Optionally, a measurement of affective response of a user, taken utilizing a sensor coupled to the user, includes at least one of: a value representing a physiological signal of the user, and a value representing a behavioral cue of the user.

The system further includes a display module configured to render a representation of the function.

The system further includes a personalization module configured to receive a profile of a certain user and profiles of the at least ten users, and to generate an output indicative of similarities between the profile of the certain user and the profiles of the at least ten users; wherein the function learning module is further configured to utilize the output to learn a function personalized for the certain user that describes expected affective response when being at the location at different times in the periodic unit of time; and wherein for at least a certain first user and a certain second user, who have different profiles, the function learning module learns different functions, denoted $F_1$ and $F_2$, respectively; wherein $F_1$ is indicative of values $v_1$ and $v_2$ of expected affective responses to being at the location at times $t_1$ and $t_2$ during the periodic unit of time, respectively, and $F_2$ is indicative of values $v_3$ and $v_4$ of expected affective responses to being at the location at times $t_1$ and $t_2$, respectively; and wherein $\Delta t_1 \neq \Delta t_2$, $v_1 \neq v_2$, $v_3 \neq v_4$, and $v_1 \neq v_3$.

Optionally, an aftereffect resulting from being at a location is indicative of an extent of feeling at least one of the following emotions after being at the location: pain, anxiety, annoyance, stress, aggression, aggravation, fear, sadness, drowsiness, apathy, anger, happiness, content, calmness, attentiveness, affection, and excitement.

The system further includes a function comparator module configured to receive descriptions of first and second functions of periodic affective response corresponding to being at first and second locations, respectively; the a function comparator module is further configured to compare the first and second functions and to provide an indication of at least one of the following: (i) the location from amongst the first and second locations for which the average affective response corresponding to being at the respective location throughout the periodic unit of time is greatest; and (ii) the location, from amongst the first and second locations, for which the affective response corresponding to being at the respective location at a certain time t in the periodic unit of time is greatest.

In one embodiment, a system configured to learn a personalized function of periodic affective response corresponding to being at a location, includes:

a memory storing computer executable modules; and a processor configured to execute the computer executable modules; the computer executable modules including:

a collection module configured to receive measurements of affective response of at least ten users; wherein each user is at the location at some time during a periodic unit of time, and a measurement of the user is taken by a sensor coupled to the user while the user is at the location;

a personalization module configured to receive a profile of a certain user and profiles of the at least ten users, and to generate an output indicative of similarities between the profile of the certain user and the profiles of the at least ten users; and a function learning module configured to utilize the measurements and the output to learn a function, personalized for the certain user, which describes expected affective response corresponding to being at the location when being at the location at different times in the periodic unit of time; wherein for at least a certain first user and a certain second user, who have different profiles, the function learning module learns different functions, denoted $F_1$ and $F_2$, respectively; wherein $F_1$ is indicative of values $v_1$ and $v_2$ of expected affective responses to being at the location at times $t_1$ and $t_2$ during the periodic unit of time, respectively, and $F_2$ is indicative of values $v_3$ and $v_4$ of expected affective responses to being at the location at times $t_1$ and $t_2$, respectively; and wherein $\Delta t_1 \neq \Delta t_2$, $v_1 \neq v_2$, $v_3 \neq v_4$, and $v_1 \neq v_3$.

Optionally, a profile of a user includes information that describes one or more of the following: a demographic characteristic of the user, a genetic characteristic of the user, a static attribute describing the body of the user, a medical condition of the user, an indication of a content item consumed by the user, and a feature value derived from semantic analysis of communications of the user.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the function, which is personalized for the certain user, is computed based on the measurements of the at least ten users and their corresponding weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and the function, which is personalized for the certain user, is computed based on the measurements of the at least eight users.

The system further includes a reporting module configured to render a representation of a function personalized for a certain user and to forward it to a user interface used by the certain user; and wherein a rendered representation of the function $F_1$ that is forwarded to the certain first user is different from a rendered representation of the function $F_2$ that is forwarded to the certain second user.

In one embodiment, a system configured to rank when to be at a location based on expected aftereffect values, includes:

a memory storing computer executable modules; and a processor configured to execute the computer executable modules; the computer executable modules including:

a collection module configured to receive prior and subsequent measurements of affective response of at least ten users; wherein each user was at the location at some time during a periodic unit of time, a prior measurement is taken before the user left the location, and a subsequent measurement taken at least ten minutes after the user left the location; and wherein the measurements include prior and subsequent measurements of at least five users who were at the location during a first portion of the periodic unit of time and prior and subsequent measurements of at least five users who were at the location during a second portion of the periodic unit of time that is different from the first period; and a ranking module configured to rank times to be at the location based on aftereffects indicated by the measurements, such that, being at the location during the first portion of the periodic unit of time is ranked above being at the location during the second portion of the periodic unit of time; wherein a difference between a subsequent measurement and a prior measurement of a user who was at the location is indicative of the aftereffect on the user resulting from being at the location.

Optionally, being at the location during the first portion of the periodic unit of time being ranked above being at the location during the second portion of the periodic unit of time is indicative that, on average, a difference between the subsequent measurements and the prior measurements of the at least five users who were at the location during the first portion is greater than a difference between the subsequent and the prior measurements of the at least five users who were at the location during the second portion.

Optionally, being at the location during the first portion of the periodic unit of time being ranked above being at the location during the second portion of the periodic unit of time is indicative that, a first aftereffect score computed based on the prior and subsequent measurements of the at least five users who were at the location during the first portion is greater than a second aftereffect score computed based on the prior and subsequent measurements of the at least five users who were at the location during the second portion.

Optionally, the prior measurement of a user who was at the location is taken before the user arrived at the location.

Optionally, the ranking module includes:

an aftereffect scoring module configured to compute aftereffect scores resulting from being at the location corresponding to portions of the periodic unit of time; wherein an aftereffect score corresponding to a certain portion of the periodic unit of time is computed based on prior and subsequent measurements of the at least five users who were at the location during the certain portion of the periodic unit of time; and a score-based ranking module configured to rank times to be at the location based on their respective aftereffect scores;

and wherein the ranking of the times to be at the location by the ranking module is based on a ranking generated by the score-based ranking module.

Optionally, the ranking module includes:

a preference generator module configured to generate a plurality of preference rankings; wherein each preference ranking is indicative of ranks of at least two portions of the periodic unit of time during which to be at the location, such that one portion, of the at least two portions, is ranked above another portion of the at least two portions; and wherein the preference ranking is determined based on a subset including at least a pair of prior and subsequent measurements of a user who was at the location during the one portion and at least a pair of prior and subsequent measurements of a user who was at the location during the other portion; and a preference-based ranking module configured to rank times to be at the location based on the plurality of the preference rankings utilizing a method that satisfies the Condorcet criterion;

and wherein the ranking of the times to be at the location by the ranking module is based on a ranking generated by the preference-based ranking module.

The system further includes a personalization module configured to receive a profile of a certain user and profiles of the a set of users including at least five users who were at the location during the first portion and the at least five users who were at the location during the second portion, and to generate an output indicative of similarities between the profile of the certain user and the profiles of the users from the set of users; wherein the ranking module is further configured to rank the times to be at the location based on the output; and wherein, for at least a certain first user and a certain second user, who have different profiles, the aftereffect-based ranking module ranks times to be at the location differently, such that for the certain first user, being at the location during a third portion of the periodic unit of time is ranked above being at the location during a fourth portion of the periodic unit of time, and for the certain second user, being at the location during the fourth portion of the periodic unit of time is ranked above being at the location during the third portion of the periodic unit of time.

In one embodiment, a system configured to learn a function of a periodic aftereffect resulting from being at a location:

a memory storing computer executable modules; and a processor configured to execute the computer executable modules; the computer executable modules including:

a collection module configured to receive prior and subsequent measurements of affective response of at least ten users; wherein each user was at the location at some time during a periodic unit of time, a prior measurement is taken before the user left the location, and a subsequent measurement taken at least ten minutes after the user left the location; and a function learning module configured to utilize the prior and subsequent measurements to learn the function of the periodic aftereffect, which describes, for different times in the periodic unit of time, expected aftereffects resulting from being at a location due to being at the location at the different times; wherein a difference between a subsequent measurement and a prior measurement of a user who was at the location is indicative of an aftereffect on the user resulting from being at the location.

Optionally, the function is at least indicative of values $v_1$ and $v_2$ of expected aftereffects due to being at the location at times $t_1$ and $t_2$ in the periodic unit of time, respectively; wherein $t_1 \neq t_2$ and $v_1 \neq v_2$.

Optionally, the function learning module includes a machine learning-based trainer that is configured to utilize the prior and subsequent measurements to train a model for a predictor configured to predict a value of affective response of a user based on an input indicative of a time during the periodic unit of time during which a user is at the location; and wherein responsive to being provided inputs indicative of the times $t_1$ and $t_2$, the predictor predicts the values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign prior and subsequent measurements of affective response of users who are at the location to a plurality of bins based on when in the periodic unit of time the users are at the location; wherein each bin corresponds to a portion of the periodic unit of time; and an aftereffect scoring module configured to compute a plurality of aftereffect scores corresponding to the plurality of bins; wherein an aftereffect score corresponding to a bin is computed based on prior and subsequent measurements of at least five users, from the at least ten users, who are at the location at a time that falls within the portion of the periodic unit of time that corresponds to the bin; and wherein $t_1$ falls within a portion of the periodic unit of time corresponding to a first bin, $t_2$ falls within a portion of the periodic unit of time corresponding to a second bin, which is different from the first bin, and the values $v_1$ and $v_2$ are the aftereffect scores corresponding to the first and second bins, respectively.

Optionally, an aftereffect score for a location is indicative of an extent of feeling at least one of the following emotions while being at the location: pain, anxiety, annoyance, stress, aggression, aggravation, fear, sadness, drowsiness, apathy, anger, happiness, content, calmness, attentiveness, affection, and excitement.

Optionally, a prior measurement of a user is utilized to compute a baseline affective response value for the user; and wherein the function is indicative of an expected difference between the subsequent measurements of the at least ten users and baseline affective response values for the at least ten users.

Optionally, the prior measurement of the user is taken before the user arrives at the location.

Optionally, the measurements include multiple subsequent measurements of a user who left the location, taken at different times after the user left the location.

Optionally, the prior and subsequent measurements of affective response of the at least ten users are taken utilizing sensors coupled to the at least ten users; wherein a measurement of affective response of a user, taken utilizing a sensor coupled to the user, includes at least one of: a value representing a physiological signal of the user, and a value representing a behavioral cue of the user.

The system further includes a display module configured to render a representation of the function.

The system further includes a personalization module configured to receive a profile of a certain user and profiles of the at least ten users, and to generate an output indicative of similarities between the profile of the certain user and the profiles of the at least ten users; and wherein the function learning module is further configured to utilize the output to learn a function, which is personalized for the certain user, and describes expected affective response values after being at the location at different times during the periodic unit of time.

The system further includes a function comparator module configured to receive descriptions of first and second functions of the periodic aftereffect resulting from being at first and second locations, respectively; the function comparator module is further configured to compare the first and second functions and to provide an indication of at least one of the following: (i) the location from amongst the first and second locations for which the aftereffect throughout the periodic unit of time is greatest; and (ii) the location, from amongst the first and second locations, for which the after-effect resulting from being at the respective location at a certain time t in the periodic unit of time is greatest.

In one embodiment, a system configured to learn a relationship between repetitions of being at a location and affective response corresponding to being at the location again, includes:

a memory storing computer executable modules; and a processor configured to execute the computer executable modules; the computer executable modules including:

a collection module configured to receive measurements of affective response of at least ten users; wherein each measurement of a user is taken while the user is at the location, and is associated with a value indicative of an extent to which the user had previously been at the location; and a function learning module configured to learn a function based on the measurements and their associated values; wherein the function describes, for different extents to which a user had been in the location, an expected affective response corresponding to being at the location again.

Optionally, the function is indicative of values $v_1$ and $v_2$ of expected affective response corresponding to certain extents $e_1$ and $e_2$, respectively; wherein $v_1$ describes an expected affective response corresponding to being at location again, after it had been visited to the certain extent $e_1$; and $v_2$ describes an expected affective response corresponding to being at the location again, after it had been visited to the certain extent $e_2$; and wherein $e_1 \neq e_2$ and $v_1 \neq v_2$.

Optionally, the function learning module includes a machine learning-based trainer that is configured to utilize the measurements to train a model for a predictor configured to predict a value of affective response of a user based on an input indicative of a certain extent to which a user had previously been at the location; and wherein responsive to being provided inputs indicative of the certain extents $e_1$ and $e_2$, the predictor predicts the affective response values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign measurements of affective response of users to a plurality of bins based on the values associated with the measurements; wherein each bin corresponds to a certain range of extents of previously being at the location; and a scoring module configured to compute a plurality of scores corresponding to the plurality of bins; wherein a score corresponding to a bin is computed based on measurements of at least five users, from the at least ten users, for which the associated values fall within the range corresponding to the bin; and wherein $e_1$ falls within a range of extents corresponding to a first bin, $e_2$ falls within a range of extents corresponding to a second bin, which is different from the first bin, and the values $v_1$ and $v_2$ are the scores corresponding to the first and second bins, respectively.

Optionally, a value of an extent to which a user had been at the location before is a value that is indicative of time that had elapsed since the user first visit at the location.

Optionally, a value of an extent to which a user had been at the location before is a value that is indicative of a number of times the user had visited the location before.

Optionally, a value of an extent to which a user had been at the location before is a value that is indicative of a number of hours spent by the user being at the location, since being at the location for the first time.

In one embodiment, a system configured to learn a relationship between repetitions of playing a game and affective response associated with playing the game again, includes:

a memory storing computer executable modules; and a processor configured to execute the computer executable modules; the computer executable modules including:

a collection module configured to receive measurements of affective response of at least ten users; wherein each measurement of a user is taken while the user plays the game, and is associated with a value indicative of an extent to which the user had previously played the game; and a function learning module configured to learn a function based on the measurements and their associated values; wherein the function describes, for different extents to which a user had played the game, an expected affective response associated with playing the game again.

In one embodiment, a system configured to learn a relationship between repetitions of being at a location and affective response corresponding to being at the location, includes:

a memory storing computer executable modules; and a processor configured to execute the computer executable modules; the computer executable modules including:

a collection module configured to receive measurements of affective response of at least ten users; wherein each measurement of a user is taken while the user is at the location, and is associated with a value indicative of an extent to which the user had previously been at the location;

a personalization module configured to receive a profile of a certain user and profiles of the at least ten users, and to generate an output indicative of similarities between the profile of the certain user and the profiles of the at least ten users; and a function learning module configured to learn a function, personalized for the certain user, based on the measurements and their associated values; wherein the function describes, for different extents to which a user had been at the location, an expected affective response corresponding to being at the location again; wherein for at least a certain first user and a certain second user, who have different profiles, the function learning module learns different functions, denoted $F_1$ and $F_2$, respectively; wherein $F_1$ is indicative of values $v_1$ and $v_2$ of expected affective response of the certain first user to being at the location again, after been at the location to certain extents $e_1$ and $e_2$, respectively; and $F_2$ is indicative of values $v_3$ and $v_4$ of expected affective response of the certain second user to being at the location again, after been at the location to the certain extents $e_1$ and $e_2$, respectively; and wherein $e_1 \neq e_2$, $v_1 \neq v_2$, $v_3 \neq v_4$, and $v_1 \neq v_3$.

Optionally, the function learning module includes a machine learning-based trainer that is configured to utilize the measurements and the output to train a model for a predictor configured to predict a value of affective response of a user based on an input indicative of a certain extent to which a user had previously been at the location; and wherein responsive to being provided inputs indicative of the certain extents $e_1$ and $e_2$, the predictor of the function personalized for the certain first user, predicts the affective response values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign measurements of affective response of users to a plurality of bins based on the values associated with the measurements; wherein each bin corresponds to a certain range of extents of previously being at the location; and a scoring module configured to compute a plurality of scores corresponding to the plurality of bins; wherein a score corresponding to a bin is computed based on measurements of at least five users, from the at least ten users, for which the associated values fall within the range corresponding to the bin; and wherein $e_1$ falls within a range of extents corresponding to a first bin, $e_2$ falls within a range of extents corresponding to a second bin, which is different from the first bin, and the values $v_1$ and $v_2$ are the scores computed based on the output generated for the certain first user, which correspond to the first and second bins, respectively.

Optionally, a value of an extent to which a user had been at the location before is a value that is indicative of time that had elapsed since the user first visit at the location.

Optionally, a value of an extent to which a user had been at the location before is a value that is indicative of a number of times the user had visited the location before.

Optionally, a value of an extent to which a user had been at the location before is a value that is indicative of a number of hours spent by the user being at the location, since being at the location for the first time.

Optionally, a profile of a user includes information that describes one or more of the following: a demographic characteristic of the user, a genetic characteristic of the user, a static attribute describing the body of the user, a medical condition of the user, an indication of a content item consumed by the user, and a feature value derived from semantic analysis of communications of the user.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the function, which is personalized for the certain user, is computed based on the measurements of the at least ten users and their corresponding weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and the function, which is personalized for the certain user, is computed based on the measurements of the at least eight users.

The system further includes a reporting module configured to render a representation of a function personalized for a certain user and to forward it to a user interface used by the certain user; and wherein a rendered representation of the function $F_1$ that is forwarded to the certain first user is different from a rendered representation of the function $F_2$ that is forwarded to the certain second user.

In one embodiment, a system configured to learn a relationship between repetitions of being at a location and an aftereffect resulting from being at the location, includes:

a memory storing computer executable modules; and a processor configured to execute the computer executable modules; the computer executable modules including:

a collection module configured to receive prior and subsequent measurements of affective response of at least ten users who were at the location; wherein a prior measurement is taken before the user left the location, and a subsequent measurement taken at least ten minutes after the user left the location; and wherein the prior measurement and the subsequent measurement are associated with a value indicative of an extent to which the user had previously been in the location; and a function learning module configured to learn a function based on the prior and subsequent measurements and their associated values; wherein the function describes, for different extents to which a user had been in the location, an expected aftereffect due to being in the location again; wherein a difference between a subsequent measurement and a prior measurement of a user who was in the location is indicative of an aftereffect on the user resulting from being at the location.

Optionally, the function is at least indicative of values $v_1$ and $v_2$ of expected aftereffects resulting from being at the location again, after had being at the location to certain extents $e_1$ and $e_2$, respectively; wherein $e_1 \neq e_2$ and $v_1 \neq v_2$.

Optionally, the function learning module includes a machine learning-based trainer that is configured to utilize the prior and subsequent measurements to train a model for a predictor configured to predict a value of an aftereffect resulting from being at the location, after being at the location again, based on an input indicative of a certain extent to which the user had previously been at the location; and wherein responsive to being provided inputs indicative of the certain extents $e_1$ and $e_2$, the predictor predicts the values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign prior and subsequent measurements of affective response of users to a plurality of bins based on the values associated with the measurements; wherein each bin corresponds to a certain range of values of extents of previously being at the location; and an aftereffect scoring module configured to compute a plurality of aftereffect scores corresponding to the plurality of bins; wherein an aftereffect score corresponding to a bin is computed based on prior and subsequent measurements of at least five users, from the at least ten users, for which the associated values fall within the range corresponding to the bin; and wherein $e_1$ falls within a range of extents corresponding to a first bin, $e_2$ falls within a range of extents corresponding to a second bin, which is different from the first bin, and the values $v_1$ and $v_2$ are the aftereffect scores corresponding to the first and second bins, respectively.

Optionally, an aftereffect score for a location is indicative of an extent of feeling at least one of the following emotions while being at the location: pain, anxiety, annoyance, stress, aggression, aggravation, fear, sadness, drowsiness, apathy, anger, happiness, content, calmness, attentiveness, affection, and excitement.

Optionally, a value of an extent to which a user had been at the location before is a value that is indicative of time that had elapsed since the user first visit at the location.

Optionally, a value of an extent to which a user had been at the location before is a value that is indicative of a number of times the user had visited the location before.

Optionally, a value of an extent to which a user had been at the location before is a value that is indicative of a number of hours spent by the user being at the location, since being at the location for the first time.

Optionally, a prior measurement of a user is utilized to compute a baseline affective response value for the user; and wherein the function is indicative of expected differences between the subsequent measurements of the at least ten users and baseline affective response values for the at least ten users.

Optionally, the function is indicative of expected differences between the subsequent measurements of the at least ten users and the prior measurements of the at least ten users.

Optionally, the prior measurement of the user is taken before the user arrives at the location.

Optionally, the measurements include multiple subsequent measurements of a user who was at the location, taken at different times after the user left the location.

Optionally, the prior and subsequent measurements of affective response of the at least ten users are taken utilizing sensors coupled to the at least ten users; wherein a measurement of affective response of a user, taken utilizing a sensor coupled to the user, includes at least one of: a value representing a physiological signal of the user, and a value representing a behavioral cue of the user.

The system further includes a display module configured to render a representation of the function.

The system further includes a personalization module configured to receive a profile of a certain user and profiles of the at least ten users, and to generate an output indicative of similarities between the profile of the certain user and the profiles of the at least ten users;

wherein the function learning module is further configured to utilize the output to learn a function, which is personalized for the certain user, and describes, for different extents to which the experience had already been had, an expected aftereffect after having the experience again, after it had already been had to a certain extent;

and wherein for at least a certain first user and a certain second user, who have different profiles, the function learning module learns different functions, denoted $F_1$ and $F_2$, respectively; wherein $F_1$ is indicative of values $v_1$ and $v_2$ of expected aftereffects to experiencing the experience again, after the experience had been experienced to certain extents $e_1$ and $e_2$, respectively; and $F_2$ is indicative of values $v_3$ and $v_4$ of expected aftereffects response to experiencing the experience again, after the experience had been experienced before to the certain extents $e_1$ and $e_2$, respectively; and wherein $e_1 \neq e_2$, $v_1 \neq v_2$, $v_3 \neq v_4$, and $v_1 \neq v_3$.

The system further includes a function comparator module configured to receive descriptions of first and second functions of aftereffects to having respective first and second experiences after having experienced them before to different extents; the a function comparator module is further configured to compare the first and second functions and to provide an indication of at least one of the following: (i) the experience from amongst the first and second experiences for which the average expected aftereffect to having the respective experience again, after having experienced the experience before at most to a certain extent e, is greatest; (ii) the experience from amongst the first and second experiences for which the average expected aftereffect to having the respective experience again, after having experienced the experience before at least to a certain extent e, is greatest; and (iii) the experience from amongst the first and second experiences for which the expected aftereffect to having the respective experience again, after having experienced the experience before to a certain extent e, is greatest.

In one embodiment, a system configured to learn a relationship between an environmental parameter at a location and affective response corresponding to being at the location, includes:

a memory storing computer executable modules; and a processor configured to execute the computer executable modules; the computer executable modules including:

a collection module configured to receive measurements of affective response of at least ten users; wherein each measurement of the user is taken by a sensor coupled to the user, while the user is at the location, and is associated with a value of the environmental parameter at the location while the user is at the location; and a function learning module configured to utilize the measurements and their associated values to learn a function that describes expected affective responses to being at the location in environments characterized by different values of the environmental parameter.

Optionally, the environmental parameter describes at least one of the following: a temperature of the environment, a level of precipitation in the environment, a degree of air pollution in the environment, wind speed in the environment, an extent at which the environment is overcast, a degree to which the environment is crowded with people, and a noise level at the environment.

Optionally, the function is indicative of values $v_1$ and $v_2$ of expected affective response corresponding to being at the location in environments characterized by the environmental parameter having values $p_1$ and $p_2$, respectively; wherein $p_1 \neq p_2$ and $v_1 \neq v_2$.

Optionally, the function learning module includes a machine learning-based trainer that is configured to utilize the measurements and their associated values to train a model for a predictor configured to predict a value of affective response of a user who is at the location in an environment, based on an input indicative of a value of the environmental parameter that characterizes the environment; and wherein responsive to being provided inputs indicative of the values $p_1$ and $p_2$, the predictor predicts the values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:

a binning module configured to assign measurements of affective response of users to a plurality of bins based on the values associated with the measurements; wherein each bin corresponds to a range of values of the environmental parameter; and a scoring module configured to compute a plurality of scores corresponding to a plurality of bins; wherein a score corresponding to a bin is computed based on measurements of at least five users, from the at least ten users, for whom the associated values fall within the range corresponding to the bin; and wherein $p_1$ falls within a range values corresponding to a first bin, $p_2$ falls within a range of values corresponding to a second bin, which is different from the first bin, and the values $v_1$ and $v_2$ are the scores corresponding to the first and second bins, respectively.

Optionally, a score for a location is indicative of an extent of feeling at least one of the following emotions while being at the location: pain, anxiety, annoyance, stress, aggression, aggravation, fear, sadness, drowsiness, apathy, anger, happiness, content, calmness, attentiveness, affection, and excitement.

Optionally, a measurement of affective response of a user, taken utilizing a sensor coupled to the user, includes at least one of: a value representing a physiological signal of the user, and a value representing a behavioral cue of the user.

The system further includes a display module configured to render a representation of the function.

The system further includes a personalization module configured to receive a profile of a certain user and profiles of the at least ten users, and to generate an output indicative of similarities between the profile of the certain user and the profiles of the at least ten users;

wherein the function learning module is further configured to utilize the output to learn a personalized function for the certain user that expected affective responses to being at the location in environments characterized by different values of the environmental parameter;

and wherein for at least a certain first user and a certain second user, who have different profiles, the function learning module learns different functions, denoted $F_1$ and $F_2$, respectively; wherein $F_1$ is indicative of values $v_1$ and $v_2$ of expected affective response corresponding to being at the location in environments characterized by the environmental parameter having values $p_1$ and $p_2$, respectively, and $F_2$ is indicative of values $v_3$ and $v_4$ of expected affective response corresponding to being at the location in environments characterized by the environmental parameter having the values $p_1$ and $p_2$, respectively; and wherein $p_1 \neq p_2$, $v_1 \neq v_2$, $v_3 \neq v_4$, and $v_1 \neq v_3$.

The system further includes a function comparator module configured to receive descriptions of first and second functions describing expected affective responses to being at respective first and second locations in environments characterized by different values of the environmental parameter; the a function comparator module is further configured to compare the first and second functions and to provide an indication of at least one of the following: (i) the location from amongst the first and second locations, for which the average expected affective response corresponding to being at the respective location in an environment characterized by the environmental having a value that is at most a certain value p; (ii) the location from amongst the first and second locations, for which the average expected affective response corresponding to being at the respective location in an environment characterized by the environmental having a value that is at least a certain value p; and (iii) the location from amongst the first and second locations, for which the average expected affective response corresponding to being at the respective location in an environment characterized by the environmental having a certain value p, is greatest.

In one embodiment, a system configured to learn a relationship between an environmental parameter and affective response corresponding to being at a location, includes:

a memory storing computer executable modules; and a processor configured to execute the computer executable modules; the computer executable modules including:

a collection module configured to receive measurements of affective response of at least ten users; wherein each measurement of the user is taken by a sensor coupled to the user, while the user is at the location, and is associated with a value of the environmental parameter that characterizes an environment in which the user is at the location;

a personalization module configured to receive a profile of a certain user and profiles of the at least ten users, and to generate an output indicative of similarities between the profile of the certain user and the profiles of the at least ten users; and a function learning module configured to utilize the measurements and their associated values to learn a function, personalized for the certain user, which describes expected affective responses to being at the location in environments characterized by different values of the environmental parameter; wherein for at least a certain first user and a certain second user, who have different profiles, the function learning module learns different functions, denoted $F_1$ and $F_2$, respectively; wherein $F_1$ is indicative of values $v_1$ and $v_2$ of expected affective response of the certain first user corresponding to being at the location in environments characterized by the environmental parameter having values $p_1$ and $p_2$, respectively, and $F_2$ is indicative of values $v_3$ and $v_4$ of expected affective response of the certain second user corresponding to being at the location in environments characterized by the environmental parameter having the values $p_1$ and $p_2$, respectively; and wherein $p_1 \neq p_2$, $v_1 \neq v_2$, $v_3 \neq v_4$, and $v_1 \neq v_3$.

Optionally, the environmental parameter describes at least one of the following: a temperature of the environment, a level of precipitation in the environment, a degree of air pollution in the environment, wind speed in the environment, an extent at which the environment is overcast, a degree to which the environment is crowded, and a noise level at the environment.

Optionally, a profile of a user includes information that describes one or more of the following: a demographic characteristic of the user, a genetic characteristic of the user, a static attribute describing the body of the user, a medical condition of the user, an indication of a content item consumed by the user, and a feature value derived from semantic analysis of communications of the user.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the function personalized for the certain user is computed based on the measurements of the at least ten users and their corresponding weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and the function personalized for the certain user is computed based on the measurements of the at least eight users.

The system further includes a reporting module configured to render a representation of a function personalized for a certain user and to forward it to a user interface used by the certain user; and wherein a rendered representation of the function $F_1$ that is forwarded to the certain first user is different from a rendered representation of the function $F_2$ that is forwarded to the certain second user.

Optionally, a measurement of affective response of a user, taken utilizing a sensor coupled to the user, includes at least one of: a value representing a physiological signal of the user, and a value representing a behavioral cue of the user.

In one embodiment, a system configured to dynamically alert about locations associated with negative affective response, includes:

a memory storing computer executable modules; and a processor configured to execute the computer executable modules; the computer executable modules including:

a collection module configured to receive measurements of affective response of users; wherein each user spent at least one minute in at least one location from among a plurality of locations, and the measurements include one or more measurements of the user taken with a sensor coupled to the user after the user arrives at the location;

a dynamic scoring module configured to compute scores for the plurality of locations; wherein each score corresponds to a time t, and is computed based on measurements of at least five of the users taken at most a certain period $\Delta t$ before the time t, and no later than the time t; and wherein each of the at least five users spent at least one minute at the location after the time $t-\Delta t$;

a significance module configured to compute significance levels of the scores for the plurality of the locations;

an alert module configured to: evaluate the scores and significance levels, and to determine whether one or more of the following conditions are met for a location from among the plurality of locations: a score for the location corresponding to the time t reaches a predetermined threshold, and a significance of the score reaches a predetermined level; wherein responsive to at least one of the above conditions being met, the alert module is further configured to forward, no later than one day after the time t, a notification indicative of at least one of the conditions being met for the location; and wherein a score for a location reaching the predetermined threshold is indicative that, on average, users whose measurements were used to compute the score had a negative affective response when their measurements were taken.

Optionally, for at least a certain location, a first time $t_1$, and a second time $t_2$, a score for the location corresponds to $t_1$ does not reach the predetermined threshold, and a score for the location that corresponds to $t_2$ reaches the predetermined threshold; and wherein $t_2$ is after $t_1$, and the score for the location that corresponds to $t_2$ is computed based on at least one measurement taken after $t_1$.

Optionally, the statistical test includes a permutation test.

Optionally, the significance is based on a p-value corresponding to observing a difference that is at least as large as the difference between the first and second location scores if the first and second subsets are shuffled such that the measurements collected from the first and second subsets are redistributed to those subsets randomly.

Optionally, the plurality of locations includes one or more of the following: a city, a country, and a continent.

Optionally, the plurality of locations include one or more of the following: a park, a public building, an office building, a mall, an airport, a train station, a subway station, and a port.

Optionally, the plurality of locations include one or more rooms in a building.

Optionally, the statistical test includes a test that determines significance of a hypothesis that supports at least one of the following assumptions: that the first and second subsets are sampled from the same underlying distribution, and that a parameter of a first distribution from which the measurements in the first subset are sampled is the same as a parameter of a second distribution from which the measurements in the second subset are sampled.

Optionally, the significance of the hypothesis is determined based on at least one of: a nonparametric test that compares between the measurements in the first subset and the measurements in the second subset, and a parametric that compares between the measurements in the first subset and the measurements in the second subset.

Optionally, the parametric that compares between the measurements in the first subset and the measurements in the second subset determines significance of a hypothesis that the mean of measurements in the first subset is the same as the mean of measurements in the second subset.

Optionally, measurements taken earlier than $t-\Delta t$ are not utilized by the dynamic scoring module to compute a score corresponding the time t.

The system further includes a baseline normalizer configured to receive baseline affective response values of the users and to normalize the measurements of affective response with respect to the baseline affective response values.

Optionally, a measurement of affective response of a user used to compute a score for a location corresponding to time t is normalized with respect to a baseline affective response value that is based on a previous measurement of affective response of the user taken prior to the time $t-\Delta t$.

Optionally, a certain measurement of affective response of a user used to compute a score for a location corresponding to time t is normalized with respect to a baseline affective response value that is based on a previous measurement of affective response of the user taken before the time the user arrived at the location and before the certain measurement was taken.

Optionally, the dynamic scoring module is further configured to assign weights to measurements used to compute a score corresponding to the time t, such that an average of weights assigned to measurements whose value is more negative than the median of the measurements used to compute the score, is higher than an average of weights assigned to measurements whose value is not more negative than the median.

Optionally, the dynamic scoring module is further configured to assign weights to measurements used to compute a score corresponding to the time t, such that an average of weights assigned to measurements taken before $t-\Delta t$ is lower than an average of weights assigned to measurements taken after $t-\Delta t$; wherein the dynamic scoring module is further configured to utilize the weights to compute the score corresponding to the certain time.

Optionally, the dynamic scoring module is further configured to assign weights to measurements used to compute a score corresponding to the time t, such that for a value $\Delta t' < \Delta t$, an average of weights assigned to measurements taken before $t-\Delta t'$, is higher than an average of weights assigned to measurements taken after $t-\Delta t'$; wherein the dynamic scoring module is further configured to utilize the weights to compute the score corresponding to the certain time.

The system further includes a map-displaying module configured to present on a display: a map including a description of an environment that at least some of the plurality of locations, and an annotation overlaid on the map indicating at least one of: one or more scores corresponding to the time t, one or more locations for which.

Optionally, a measurement of affective response of a user, taken utilizing a sensor coupled to the user, includes at least one of the following: a value representing a physiological signal of the user and a value representing a behavioral cue of the user.

Optionally, the measurement of affective response of the user, taken utilizing the sensor coupled to the user, event is based on values acquired by measuring the user with the sensor during at least three different non-overlapping periods while the user was at the location.

Different vehicles provide different traveling experiences. Some traveling experiences are more comfortable for the traveler than others are. One way to compute a comfort score for traveling in a vehicle (whether as the driver or as the passenger) is to measure the affective response of the traveler while traveling in the vehicle, and optionally before and/or after traveling.

In one embodiment, a system configured to utilize profiles of travelers to compute personalized comfort scores for traveling in a certain type of vehicle based on measurements of affective response of the travelers, includes:

a memory storing computer executable modules; and a processor configured to execute the computer executable modules; the computer executable modules including:

a collection module configured to receive measurements of affective response of at least ten travelers; wherein each measurement of a traveler is taken with a sensor coupled to the traveler, while the traveler travels in a vehicle that is of the certain type;

a personalization module configured to receive a profile of a certain traveler and profiles of the at least ten travelers, and to generate an output indicative of similarities between the profile of the certain traveler and the profiles of the at least ten travelers; and a scoring module configured to compute a comfort score for the certain traveler based on the measurements and the output; wherein, for at least a certain first traveler and a certain second traveler, who have different profiles, the scoring module computes, for the certain type of vehicle, respective first and second comfort scores that are different.

Optionally, a profile of the certain first traveler indicates that the first traveler is a male aged 20-40 years old who weighs 200-300 lbs, and the profile of the certain second traveler indicates that the certain second traveler is a woman aged 50-70 years old who weighs 100-170 lbs, and the difference between the first and second comfort scores is above 10%.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

Optionally, a profile of a traveler includes information that describes one or more of the following: an indication of the preferred seating location of the traveler in the vehicle, an indication of the traveler's sensitivity to the sun, an indication of the traveler's sensitivity to noise, attitude toward vehicle manufacturers, a demographic characteristic of the traveler, a genetic characteristic of the traveler, a static attribute describing the body of the traveler, and a medical condition of the traveler.

Optionally, each measurement of a traveler is based on values acquired by the sensor during at least three different non-overlapping periods while the traveler travels in the vehicle that is of the certain type.

Optionally, the traveler travels in the vehicle that is of the certain type during more than 30 minutes, and each measurement of the traveler is based on values acquired by the sensor during at least five different non-overlapping periods that are spread over the more than 30 minutes.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

The system further includes a recommender module configured to recommend a vehicle to a traveler in a manner that belongs to a set including first and second manners; wherein when recommending a vehicle in the first manner, the recommender module provides a stronger recommendation for the vehicle, compared to a recommendation for the vehicle that the recommender module provides when recommending in the second manner.

Optionally, the recommender module is further configured to: recommend the vehicle in the first manner when a comfort score for the vehicle reaches a predetermined threshold, and to recommend the vehicle in the second manner when the comfort score does not reach the predetermined threshold.

Optionally, responsive to the first comfort score reaching the predetermined threshold, the vehicle is recommended, by the recommender module, to the certain first traveler in the first manner; and wherein responsive to the second comfort score not reaching the predetermined threshold, the vehicle is recommended, by the recommender module, to the certain second traveler in the second manner.

Optionally, the personalization module includes:

a profile comparator module configured to compute a value indicative of an extent of a similarity between a pair of profiles of travelers;

a weighting module configured to receive a profile of a certain traveler and profiles of the at least ten travelers and to generate weights for the measurements of the at least ten travelers; wherein the weight for a measurement of a traveler, from among the at least ten travelers, is proportional to the extent of a similarity computed by the profile comparator module between a pair including the profile of the traveler and the profile of the certain traveler, such that a weight generated for a measurement of a traveler whose profile is more similar to the profile of the certain traveler is higher than a weight generated for a measurement of a traveler whose profile is less similar to the profile of the certain traveler;

and wherein the comfort score is computed based on the measurements of the at least ten travelers and the weights.

Optionally, the personalization module includes:

a clustering module configured to receive profiles of the at least ten travelers, and to cluster the travelers into clusters based on profile similarity, with each cluster including a single traveler or multiple travelers with similar profiles; and a selector module configured to receive a profile of a certain traveler, and based on the profile, to select a subset including at most half of the clusters; wherein, on average, the profile of the certain traveler is more similar to a profile of a traveler who is a member of a cluster in the subset, than it is to a profile of a traveler, from among the at least ten travelers, who is not a member of any of the clusters in the subset;

the selector module is further configured to select at least eight travelers from among the travelers belonging to clusters in the subset;

and wherein the comfort score is computed based on measurements of the at least eight travelers.

In one embodiment, a system configured to utilize profiles of users to compute personalized comfort scores for wearing a certain type of clothing item based on measurements of affective response of the users, includes:

a memory storing computer executable modules; and a processor configured to execute the computer executable modules; the computer executable modules including:

a collection module configured to receive measurements of affective response of at least ten users; wherein each measurement of a user is taken with a sensor coupled to the user, while the user wears a clothing item that is of the certain type;

a personalization module configured to receive a profile of a certain user and profiles of the at least ten users, and to generate an output indicative of similarities between the profile of the certain user and the profiles of the at least ten users; and a scoring module configured to compute a comfort score for the certain user based on the measurements and the output; wherein, for at least a certain first user and a certain second user, who have different profiles, the scoring module computes respective first and second comfort scores that are different.

Optionally, a profile of the certain first user indicates that the first user is a woman aged 20-30 years old who weighs who weighs 130-160 lbs, and the profile of the certain second user indicates that the certain second user is a woman aged 50-60 years old who weighs 100-130 lbs, and the difference between the first and second comfort scores is above 10%.

Optionally, clothing items are categorized into types based on one or more of the following classifications: outerwear, underwear, tops, skirts, dresses, jackets, pants, shorts, coats, lingerie, shoes, and wearable accessories.

Optionally, clothing items are categorized into types based on one or more of the following classifications: cost of the clothing item, identity of the manufacturer of the clothing item, classification based on a brand associated with the clothing item, and model of the clothing item.

Optionally, a profile of a user includes information that describes one or more of the following properties of the user: skin tone, weight, height, sensitivity to certain fabrics, preferences regarding use of animal byproducts, attitude toward brands, a demographic characteristic of the user, a genetic characteristic of the user, a static attribute describing the body of the user, and a medical condition of the user.

Optionally, each measurement of a user is based on values acquired by the sensor during at least three different non-overlapping periods while the user wears the clothing item that is of the certain type.

Optionally, the user wears the clothing item that is of the certain type during more than 3 hours, and each measurement of the user is based on values acquired by the sensor during at least five different non-overlapping periods that are spread over the more than 3 hours.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

The system further includes a recommender module configured to recommend a clothing item to a user in a manner that belongs to a set including first and second manners; wherein when recommending a clothing item in the first manner, the recommender module provides a stronger recommendation for the clothing item, compared to a recommendation for the clothing item that the recommender module provides when recommending in the second manner.

Optionally, the recommender module is further configured to: recommend the clothing item in the first manner when a comfort score for the clothing item reaches a predetermined threshold, and to recommend the clothing item in the second manner when the comfort score does not reach the predetermined threshold.

Optionally, responsive to the first comfort score reaching the predetermined threshold, the clothing item is recommended, by the recommender module, to the certain first user in the first manner; and wherein responsive to the second comfort score not reaching the predetermined threshold, the clothing item is recommended, by the recommender module, to the certain second user in the second manner.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator module between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the comfort score is computed based on the measurements of the at least ten users and the weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the comfort score is computed based on measurements of the at least eight users.

In one embodiment, a system configured to utilize profiles of users to compute personalized satisfaction scores for a certain type of electronic device based on measurements of affective response of the users, includes:

a memory storing computer executable modules; and a processor configured to execute the computer executable modules; the computer executable modules including:

a collection module configured to receive measurements of affective response of at least ten users; wherein each measurement of a user is taken with a sensor coupled to the user, while the user interacts with an electronic device that is of the certain type;

a personalization module configured to receive a profile of a certain user and profiles of the at least ten users, and to generate an output indicative of similarities between the profile of the certain user and the profiles of the at least ten users; and a scoring module configured to compute a satisfaction score for the certain user based on the measurements and the output; wherein, for at least a certain first user and a certain second user, who have different profiles, the scoring module computes respective first and second satisfaction scores that are different.

Optionally, a profile of the certain first user indicates that the first user is a woman aged 30-50 years old who works at a low firm, and the profile of the certain second user indicates that the certain second user is a boy aged 10-15 years old, and the difference between the first and second comfort scores is above 10%.

Optionally, electronic device are categorized into types based on one or more of the following classifications: functionality of the electronic device, physical properties of the electronic device, power of the electronic device, durability of the electronic device, and mean time to failure (MTTF) of the electronic device.

Optionally, electronic device are categorized into types based on one or more of the following classifications: cost of the electronic device, identity of the manufacturer of the electronic device, classification based on a brand associated with the electronic device, and the model of the electronic device.

Optionally, a profile of a user includes information that describes one or more of the following properties of the user: attitude toward brands, a demographic characteristic of the user, a genetic characteristic of the user, a static attribute describing the body of the user, and a medical condition of the user.

Optionally, the first satisfaction score is computed based on at least one measurement that is not utilized for computing the second satisfaction score.

Optionally, a measurement utilized to compute both the first and second satisfaction scores has a first weight when utilized to compute the first satisfaction score and the measurement has a second weight, different from the first weight, when utilized to compute the second satisfaction score.

The system further includes a recommender module configured to recommend a type of electronic device to a user in a manner that belongs to a set including first and second manners; wherein when recommending a type of electronic device in the first manner, the recommender module provides a stronger recommendation for the type of electronic device, compared to a recommendation for the type of electronic device that the recommender module provides when recommending in the second manner.

Optionally, the recommender module is further configured to: recommend the type of electronic device in the first manner when a satisfaction score for the type of electronic device reaches a predetermined threshold, and to recommend the type of electronic device in the second manner when the satisfaction score does not reach the predetermined threshold.

Optionally, responsive to the first satisfaction score reaching the predetermined threshold, the type of electronic device is recommended, by the recommender module, to the certain first user in the first manner; and wherein responsive to the second satisfaction score not reaching the predetermined threshold, the type of electronic device is recommended, by the recommender module, to the certain second user in the second manner.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator module between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the satisfaction score is computed based on the measurements of the at least ten users and the weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the satisfaction score is computed based on measurements of the at least eight users.

In one embodiment, a system configured to utilize profiles of users to compute personalized food preference scores for a certain type of food item based on measurements of affective response of the users, includes:

a memory storing computer executable modules; and a processor configured to execute the computer executable modules; the computer executable modules including:

a collection module configured to receive measurements of affective response of at least ten users; wherein each measurement of a user is taken with a sensor coupled to the user, while the user consumes the certain type of food item;

a personalization module configured to receive a profile of a certain user and profiles of the at least ten users, and to generate an output indicative of similarities between the profile of the certain user and the profiles of the at least ten users; and a scoring module configured to compute a food preference score for the certain user based on the measurements and the output; wherein, for at least a certain first user and a certain second user, who have different profiles, the scoring module computes respective first and second food preference scores for the certain type of food item; and wherein the first and second food preference scores are different.

Optionally, consuming a certain type of food item involves at least one of eating the certain type of food item and drinking the certain type of food item.

Optionally, the collection module is further configured to receive additional measurements of affective response of the at least ten users; wherein each additional measurement of a user is taken with the sensor, at most four hour after the user finished consuming the certain type of food; and the scoring module is further configured to compute the food preference score for the certain user also based on the additional measurements.

Optionally, each measurement of a user is based on values acquired by the sensor during at least three different non-overlapping periods while the user consumes the certain type of food.

Optionally, the user consumes the certain type of food during more than five minutes, and each measurement of a user is based on values acquired by the sensor during at least five different non-overlapping periods that are spread over the more than five minutes.

Optionally, the food is categorized into types based on one or more of the following classifications or combinations thereof: (i) comfort food, fast food, junk food, natural food, organic food, slow food, and whole food, (ii) fruits, grains, vegetables, and protein, (iii) plant or animal source, (iv) extent to which the food is genetically modified, (v) way of preparing the food, (vi) identities of the food manufacturers, (vii) brands associated with the food, (viii) food price, (ix) existence of food substances related to food allergy, and (x) diet related properties of the food.

Optionally, a profile of a user includes information that describes one or more of the following properties of the user: sensitivity to certain food substances, known food allergies, preferences regarding use of animal source food, attitude toward brands, a demographic characteristic of the user, a genetic characteristic of the user, a static attribute describing the body of the user, a medical condition of the user, and attitude toward certain types of food.

Optionally, the first food preference score is computed based on at least one measurement that is not utilized for computing the second food preference score.

Optionally, a measurement utilized to compute both the first and second food preference scores has a first weight when utilized to compute the first food preference score and the measurement has a second weight, different from the first weight, when utilized to compute the second food preference score.

The system further includes a recommender module configured to recommend a certain type of food to a user in a manner that belongs to a set including first and second manners; wherein when recommending the certain type of food in the first manner, the recommender module provides a stronger recommendation for the certain type of food, compared to a recommendation for the certain type of food that the recommender module provides when recommending in the second manner.

Optionally, the recommender module is further configured to: recommend the certain type of food in the first manner when a food preference score for the certain type of food reaches a predetermined threshold, and to recommend the certain type of food in the second manner when the food preference score does not reach the predetermined threshold.

Optionally, responsive to the first food preference score reaching the predetermined threshold, the certain type of food is recommended, by the recommender module, to the certain first user in the first manner; and wherein responsive to the second food preference score not reaching the predetermined threshold, the certain type of food is recommended, by the recommender module, to the certain second user in the second manner.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator module between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the food preference score is computed based on the measurements of the at least ten users and the weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the food preference score is computed based on measurements of the at least eight users.

In one embodiment, a system configured to utilize profiles of users to compute personalized restaurant scores based on measurements of affective response of the users who ate at the restaurant, includes:

a memory storing computer executable modules; and a processor configured to execute the computer executable modules; the computer executable modules including:

a collection module configured to receive measurements of affective response of at least ten users; wherein each measurement of a user is taken with a sensor coupled to the user, while the user dines in the restaurant;

a personalization module configured to receive a profile of a certain user and profiles of the at least ten users, and to generate an output indicative of similarities between the profile of the certain user and the profiles of the at least ten users; and a scoring module configured to compute a restaurant score for the certain user based on the measurements and the output; wherein, for at least a certain first user and a certain second user, who have different profiles, the scoring module computes respective first and second restaurant scores that are different.

Optionally, the measurements of affective response of the at least ten users are taken when the at least ten users eat the same type of dish at the restaurant.

Optionally, the collection module is further configured to receive additional measurements of affective response of the at least ten users; wherein each additional measurement of a user is taken with the sensor, at most four hour after the user finished dining at the restaurant; and the scoring module is further configured to compute the restaurant score for the certain user also based on the additional measurements.

Optionally, each measurement of a user is based on values acquired by the sensor during at least three different non-overlapping periods while the user dines at the restaurant.

Optionally, the user dines at the restaurant during more than 30 minutes, and each measurement of a user is based on values acquired by the sensor during at least five different non-overlapping periods that are spread over the more than 30 minutes.

Optionally, a profile of a user includes information that describes one or more of the following properties of the user: sensitivity to certain food substances, known food allergies, preferences regarding use of animal source food, preferred seating location at the restaurant, an indication of the user's sensitivity to environmental noise, attitude toward brands, a demographic characteristic of the user, a genetic characteristic of the user, a static attribute describing the body of the user, a medical condition of the user, and attitude toward certain types of food.

Optionally, the first restaurant score is computed based on at least one measurement that is not utilized for computing the second restaurant score.

Optionally, a measurement utilized to compute both the first and second restaurant scores has a first weight when utilized to compute the first restaurant score and the measurement has a second weight, different from the first weight, when utilized to compute the second restaurant score.

The system further includes a recommender module configured to recommend a restaurant to a user in a manner that belongs to a set including first and second manners; wherein when recommending the restaurant in the first manner, the recommender module provides a stronger recommendation for the restaurant, compared to a recommendation for the restaurant that the recommender module provides when recommending in the second manner.

Optionally, the recommender module is further configured to: recommend the restaurant in the first manner when a restaurant score for the restaurant reaches a predetermined threshold, and to recommend the restaurant in the second manner when the restaurant score does not reach the predetermined threshold.

Optionally, responsive to the first restaurant score reaching the predetermined threshold, the certain restaurant is recommended, by the recommender module, to the certain first user in the first manner; and wherein responsive to the second restaurant score not reaching the predetermined threshold, the certain restaurant is recommended, by the recommender module, to the certain second user in the second manner.

Optionally, the personalization module includes:

a profile comparator module configured to compute a value indicative of an extent of a similarity between a pair of profiles of users;

a weighting module configured to receive a profile of a certain user and profiles of the at least ten users and to generate weights for the measurements of the at least ten users; wherein the weight for a measurement of a user, from among the at least ten users, is proportional to the extent of a similarity computed by the profile comparator module between a pair including the profile of the user and the profile of the certain user, such that a weight generated for a measurement of a user whose profile is more similar to the profile of the certain user is higher than a weight generated for a measurement of a user whose profile is less similar to the profile of the certain user;

and wherein the restaurant score is computed based on the measurements of the at least ten users and the weights.

Optionally, the personalization module includes:

a clustering module configured to receive profiles of the at least ten users, and to cluster the users into clusters based on profile similarity, with each cluster including a single user or multiple users with similar profiles; and a selector module configured to receive a profile of a certain user, and based on the profile, to select a subset including at most half of the clusters; wherein, on average, the profile of the certain user is more similar to a profile of a user who is a member of a cluster in the subset, than it is to a profile of a user, from among the at least ten users, who is not a member of any of the clusters in the subset;

the selector module is further configured to select at least eight users from among the users belonging to clusters in the subset;

and wherein the restaurant score is computed based on measurements of the at least eight users.

In one embodiment, a system configured to rank comfort scores for traveling in various types of vehicles based on measurements of affective response of travelers that traveled in the various types of vehicles, includes:

a memory storing computer executable modules; and a processor configured to execute the computer executable modules; the computer executable modules including:

a collection module configured to receive the measurements of affective response of the travelers while traveling in vehicles that are of the certain types of vehicles; wherein the measurements are taken utilizing sensors coupled to the travelers; and wherein for each type of vehicle of the various types of vehicles, the measurements include measurements of at least five users who traveled in that type of vehicle; and a ranking module configured to rank the various types of vehicles based on the measurements, such that, a first comfort score for traveling in a first type of vehicles from among the various types of vehicles is ranked higher than a second comfort score for traveling in a second type of vehicles from among the various types of vehicles.

Optionally, a profile of the certain first traveler indicates that the first traveler is a male aged 20-40 years old who weighs 200-300 lbs, and the profile of the certain second traveler indicates that the certain second traveler is a woman aged 50-70 years old who weighs 100-170 lbs, and the difference between the first and second comfort scores is above 10%.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

Optionally, a profile of a traveler includes information that describes one or more of the following: an indication of the preferred seating location of the traveler in the vehicle, an indication of the traveler's sensitivity to the sun, an indication of the traveler's sensitivity to noise, attitude toward vehicle manufacturers, a demographic characteristic of the traveler, a genetic characteristic of the traveler, a static attribute describing the body of the traveler, and a medical condition of the traveler.

Optionally, each measurement of a traveler is based on values acquired by the sensor during at least three different non-overlapping periods while the traveler travels in the vehicle that is of the certain type.

Optionally, the traveler travels in the vehicle that is of the certain type during more than 30 minutes, and each measurement of the traveler is based on values acquired by the sensor during at least five different non-overlapping periods that are spread over the more than 30 minutes.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to rank comfort scores for wearing certain types of clothing items based on measurements of affective response of users that wear clothing items of the various type, includes:

a memory storing computer executable modules; and a processor configured to execute the computer executable modules; the computer executable modules including:

a collection module configured to receive the measurements of affective response of the users while wearing clothing items that are of the certain types; wherein the measurements are taken utilizing sensors coupled to the users; and wherein for each type of clothing item of the various types of clothing items, the measurements include measurements of at least five users who wear the same type of clothing item; and a ranking module configured to rank the various types of clothing items based on the measurements, such that, a first comfort score for wearing a first type of clothing item from among the various types of clothing items is ranked higher than a second comfort score for wearing a second type of clothing item from among the various types of clothing items.

Optionally, a profile of the certain first user indicates that the first user is a woman aged 20-30 years old who weighs who weighs 130-160 lbs, and the profile of the certain second user indicates that the certain second user is a woman aged 50-60 years old who weighs 100-130 lbs, and the difference between the first and second comfort scores is above 10%.

Optionally, clothing items are categorized into types based on one or more of the following classifications: outerwear, underwear, tops, skirts, dresses, jackets, pants, shorts, coats, lingerie, shoes, and wearable accessories.

Optionally, clothing items are categorized into types based on one or more of the following classifications: cost of the clothing item, identity of the manufacturer of the clothing item, classification based on a brand associated with the clothing item, and model of the clothing item.

Optionally, a profile of a user includes information that describes one or more of the following properties of the user: skin tone, weight, height, sensitivity to certain fabrics, preferences regarding use of animal byproducts, attitude toward brands, a demographic characteristic of the user, a genetic characteristic of the user, a static attribute describing the body of the user, and a medical condition of the user.

Optionally, each measurement of a user is based on values acquired by the sensor during at least three different non-overlapping periods while the user wears the clothing item that is of the certain type.

Optionally, the user wears the clothing item that is of the certain type during more than 3 hours, and each measurement of the user is based on values acquired by the sensor during at least five different non-overlapping periods that are spread over the more than 3 hours.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to rank satisfaction scores for interacting with electronic devices that are of certain types, based on measurements of affective response of users who interact with the electronic devices, includes:

a memory storing computer executable modules; and a processor configured to execute the computer executable modules; the computer executable modules including:

a collection module configured to receive the measurements of affective response of the users while interacting with electronic devices that are of the certain types; wherein the measurements are taken utilizing sensors coupled to the users; and wherein for each type of electronic device of the various types of electronic devices, the measurements include measurements of at least five users while interacting with an electronic device that is of the certain type; and a ranking module configured to rank the various types of electronic devices based on the measurements, such that, a first satisfaction score for interacting with a first type of electronic device from among the various types of electronic devices is ranked higher than a second satisfaction score for interacting with a second type of electronic device from among the various types of electronic devices.

Optionally, a profile of the certain first user indicates that the first user is a woman aged 30-50 years old who works at a low firm, and the profile of the certain second user indicates that the certain second user is a boy aged 10-15 years old, and the difference between the first and second comfort scores is above 10%.

Optionally, electronic device are categorized into types based on one or more of the following classifications: functionality of the electronic device, physical properties of the electronic device, power of the electronic device, durability of the electronic device, and mean time to failure (MTTF) of the electronic device.

Optionally, electronic device are categorized into types based on one or more of the following classifications: cost of the electronic device, identity of the manufacturer of the electronic device, classification based on a brand associated with the electronic device, and the model of the electronic device.

Optionally, a profile of a user includes information that describes one or more of the following properties of the user: attitude toward brands, a demographic characteristic of the user, a genetic characteristic of the user, a static attribute describing the body of the user, and a medical condition of the user.

Optionally, the first satisfaction score is computed based on at least one measurement that is not utilized for computing the second satisfaction score.

Optionally, a measurement utilized to compute both the first and second satisfaction scores has a first weight when utilized to compute the first satisfaction score and the measurement has a second weight, different from the first weight, when utilized to compute the second satisfaction score.

In one embodiment, a system configured to rank food preference scores for consuming certain types of food items, based on measurements of affective response of users who consumed the certain types of food items, includes:

a memory storing computer executable modules; and
a processor configured to execute the computer executable modules; the computer executable modules including:
a collection module configured to receive the measurements of affective response of the users while consuming food items that are of the certain types of food items; wherein the measurements are taken utilizing sensors coupled to the users; and wherein for each type of food item of the various types of food items, the measurements include measurements of at least five users while consuming the food item that is of the certain type; and
a ranking module configured to rank the various types of food items based on the measurements, such that, a first food preference score for consuming a first type of food item from among the various types of food items is ranked higher than a second food preference score for consuming a second type of food item from among the various types of food items.

Optionally, consuming a certain type of food item involves at least one of eating the certain type of food item and drinking the certain type of food item.

Optionally, the collection module is further configured to receive additional measurements of affective response of the at least ten users; wherein each additional measurement of a user is taken with the sensor, at most four hour after the user finished consuming the certain type of food; and the scoring module is further configured to compute the food preference score for the certain user also based on the additional measurements.

Optionally, each measurement of a user is based on values acquired by the sensor during at least three different non-overlapping periods while the user consumes the certain type of food.

Optionally, the user consumes the certain type of food during more than five minutes, and each measurement of a user is based on values acquired by the sensor during at least five different non-overlapping periods that are spread over the more than five minutes.

Optionally, the food is categorized into types based on one or more of the following classifications or combinations thereof: (i) comfort food, fast food, junk food, natural food, organic food, slow food, and whole food, (ii) fruits, grains, vegetables, and protein, (iii) plant or animal source, (iv) extent to which the food is genetically modified, (v) way of preparing the food, (vi) identities of the food manufacturers, (vii) brands associated with the food, (viii) food price, (ix) existence of food substances related to food allergy, and (x) diet related properties of the food.

Optionally, a profile of a user includes information that describes one or more of the following properties of the user: sensitivity to certain food substances, known food allergies, preferences regarding use of animal source food, attitude toward brands, a demographic characteristic of the user, a genetic characteristic of the user, a static attribute describing the body of the user, a medical condition of the user, and attitude toward certain types of food.

Optionally, the first food preference score is computed based on at least one measurement that is not utilized for computing the second food preference score.

Optionally, a measurement utilized to compute both the first and second food preference scores has a first weight when utilized to compute the first food preference score and the measurement has a second weight, different from the first weight, when utilized to compute the second food preference score.

In one embodiment, a system configured to rank restaurant scores for dining at various restaurants, based on measurements of affective response of diners who dined at the various restaurants, includes:

a memory storing computer executable modules; and
a processor configured to execute the computer executable modules; the computer executable modules including:
a collection module configured to receive the measurements of affective response of the diners while dining at the various restaurants; wherein the measurements are taken utilizing sensors coupled to the diners; and wherein for each restaurant of the various restaurants, the measurements include measurements of at least five diners while dining at the restaurant; and
a ranking module configured to rank the various restaurants based on the measurements, such that, a first restaurant score for dining at a first restaurant from among the various restaurants is ranked higher than a second restaurant score for dining at a second restaurant from among the various restaurants.

Optionally, the measurements of affective response of the at least ten users are taken when the at least ten users eat the same type of dish at the restaurant.

Optionally, the collection module is further configured to receive additional measurements of affective response of the at least ten users; wherein each additional measurement of a user is taken with the sensor, at most four hour after the user finished dining at the restaurant; and the scoring module is further configured to compute the restaurant score for the certain user also based on the additional measurements.

Optionally, each measurement of a user is based on values acquired by the sensor during at least three different non-overlapping periods while the user dines at the restaurant.

Optionally, the user dines at the restaurant during more than 30 minutes, and each measurement of a user is based on values acquired by the sensor during at least five different non-overlapping periods that are spread over the more than 30 minutes.

Optionally, a profile of a user includes information that describes one or more of the following properties of the user: sensitivity to certain food substances, known food allergies, preferences regarding use of animal source food, preferred seating location at the restaurant, an indication of the user's sensitivity to environmental noise, attitude toward brands, a demographic characteristic of the user, a genetic characteristic of the user, a static attribute describing the body of the user, a medical condition of the user, and attitude toward certain types of food.

Optionally, the first restaurant score is computed based on at least one measurement that is not utilized for computing the second restaurant score.

Optionally, a measurement utilized to compute both the first and second restaurant scores has a first weight when utilized to compute the first restaurant score and the measurement has a second weight, different from the first weight, when utilized to compute the second restaurant score.

In one embodiment, a system configured to utilize profiles of travelers to compute personalized rankings of traveling in various types of vehicles based on measurements of affective response of the travelers, includes:
 a memory storing computer executable modules; and
 a processor configured to execute the computer executable modules; the computer executable modules including:
 a collection module configured to receive measurements of affective response of the travelers taken while traveling in vehicles that are of the various types of vehicles; wherein the measurements are taken utilizing sensors coupled to the travelers; and wherein for each certain type of vehicle of the various types of vehicles, the measurements include measurements of at least eight travelers taken while they were traveling in certain type of vehicle;
 a personalization module configured to receive a profile of a certain traveler and profiles of the travelers, and to generate an output indicative of similarities between the profile of the certain traveler and the profiles of the travelers; and
 a ranking module configured to rank the various types of vehicles utilizing the output and at least some of the measurements; wherein, for at least a certain first traveler and a certain second traveler, who have different profiles, the ranking module ranks first and second types of vehicles from among the various types of vehicles differently, such that for the certain first traveler, the first type of vehicle is ranked above the second type of vehicle, and for the certain second traveler, the second type of vehicle is ranked above the first type of vehicle.

Optionally, a profile of the certain first traveler indicates that the first traveler is a male aged 20-40 years old who weighs 200-300 lbs, and the profile of the certain second traveler indicates that the certain second traveler is a woman aged 50-70 years old who weighs 100-170 lbs, and the difference between the first and second comfort scores is above 10%.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

Optionally, a profile of a traveler includes information that describes one or more of the following: an indication of the preferred seating location of the traveler in the vehicle, an indication of the traveler's sensitivity to the sun, an indication of the traveler's sensitivity to noise, attitude toward vehicle manufacturers, a demographic characteristic of the traveler, a genetic characteristic of the traveler, a static attribute describing the body of the traveler, and a medical condition of the traveler.

Optionally, each measurement of a traveler is based on values acquired by the sensor during at least three different non-overlapping periods while the traveler travels in the vehicle that is of the certain type.

Optionally, the traveler travels in the vehicle that is of the certain type during more than 30 minutes, and each measurement of the traveler is based on values acquired by the sensor during at least five different non-overlapping periods that are spread over the more than 30 minutes.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to utilize profiles of users to compute personalized rankings of wearing various types of clothing items based on measurements of affective response of the users, includes:
 a memory storing computer executable modules; and
 a processor configured to execute the computer executable modules; the computer executable modules including:
 a collection module configured to receive measurements of affective response of the users taken while wearing clothing items that are of the various types of clothing items; wherein the measurements are taken utilizing sensors coupled to the users; and wherein for each certain type of clothing item of the various types of clothing items, the measurements include measurements of at least eight users taken while they were wearing the clothing item of the certain type;
 a personalization module configured to receive a profile of a certain user and profiles of the users, and to generate an output indicative of similarities between the profile of the certain user and the profiles of the users; and
 a ranking module configured to rank the various types of clothing items utilizing the output and at least some of the measurements; wherein, for at least a certain first user and a certain second user, who have different profiles, the ranking module ranks first and second types of clothing items from among the various types of clothing items differently, such that for the certain first user, the first type of clothing item is ranked above the second type of clothing item, and for the certain second user, the second type of clothing item is ranked above the first type of clothing item.

Optionally, a profile of the certain first user indicates that the first user is a woman aged 20-30 years old who weighs who weighs 130-160 lbs, and the profile of the certain second user indicates that the certain second user is a woman aged 50-60 years old who weighs 100-130 lbs, and the difference between the first and second comfort scores is above 10%.

Optionally, clothing items are categorized into types based on one or more of the following classifications: outerwear, underwear, tops, skirts, dresses, jackets, pants, shorts, coats, lingerie, shoes, and wearable accessories.

Optionally, clothing items are categorized into types based on one or more of the following classifications: cost of the clothing item, identity of the manufacturer of the clothing item, classification based on a brand associated with the clothing item, and model of the clothing item.

Optionally, a profile of a user includes information that describes one or more of the following properties of the user: skin tone, weight, height, sensitivity to certain fabrics, preferences regarding use of animal byproducts, attitude toward brands, a demographic characteristic of the user, a genetic characteristic of the user, a static attribute describing the body of the user, and a medical condition of the user.

Optionally, each measurement of a user is based on values acquired by the sensor during at least three different non-overlapping periods while the user wears the clothing item that is of the certain type.

Optionally, the user wears the clothing item that is of the certain type during more than 3 hours, and each measurement of the user is based on values acquired by the sensor during at least five different non-overlapping periods that are spread over the more than 3 hours.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to utilize profiles of users to compute personalized rankings of interacting with various types of electronic devices based on measurements of affective response of the users, includes:

a memory storing computer executable modules; and a processor configured to execute the computer executable modules; the computer executable modules including:

a collection module configured to receive measurements of affective response of the users taken while interacting with electronic devices that are of the various types of electronic devices; wherein the measurements are taken utilizing sensors coupled to the users; and wherein for each certain type of electronic device of the various types of electronic devices, the measurements include measurements of at least eight users taken while they were interacting with the electronic devices of the certain type;

a personalization module configured to receive a profile of a certain user and profiles of the users, and to generate an output indicative of similarities between the profile of the certain user and the profiles of the users; and a ranking module configured to rank the various types of electronic devices utilizing the output and at least some of the measurements; wherein, for at least a certain first user and a certain second user, who have different profiles, the ranking module ranks first and second types of electronic devices from among the various types of electronic devices differently, such that for the certain first user, the first type of electronic device is ranked above the second type of electronic device, and for the certain second user, the second type of electronic device is ranked above the first type of electronic device.

Optionally, a profile of the certain first user indicates that the first user is a woman aged 30-50 years old who works at a low firm, and the profile of the certain second user indicates that the certain second user is a boy aged 10-15 years old, and the difference between the first and second comfort scores is above 10%.

Optionally, electronic device are categorized into types based on one or more of the following classifications: functionality of the electronic device, physical properties of the electronic device, power of the electronic device, durability of the electronic device, and mean time to failure (MTTF) of the electronic device.

Optionally, electronic device are categorized into types based on one or more of the following classifications: cost of the electronic device, identity of the manufacturer of the electronic device, classification based on a brand associated with the electronic device, and the model of the electronic device.

Optionally, a profile of a user includes information that describes one or more of the following properties of the user: attitude toward brands, a demographic characteristic of the user, a genetic characteristic of the user, a static attribute describing the body of the user, and a medical condition of the user.

Optionally, the first satisfaction score is computed based on at least one measurement that is not utilized for computing the second satisfaction score.

Optionally, a measurement utilized to compute both the first and second satisfaction scores has a first weight when utilized to compute the first satisfaction score and the measurement has a second weight, different from the first weight, when utilized to compute the second satisfaction score.

In one embodiment, a system configured to utilize profiles of users to compute personalized rankings of various types of food items based on measurements of affective response of the users, includes:

a memory storing computer executable modules; and a processor configured to execute the computer executable modules; the computer executable modules including:

a collection module configured to receive measurements of affective response of the users taken while consuming food items that are of the various types of food items; wherein the measurements are taken utilizing sensors coupled to the users; and wherein for each certain type of food item of the various types of food items, the measurements include measurements of at least eight users taken while they were consuming the food items of the certain type;

a personalization module configured to receive a profile of a certain user and profiles of the users, and to generate an output indicative of similarities between the profile of the certain user and the profiles of the users; and a ranking module configured to rank the various types of food items utilizing the output and at least some of the measurements; wherein, for at least a certain first user and a certain second user, who have different profiles, the ranking module ranks first and second types of food items from among the various types of food items differently, such that for the certain first user, the first type of food item is ranked above the second type of food item, and for the certain second user, the second type of food item is ranked above the first type of food item.

Optionally, consuming a certain type of food item involves at least one of eating the certain type of food item and drinking the certain type of food item.

Optionally, the collection module is further configured to receive additional measurements of affective response of the at least ten users; wherein each additional measurement of a user is taken with the sensor, at most four hour after the user finished consuming the certain type of food; and the scoring module is further configured to compute the food preference score for the certain user also based on the additional measurements.

Optionally, each measurement of a user is based on values acquired by the sensor during at least three different non-overlapping periods while the user consumes the certain type of food.

Optionally, the user consumes the certain type of food during more than five minutes, and each measurement of a user is based on values acquired by the sensor during at least five different non-overlapping periods that are spread over the more than five minutes.

Optionally, the food is categorized into types based on one or more of the following classifications or combinations thereof: (i) comfort food, fast food, junk food, natural food, organic food, slow food, and whole food, (ii) fruits, grains, vegetables, and protein, (iii) plant or animal source, (iv) extent to which the food is genetically modified, (v) way of preparing the food, (vi) identities of the food manufacturers, (vii) brands associated with the food, (viii) food price, (ix) existence of food substances related to food allergy, and (x) diet related properties of the food.

Optionally, a profile of a user includes information that describes one or more of the following properties of the user: sensitivity to certain food substances, known food allergies, preferences regarding use of animal source food, attitude toward brands, a demographic characteristic of the user, a genetic characteristic of the user, a static attribute describing the body of the user, a medical condition of the user, and attitude toward certain types of food.

Optionally, the first food preference score is computed based on at least one measurement that is not utilized for computing the second food preference score.

Optionally, a measurement utilized to compute both the first and second food preference scores has a first weight when utilized to compute the first food preference score and the measurement has a second weight, different from the first weight, when utilized to compute the second food preference score.

In one embodiment, a system configured to utilize profiles of diners to compute personalized rankings of restaurants based on measurements of affective response of the diners, includes:

a memory storing computer executable modules; and a processor configured to execute the computer executable modules; the computer executable modules including:

a collection module configured to receive measurements of affective response of the diners taken while dining at the restaurants; wherein the measurements are taken utilizing sensors coupled to the diners; and wherein for each restaurant of the restaurants, the measurements include measurements of at least eight diners while dining at the restaurant;

a personalization module configured to receive a profile of a certain diner and profiles of the diners, and to generate an output indicative of similarities between the profile of the certain diner and the profiles of the diners; and a ranking module configured to rank the various restaurants utilizing the output and at least some of the measurements; wherein, for at least a certain first diner and a certain second diner, who have different profiles, the ranking module ranks first and second restaurants from among the restaurants differently, such that for the certain first diner, the first restaurant is ranked above the second restaurant, and for the certain second diner, the second restaurant is ranked above the first restaurant.

Optionally, the measurements of affective response of the at least ten users are taken when the at least ten users eat the same type of dish at the restaurant.

Optionally, the collection module is further configured to receive additional measurements of affective response of the at least ten users; wherein each additional measurement of a user is taken with the sensor, at most four hour after the user finished dining at the restaurant; and the scoring module is further configured to compute the restaurant score for the certain user also based on the additional measurements.

Optionally, each measurement of a user is based on values acquired by the sensor during at least three different non-overlapping periods while the user dines at the restaurant.

Optionally, the user dines at the restaurant during more than 30 minutes, and each measurement of a user is based on values acquired by the sensor during at least five different non-overlapping periods that are spread over the more than 30 minutes.

Optionally, a profile of a user includes information that describes one or more of the following properties of the user: sensitivity to certain food substances, known food allergies, preferences regarding use of animal source food, preferred seating location at the restaurant, an indication of the user's sensitivity to environmental noise, attitude toward brands, a demographic characteristic of the user, a genetic characteristic of the user, a static attribute describing the body of the user, a medical condition of the user, and attitude toward certain types of food.

Optionally, the first restaurant score is computed based on at least one measurement that is not utilized for computing the second restaurant score.

Optionally, a measurement utilized to compute both the first and second restaurant scores has a first weight when utilized to compute the first restaurant score and the measurement has a second weight, different from the first weight, when utilized to compute the second restaurant score.

In one embodiment, a system configured to learn a function of an aftereffect resulting from traveling in a vehicle of a certain type, includes:

a memory storing computer executable modules; and a processor configured to execute the computer executable modules; the computer executable modules including:

a collection module configured to receive measurements of affective response of travelers, taken utilizing sensors coupled to at least ten travelers; the measurements including prior and subsequent measurements of at least ten travelers who were traveling in a vehicle of the certain type; wherein a prior measurement of a traveler is taken while the traveler travels in the vehicle of the certain type, and a subsequent measurement of the traveler is taken after elapsing of a duration of at least one minute after the traveler gets out of the vehicle of the certain type; and a function learning module configured to utilize the prior and subsequent measurements to learn an aftereffect function that describes values of expected affective response after different durations since getting out of the vehicle of the certain type.

Optionally, a profile of the certain first traveler indicates that the first traveler is a male aged 20-40 years old who weighs 200-300 lbs, and the profile of the certain second traveler indicates that the certain second traveler is a woman aged 50-70 years old who weighs 100-170 lbs, and the difference between the first and second comfort scores is above 10%.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

Optionally, a profile of a traveler includes information that describes one or more of the following: an indication of the preferred seating location of the traveler in the vehicle, an indication of the traveler's sensitivity to the sun, an indication of the traveler's sensitivity to noise, attitude toward vehicle manufacturers, a demographic characteristic of the traveler, a genetic characteristic of the traveler, a static attribute describing the body of the traveler, and a medical condition of the traveler.

Optionally, each measurement of a traveler is based on values acquired by the sensor during at least three different non-overlapping periods while the traveler travels in the vehicle that is of the certain type.

Optionally, the traveler travels in the vehicle that is of the certain type during more than 30 minutes, and each measurement of the traveler is based on values acquired by the sensor during at least five different non-overlapping periods that are spread over the more than 30 minutes.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to learn a function of an aftereffect resulting from wearing a clothing item of a certain type, includes:
a memory storing computer executable modules; and
a processor configured to execute the computer executable modules; the computer executable modules including:
a collection module configured to receive measurements of affective response of users, taken utilizing sensors coupled to at least ten users; the measurements including prior and subsequent measurements of at least ten users who were wearing clothing items of the certain type; wherein a prior measurement of a user is taken before the user removes the clothing item, and a subsequent measurement of the user is taken after elapsing of a duration of at least one minute after the user removed the clothing item; and
a function learning module configured to utilize the prior and subsequent measurements to learn an aftereffect function that describes values of expected affective response after different durations since removing the type of clothing item of the certain type.

Optionally, a profile of the certain first user indicates that the first user is a woman aged 20-30 years old who weighs who weighs 130-160 lbs, and the profile of the certain second user indicates that the certain second user is a woman aged 50-60 years old who weighs 100-130 lbs, and the difference between the first and second comfort scores is above 10%.

Optionally, clothing items are categorized into types based on one or more of the following classifications: outerwear, underwear, tops, skirts, dresses, jackets, pants, shorts, coats, lingerie, shoes, and wearable accessories.

Optionally, clothing items are categorized into types based on one or more of the following classifications: cost of the clothing item, identity of the manufacturer of the clothing item, classification based on a brand associated with the clothing item, and model of the clothing item.

Optionally, a profile of a user includes information that describes one or more of the following properties of the user: skin tone, weight, height, sensitivity to certain fabrics, preferences regarding use of animal byproducts, attitude toward brands, a demographic characteristic of the user, a genetic characteristic of the user, a static attribute describing the body of the user, and a medical condition of the user.

Optionally, each measurement of a user is based on values acquired by the sensor during at least three different non-overlapping periods while the user wears the clothing item that is of the certain type.

Optionally, the user wears the clothing item that is of the certain type during more than 3 hours, and each measurement of the user is based on values acquired by the sensor during at least five different non-overlapping periods that are spread over the more than 3 hours.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to learn a function of an aftereffect resulting from interacting with an electronic device of a certain type, includes:
a memory storing computer executable modules; and
a processor configured to execute the computer executable modules; the computer executable modules including:
a collection module configured to receive measurements of affective response of users, taken utilizing sensors coupled to at least ten users; the measurements including prior and subsequent measurements of at least ten users who were interacting with electronic devices of the certain type; wherein a prior measurement of a user is taken while the user interacts with the electronic device, and a subsequent measurement of the user is taken after elapsing of a duration of at least one minute after the user completed the interaction with the electronic device; and
a function learning module configured to utilize the prior and subsequent measurements to learn an aftereffect function that describes values of expected affective response after different durations since completing the interaction with an electronic device of the certain type.

Optionally, a profile of the certain first user indicates that the first user is a woman aged 30-50 years old who works at a low firm, and the profile of the certain second user indicates that the certain second user is a boy aged 10-15 years old, and the difference between the first and second comfort scores is above 10%.

Optionally, electronic device are categorized into types based on one or more of the following classifications: functionality of the electronic device, physical properties of the electronic device, power of the electronic device, durability of the electronic device, and mean time to failure (MTTF) of the electronic device.

Optionally, electronic device are categorized into types based on one or more of the following classifications: cost of the electronic device, identity of the manufacturer of the electronic device, classification based on a brand associated with the electronic device, and the model of the electronic device.

Optionally, a profile of a user includes information that describes one or more of the following properties of the user: attitude toward brands, a demographic characteristic of the user, a genetic characteristic of the user, a static attribute describing the body of the user, and a medical condition of the user.

Optionally, the first satisfaction score is computed based on at least one measurement that is not utilized for computing the second satisfaction score.

Optionally, a measurement utilized to compute both the first and second satisfaction scores has a first weight when utilized to compute the first satisfaction score and the measurement has a second weight, different from the first weight, when utilized to compute the second satisfaction score.

In one embodiment, a system configured to learn a function of an aftereffect resulting from consuming a certain food item of a certain type, includes:
 a memory storing computer executable modules; and
 a processor configured to execute the computer executable modules; the computer executable modules including:
 a collection module configured to receive measurements of affective response of users, taken utilizing sensors coupled to at least ten users; the measurements including prior and subsequent measurements of at least ten users who consumed food items of the certain type; wherein a prior measurement of a user is taken while the user consumes the food item, and a subsequent measurement of the user is taken after elapsing of a duration of at least one minute after the user finished consuming the food item; and
 a function learning module configured to utilize the prior and subsequent measurements to learn an aftereffect function that describes values of expected affective response after different durations since finish consuming a food item of the certain type.

Optionally, consuming a certain type of food item involves at least one of eating the certain type of food item and drinking the certain type of food item.

Optionally, the collection module is further configured to receive additional measurements of affective response of the at least ten users; wherein each additional measurement of a user is taken with the sensor, at most four hour after the user finished consuming the certain type of food; and the scoring module is further configured to compute the food preference score for the certain user also based on the additional measurements.

Optionally, each measurement of a user is based on values acquired by the sensor during at least three different non-overlapping periods while the user consumes the certain type of food.

Optionally, the user consumes the certain type of food during more than five minutes, and each measurement of a user is based on values acquired by the sensor during at least five different non-overlapping periods that are spread over the more than five minutes.

Optionally, the food is categorized into types based on one or more of the following classifications or combinations thereof: (i) comfort food, fast food, junk food, natural food, organic food, slow food, and whole food, (ii) fruits, grains, vegetables, and protein, (iii) plant or animal source, (iv) extent to which the food is genetically modified, (v) way of preparing the food, (vi) identities of the food manufacturers, (vii) brands associated with the food, (viii) food price, (ix) existence of food substances related to food allergy, and (x) diet related properties of the food.

Optionally, a profile of a user includes information that describes one or more of the following properties of the user: sensitivity to certain food substances, known food allergies, preferences regarding use of animal source food, attitude toward brands, a demographic characteristic of the user, a genetic characteristic of the user, a static attribute describing the body of the user, a medical condition of the user, and attitude toward certain types of food.

Optionally, the first food preference score is computed based on at least one measurement that is not utilized for computing the second food preference score.

Optionally, a measurement utilized to compute both the first and second food preference scores has a first weight when utilized to compute the first food preference score and the measurement has a second weight, different from the first weight, when utilized to compute the second food preference score.

In one embodiment, a system configured to learn a function of an aftereffect resulting from dining at a restaurant, includes:
 a memory storing computer executable modules; and
 a processor configured to execute the computer executable modules; the computer executable modules including:
 a collection module configured to receive measurements of affective response of diners, taken utilizing sensors coupled to at least ten diners; the measurements including prior and subsequent measurements of at least ten diners who dined at the restaurant; wherein a prior measurement of a diner is taken while the diner dines at the restaurant, and a subsequent measurement of the diner is taken after elapsing of a duration of at least five minute after the diner leaves the restaurant; and
 a function learning module configured to utilize the prior and subsequent measurements to learn an aftereffect function that describes values of expected affective response after different durations since leaving the restaurant.

Optionally, the measurements of affective response of the at least ten users are taken when the at least ten users eat the same type of dish at the restaurant.

Optionally, the collection module is further configured to receive additional measurements of affective response of the at least ten users; wherein each additional measurement of a user is taken with the sensor, at most four hour after the user finished dining at the restaurant; and the scoring module is further configured to compute the restaurant score for the certain user also based on the additional measurements.

Optionally, each measurement of a user is based on values acquired by the sensor during at least three different non-overlapping periods while the user dines at the restaurant.

Optionally, the user dines at the restaurant during more than 30 minutes, and each measurement of a user is based on values acquired by the sensor during at least five different non-overlapping periods that are spread over the more than 30 minutes.

Optionally, a profile of a user includes information that describes one or more of the following properties of the user: sensitivity to certain food substances, known food allergies, preferences regarding use of animal source food, preferred seating location at the restaurant, an indication of the user's sensitivity to environmental noise, attitude toward brands, a demographic characteristic of the user, a genetic characteristic of the user, a static attribute describing the body of the user, a medical condition of the user, and attitude toward certain types of food.

Optionally, the first restaurant score is computed based on at least one measurement that is not utilized for computing the second restaurant score.

Optionally, a measurement utilized to compute both the first and second restaurant scores has a first weight when utilized to compute the first restaurant score and the measurement has a second weight, different from the first weight, when utilized to compute the second restaurant score.

In one embodiment, a system configured to rank certain types of vehicles based on aftereffects determined from measurements of affective response of travelers, includes:

a memory storing computer executable modules; and a processor configured to execute the computer executable modules; the computer executable modules including:

a collection module configured to receive measurements of affective response of travelers while traveling in vehicles of the certain types; wherein the measurements include, for each certain type of vehicle from among the certain types of clothing items, prior and subsequent measurements of at least five travelers who traveled in the certain type of vehicle; and wherein a prior measurement of a traveler is taken before the traveler gets out of the certain type of vehicle, and a subsequent measurement of the traveler is taken at least one minute after the traveler got out of the certain type of vehicle; and an aftereffect ranking module configured to rank the certain types of vehicles based on the measurements, such that, for at least first and second types of vehicles from among the certain types of vehicles, the aftereffect resulting from traveling in the first type of vehicle is greater than the aftereffect resulting from traveling in the second type of vehicle, and the first type of vehicle is ranked above the second type of vehicle; and wherein a difference between a subsequent measurement and a prior measurement, of a traveler who was traveling in a vehicle, is indicative of an aftereffect on the traveler as a result of traveling in the vehicle.

Optionally, the measurements of affective response are taken utilizing sensors coupled to the travelers, and each measurement of affective response includes at least one of the following: a value representing a physiological signal of the traveler and a value representing a behavioral cue of the traveler.

Optionally, a profile of the certain first traveler indicates that the first traveler is a male aged 20-40 years old who weighs 200-300 lbs, and the profile of the certain second traveler indicates that the certain second traveler is a woman aged 50-70 years old who weighs 100-170 lbs, and the difference between the first and second comfort scores is above 10%.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

Optionally, a profile of a traveler includes information that describes one or more of the following: an indication of the preferred seating location of the traveler in the vehicle, an indication of the traveler's sensitivity to the sun, an indication of the traveler's sensitivity to noise, attitude toward vehicle manufacturers, a demographic characteristic of the traveler, a genetic characteristic of the traveler, a static attribute describing the body of the traveler, and a medical condition of the traveler.

Optionally, each measurement of a traveler is based on values acquired by the sensor during at least three different non-overlapping periods while the traveler travels in the vehicle that is of the certain type.

Optionally, the traveler travels in the vehicle that is of the certain type during more than 30 minutes, and each measurement of the traveler is based on values acquired by the sensor during at least five different non-overlapping periods that are spread over the more than 30 minutes.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to rank certain types of clothing items based on aftereffects determined from measurements of affective response of users, includes:

a memory storing computer executable modules; and a processor configured to execute the computer executable modules; the computer executable modules including:

a collection module configured to receive measurements of affective response of users to wearing clothing items of certain types; wherein the measurements include, for each certain type of clothing item from among the certain types of clothing items, prior and subsequent measurements of at least five users who were wearing the certain type of clothing item; and wherein a prior measurement of a user is taken before the user removes the certain type of clothing item, and a subsequent measurement of the user is taken at least one minute after the user removed the certain type of clothing item; and an aftereffect ranking module configured to rank the certain types of clothing items based on the measurements, such that, for at least first and second types of clothing items from among the certain types of clothing items, the aftereffect resulting from wearing the first type of clothing item is greater than the aftereffect resulting from wearing the second type of clothing item, and the first type of clothing item is ranked above the second type of clothing item; and wherein a difference between a subsequent measurement and a prior measurement, of a user who was wearing a clothing item, is indicative of an aftereffect on the user as a result of wearing the clothing item.

Optionally, the measurements of affective response are taken utilizing sensors coupled to the users, and each measurement of affective response includes at least one of the following: a value representing a physiological signal of the user and a value representing a behavioral cue of the user.

Optionally, a profile of the certain first user indicates that the first user is a woman aged 20-30 years old who weighs who weighs 130-160 lbs, and the profile of the certain second user indicates that the certain second user is a woman aged 50-60 years old who weighs 100-130 lbs, and the difference between the first and second comfort scores is above 10%.

Optionally, clothing items are categorized into types based on one or more of the following classifications: outerwear, underwear, tops, skirts, dresses, jackets, pants, shorts, coats, lingerie, shoes, and wearable accessories.

Optionally, clothing items are categorized into types based on one or more of the following classifications: cost of the clothing item, identity of the manufacturer of the clothing item, classification based on a brand associated with the clothing item, and model of the clothing item.

Optionally, a profile of a user includes information that describes one or more of the following properties of the user: skin tone, weight, height, sensitivity to certain fabrics, preferences regarding use of animal byproducts, attitude toward brands, a demographic characteristic of the user, a genetic characteristic of the user, a static attribute describing the body of the user, and a medical condition of the user.

Optionally, each measurement of a user is based on values acquired by the sensor during at least three different non-overlapping periods while the user wears the clothing item that is of the certain type.

Optionally, the user wears the clothing item that is of the certain type during more than 3 hours, and each measurement of the user is based on values acquired by the sensor during at least five different non-overlapping periods that are spread over the more than 3 hours.

Optionally, the first comfort score is computed based on at least one measurement that is not utilized for computing the second comfort score.

Optionally, a measurement utilized to compute both the first and second comfort scores has a first weight when utilized to compute the first comfort score and the measurement has a second weight, different from the first weight, when utilized to compute the second comfort score.

In one embodiment, a system configured to rank certain types of electronic devices based on aftereffects determined from measurements of affective response of users, includes:
a memory storing computer executable modules; and
a processor configured to execute the computer executable modules; the computer executable modules including:
a collection module configured to receive measurements of affective response of users to interacting with electronic devices of certain types; wherein the measurements include, for each certain type of electronic device from among the certain types of electronic device, prior and subsequent measurements of at least five users who were interacting with the certain type of electronic device; and wherein a prior measurement of a user is taken while the user interacts with the certain type of electronic device, and a subsequent measurement of the user is taken at least one minute after the user completed the interaction with the certain type of electronic device; and
an aftereffect ranking module configured to rank the certain types of electronic devices based on the measurements, such that, for at least first and second types of electronic devices from among the certain types of electronic devices, the aftereffect resulting from interacting with the first type of electronic device is greater than the aftereffect resulting from interacting with the second type of electronic device, and the first type of electronic device is ranked above the second type of electronic device; and wherein a difference between a subsequent measurement and a prior measurement, of a user who was interacting with an electronic device, is indicative of an aftereffect on the user as a result of interacting with the electronic device.

Optionally, the measurements of affective response are taken utilizing sensors coupled to the users, and each measurement of affective response includes at least one of the following: a value representing a physiological signal of the user and a value representing a behavioral cue of the user.

Optionally, a profile of the certain first user indicates that the first user is a woman aged 30-50 years old who works at a low firm, and the profile of the certain second user indicates that the certain second user is a boy aged 10-15 years old, and the difference between the first and second comfort scores is above 10%.

Optionally, electronic device are categorized into types based on one or more of the following classifications: functionality of the electronic device, physical properties of the electronic device, power of the electronic device, durability of the electronic device, and mean time to failure (MTTF) of the electronic device.

Optionally, electronic device are categorized into types based on one or more of the following classifications: cost of the electronic device, identity of the manufacturer of the electronic device, classification based on a brand associated with the electronic device, and the model of the electronic device.

Optionally, a profile of a user includes information that describes one or more of the following properties of the user: attitude toward brands, a demographic characteristic of the user, a genetic characteristic of the user, a static attribute describing the body of the user, and a medical condition of the user.

Optionally, the first satisfaction score is computed based on at least one measurement that is not utilized for computing the second satisfaction score.

Optionally, a measurement utilized to compute both the first and second satisfaction scores has a first weight when utilized to compute the first satisfaction score and the measurement has a second weight, different from the first weight, when utilized to compute the second satisfaction score.

In one embodiment, a system configured to rank certain types of food items based on aftereffects determined from measurements of affective response of users, includes:
a memory storing computer executable modules; and
a processor configured to execute the computer executable modules; the computer executable modules including:
a collection module configured to receive measurements of affective response of users to consuming food items of certain types; wherein the measurements include, for each certain type of food item from among the certain types of food items, prior and subsequent measurements of at least five users who consumed the certain type of food item; and wherein a prior measurement of a user is taken while the user consumes the certain food item, and a subsequent measurement of the user is taken at least one minute after the user finished consuming the certain type of food item; and an aftereffect ranking module configured to rank the certain types of food items based on the measurements, such that, for at least first and second types of food items from among the certain types of food items, the aftereffect resulting from consuming the first type of food item is greater than the aftereffect resulting from consuming with the second type of food item, and the first type of food item is ranked above the second type of food item; and wherein a difference between a subsequent measurement and a prior measurement, of a user who consumed a food item, is indicative of an aftereffect on the user as a result of consuming the food item.

Optionally, the measurements of affective response are taken utilizing sensors coupled to the users, and each measurement of affective response includes at least one of the following: a value representing a physiological signal of the user and a value representing a behavioral cue of the user.

Optionally, consuming a certain type of food item involves at least one of eating the certain type of food item and drinking the certain type of food item.

Optionally, the collection module is further configured to receive additional measurements of affective response of the at least ten users; wherein each additional measurement of a user is taken with the sensor, at most four hour after the user finished consuming the certain type of food; and the scoring module is further configured to compute the food preference score for the certain user also based on the additional measurements.

Optionally, each measurement of a user is based on values acquired by the sensor during at least three different non-overlapping periods while the user consumes the certain type of food.

Optionally, the user consumes the certain type of food during more than five minutes, and each measurement of a user is based on values acquired by the sensor during at least five different non-overlapping periods that are spread over the more than five minutes.

Optionally, the food is categorized into types based on one or more of the following classifications or combinations thereof: (i) comfort food, fast food, junk food, natural food, organic food, slow food, and whole food, (ii) fruits, grains, vegetables, and protein, (iii) plant or animal source, (iv) extent to which the food is genetically modified, (v) way of preparing the food, (vi) identities of the food manufacturers, (vii) brands associated with the food, (viii) food price, (ix) existence of food substances related to food allergy, and (x) diet related properties of the food.

Optionally, a profile of a user includes information that describes one or more of the following properties of the user: sensitivity to certain food substances, known food allergies, preferences regarding use of animal source food, attitude toward brands, a demographic characteristic of the user, a genetic characteristic of the user, a static attribute describing the body of the user, a medical condition of the user, and attitude toward certain types of food.

Optionally, the first food preference score is computed based on at least one measurement that is not utilized for computing the second food preference score.

Optionally, a measurement utilized to compute both the first and second food preference scores has a first weight when utilized to compute the first food preference score and the measurement has a second weight, different from the first weight, when utilized to compute the second food preference score.

In one embodiment, a system configured to rank certain restaurants based on aftereffects determined from measurements of affective response of diners, includes:

a memory storing computer executable modules; and a processor configured to execute the computer executable modules; the computer executable modules including:

a collection module configured to receive measurements of affective response of diners to dining at certain restaurants; wherein the measurements include, for each certain restaurant among the certain restaurants, prior and subsequent measurements of at least five diners who dined at the certain restaurant; and wherein a prior measurement of a diner is taken while the diner dines at the certain restaurant, and a subsequent measurement of the diner is taken at least one minute after the diner leaves the certain restaurant; and an aftereffect ranking module configured to rank the certain restaurants based on the measurements, such that, for at least first and second restaurants from among the certain restaurants, the aftereffect resulting from dining at the first restaurant is greater than the aftereffect resulting from dining at the second restaurant, and the first restaurant is ranked above the second restaurant; and wherein a difference between a subsequent measurement and a prior measurement, of a diner who dined at a restaurant, is indicative of an aftereffect on the user as a result of dining at the restaurant.

Optionally, the measurements of affective response are taken utilizing sensors coupled to the diners, and each measurement of affective response includes at least one of the following: a value representing a physiological signal of the diner and a value representing a behavioral cue of the diner.

Optionally, the measurements of affective response of the at least ten users are taken when the at least ten users eat the same type of dish at the restaurant.

Optionally, the collection module is further configured to receive additional measurements of affective response of the at least ten users; wherein each additional measurement of a user is taken with the sensor, at most four hour after the user finished dining at the restaurant; and the scoring module is further configured to compute the restaurant score for the certain user also based on the additional measurements.

Optionally, each measurement of a user is based on values acquired by the sensor during at least three different non-overlapping periods while the user dines at the restaurant.

Optionally, the user dines at the restaurant during more than 30 minutes, and each measurement of a user is based on values acquired by the sensor during at least five different non-overlapping periods that are spread over the more than 30 minutes.

Optionally, a profile of a user includes information that describes one or more of the following properties of the user: sensitivity to certain food substances, known food allergies, preferences regarding use of animal source food, preferred seating location at the restaurant, an indication of the user's sensitivity to environmental noise, attitude toward brands, a demographic characteristic of the user, a genetic characteristic of the user, a static attribute describing the body of the user, a medical condition of the user, and attitude toward certain types of food.

Optionally, the first restaurant score is computed based on at least one measurement that is not utilized for computing the second restaurant score.

Optionally, a measurement utilized to compute both the first and second restaurant scores has a first weight when utilized to compute the first restaurant score and the measurement has a second weight, different from the first weight, when utilized to compute the second restaurant score.

In one embodiment, a system configured to compute a comfort score for a certain type of clothing item based on measurements of affective response of users who removed clothing items that are of the certain type, includes:

a memory storing computer executable modules; and a processor configured to execute the computer executable modules; the computer executable modules including:

a collection module configured to receive prior and subsequent measurements of affective response of at least ten users who removed clothing items that are of the certain type; wherein each measurement of a user is taken with a sensor coupled to the user; and wherein a prior measurement of a user is taken before the user removes the clothing item, and a subsequent measurement of the user is taken during at least one of the following periods: while the user removes the clothing item, and at most three minutes after the user removed the clothing item; and a scoring module configured to compute the comfort score based on difference between the subsequent and prior measurements.

Optionally, the clothing items are bras, and the type of the bra is set according to one or more of the following bra classifications: bra size, cup size, bra style, cost of the bra, identity of the manufacturer of the bra, classification based on a brand associated with the bra, and model of the bra.

Optionally, the clothing items are shoes, and the type of the shoe is set according to one or more of the following shoe classifications: shoes size, shoes width, shoes style, toe style, heel style, cost of the shoes, identity of the manufacturer of the shoes, classification based on a brand associated with the shoes, and model of the shoes.

Optionally, the higher the magnitude of the difference between a subsequent measurement of a user and a prior measurement of the user, the more uncomfortable wearing the clothing item was for the user.

Optionally, each prior measurement is taken less than two minutes before the user starts removing the clothing item.

Optionally, more than 25% of the comfort score is attributed to the difference between the subsequent and prior measurements.

Optionally, the at least ten users remove the same model of the clothing item.

Optionally, the at least ten users remove the same model and size of the clothing item.

The system further includes a recommender module configured to recommend, based on the comfort score, the clothing item to a user in a manner that belongs to a set including first and second manners; wherein when recommending the clothing item in the first manner, the recommender module provides a stronger recommendation for the clothing item, compared to a recommendation for the clothing item that the recommender module provides when recommending in the second manner; wherein the recommender module is further configured to: recommend the clothing item in the first manner when the comfort score for the clothing item reaches a predetermined threshold, and to recommend the clothing item in the second manner when the comfort score does not reach the predetermined threshold.

Optionally, the recommender module is further configured to recommend the clothing item via a display of a user interface; and wherein recommending in the first manner includes one or more of the following: (i) utilizing a larger icon to represent the clothing item on a display of the user interface, compared to the size of the icon utilized to represent the clothing item on the display when recommending in the second manner; (ii) presenting images representing the clothing item for a longer duration on the display, compared to the duration during which images representing the clothing item are presented when recommending in the second manner; (iii) utilizing a certain visual effect when presenting the clothing item on the display, which is not utilized when presenting the clothing item on the display when recommending the clothing item in the second manner; and (iv) presenting certain information related to the clothing item on the display, which is not presented when recommending the clothing item in the second manner.

Optionally, the recommender module is further configured to recommend the clothing item to a user by sending the user a notification about the clothing item; and wherein recommending in the first manner includes one or more of the following: (i) sending the notification to a user about the clothing item at a higher frequency than the frequency the notification about the clothing item is sent to the user when recommending the clothing item in the second manner; (ii) sending the notification to a larger number of users compared to the number of users the notification is sent to when recommending the clothing item in the second manner; and (iii) on average, sending the notification about the clothing item sooner than it is sent when recommending the clothing item in the second manner.

Optionally, the at least ten users consist a number of users that falls into one of the following ranges: 10-24, 25-99, 100-999, 1000-9999, 10000-99999, 100000-1000000, and more than one million.

In one embodiment, a system configured to compute a comfort score for a certain type of clothing item based on measurements of affective response of users who put on clothing items that are of the certain type, includes:

a memory storing computer executable modules; and a processor configured to execute the computer executable modules; the computer executable modules including:

a collection module configured to receive prior and subsequent measurements of affective response of at least ten users who put on the same type of clothing item; wherein each measurement of a user is taken with a sensor coupled to the user; and wherein a prior measurement of a user is taken before the user puts on the clothing item, and a subsequent measurement of the user is taken during at least one of the following periods: while the user puts on the clothing item, and at most three minutes after the user put on the clothing item; and a scoring module configured to compute the comfort score based on difference between the subsequent and prior measurements.

Optionally, the higher the magnitude of the difference between a subsequent measurement of a user and a prior measurement of the user, the more uncomfortable the clothing item is for the user.

Optionally, each prior measurement is taken less than two minutes before the user starts putting on the clothing item.

Optionally, more than 25% of the comfort score is attributed to the difference between the subsequent and prior measurements.

Optionally, the clothing items are bras, and the type of the bra is set according to one or more of the following bra classifications: bra size, cup size, bra style, cost of the bra, identity of the manufacturer of the bra, classification based on a brand associated with the bra, and model of the bra.

Optionally, the clothing items are shoes, and the type of the shoe is set according to one or more of the following shoe classifications: shoes size, shoes width, shoes style, toe style, heel style, cost of the shoes, identity of the manufacturer of the shoes, classification based on a brand associated with the shoes, and model of the shoes.

Optionally, the at least ten users put on the same model of the clothing item.

Optionally, the at least ten users put on the same model and size of the clothing item.

The system further includes a recommender module configured to recommend, based on the comfort score, the clothing item to a user in a manner that belongs to a set including first and second manners; wherein when recommending the clothing item in the first manner, the recommender module provides a stronger recommendation for the clothing item, compared to a recommendation for the clothing item that the recommender module provides when recommending in the second manner; wherein the recommender module is further configured to: recommend the clothing item in the first manner when the comfort score for the clothing item reaches a predetermined threshold, and to recommend the clothing item in the second manner when the comfort score does not reach the predetermined threshold.

Optionally, the recommender module is further configured to recommend the clothing item via a display of a user interface; and wherein recommending in the first manner includes one or more of the following: (i) utilizing a larger icon to represent the clothing item on a display of the user interface, compared to the size of the icon utilized to represent the clothing item on the display when recommending in the second manner; (ii) presenting images representing the clothing item for a longer duration on the display, compared to the duration during which images representing the clothing item are presented when recommending in the second manner; (iii) utilizing a certain visual effect when presenting the clothing item on the display, which is not utilized when presenting the clothing item on the display when recommending the clothing item in the second manner; and (iv) presenting certain information related to the clothing item on the display, which is not presented when recommending the clothing item in the second manner.

Optionally, the recommender module is further configured to recommend the clothing item to a user by sending the user a notification about the clothing item; and wherein recommending in the first manner includes one or more of the following: (i) sending the notification to a user about the clothing item at a higher frequency than the frequency the notification about the clothing item is sent to the user when recommending the clothing item in the second manner; (ii) sending the notification to a larger number of users compared to the number of users the notification is sent to when recommending the clothing item in the second manner; and (iii) on average, sending the notification about the clothing item sooner than it is sent when recommending the clothing item in the second manner.

Optionally, the at least ten users consist a number of users that falls into one of the following ranges: 10-24, 25-99, 100-999, 1000-9999, 10000-99999, 100000-1000000, and more than one million.

Different 3D experiences, presented on the same HMD hardware, have different qualities. Some 3D experiences (such as movies, games, virtual worlds, educational content, social interactions) are more comfortable to watch and/or less strenuous than others are. One way to compute a comfort score for watching a 3D experience presented on an HMD is to measure the affective response of the user around the time the user finishes watching the 3D content and removes the HMD.

In one embodiment, a system configured to compute a comfort score for watching a three-dimensional (3D) content presented on a head mounted display (HMD), based on measurements of affective response of users who removed the HMD of the face, includes:

a memory storing computer executable modules; and a processor configured to execute the computer executable modules; the computer executable modules including:

a collection module configured to receive prior and subsequent measurements of affective response of at least ten users who removed the same type of HMD after watching the 3D content for at least 5 minute; wherein each measurement of a user is taken with a sensor coupled to the user; and wherein a prior measurement of a user is taken while the user watches the 3D content, and a subsequent measurement of the user is taken during at least one of the following periods: while the user removes the HMD, and at most three minutes after the user removed the HMD; and a scoring module configured to compute the comfort score for watching the 3D content based on difference between the subsequent and prior measurements.

Optionally, the higher the magnitude of the difference between a subsequent measurement of a user and a prior measurement of the user, the more uncomfortable the watching of the 3D was for the user.

Optionally, the processor is further configured to utilize a measurements received from a sensor belonging to the HMD in order to identify the removing of the HMD of the face.

Examples of sensors useful to identify the removing of the HMD of the face include: a camera mounted on the HMD, an IMU of the HMD, and a pressure sensors imbedded in the HMD.

Optionally, each prior measurement is taken less than two minutes before the user starts removing the HMD.

Optionally, more than 25% of the comfort score is attributed to the difference between the subsequent and prior measurements.

Different vehicles provide different traveling experiences. Some traveling experiences are more comfortable for the traveler than others are. One way to compute a comfort score for traveling in a vehicle (whether as the driver or as the passenger) is to measure the affective response of the traveler around the time the traveler is getting out of the vehicle.

In one embodiment, a system configured to compute a comfort score for traveling in a vehicle of a certain type, based on measurements of affective response of travelers who got out of vehicles of the certain type, includes:

a memory storing computer executable modules; and a processor configured to execute the computer executable modules; the computer executable modules including:

a collection module configured to receive prior and subsequent measurements of affective response of at least ten travelers who got out of vehicles of the certain type after traveling in the vehicles for at least 5 minute; wherein each measurement of a traveler is taken with a sensor coupled to the traveler; and wherein a prior measurement of a traveler is taken while the traveler is traveling in the vehicle, and a subsequent measurement of the traveler is taken during at least one of the following periods: while the traveler gets out of the vehicle, and at most three minutes after the traveler got out of the vehicle; and a scoring module configured to compute the comfort score for traveling in the vehicle of the certain type based on difference between the subsequent and prior measurements.

Optionally, the higher the magnitude of the difference between a subsequent measurement of a traveler and a prior measurement of the traveler, the more uncomfortable the traveling in the vehicle was for the traveler.

Optionally, the processor is further configured to utilize a measurements received from a sensor belonging to the vehicle in order to identify when the traveler is getting out of the vehicle.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

In one embodiment, a system configured to compute comfort scores for certain types of clothing items based on aftereffects determined from measurements of affective response of users who removed clothing items that are of the certain types, includes:

a memory storing computer executable modules; and a processor configured to execute the computer executable modules; the computer executable modules including:

a collection module configured to receive measurements of affective response of users who removed clothing items that are of the certain types; wherein the measurements include, for each type of clothing item from among the certain types of clothing items, prior and subsequent measurements of at least five users who removed the same type of clothing item; wherein each measurement of a user is taken with a sensor coupled to the user; and wherein a prior measurement of a user is taken before the user removes the clothing item, and a subsequent measurement of the user is taken during at least one of the following periods: while the user removes the clothing item, and at most three minutes after the user removed the clothing item; and an aftereffect-based ranking module configured to rank the comfort scores for the certain types of clothing items based on the difference between the subsequent and prior measurements, such that, for at least first and second types of clothing items from among the certain types of clothing items, the aftereffect of the first type of clothing item is greater than the aftereffect of the second type of clothing item, and the first type of clothing item is ranked below the second type of clothing item.

Optionally, the clothing items are bras, and the type of the bra is set according to one or more of the following bra classifications: bra size, cup size, bra style, cost of the bra, identity of the manufacturer of the bra, classification based on a brand associated with the bra, and model of the bra.

Optionally, the clothing items are shoes, and the type of the shoe is set according to one or more of the following shoe classifications: shoes size, shoes width, shoes style, toe style, heel style, cost of the shoes, identity of the manufacturer of the shoes, classification based on a brand associated with the shoes, and model of the shoes.

Optionally, the greater the aftereffect of a clothing item, the more uncomfortable wearing the clothing item was for the user.

Optionally, each prior measurement is taken less than two minutes before the user starts removing the clothing item.

Optionally, more than 25% of the comfort score is attributed to the difference between the subsequent and prior measurements.

Optionally, the users remove the same model of the clothing item.

Optionally, the users remove the same model and size of the clothing item.

In one embodiment, a system configured to compute comfort scores for certain types of clothing items based on aftereffects determined from measurements of affective response of users who put on clothing items that are of the certain types, includes:

a memory storing computer executable modules; and a processor configured to execute the computer executable modules; the computer executable modules including:

a collection module configured to receive measurements of affective response of users who put on clothing items that are of the certain types; wherein the measurements include, for each type of clothing item from among the clothing items, prior and subsequent measurements of at least five users who put on the same type of clothing item; wherein each measurement of a user is taken with a sensor coupled to the user; and wherein a prior measurement of a user is taken before the user puts on the clothing item, and a subsequent measurement of the user is taken during at least one of the following periods: while the user puts on the clothing item, and at most three minutes after the user put on the clothing item; and an aftereffect-based ranking module configured to rank the comfort scores for the clothing items based on the difference between the subsequent and prior measurements, such that, for at least first and second types of clothing items from among the clothing items, the aftereffect of the first type of clothing item is greater than the aftereffect of the second type of clothing item, and the first type of clothing item is ranked differently than the second type of clothing item.

Optionally, the higher the magnitude of the difference between a subsequent measurement of a user and a prior measurement of the user, the more uncomfortable the clothing item is for the user.

Optionally, each prior measurement is taken less than two minutes before the user starts putting on the clothing item.

Optionally, more than 25% of the comfort score is attributed to the difference between the subsequent and prior measurements.

Optionally, the clothing items are bras, and the type of the bra is set according to one or more of the following bra classifications: bra size, cup size, bra style, cost of the bra, identity of the manufacturer of the bra, classification based on a brand associated with the bra, and model of the bra.

Optionally, the clothing items are shoes, and the type of the shoe is set according to one or more of the following shoe classifications: shoes size, shoes width, shoes style, toe style, heel style, cost of the shoes, identity of the manufacturer of the shoes, classification based on a brand associated with the shoes, and model of the shoes.

Optionally, the users put on the same model of the clothing item.

Optionally, the users put on the same model and size of the clothing item.

In one embodiment, a system configured to compute comfort scores for watching three-dimensional (3D) contents presented on a head mounted display (HMD) based on aftereffects determined from measurements of affective response of users who removed the HMD, includes:

a memory storing computer executable modules; and a processor configured to execute the computer executable modules; the computer executable modules including:

a collection module configured to receive measurements of affective response of users who removed the same type of HMD after watching the 3D contents for at least 5 minute; wherein the measurements include, for each type of 3D content from among the 3D contents, prior and subsequent measurements of at least five users who removed the same type of HMD after watching the 3D content for at least 5 minute; wherein each measurement of a user is taken with a sensor coupled to the user; and wherein a prior measurement of a user is taken while the user watches the 3D content, and a subsequent measurement of the user is taken during at least one of the following periods: while the user removes the HMD, and at most three minutes after the user removed the HMD; and an aftereffect-based ranking module configured to rank the comfort scores for watching the 3D contents based on the differences between the subsequent and prior measurements, such that, for at least first and second 3D contents from among the 3D contents, the aftereffect of the first 3D content is greater than the aftereffect of the second 3D content, and the first 3D content is ranked differently than the second 3D content.

Optionally, the higher the magnitude of the difference between a subsequent measurement of a user and a prior measurement of the user, the more uncomfortable the watching of the 3D was for the user.

Optionally, the first 3D content is ranked less user friendly than the second 3D content.

Optionally, the higher the magnitude of the difference between a subsequent measurement of a user and a prior measurement of the user, the greater the immersion into being physically present in a non-physical world as a result of watching the 3D content.

Optionally, the first 3D content is ranked more immersive than the second 3D content.

Optionally, the processor is further configured to utilize a measurements received from a sensor belonging to the HMD in order to identify the removing of the HMD of the face.

Optionally, each prior measurement is taken less than two minutes before the user starts removing the HMD.

Optionally, more than 25% of the comfort score is attributed to the difference between the subsequent and prior measurements.

In one embodiment, a system configured to compute comfort scores for traveling in vehicles of certain types based on aftereffects determined from measurements of affective response of travelers who got out of vehicles of the certain types, includes:

a memory storing computer executable modules; and a processor configured to execute the computer executable modules; the computer executable modules including:

a collection module configured to receive measurements of affective response of travelers who got out of the vehicles of the certain types; wherein the measurements include, for each type of vehicle from among the vehicles of the certain types, prior and subsequent measurements of at least five travelers who got out of the same type of vehicle; wherein each measurement of a traveler is taken with a sensor coupled to the traveler; and wherein a prior measurement of a traveler is taken before the traveler gets out of the vehicle, and a subsequent measurement of the traveler is taken during at least one of the following periods: while the traveler gets out of the vehicle, and at most three minutes after the traveler got out of the vehicle; and an aftereffect-based ranking module configured to rank the comfort scores for the vehicles of the certain types based on the difference between the subsequent and prior measurements, such that, for at least first and second types of vehicles from among the vehicles of the certain types, the aftereffect of the first type of vehicle item is greater than the aftereffect of the second type of vehicle, and the first type of vehicle is ranked below the second type of vehicle.

Optionally, the higher the magnitude of the difference between a subsequent measurement of a traveler and a prior measurement of the traveler, the more uncomfortable the traveling in the vehicle was for the traveler.

Optionally, the processor is further configured to utilize a measurements received from a sensor belonging to the vehicle in order to identify when the traveler is getting out of the vehicle.

Optionally, the vehicles are cars, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicles are car, and the type of the car is set according to one or more of the following car classifications: cost of the car, mean time between failures (MTBF) of the car, identity of the manufacturer of the car, classification based on a brand associated with the car, and the model of the car.

In one embodiment, a system configured to learn a relationship between a duration of wearing a clothing item that is of a certain type and an aftereffect of wearing the clothing item, includes:

a memory storing computer executable modules; and a processor configured to execute the computer executable modules; the computer executable modules including:

a collection module configured to receive prior and subsequent measurements of affective response of at least ten users who removed clothing items that are of the certain type; wherein each user wore the clothing item for a duration, a prior measurement of a user is taken before the user removed the clothing item, and a subsequent measurement of the user is taken at most three minutes after the user removed the clothing item; and a function learning module configured to utilize the prior and subsequent measurements to learn a function that describes, for different durations, values of expected affective responses corresponding to extents of aftereffects of wearing a clothing item that is of the certain type after wearing the clothing item for the different durations; wherein a difference between a subsequent measurement and a prior measurement of a user who worn the clothing item of the certain type is indicative of an aftereffect on the user of the clothing item of the certain type.

Optionally, the clothing items are bras, and the type of the bra is set according to one or more of the following bra classifications: bra size, cup size, bra style, cost of the bra, identity of the manufacturer of the bra, classification based on a brand associated with the bra, and model of the bra.

Optionally, the clothing items are shoes, and the type of the shoe is set according to one or more of the following shoe classifications: shoes size, shoes width, shoes style, toe style, heel style, cost of the shoes, identity of the manufacturer of the shoes, classification based on a brand associated with the shoes, and model of the shoes.

Optionally, the greater the aftereffect of a clothing item, the more uncomfortable wearing the clothing item was for the user.

Optionally, each prior measurement is taken less than two minutes before the user starts removing the clothing item.

Optionally, the at least ten users remove the same model of the clothing item.

Optionally, the at least ten users remove the same model and size of the clothing item.

In one embodiment, a system configured to learn a relationship between a duration of watching a three-dimensional (3D) content presented on a head mounted display (HMD) and an aftereffect of watching the 3D content, includes:

a memory storing computer executable modules; and a processor configured to execute the computer executable modules; the computer executable modules including:

a collection module configured to receive prior and subsequent measurements of affective response of at least ten users who removed the same type of HMD after watching the 3D content for at least 5 minute; wherein each user watched the 3D content for a duration, a prior measurement of a user is taken while the user watches the 3D content, and a subsequent measurement of the user is taken during at least one of the following periods: while the user removes the HMD, and at most three minutes after the user removed the HMD; and a function learning module configured to utilize the prior and subsequent measurements to learn a function that describes, for different durations, values of expected affective responses corresponding to extents of aftereffects of 3D content after watching the 3D content for the different durations; wherein a difference between a subsequent measurement and a prior measurement of a user who watched the 3D content is indicative of an aftereffect of watching the 3D content on the user.

Optionally, the higher the magnitude of the difference between a subsequent measurement of a user and a prior measurement of the user, the more uncomfortable the watching of the 3D was for the user.

Optionally, the first 3D content is ranked less user friendly than the second 3D content.

Optionally, the higher the magnitude of the difference between a subsequent measurement of a user and a prior measurement of the user, the greater the immersion into being physically present in a non-physical world as a result of watching the 3D content.

Optionally, the first 3D content is ranked more immersive than the second 3D content.

Optionally, the processor is further configured to utilize a measurements received from a sensor belonging to the HMD in order to identify the removing of the HMD of the face.

Optionally, each prior measurement is taken less than two minutes before the user starts removing the HMD.

In one embodiment, a system configured to learn a relationship between a duration of traveling in a vehicle of a certain type and an aftereffect of traveling in the vehicle of the certain type, includes:

a memory storing computer executable modules; and a processor configured to execute the computer executable modules; the computer executable modules including:

a collection module configured to receive prior and subsequent measurements of affective response of at least ten travelers who got out of the vehicles of the certain type; wherein each traveler traveled in the vehicle for a duration, a prior measurement of a traveler is taken while the traveler travels in the vehicle, and a subsequent measurement of the traveler is taken during at least one of the following periods: while the traveler gets out of the vehicle, and at most three minutes after the traveler got out of the vehicle; and a function learning module configured to utilize the prior and subsequent measurements to learn a function that describes, for different durations, values of expected affective responses corresponding to extents of aftereffects of the vehicle of the certain type after traveling in the vehicle for the different durations; wherein a difference between a subsequent measurement and a prior measurement of a traveler who traveled in the vehicle is indicative of an aftereffect of traveling in the vehicle of the certain type on the traveler.

Optionally, the higher the magnitude of the difference between a subsequent measurement of a traveler and a prior measurement of the traveler, the more uncomfortable the traveling in the vehicle was for the traveler.

Optionally, the processor is further configured to utilize a measurements received from a sensor belonging to the vehicle in order to identify when the traveler is getting out of the vehicle.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

In one embodiment, a system configured to learn a relationship between repetitions of wearing a clothing item that is of a certain type and affective response to the clothing item, includes:

a memory storing computer executable modules; and a processor configured to execute the computer executable modules; the computer executable modules including:

a collection module configured to receive prior and subsequent measurements of affective response of at least ten users who removed clothing items that are of the certain type; wherein each measurement of a user is taken with a sensor coupled to the user, and is associated with a value indicative of an extent to which the user had previously worn the clothing item of the certain type; and wherein a prior measurement of a user is taken before the user removes the clothing item, and a subsequent measurement of the user is taken during at least one of the following periods: while the user removes the clothing item, and at most three minutes after the user removed the clothing item; and a function learning module configured to learn a function based on the prior and subsequent measurements and their associated values; wherein the function describes, for different extents to which a user had worn the clothing item that is of the certain type, an expected affective response to wearing the clothing item again.

Optionally, the clothing items are bras, and the type of the bra is set according to one or more of the following bra classifications: bra size, cup size, bra style, cost of the bra, identity of the manufacturer of the bra, classification based on a brand associated with the bra, and model of the bra.

Optionally, the clothing items are shoes, and the type of the shoe is set according to one or more of the following shoe classifications: shoes size, shoes width, shoes style, toe style, heel style, cost of the shoes, identity of the manufacturer of the shoes, classification based on a brand associated with the shoes, and model of the shoes.

Optionally, the higher the magnitude of the difference between a subsequent measurement of a user and a prior measurement of the user, the more uncomfortable wearing the clothing item was for the user.

Optionally, each prior measurement is taken less than two minutes before the user starts removing the clothing item.

Optionally, more than 25% of the expected affective response to wearing the clothing item again is attributed to the difference between the subsequent and prior measurements.

Optionally, the at least ten users remove the same model of the clothing item.

Optionally, the at least ten users remove the same model and size of the clothing item.

Optionally, the function is indicative of values $v_1$ and $v_2$ of expected affective response corresponding to certain extents $e_1$ and $e_2$, respectively; wherein $v_1$ describes an expected affective response to wearing the clothing item again, after it had been worn to the certain extent $e_1$; and $v_2$ describes an expected affective response to wearing the clothing item again, after it had been worn to the certain extent $e_2$; and wherein $e_1 \neq e_2$ and $v_1 \neq v_2$.

Optionally, the function learning module includes a machine learning-based trainer that is configured to utilize the measurements to train a model for a predictor configured to predict a value of affective response of a user based on an input indicative of a certain extent to which a user had previously worn the clothing item; and wherein responsive to being provided inputs indicative of the certain extents $e_1$ and $e_2$, the predictor predicts the affective response values $v_1$ and $v_2$, respectively.

Optionally, the model is at least one of the following: a regression model, a model utilized by a neural network, a nearest neighbor model, a model for a support vector machine for regression, and a model utilized by a decision tree.

Optionally, the function learning module includes:
a binning module configured to assign measurements of affective response of users to a plurality of bins based on the values associated with the measurements; wherein each bin corresponds to a certain range of extents of previously wearing the clothing item; and
a scoring module configured to compute a plurality of scores corresponding to the plurality of bins; wherein a score corresponding to a bin is computed based on measurements of at least five users, from the at least ten users, for which the associated values fall within the range corresponding to the bin; and wherein $e_1$ falls within a range of extents corresponding to a first bin, $e_2$ falls within a range of extents corresponding to a second bin, which is different from the first bin, and the values $v_1$ and $v_2$ are the scores corresponding to the first and second bins, respectively.

Optionally, a value of an extent to which a user had worn the clothing item before is a value that is indicative of time that had elapsed since the user first worn the clothing item.

Optionally, a value of an extent to which a user had worn the clothing item before is a value that is indicative of a number of occasions the user had already worn the clothing item.

Optionally, a value of an extent to which a user had worn the clothing item before is a value that is indicative of a number of hours spent by the user while wearing the clothing item, since having it for the first time.

In one embodiment, a system configured to learn a relationship between repetitions of traveling in a vehicle of a certain type and affective response to traveling in the vehicle of the certain type, includes:
a memory storing computer executable modules; and
a processor configured to execute the computer executable modules; the computer executable modules including:
a collection module configured to receive prior and subsequent measurements of affective response of at least ten travelers who traveled in vehicles of the certain type; wherein each measurement of a traveler is taken with a sensor coupled to the traveler, and is associated with a value indicative of an extent to which the traveler had previously traveling in the vehicle of the certain type; and wherein a prior measurement of a traveler is taken while the traveler is traveling in the vehicle, and a subsequent measurement of the traveler is taken during at least one of the following periods: while the traveler gets out of the vehicle, and at most three minutes after the traveler got out of the vehicle; and
a function learning module configured to learn a function based on the prior and subsequent measurements and their associated values; wherein the function describes, for different extents to which a traveler had traveled in the vehicle of the certain type, an expected affective response to traveling in the vehicle of the certain type again.

Optionally, the higher the magnitude of the difference between a subsequent measurement of a traveler and a prior measurement of the traveler, the more uncomfortable the traveling in the vehicle was for the traveler.

Optionally, the processor is further configured to utilize a measurements received from a sensor belonging to the vehicle in order to identify when the traveler is getting out of the vehicle.

Optionally, the vehicle is a car, and the type of the car is set according to one or more of the following car classifications: Association of Car Rental Industry Systems Standards (ACRISS) car classification, the US Insurance Institute for Highway Safety (IIHS) car classification, the US National Highway Traffic Safety Administration (NHTSA) car classification, the US Environmental Protection Agency (US EPA) car classification, the Euro NCAP Structural Category.

Optionally, the vehicle is a car, and the type of the car is set according to one or more of the following car classifications: cost of the car, mean time between failures (MTBF) of the car, identity of the manufacturer of the car, classification based on a brand associated with the car, and the model of the car.

1—Sensors

As used herein, a sensor is a device that detects and/or responds to some type of input from the physical environment. Herein "physical environment" is a term that includes the human body and its surroundings.

In some embodiments, a sensor that is used to measure affective response of a user may include, without limitation, one or more of the following: a device that measures a physiological signal of the user, an image-capturing device (e.g., a visible light camera, a near infrared (NIR) camera, a thermal camera (useful for measuring wavelengths larger than 2500 nm), a microphone used to capture sound, a movement sensor, a pressure sensor, a magnetic sensor, an electro-optical sensor, and/or a biochemical sensor. When a sensor is used to measure the user, the input from the physical environment detected by the sensor typically originates and/or involves the user. For example, a measurement of affective response of a user taken with an image capturing device comprises an image of the user. In another example, a measurement of affective response of a user obtained with a movement sensor typically detects a movement of the user. In yet another example, a measurement of affective response of a user taken with biochemical sensor may measure concentration of chemicals in the user (e.g., nutrients in blood) and/or by-products of chemical processes in the body of the user (e.g., composition of the user's breath).

Sensors used in embodiments described herein may have different relationships to the body of a user. In one example, a sensor used to measure affective response of a user may include an element that is attached to the user's body (e.g., the sensor may be embedded in gadget in contact with the body and/or a gadget held by the user, the sensor may comprise an electrode in contact with the body, and/or the sensor may be embedded in a film or stamp that is adhesively attached to the body of the user). In another example, the sensor may embedded in, and/or attached to, an item worn by the user, such as a glove, a shirt, a shoe, a bracelet, a ring, a head-mounted display, and/or helmet or other form of headwear. In yet another example, the sensor may be implanted in the user's body, such a chip or other form of implant that measures concentration of certain chemicals and/or monitors various physiological processes in the body of the user. And in still another example, the sensor may be a device that is remote of the user's body (e.g., a camera or microphone).

As used herein, a "sensor" may refer to a whole structure housing a device used for detecting and/or responding to some type of input from the physical environment, or to one or more of the elements comprised in the whole structure. For example, when the sensor is a camera, the word sensor may refer to the entire structure of the camera, or just to its CMOS detector.

In some embodiments, a sensor may store data it collects and/processes (e.g., in electronic memory). Additionally or alternatively, the sensor may transmit data it collects and/or processes. Optionally, to transmit data, the sensor may use various forms of wired communication and/or wireless communication, such as Wi-Fi signals, Bluetooth, cellphone signals, and/or near-field communication (NFC) radio signals.

In some embodiments, a sensor may require a power supply for its operation. In one embodiment, the power supply may be an external power supply that provides power to the sensor via a direct connection involving conductive materials (e.g., metal wiring and/or connections using other conductive materials). In another embodiment, the power may be transmitted to the sensor wirelessly. Examples of wireless power transmissions that may be used in some embodiments include inductive coupling, resonant inductive coupling, capacitive coupling, and magnetodynamic coupling. In still another embodiment, a sensor may harvest power from the environment. For example, the sensor may use various forms of photoelectric receptors to convert electromagnetic waves (e.g., microwaves or light) to electric power. In another example, radio frequency (RF) energy may be picked up by a sensor's antenna and converted to electrical energy by means of an inductive coil. In yet another example, harvesting power from the environment may be done by utilizing chemicals in the environment. For example, an implanted (in vivo) sensor may utilize chemicals in the body of the user that store chemical energy such as ATP, sugars, and/or fats.

In some embodiments, a sensor may receive at least some of the energy required for its operation from a battery. Such a sensor may be referred to herein as being "battery-powered". Herein a battery refers to an object that can store energy and provide it in the form of electrical energy. In one example, a battery includes one or more electrochemical cells that convert stored chemical energy into electrical energy. In another example, a battery includes a capacitor that can store electrical energy. In one embodiment, the battery may be rechargeable; for example, the battery may be recharged by storing energy obtained using one or more of the methods mentioned above. Optionally, the battery may be replaceable. For example, a new battery may be provided to the sensor in cases where its battery is not rechargeable or does not recharge with desired efficiency.

In some embodiments, a measurement of affective response of a user comprises, and/or is based on, a physiological signal of the user, which reflects a physiological state of the user. Following are some non-limiting examples of physiological signals that may be measured. Some of the example below include types of techniques and/or sensors that may be used to measure the signals; those skilled in the art will be familiar with various sensors, devices, and/or methods that may be used to measure these signals:

a. Heart Rate (HR), Heart Rate Variability (HRV), and Blood-Volume Pulse (BVP), and/or other parameters relating to blood flow, which may be determined by various means such as electrocardiogram (ECG), photoplethysmogram (PPG), and/or impedance cardiography (ICG).

b. Skin conductance (SC), which may be measured via sensors for Galvanic Skin Response (GSR), which may also be referred to as Electrodermal Activity (EDA).

c. Skin Temperature (ST) may be measured, for example, with various types of thermometers.

d. Brain activity and/or brainwave patterns, which may be measured with electroencephalography (EEG). Additional discussion about EEG is provided below.

e. Brain activity determined based on functional magnetic resonance imaging (fMRI).

f. Brain activity based on Magnetoencephalography (MEG).

g. Muscle activity, which may be determined via electrical signals indicative of activity of muscles, e.g., measured with electromyography (EMG). In one example, surface electromyography (sEMG) may be used to measure muscle activity of *frontalis* and corrugator supercilii muscles, indicative of eyebrow movement, and from which an emotional state may be recognized.

h. Eye movement, e.g., measured with electrooculography (EOG).

i. Blood oxygen levels that may be measured using hemoencephalography (HEG).

j. $CO_2$ levels in the respiratory gases that may be measured using capnography.

k. Concentration of various volatile compounds emitted from the human body (referred to as the Volatome), which may be detected from analysis of exhaled respiratory gasses and/or secretions through the skin using various detection tools that utilize nanosensors.

l. Temperature of various regions of the body and/or face may be determined utilizing thermal Infra-Red (IR) cameras. For example, thermal measurements of the nose and/or it surrounding region may be utilized to estimate physiological signals such as respiratory rate and/or occurrence of allergic reactions.

In some embodiments, a measurement of affective response of a user comprises, and/or is based on, a behavioral cue of the user. A behavioral cue of the user is obtained by monitoring the user in order to detect things such as facial expressions of the user, gestures made by the user, tone of voice, and/or other movements of the user's body (e.g., fidgeting, twitching, or shaking). The behavioral cues may be measured utilizing various types of sensors. Some non-limiting examples include an image capturing device (e.g., a camera), a movement sensor, a microphone, an accelerometer, a magnetic sensor, and/or a pressure sensor. In one example, a behavioral cue may involve prosodic features of a user's speech such as pitch, volume, tempo, tone, and/or stress (e.g., stressing of certain syllables), which may be indicative of the emotional state of the user. In another example, a behavioral cue may be the frequency of movement of a body (e.g., due to shifting and changing posture when sitting, laying down, or standing). In this example, a sensor embedded in a device such as accelerometers in a smartphone or smartwatch may be used to take the measurement of the behavioral cue.

In some embodiments, a measurement of affective response of a user may be obtained by capturing one or more images of the user with an image-capturing device, such as a camera. Optionally, the one or more images of the user are captured with an active image-capturing device that transmits electromagnetic radiation (such as radio waves, millimeter waves, or near visible waves) and receives reflections of the transmitted radiation from the user. Optionally, the one or more captured images are in two dimensions and/or three dimensions. Optionally, the one or more captured images comprise one or more of the following: a single image, a sequences of image, a video clip. In one example, images of a user captured by the image capturing device may be utilized to determine facial expression and/or posture of the user. In another example, images of a user captured by the image capturing device depict an eye of the user. Optionally, analysis of the images can reveal the direction of the gaze of the user and/or the size of the pupils. Such images may be used for eye tracking applications, such as identifying what the user is paying attention to, and/or for determining the user's emotions (e.g., what intentions the user likely has). Additionally, gaze patterns, which may involve information indicative of directions of a user's gaze, the time a user spends gazing at fixed points, and/or frequency at which the user changes points of interest, may provide information that may be utilized to determine the emotional response of the user.

In some embodiments, a measurement of affective response of a user may include a physiological signal derived from a biochemical measurement of the user. For example, the biochemical measurement may be indicative of the concentration of one or more chemicals in the body of the user (e.g., electrolytes, metabolites, steroids, hormones, neurotransmitters, and/or products of enzymatic activity). In one example, a measurement of affective response may describe the glucose level in the bloodstream of the user. In another example, a measurement of affective response may describe the concentration of stress-related hormones such as adrenaline and/or cortisol. In one embodiment, a sensor that provides a biochemical measurement may be an external sensor (e.g., a sensor that measures glucose from a blood sample extracted from the user). In another embodiment, a sensor that provides a biochemical measurement may be in physical contact with the user (e.g., contact lens in the eye of the user that measures glucose levels). In yet another embodiment, a sensor that provides a biochemical measurement may be sensor that is in the body of the user (an "in vivo" sensor). Optionally, the sensor may be implanted in the body (e.g., by a chirurgical procedure), injected into the bloodstream, and/or enter via the respiratory and/or digestive system. Some examples of types of in vivo sensors that may be used are given in Eckert et al. (2013), "Novel molecular and nanosensors for in vivo sensing", in *Theranostics*, 3.8:583.

Sensors used to take measurements of affective response may be considered, in some embodiments, to be part of a Body Area Network (BAN) also called a Body Sensor Networks (BSN). Such networks enable monitoring of user physiological signals, actions, health status, and/or motion patterns. Further discussion about BANs may be found in Chen et al. "Body area networks: A survey" in *Mobile networks and applications* 16.2 (2011): 171-193.

EEG is a common method for recording brain signals in humans because it is safe, affordable, and easy to use; it also has a high temporal resolution (of the order of milliseconds). EEG electrodes, placed on the scalp, can be either "passive" or "active". Passive electrodes, which are metallic, are connected to an amplifier, e.g., by a cable. Active electrodes may have an inbuilt preamplifier to make them less sensitive to environmental noise and cable movements. Some types of electrodes may need gel or saline liquid to operate, in order to reduce the skin-electrode contact impedance. While other types of EEG electrodes can operate without a gel or saline and are considered "dry electrodes". There are various brain activity patterns that may be measured by EEG. Some of the popular ones often used in affective computing include: Event Related Desynchronization/Synchronization, Event Related Potentials (e.g., P300 wave and error potentials), and Steady State Evoked Potentials. Measurements of EEG electrodes are typically subjected to various feature extraction techniques which aim to represent raw or preprocessed EEG signals by an ideally small number of relevant values, which describe the task-relevant information contained in the signals. For example, these features may be the power of the EEG over selected channels, and specific frequency bands. Various feature extraction techniques are discussed in more detail in Bashashati, et al., "A survey of signal processing algorithms in brain-computer interfaces based on electrical brain signals", in *Journal of Neural engineering*, 4(2):R32, 2007. Additional discussion about the using EEG in affective computing and brain computer interfaces (BCI) can be found in Lotte, et al., "Electroencephalography (EEG)-based Brain Computer Interfaces", in Wiley Encyclopedia of Electrical and Electronics Engineering, pp. 44, 2015, and the references cited therein.

The aforementioned examples involving sensors and/or measurements of affective response represent an exemplary sample of possible physiological signals and/or behavioral cues that may be measured. Embodiments described in this disclosure may utilize measurements of additional types of physiological signals and/or behavioral cues, and/or types of measurements taken by sensors, which are not explicitly listed above. Additionally, in some examples given above some of the sensors and/or techniques may be presented in association with certain types of values that may be obtained utilizing those sensors and/or techniques. This is not intended to be limiting description of what those sensors and/or techniques may be used for. In particular, a sensor and/or technique listed above, which is associated in the examples above with a certain type of value (e.g., a certain type of physiological signal and/or behavioral cue) may be used, in some embodiments, in order to obtain another type of value, not explicitly associated with the sensor and/or technique in the examples given above.

2—Measurements of Affective Response

In various embodiments, a measurement of affective response of a user comprises, and/or is based on, one or more values acquired with a sensor that measures a physiological signal and/or a behavioral cue of the user.

In some embodiments, an affective response of a user to an event is expressed as absolute values, such as a value of a measurement of an affective response (e.g., a heart rate level, or GSR value), and/or emotional state determined from the measurement (e.g., the value of the emotional state may be indicative of a level of happiness, excitement, and/or contentedness). Alternatively, the affective response of the user may be expressed as relative values, such as a difference between a measurement of an affective response (e.g., a heart rate level, or GSR value) and a baseline value, and/or a change to emotional state (e.g., a change to the level of happiness). Depending on the context, one may understand whether the affective response referred to is an absolute value (e.g., heart rate and/or level of happiness), or a relative value (e.g., change to heart rate and/or change to level of happiness). For example, if the embodiment describes an additional value to which the measurement may be compared (e.g., a baseline value), then the affective response may be interpreted as a relative value. In another example, if an embodiment does not describe an additional value to which the measurement may be compared, then the affective response may be interpreted as an absolute value. Unless stated otherwise, embodiments described herein that involve measurements of affective response may involve values that are either absolute and/or relative.

As used herein, a "measurement of affective response" is not limited to representing a single value (e.g., scalar); a measurement may comprise multiple values. In one example, a measurement may be vector of co-ordinates, such as a representation of an emotional state as a point on multidimensional plane. In another example, a measurement may comprise values of multiple signals taken at a certain time (e.g., heart rate, temperature, and a respiration rate at a certain time). In yet another example, a measurement may include multiple values representing signal levels at different times. Thus, a measurement of affective response may be a time-series, pattern, or a collection of wave functions, which may be used to describe a signal that changes over time, such as brainwaves measured at one or more frequency bands. Thus, a "measurement of affective response" may comprise multiple values, each of which may also be considered a measurement of affective response. Therefore, using the singular term "measurement" does not imply that there is a single value. For example, in some embodiments, a measurement may represent a set of measurements, such as multiple values of heart rate and GSR taken every few minutes during a duration of an hour.

In some embodiments, a "measurement of affective response" may be characterized as comprising values acquired with a certain sensor or a certain group of sensors sharing a certain characteristic. Additionally or alternatively, a measurement of affective response may be characterized as not comprising, and/or not being based, on values acquired by a certain type of sensor and/or a certain group of sensors sharing a certain characteristic. For example, in one embodiment, a measurement of affective response is based on one or more values that are physiological signals (e.g., values obtained using GSR and/or EEG), and is not based on values representing behavioral cues (e.g., values derived from images of facial expressions measured with a camera). While in another embodiment, a measurement of affective response is based on one or more values representing behavioral cues and is not based on values representing physiological signals.

Following are additional examples for embodiments in which a "measurement of affective response" may be based only on certain types of values, acquired using certain types of sensors (and not others). In one embodiment, a measurement of affective response does not comprise values acquired with sensors that are implanted in the body of the user. For example, the measurement may be based on values obtained by devices that are external to the body of the user and/or attached to it (e.g., certain GSR systems, certain EEG systems, and/or a camera). In another embodiment, a measurement of affective response does not comprise a value representing a concentration of chemicals in the body such as glucose, cortisol, adrenaline, etc., and/or does not comprise a value derive from a value representing the concentration. In still another embodiment, a measurement of affective response does not comprise values acquired by a sensor that is in contact with the body of the user. For example, the measurement may be based on values acquired with a camera and/or microphone. And in yet another embodiment, a measurement of affective response does not comprise values describing brainwave activity (e.g., values acquired by EEG).

A measurement of affective response may comprise raw values describing a physiological signal and/or behavioral cue of a user. For example, the raw values are the values provided by a sensor used to measure, possibly after minimal processing, as described below. Additionally or alternatively, a measurement of affective response may comprise a product of processing of the raw values. The processing of the one or more values may involve one or more of the following operations: normalization, filtering, feature extraction, image processing, compression, encryption, and/or any other techniques described further in the disclosure and/or that are known in the art and may be applied to measurement data.

In some embodiments, processing raw values, and/or processing minimally processed values, involves providing the raw values and/or products of the raw values to a module, function, and/or predictor, to produce a value that is referred to herein as an "affective value". As typically used herein, an affective value is a value that describes an extent and/or quality of an affective response. For example, an affective value may be a real value describing how good an affective response is (e.g., on a scale from 1 to 10) or whether a user is attracted to something or repelled by it (e.g., by having a positive value indicate attraction and a negative value indicate repulsion). In some embodiments, the use of the term "affective value" is intended to indicate that certain processing may have been applied to a measurement of affective response. Optionally, the processing is performed by a software agent. Optionally, the software agent has access to a model of the user that is utilized in order to compute the affective value from the measurement. In one example, an affective value may be a prediction of an Emotional State Estimator (ESE) and/or derived from the prediction of the ESE. In some embodiments, measurements of affective response may be represented by affective values.

It is to be noted that, though affective values are typically results of processing measurements, they may be represented by any type of value that a measurement of affective response may be represented by. Thus, an affective value may, in some embodiments, be a value of a heart rate, brainwave activity, skin conductance levels, etc.

In some embodiments, a measurement of affective response may involve a value representing an emotion (also referred to as an "emotional state" or "emotional response"). Emotions and/or emotional responses may be represented in various ways. In some examples, emotions or emotional responses may be predicted based on measurements of affective response, retrieved from a database, and/or annotated by a user (e.g., self-reporting by a user having the emotional response). In one example, self-reporting may involve analyzing communications of the user to determine the user's emotional response. In another example, self-reporting may involve the user entering values (e.g., via a GUI) that describes the emotional state of the user at a certain time and/or the emotional response of the user to a certain event. In the embodiments, there are several ways to represent emotions (which may be used to represent emotional states and emotional responses as well).

In one embodiment, emotions are represented using discrete categories. For example, the categories may include three emotional states: negatively excited, positively excited, and neutral. In another example, the categories may include emotions such as happiness, surprise, anger, fear, disgust, and sadness. In still another example, the emotions may be selected from the following set that includes basic emotions, including a range of positive and negative emotions such as Amusement, Contempt, Contentment, Embarrassment, Excitement, Guilt, Pride in achievement, Relief, Satisfaction, Sensory pleasure, and Shame, as described by Ekman P. (1999), "Basic Emotions", in Dalgleish and Power, *Handbook of Cognition and Emotion*, Chichester, UK: Wiley.

In another embodiment, emotions are represented using a multidimensional representation, which typically characterizes the emotion in terms of a small number of dimensions. In one example, emotional states are represented as points in a two dimensional space of Arousal and Valence. Arousal describes the physical activation and valence the pleasantness or hedonic value. Each detectable experienced emotion is assumed to fall in a specified region in that two-dimensional space. Other dimensions that are typically used to represent emotions include potency/control (refers to the individual's sense of power or control over the eliciting event), expectation (the degree of anticipating or being taken unaware), and intensity (how far a person is away from a state of pure, cool rationality). The various dimensions used to represent emotions are often correlated. For example, the values of arousal and valence are often correlated, with very few emotional displays being recorded with high arousal and neutral valence. In one example, emotions are represented as points on a circle in a two dimensional space pleasure and arousal, such as the circumplex of emotions. In another example, emotions may be represented as points in a two dimensional space whose axes correspond to positive affect (PA) and negative affect (NA), as described by Watson et al. (1988), "Development and validation of brief measures of positive and negative affect: the PANAS scales", *Journal of Personality and Social Psychology* 54.6: 1063.

In yet another embodiment, emotions are represented using a numerical value that represents the intensity of the emotional state with respect to a specific emotion. For example, a numerical value stating how much the user is enthusiastic, interested, and/or happy. Optionally, the numeric value for the emotional state may be derived from a multidimensional space representation of emotion; for instance, by projecting the multidimensional representation of emotion to the nearest point on a line in the multidimensional space.

In still another embodiment, emotional states are modeled using componential models that are based on the appraisal theory, as described by the OCC model of Ortony, et al. (1988), "The Cognitive Structure of Emotions", Cambridge University Press). According to this theory, a person's emotions are derived by appraising the current situation (including events, agents, and objects) with respect to the person goals and preferences.

A measurement of affective response may be referred to herein as being positive or negative. A positive measurement of affective response, as the term is typically used herein, reflects a positive emotion indicating one or more qualities such as desirability, happiness, content, and the like, on the part of the user of whom the measurement is taken. Similarly, a negative measurement of affective response, as typically used herein, reflects a negative emotion indicating one or more qualities such as repulsion, sadness, anger, and the like on the part of the user of whom the measurement is taken. Optionally, when a measurement is neither positive nor negative, it may be considered neutral.

In some embodiments, whether a measurement is to be considered positive or negative may be determined with reference to a baseline (e.g., a value determined based on previous measurements to a similar situation and/or experience the user may be having). Thus, if the measurement indicates a value that is above the baseline, e.g., happier than the baseline, it may be considered positive, and if lower it may be considered negative).

In some embodiments, when a measurement of affective response is relative, i.e., it represents a change in a level of a physiological signal and/or a behavioral cue of a user, then the direction of the change may be used to determine whether the measurement is positive or negative. Thus, a positive measurement of affective response may correspond to an increase in one or more qualities such as desirability, happiness, content, and the like, on the part of the user of whom the measurement is taken. Similarly, a negative measurement of affective response may correspond to an increase in one or more qualities such as repulsion, sadness, anger, and the like on the part of the user of whom the measurement is taken. Optionally, when a measurement neither changes in a positive direction nor in a negative direction, it may be considered neutral.

Some embodiments may involve a reference to the time at which a measurement of affective response of a user is taken. Depending on the embodiment, this time may have various interpretations. For example, in one embodiment, this time may refer to the time at which the one or more values describing a physiological signal and/or behavioral cue of the user were obtained utilizing one or more sensors. Optionally, the time may correspond to one or more periods during which the one or more sensors operated in order to obtain the one or more values describing the physiological signal and/or the behavioral cue of the user. For example, a measurement of affective response may be taken during a single point in time and/or refer to a single point in time (e.g., skin temperature corresponding to a certain time). In another example, a measurement of affective response may be taken during a contiguous stretch of time (e.g., brain activity measured using EEG over a period of one minute). In still another example, a measurement of affective response may be taken during multiple points and/or multiple contiguous stretches of time (e.g., brain activity measured every waking hour for a few minutes each time). Optionally, the time at which a measurement of affective response is taken may refer to the earliest point in time during which the one or more sensors operated in order to obtain the one or more values (i.e., the time the one or more sensors started taking the measurement of affective response). Alternatively, the time may refer to the latest point in time during which the one or more sensors operated in order to obtain the one or more values (i.e., the time the one or more sensors finished taking the measurement of affective response). Another possibility is for the time to refer to a point of time in between the earliest and latest points in time in which the one or more sensors were operating, such as the average of the two points in time.

Various embodiments described herein involve measurements of affective response of users to having experiences. In order to reflect the affective response of a user to having an experience, the measurement is typically taken in temporal proximity to when the user had the experience (so the affective response may be determined from the measurement). Herein, temporal proximity means nearness in time. Additionally, stating that a measurement of affective response of a user is taken in temporal proximity to when the user has an experience means that the measurement is taken while the user has the experience and/or shortly after the user finishes having the experience. Optionally, a measurement of affective response of a user taken in temporal proximity to having an experience may involve taking at least some of the measurement shortly before when the user started having the experience (e.g., for calibration and/or determining a baseline).

What window in time constitutes being "shortly before" and/or "shortly after" having an experience may vary in embodiments described herein, and may depend on various factors such as the length of the experience, the type of sensor used to acquire the measurement, and/or the type of physiological signal and/or behavioral cue being measured. In one example, with a short experience (e.g., and experience lasting 10 seconds), "shortly before" and/or "shortly after" may mean at most 10 seconds before and/or after the experience; though in some cases it may be longer (e.g., a minute or more). However, with a long experience (e.g., an experience lasting hours or days), "shortly before" and/or "shortly after" may correspond even to a period of up to a few hours before and/or after the experience (or more). In another example, when measuring a signal that is quick to change, such as brainwaves measured with EEG, "shortly before" and/or "shortly after" may correspond to a period of a few seconds or even up to a minute. However, with a signal that changes slower, such as heart rate or skin temperature, "shortly before" and/or "shortly after" may correspond to a longer period such as even up to ten minutes or more. In still another example, what constitutes "shortly after" an experience may depend on the nature of the experience and how long the affective response to it may last. For example, in one embodiment, measuring affective response to a short segment of content (e.g., viewing a short video clip) may comprise heart-rate measurements taken up to 30 seconds after the segment had been viewed. However, in another embodiment, measuring affective response to eating a meal may comprise measurements taken even possibly hours after the meal, to reflect effects digesting the meal had on the user's physiology.

The duration during which a sensor operates in order to measure an affective response of a user may differ depending on one or more of the following: (i) the type of event involving the user, (ii) the type of physiological and/or behavioral signal being measured, and (iii) the type of sensor utilized for the measurement. In some cases, the affective response may be measured by the sensor substantially continually throughout the period corresponding to the event (e.g., while the user interacts with a service provider). However, in other cases, the duration during which the affective response of the user is measured need not necessarily overlap, or be entirely contained in, a period corresponding to an event (e.g., an affective response to a meal may be measured hours after the meal).

With some physiological signals, there may be a delay between the time an event occurs and the time in which changes in the user's emotional state are reflected in measurements of affective response. For example, an affective response involving changes in skin temperature may take several seconds to be detected by a sensor. In some cases, the physiological signal might change quickly because of a stimulus, but returning to the pervious baseline value, e.g., a value corresponding to a time preceding the stimulus, may take much longer. For example, the heart rate of a person viewing a movie in which there is a startling event may increase dramatically within a second. However, it can take tens of seconds and even minutes for the person to calm down and for the heart rate to return to a baseline level. The lag in time it takes affective response to be manifested in certain physiological and/or behavioral signals can lead to it that the period in which the affective response is measured extends after an event to which the measurement refers. For example, measuring of affective response of a user to an interaction with a service provider may extend minutes, and even hours, beyond the time the interaction was completed. In some cases, manifestation of affective response to an event may last an extended period after the event. For example, at least some of the measurements of affective response of a user taken to determine how the user felt about a certain travel destination may be taken days, and even weeks, after the user leaves the travel destination.

In some embodiments, determining affective response of a user to an event may utilize measurement values corresponding to a fraction of the time corresponding to the event. The affective response of the user may be measured by obtaining values of a physiological signal of the user that in some cases may be slow to change, such as skin temperature, and/or slow to return to baseline values, such as heart rate. In such cases, measuring the affective response does not have to involve continually measuring the user throughout the duration of the event. Since such physiological signals are slow to change, reasonably accurate conclusions regarding the affective response of the user to an event may be reached from samples of intermittent measurements taken at certain periods during the event and/or after it. In one example, measuring the affective response of a user to a vacation destination may involve taking measurements during short intervals spaced throughout the user's stay at the destination, such as taking a GSR measurement lasting a few seconds, every few minutes or hours.

Additionally, a user having an experience has the experience over a certain period of time, it may be sufficient to sample values of physiological signals and/or behavioral cues during the certain period in order to obtain the value of a measurement of affective response. Optionally, the measurement of affective response is computed based on values acquired by a sensor during at least three different non-overlapping periods within the certain period, while the user had the experience (and/or shortly after it). In one example, the measurement if a function of the values acquired during the three non-overlapping periods, such as an average or weighted average of the values.

In some embodiments, determining an affective response of a user to an event may involve measuring a physiological and/or behavioral signal of the user before and/or after the event. Optionally, this is done in order to establish a baseline for the signal to which measurement values of the user taken during the exposure to the segment of content, and/or shortly after the exposure, can be compared. Optionally, such measurements may be considered baseline affective response values, and may refer to an affective response that a user typically has, according to which measurements of affective response may be compared. Additionally or alternatively, baseline affective response values may reflect a state of a user prior to the occurrence of an event (e.g., the state of the user prior to arriving at a location). Measurements of affective response of the user to the event may be compared to the baseline affective response values in order to determine the affective response of the user to the event, which are represented by the difference between the measurements and the baseline affective response values.

Measurements of affective response of users may be taken, in the embodiments, at different extents and/or frequency, depending on the characteristics of the embodiments.

In some embodiments, measurements of affective response of users are routinely taken; for example, measurements are taken according to a preset protocol set by the user, an operating system of a device of the user that controls a sensor, and/or a software agent operating on behalf of a user. Optionally, the protocol may determine a certain frequency at which different measurements are to be taken (e.g., to measure GSR every minute). Optionally, the protocol may dictate that certain measurements are to be taken continuously (e.g., heart rate may be monitored throughout the period the sensor that measures it is operational). Optionally, continuous and/or periodical measurements of affective response of a user are used in order to determine baseline affective response levels for the user.

In some embodiments, measurements may be taken in order to gauge affective response of users to certain events. Optionally, a protocol may dictate that measurements to certain experiences are to be taken automatically. For example, a protocol governing the operation of a sensor may dictate that every time a user exercises, certain measurements of physiological signals of the user are to be taken throughout the exercise (e.g., heart rate and respiratory rate), and possibly a short duration after it (e.g., during a recuperation period). Alternatively or additionally, measurements of affective response may be taken "on demand". For example, a software agent operating on behalf of a user may decide that measurements of the user should be taken in order to establish a baseline for future measurements. In another example, the software agent may determine that the user is having an experience for which the measurement of affective response may be useful (e.g., in order to learn a preference of the user and/or in order to contribute the measurement to the computation of an experience score). Optionally, an entity that is not a user or a software agent operating on behalf of the user may request that a measurement of the affective response of the user be taken to a certain experience (e.g., by defining a certain window in time during which the user should be measured). Optionally, the request that the user be measured is made to a software agent operating on behalf of the user.

When a measurement of affective response is taken to determine the response of a user to an experience, various aspects such as the type of experience and/or duration of the experience may influence which sensors are to be utilized to take the measurement. For example, a short event may be measured by a sensor that requires a lot of power to operate, while a long event may be measured by a sensor that takes less power to operate. The type of expected response to the experience measured may also be a factor in selecting which sensor to use. For example, in one embodiment, if the measurement is taken to determine an emotion (e.g., detecting whether the user is sad, depressed, apathetic, happy, or elated etc.), then a first sensor that may give a lot of information about the user is used (e.g., an EEG headset). However, if the measurement involves determining a level of exertion (e.g., how hard the user is exercising), then another sensor may be used (e.g., a heart rate monitor).

Various embodiments described herein utilize measurements of affective response of users to learn about the affective response of the users. In some embodiments, the measurements may be considered as being obtained via a process that is more akin to an observational study than to a controlled experiment. In a controlled experiment, a user may be told to do something (e.g., go to a location), in order for a measurement of the user to be obtained under a certain condition (e.g., obtain a measurement of the user at the location). In such a case, the experience the user has is often controlled (to limit and/or account for possible variability), and the user is often aware of participating in an experiment. Thus, both the experience and the response of the user may not be natural. In contrast, an observational study assumes a more passive role, in which the user is monitored and not actively guided. Thus, both the experience and response of the user may be more natural in this setting.

As used herein, a "baseline affective response value of a user" (or "baseline value of a user" when the context is clear) refers to a value that may represent a typically slowly changing affective response of the user, such as the mood of the user. Optionally, the baseline affective response value is expressed as a value of a physiological signal of the user and/or a behavioral cue of the user, which may be determined from a measurement taken with a sensor. Optionally, the baseline affective response value may represent an affective response of the user under typical conditions. For example, typical conditions may refer to times when the user is not influenced by a certain event that is being evaluated. In another example, baseline affective response values of the user are typically exhibited by the user at least 50% of the time during which affective response of the user may be measured. In still another example, a baseline affective response value of a user represents an average of affective response of the user, such as an average of measurements of affective response of the user taken during periods spread over hours, days, weeks, and possibly even years. Herein a module that computes a baseline value may be referred to herein as a "baseline value predictor".

In one embodiment, normalizing a measurement of affective response utilizing a baseline involves subtracting the value of the baseline from the measurement. Thus, after normalizing with respect to the baseline, the measurement becomes a relative value, reflecting a difference from the baseline. In one example, if the measurement includes a certain value, normalization with respect to a baseline may produce a value that is indicative of how much the certain value differs from the value of the baseline (e.g., how much is it above or below the baseline). In another example, if the measurement includes a sequence of values, normalization with respect to a baseline may produce a sequence indicative of a divergence between the measurement and a sequence of values representing the baseline.

In one embodiment, a baseline affective response value may be derived from one or more measurements of affective response taken before and/or after a certain event that may be evaluated to determine its influence on the user. For example, the event may involve visiting a location, and the baseline affective response value is based on a measurement taken before the user arrives at the location. In another example, the event may involve the user interacting with a service provider, and the baseline affective response value is based on a measurement of the affective response of the user taken before the interaction takes place. In yet another example, the event may involve consuming a substance, and a baseline affective response value is based on a measurement taken before consuming the substance.

In another embodiment, a baseline affective response value may correspond to a certain event, and represent an affective response the user corresponding to the event would typically have to the certain event. Optionally, the baseline affective response value is derived from one or more measurements of affective response of a user taken during previous instantiations of events that are similar to the certain event (e.g., involve the same experience and/or similar conditions of instantiation). For example, the event may involve visiting a location, and the baseline affective response value is based on measurements taken during previous visits to the location. In another example, the event may involve the user interacting with a service provider, and the baseline affective response value may be based on measurements of the affective response of the user taken while interacting with other service providers. In yet another example, the event may involve consuming a substance, and a baseline affective response value is based on measurements taken after previous consumptions of the substance. Optionally, a predictor may be used to compute a baseline affective response value corresponding to an event. For example, such a baseline may be computed utilizing an Emotional State Estimator (ESE), as described in further detail in Section 8—Predictors and Emotional State Estimators. Optionally, an approach that utilizes a database storing descriptions of events and corresponding values of measurements of affective response, such as approaches outlined in the patent publication U.S. Pat. No. 8,938,403 titled "Computing token-dependent affective response baseline levels utilizing a database storing affective responses", may also be utilized to compute a baseline corresponding to an event.

In yet another embodiment, a baseline affective response value may correspond to a certain period in a recurring unit of time. Optionally, the baseline affective response value is derived from measurements of affective response taken during the certain period during the recurring unit of time. For example, a baseline affective response value corresponding to mornings may be computed based on measurements of a user taken during the mornings. In this example, the baseline will include values of an affective response a user typically has during the mornings.

As used herein, a recurring unit of time, which is also referred to as a periodic unit of time, is a period of time that repeats itself. For example, an hour, a day, a week, a month, a year, two years, four years, or a decade. A recurring unit of time may correspond to the time between two occurrences of a recurring event, such as the time between two world cup tournaments. Optionally, a certain period during a recurring unit of time may correspond to a recurring event. For example, the recurring event may be the Cannes film festival, Labor Day weekend, or the NBA playoffs.

In still another embodiment, a baseline affective response value may correspond to a certain situation in which a user may be (in this case, the baseline may be referred to as being "situation-specific"). Optionally, the situation-specific baseline affective response value is derived from measurements of affective response of the user and/or of other users, taken while in the certain situation. For example, a baseline affective response value corresponding to being inebriated may be based on measurements of affective response of a user taken while the user is inebriated. In another example, a baseline affective response value corresponding to a situation of "being alone" may be based on measurements of a user taken while the user was alone in a room, while a baseline affective response value corresponding to a situation of "being with company" may be based on measurements of a user taken while the user was with other people in a room. In one embodiment, a situation-specific baseline for a user in a certain situation is computed using one or more of the various approaches described in patent publication U.S. Pat. No. 8,898,091 titled "Computing situation-dependent affective response baseline levels utilizing a database storing affective responses".

As used herein, a situation refers to a condition of a user that may change the affective response of the user. In one example, monitoring the user over a long period may reveal variations in the affective response that are situation-dependent, which may not be revealed when monitoring the user over a short period or in a narrow set of similar situations. Optionally, a situation may refer to a mindset of the user, such as knowledge of certain information, which changes the affective response of the user. For example, waiting for a child to come home late at night may be considered a different situation for a parent, than knowing the child is at home safe and sound. Other examples of different situations may involve factors such as: presence of other people in the vicinity of the user (e.g., being alone may be a different situation than being with company), the user's mood (e.g., the user being depressed may be considered a different situation than the user being elated), the type of activity the user is doing at the time (e.g., watching a movie, participating in a meeting, driving a car, may all be different situations). In some examples, different situations may be characterized by a user exhibiting a noticeably different affective response to certain stimuli. Additionally or alternatively, different situations may be characterized by the user having noticeably different baseline affective response values.

In embodiments described herein, a baseline affective response value may be derived from one or more measurements of affective response in various ways. Additionally, the baseline may be represented by different types of values. For example, the baseline may be the value of a single measurement, a result of a function of a single measurement, or a result of function of multiple measurements. In one example, a measurement of the heart-rate of a user taken before the user has an experience may be used as the baseline affective response value of the user. In another example, an emotional response predicted from an EEG measurement of the user may serve as a baseline affective response value. In yet another example, a baseline affective response value may be a function of multiple values, for example, it may be an average, mode, or median of multiple measurements of affective response.

In some embodiments, a baseline affective response value is a weighted average of a plurality of measurements of affective response. For example, a weighted average of measurements taken over a period of a year may give measurements that are more recent a higher weight than measurements that are older.

In some embodiments, measurements of affective response of a user are stored in a database. Optionally, the measurements correspond to certain periods in a recurring unit of time, and/or situations the user is in. Optionally, the stored measurements and/or values derived from at least some of the stored measurements may be retrieved from the database and utilized as baseline affective response values.

In some embodiments, a baseline affective response value may be derived from measurements of multiple users, and represent an average affective response of the multiple users. While in other embodiments, the baseline affective response value may be derived from measurements of a single user, and represent an affective response of the single user.

There are various ways, in different embodiments described herein, in which data comprising measurements of affective response, and/or data on which measurements of affective response are based, may be processed. The processing of the data may take place before, during, and/or after the data is acquired by a sensor (e.g., when the data is stored by the sensor and/or transmitted from it). Optionally, at least some of the processing of the data is performed by the sensor that measured it. Additionally or alternatively, at least some of the processing of the data is performed by a processor that receives the data in raw (unprocessed) form, or in a partially processed form. Following are examples of various ways in which data obtained from a sensor may be processed in some of the different embodiments described herein.

In some embodiments, at least some of the data may undergo signal processing, such as analog signal processing, and/or digital signal processing.

In some embodiments, at least some of the data may be scaled and/or normalized. For example, measured values may be scaled to be in the range [−1, +1]. In another example, some measured values are normalized to z-values, which bring the mean of the values to 0, with a variance of 1. In yet another example, statistics are extracted from some values, such as statistics of the minimum, maximum, and/or various moments of the distribution, such as the mean, variance, or skewness. Optionally, the statistics are computed for data that includes time-series data, utilizing fixed or sliding windows.

In some embodiments, at least some of the data may be subjected to feature extraction and/or reduction techniques. For example, data may undergo dimensionality-reducing transformations such as Fisher projections, Principal Component Analysis (PCA), and/or techniques for the selection of subsets of features like Sequential Forward Selection (SFS) or Sequential Backward Selection (SBS). Optionally, dimensions of multi-dimensional data points, such as measurements involving multiple sensors and/or statistics, may be evaluated in order to determine which dimensions are most relevant for identifying emotion. For example, Godin et al. (2015), "Selection of the Most Relevant Physiological Features for Classifying Emotion" in Emotion 40:20, describe various feature selection approaches that may be used to select relevant dimensionalities with multidimensional measurements of affective response.

In some embodiments, data that includes images and/or video may undergo processing that may be done in various ways. In one example, algorithms for identifying cues like movement, smiling, laughter, concentration, body posture, and/or gaze, are used in order to detect high-level image features. Additionally, the images and/or video clips may be analyzed using algorithms and/or filters for detecting and/or localizing facial features such as location of eyes, brows, and/or the shape of mouth. Additionally, the images and/or video clips may be analyzed using algorithms for detecting facial expressions and/or micro-expressions. In another example, images are processed with algorithms for detecting and/or describing local features such as Scale-Invariant Feature Transform (SIFT), Speeded Up Robust Features (SURF), scale-space representation, and/or other types of low-level image features.

In some embodiments, processing measurements of affective response involves compressing and/or encrypting portions of the data. This may be done for a variety of reasons, for instance, in order to reduce the volume of measurement data that needs to be transmitted. Another reason to use compression and/or encryption is that it helps protect the privacy of a measured user by making it difficult for unauthorized parties to examine the data. Additionally, the compressed data may be preprocessed prior to its compression.

In some embodiments, processing measurements of affective response of users involves removal of at least some of the personal information about the users from the measurements prior to measurements being transmitted (e.g., to a collection module) or prior to them be utilized by modules to generate crowd-based results. Herein personal information of a user may include information that teaches specific details about the user such as the identity of the user, activities the user engages in, and/or preferences, account information of the user, inclinations, and/or a worldview of the user.

The literature describes various algorithmic approaches that can be used for processing measurements of affective response. Some embodiments may utilize these known, and possibly other yet to be discovered, methods for processing measurements of affective response. Some examples include: (i) a variety of physiological measurements may be preprocessed according to the methods and references listed in van Broek, E. L., et al. (2009), "Prerequisites for Affective Signal Processing (ASP)", in *Proceedings of the International Joint Conference on Biomedical Engineering Systems and Technologies*", INSTICC Press; (ii) a variety of acoustic and physiological signals may be preprocessed and have features extracted from them according to the methods described in the references cited in Tables 2 and 4, Gunes, H., & Pantic, M. (2010), Automatic, Dimensional and Continuous Emotion Recognition, International Journal of Synthetic Emotions, 1 (1), 68-99; (iii) preprocessing of Audio and visual signals may be performed according to the methods described in the references cited in Tables 2-4 in Zeng, Z., et al. (2009), "A survey of affect recognition methods: audio, visual, and spontaneous expressions", *IEEE Transactions on Pattern Analysis and Machine Intelligence,* 31 (1), 39-58; and (iv) preprocessing and feature extraction of various data sources such as images, physiological measurements, voice recordings, and text based-features, may be performed according to the methods described in the references cited in Tables 1, 2, 3, 5 in Calvo, R. A., & D'Mello, S. (2010) "Affect Detection: An Interdisciplinary Review of Models, Methods, and Their Applications", *IEEE Transactions on affective computing* 1(1), 18-37.

As part of processing measurements of affective response, the measurements may be provided, in some embodiments, to various modules for making determinations according to values of the measurements. Optionally, the measurements are provided to one or more various functions that generate values based on the measurements. For example, the measurements may be provided to estimators of emotional states from measurement data (ESEs described below) in order to estimate an emotional state (e.g., level of happiness). The results obtained from the functions and/or predictors may also be considered measurements of affective response.

As discussed above, a value of a measurement of affective response corresponding to an event may be based on a plurality of values obtained by measuring the user with one or more sensors at different times during the event's instantiation period or shortly after it. Optionally, the measurement of affective response is a value that summarizes the plurality of values. It is to be noted that, in some embodiments, each value of the plurality of values may be considered a measurement of affective response on its own merits. However, in order to distinguish between a measurement of affective response and the values is based on, the latter are referred to in the discussion below as "a plurality of values" and the like. Optionally, when a measurement of affective response is a value that summarizes a plurality of values, it may, but not necessarily, be referred to in this disclosure as an "affective value".

In some embodiments, having a value that summarizes the plurality of values enables easier utilization of the plurality of values by various modules in embodiments described herein. For example, computing a score for a certain experience based on measurements of affective response corresponding to a set of events involving the certain experience may be easier if the measurement corresponding to each event in the set is a single value (e.g., a value between 0 and 10) or a small set of values (e.g., a representation of an emotional response in a multidimensional space). If on the other hand, each measurement of affective response is represented by a large set of values (e.g., measurements obtained with EEG, GSR, and heart rate taken over a period of a few hours), it might be more difficult to compute a score for the certain experience directly from such data.

There are various ways, in embodiments described herein, in which a plurality of values, obtained utilizing sensors that measure a user, can be used to produce the measurement of affective response corresponding to the event. It is to be noted that in some embodiments, the measurement of affective response simply comprises the plurality of values (e.g., the measurement may include the plurality of values in raw or minimally-processed form). However, in other embodiments, the measurement of affective response is a value that is a function of the plurality of values. There are various functions that may be used for this purpose. In one example, the function is an average of the plurality of values. In another example, the function may be a weighted average of the plurality of values, which may give different weights to values acquired at different times. In still another example, the function is implemented by a machine learning-based predictor.

In one embodiment, a measurement of affective response corresponding to an event is a value that is an average of a plurality of values obtained utilizing a sensor that measured the user corresponding to the event. Optionally, each of the plurality of values was acquired at a different time during the instantiation of the event (and/or shortly after it). In one example, the plurality of values include all the values measured by the sensor, and as such, the measurement of affective response is the average of all the values. In another example, the measurement of affective response corresponding to an event is an average of a plurality of values that were acquired at certain points of time, separated by approximately equal intervals, during the instantiation of the event (and/or shortly after it). For example, the plurality of values may have been taken every second, minute, hour, or day, during the instantiation. In yet another example, the measurement of affective response corresponding to an event is an average of a plurality of values that were acquired at random points of time during the instantiation of the event (and/or shortly after it). For example, the measurement of affective response may be an average of a predetermined number of values measured with the sensor. Optionally, the predetermined number is proportional to the duration of the instantiation. Optionally, the predetermined number is 2, 3, 5, 10, 25, 100, 1000, 10000, or more than 10000.

In another embodiment, a measurement of affective response corresponding to an event is a value that is a weighted average of a plurality of values obtained utilizing a sensor that measured the user corresponding to the event. Herein a weighted average of values may be any linear combination of the values. Optionally, each of the plurality of values was acquired at a different time during the instantiation of the event (and/or shortly after it) and may assigned a possible different weight for the computing of the weighted average.

In one example, the weights of values acquired in the middle or towards the end of the instantiation of the event may be given a higher weight than values acquired just the start of the instantiation of the event, since they might better reflect the affective response to the whole experience.

In another example, the weights assigned to values from among the plurality of values may depend on the magnitude of the values (e.g., the magnitude of their absolute value). In some embodiments, it may be the case that extreme emotional response is more memorable than less extreme emotional response (be it positive or negative). The extreme emotional response may be more memorable even if it lasts only a short while compared to the duration of an event to which a measurement of affective response corresponds. Thus, when choosing how to weight values from a plurality of values measured by one or more sensors at different times during the event's instantiation period or shortly after it, it may be beneficial to weight extreme values higher than non-extreme values. Optionally, the measurement of affective response corresponding to an event is based on the most extreme value (e.g., as determined based on its distance from a baseline) measured during the event's instantiation (or shortly after it).

In yet another example, an event to which a measurement of affective response corresponds may be comprised of multiple "mini-events" instantiated during its instantiation (the concept of mini-events is discussed in more detail in Section 4—Events). Optionally, each mini-event may have a corresponding measurement of affective response. Optionally, the measurement corresponding to each mini-event may be derived from one or more values measured with a sensor. Thus, combining the measurements corresponding to the mini-events into the measurement of affective response corresponding to the event may amount to weighting and combining the multiple values mentioned above into the measurement of affective response that corresponds to the event.

In some embodiments, an event $\tau$ may include, and/or be partitioned to, multiple "mini-events" $\tau_1, \tau_2, \ldots, \tau_k$ that are derived from the event $\tau$, such that the instantiation period of each $\tau_i$, $1 \le i \le k$, falls within the instantiation period of $\tau$. Furthermore, it may be assumed that each mini-event has an associated measurement of affective response $m_{\tau_i}$ such if $i \ne j$ it may be that $m_{\tau_i} \ne m_{\tau_j}$. In these embodiments, $m_\tau$, the measurement of affective response corresponding to the event $\tau$ is assumed to be a function of the measurements corresponding to the mini-events $m_{\tau_1}, m_{\tau_2}, \ldots, m_{\tau_k}$. It is to be noted that the measurements $m_{\tau_i}$ may in themselves each comprise multiple values and not necessarily consist of a single value. For example, a measurement $m_{\tau_i}$ may comprise brainwave activity measured with EEG over a period of minutes or hours.

In one example, $m_\tau$ may be a weighted average of the measurements corresponding to the mini-events, that is computed according to a function $$m_\tau = \frac{1}{\sum_{i=1}^{k} w_i} \cdot \sum_{i=1}^{k} w_i \cdot m_{\tau_i},$$

where the $w_i$ are weight corresponding to each mini-event $\tau_i$. In another example, combining measurements corresponding to mini-events may be done is some other way, e.g., to give more emphasis for measurements of events with a high weight, such as $$m_\tau = \frac{1}{\sum_{i=1}^{k} w_i^2} \cdot \sum_{i=1}^{k} (w_i^2 \cdot m_{\tau_i}).$$

in another example, the measurement $m_\tau$ may be selected as the measurement of the mini-event with the largest weight. In yet another example, the measurement $m_\tau$ may be computed as an average (or weighted average) of the $j \geq 2$ measurements having the largest weights.

The weights $w_i$, $1 \leq i \leq k$, corresponding to measurements of each mini-event may be computed in different ways, in different embodiments, and depend on various attributes. In one embodiment, a weight $w_i$, $1 \leq i \leq k$, corresponding to a measurement of mini-event $m_{\tau_i}$ may be proportional to the duration of the instantiation of the event $\tau_1$. Optionally, for most mini-events the weight $w_i$ increases with the duration of the instantiation of $\tau_i$. For example, the weight may be linear in the duration, or have some other form of function relationship with the duration, e.g., the weight may be proportional to a logarithm of the duration, the square root of the duration, etc. It is to be noted that one reason for considering setting weights based on the duration may be that in some cases, the longer people have a certain emotional response during an event, the more they tend to associate that emotional response with an event. In another embodiment, the weight of a mini-event based on an aspect of the type of experience the mini-event involves (e.g., indoors or outdoors, work vs. recreation, etc.) In yet another embodiment, mini-events may be weighted based on aspects such as the location the experience takes place, and/or the situation the user is in.

In other embodiments, the weight of a mini-event is based on its associated dominance factor. An event's dominance factor is indicative of the extent affective response expressed by the user corresponding to the event should be associated with the event. Additional details about dominance factors are given at least in Section 4—Events.

In some embodiments, weights of event or mini-events may be computed utilizing various functions that take into account multiple weighting techniques described in embodiments above. Thus, for example, in one embodiment, a weight $w_i$, $1 \leq i \leq k$, corresponding to a measurement of mini-event $m_{\tau_j}$ may be proportional both to certain attributes characterizing the experience (e.g., indicative of the type of experience), and to the duration of the mini-event, as described in the examples above. This can lead to cases where a first measurement $m_{\tau_1}$ corresponding to a first mini-event $\tau_1$ may have a weight $w_1$ that is greater than a weight $w_2$ given to a second measurement $m_{\tau_2}$ corresponding to a second mini-event $\tau_2$, despite the duration of the instantiation of $\tau_1$ being shorter than the duration of the instantiation of $\tau_2$.

Combining a plurality of values obtained utilizing a sensor that measured a user in order to a measurement of affective response corresponding to an event, as described in the examples above, may be performed, in some embodiments, by an affective value scorer. Herein an affective value scorer is a module that computes an affective value based on input comprising a measurement of affective response. Thus, the input to an affective value scorer may comprise a value obtained utilizing a sensor that measured a user and/or multiple values obtained by the sensor. Additionally, the input to the affective value scorer may include various values related to the user corresponding to the event, the experience corresponding to the event, and/or to the instantiation corresponding to the event. In one example, input to an affective value scorer may comprise a description of mini-events comprises in the event (e.g., their instantiation periods, durations, and/or corresponding attributes). In another example, input to an affective value scorer may comprise dominance factors of events (or mini-events). Thus, the examples given above describing computing a measurement of affective response corresponding to an event as an average, and/or weighted average of a plurality of values, may be considered examples of function computed by an affective value scorer.

In some embodiments, input provided to an affective value scorer may include private information of a user. For example, the information may include portions of a profile of the user. Optionally, the private information is provided by a software agent operating on behalf of the user. Alternatively, the affective values scorer itself may be a module of a software agent operating on behalf of the user.

In some embodiments, an affective value scorer may be implemented by a predictor, which may utilize an Emotional State Estimator (ESE) and/or itself be an ESE. Additional information regarding ESEs is given at least in Section 8—Predictors and Emotional State Estimators.

Computing a measurement of affective response corresponding to an event utilizing a predictor may involve, in some embodiments, utilizing various statistics derived from the plurality of values obtained by the sensor and/or from description of the event (and/or descriptions of mini-events comprised in the event). Optionally, some of the statistics may be comprised in input provided to the affective value scorer. Additionally or alternatively, some of the statistics may be computed by the affective value scorer based on input provided to the affective value scorer. Optionally, the statistics may assist the predictor by providing context that may assist in interpreting the plurality of values and combining them into the measurement of affective response corresponding to the event.

In one embodiment, the statistics may comprise various averages, such as averages of measurement values. Optionally, the averages may be with respect to various characteristics of the events. For example, a statistic may indicate the average heart rate in the morning hours, the average skin conductance when eating, and/or the average respiratory rate when sleeping. In another example, a statistic may refer to the number of times an hour the user smiled during an event.

In another embodiment, the statistics may refer to a function of the plurality of values and/or a comparison of the plurality of values to typical affective values and/or baseline affective values. For example, a statistic may refer to the number of times and/or percent of time a certain value exceeded a certain threshold. For example, one statistic may indicate the number of times the heart rate exceeds 80 beats-per-minute. Another statistic may refer to the percent of time the systolic blood pressure was above 140. In another example, statistics may refer to baseline values and/or baseline distributions corresponding to the user. For example, a statistic may indicate the percent of time the user's heart rate was more than two standard deviations above the average observed for the user over a long period.

In yet another embodiment, statistics may summarize the emotional state of a user during a certain event. For example, statistics may indicate what percent of the time, during an event, the user corresponding to the event had an emotional state corresponding to a certain core emotion (e.g., happiness, sadness, anger, etc.) In another example, statistics may indicate the average intensity the user felt each core emotion throughout the duration of the instantiation of the event. Optionally, determining an emotional state of a user and/or the intensity of emotions felt by a user may be done using an ESE that receives the plurality of values obtained by the sensor that measured the user.

Training an affective value scorer with a predictor involves obtaining a training set comprising samples and corresponding labels, and utilizing a training algorithm for one or more of the machine learning approaches described in Section 8—Predictors and Emotional State Estimators. Optionally, each sample corresponds to an event and comprises feature values derived from one or more measurements of the user (i.e., the plurality of values mentioned above) and optionally other feature values corresponding to the additional information and/or statistics mentioned above. The label of a sample is the affective value corresponding to the event. The affective value used as a label for a sample may be generated in various ways.

In one embodiment, the user may provide an indication of an affective value that corresponds to an event. For example, the user may voluntarily rank the event (e.g., this video clip was 4/5, or this meal was 9/10). In another example, the user may be prompted to provide an affective value to an event, e.g., by a software agent.

In another embodiment, the affective value corresponding to the event may be provided by an external labeler (e.g., a human and/or algorithm) that may examine measurements of the user (e.g., images of the user taken during the event) and/or actions of the user during the event to determine how the user likely felt during the event (and give a corresponding numerical ranking).

In still another embodiment, the affective value corresponding to the event may be derived from a communication of the user regarding the event. Optionally, deriving the affective value may involve using semantic analysis to determine the user's sentiment regarding the event from a conversation (voice and/or video), comment on a forum, post on social media, and/or a text message.

Affective values may have various meanings in different embodiments. In some embodiments, affective values may correspond to quantifiable measures related to an event (which may take place in the future and/or not always be quantifiable for every instance of an event). In one example, an affective value may reflect expected probability that the user corresponding to the event may have the event again (i.e., a repeat customer). In another example, an affective value may reflect the amount of money a user spends during an event (e.g., the amount of money spent during a vacation). Such values may be considered affective values since they depend on how the user felt during the event. Collecting such labels may not be possible for all events and/or may be expensive (e.g., since it may involve purchasing information from an external source). Nonetheless, it may be desirable, for various applications, to be able to express a measurement of affective response to an event in these terms, and be able to predict such an affective value from measurements taken with a sensor. This may enable for example to compute an experience score that represents the average amount of money users spend during a night out based on how they felt (without needing access to their financial records).

In some embodiments, labels corresponding to affective values may be acquired when the user is measured with an extended set of sensors. This may enable the more accurate detection of the emotional state of the user. For example, a label for a user may be generated utilizing video images and/or EEG, in addition to heart rate and GSR. Such a label is typically more accurate than using heart rate and GSR alone (without information from EEG or video). Thus, an accurate label may be provided in this case and used to train a predictor that is given an affective value based on heart rate and GSR (but not EEG or video images of the user).

An affective value scorer may be trained from data obtained from monitoring multiple users, and as such in some embodiments, may be considered a general affective value scorer. In other embodiments, an affective value scorer may be trained primarily on data involving a certain user, and as such may be considered a personalized affective values scorer for the certain user.

3—Experiences

Some embodiments described herein may involve users having "experiences". In different embodiments, "experiences" may refer to different things. In some embodiments, there is a need to identify events involving certain experiences and/or to characterize them. For example, identifying and/or characterizing what experience a user has may be needed in order to describe an event in which a user has the experience. Having such a description is useful for various tasks. In one example, a description of an event may be used to generate a sample provided to a predictor for predicting affective response to the experience, as explained in more detail at least in Section 8—Predictors and Emotional State Estimators. In another example, descriptions of events may be used to group events into sets involving the same experience (e.g., sets of events described further below in this disclosure). A grouping of events corresponding to the same experience may be useful for various tasks such as for computing a score for the experience from measurements of affective response, as explained in more detail at least in Section 6—Experience Scores. Experiences are closely tied to events; an instance in which a user has an experience is considered an event. As such additional discussion regarding experiences is given also at least in Section 4—Events.

An experience is typically characterized as being of a certain type. Below is a description comprising non-limiting examples of various categories of types of experiences to which experiences in different embodiments may correspond. This description is not intended to be a partitioning of experiences; e.g., various experiences described in embodiments may fall into multiple categories listed below. This description is not comprehensive; e.g., some experiences in embodiments may not belong to any of the categories listed below.

Location.

Various embodiments described herein involve experiences in which a user is in a location. In some embodiments, a location may refer to a place in the physical world. A location in the physical world may occupy various areas in, and/or volumes of, the physical world. For example, a location may be a continent, country, region, city, park, a business (e.g., a restaurant). In one example, a location is a travel destination (e.g., Paris). In another example, a location may be a portion of another location, such as a specific room in a hotel or a seat in a specific location in a theatre. For example, is some embodiments, being in the living room of an apartment may be considered a different experience than being in a bedroom.

Virtual Location.

In some embodiments, a location may refer to a virtual environment such as a virtual world, with at least one instantiation of the virtual environment stored in a memory of a computer. Optionally, a user is considered to be in the virtual environment by virtue of having a value stored in the memory indicating presence of a representation of the user in the virtual environment. Optionally, different locations in virtual environment correspond to different logical spaces in the virtual environment. For example, different rooms in an inn in a virtual world may be considered different locations. In another example, different continents in a virtual world may be considered different locations. In one embodiment, a user interacts with a graphical user interface in order to participate in activities within a virtual environment. In some examples, a user may be represented in the virtual environment as an avatar. Optionally, the avatar of the user may represent the presence of the user at a certain location in the virtual environment. Furthermore, by seeing where the avatar is, other users may determine what location the user is in, in the virtual environment.

Route.

In some embodiments, an experience may involve traversing a certain route. Optionally, a route is a collection of two or more locations that a user may visit. Optionally, at least some of the two or more locations in the route are places in the physical world. Optionally, at least some of the two or more locations in the route are places in a virtual world. In one embodiment, a route is characterized by the order in which the locations are visited. In another embodiment, a route is characterized by a mode of transportation used to traverse it.

Content.

Consuming content is considered an experience in some embodiments. Optionally, the content that is consumed is digital content and consuming it involves a user interface that presents the content (e.g., a display and/or speakers). In some embodiments, an experience involving consuming content is characterized by the type of medium involved in consuming the content. For example, the experience may be referred to as "watching a movie", "surfing the Internet", and/or "listening to music". In other embodiments, an experience involving consuming content is characterized by content itself. For example, the experience may be referred to as "watching Star Trek 3", "browsing Facebook", and/or "Listening to Wish You Were Here" by Pink Floyd.

Activity.

In some embodiments, an experience may involve an activity that a user does. In one example, an experience involves a recreational activity (e.g., traveling, going out to a restaurant, visiting the mall, or playing games on a gaming console). In another example, an experience involves a day-to-day activity (e.g., getting dressed, driving to work, talking to another person, sleeping, and/or making dinner). In yet another example, an experience involves a work related activity (e.g., writing an email, boxing groceries, or serving food). In still another example, an experience involves a mental activity such as studying and/or taking an exam. In still another example, an experience may involve a simple action like sneezing, kissing, or coughing.

Social Interaction.

In some embodiments, an experience may involve some sort of social interaction a user has. Optionally, the social interaction may be between the user and another person and/or between the user and a software-based entity (e.g., a software agent or physical robot). The scope of an interaction may vary between different experiences. In one example, an experience may involve an interaction that lasts minutes and even hours (e.g., playing a game or having a discussion). In another example, an interaction may be as short as exchanging a smile, a handshake, or being rudely interrupted. It is to be noted that the emotional state of a person a user is interacting with may change the nature of the experience the user is having. For example, interacting with a happy smiling person may be a completely different experience than interacting with a sobbing person.

Service Provider—

In some embodiments, a social interaction a user has is with a service provider providing a service to the user. Optionally, a service provider may be a human service provider or a virtual service provider (e.g., a robot, a chatbot, a web service, and/or a software agent). In some embodiments, a human service provider may be any person with whom a user interacts (that is not the user). Optionally, at least part of an interaction between a user and a service provider may be performed in a physical location (e.g., a user interacting with a waiter in a restaurant, where both the user and the waiter are in the same room). Optionally, the interaction involves a discussion between the user and the service provider (e.g., a telephone call or a video chat). Optionally, at least part of the interaction may be in a virtual space (e.g., a user and insurance agent discuss a policy in a virtual world). Optionally, at least part of the interaction may involve a communication, between the user and a service provider, in which the user and service provider are not in physical proximity (e.g., a discussion on the phone).

Substance—

Various embodiments described herein involve experiences in which a user consumes a substance and/or a combination of substances. Optionally, a substance is something that the user consumes by having it absorbed in the body of the user. In one example, "substances" may refer to various forms of food and drink that are consumed by eating and drinking. In another example, "substances" may refer to various forms of drugs and/or chemicals that may be consumed by swallowing, injecting, inhaling, and/or by absorption through the skin.

Product—

Utilizing a product may be considered an experience in some embodiments. A product may be any object that a user may utilize. Examples of products include appliances, clothing items, footwear, wearable devices, gadgets, jewelry, cosmetics, cleaning products, vehicles, sporting gear and musical instruments. Optionally, with respect to the same product, different periods of utilization and/or different periods of ownership of the product may correspond to different experiences. For example, wearing a new pair of shoes for the first time may be considered an event of a different experience than an event corresponding to wearing the shoes after owning them for three months.

Environment—

Spending time in an environment characterized with certain environmental conditions may also constitute an experience in some embodiments. Optionally, different environmental conditions may be characterized by a certain value or range of values of an environmental parameter. In one example, being in an environment in which the temperature is within a certain range corresponds to a certain experience (e.g., being in temperatures lower than 45° F. may be considered an experience of being in the cold and being in temperatures higher than 90° F. may be considered being in a warm environment). In another example, environments may be characterized by a certain range of humidity, a certain altitude, a certain level of pressure (e.g., expressed in atmospheres), and/or a certain level of felt gravity (e.g., a zero-G environment). In yet another example, being in an environment that is exposed to a certain level of radiation may be considered an experience (e.g., exposure to certain levels of sun light, Wi-Fi transmissions, electromagnetic fields near power lines, and/or cellular phone transmissions). In still another example, being in an environment in which there is a certain level of noise (e.g., city traffic or dessert quiet), and/or noise of a certain type (e.g., chirping birds, or sounds of the sea) may be considered an experience. In yet another example, being in an environment in which there is a certain odor may be considered an experience (e.g., being in a place where there is a smell of Jasmine flowers or an unpleasant odor associated with refuse). And in yet another example, being in an environment in which there is a certain amount of pollutants and/or allergens (e.g., certain range of particles-per-million) may be considered an experience. It is to be noted that a user having one of the above experiences may not be aware of the extent of the respective environmental parameter and thus may not be aware of having the corresponding experience. Optionally, being in a same environment for a different period of time and/or under different conditions may be considered a different experience.

In different embodiments described herein, measurements of affective response of users are utilized in computations involving experiences, such as scoring experiences, ranking experiences, comparing experiences, and/or computing time-dependent trends for experiences. Optionally, the experiences involved in such computations all belong to a set of experiences that includes certain types of experiences. Additionally, in embodiments, there may be one or more types of experiences that are explicitly excluded from the set of experiences, and thus measurements of affective response users utilized in the computations do not include measurements of users corresponding to events involving experiences of the one or more types of experiences.

Below are some examples of embodiments that involve certain types of experiences, such that the set of experiences may include experiences of one or more of the following types. In one embodiment, the set of experiences includes experiences in which the user is in a location (in the physical world). In one embodiment, the set of experiences includes experiences in which the user is in a virtual location. In one embodiment, the set of experiences includes experiences that involve traversing a certain route. In one embodiment, the set of experiences includes experiences in which the user consumes content (e.g., a movie or a computer game). In one embodiment, the set of experiences includes experiences in which the user partakes in a recreational activity. In another embodiment, the set of experiences includes experiences in which the user partakes in a work-related activity. In one embodiment, the set of experiences includes experiences in which the user has a social interaction. In one embodiment, the set of experiences includes experiences in which the user receives a service from a service provider. In one embodiment, the set of experiences includes experiences in which the user utilizes a certain product. In one embodiment, the set of experiences includes experiences in which the user spends time in an environment characterized with certain environmental condition.

Below are some examples of embodiments that exclude certain types of experiences, such that the set of experiences does not include experiences of at least a certain type. In one embodiment, the set of experiences does not include experiences in which the user is in a location (in the physical world). In one embodiment, the set of experiences does not include experiences in which the user is in a virtual location. In one embodiment, the set of experiences does not include experiences that involve traversing a certain route. In one embodiment, the set of experiences does not include experiences in which the user consumes content (e.g., a movie or a computer game). In one embodiment, the set of experiences does not include experiences in which the user partakes in a recreational activity. In another embodiment, the set of experiences does not include experiences in which the user partakes in a work-related activity. In one embodiment, the set of experiences does not include experiences in which the user has a social interaction. In one embodiment, the set of experiences does not include experiences in which the user receives a service from a service provider. In one embodiment, the set of experiences does not include experiences in which the user utilizes a certain product. In one embodiment, the set of experiences does not include experiences in which the user spends time in an environment characterized with certain environmental condition.

The examples given above illustrate some of the different types of experiences users may have in embodiments described herein. In addition to a characterization according to a type of experience, and in some embodiments instead of such a characterization, different experiences may be characterized according to other attributes. In one embodiment, experiences may be characterized according to the length of time in which a user has them. For example, "short experiences" may be experiences lasting less than five minutes, while "long experiences" may take more than an hour (possibly with a category of "intermediate experiences" for experiences lasting between five minutes and an hour). In another embodiment, experiences may be characterized according to an expense associated with having them. For example, "free experiences" may have no monetary expense associated with them, while "expensive experiences" may be experiences that cost at least a certain amount of money (e.g., at least a certain portion of a budget a user has). In yet another embodiment, experiences may be characterized according to their age-appropriateness. For example, certain experiences may be considered for the general public (including children), while others may be deemed for a mature audience only. It is to be noted that the examples given in the above embodiment may be used to characterize experiences without reference to a type of experience (e.g., R-rated experiences vs. PG-rated experiences) or in conjunction with a type of experience (e.g., an R-rated movie vs. a PG-rated movie).

Characterizations of experiences may be done in additional ways. In some embodiments, experiences may be considered to by corresponding attributes (e.g., type of experience, length, cost, quality, etc.) Depending on the embodiments, different subsets of attributes may be considered, which amounts to different ways in which experiences may be characterized. Thus, for example, in one embodiment, two events may be considered corresponding to the same experience (when a first set of attributes is used to characterize experiences), while in another embodiment, the same two events may be considered corresponding to different experiences (when a second set of attributes is used to characterize experiences. For example, in one embodiment, biking for 15 minutes may be considered a different experience than biking for 2 hours; they may be considered as the experiences "short bike ride" and "long bike ride", respectively. However, in another embodiment they may both be considered the same experience "riding a bike". In another example, in one embodiment, eating a burger at McDonald's may considered a different experience than eating a burger at In-N-Out (e.g., when considering an attribute involving the quality of food), while in another embodiment, both would be considered examples of the experience "eating a burger".

Characterizing experiences based on attributes may involve certain combinations of pairs of attributes. These attributes may describe properties such as the location the experience takes place, an activity the experience involves, the duration of the experience, and/or a period of time in a recurrent unit time during which the experience happens (e.g., the hour of the day, the day of week, the season in the year, etc.) Following are examples of characterizing experiences via combinations of the attributes described above.

In one embodiment, an experience a user has may involve engaging in a certain activity at a certain location. Optionally, the certain activity belongs to a set of activities that includes the following: exercise activities, recreational activities, shopping related activities, dining related activities, consuming digital content, resting, playing games, visiting a location in the physical world, interacting in a virtual environment, receiving a medical treatment, and receiving services. Optionally, the certain location belongs to a set that includes locations that may be characterized as being of one or more of the following types: countries of the world, cities in the world, neighborhoods in cities, parks, beaches, stadiums, hotels, restaurants, theaters, night clubs, bars, shopping malls, stores, theme parks, museums, zoos, spas, health clubs, exercise clubs, clinics, hospitals, banks, and other places of business.

In another embodiment, an experience a user has may involve visiting a certain location during a certain period of time. In one example, the certain location belongs to a set that includes locations that may be characterized as being of one or more of the following types: cities, neighborhoods, parks, beaches, restaurants, theaters, night clubs, bars, shopping malls, stores, theme parks, museums, zoos, spas, health clubs, exercise clubs, clinics, hospitals, banks and other places of business. In this example, the certain period of time during which the certain location is visited is a recurring period of time that includes at least one of the following: a certain hour during the day, a certain day of the week, a certain day of the month, and a certain holiday. In another example, the certain location belongs to a set that includes locations that may be characterized as being of one or more of the following types: continents, countries, cities, parks, beaches, theme parks, museums, resorts, and zoos. In this example, the certain period of time during which the certain location is visited is a recurring period of time that involves at least one of: a season of the year, a month of the year, and a certain holiday.

In yet another embodiment, an experience a user has may involve visiting a certain location for a certain duration. In one example, the certain location belongs to a set that includes locations that may be characterized as being of one or more of the following types: cities, neighborhoods, parks, beaches, restaurants, theaters, night clubs, bars, shopping malls, stores, theme parks, museums, zoos, spas, health clubs, and exercise clubs. In this example, the certain duration is longer than five minutes and shorter than a week. In another example, the certain location belongs to a set that includes locations that may be characterized as being of one or more of the following types: continents, countries, cities, parks, hotels, cruise ships, and resorts. In this example, the certain duration is longer than an hour and shorter than two months.

In still another embodiment, an experience a user has may involve engaging in a certain activity during a certain period of time. Optionally, the certain activity belongs to a set of activities that includes exercise activities, recreational activities, work related activities, household related activities, shopping related activities, dining related activities, consuming digital content, playing games, studying, resting, visiting a location in the physical world, interacting in a virtual environment, receiving a medical treatment, and receiving services. Optionally, the certain period of time is a recurring period of time that includes at least one of the following: a certain hour during the day, a certain day of the week, a certain day of the month, and a certain holiday.

And in yet another embodiment, an experience a user has may involve engaging in a certain activity for a certain duration. Optionally, the certain activity belongs to a set of activities that includes exercise activities, recreational activities, work related activities, household related activities, shopping related activities, dining related activities, consuming digital content, playing games, studying, resting, visiting a location in the physical world, interacting in a virtual environment, receiving a medical treatment, and receiving services. Optionally, the certain duration is longer than one minute and shorter than one day.

The possibility to characterize experiences with subsets of corresponding attributes may lead to the fact that depending on the embodiment, the same collection of occurrences (e.g., actions by a user at a location) may correspond to different experiences and/or a different number of experiences. For example, when a user takes a bike ride in the park, it may correspond to multiple experiences, such as "exercising", "spending time outdoors", "being at the park", "being exposed to the sun", "taking a bike ride", and possibly other experience. Thus, the decision on which of the above are to be recognized as experiences based on the set of actions involving riding the bike in the park would depend on specifics of the embodiment involved.

In different embodiments, experiences may be characterized according to attributes involving different levels of specificity. The level of specify, according to which it may be judged whether two events correspond to the same experience, may depend on the embodiment. For example, when considering an experience involving being in a location, in one embodiment, the location may be a specific location such as room 1214 in the Grand Budapest Hotel, or seat 10 row 4 in the Left Field Pavilion 303 at Dodger Stadium. In another embodiment, the location may refer to multiple places in the physical world. For example, the location "fast food restaurant" may refer to any fast food restaurant, while the location "hotel" may refer to any hotel. Similarly, for example, the location "In-N-Out Burger" may refer to any branch of the franchise, and not necessarily a certain address. In one example, a location may refer to designated place in a vehicle, such as a specific seat on an airplane (e.g., seat 34A), or a cabin in a ship (e.g., cabin 212). In another example, the location may refer to a specific seat in a vehicle travelling on a certain route (e.g., window seat flying through the Grand Canyon).

In some embodiments, attributes used to characterize experiences may be considered to belong to hierarchies.

Thus, at the same time, something that happens to the user and/or something the user does may be associated with multiple related experiences of an increasing scope. For example, when a user rides a bike in the park, this may be associated with multiple experiences that have a hierarchical relationship between them. For example, riding the bike may correspond to an experience of "riding a bike in Battery park on a weekend", which belongs to a group of experiences that may be described as "riding a bike in Battery park", which belongs to a larger group of experiences that may be characterized as "riding a bike in a park", which in turn may belong to a larger group "riding a bike", which in turn may belong to an experience called "exercising". Which of the hierarchical representations gets used and/or what level in a hierarchy gets used, would be a detail specific to the embodiment at hand.

Additionally, in some embodiments, an experience may comprise multiple ("smaller") experiences, and depending on the embodiment, the multiple experiences may be considered jointly (e.g., as a single experience) or individually. For example, "going out to a movie" may be considered a single experience that is comprised of multiple experiences such as "driving to the theatre", "buying a ticket", "eating popcorn", "going to the bathroom", "watching the movie", and "driving home".

4—Events

When a user has an experience, this defines an "event". An event may be characterized according to certain attributes. For example, every event may have a corresponding experience and a corresponding user (who had the corresponding experience). An event may have additional corresponding attributes that describe the specific instantiation of the event in which the user had the experience. Examples of such attributes may include the event's duration (how long the user had the experience in that instantiation), the event's starting and/or ending time, and/or the event's location (where the user had the experience in that instantiation).

An event may be referred to as being an "instantiation" of an experience and the time during which an instantiation of an event takes place may be referred to herein as the "instantiation period" of the event. This relationship between an experience and an event may be considered somewhat conceptually similar to the relationship in programming between a class and an object that is an instantiation of the class. The experience may correspond to some general attributes (that are typically shared by all events that are instantiations of the experience), while each event may have attributes that correspond to its specific instantiation (e.g., a certain user who had the experience, a certain time the experience was experienced, a certain location the certain user had the experience, etc.) Therefore, when the same user has the same experience but at different times, these may be considered different events (with different instantiations periods). For example, a user eating breakfast on Sunday Feb. 1, 2015 is a different event than the user eating breakfast on Monday Feb. 2, 2015.

In some embodiments, an event may have a corresponding measurement of affective response, which is a measurement of the user corresponding to the event to having the experience corresponding to the event. The measurement corresponding to an event is taken during a period corresponding to the event; for example, during the time the user corresponding to the event had the experience corresponding to the event, or shortly after that. Optionally, a measurement corresponding to an event reflects the affective response corresponding to the event, which is the affective response of the user corresponding to the event to having the experience corresponding to the event. Thus, a measurement of affective response corresponding to an event typically comprises, and/or is based on, one or more values measured during the instantiation period of the event and/or shortly after it, as explained in more detail at least in Section 2—Measurements of Affective Response.

An event is often denoted in this disclosure with the letter $\tau$. An event involving a user u corresponding to the event who has an experience e corresponding to the event, may be represented by a tuple $\tau=(u,e)$. Similarly, an event $\tau$ may have a corresponding measurement of affective response m which is a measurement of the user u corresponding to the event to having the experience e corresponding to the event (as taken during the instantiation period of the event or shortly after it). In this case, the event $\tau$ may be represented by a tuple $\tau=(u,e,m)$. It is to be noted that the same user may have the same experience at multiple different times. These may be represented by multiple different events having possibly different measurement values. For example, two different events in which the same user had the same experience, but with possibly different corresponding measurements of affective response may be denoted herein as events $\tau_1=(u,e,m_1)$ and $\tau_2=(u,e,m_2)$. In some cases herein, to emphasize that a measurement m corresponds to an event $\tau$ the measurement will be denoted $m_\tau$. Similarly, the user corresponding to an event $\tau$ may be denoted $u_\tau$ and the experience corresponding to $\tau$ may be denoted $e_\tau$.

In some embodiments, a tuple $\tau$ may correspond to additional information related to the specific instantiation of the event, such as a time t of the event (e.g., the time the measurement m is taken), in which case the tuple may be of the form $\tau=(u,e,m,t)$. Additionally or alternatively, a tuple $\tau$ may further correspond to a weight parameter w, which may represent the importance of the measurement and be indicative of the weight the measurement should be given when training models. In this case the tuple may be of the form $\tau=(u,e,m,w)$. Additionally or alternatively, a tuple $\tau$ may correspond to other factors related to the user (e.g., demographic characteristics) or the instantiation of the experience (e.g., duration and/or location of the event corresponding to the measurement).

When discussing events, it may be stipulated that the measurement of affective response corresponding to an event is taken in temporal proximity to the user corresponding to the event having the experience corresponding to the event. Thus, when discussing an event represented by a tuple $\tau=(u,e,m)$, where m is a measurement of affective response of the user u to having the experience e, it may be assumed that m is taken in temporal proximity to when the user u had the experience e.

It is to be noted that in the above notation, $\tau=(u,e,m)$ is typically assumed to involve a single user u, a single experience e, and a measurement m. However, this is not necessarily true in all embodiments. In some embodiments, u may represent multiple users, e may represent multiple experiences, and/or m may represent multiple measurements. For example, when the experience e may represent multiple experiences that the user u had, such as in a case where e is an experience that involves a set of "smaller" experiences $e_1, e_2, \ldots, e_n$, the measurement m may be assumed to correspond to each experience $e_1, e_2, \ldots, e_n$. Thus in this example, to account for multiple experiences, the event $\tau$ may be substituted by multiple events, e.g., $\tau_1=(u,e_1,m), \ldots, \tau_n=(u,e_n,m)$. Similarly, if the user u represents multiple users, the measurement m may be considered an average and/or representative measurement of those users. Additionally, as described elsewhere herein, the use of a singular "measurement" in this disclosure may refer to multiple values (e.g., from the same sensor, different sensor, and/or acquired at multiple times).

Similar to how a "larger" experience may comprise multiple "smaller" experiences, in some embodiments, an event may comprise a plurality of smaller events instantiated during the instantiation period of the "larger" event. Optionally, the smaller events may be referred to as "mini-events". For example, an event corresponding to an experience of being at a location (e.g., a mall), may include multiple mini-events, such as an event in which a user traveled to the location, an event in which the user spoke to someone at the location, an event in which the user bought a present at the location, and an event in which the user ate food at the location. In some embodiments, some of the mini-events may have overlapping instantiation periods (e.g., a user exercising and speaking to someone else simultaneously), while in others, the events comprised in a "larger" event may have non-overlapping instantiation periods. It is to be noted that the herein the term "mini-event" is used only to distinguish a larger event from smaller events it comprises; each mini-event is an event, and may have all the characteristics of an event as described in this disclosure.

In some embodiments, an event $\tau$ may be include, and/or be partitioned to, multiple "mini-events" $\tau_1, \tau_2, \ldots, \tau_k$ that are derived from the event $\tau$, such that the instantiation period of each $\tau_i$, $1 \le i \le k$, falls within the instantiation period of $\tau$. Furthermore, it may be assumed that each mini-event has an associated measurement of affective response $m_{\tau_i}$ such if $i \ne j$ it may be that $m_{\tau_i} \ne m_{\tau_j}$. In this embodiment, $m_\tau$, the measurement of affective response corresponding to the event $\tau$ is assumed to be a function of the measurements corresponding to the mini-events $m_{\tau_1}, m_{\tau_2}, \ldots, m_{\tau_k}$. For example, $m_\tau$ may be a weighted average of the measurements corresponding to the mini-events, that is computed according to a function $$m_\tau = \frac{1}{\sum_{i=1}^{k} w_i} \cdot \sum_{i=1}^{k} w_i \cdot m_{\tau_i},$$

where the $w_i$ are weight corresponding to each mini-event $\tau_i$. Additional discussion regarding the computation of the measurement of affective response corresponding to an event from measurements corresponding to mini-events comprised in the event is given in Section 2—Measurements of Affective Response.

In one embodiment, the instantiation periods of the k mini-events do not overlap. Alternatively, the instantiation periods of some of the k mini-events may overlap. In one embodiment, the instantiation periods of the k mini-events may cover the entire instantiation period of the event $\tau$. Alternatively, the instantiation periods of the k mini-events may cover only a portion of the instantiation of the event $\tau$. Optionally, the portion of $\tau$ that is covered by instantiations of mini-events involves at least a certain percent of the instantiation period of $\tau$, such as at least 1%, 5%, 10%, 25%, or at least 50% of the instantiation period of $\tau$. In another embodiment, the duration covered by instantiations of the k mini-events may comprise at least a certain period of time. For example, the certain period may be at least 1 second, 10 second, 1 minute, 1 hour, 1 day, 1 week, or more.

In one embodiment, $k \ge 1$ "mini-events" are derived from an event $\tau$, in such a way that each mini-event has an instantiation period having a certain duration. For example, the certain duration may be one second, five seconds, one minute, one hour, one day, one week, or some other duration between one second and one week. In another embodiment, each of the k mini-events derived from an event $\tau$ have an initiation period falling within a certain range. Examples of the certain range include 0.01 seconds to one second, 0.5 seconds to five seconds, one second to one minute, one minute to five minutes, one minute to one hour, one hour to one day, and between one day and one week.

In some embodiments, mini-events are generated from a larger event because they reflect different types of events. For example, an event involving going out may be represented by the mini-events corresponding to getting dressed, driving down-town, finding parking, going to a restaurant, taking a stroll, and driving back home. In another example, different scenes in a movie may be considered mini-events, and similarly different levels in a game, different rooms in a virtual world, etc., may also each be considered a different mini-event.

In some embodiments, a measurement of affective response corresponding to a certain event may be based on values that are measured with one or more sensors at different times during the certain event's instantiation period or shortly after it (this point is discussed further in Section 2—Measurements of Affective Response). It is to be noted that in the following discussion, the values may themselves be considered measurements of affective response. However, for the purpose of being able to distinguish, in the discussion below, between a measurement of affective response corresponding to an event, and values upon which the measurement is bases, the term "measurement of affective response" is not used when referring to the values measured by the one or more sensors. However, this distinction is not meant to rule out the possibility that the measurement of affective response corresponding to the certain event comprises the values.

When there are no other events overlapping with the certain event, the values measured with the one or more sensors may be assumed to represent the affective response corresponding to the certain event. However, when this is not the case, and there are one or more events with instantiation periods overlapping with the instantiation of the certain event, then in some embodiments, that assumption may not hold. For example, if for a certain period during the instantiation of the certain event, there may be another event with an instantiation that overlaps with the instantiation of the certain event, then during the certain period, the user's affective response may be associated with the certain event, the other event, and/or both events. In some cases, if the other event is considered part of the certain event, e.g., the other event is a mini-event corresponds to an experience that is part of a "larger" experience to which the certain event corresponds, then this fact may not matter much (since the affective response may be considered to be directed to both events). However, if the other event is not a mini-event that is part of the certain event, then associating the affective response measured during the certain period with both events may produce an inaccurate measurement corresponding to the certain event. For example, if the certain event corresponds to an experience of eating a meal, and during the meal the user receives an annoying phone call (this is the "other event"), then it may be preferable not to associate the affective response expressed during the phone call with the meal.

It is to be noted that in some embodiments, the fact that unrelated events may have overlapping instantiation periods may be essentially ignored when computing measurements of affective response corresponding to the events. For example, a measurement of affective response corresponding to the certain event may be an average of values acquired by a sensor throughout the instantiation of the certain event, without regard to whether there were other overlapping events at the same time. One example embodiment in which such an approach may be useful is an embodiment in which the certain event has a long instantiation period (e.g., going on a vacation), while the overlapping events are relatively short (e.g., intervening phone calls with other people). In this embodiment, filtering out short periods in which the user's attention was not focused on the experience corresponding to the certain event may not lead to significant changes in the value of the measurement of affective response corresponding to the certain event (e.g., because most of the values upon which the measurement is based still correspond to the certain event and not to other events).

However, in other embodiments, it may be desirable to treat values acquired by a sensor during periods of overlapping instantiations differently than values acquired when only the certain event is considered to be instantiated. For example, some of the values acquired during periods of overlapping instantiations may receive a different weight than values acquired when there is only a single instantiation to consider or be filtered out entirely.

In some embodiments, an event may be associated with a dominance factor indicative of the extent affective response expressed by the user corresponding to the event should be associated with the event. Based on such dominance factors, when an event with a higher dominance factor overlaps with an event with a lower dominance factor, the affective response, measured during the overlap, is associated to a higher degree with the event with the higher dominance factor. Optionally, the affective response is associated entirely with the event with the higher dominance factor, such that a value acquired by a sensor during the time of the overlap between the events having the lower and higher dominance factors is essentially not utilized to compute the measurement of affective response corresponding to the event with the lower dominance factor. In some embodiments, this may amount to filtration of values from periods in which an event's instantiation overlaps with other events having higher dominance factors. Alternatively, a value acquired by the sensor during the time of the overlap may be given a lower weight when used to compute the measurement of affective response corresponding to the event with the lower dominance factor, compared to the weight given to a value acquired by the sensor during a time in which the event with the higher dominance factor does not overlap with the event with the lower dominance factor.

In one embodiment, an event may have a certain dominance factor associated with it based on the type of the experience corresponding to the event. For example, an event involving having a phone conversation may have a higher dominance factor than an event involving watching TV. Thus, if a user is doing both simultaneously, in this embodiment, it may be assumed that affective response the user has at the time of the conversation is more dominantly related to the phone conversation and to a lesser extent (or not at all) to what is playing on the TV.

In another embodiment, an event may have a certain dominance factor associated with it based on its length, such that a shorter event is typically given a higher dominance factor than a longer event. For example, the shorter event may be assumed to interrupt the user's experiencing of the experience corresponding to the longer event, thus during the instantiation of the shorter event it may be assumed that the user pays more attention to the experience corresponding to the shorter event.

Determining dominance factors of events may involve, in some embodiments, tracking users during the events. Tracking a user may be done utilizing various sensors that may detect movements and/or other actions performed by the user. Optionally, tracking the user is done at least in part by a software agent operating on behalf of the user. Additionally, the software agent may also be the entity that assigns dominance factors to at least some events involving the user on behalf of whom it operates.

In one example, eye tracking may be used to determine what the user is focusing on when measurements are taken with a sensor. Based on the eye tracking data, objects that are the target of attention of the user can be identified, and events involving those objects may receive a higher dominance factor than events that do not involve those objects. In another example, a camera and/or other sensors may identify certain actions a user does, like typing a text message on a phone, in order to determine that an event involving composition of a text message should receive a higher dominance factor than some other events instantiated at the same time (e.g., an event involving listening to a certain song). In yet another example, semantic analysis of what a user is saying may be used to determine to whom the user is addressing (another person, a software agent, or an operating system) in order to determine what experience the user is focusing on at the time. In still another example, software systems with which a user interacts may provide indications of when such interaction takes place. When such an interaction takes place, it may be assumed that the focus of the user is primarily on the experience involved in the interaction (e.g., an operating system of an entertainment system) and to a lesser extent with other experiences happening at the same time.

Other information that may be used to determine dominance factors of events, in some embodiments, may come from other users who were faced with similar overlapping events. Optionally, the other users were monitored at the time, and the dominance factors assigned to their corresponding events are based on monitoring, such as in the examples given above.

In some embodiments, when the user experiences different consecutive dominant events, a certain time margin may be used when using values measured by a sensor to compute measurements of affective response corresponding to the events. The certain time margin may span a few seconds, to a few minutes or even more, depending on the type of sensors used. Optionally, the certain time margin may be used in order to try and avoid associating the affective response of a user to a first experience with the affective response of the user to a second experience that came before and/or after it. For example, if a user is eating in a restaurant (a first event) and the user receives a phone call that excites the user (a second event), it may be prudent to not to use values measured by a sensor during the first minute or two after the call to compute a measurement of affective response corresponding to the meal. This is because affective response of the user shortly after the phone call may be still related to the conversation the user had, and not so much to the meal. After a certain amount of time (e.g., a couple of minutes), the effects of the conversation may have diminished, and the affective response of the user is more likely to represent how the user feels about the meal.

In one embodiment, the certain time margin described above does not have a fixed duration, rather, it represents the time needed to return to a baseline or to return to at least a certain distance from a baseline. For example, if measurements of a user up to a certain event are at a certain level, and an intervening event causes the measurements to jump significantly, then after the intervening event, the margin in which measurements are not associated with the certain event may extend until the measurements return at least a certain distance to their prior level (e.g., at least 50% of the difference).

Descriptions of events are used in various embodiments in this disclosure. Typically, a description of an event may include values related to a user corresponding to the event, an experience corresponding to the event, and/or details of the instantiation of the event (e.g., the duration, time, location, and/or conditions of the specific instantiation of the event). Optionally, a description of an event may be represented as feature vector comprising feature values. Additionally or alternatively, a description of an event may include various forms of data such as images, audio, video, transaction records, and/or other forms of data that describe aspects of the user corresponding to the event, the experience corresponding to the event, and/or the instantiation of the event.

A description of a user includes values describing aspects of the user. Optionally, the description may be represented as a vector of feature values. Additionally or alternatively, a description of a user may include data such as images, audio, and/or video that includes the user. In some embodiments, a description of a user contains values that relate to general attributes of the user, which are often essentially the same for different events corresponding to the same user, possibly when having different experiences. Examples of such attributes may include demographic information about the user (e.g., age, education, residence, etc.). Additionally or alternatively, the description may include portions of a profile of the user. The profile may describe various details of experiences the user had, such as details of places in the real world or virtual worlds the user visited, details about activities the user participated in, and/or details about content the user consumed.

A description of an experience includes values describing aspects of the experience. Optionally, the description of the experience may be represented as a vector of feature values. Typically, the description of the experience contains values that relate to general attributes of the experience, which are often essentially the same for different events corresponding to the same experience, possibly even when it is experienced at different times and/or by different users. Examples of such information may include attributes related to the type of experience, such as its typical location, cost, difficulty, etc.

The description of an event $\tau$ may include feature values obtained from a description of the user corresponding to the event $\tau$ and/or a description of the experience corresponding to the event $\tau$. Additionally, the description of the event $\tau$ may include values that may vary between different events corresponding to the same experience as $\tau$. These values include values corresponding to the instantiation of the event $\tau$ during the specific time corresponding to $\tau$, when the user u had the experience e. Examples of such values may include the location corresponding to $\tau$ (where the user u had the experience e in the specific instantiation $\tau$), the duration corresponding to $\tau$ (how long the user u had the experience e in the specific instantiation $\tau$), and/or the time frame of $\tau$ (e.g., when $\tau$ started and/or ended). Optionally, the description of the event $\tau$ may include values related to situations the user was in during the time frame of $\tau$ (e.g., the user's mood, alertness, credit status, relationship status, and other factors that may influence the user's state of mind). Optionally, the description of $\tau$ may include values related to experience the user had, such as the size of portion the user was served, the noise and/or cleanliness level in the user's room, how long it took to deliver a product to the user, and/or other attributes that may differ depending on the embodiment being considered.

In some embodiments, the description of an event $\tau$ may include information derived from monitoring of the user corresponding to $\tau$, such as actions the user is performing, things the user is saying, and/or what objects are capturing the attention of the user (e.g., as determined from eye tracking). Optionally, this information may be used to determine a dominance factor of $\tau$, which may be used to determine to what extent the affective response of the user corresponding to $\tau$ is to be associated with the experience corresponding to $\tau$.

In some embodiments, a description of an event may include information pertaining to a measurement of affective response m corresponding to the event $\tau$ (also denoted $m_\tau$). Optionally, the information pertaining to the measurement includes information about one or more sensors used to measure the user corresponding to the event, such as operating parameters of the one or more sensors (e.g., settings used and/or durations of operation) and/or details regarding the processing of the data acquired by the one or more sensors. Additionally, the information in the description of the event $\tau$ may include the measurement $m_\tau$ itself or a product of it.

It is to be noted that the description of an event may include various types of values. The choice of which values to include in the description of the event may vary between embodiments and depend on the task at hand. In one example, a description of an event may include values represented as indicator values indicating whether certain aspects of an event are relevant to the event or not. Optionally, the description of an event may include values represented as real values indicative of the magnitude of certain aspects (where irrelevant aspects may be represented by a fixed value such as 0).

It is also to be noted that when a description of an event is represented by a feature vector, in different embodiments, there may be different ways to represent the same type of data. For example, in some embodiments, events involving corresponding experiences of different types may be all described as feature vectors in the same feature space (i.e., they all have the same dimensionality and features at a certain dimension relate to the same attribute in all events). In other embodiments, each type of experience may have its own feature space (i.e., its own set of attributes). In such a case, processing events represented in different feature spaces may involve converting their representation into representation involving a common feature space.

Various embodiments described herein involve collecting measurements of affective response of users to experiences (i.e., collecting measurements corresponding to events). Though in some embodiments it may be easy to determine who the users corresponding to the events are (e.g., via knowledge of which sensors, devices, and/or software agents provide the data), it may not always be easy to determine what are the corresponding experiences the users had. Thus, in some embodiments, it is necessary to identify the experiences users have, and be able to associate measurements of affective response of the users with respective experiences to define events. However, this may not always be easily done. In one example, it may not be clear to a system that monitors a user (e.g., a software agent) when the user has an experience and/or what the experience is. In another example, the identity of a user who has an experience may not be known (e.g., by a provider of an experience), and thus it may be necessary to identify the user too. In general, determining who the user corresponding to an event and/or the experience corresponding to an event are referred to herein as identifying the event.

Identifying an event may also involve, in some embodiments, identifying details describing aspects of the event. Thus, the term "identifying an event" may also refer to determining one or more details related to an event, and as such, in some embodiments, "identifying an event" may be interpreted as "describing an event", and may be used with that term interchangeably. In one example, the one or more details may relate to the user corresponding to the event. In another example, the one or more details may relate to the experience corresponding to the event. And in yet another example, the one or more details may relate to the instantiation of the event.

In some embodiments, events are identified by a module referred to herein as an event annotator. Optionally, an event annotator is a predictor, and/or utilizes a predictor, to identify events.

In some embodiments, identifying events of a user is done, at least in part, by a software agent operating on behalf of the user (for more details on software agents see Section 9—Software Agents). Optionally, the software agent may monitor the user and/or provide information obtained from monitoring the user to other parties. Optionally, the software agent may have access to a model of the user and utilize the model to analyze and/or process information collected from monitoring the user (where the information may be collected by the software agent or another entity). Thus, in some embodiments, an event annotator used to identify events of a user may be a module of a software agent operating on behalf of the user and/or in communication with a software agent operating on behalf of the user.

In some embodiments, in order to gather this information, a software agent may actively access various databases that include records about the user on behalf of whom the software agent operates. For example, such databases may be maintained by entities that provide experiences to users and/or aggregate information about the users, such as content providers (e.g., search engines, video streaming services, gaming services, and/or hosts of virtual worlds), communication service providers (e.g., Internet service providers and/or cellular service providers), e-commerce sites, and/or social networks.

In one embodiment, a first software agent acting on behalf of a first user may contact a second software agent acting behalf of a second user in order to receive information about the first user that may be collected by the second software agent (e.g., via a device of the second user). For example, the second software agent may provide images of the first user that the first software agent may analyze in order to determine what experience the first user is having.

Events can have multiple measurements associated with them that are taken during various times. For example, a measurement corresponding to an event may comprise, and/or be based on, values measured when the user corresponding to the event starts having the experience corresponding to the event, throughout the period during which the user has the experience, and possibly sometime after having the experience. In another example, the measurement may be based on values measured before the user starts having the experience (e.g., in order to measure effects of anticipation and/or in order to establish a baseline value based on the measurement taken before the start). Various aspects concerning how a measurement of affective response corresponding to an event is computed are described in more detail at least in Section 2—Measurements of Affective Response.

In some embodiments, measurements of affective response corresponding to an event, which are taken at different times and/or are based on values measured by sensors over different time frames, may be used to capture different aspects of the event. For example, when considering an event involving eating a meal, the event may have various corresponding measurements capturing different aspects of the experience of having the meal. A measurement of affective response based on values acquired while the meal is being brought to the table and before a user starts eating may capture affective response to how the food looks, how it smells, and/or the size of the portion. A measurement of affective response based on values acquired while the user is eating may be associated with how the food tastes, its texture, etc. And a measurement of affective response based on values acquired after the user is done eating may express how the meal influences the body of the user (e.g., how it is digested, whether it causes the user to be lethargic or energetic, etc.)

Events may belong to one or more sets of events. Considering events in the context of sets of events may be done for one or more various purposes, in embodiments described herein. For example, in some embodiments, events may be considered in the context of a set of events in order to compute an experience score based on measurements corresponding to the events in the set. Optionally, events belonging to a set of events may be related in some way, such as the events in the set of events all take place during a certain period of time or under similar conditions. Additionally, it is possible in some embodiments, for the same event to belong to multiple sets of events, while in other embodiments each event may belong to at most a single set of events.

In one embodiment, a set of events may include events corresponding to the same certain experience (i.e., instances where users had the certain experience). Measurements of affective response corresponding to the set of events comprise measurements of affective response of the users corresponding to the events to having the certain experience, which were taken during periods corresponding to the events (e.g., during the instantiation periods of the events or shortly after them).

In another embodiment, a set of events may be defined by the fact that the measurements corresponding to the set of events are used to compute an experience score. In one example, a set of events may include events involving users who ate a meal in a certain restaurant during a certain day. From measurements of the users corresponding to the events, a score may be derived, which represents the quality of meals served at the restaurant that day. In another example, a set of events may involve users who visited a location, such as a certain hotel, during a certain month, and a score generated from measurements of the affective response corresponding to the set of events may represent the quality of the experience of staying at the hotel during the certain month.

In yet another embodiment, a set of events may include an arbitrary collection of events that are grouped together for a purpose of a certain computation and/or analysis.

There are various ways in which events corresponding to an experience may be assigned to sets of events. In one example, all the events corresponding to an experience are assigned to a single set of events. In another example, events may be assigned to multiple sets of events based on various criteria, such as based on the time the events occurred (e.g., in the example above involving a stay at a hotel, each month may have its own set of events). Optionally, when a set of events includes events happening during a specific period of time, the period is not necessarily a single contiguous period. For example, one set of events may include events of a certain experience that happen on weekends while another set of events may include events of the experience that happen on weekdays.

In embodiments described herein, V often denotes the set of all events (e.g., all events that may be evaluated by a system). In some embodiments, the events in V may be assigned to various sets of events $V_i$, $1 \le i \le k$. Optionally, each event in V belongs to at least one set of events, such that $V = U_{i=1}^k V_i$. Optionally, each set of events $V_i$ includes events sharing one or more similar characteristics, such as events corresponding to the same experience that was experienced during a certain period of time. In some embodiments, each set of events $V_i$ contains distinct events, such that each event belongs to at most one set of events, while in other embodiments, the sets of events do not necessarily contain distinct events, such that there may be an event belonging to sets of events $V_i$ and $V_j$, where $i \ne j$. Additionally, it is possible in some embodiments for a measurement of affective response to correspond to multiple events (e.g., events belonging to different sets of events). For example, a measurement of affective response taken while a user is jogging in a park may correspond to a first set of events corresponding to an experience of being in the park, and it may also correspond to a second set of events corresponding to an experience of jogging.

In some embodiments, a user may provide multiple measurements of affective response that correspond to events in the same set of events; that is, $V_i$, for some $1 \le i \le k$, may include two tuples $\tau_1 = (u, e, m_1)$ and $\tau_2 = (u, e, m_2)$, for which $m_1$ may or may not equal $m_2$. Multiple measurements of the same user that correspond to the same set of events may occur for various reasons. In one embodiment, multiple measurements may be taken of a user corresponding to the same event. For example, a measurement of a user is taken every minute while the event lasts one hour. In another embodiment, there may be multiple events corresponding to the same user in the same set of events. For example, the set of events may include events in which users visit an establishment during a certain week, and in that week, a certain user visited the establishment multiple times, and each time one or more measurements of the user were taken.

Having users provide different numbers of measurements that correspond to events in a certain set of events may bias a score that is based on the corresponding set of events (i.e., the measurements corresponding to events belonging to the set). In particular, the score may be skewed towards users who provided a larger number of measurements, and reflect values of their measurements in a possibly disproportionate way. Such cases in which a certain user provides multiple measurements that correspond to multiple events in the same set of events may be handled in various ways. In one example, the same weight is assigned to each of the multiple measurements, which may amount to ignoring the possible effects of using multiple measurements of the same user. In another example, each measurement of the multiple measurements of a user are weighted such that the sum of the weights of the multiple measurements of each user reaches a certain fixed weight; this enables each user who provided measurements corresponding to a set of events to make an equal contribution to a score computed based on the measurements corresponding to the set of events. In yet another example, multiple measurements of the certain user may be replaced by a single representative measurement, such as a measurement that has a value that is the average of the multiple measurements (which effectively reduces the multiple measurements to a single measurement).

In some embodiments, a set of events $V_i$, $1 \le i \le k$, may include no events corresponding to certain users. This is often the case when the measurements of affective response are taken over a long period, each with respect to one or more of multiple experiences. In such cases, it is not likely that every user has every experience corresponding to each set of events $V_i$ during a period of time corresponding to the set of events, or that every user will even have each of the experiences at all. For example, if V includes events involving eating meals at restaurants, and each set of events corresponds to meals eaten at a certain restaurant on a certain day, then it is not likely that a single user ate at all the restaurants on a particular day. Therefore, it is not likely to have a user who corresponds to each and every one of the sets of events. Furthermore, there may be one or more restaurants that the user never ate at, so that user will not correspond to any sets of events that involve an experience of eating at the one or more restaurants.

In some embodiments, a set of events $V_i$, $1 \le i \le k$, may include events corresponding to a single user (i.e., all events in the set involve the same user). However, in cases where the set of events is used to compute a crowd-based score, the number of users corresponding to events in the set of events is typically at least three, and often at least a larger number such as 5, 10, 25, 100, 1000, or more than 1000.

5—Identifying Events

In some embodiments, an event annotator is used to identify an event, such as determining who the user corresponding to the event is, what experience the user had, and/or certain details regarding the instantiation of the event. Optionally, the event annotator generates a description of the event.

Identifying events may involve utilizing information of one or more of various types of information and/or from one or more of various sources of information, as described below. This information may be used to provide context that can help identify at least one of the following: the user corresponding to the event, the experience corresponding to the event, and/or other properties corresponding to the event (e.g., characteristics of the instantiation of the experience involved in the event and/or situations of the user that are relevant to the event). Optionally, at least some of the information is collected by a software agent that monitors a user on behalf of whom it operates (as described in detail elsewhere in this disclosure). Optionally, at least some of the information is collected by a software agent that operates on behalf of an entity that is not the user corresponding to the event, such as software agents of other users that share the experience corresponding to the event with the user, are in the vicinity of the user corresponding to the event when the user has the experience corresponding to the event, and/or are in communication with the user corresponding to the event. Optionally, at least some of the information is collected by providers of experiences. Optionally, at least some of the information is collected by third parties that monitor the user corresponding to the event and/or the environment corresponding to the event. Following are some examples of types of information and/or information sources that may be used; other sources may be utilized in some embodiments in addition to, or instead of, the examples given below.

Location Information.

Data about a location a user is in and/or data about the change in location of the user (such as velocity of the user and/or acceleration of the user) may be used in some embodiments to determine what experience the user is having. Optionally, the information may be obtained from a device of the user (e.g., the location may be determined by GPS). Optionally, the information may be obtained from a vehicle the user is in (e.g., from a computer related to an autonomous vehicle the user is in). Optionally, the information may be obtained from monitoring the user; for example, via cameras such as CCTV and/or devices of the user (e.g., detecting signals emitted by a device of the user such as Wi-Fi, Bluetooth, and/or cellular signals). In some embodiments, a location of a user may refer to a place in a virtual world, in which case information about the location may be obtained from a computer that hosts the virtual world and/or may be obtained from a user interface that presents information from the virtual world to the user.

Images and Other Sensor Information.

Images taken from a device of a user, such as a smartphone or a wearable device such as a smart watch or a head-mounted augmented or virtual reality glasses may be analyzed to determine various aspects of an event. For example, the images may be used to determine what experience the user is having (e.g., exercising, eating a certain food, watching certain content). Additionally or alternatively, images may be used to determine where a user is, and a situation of the user, such as whether the user is alone and/or with company. Optionally, detecting who the user is with may also be done utilizing transmissions of devices of the people the user is with (e.g., Wi-Fi or Bluetooth signals their devices transmit). Other sensors such as microphones, accelerometers, thermometers, pressure sensors, and/or barometers may be used to identify aspects of users' experiences, such as what they are doing (e.g., by analyzing movement patterns) and/or under what conditions (e.g., by analyzing ambient noise, temperature, and/or pressure).

Time.

Temporal information may be used to determine what experience a user is having. The temporal information may be expressed in various ways, such as an absolute time (e.g., 8:22 PM on Jan. 10, 2015), a relative time (e.g., 25 minutes after getting up), or a time period in a recurring unit of time (e.g., Sunday, the last week of school, or breakfast time). Optionally, knowing the time period may assist in determining what certain experiences are possible and/or change beliefs about what experience the user had (e.g., by changing prior probabilities for certain experiences based on the time the user potentially had the experiences).

Motion Patterns.

The growing number of sensors (e.g., accelerometers, sensor pressures, or gyroscopes) embedded in devices that are worn, carried, and/or implanted in users may provide information that can help identify experiences the users are having (e.g., what activity a user is doing at the time). Optionally, this data may be expressed as time series data in which characteristic patterns for certain experiences may be sought. Optionally, the patterns are indicative of certain repetitive motion (e.g., motion patterns characteristic of running, biking, typing, eating, or drinking). Various approaches for inferring an experience from motion data are known in the art. For example, US patent application US20140278219 titled "System and Method for Monitoring Movements of a User", describes how motion patterns may be used to determine an activity the user is engaged in.

Measurements of Affective Response.

In some embodiments, measurements of affective response of a user may provide information about what experience the user is having. In one example, the measurements may indicate an emotional state of the user (e.g., a mood the user is in), which may help identify what experience the user had (e.g., the user may be more likely to have certain experiences when in a certain mood, and/or certain experiences are likely to cause the user to be in a certain mood). In another example, the measurements of affective response may be used to determine a change in the physiological state of the user (e.g., a change in heart rate and respiration). These changes may be correlated with certain experiences the user might have had. In another example, the measurements of affective response may provide a time series of values, which may include certain patterns that can be compared with previously recorded patterns corresponding to known experiences.

Measurements of the Environment.

Information that is indicative of the environment a user is in may also provide information about an experience the user is having. Optionally, at least some of the measurements of the environment are performed using a device of the user that contains one or more sensors that are used to measure or record the environment. Optionally, at least some of the measurements of the environment are received from sensors that do not belong to devices of the user (e.g., CCTV cameras, or air quality monitors). In one example, measurements of the environment may include taking sound bites from the environment (e.g., to determine whether the user is in a club, restaurant, or in a mall). In another example, images of the environment may be analyzed using various image analysis techniques such as object recognition, movement recognition, and/or facial recognition to determine where the user is, what the user is doing, and/or who the user is with. In yet another example, various measurements of the environment such as temperature, pressure, humidity, and/or particle counts for various types of chemicals or compounds (e.g. pollutants and/or allergens) may be used to determine where the user is, what the user is doing, and/or what the user is exposed to.

Objects/Devices with the User.

Information about objects and/or devices in the vicinity of a user may be used to determine what experience a user is having. Knowing what objects and/or devices are in the vicinity of a user may provide context relevant to identifying the experience. For example, if a user packs fishing gear in the car, it means that the user will likely be going fishing while if the user puts a mountain bike on the car, it is likely the user is going biking. Information about the objects and/or devices in the vicinity of a user may come from various sources. In one example, at least some of this information is provided actively by objects and/or devices that transmit information identifying their presence. For example, the objects or devices may transmit information via Wi-Fi or Bluetooth signals. Optionally, some of the objects and/or devices may be connected via the Internet (e.g., as part of the Internet of Things). In another example, at least some of this information is received by transmitting signals to the environment and detecting response signals (e.g., signals from RFID tags embedded in the objects and/or devices). In yet another example, at least some of the information is provided by a software agent that monitors the belongings of a user. In still another example, at least some of the information is provided by analyzing the environment in which a user is in (e.g., image analysis and/or sound analysis). Optionally, image analysis may be used to gain specific characteristics of an experience. For example, a system of Noronha et al. described in "Platemate: crowdsourcing nutritional analysis from food photographs" in Proceedings of the 24th annual ACM symposium on User interface software and technology (2011), enables a user to identify and receive nutritional information involving food the user is about to eat based on images of the food.

Communications of the User.

Information derived from communications of a user (e.g., email, text messages, voice conversations, and/or video conversations) may be used, in some embodiments, to provide context and/or to identify experiences the user has and/or other aspects of events. These communications may be analyzed, e.g., using semantic analysis in order to determine various aspects corresponding to events, such as what experience a user has, a situation of a user (e.g., the user's mood and/or state of mind). In one embodiment, certain patterns of communications that are identified may correspond to certain experiences. Optionally, the patterns may involve properties such as the device or medium used to communicate, the recipient of communications, and/or the extent of the communications (e.g., duration, frequency, and/or amount of information communicated).

User Calendar/Schedule.

A user's calendar that lists activities the user had in the past and/or will have in the future may provide context and/or to identify experiences the user has. Optionally, the calendar includes information such as a period, location, and/or other contextual information for at least some of the experiences the user had or will have. Optionally, at least some of the entries in the calendar are entered by the user. Optionally, at least some of the entries in the calendar are entered automatically by a software agent, possibly without prompting by the user or even knowledge of the user. Optionally, analysis of a calendar may be used to determine prior probabilities for having certain experiences at certain times and/or places.

Account Information.

Information in various accounts maintained by a user (e.g., digital wallets, bank accounts, or social media accounts) may be used to provide context, identify events, and/or certain aspects of the events. Information on those accounts may be used to determine various aspects of events such as what experiences the user has (possibly also determining when, where, and with whom), situations the user is in at the time (e.g., determining that the user is in a new relationship and/or after a breakup). For example, transactions in a digital wallet may provide information of venues visited by a user, products purchased, and/or content consumed by the user. Optionally, the accounts involve financial transactions such as a digital wallet or a bank account. Optionally, the accounts involve content provided to the user (e.g., an account with a video streaming service and/or an online game provider). In some embodiments, an account may include medical records including genetic records of a user (e.g., a genetic profile that includes genotypic and/or phenotypic information). Optionally, the genetic information may be used to determine certain situations the user is in which may correspond to certain genetic dispositions (e.g., likes or dislikes of substances, a tendency to be hyperactive, or a predisposition for certain diseases).

Robotic Serve's.

In some embodiments, a robotic helper may provide information about experiences a user it is interacting with has. For example, a smart refrigerator may provide information about what food a user consumed. A masseuse robot may provide information of periods when it operated to give a massage and identify whose user settings were used. In another example, an entertainment center may provide information regarding what content it provided the user and at what time (e.g., the name and time certain songs were streamed in a user's home audio system).

Experience Providers.

An experience provider may provide information about an experience a user is having, such as the type of experience and/or other related information (e.g., specific details of attributes of events and/or attributes that are relevant). For example, a game console and/or system hosting a virtual world may provide information related to actions of the user and/or other things that happen to the user in the game and/or the virtual world (e.g., the information may relate to virtual objects the user is interacting with, the identity of other characters, and the occurrence of certain events such as losing a life or levelling up). In another example, a system monitoring and/or managing the environment in a "smart house" house may provide information regarding the environment the user is in.

There are various approaches known in the art for identifying, indexing, and/or searching events of one or more users, which may be utilized in embodiments described herein (e.g., to create event annotators described below). In one example, identifying events may be done according to the teachings described in U.S. Pat. No. 9,087,058 titled "Method and apparatus for enabling a searchable history of real-world user experiences", which describes a searchable history of real-world user experiences of a user utilizing data captured by a mobile computing device. In another example, identifying events may be done according to the teachings described in U.S. Pat. No. 8,762,102 titled "Methods and systems for generation and rendering interactive events having combined activity and location information", which described identification of events based on sensor data of mobile devices.

To determine what events users have, and in particular what are the experiences corresponding to events, some embodiments may involve one or more event annotators to perform this task. In one embodiment, an event annotator receives information of one or more of the types or sources described above; for example, these may include information about the location, time, movement patterns, measurements of affective response of a user, measurements of the environment, objects in the vicinity of a user, communications of a user, calendar entries of a user, account information of a user, and/or information obtained from a software agent or robotic server. Optionally, the information is analyzed and used to generate a sample comprising a vector of feature values that may describe an event. Optionally, the feature values describe characteristics of the user corresponding to the event and/or identify the user corresponding to the event. Optionally, the feature values describe characteristics of the experience corresponding to the event (e.g., describe characteristics determined from the information received by the event annotator), but do not explicitly identify the experience corresponding to the event. Optionally, the sample describes details of the event concerning aspects of the instantiation of the experience corresponding to the event, such as the location, duration, and/or other conditions in which the user corresponding to the event was in while having the experience corresponding to the event.

Given an unlabeled sample, the event annotator may assign the unlabeled sample one or more corresponding labels, each label identifying an experience the user had. Optionally, the event annotator may provide values corresponding to the confidence and/or probability that the user had the experiences identified by at least some of the one or more labels.

In one embodiment, the one or more labels assigned by the event annotator are selected from a subset of a larger set of possible labels. Thus, the event annotator only considers a subset of the experiences for a certain sample. Optionally, the subset is selected based on some of the information received by the event annotator. In one example, a location described in the sample may be used to determine a subset of likely experiences for that location. Similarly, the time of day or day of week, may be used to determine a certain subset of likely experiences. In another example, a situation of the user corresponding to a sample (e.g., alone vs. with company, in a good mood vs. bad mood) may also be used to select a subset of the experiences that are most relevant. In yet another example, the objects and/or devices with the user may be used to select the subset. In still another example, external information such as billing information or a user's calendar may be used to select the subset (e.g., the information may indicate that the user had a certain experience on a given day, but not the exact time).

In some embodiments, generating a vector of feature values involves analyzing some of the information received by the event annotator using various predictors (e.g., classifiers). Optionally, the results of the analysis may be used as feature values in the vector of feature values. Optionally, the use of multiple predictors to generate feature values may simplify the event annotator's task (e.g., by reducing the feature space and/or generating more meaningful features), and in addition it may enable the use of various ensemble based methods known in the art. In one example, time series data comprising measurements of affective response of a user is classified in order to determine a corresponding activity level profile (e.g., rest, moderate activity, or intense activity) or a mental activity profile (e.g., concentrating, relaxing, or sleeping). In another example, a measurement of affective response corresponding to an event is provided to an ESE in order to determine the emotional state of the user corresponding to the event, and the emotional state is represented as a feature value.

In some embodiments, certain feature values may represent a prediction with respect to a certain experience. For example, a feature value may include a predicted value indicating how well the set of objects with the user corresponding to the sample fits a certain experience. Optionally, the prediction may be based on combinations of objects observed in events from historical data. In another example, a feature value may represent how well a certain location and/or time of day may fit a certain experience. Optionally, such values may be determined based on historical data. For example, the historical data may be used to compute various probabilities of having experiences given the set of objects, time of day and/or location by using Bayes rule.

In some embodiments, certain feature values may represent a difference between a measurement value corresponding to the sample and a predicted measurement value for a certain experience. Optionally, the predicted measurement value is determined based on previous measurements of the user to the certain experience and/or to experiences of the same type (e.g., exercising or viewing content). Optionally, the predicted measurement value is determined based on measurements of users to the certain experience and/or to experiences of the same type (e.g., exercising or viewing content). Optionally, the predicted measurement value is obtained from an ESE.

To train one or more models used by a predictor utilized by an event annotator, in some embodiments, a training module utilizes training data comprising a collection of labeled samples as input to a machine learning-based model training algorithm. Optionally, the collection of labeled samples comprises samples with vectors of feature values describing events and each label corresponding to a sample represents an experience corresponding to the event described by the sample. Optionally, the event annotator selects as a label the experience whose corresponding predictor gave the highest value. In some embodiments, various types of machine learning-based predictors may be utilized by an event annotator. In one example, the predictor may be a multi-class classification algorithm (e.g., a neural network, a maximum entropy model, or a naive Bayes classifier) that assigns a sample with one or more labels corresponding to experiences. In another example, the event annotator may use multiple predictors, each configured to generate a value representing the probability that a sample corresponds to a certain experience. Optionally, the machine learning approaches that may be used to train the one or more models may be parametric approaches (e.g., maximum entropy models) or nonparametric (e.g., Multivariate kernel density estimation or histograms).

In some embodiments, an event annotator is trained with data comprising samples involving multiple users. Optionally, each sample includes feature values describing characteristics of the user corresponding to the sample. By having samples of multiple users, it is possible to leverage the wisdom of the crowd and use the event annotator to annotate events for users who never had the experiences corresponding to the events.

In other embodiments, an event annotator is trained with data comprising samples that primarily involve a certain user, and such may be considered a personalized event annotator for the certain user. Optionally, by primarily it is meant that most of the training weight of samples in the training data is attributed to samples corresponding to the certain user (i.e., they correspond to events involving the certain user). Optionally, by primarily it is meant that in the training data, the samples of no other user have a higher training weight than the training weight of the samples of the certain user. Herein training weight of samples refers to the degree at which the samples influence the values of parameters in the model being trained on the samples. If all samples in the training data have the same weight, then the training weight of a set of samples may be considered equivalent to a proportion that equals the number of samples in the set divided by the total number of samples.

To identify what experiences a user has, in some embodiments, an event annotator may utilize personalized event annotators of other users. Thus, the event annotator may identify a certain experience that the certain user had, even if the event annotator was not trained on data comprising samples corresponding to the certain user and the certain experience, and/or even if the certain user never even had the certain experience before.

In one embodiment, an event annotator combines predictions of multiple personalized event annotators. Optionally, each personalized event annotator makes a vote for an experience corresponding to a sample, and the event annotator assigns the sample to the experience with the largest number of votes. Optionally, the results of the multiple personalized event annotators are combined using an ensemble learning method such as boosting.

In one embodiment, a personalized predictor is trained to predict a certain set of experiences. Optionally, one or more candidate labels for sample correspond to experiences for which the personalized predictor is trained. In such a case, the personalized event annotator may utilize prediction of other event annotators (e.g., personalized event annotators of other users) in order to make a prediction regarding what experience the user had.

In one embodiment, an event annotator generates a value corresponding to a confidence in a predicted label. Optionally, if the confidence does not reach a certain level, personalized event annotator refrains from using the label and/or prompts the user for confirmation regarding what experience the user had. In another embodiment, the event annotator may ask the user for confirmation of a certain predicted label if the number of labeled samples the event annotator was trained on, which correspond to the certain label, is below a certain threshold. In one example, confirmation of a label may involve the event annotator asking whether the user had the experience corresponding to the certain label. In another example, the event annotator may ask the user to describe what experience the user had. Optionally, asking the user may be done via a sound effect, visual cue, and/or verbal question. Optionally, a software agent operating on behalf of the user determines when and/or if it is appropriate to ask the user. For example, there may be certain situations which may be inappropriate (e.g., when the user is with company) and/or a maximal number of times a day the user may be interrupted. In another example, the software agent asks the user if the user is in a certain emotional state (e.g., not agitated).

In some embodiments, an event annotator is used to annotate several events. Optionally, the event annotator evaluates a stretch of time and is used to determine which events likely occurred during the stretch of time, and also may determine corresponding periods during the stretch of time. Optionally, the stretch of time is partitioned into periods, with each period represented by one or more samples, as described above. Optionally, the periods have a similar length (e.g., one second, ten seconds, one minute, five minutes, fifteen minutes, one hour, four hours, one day, or one week). Optionally, the event annotator assigns one or more labels as described above to each period.

By taking into account multiple experiences, the event annotator may consider multiple event annotations simultaneously; thus, the event annotator may utilize global constraints and/or a global modeling approach which may be used to obtain more accurate results. Below are some examples of embodiments in which multiple instantiations of experiences may be identified by an event annotator.

In one embodiment, identifying events is done utilizing constraint optimization algorithms. Optionally, the constraints may relate to various aspects of the event. For example, each experience may be associated with certain locations, times, situations of the user corresponding to the event, a collection of objects that is required or disallowed, and one or more values of expected affective response. Optionally, additional constraints may be added from external sources such as a digital wallet, analysis of communications, etc. For example, a transaction recorded by a digital wallet may indicate that a user paid for lunch at 12:30 PM. Though the exact time the user ate may not be known exactly, this may put a useful constraint on the time of the experience involving eating lunch (e.g., between 12:30 PM and 1:30 PM). Optionally, the constraints may involve certain minimal and/or maximal instantiations of certain experiences (e.g., a certain user will have between 2 and 4 meals in a day). Optionally, the constraints may involve a certain ordering of experiences (e.g., getting dressed before going out to work). Optionally, the constraints may involve dependencies between experiences, such that some experiences may be mutually exclusive (e.g., a user will only eat lunch at one restaurant during the day).

In another embodiment, identifying events is done utilizing scoring functions that score a set of event annotations. Optionally, the set of event annotations corresponds to a set of events in a certain period of time (e.g., annotations of a certain hour, day or week). Optionally, the scoring is done utilizing a predictor trained on samples comprising descriptions of previous sets of experience annotations. For example, the predictor may be a single class classifier, a maximum likelihood model, or a classifier trained on examples comprising a set of correct annotations and a set of incorrect annotations. Optionally, samples describing a set of annotations may include features corresponding to statistics derived from the event identifications. For example, the statistics may include features describing the number of different events, the number of different events corresponding to a certain type of experience, and/or indicators of various constraints regarding experiences, as described above. Optionally, various search space methods may be utilized to find an optimal (or locally optimal) assignment of events, such as simulated annealing, genetic algorithms, and/or analytical optimization methods.

In yet another embodiment, identifying experiences by an event annotator is done utilizing Hidden Markov Models (HMMs). Optionally, a stretch of time that is annotated is portioned into periods as described above. Following the structure of HMMs various elements of HMMs corresponding to the domain of event annotation are as follows: the hidden states of the model correspond to experiences the user may have during the period. The state transitions are the probabilities of switching between experiences. Optionally, these probabilities may depend on the duration of the experience and/or on how many times the experience has already been annotated. Optionally, additional constraints may be added to the probability function used to compute transitions probabilities (e.g., indicators whether certain experiences have already been annotated). The observations that may be made for each period can be represented by the feature vectors described above.

The probability functions used for transition functions and/or for determining probabilities of the observations given the states may be learned from data of a certain user, or data from multiple users. In the latter case, this may enable leverage of crowd data to make annotations of experiences for users, even if the users did not previously have those experiences.

In one embodiment, the HMMs may include outputs. Optionally, the outputs are values corresponding to measurements of affective response corresponding to an experience. For example, the outputs for each period may be derived from measurements of affective response taken during the period. Optionally, the probability of observing a certain output given a certain state (experience) may be derived from a model describing the probability of a user having a certain measurement of affective response given that the user was having the experience corresponding to the state at the time. Optionally, the probability function is learned from previous measurements of affective response of a certain user to the experience corresponding to the state. Optionally, the probability function is learned from measurements of affective response of other users to the experience corresponding to the state. Optionally, the probability function is implemented using a predictor such as a maximal entropy model.

Various approaches are known in the art for finding (locally) optimal solutions for HMMs. Optionally, in some embodiments, annotating experiences may be done using maximum-likelihood based approaches such as the Baum-Welch algorithm or the Baldi-Chauvin algorithm.

In some embodiments, an event annotator may annotate events for multiple users simultaneously. Optionally, this may enable certain constraints that involve multiple users. For example, there may be at most one user in a doctor's office at a time or a maximal number of users in room at the same time. In another example, certain users may be known to have certain experiences together (e.g., study partners or running buddies), while others will be known not to have experiences together.

6—Experience Scores

In various embodiments, a representative value computed based on a plurality of measurements of affective response of one or more users who have a certain experience is considered an experience score (for the certain experience). Optionally, the experience score represents a quality of the certain experience as determined based on the plurality of measurements. Optionally, an experience score is computed based on measurements of affective response corresponding to a certain set of events. Herein an experience score may be referred to as a "score for an experience" or simply "score".

In one embodiment, an experience score computed based on measurements of affective response is a statistic of the measurements. For example, the score may be the average, mean, and/or mode of the measurements. In other examples, the score may take the form of other statistics, such as the value of a certain percentile when the measurements are ordered according to their values.

In another embodiment, an experience score computed from measurements of affective response is computed utilizing a function that receives an input comprising the measurements of affective response, and returns a value that depends, at least to some extent, on the value of the measurements. Optionally, the function according to which the score is computed may be non-trivial in the sense that it does not return the same value for all inputs. Thus, it may be assumed that a score computed based on measurements of affective response utilizes at least one function for which there exist two different sets of inputs comprising measurements of affective response, such that the function produces different outputs for each set of inputs. Depending on the characteristics of the embodiments, various functions may be utilized to compute scores from measurements of affective response; the functions may range from simple statistical functions, as mentioned above, to various arbitrary arithmetic functions (e.g., geometric or harmonic means), and possibly complex functions that involve statistical tests such as likelihood ratio test, computations of p-values, and/or other forms of statistical significance.

In yet another embodiment, a function used to compute an experience score based on measurements of affective response involves utilizing a machine learning-based predictor that receives as input measurements of affective response and returns a result that may be interpreted as a score. The objective (target value) computed by the predictor may take various forms, possibly extending beyond values that may be interpreted as directly stemming from emotional responses, such as a degree the experience may be considered "successful" or "profitable". For example, with an experience that involves watching a movie or a concert, the score computed from the measurements may be indicative of how much income can be expected from the experience (e.g., box office returns for a movie or concert) or how long the experience will run (e.g., how many shows are expected before attendance dwindles below a certain level).

In one embodiment, an experience score computed based on measurements of affective response is obtained by providing the measurements as input to a computer program that may utilize the measurements and possibly other information in order to generate an output that may be utilized, possibly after further processing, in order to generate the score. Optionally, the other information may include information related to the users from whom the measurements were taken and/or related to the events to which the measurements correspond. Optionally, the computer program may be run as an external service, which is not part of the system that utilizes the score. Thus, the system may utilize the score without possessing the actual logic and/or all the input values used to generate the score. For example, the score may be generated by an external "expert" service that has proprietary information about the users and/or the events, which enables it to generate a value that is more informative about the affective response to an experience to which the measurements correspond.

When an experience score is computed for a complex experience that includes multiple "smaller experiences", there may be different ways to compute the experience score.

In one embodiment, the experience score is computed based on measurements of affective response corresponding to events that involve having the complex experience. For example, a measurement of affective response corresponding to an event involving a user having the complex experience may be derived from multiple measurements of the user taken during at least some of the smaller experiences comprised in the complex experience. Thus, the measurement represents the affective response of the user to the complex experience.

In another embodiment, the score for the complex experience is computed by aggregating experience scores computed for the smaller experiences. For example, for each experience comprised in the complex experience, a separate score is computed based on measurements of users who had the complex experience, which were taken during and/or shortly after the smaller experience (i.e., they correspond to events involving the smaller experience).

The score for the complex experience may be a function of the experience scores of the smaller experiences such as a weighted average of those scores. Optionally, various weighting schemes may be used to weight the experience scores of the smaller experiences. In one embodiment, the experience scores of the smaller experiences may be weighted proportionally to their average duration and/or the average dominance factors associated with events involving each smaller experience. In another embodiment, experience scores of smaller experiences may have preset weights. For example, the score for a complex experience that involves going on a vacation may be computed by weighting experience scores of smaller experiences comprised in the complex experience as follows: a weight of 20% for the score given to the flights to and from the destination, a weight of 30% is given to the stay at the hotel, a weight of 20% to the score given to being at the beach, and a weight of 30% given to the score given to going out (restaurants, clubs, etc.) It is to be noted that in this example, each smaller experience may in itself be a complex experience that is based on multiple experiences that are even smaller.

In some embodiments, the score for a complex experience is computed utilizing a predictor. Optionally, a model utilized by the predictor is trained on samples comprising descriptions of the smaller experiences comprised in the complex experience and/or scores of the smaller experiences and labels that include a score for a complex experience that comprises the smaller experiences. In one example, the score for the complex experience may be determined by an expert (e.g., a human annotator or a software agent). In another example, the score for the complex experience may be determined based on statistics describing the complex experience (e.g., average duration users spend on a vacation and/or the average amount of money they spend when going out to a certain town).

Experience scores computed based on measurements of affective response may represent different types of values. The type of value a score represents may depend on various factors such as the type of measurements of affective response used to compute the score, the type of experience corresponding to the score, the application for which the score is used, and/or the user interface on which the score is to be presented.

In one embodiment, an experience score computed from measurements of affective response may be expressed in the same units as the measurements. In particular, an experience score may be expressed as any type of affective value that is described herein. In one example, the measurements may represent a level of happiness, and the score too may represent a level of happiness, such as the average of the measurements. In another example, if the measurements may represent sizes or extents of smiles of users, the score too may represent a size of a smile, such as the median size of smile represented by the measurements. In still another example, if the measurements represent a physiological value, such as heart rates (or changes to heart rates), the score too may be expressed in the same terms (e.g., it may be the average change in the users' heart rates).

In another embodiment, an experience score may be expressed in units that are different from the units in which the measurements of affective response used to compute it are expressed. Optionally, the different units may represent values that do not directly convey an affective response (e.g., a value indicating qualities such as utility, profit, and/or a probability). Optionally, the score may represent a numerical value corresponding to a quality of an experience (e.g., a value on a scale of 1 to 10, or a rating of 1 to 5 stars). Optionally, the score may represent a numerical value representing a significance of a hypothesis about the experience (e.g., a p-value of a hypothesis that the measurements of users who had the experience indicate that they enjoyed the experience). Optionally, the score may represent a numerical value representing a probability of the experience belonging to a certain category (e.g., a value indicating whether the experience belongs to the class "popular experiences"). Optionally, the score may represent a similarity level between the experience and another experience (e.g., the similarity of the experience to a certain "blockbuster" experience). Optionally, the score may represent certain performance indicator such as projected sales (e.g., for product, movie, restaurant, etc.) or projected virality (e.g., representing the likelihood that a user will share the fact of having the experience with friends).

In still another embodiment, an experience score may represent a probability related to an experience. In one example, a score derived from measurements of affective response comprising EEG measurements of a group of users eating at a restaurant may be expressed as a probability that the users in the group will return to the restaurant within a week. In another example, a score corresponding to an experience may be generated from measurements of users taken while they have the experience, and represent a probability that the users will finish having the experience (and not stop in the middle).

In yet another embodiment, an experience score may represent a typical or average extent of an emotional response of the users who contributed the measurements used to compute the score to having the experience corresponding to the score. Optionally, the emotional response corresponds to an increase or decrease in the level of at least one of the following: pain, anxiety, annoyance, stress, aggression, aggravation, fear, sadness, drowsiness, apathy, anger, happiness, content, calmness, attentiveness, affection, and excitement.

Experience scores may also be expressed in various ways in the different embodiments. Optionally, expressing a score involves presenting it to a user via a user interface (e.g., a display). The way a score is expressed may depend on various factors such as the type of value the score represents, the type of experience corresponding to the score, the application for which the score is used, and/or the user interface on which the score is to be presented.

In one embodiment, an experience score is expressed by presenting its value in essentially the same form it is received. For example, the score may include a numerical value, and the score is expressed by providing a number representing the numerical value. In another example, a score includes a categorical value (e.g., a type of emotion), and the score is expressed by conveying the emotion to the user (e.g., by presenting the name of the emotion to the user).

In another embodiment, an experience score may be expressed as text, and it may indicate a property related to the experience such as a quality, quantity, and/or rating of the experience. In one example, a score may be expressed through one or more words, one or more sentences, and even one or more paragraphs expressing a rating and/or attitude. In another example, the text representing the score may be extracted from external sources (e.g., a database of review phrases and/or highlights from an online review from an Internet site). In yet another example, the text is generated using semantic analysis of reactions of one or more users who contributed measurements used to compute the score. Optionally, the text is generated by a software program utilizing artificial intelligence (e.g., generated by a software agent). Optionally, the text is conveyed via speech (e.g., software generated speech) or via computer generated 2D or 3D video (e.g., a software generated avatar), which may display a reaction indicating the typical affective response to the experience corresponding to the score.

In still another embodiment, an experience score may be expressed using an image, sound effect, music, animation effect, and/or video. For example, a score may be conveyed by various icons (e.g., "thumbs up" vs. "thumbs down"), animations (e.g., "rocket lifting off" vs. a "crash and burn"), and/or sound effects (e.g., cheering vs. booing).

In some embodiments, an experience score may be presented by overlaying it (e.g., an image representing the score) on a map or image in which multiple experiences are presented. For example, the map may describe multiple locations in the physical world and/or a virtual environment, and the scores are presented as an overlaid layer of icons (e.g., star ratings) representing the score of each location and/or for different experiences that a user may have at each of the locations.

In some embodiments, a measurement of affective response of a user that is used to compute an experience score may be considered "contributed" by the user to the computation of the score. Similarly, in some embodiments, a user whose measurement of affective response is used to compute an experience score may be considered as a user who contributed the measurement to the score. Optionally, contribution of a measurement to a score may be considered an action that is actively performed by the user (e.g., by prompting a measurement to be sent) and/or passively performed by the user (e.g., by a device of the user automatically sending data that may also be collected automatically). Optionally, contribution of a measurement by a user to a score may be considered an action that is done with the user's permission and/or knowledge (e.g., the measurement is taken according to a policy approved by the user), but possibly without the user being aware that it is done. For example, a measurement of affective response may be taken in a manner approved by the user, e.g., the measurement may be taken according to certain terms of use of a device and/or service that were approved by the user, and/or the measurement is taken based on a configuration or instruction of the user. Even though the user may not be consciously aware that the measurement was taken, used for the computation of a score, and/or that the score was disclosed, in some embodiments, that measurement of affective response is considered contributed by the user.

Disclosing an experience score may involve, in some embodiments, providing information about the score to a third party, such as a value of the score and/or a statistic computed from the score (e.g., an indication of whether the score reaches a certain threshold). Optionally, an experience score that is disclosed to a third party or likely to be disclosed to a third party may be referred to as a "disclosed score", a "disclosed crowd-based score", a and/or a "disclosed experience score". Optionally, disclosing a score may also be referred to herein as "forwarding" the score. Optionally, a third party may refer to any entity that does not have the actual values of the measurements of affective response used to compute the score. Thus, a user who only has knowledge of his or her measurements may be considered a third party if the user receives a score that was computed based on measurements of other users too. In some embodiments, disclosing a score entails storing the score in a database that may be accessed by a third party; thus, disclosing a score may not necessary involve providing a value of the score to a third party, rather just putting the value in a condition such that it may be potentially accessed by the third party.

In addition to providing a value corresponding to an experience score, or instead of providing the value, in some embodiments, disclosing an experience score may involve providing information related to the score and/or the computation of the score. In one example, this information may include one or more of the measurements of affective response used to compute the score, and/or statistics related to the measurements (e.g., the number of users whose measurements were used, or the mean and/or variance of the measurements). In another example, the information may include data identifying one or more of the users who contributed measurements of affective response used to compute the score and/or statistics about those users (e.g., the number of users, and/or a demographic breakdown of the users).

In some embodiments, disclosing an experience score may involve presenting it using a device that conveys information; for example, a smartphone, a wearable device, augmented reality device (e.g., glasses with augmented images), a virtual reality device. Optionally, a score may be disclosed via a device that emits sound (e.g., headphones). Optionally, an experience score may be disclosed using haptic feedback. For example, a haptic feedback glove may provide a distinct vibration indicative of a score of a choice when a user's hand is pointed or placed in a position representing the choice (e.g., the hand may be pointing to an object presented in a virtual reality).

In one embodiment, additional data disclosed in addition to, or instead of, an experience score may include a value indicating the significance of experience score. Optionally, the significance may be determined utilizing various statistical tests. Optionally, the significance may be expressed utilizing various values derived from statistical tests, such as p-values, q-values, false discovery rates (FDRs), error bars, and/or confidence intervals.

7—Ranking Experiences

In various embodiments, two or more experiences (also referred to as a "plurality of experiences" or simply "experiences") are ranked based on measurements of affective response of users who had the plurality of experiences. The results of this action are referred to as a ranking of the plurality of experiences. A ranking of experiences is an ordering of the experiences, which is indicative of preferences of the users towards the experiences and/or is indicative of the extent of emotional response of the users to the experiences. For example, the higher the rank of an experience, the more the users liked the experience. Thus, in some embodiments, it may be assumed that a first experience that is ranked higher than a second experience was preferred by the users. In another example, a first experience having a higher rank than a second experience implies that the emotional response of users who had the first experience is more positive than the emotional response of users who had the second experience.

A module that ranks experiences may be referred to as a "ranking module" and/or a "ranker". When the experiences being ranked are of a certain type, the ranker and/or ranking module may be referred to based on the type of experience being ranked (e.g., a location ranker, content ranking module, etc.) There are various ways, which may be used in embodiments described herein, to rank experiences based on measurements of affective response. In some embodiments, the ranking is performed utilizing a scoring module that computes scores for the experiences being ranked, and ranks the experiences based on the scores. In other embodiments, the measurements may be used to generate a plurality of preference rankings, each generated based on a subset of the measurements (e.g., a subset that consists of measurements of a single user); with each preference ranking including a ranking of at least some of the experiences. The plurality of preference rankings may than be used to generate a single ranking of all the experiences.

It is to be noted that in embodiments described herein, it is not required that each user have every experience being ranked. Thus, measurements of affective response that include measurements of many users, with each user providing measurements corresponding to a small number of events involving different experiences, may still be used to generate a ranking of all the experiences involved. In some embodiments, such as when the ranking is done using a scoring module, it may be possible for some, or even all, of the users to provide a single measurement of affective response.

Additionally, it is to be noted that in embodiments described herein, a ranking may include ties. A tie in a ranking occurs when multiple experiences share the same rank. Ties may happen for various reasons, such as experiences having similar or equal experience scores, when the difference between the measurements corresponding to different experiences is not significant, and/or when preference rankings do not clearly indicate that one experience, from among the different experiences, is to be ranked higher than another.

In some embodiments, measurements of affective response utilized to rank experiences may have associated weights, such that some measurements may have higher weights than other measurements. There may be various reasons for measurements to be assigned weights. For example, measurements may be assigned weights proportional to the age of the measurements, such that measurements that are relatively new receive a higher weight than measurements that are older. In another example, measurements of users may be assigned weights based on the similarity of the users to a certain user (e.g., as determined by a profile comparator). In another example, measurements may be weighted in order to have measurements corresponding to a certain user, or group of users, reach a certain weight. For example, this form of normalization may enable curbing the influence of certain users and/or groups of users who provide many measurements that are used for the ranking of the experiences.

In some embodiments, ranking experiences may be done utilizing a scoring module, such as the scoring module 150 and/or aftereffect scoring module 302. For each of the experiences, the scoring module computes a score for the experience based on measurements of users who had the experience (i.e., measurements corresponding to events involving the experience). Optionally, each score is computed based on measurements of at least a certain number of users, such as at least 3, at least 5, at least 10, at least 100, or at least 1000 users. Optionally, at least some of the measurements have corresponding weights which are utilized by the scoring module to compute the scores for the experiences.

Ranking experiences utilizing scores computed by an experience ranker may result, in some embodiments, in ties in the rankings of at least some of the experiences, such that at least a first experience and a second experience share the same rank. In one example, the first and second experiences are tied if the scores computed for the first and second experiences are the same. In another example, the first and second experiences are tied if the difference between the scores computed for the first and second experiences is below a predetermined threshold. For example, there is less than a 1% difference between the two scores. In yet another embodiment, the first and second experiences are tied if the significance of the difference between the scores is below a predetermined threshold, e.g., as determined by score-significance module that is configured to determine significance of a difference between scores for different experiences. Optionally, when the significance of the difference of two scores corresponding to two experiences is below a certain threshold (e.g., a p-value greater than 0.05), the two experiences are given the same rank.

In some embodiments, ranking experiences may be done utilizing preference rankings. A preference ranking is a list of two or more experiences in which an ordering is established between at least first and second experiences, from among the two or more experiences, such that the first experience is ranked above the second experience. Other experiences from among the two or more experiences may be tied with the first experience or the second experience, tied among themselves, and/or be ranked above or below the first and second experiences.

Preference rankings may be generated by a preference generator module, such as the preference generator module 228. The preference generator module receives a set of measurements that includes measurements of affective response to two or more experiences and generates a preference ranking based on the measurements. For example, the set may include measurements corresponding to events, with each event involving an experience from among the two or more experiences. Optionally, the measurements in the set are given in the form of affective values and/or may be converted to affective values, such as ratings on a numerical scale, from which an ordering (or partial ordering) of the two or more experiences may be established.

Depending on the embodiment, the measurements belonging to a set of measurements, from which a preference ranking is generated, may have different compositions. In one embodiment, the set of measurements includes measurements of the same user to different experiences. In another embodiment, the set of measurements includes measurements of similar users (e.g., as determined by a profile comparator that compares profiles of users). In still another embodiment, the measurements in the set include measurements corresponding to similar situations, locations, and/or periods. For example, the measurements in the set were taken when a user was in a certain situation (e.g., the user was alone and not in the company of others). In another example, the measurements in the set were all taken during a certain period (e.g., the same day or week). In still another example, the measurements in the set were taken when the user was at a certain location (e.g., at work).

It is to be noted that having the measurements in the set be measurements of the same user, similar users, and/or involve the same or similar conditions, can assist in removing noise factors that may render the preference ranking less accurate. These noise factors that relate to the users who provided the measurements and/or the conditions under which the measurements were taken, may not directly relate to the quality of the experiences being ranked. Thus, removal of such factors (by having the measurements be homogenous to some extent), may help remove some noise from the rankings, resulting in ranking that may be more accurate.

In some embodiments, measurements used by the preference generator to generate preference rankings have corresponding weights. Optionally, the weights are utilized in order to generate the preference ranking from a set of measurements by establishing an order (or partial order) between experiences such that a first experience is ranked in a preference ranking ahead of a second experience and the weighted average of the measurements in the set corresponding to the first experience is higher than the weighted average of the measurements in the set corresponding to the second experience.

Given two or more preference rankings, each involving some, but not necessarily all the experiences being ranked, the preference rankings need to be consolidated in order to generate a ranking of the experiences. In some embodiments, the two or more preference rankings are consolidated to a ranking of experiences by a preference-based rank determining module, such as the preference-based rank determining module 230. There are various approaches known in the art that may be used by the preference-based rank determining module to generate the ranking of the experiences from the two or more preference rankings. Some of these approaches may be considered Condorcet methods and/or methods that satisfy the Condorcet criterion.

Various Condorcet methods that are known in the art, which may be utilized in some embodiments, are described in Hwang et al., "Group decision making under multiple criteria: methods and applications", Vol. 281, Springer Science & Business Media, 2012. Generally speaking, when a Condorcet method is used to rank experiences based on preference rankings, it is expected to satisfy at least the Condorcet criterion. A method that satisfies the Condorcet criterion ranks a certain experience higher than each experience belonging to a set of other experiences, if, for each other experience belonging to the set of other experiences, the number of preference rankings that rank the certain experience higher than the other experience is larger than the number of preference rankings that rank the other experience higher than the certain experience.

Following are some examples of methods that satisfy the Condorcet criterion, which may be used to generate the ranking. These examples are not exhaustive, and are to be construed as non-limiting; other approaches not mentioned and/or described below may be utilized in embodiments described herein.

In one embodiment, a "ranked pairs" approach may be utilized to generate a ranking of experiences from one or more preference rankings. Optionally, utilizing a ranked pairs approach involves deriving from each preference ranking one or more pairs, with each pair indicating a first experience that is ranked above a second experience. Following that, ranked pairs algorithms generally operate along the lines of the following steps: (1) tallying, from the pairs, the vote count obtained by comparing each pair of experiences, and determining the winner of each pair of experiences (provided there is not a tie between the vote counts of the pair of experiences); (2) sorting (i.e., ranking) each pair of experiences, by the largest strength of victory first to smallest last; (3) and "locking in" each pair, starting with the one with the largest number of winning votes, and adding one in turn to a directed graph as long as they do not create a cycle (which would create an ambiguity). The completed graph shows the winner, as the experience which does not have any other experiences pointing to it. Steps 1 through 3 may be repeated multiple times (after removing each round's winner) in order to generate the ranking of the experiences.

In another embodiment, a Kemeny-Young method may be utilized to generate a ranking of experiences from one or more preference rankings. The Kemeny-Young method uses preferential rankings that are indicative of an order of preferences of at least some of the experiences being ranked. Optionally, a preference ranking may include ties, such that multiple experiences may share the same rank. A Kemeny-Young method typically uses two stages of calculations. The first stage involves creating a matrix or table that comprises counts of pairwise preferences between pairs of experiences. The second stage involves testing possible rankings of the experiences, calculating a score for each such ranking, and comparing the scores. Each ranking score equals the sum of the counts of the pairwise preferences that apply to that ranking. The ranking that has the largest score is identified as the overall ranking, which may be returned by the preference-based rank determining module. Optionally, if more than one ranking has the same largest score, all these possible rankings are tied, and typically the overall ranking involves one or more ties.

In yet another embodiment, generating a ranking of experiences from preference rankings may be done utilizing the Minimax algorithm, which is also called Simpson, Simpson-Kramer, and Simple Condorcet. In this method, an experience is chosen to be ranked ahead of other experiences when its worst pairwise defeat is better than that of all the other experiences.

Other approaches known in the art that may be utilized in some embodiments include the Schulze method, Copeland's method, Nanson's method, and Dodgson's method.

Some embodiments may involve rankings generated by the preference-based rank determining module that include ties, while other embodiments may involve a method that generates a ranking that does not include ties. In the case of ties between experiences, they may either be left in the ranking or resolved to generate an unambiguous ranking. For example, many methods known in the art involve a two-stage system in which in the event of an ambiguity, use a separate voting system to find the winner (i.e., the experience to rank ahead from among tied experiences). Optionally, this second stage is restricted to a certain subset of experiences found by scrutinizing the results of the pairwise comparisons. The certain subset may be chosen based on certain criteria, corresponding to one or more of definitions of such sets that are known in the art such as the Smith set, The Schwartz set, or the Landau set. In some embodiments, ties between experiences in a ranking that is generated from preference rankings may be resolved by computing scores for the tied experiences, and ranking the tied experiences based on their corresponding scores.

8—Predictors and Emotional State Estimators

In some embodiments, a module that receives a query that includes a sample (e.g., a vector including one or more feature values) and computes a label for that sample (e.g., a class identifier or a numerical value), is referred to as a "predictor" and/or an "estimator". Optionally, a predictor and/or estimator may utilize a model to assign labels to samples. In some embodiments, a model used by a predictor and/or estimator is trained utilizing a machine learning-based training algorithm. Optionally, when a predictor and/or estimator return a label that corresponds to one or more classes that are assigned to the sample, these modules may be referred to as "classifiers".

The terms "predictor" and "estimator" are used interchangeably in this disclosure. Thus, a module that is a referred to as a "predictor" may receive the same type of inputs as a module that is called an "estimator", it may utilize the same type of machine learning-trained model, and/or produce the same type of output. However, as commonly used in this disclosure, the input to an estimator typically includes values that come from measurements, while a predictor may receive samples with arbitrary types of input. For example, a module that identifies what type emotional state a user was likely in based on measurements of affective response of the user is referred to herein as an Emotional State Estimator (ESE). Additionally, a model utilized by an ESE may be referred to as an "emotional state model" and/or an "emotional response model".

A sample provided to a predictor and/or an estimator in order to receive a label for it may be referred to as a "query sample" or simply a "sample". A value returned by the predictor and/or estimator, which it computed from a sample given to it as an input, may be referred to herein as a "label", a "predicted value", and/or an "estimated value". A pair that includes a sample and a corresponding label may be referred to as a "labeled sample". A sample that is used for the purpose of training a predictor and/or estimator may be referred to as a "training sample" or simply a "sample". Similarly, a sample that is used for the purpose of testing a predictor and/or estimator may be referred to as a "testing sample" or simply a "sample". In typical embodiments, samples used for various purposes (e.g., training, testing, and/or a query) are assumed to have a similar structure (e.g., similar dimensionality) and are assumed to be generated in a similar process (e.g., they undergo the same type of preprocessing).

In some embodiments, a sample for a predictor and/or estimator includes one or more feature values. Optionally, at least some of the feature values are numerical values (e.g., integer and/or real values). Optionally, at least some of the feature values may be categorical values that may be represented as numerical values (e.g., via indices for different categories). Optionally, the one or more feature values comprised in a sample may be represented as a vector of values. Various preprocessing, processing, and/or feature extraction techniques known in the art may be used to generate the one or more feature values comprised in a sample. Additionally, in some embodiments, samples may contain noisy or missing values. There are various methods known in the art that may be used to address such cases.

In some embodiments, a label that is a value returned by a predictor and/or an estimator in response to receiving a query sample, may include one or more types of values. For example, a label may include a discrete categorical value (e.g., a category), a numerical value (e.g., a real number), a set of categories and/or numerical values, and/or a multidimensional value (e.g., a point in multidimensional space, a database record, and/or another sample).

Predictors and estimators may utilize, in various embodiments, different types of models in order to compute labels for query samples. A plethora of machine learning algorithms is available for training different types of models that can be used for this purpose. Some of the algorithmic approaches that may be used for creating a predictor and/or estimator include classification, clustering, function prediction, regression, and/or density estimation. Those skilled in the art can select the appropriate type of model and/or training algorithm depending on the characteristics of the training data (e.g., its dimensionality or the number of samples), and/or the type of value used as labels (e.g., a discrete value, a real value, or a multidimensional value).

In one example, classification methods like Support Vector Machines (SVMs), Naive Bayes, nearest neighbor, decision trees, logistic regression, and/or neural networks can be used to create a model for predictors and/or estimators that predict discrete class labels. In another example, methods like SVMs for regression, neural networks, linear regression, logistic regression, and/or gradient boosted decision trees can be used to create a model for predictors and/or estimators that return real-valued labels, and/or multidimensional labels. In yet another example, a predictor and/or estimator may utilize clustering of training samples in order to partition a sample space such that new query samples can be placed in clusters and assigned labels according to the clusters to which they belong. In a somewhat similar approach, a predictor and/or estimator may utilize a collection of labeled samples in order to perform nearest neighbor classification (in which a query sample is assigned a label according to one or more of the labeled samples that are nearest to it in some space).

In some embodiments, semi-supervised learning methods may be used to train a model utilized by a predictor and/or estimator, such as bootstrapping, mixture models with Expectation Maximization, and/or co-training. Semi-supervised learning methods are able to utilize as training data unlabeled samples in addition to labeled samples.

In one embodiment, a predictor and/or estimator may return as a label one or more other samples that are similar to a given query sample. For example, a nearest neighbor approach method may return one or more samples that are closest in the data space to the query sample (and thus in a sense are most similar to it.)

In another embodiment, a predictor and/or estimator may return a value representing a probability of a sample according to a model utilized by the predictor and/or estimator. For example, the value may represent a probability of the sample according to a probability density function, which is described and/or defined by the model, and assigns probability values to at least some of the samples in the space of all possible samples. In one example, such a predictor may be a single class support vector machine, a naïve Bayes classifier, a graphical model (e.g., Bayesian network), or a maximum entropy model.

In addition to a label predicted for a query sample, in some embodiments, a predictor and/or an estimator may provide a value describing a level of confidence in the label computed for the query sample. In some cases, the value describing the confidence level may be derived directly from the computation process itself. For example, a predictor that is a classifier that selects a label for a given query sample may provide a probability or score according to which the specific label was chosen (e.g., a naïve Bayes' posterior probability of the selected label or a probability derived from the distance of the sample from the hyperplane when using an SVM).

In one embodiment, a predictor and/or estimator returns a confidence interval as a label or in addition to the label. Optionally, a confidence interval is a range of values and an associated probability that represents the chance that the true value corresponding to the label falls within the range of values. For example, if a prediction of a label is made according to an empirically determined normal distribution with a mean m and variance $\sigma^2$, the range $[m-2\sigma, m+2\sigma]$ corresponds approximately to a 95% confidence interval surrounding the mean value m.

Samples provided to a predictor and/or estimator, and/or that are used for training the predictor and/or estimator, may be generated from data that may be received from various sources and have various characteristics (e.g., the data may comprise numerical values, text, images, audio, video, and/or other types of data). In some embodiments, at least part of the data may undergo various forms of preprocessing in order to obtain the feature values comprised in the samples. Following are some non-limiting and non-exhaustive examples of preprocessing that data may undergo as part of generating a sample. Other forms of preprocessing may also be used in different embodiments described herein.

In some embodiments, data used to generate a sample may undergo filtration (e.g., removal of values that are below a threshold) and/or normalization. In one embodiment, normalization may include converting a value from the data into a binary value (e.g., the normalized value is zero if the original value is below a threshold and is one otherwise). In another embodiment, normalization may involve transforming and/or projecting a value from the data to a different set of co-ordinates or to a certain range of values. For example, real values from the data may be projected to the interval [0,1]. In yet another example, normalization may involve converting values derived from the data according to a distribution, such as converting them to z-values according to certain parameters of a normal distribution.

In some embodiments, data used to generate a sample may be provided to feature generation functions. Optionally, a feature generation function is a function that receives an input comprising one or more values comprised in the data and generates a value that is used as a feature in the sample.

In one embodiment, a feature generation function may be any form of predictor that receives at least some of the values comprised in the data used to generate the sample and produces a result from which a feature value, comprised in the sample, is derived. For example, feature generation functions may involve various image analysis algorithms (e.g., object recognition algorithms, facial recognition algorithms, action recognition algorithms, etc.), audio analysis algorithms (e.g., speech recognition), and/or other algorithms. Additional examples of data sources and computation approaches that may be used to generate features are described in Section 5—Identifying Events.

In another embodiment, a feature generation function may be a function that generates one or more features values based on the value of a datum it is provided. For example, a feature generation function may receive a datum comprised in the data that has a value that belongs to a certain range (e.g., 0-10000 mg of sodium in food), and based on that value, the function will generate a certain indicator feature that has a value of one if the value of the datum is in a certain range, and zero otherwise. In this example, the feature generation function may select one of three features that will receive the value one: a first feature if the value of the datum is in the range 0-150, which may correspond to "low sodium", a second feature if the value of the datum is in the range 150-300, which may correspond to "medium sodium", and a third feature if the value of the datum is above 300, which may correspond to "high sodium".

In some embodiments, data used to generate a sample may be extensive and be represented by many values (e.g., high-dimensionality data). Having samples that are high-dimensional can lead, in some cases, to a high computational load and/or reduced accuracy of predictors and/or estimators that handle such data. Thus, in some embodiments, as part of preprocessing, samples may undergo one or more forms of dimensionality reduction and/or feature selection. For example, dimensionality reduction may be attained utilizing techniques such as principal component analysis (PCA), linear discriminant analysis (LDA), and/or canonical correlation analysis (CCA). In another example, dimensionality reduction may be achieved using random projections and/or locality-sensitive hashing. In still another example, a certain subset of the possible features may be selected to be used by a predictor and/or estimator, such as by various filter, wrapper, and/or embedded feature selection techniques known in the art.

In some embodiments, predictors and estimators may be described as including and/or utilizing models. A model that is included in a predictor and/or an estimator, and/or utilized by a predictor and/or an estimator, may include parameters used by the predictor and/or estimator to compute a label. Non-limiting examples of such parameters include: support vectors (e.g., used by an SVM), points in a multidimensional space (e.g., used by a Nearest-Neighbor predictor), regression coefficients, distribution parameters (e.g., used by a graphical model), topology parameters, and/or weight parameters (e.g., used by a neural network). When a model contains parameters that are used to compute a label, such as in the examples above, the terms "model", "predictor", and/or "estimator" (and derivatives thereof) may at times be used interchangeably herein. Thus, for example, language reciting "a model that predicts" or "a model used for estimating" is acceptable. Additionally, phrases such as "training a predictor" and the like may be interpreted as training a model utilized by the predictor. Furthermore, when a discussion relates to parameters of a predictor and/or an estimator, this may be interpreted as relating to parameters of a model used by the predictor and/or estimator.

The type and quantity of training data used to train a model utilized by a predictor and/or estimator can have a dramatic influence on the quality of the results they produce. Generally speaking, the more data available for training a model, and the more the training samples are similar to the samples on which the predictor and/or estimator will be used (also referred to as test samples), the more accurate the results for the test samples are likely to be. Therefore, when training a model that will be used with samples involving a specific user, it may be beneficial to collect training data from the user (e.g., data comprising measurements of the specific user). In such a case, a predictor may be referred to as a "personalized predictor", and similarly an estimator may be referred to as a "personalized estimator".

Training a predictor and/or an estimator, and/or utilizing the predictor and/or the estimator, may be done utilizing various computer system architectures. In particular, some architectures may involve a single machine (e.g., a single server) and/or single processor, while other architectures may be distributed, involving many processors and/or servers (e.g., possibly thousands or more processors on various machines). For example, some predictors may be trained on distributed architectures such as Hadoop, utilizing distributed machine learning-based algorithms. In this example, it is possible that each processor will only have access to a portion of the training data.

A predictor and/or an estimator that receives a query sample that includes features derived from a measurement of affective response of a user, and returns a value indicative of an emotional state corresponding to the measurement, may be referred to as a predictor and/or estimator of emotional state based on measurements, an Emotional State Estimator, and/or an ESE. Optionally, an ESE may receive additional values as input, besides the measurement of affective response, such as values corresponding to an event to which the measurement corresponds. Optionally, a result returned by the ESE may be indicative of an emotional state of the user that may be associated with a certain emotion felt by the user at the time such as happiness, anger, and/or calmness, and/or indicative of level of emotional response, such as the extent of happiness felt by the user. Additionally or alternatively, a result returned by an ESE may be an affective value, for example, a value indicating how well the user feels on a scale of 1 to 10.

In some embodiments, when a predictor and/or an estimator (e.g., an ESE), is trained on data collected from multiple users, its predictions of emotional states and/or response may be considered predictions corresponding to a representative user. It is to be noted that the representative user may in fact not correspond to an actual single user, but rather correspond to an "average" of a plurality of users.

In some embodiments, a label returned by an ESE may represent an affective value. In particular, in some embodiments, a label returned by an ESE may represent an affective response, such as a value of a physiological signal (e.g., skin conductance level, a heart rate) and/or a behavioral cue (e.g., fidgeting, frowning, or blushing). In other embodiments, a label returned by an ESE may be a value representing a type of emotional response and/or derived from an emotional response. For example, the label may indicate a level of interest and/or whether the response can be classified as positive or negative (e.g., "like" or "dislike"). In another example, a label may be a value between 0 and 10 indicating a level of how much an experience was successful from a user's perspective (as expressed by the user's affective response).

There are various methods that may be used by an ESE to estimate emotional states from a measurement of affective response. Examples of general purpose machine learning algorithms that may be utilized are given above in the general discussion about predictors and estimators. In addition, there are various methods specifically designed for estimating emotional states based on measurements of affective response. Some non-limiting examples of methods described in the literature, which may be used in some embodiments include: (i) physiological-based estimators as described in Table 2 in van den Broek, E. L., et al. (2010) "Prerequisites for Affective Signal Processing (ASP)—Part II." in: *Third International Conference on Bio Inspired Systems and Signal Processing, Biosignals* 2010; (ii) Audio- and image-based estimators as described in Tables 2-4 in Zeng, Z., et al. (2009) "A Survey of Affect Recognition Methods: Audio, Visual, and Spontaneous Expressions." in *IEEE Transaction on Pattern Analysis and Machine Intelligence*, Vol. 31(1), 39-58; (iii) emotional state estimations based on EEG signals may be done utilizing methods surveyed in Kim et al. (2013) "A review on the computational methods for emotional state estimation from the human EEG" In *Computational and mathematical methods in medicine*, Vol. 2013, Article ID 573734; (iv) emotional state estimations from EEG and other peripheral signals (e.g., GSR) may be done utilizing the teachings of Chanel, Guillaume, et al. "Emotion assessment from physiological signals for adaptation of game difficulty" in *IEEE Transactions on Systems, Man and Cybernetics, Part A: Systems and Humans*, 41.6 (2011): 1052-1063; and/or (v) emotional state estimations from body language (e.g., posture and/or body movements), may be done using methods described by Dael, et al. (2012), "Emotion expression in body action and posture", *Emotion*, 12(5), 1085.

In some embodiments, an ESE may make estimations based on a measurement of affective response that comprises data from multiple types of sensors (often referred to in the literature as multiple modalities). This may optionally involve fusion of data from the multiple modalities. Different types of data fusion techniques may be employed, for example feature-level fusion, decision-level fusion, or model-level fusion, as discussed in Nicolaou et al. (2011), "Continuous Prediction of Spontaneous Affect from Multiple Cues and Modalities in Valence-Arousal Space", *IEEE Transactions on Affective Computing*. Another example of use of fusion-based estimators of emotional state may be found in Schels et al. (2013), "Multi-modal classifier-fusion for the recognition of emotions", Chapter 4 in *Coverbal synchrony in Human-Machine Interaction*. The benefits of multimodal fusion typically include more resistance to noise (e.g., noisy sensor measurements) and missing data, which can lead to better affect detection when compared to affect detection from a single modality. For example, in meta-analysis described in D'mello and Kory (2015) "A Review and Meta-Analysis of Multimodal Affect Detection Systems" in *ACM Computing Surveys (CSUR)* 47.3: 43, multimodal affect systems were found to be more accurate than their best unimodal counterparts in 85% of the systems surveyed.

In one embodiment, in addition to a measurement of affective response of a user, an ESE may receive as input a baseline affective response value corresponding to the user. Optionally, the baseline affective response value may be derived from another measurement of affective response of the user (e.g., an earlier measurement) and/or it may be a predicted value (e.g., based on measurements of other users and/or a model for baseline affective response values). Accounting for the baseline affective response value (e.g., by normalizing the measurement of affective response according to the baseline), may enable the ESE, in some embodiments, to more accurately estimate an emotional state of a user based on the measurement of affective response.

In some embodiments, an ESE may receive as part of the input (in addition to a measurement of affective response), additional information comprising feature values related to the user, experience and/or event to which the measurement corresponds. Optionally, additional information is derived from a description of an event to which the measurement corresponds.

In one embodiment, the additional information is used to provide context for the measurement with respect to the user, experience, and/or event to which the measurement corresponds. For example, the context may relate to specific characteristics of the user, experience, and/or event to which the measurement corresponds, which when considered by the ESE may make its estimated emotional state more accurate with respect to the user, experience, and/or event to which the measurement corresponds. Knowing context related to a measurement may be helpful since depending on the sensors used, in some embodiments, it may be the case that in different conditions the same signal values may correspond to different emotions (e.g., extreme excitement or high stress). Knowing the context (e.g., playing a difficult level in a game or hearing a noise when alone in a dark parking lot) can assist in deciding which emotion the user is having.

Context may be given by identifying a situation the user was in when the measurement was taken. Examples of situations may include a mood of the user, a health state of the user, the type of activity the user is partaking in (e.g., relaxing, exercising, working, and/or shopping), the location the user is (e.g., at home, in public, or at work), and/or the alertness level of the user. The additional situation information may be used by the ESE to improve the estimation of the emotional state of the user from the measurement. In one example, the ESE may normalize values according to the situation (e.g., according to situation-specific baselines). In another example, the ESE may select certain models to use based on the additional information (e.g., selecting a situation-specific model according with which the measurement of affective response is processed). For example, separate models may be used by an ESE for different situations a user is in, such as being at home vs. outside, or for when the user is alone vs. in a group. In still another example, separate models may be used for different types of experiences. For example, a first model may be used for determining emotional states from measurements of affective response to experiences that are considered primarily physical activities (e.g., cycling or jogging), while a second model may be used for experiences that may be considered primarily mental activities (e.g., consuming digital content).

In one embodiment, additional information received by an ESE may include information derived from semantic analysis of communications of a user. The choice of words a user uses to communicate (in addition to the way the user says the words), may be indicative of the emotion being expressed. For example, semantic analysis may help determine whether a user is very excited or very angry. It is to be noted that semantic analysis is interpreted as determining the meaning of a communication based on its content (e.g., a textual representation of a communication), and not from features related to how a user makes the communication (e.g., characteristics of the user's voice which may be indicative of an emotional state).

In another embodiment, additional information received by an ESE may include information derived from tracking actions of the user, and/or from eye tracking data of the user that indicates what the user is doing and/or to what the user is paying attention.

In still another embodiment, additional information received by an ESE may include information derived from measurements of the environment the user is in. For example, the additional information may include values that are indicative of one or more of the following: the temperature, humidity, precipitation levels, noise level, air pollution level, allergen levels, time of day, and ambient illumination level.

In some embodiments, an ESE may be utilized to evaluate, from measurements of affective response of one or more users, whether the one or more users are in an emotional state that may be manifested via a certain affective response. Optionally, the certain affective response is manifested via changes to values of at least one of the following: measurements of physiological signals of the one or more users, and measurements of behavioral cues of the one or more users. Optionally, the changes to the values are manifestations of an increase or decrease, to at least a certain extent, in a level of at least one of the following emotions: pain, anxiety, annoyance, stress, aggression, aggravation, fear, sadness, drowsiness, apathy, anger, happiness, content, calmness, attentiveness, affection, and excitement. Optionally, an ESE is utilized to detect an increase, to at least a certain extent, in the level of at least one of the aforementioned emotions.

In one embodiment, determining whether a user experiences a certain affective response is done utilizing a model trained on data comprising measurements of affective response of the user taken while the user experienced the certain affective response (e.g., measurements taken while the user was happy or sad). Optionally, determining whether a user experiences a certain affective response is done utilizing a model trained on data comprising measurements of affective response of other users taken while the other users experienced the certain affective response.

In some embodiments, certain values of measurements of affective response, and/or changes to certain values of measurements of affective response, may be universally interpreted as corresponding to being in a certain emotional state. For example, an increase in heart rate and perspiration (e.g., measured with GSR) may correspond to an emotional state of fear. Thus, in some embodiments, any ESE may be considered "generalized" in the sense that it may be used successfully for estimating emotional states of users who did not contribute measurements of affective response to the training data. In other embodiments, the context information described above, which an ESE may receive, may assist in making the ESE generalizable and useful for interpreting measurements of users who did not contribute measurements to the training data and/or for interpreting measurements of experiences that are not represented in the training data.

In one embodiment, a personalized ESE for a certain user may be utilized to interpret measurements of affective response of the certain user. Optionally, the personalized ESE is utilized by a software agent operating on behalf of the certain user to better interpret the meaning of measurements of affective response of the user. For example, a personalized ESE may better reflect the personal tendencies, idiosyncrasies, unique behavioral patterns, mannerisms, and/or quirks related to how a user expresses certain emotions. By being in position in which it monitors a user over long periods of time, in different situations, and while having different experiences, a software agent may be able to observe affective responses of "its" user (the user on behalf of whom it operates) when the user expresses various emotions. Thus, the software agent can learn a model describing how the user expresses emotion, and use that model for personalized ESE that might, in some cases, "understand" its user better than a "general" ESE trained on data obtained from multiple users.

Training a personalized ESE for a user may require acquiring appropriate training samples. These samples typically comprise measurements of affective response of the user (from which feature values may be extracted) and labels corresponding to the samples, representing an emotional response the user had when the measurements were taken. Inferring what emotional state the user was in, at a certain time measurements were taken, may be done in various ways.

In one embodiment, labels representing emotional states may be self-reported by a user stating how the user feels at the time (e.g., on a scale of 1 to 10). For example, a user may declare how he or she is feeling, select an image representing the emotion, and/or provide another form of rating for his or her feelings. Optionally, the user describes his or her emotional state after being prompted to do so by the software agent.

In another embodiment, labels representing emotional states may be determined by an annotator that observes the user's behavior and/or measurements of affective response of the user. Optionally, the annotator may be a human (e.g., a trained professional and/or a person who is part of a crowd-sourced workforce such as Amazon's Mechanical Turk). Optionally, the annotator may be a software agent that utilizes one or more predictors and/or estimators, such as ESEs.

In still another embodiment, labels representing emotional states may be derived from communications of the user. For example, semantic analysis may be used to determine the meaning of what the user says, writes, and/or communicates in other ways (e.g., via emojis and/or gestures).

In yet another embodiment, labels representing emotional states may be derived from actions of the user. For example, US patent application publication US 2014/0108309, describes various approaches for determining emotional response from actions such as voting on a social network site or interacting with a media controller.

One approach, which may be used in some embodiments, for addressing the task of obtaining labeled samples for training a personalized predictor and/or estimator is to use a form of bootstrapping. In one example, a software agent (or another module) that is tasked with training a personalized ESE for a certain user may start off by utilizing a general ESE to determine emotional states of the user. These labeled samples may be added to a pool of training samples used to train the personalized ESE. As the body of labeled samples increases in size, the estimator trained on them will begin to represent the particular characteristics of how the user expresses emotions. Eventually, after a sufficiently large body of training samples is generated, it is likely that the personalized ESE will perform better than a general ESE on the task of identifying the emotional state of the user based on measurements of the affective response of the user.

9—Software Agents

As used herein, "software agent" may refer to one or more computer programs that operate on behalf of an entity. For example, an entity may be a person, a group of people, an institution, a computer, and/or computer program (e.g., an artificial intelligence). Software agents may be sometimes referred to by terms including the words "virtual" and/or "digital", such as "virtual agents", "virtual helpers", "digital assistants", and the like.

In some embodiments, a software agent acting on behalf of an entity is implemented, at least in part, via a computer program that is executed with the approval of the entity. The approval to execute the computer program may be explicit, e.g., a user may initiate the execution of the program (e.g., by issuing a voice command, pushing an icon that initiates the program's execution, and/or issuing a command via a terminal and/or another form of a user interface with an operating system). Additionally or alternatively, the approval may be implicit, e.g., the program that is executed may be a service that is run by default for users who have a certain account and/or device (e.g., a service run by an operating system of the device). Optionally, explicit and/or implicit approval for the execution of the program may be given by the entity by accepting certain terms of service and/or another form of contract whose terms are accepted by the entity.

In some embodiments, a software agent operating on behalf of an entity is implemented, at least in part, via a computer program that is executed in order to advance a goal of the entity, protect an interest of the entity, and/or benefit the entity. In one example, a software agent may seek to identify opportunities to improve the well-being of the entity, such as identifying and/or suggesting activities that may be enjoyable to a user, recommending food that may be a healthy choice for the user, and/or suggesting a mode of transportation and/or route that may be safe and/or time saving for the user. In another example, a software agent may protect the privacy of the entity it operates on behalf of, for example, by preventing the sharing of certain data that may be considered private data with third parties.

A software agent may operate with at least some degree of autonomy, in some of the embodiments described herein, and may be capable of making decisions and/or taking actions in order to achieve a goal of the entity of behalf of whom it operates, protect an interest of the entity, and/or benefit the entity. Optionally, a computer program executed to implement the software agent may exhibit a certain degree of autonomous behavior; for example, it may perform certain operations without receiving explicit approval of the entity on behalf of whom it operates each time it performs the certain operations. Optionally, these actions fall within the scope of a protocol and/or terms of service that are approved by the entity.

A software agent may function as a virtual assistant and/or "virtual wingman" that assists a user by making decisions on behalf of a user, making suggestions to the user, and/or issuing warnings to the user. Optionally, the software agent may make decisions, suggestions, and/or warnings based on crowd-based scores for experiences. In one example, the software agent may suggest to a user certain experiences to have (e.g., to go biking in the park), places to visit (e.g., when on a vacation in unfamiliar city), and/or content to select. In another example, the software agent may warn a user about situations that may be detrimental to the user or to achievement of certain goals of the user. For example, the agent may warn about experiences that are bad according to crowd-based scores, suggest the user take a certain route to avoid traffic, and/or warn a user about excessive behavior (e.g., warn when excessive consumption of alcohol is detected when the user needs to get up early the next day). In still another example, the software agent may make decisions for the user on behalf of whom it operates and take actions accordingly, possibly without prior approval of the user. For example, the software agent may make a reservation for a user (e.g., to a restaurant), book a ticket (e.g., that involves traveling a certain route that is the fastest at the time), and/or serve as a virtual secretary, which filters certain calls to the user (e.g., sending voicemail) and allows others to get through to the user.

In some embodiments, a software agent may assist a user in "reading" certain situations. For example, a software agent may indicate to a user affective response of other people in the user's vicinity and/or people the user is communicating with. This type of feature may be especially helpful for users who may have difficulties detecting social cues, such as users who have a condition on the autistic spectrum. In another example, the software agent may suggest an alternative phrasing to one selected by a user and/or warn the user about a phrasing the user intends to use in a communication in order to better advance a goal of the user, such as social acceptance of the user and/or avoiding the offending others. In still another example, a software agent may suggest to a user to change a demeanor of the user, such as a tone of voice, facial expression, use of body language, and/or maintaining of a certain distance from other people the user is conversing with. Optionally, the suggestion is made by detecting the affective response of a person the user is communicating with.

In some embodiments, depending on settings and/or a protocol that governs the operation of the software agent, the software agent may be active (i.e., autonomous) or passive when it comes to interacting with a user on behalf of whom it operates. For example, the software agent may be passive and typically require activation in order to interact with a user, e.g., by making a suggestion and/or issue a warning. Examples of different activations of a software agent include making a certain gesture, pushing a button, and/or saying a certain catchphrase like "OK Google", "Hey Cortana", or "Hey Ski". Optionally, even when being passive, the software agent may still monitor the user and/or perform other operations on behalf of the user. Optionally, a software agent may be active and interact with a user without necessarily being prompted to do so by the user. Optionally, the software agent may be active for some purposes and interact with a user based on an autonomous decision (e.g., the software agent issues a warning about a situation that compromises the user's safety when it is detected). However, the software agent may be passive in other situations that involve interaction with the user (e.g., the software agent suggests experiences for the user only when prompted to do so by the user).

Communication between a software agent and a user on behalf of whom the software agent operates may take various forms in different embodiments described herein. Following is a non-limiting and non-exhaustive list of examples; in some embodiments other forms of communication may be used in addition to, or instead of these examples. In one example, communication between a software agent and a user on behalf of whom it operates involves sending textual messages such as emails, SMSs, social media messages, and/or other forms of text content. In another example, communication between a software agent and a user on behalf of whom it operates involves displaying a message on display of the user, such as a monitor, a handheld device, a wearable device with a screen, an augmented reality and/or virtual reality display, and/or another form of device that may convey visual data to the user's brain (e.g., neural implants). Optionally, the message may include 2D and/or 3D images. Optionally, the message may include 2D and/or 3D video. Optionally, the messages may include sound that is provided via a speaker that emits sound waves and/or vibrational signals (e.g., involving bone conduction). In another example, communication between a software agent and a user on behalf of whom it operates may involve haptic signals, such as applying pressure, heat, electrical current, and/or vibrations by a device or garment worn by the user, and/or a device implanted in the user. In yet another example, communication between a software agent and a user on behalf of whom it operates may involve exciting areas in the brain of the user in order to generate electrical signals in the user (e.g., involving synaptic signaling), which are interpreted by the user as information.

There are also various ways in which a user may communicate with a software agent in embodiments described herein. Following is a non-limiting and non-exhaustive list of examples; in some embodiments other forms of communication may be used in addition to, or instead of these examples. In one example, a user may communicate with a software agent via a user interface that involves providing a textual message such as by typing a message (e.g., on a keyboard or touchscreen) and/or writing a message (e.g., that is interpreted using a camera, touch screen, or a smart pen that tracks movements of the pen). Additionally or alternatively, the user interface may involve pointing and/or selecting objects presented on a screen (e.g., via touching the screen or using a pointing device such as a computer mouse). In another example, a user may communicate with a software agent by tracing (e.g., by tracing a finger on a touchscreen or in the air). In yet another example, a user may communicate with a software agent by making sounds, e.g., by speaking, whistling, clapping and/or making other sounds that may be detected using a microphone. In still another example, a user may communicate by making gestures, such as pointing or moving hands, making facial expressions, sign language, and/or making other movements that may be detected using a camera, a motion sensor, an accelerometer, and/or other sensors that may detect movement. Optionally, the gestures may involve movements of the tongue of the user in the mouth, clicking of teeth, and/or various forms of subvocalization that may be detected by sensors such as movement sensors, microphones, and/or pressure sensors. And in another example, a user may communicate with a software agent by thinking certain thoughts that may be detected by a device that reads electrical signals in the brain. Optionally, the certain thoughts correspond to electrical signals in the brain that have characteristic patterns (e.g., certain amplitudes and/or excitation in certain areas of the brain). Optionally, the electrical signals are read via EEG, and interpreted using signal processing algorithms in order to determine the meaning of the user's thought (e.g., a desire of the user for a certain object, a certain action, and/or to move in a certain direction).

In some embodiments, communication between a software agent and a user may be done in such a way that the content exchanged between the software agent and the user (and/or vice versa) may not be known to an entity that is not the user or the software agent, even if the entity is the vicinity of the user at the time of communication. For example, the software agent may send a message displayed on augmented reality glasses and/or play message via headphones. In another example, a user may communicate with a software agent via subvocalization and/or selecting of options by pointing at a virtual menu seen using augmented reality glasses. Optionally, the communication may take place in such a way that an entity that is in the vicinity of the user is not likely to identify that such a communication is taking place.

In some embodiments, a software agent, and/or one or more of the programs it may comprise, may simultaneously operate on behalf of multiple entities. In one example, a single process running on a CPU or even a single execution thread, may execute commands that represent actions done on behalf of multiple entities. In another example, a certain running program, such as a server that responds to queries, may be considered comprised in multiple software agents operating on behalf of multiple entities.

In some embodiments, a single service, which in itself may involve multiple programs running on multiple servers, may be considered a software agent that operates on behalf of a user or multiple users. Optionally, a software agent may be considered a service that is offered as part of an operating system. Following are some examples of services that may be considered software agents or may be considered to include a software agent. In one example, a service simply called "Google", "Google Now", or some other variant such as "Google Agent" may be services that implement software agents on behalf of users who have accounts with Google™. Similarly, Siri® or "Proactive Assistant" may be considered software agents offered by Apple™. In another example, "Cortana" may be considered a software agent offered by Microsoft™. And in another example, "Watson" may be considered a software agent offered by IBM™.

Implementation of a software agent may involve executing one or more programs on a processor that belongs to a device of a user, such as a processor of a smart phone of the user or a processor of a wearable and/or implanted device of the user. Additionally or alternatively, the implementation of a software agent may involve execution of at least one or more programs on a processor that is remote of a user, such as a processor belonging to a cloud-based server.

As befitting this day and age, users may likely have interaction with various devices and/or services that involve computers. A non-limiting list of examples may include various computers (e.g., wearables, handled devices, and/or servers on the cloud), entertainment systems (e.g., gaming systems and/or media players), appliances (e.g., connected via the Internet of Things), vehicles (e.g., autonomous vehicles), and/or robots (e.g., service robots). Interacting with each of the services and/or devices may involve programs that communicate with the user and may operate on behalf of the user. As such, in some embodiments, a program involved in such an interaction is considered a software agent operating on behalf of a user. Optionally, the program may interact with the user via different interfaces and/or different devices. For example, the same software agent may communicate with a user via a robot giving the user a service, via a vehicle the user is traveling in, via a user interface of an entertainment system, and/or via a cloud-based service that utilizes a wearable display and sensors as an interface.

In some embodiments, different programs that operate on behalf of a user and share data and/or have access to the same models of the user may be considered instantiations of the same software agent. Optionally, different instantiations of a software agent may involve different methods of communication with the user. Optionally, different instantiations of a software agent may have different capabilities and/or be able to obtain data from different sources.

Various embodiments described herein require monitoring of users. This may be done for various purposes, such as computing crowd-based scores and/or modeling users. Optionally, monitoring users may involve identifying events in which the users are involved (e.g., as described in Section 5—Identifying Events). In some embodiments, such monitoring may involve a central entity that receives measurements of affective response of one or more users (and in some cases many users) to one or more experiences (possibly many experiences, such as dozens, hundreds, thousands or more). Collecting this information on a large scale may be challenging since it is typically done automatically, possibly without active intervention by users. This may require extensive monitoring of users, not only in order to acquire measurements of affective response, but also to identify other aspects of an event. In some embodiments, in order to identify an event there is a need to identify the users who contribute the measurements and also the experiences to which the measurements correspond. In some embodiments, identifying an experience may be relatively easy since it may be based on digital transactions, for example, identifying that a user flew on an airplane may be done based on booking data, financial transactions, and/or electromagnetic transmission of a device of a user. However, in other embodiments it may be more difficult (e.g., if the experience involves chewing a piece of gum). Additionally, information about the situation a user is in, which may be needed in some embodiments, such as when considering and/or situation-dependent baselines, may also be difficult to come by (e.g., detecting various aspects such as a mood of the user, whether the user is with other people, or whether the user is late to an activity).

Coming by the diverse information described above may be difficult for a central entity since it may require extensive monitoring of users, which may be difficult for a central entity to perform and/or undesirable from a user's standpoint (e.g., due to security and privacy concerns). Therefore, in some embodiments, information about events that may be used to compute scores and/or model users is provided, at least in part, by software agents operating on behalf of the users. Optionally, the software agents may operate according to a protocol set by the users and/or approved by the users.

By operating on behalf of users, and possibly receiving abundant information from the users, e.g., from devices of the users and/or activity of the users, software agents may be able to determine various aspects concerning events such as identifying experiences the users are having, situations the users are in, and/or other attributes. This information may come from a wide range of different sources, as mentioned in Section 5—Identifying Events.

In some embodiments, at least some of the data collected from monitoring users is collected as part of life logging of the users, which involves recording various aspects of the users' day to day life. Optionally, a software agent may participate in performing life logging of a user on behalf it operates and/or the software agent may have access to data collected through life logging of the user.

In some cases, providing a central entity with some, or all, of the aforementioned information may not be feasible (e.g., it may involve excessive transmission) and/or may not be desirable from data security and/or privacy perspectives. For example, if the central entity is hacked, this may jeopardize the privacy of many users. In addition, monitoring users to the extent described in some of the embodiments described above may make some users uncomfortable. Thus, a software agent that operates on behalf of a user and monitors the user may be a feasible solution that can make some users feel more at ease, especially if the user can control some, or all, aspects of the software agent's actions regarding data collection, retention, and/or sharing.

Thus, in some embodiments, a software agent may provide an entity that computes scores for experiences from measurements of affective response with information related to events. Optionally, information related to an event, which is provided by the software agent, identifies at least one of the following: the user corresponding to the event, the experience corresponding to the event, a situation the user was in when the user had the experience, and a baseline value of the user when the user had the experience. Additionally or alternatively, the software agent may provide a measurement of affective response corresponding to the event (i.e., a measurement of the user corresponding to the event to having an experience corresponding to the event, taken during the instantiation of the event or shortly after that). In some embodiments, information provided by a software agent operating on behalf of a user, which pertains to the user, may be considered part of a profile of the user.

In some embodiments, a software agent may operate based on a certain protocol that involves aspects such as the type of monitoring that may be performed by the software, the type of data that is collected, how the data is retained, and/or how it is utilized. Optionally, the protocol is determined, at least in part, by a user on behalf of whom the software agent operates. Optionally, the protocol is determined, at least in part, by an entity that is not a user on behalf of whom the software agent operates (e.g., the entity is a recipient of the measurements that computes an experience score). Optionally, the protocol is approved by a user on behalf of whom the software agent operates (e.g., the user accepted certain terms of use associated with the software agent).

The protocol according to which a software agent operates may dictate various restrictions related to the monitoring of users. For example, the restrictions may dictate the identity of users that may be monitored by a software agent. In one example, an agent may be restricted to provide information only about users that gave permission for this action. Optionally, these users are considered users on behalf of whom the software agent operates. In another example, the protocol may dictate that no identifying information about users, who are not users on behalf of whom the software agent operates, may be collected. In another example, the protocol may dictate certain conditions for collecting information about users. For example, the protocol may dictate that certain users may be monitored only in public areas. In another example, the protocol may dictate that certain users may be monitored at certain times. In still another example, the protocol may dictate that certain users may be monitored when having certain experiences. In one embodiment, a protocol may dictate what type of information may be collected with respect to certain users, locations, and/or experiences. For example, the protocol may dictate that when a user is in private surroundings (e.g., a bedroom or bathroom), the software agent may not collect data using cameras and/or microphones.

The protocol may dictate what type of information may be provided by the software agent to another entity, such as an entity that uses the information to compute experience scores. For example, the software agent may be instructed to provide information related to only certain experiences. Optionally, the extent of the information the software agent monitors and/or collects might be greater than the extent of the information the software agent provides. For example, in order to perform better modeling of the user on behalf of whom it operates, a software agent may collect certain data (e.g., private data), that does not get passed on to other parties. Additionally, a protocol may dictate the extent of information that may be provided by limiting the frequency and/or number of measurements that are provided, limiting the number of experiences to which the measurements correspond, and/or restricting the recipients of certain types of data.

In some embodiments, the protocol may dictate what use may be made with the data a software agent provides. For example, what scores may be computed (e.g., what type of values), and what use may be made with the scores (e.g., are they disclosed to the public or are they restricted to certain entities such as market research firms). In other embodiments, the protocol may dictate certain policies related to data retention. In one example, the protocol may relate to the location the data is stored (e.g., in what countries servers storing the data may reside and/or what companies may store it). In another example, the protocol may dictate time limits for certain types of data after which the data is to be deleted. In yet another example, the protocol may dictate what type of security measures must be implemented when storing certain types of data (e.g., usage of certain encryption algorithms).

In some embodiments, the protocol may dictate certain restrictions related to a required reward and/or compensation that a user is to receive for the information provided by the software agent. Optionally, the reward and/or compensation may be in a monetary form (e.g., money and/or credits that may be used to acquire services and/or products). Optionally, the reward may be in the form of services provided to the user. Optionally, the reward may be in the form of information (e.g., a user providing a measurement to an experience may receive information such as the score computed for the experience based on the measurement and measurements of other users.

The discussion above described examples of aspects involved in a software agents operation that may be addressed by a protocol. Those skilled in the art will recognize that there may be various other aspects involving collection of data by software agents, retention of the data, and/or usage of data, that were not described above, but may be nonetheless implemented in various embodiments.

In one embodiment, the software agent provides information as a response to a request. For example, the software agent may receive a request for a measurement of the user on behalf whom it operates. In another example, the request is a general request sent to multiple agents, which specifies certain conditions. For example, the request may specify a certain type of experience, time, certain user demographics, and/or a certain situation which the user is in. Optionally, the software responds to the request with the desired information if doing so does not violate a restriction dictated by a policy according to which the software agent operates. For example, the software agent may respond with the information if the risk associated with doing so does not exceed a certain threshold and/or the compensation provided for doing so is sufficient.

In one embodiment, the software agent may provide information automatically. Optionally, the nature of the automatic providing of information is dictated by the policy according to which the software agent operates. In one example, the software agent may periodically provide measurements along with context information (e.g., what experience the user was having at the time and/or information related to the situation of the user at the time). In another example, the software agent provides information automatically when the user has certain types of experiences (e.g., when consuming content, eating, or exercising).

A software agent may be utilized for training a personalized ESE of a user on behalf of whom the software agent operates. For example, the software agent may monitor the user and at times query the user to determine how the user feels (e.g., represented by an affective value on a scale of 1 to 10). After a while, the software agent may have a model of the user that is more accurate at interpreting "its" user than a general ESE. Additionally, by utilizing a personalized ESE, the software agent may be better capable of integrating multiple values (e.g., acquired by multiple sensors and/or over a long period of time) in order to represent how the user feels at the time using a single value (e.g., an affective value on a scale of 1 to 10). For example, a personalized ESE may learn model parameters that represent weights to assign to values from different sensors and/or weights to assign to different periods in an event (e.g., the beginning, middle or end of the experience), in order to be able to produce a value that more accurately represents how the user feels (e.g., on the scale of 1 to 10). In another example, a personalized ESE may learn what weight to assign to measurements corresponding to mini-events in order to generate an affective value that best represents how the user felt to a larger event that comprises the mini-events.

10—Determining Significance of Results

Embodiments described herein may involve a determination of significance (may also be referred to as "statistical significance") of information derived from measurements of affective response of users, such as significance of scores, ranks of experiences, and/or other values derived from the measurements. Additionally or alternatively, the determination may pertain to significance of differences between the ranks, the scores, and/or the other values derived from the measurements. Optionally, in some cases, significance may be expressed utilizing various values derived from statistical tests, such as p-values, q-values, and false discovery rates (FDRs).

Significance may also come into play in some cases, for determining ranges, error-bars, and/or confidence intervals for various values derived from the measurements of affective response. In such cases, the significance may indicate the variability of the data, and help guide decisions based on it. In one example, locations are scored based on a scale from 1 to 10 representing excitement of users at the locations. A first location may be given a score of 6, while a second location may be given a score of 7. In this case, the second location may be preferable to the first. However, if the 95% confidence level for the first location is 5-7 and for the second location, it is 4-8, then a person wanting to be confident of not having a bad experience may select the first location, nonetheless. Making such a choice would minimize the chance of having a bad experience (a score of 4 on the scale of 1 to 10) at the expense of reducing the chance of having a very good experience (score of 8 on the scale of 1 to 10).

After having the blueprint provided herein and familiarizing with the inventive steps, those skilled in the art will recognize that there are various methods in the field of statistics, and also some developed in other disciplines, which may be used to determine significance of results. Below is a non-exhaustive description of some approaches that may be used in conjunction with the inventive concepts discussed herein; other methods may be applied to obtain similar results.

In various embodiments described herein, significance may be expressed in terms of p-values. Herein, a p-value is the probability of obtaining a test statistic result at least as extreme as the one that was actually observed, assuming that the null hypothesis is true. Depending on the embodiments, one skilled in the art may postulate various null hypotheses according to which the p-values are computed. Optionally, when p-values are used to denote significance of a score, the lower the p-value, the more significant the results may be considered. In some embodiments, reaching a certain p-value such as 0.05 or less indicates that a certain significance is reached, and thus the results should be considered significant.

In some embodiments, determining significance requires performing multiple hypotheses testing, and thus may involve accounting and/or correcting for multiple comparisons. This can be achieved utilizing statistical approaches such as corrections for familywise error rates, e.g., by using Bonferroni correction and/or other similar approaches. In one example, determining significance of a selection, such as which dish from among a plurality of dishes has the most favorable affective response may require correction for multiple comparisons. In this example, we may want to know whether the top ranked dish is truly exceptional, or maybe its favorable affective response is a statistical artifact. If, for instance, there were more than 20 dishes to select from, one would expect at least one to have affective response that is two standard deviations away above the mean. In this example, the significance of the results is likely to be more accurate if the number of dishes that are evaluated is a parameter that influences the significance value (as it would be when using Bonferroni correction or some other variant that corrects for familywise error rates).

In some embodiments, determining significance involves employing False Discovery Rate (FDR) control, which is a statistical method used in multiple hypothesis testing to correct for multiple comparisons. In a list of findings (i.e. studies where the null-hypotheses are rejected), FDR procedures are designed to control the expected proportion of incorrectly rejected null hypotheses ("false discoveries"). In some cases, FDR controlling procedures exert a less stringent control over false discovery compared to FamilyWise Error Rate (FWER) procedures (such as the Bonferroni correction), which seek to reduce the probability of even one false discovery, as opposed to the expected proportion of false discoveries.

Determining significance of results may be done, in some embodiments, utilizing one or more of the following resampling approaches: (1) Estimating the precision of sample statistics (medians, variances, percentiles) by using subsets of available data (jackknifing) or drawing randomly with replacement from a set of data points (bootstrapping); (2) Exchanging labels on data points when performing significance tests (permutation tests, also called exact tests, randomization tests, or re-randomization tests); and (3) Validating models by using random subsets (bootstrapping, cross validation).

In some embodiments, permutation tests are utilized to determine significance of results, such as significance of scores, ranking, and/or difference between values. Optionally, a permutation test (also called a randomization test, re-randomization test, or an exact test) may be any type of statistical significance test in which the distribution of the test statistic under the null hypothesis is obtained by calculating multiple values of the test statistic under rearrangements of the labels on the observed data points.

In some embodiments, significance is determined for a value, such as a score for an experience. For example, such significance may be determined by the score significance module 165. There are various ways in which significance of a score may be determined.

In one example, significance of a score for an experience is determined based on parameters of a distribution of scores for the experience. For example, the distribution may be determined based on historical values computed for the score for the experience based on previously collected sets of measurements of affective response. Optionally, the significance is represented as a p-value for observing a score that is greater (or lower) than the score. Additionally or alternatively, the significance may be expressed as a percentile and/or other quantile in which the score is positioned relative to the historic scores and/or the distribution. Optionally, in this example, a score with high significance is a score which is less often observed, e.g., an outlier or a score that is relatively higher or lower than most of the scores previously observed.

In another example, significance of a score for an experience may be determined by comparing it to another score for the experience. Optionally, the significance assigned to the score is based on the significance of the difference between the score and the other score as determined utilizing one or more of the statistical approaches described below. Optionally, the other score to which the score is compared is an average of other scores (e.g., computed for various other experiences) and/or an average of historical scores (e.g., computed for the experience). Optionally, in this example, a score with a high significance is a score for which the difference between the score and the other score to which it is compared is significant (e.g., represents at least a certain p-value or has at least a certain t-test statistic).

In another example, significance of a score for an experience may be determined by a resampling approach. For example, a set of measurements used to compute the score may be pooled along with other measurements of affective response (e.g., corresponding to other experiences and/or users), to form a larger pool of measurements. From this pool, various resampling approaches may be employed to determine the significance of the score. For example, resampling may involve repeatedly randomly selecting a subset of measurements from the pool, which has the same size as the set, and computing a score based on the subset. The distribution of scores that is obtained this way may be utilized to determine the significance of the score (e.g., by assigning a p-value to the score).

In some embodiments, significance of results is determined utilizing statistical tests. For example, the results may involve two or more scores of some sort, and the significance of the scores needs to be determined. The significance may relate to various factors such as whether the fact that one score is higher than the rest is likely a true phenomenon, or is this likely observed due to there being a limited number of measurements of affective response that are used to generate the results. In the latter case, were there a larger number of measurements, perhaps the results would be different. However, in the former case, increasing the number of measurements upon which results are drawn is not likely to change the results significantly (since they are based on observations of a true phenomenon).

One scenario in which significance of results is tested relates to there being two (or more) sets of values that need to be compared. With this approach, certain statistics that characterize the sets of values are computed. For example, a statistic for a set of values may be the empirical mean of the values. Given the statistics computed for the sets of values, a parametric test may be used to answer certain questions about the sets of values. For example, whether they come from the same distribution, or whether the distributions from which the sets of values come have different parameters. Knowing the answer to such questions and/or how likely the answer to them is true, can be translated into a value indicative of the significance of the results (e.g., a p-value).

Consider a scenario in which first and second locations are scored according to measurements of affective response of users who were at the first and second locations. Based on the measurements it is determined that a first location-score for the first location is higher than a second location-score for the second location. In this example, a location-score may represent an average emotional response, such as an average level of happiness, determined from the measurements. It may be the case that the first location-score is higher than the second location-score, which would imply that the first location is preferable to the second location. However, if these results have low significance, for example, tests indicate that the first and second sets of measurements are similar, such as they likely come from the same distribution, then it may be desirable not to treat the first location as being preferable to the second location.

One parametric test approach often used to answer questions about differences between sets of values is a t-test, which herein refers to any statistical hypothesis test in which the test statistic follows a Student's t distribution if the null hypothesis is supported. A t-test can be used to determine if two sets of data are significantly different from each other, and is often applied when the test statistic would follow a normal distribution if the value of a scaling term in the test statistic were known. When the scaling term is unknown and is replaced by an estimate based on the data, the test statistic (under certain conditions) follows a Student's t distribution. Optionally, the test statistic is converted to a p-value that represents the significance.

The t-tests may be utilized in different ways for various tasks such as: a one-sample test of whether the mean of a population has a value specified in a null hypothesis, a two-sample test of the null hypothesis that the means of two populations are equal, a test of the null hypothesis that the difference between two responses measured on the same statistical unit has a mean value of zero, and a test of whether the slope of a regression line differs significantly from zero. Additionally, repeated t-tests may be conducted multiple times between various pairs of sets of measurements in order to evaluate relationships between multiple sets of measurements.

In one embodiment, a t-test is conducted as an independent samples t-test. This t-test approach is used when two separate sets of, what are assumed to be, independent and identically distributed samples are obtained, one sample from each of the two populations being compared. For example, suppose we are evaluating the effect of being in a first and second locations, and we use measurements of affective response of one hundred users, where fifty users were at the first location and the other fifty users were at the second location. In this case, we have two independent samples and could use the unpaired form of the t-test.

In another embodiment, a t-test is conducted as a paired samples t-test, which involves a sample of matched pairs of similar units, or one group of units that has been tested twice (a "repeated measures" t-test). A typical example of the repeated measures t-test would be where measurements of the same users are taken under different conditions (e.g., when in different locations). This may help remove variability (e.g., due to differences in the users), which does not directly concern the aspect being tested (e.g., there being different reactions to being in the different locations). By comparing the same user's measurements corresponding to different locations, we are effectively using each user as their own control.

In yet another embodiment, a t-test is conducted as an overlapping samples t-test, which is used when there are paired samples with data missing in one or the other samples (e.g., due to selection of "Don't know" options in questionnaires or because respondents are randomly assigned to a subset question).

In some embodiments, significance may be determined using other parametric methods besides t-tests, when certain conditions and/or assumptions are met.

In one example, significance may be determined using Welch's t-test (Welch-Aspin Test) which is a two-sample test, and is used to check the hypothesis that two populations have equal means. Welch's t-test may be considered an adaptation of Student's t-test, and is intended for us when the two samples have possibly unequal variances.

In another example, significance may be determined using a Z-test, which is any statistical test for which the distribution of the test statistic under the null hypothesis can be approximated by a normal distribution.

In still another example, significance may be determined using Analysis of variance (ANOVA), which includes a collection of statistical models used to analyze the differences between group means and their associated procedures (such as "variation" among and between groups). In the ANOVA setting, the observed variance in a particular variable is partitioned into components attributable to different sources of variation. In its simplest form, ANOVA provides a statistical test of whether or not the means of several groups are equal, and therefore may be used to generalize the t-test to more than two groups.

In some embodiments, significance may be tested utilizing non-parametric alternatives to the aforementioned parametric tests (e.g., t-tests). Optionally, this may be done due to certain assumptions regarding the data not holding (e.g., the normality assumption may not hold). In such cases, a non-parametric alternative to the t-test may be used. For example, for two independent samples when the data distributions are asymmetric (that is, the distributions are skewed) or the distributions have large tails, then the Wilcoxon rank-sum test (also known as the Mann-Whitney U test) can have higher power than the t-test. Another approach that may be used is the nonparametric counterpart to the paired samples t-test, which is the Wilcoxon signed-rank test for paired samples.

11—Additional Considerations

Figure 48:
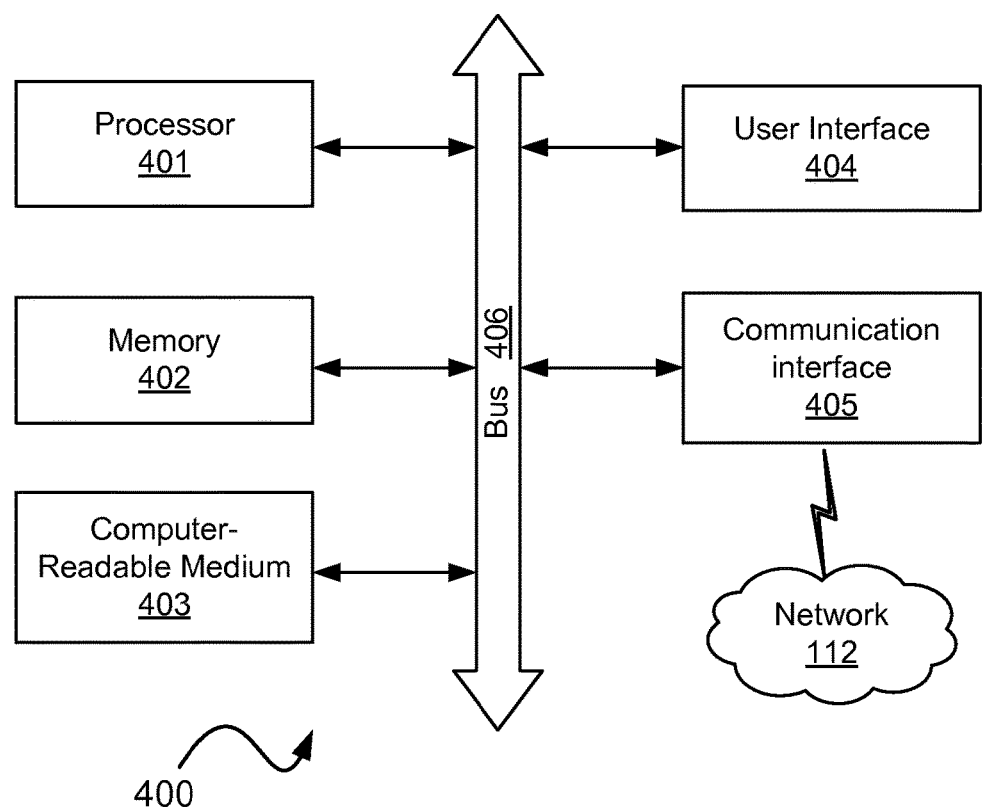
FIG. 48 is a schematic illustration of a computer that is able to realize any one or more of the embodiments discussed herein.

FIG. 48 is a schematic illustration of a computer 400 that is able to realize one or more of the embodiments discussed herein. The computer 400 may be implemented in various ways, such as, but not limited to, a server, a client, a personal computer, a set-top box (STB), a network device, a handheld device (e.g., a smartphone), computing devices embedded in wearable devices (e.g., a smartwatch or a computer embedded in clothing), computing devices implanted in the human body, and/or any other computer form capable of executing a set of computer instructions. Further, references to a computer include any collection of one or more computers that individually or jointly execute one or more sets of computer instructions to perform any one or more of the disclosed embodiments.

The computer 400 includes one or more of the following components: processor 401, memory 402, computer readable medium 403, user interface 404, communication interface 405, and bus 406. In one example, the processor 401 may include one or more of the following: a general-purpose processing device, a microprocessor, a central processing unit, a complex instruction set computing (CISC) microprocessor, a reduced instruction set computing (RISC) microprocessor, a very long instruction word (VLIW) microprocessor, a special-purpose processing device, an application specific integrated circuit (ASIC), a field programmable gate array (FPGA), a digital signal processor (DSP), a distributed processing entity, and/or a network processor. Continuing the example, the memory 402 may include one or more of the following memory components: CPU cache, main memory, read-only memory (ROM), dynamic random access memory (DRAM) such as synchronous DRAM (SDRAM), flash memory, static random access memory (SRAM), and/or a data storage device. The processor 401 and the one or more memory components may communicate with each other via a bus, such as bus 406.

Still continuing the example, the communication interface 405 may include one or more components for connecting to one or more of the following: LAN, Ethernet, intranet, the Internet, a fiber communication network, a wired communication network, and/or a wireless communication network. Still continuing the example, the user interface 404 may include one or more of the following components: (i) an image generation device, such as a video display, an augmented reality system, a virtual reality system, and/or a mixed reality system, (ii) an audio generation device, such as one or more speakers, (iii) an input device, such as a keyboard, a mouse, a gesture based input device that may be active or passive, and/or a brain-computer interface.

Functionality of various embodiments may be implemented in hardware, software, firmware, or any combination thereof. If implemented at least in part in software, implementing the functionality may involve a computer program that includes one or more instructions or code stored or transmitted on a computer-readable medium and executed by one or more processors. Computer-readable media may include computer-readable storage media, which corresponds to a tangible medium such as data storage media, or communication media including any medium that facilitates transfer of a computer program from one place to another. Computer-readable medium may be any media that can be accessed by one or more computers to retrieve instructions, code and/or data structures for implementation of the described embodiments. A computer program product may include a computer-readable medium.

In one example, the computer-readable medium 403 may include one or more of the following: RAM, ROM, EEPROM, optical storage, magnetic storage, biologic storage, flash memory, or any other medium that can store computer readable data. Additionally, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. It should be understood, however, that computer-readable medium does not include connections, carrier waves, signals, or other transient media, but are instead directed to non-transient, tangible storage media.

A computer program (also known as a program, software, software application, script, program code, or code) can be written in any form of programming language, including compiled or interpreted languages, declarative or procedural languages. The program can be deployed in any form, including as a standalone program or as a module, component, subroutine, object, or other unit suitable for use in a computing environment. A computer program may correspond to a file in a file system, may be stored in a portion of a file that holds other programs or data, and/or may be stored in one or more files that may be dedicated to the program. A computer program may be deployed to be executed on one or more computers that are located at one or more sites that may be interconnected by a communication network.

Computer-readable medium may include a single medium and/or multiple media (e.g., a centralized or distributed database, and/or associated caches and servers) that store the one or more sets of instructions. In various embodiments, a computer program or portions of a computer program, may be stored on a non-transitory computer-readable medium. The non-transitory computer-readable medium may be implemented, for example, via one or more of a volatile computer memory, a non-volatile memory, a hard drive, a flash drive, a magnetic data storage, an optical data storage, and/or any other type of tangible computer memory to be invented that is not transitory signals per se. The computer program may be updated on the non-transitory computer-readable medium and/or downloaded to the non-transitory computer-readable medium via a communication network such as the Internet. Optionally, the computer program may be downloaded from a central repository such as Apple App Store and/or Google Play. Optionally, the computer program may be downloaded from a repository such as an open source and/or community run repository (e.g., GitHub).

At least some of the methods described in this disclosure are implemented on a computer, such as computer 400. When implementing a method from among the at least some of the methods, at least some of the steps belonging to the method are performed by the processor 401 by executing instructions. Additionally, at least some of the instructions for running methods described in this disclosure and/or for implementing systems described in this disclosure may be stored on a non-transitory computer-readable medium.

Some of the embodiments described herein include a number of modules. Modules may also be referred to herein as "components" or "functional units". Additionally, modules and/or components may be referred to as being "computer executed" and/or "computer implemented"; this is indicative of the modules being implemented within the context of a computer system that typically includes a processor and memory. Generally, a module is a component of a system that performs certain operations towards the implementation of a certain functionality. Examples of functionalities include receiving measurements (e.g., by a measurement collector module), computing an experience score (e.g., by a scoring module), determining risk (e.g., by a privacy risk assessment module), and various other functionalities described in embodiments in this disclosure.

Executing modules included in embodiments described in this disclosure typically involves hardware. For example, a module may comprise dedicated circuitry or logic that is permanently configured (e.g., as a special-purpose processor, such as a field programmable gate array (FPGA) or an application-specific integrated circuit (ASIC) to perform certain operations. Additionally or alternatively, a module may comprise programmable logic or circuitry (e.g., as encompassed within a general-purpose processor or other programmable processor) that is temporarily configured by software to perform certain operations. For example, a computer system such as the computer system illustrated in FIG. 48 may be used to implement one or more modules. In some instances, a module may be implemented using both dedicated circuitry and programmable circuitry. For example, a collection module may be implemented using dedicated circuitry that preprocesses signals obtained with a sensor (e.g., circuitry belonging to a device of the user) and in addition the collection module may be implemented with a general purpose processor that organizes and coalesces data received from multiple users.

It will be appreciated that the decision to implement a module in dedicated permanently configured circuitry and/or in temporarily configured circuitry (e.g., configured by software) may be driven by various considerations such as considerations of cost, time, and ease of manufacturing and/or distribution. In any case, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, a general-purpose processor may be configured to run different modules at different times.

In some embodiments, a processor implements a module by executing instructions that implement at least some of the functionality of the module. Optionally, a memory may store the instructions (e.g., as computer code), which are read and processed by the processor, causing the processor to perform at least some operations involved in implementing the functionality of the module. Additionally or alternatively, the memory may store data (e.g., measurements of affective response), which is read and processed by the processor in order to implement at least some of the functionality of the module. The memory may include one or more hardware elements that can store information that is accessible to a processor. In some cases, at least some of the memory may be considered part of the processor or on the same chip as the processor, while in other cases the memory may be considered a separate physical element than the processor. Referring to FIG. 48 for example, one or more processors 401, may execute instructions stored in memory 402 (that may include one or more memory devices), which perform operations involved in implementing the functionality of a certain module.

The one or more processors may also operate to support performance of the relevant operations in a "cloud computing" environment or as a "software as a service" (SaaS). For example, at least some of the operations involved in implementing a module, may be performed by a group of computers accessible via a network (e.g., the Internet) and/or via one or more appropriate interfaces (e.g., application program interfaces (APIs)). Optionally, some of the modules may be executed in a distributed manner among multiple processors. The one or more processors may be located in a single geographic location (e.g., within a home environment, an office environment, or a server farm), and/or distributed across a number of geographic locations. Optionally, some modules may involve execution of instructions on devices that belong to the users and/or are adjacent to the users. For example, procedures that involve data preprocessing and/or presentation of results may run, in part or in full, on processors belonging to devices of the users (e.g., smart phones and/or wearable computers). In this example, preprocessed data may further be uploaded to cloud-based servers for additional processing. Additionally, preprocessing and/or presentation of results for a user may be performed by a software agent that operates on behalf of the user.

In some embodiments, modules may provide information to other modules, and/or receive information from other modules. Accordingly, such modules may be regarded as being communicatively coupled. Where multiple of such modules exist contemporaneously, communications may be achieved through signal transmission (e.g., over appropriate circuits and buses). In embodiments in which modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A different module may then, at a later time, access the memory device to retrieve and process the stored output.

It is to be noted that in the claims, when a dependent system claim is formulated according to a structure similar to the following: "further comprising module X configured to do Y", it is to be interpreted as: "the memory is further configured to store module X, the processor is further configured to execute module X, and module X is configured to do Y".

As used herein any reference to "one embodiment" or "an embodiment" means that a particular element, feature, structure, or characteristic described in connection with the embodiment is included in at least one embodiment. Moreover, separate references to "one embodiment" or "some embodiments" in this description do not necessarily refer to the same embodiment. Additionally, references to "one embodiment" and "another embodiment" may not necessarily refer to different embodiments, but may be terms used, at times, to illustrate different aspects of an embodiment. Similarly, references to "some embodiments" and "other embodiments" may refer, at times, to the same embodiments.

Herein, a predetermined value, such as a predetermined threshold, is a fixed value and/or a value determined any time before performing a calculation that compares a certain value with the predetermined value. A value is also considered to be a predetermined value when the logic (e.g., circuitry, computer code, and/or algorithm), used to determine whether a threshold that utilizes the value is reached, is known before the computations used to determine whether the threshold is reached are started.

Some embodiments may be described using the expression "coupled" and/or "connected", along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" is employed to describe one or more elements/components/steps/modules/things of the embodiments herein. This description should be read to include one or at least one, and the singular also includes the plural unless it is obvious that it is meant otherwise. Additionally, the phrase "based on" is intended to mean "based, at least in part, on". For example, stating that a score is computed "based on measurements" means that the computation may use, in addition to the measurements, additional data that are not measurements, such as models, billing statements, and/or demographic information of users.

Though this disclosure in divided into section having various titles, this partitioning is done just for the purpose of assisting the reader and is not meant to be limiting in any way. In particular, embodiments described in this disclosure may include elements, features, components, steps, and/or modules that may appear in various sections of this disclosure that have different titles. Furthermore, section numbering and/or location in the disclosure of subject matter are not to be interpreted as indicating order and/or importance. For example, a method may include steps described in sections having various numbers. These numbers and/or the relative location of the section in the disclosure are not to be interpreted in any way as indicating an order according to which the steps are to be performed when executing the method.

With respect to computer systems described herein, various possibilities may exist regarding how to describe systems implementing a similar functionality as a collection of modules. For example, what is described as a single module in one embodiment may be described in another embodiment utilizing more than one module. Such a decision on separation of a system into modules and/or on the nature of an interaction between modules may be guided by various considerations. One consideration, which may be relevant to some embodiments, involves how to clearly and logically partition a system into several components, each performing a certain functionality. Thus, for example, hardware and/or software elements that are related to a certain functionality may belong to a single module. Another consideration that may be relevant for some embodiments, involves grouping hardware elements and/or software elements that are utilized in a certain location together. For example, elements that operate at the user end may belong to a single module, while other elements that operate on a server side may belong to a different module. Still another consideration, which may be relevant to some embodiments, involves grouping together hardware and/or software elements that operate together at a certain time and/or stage in the lifecycle of data. For example, elements that operate on measurements of affective response may belong to a first module, elements that operate on a product of the measurements may belong to a second module, while elements that are involved in presenting a result based on the product, may belong to third module.

It is to be noted that essentially the same embodiments may be described in different ways. In one example, a first description of a computer system may include descriptions of modules used to implement it. A second description of essentially the same computer system may include description of operations that a processor is configured to execute (which implement the functionality of the modules belonging to the first description). The operations recited in the second description may be viewed in some cases as corresponding to steps of a computer-implemented method that performs the functionality of the computer system. In another example, a first description of a computer-readable medium may include description of computer code, which when executed on a processor performs operations corresponding to certain steps of a computer-implemented method. A second description of essentially the same computer-readable medium may include description of modules that are to be implemented by a computer system having a processor that executes code stored on the computer-implemented medium. The modules described in the second description may be viewed in some cases as producing the same functionality as executing the operations corresponding to the certain steps of the computer-implemented method.

While the methods disclosed herein may be described and shown with reference to particular steps performed in a particular order, it is understood that these steps may be combined, sub-divided, and/or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when a processor is disclosed in one embodiment, the scope of the embodiment is intended to also cover the use of multiple processors. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination.

Some embodiments described herein may be practiced with various computer system configurations, such as: cloud computing, a client-server model, grid computing, peer-to-peer, hand-held devices, multiprocessor systems, microprocessor-based systems, programmable consumer electronics, minicomputers, and/or mainframe computers. Additionally or alternatively, some of the embodiments may be practiced in a distributed computing environment where tasks are performed by remote processing devices that are linked through a communication network. In a distributed computing environment, program components may be located in both local and remote computing and/or storage devices. Additionally or alternatively, some of the embodiments may be practiced in the form of a service, such as infrastructure as a service (IaaS), platform as a service (PaaS), software as a service (SaaS), and/or network as a service (NaaS).

Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the appended claims and their equivalents.

What is claimed is:
1. A system configured to compute personalized experience scores, comprising:
sensors configured to take measurements of affective response of at least ten users who had an experience; wherein each measurement of affective response of a user comprises at least one of a value of a physiological signal of the user and a value indicative of a behavioral cue of the user;

a computer configured to:

receive a profile of a certain user and profiles of the at least ten of the users; wherein a profile of a user comprises data that describes at least one of the following: a characteristic of the user, and an indication of one or more experiences the user had;

generate an output indicative of similarities between the profile of the certain user and the profiles of the at least ten of the users; and compute an experience score for the certain user based on the measurements and the output; wherein, for at least a certain first user and a certain second user, who have different profiles, the computer computes respective first and second experience scores that are different.

2. The system of claim 1, wherein the data describes one or more of the following: a demographic characteristic of the user, a genetic characteristic of the user, a static attribute describing the body of the user, a medical condition of the user, an indication of a content item consumed by the user, and a value derived from semantic analysis of a communication of the user.

3. The system of claim 1, wherein the first experience score is computed based on at least one measurement that is not utilized for computing the second experience score.

4. The system of claim 1, wherein a measurement utilized to compute both the first and second experience scores has a first weight when utilized to compute the first experience score and the measurement has a second weight, different from the first weight, when utilized to compute the second experience score.

5. The system of claim 1, wherein the computer is further configured to recommend the experience to a user in a manner that belongs to a set comprising first and second manners; wherein when recommending an experience in the first manner, the computer provides a stronger recommendation for the experience, compared to a recommendation for the experience that the computer provides when recommending in the second manner.

6. The system of claim 5, wherein the computer is further configured to: recommend the experience in the first manner when an experience score for the experience reaches a predetermined threshold, and to recommend the experience in the second manner when the experience score does not reach the predetermined threshold.

7. The system of claim 6, wherein responsive to the first experience score reaching the predetermined threshold, the experience is recommended to the certain first user in the first manner; and wherein responsive to the second experience score not reaching the predetermined threshold, the experience is recommended to the certain second user in the second manner.

8. The system of claim 1, wherein the computer is configured to generate the output by calculating values indicative of a similarity between each of the profiles of the at least ten users and the profile of the certain user, and by utilizing the values to calculate weights for the measurements of the users; wherein a weight for a measurement of a user, from among the at least ten of the users, is proportional to an extent of a similarity between the profile of the user and the profile of the certain user, such that a weight generated for a measurement of a user whose profile is more similar to the profile of the certain user is higher than a weight generated for a measurement of a user whose profile is less similar to the profile of the certain user; wherein the output is indicative of the weights;

and wherein the experience score is computed based on the measurements of the at least ten of the users and the weights.

9. The system of claim 1, wherein the computer is configured to generate the output by clustering the at least ten of the users into clusters based on profile similarity, with each cluster comprising a single user or multiple users with similar profiles, and selecting, based on the profile of the certain user, a subset comprising at most half of the clusters; wherein, on average, the profile of the certain user is more similar to a profile of a user who is a member of a cluster in the subset, than it is to a profile of a user, from among the at least ten of the users, who is not a member of any of the clusters in the subset;

the computer is further configured to select at least eight users from among the users belonging to clusters in the subset; wherein the output is indicative of the at least eight users;

and wherein the experience score is computed based on measurements of the at least eight users.

10. The system of claim 9, wherein clustering the at least ten of the users is done utilizing one or more of the following clustering approaches: hierarchical clustering, partition-based clustering, and clustering utilizing an Expectation-Maximization algorithm.

11. The system of claim 1, wherein the computer is configured to calculate similarities between the profile of the certain user and the profiles of the at least ten of the users by utilizing a distance metric that is applied vectors of feature values representing the profiles; and wherein utilizing the distance metric is based on one or more of the following metrics applied to a pair of vectors: a dot-product between the pair of vectors, a Euclidean distance between the pair of vectors, and the Hamming distance between the pair of vectors.

12. A method for computing personalized experience scores, comprising:

taking, utilizing sensors, measurements of affective response of at least ten users who had an experience; wherein each measurement of affective response of a user comprises at least one of a value of a physiological signal of the user and a value indicative of a behavioral cue of the user;

receiving a first profile of a first user, a second profile of a second user, and profiles of the at least ten of the users; wherein the first profile is different from the second profile; wherein a profile of a user comprises data that describes at least one of the following: a characteristic of the user, and an indication of one or more experiences the user had;

generating a first output indicative of similarities between the profile of the first user and the profiles of the at least ten of the users;

generating a second output indicative of similarities between the profile of the second user and the profiles of the at least ten of the users; wherein the second output is different from the first output;

computing a first experience score for the first user based on the measurements and the first output; and computing a second experience score for the second user based on the measurements and the second output; wherein first and second experience scores that are different.

13. The method of claim 12, further comprising utilizing at least one measurement for computing the first experience score, which is not utilized for computing the second experience score.

14. The method of claim 12, further comprising utilizing a certain measurement to compute both the first and second experience scores; wherein the certain measurement has a first weight when utilized to compute the first experience score and the certain measurement has a second weight, different from the first weight, when utilized to compute the second experience score.

15. The method of claim 12, further comprising generating the first output by calculating values indicative of a similarity between each of the profiles of the at least ten of the users and the profile of the first user, and utilizing the values to calculate weights for the measurements of the users; wherein a weight for a measurement of a user, from among the at least ten of the users, is proportional to an extent of a similarity between the profile of the user and the profile of the first user, such that a weight generated for a measurement of a user whose profile is more similar to the profile of the first user is higher than a weight generated for a measurement of a user whose profile is less similar to the profile of the first user; and wherein the first output is indicative of the weights.

16. The method of claim 12, further comprising generating the first output by clustering the at least ten of the users into clusters based on profile similarity, with each cluster comprising a single user or multiple users with similar profiles, and selecting, based on the profile of the first user, a subset comprising at most half of the clusters; wherein, on average, the profile of the first user is more similar to a profile of a user who is a member of a cluster in the subset, than it is to a profile of a user, from among the at least ten of the users, who is not a member of any of the clusters in the subset; and further comprising selecting at least eight users from among the users belonging to clusters in the subset; wherein the first output is indicative of the at least eight users.

17. A non-transitory computer-readable medium having instructions stored thereon that, in response to execution by a system including a processor and memory, causes the system to perform operations comprising:

taking, utilizing sensors, measurements of affective response of at least ten users who had an experience; wherein each measurement of affective response of a user comprises at least one of a value of a physiological signal of the user and a value indicative of a behavioral cue of the user;

receiving a first profile of a first user, a second profile of a second user, and profiles of the at least ten of the users; wherein the first profile is different from the second profile; and wherein a profile of a user comprises data that describes at least one of the following: a characteristic of the user, and an indication of one or more experiences the user had;

generating a first output indicative of similarities between the profile of the first user and the profiles of the at least ten of the users;

generating a second output indicative of similarities between the profile of the second user and the profiles of the at least ten of the users; wherein the second output is different from the first output;

computing a first experience score for the first user based on the measurements and the first output; and computing a second experience score for the second user based on the measurements and the second output; wherein first and second experience scores are different.

18. The non-transitory computer-readable medium of claim 17, further comprising instructions for generating the first output by calculating values indicative of a similarity between each of the profiles of the at least ten of the users and the profile of the first user, and utilizing the values to calculate weights for the measurements of the users; wherein a weight for a measurement of a user, from among the at least ten of the users, is proportional to an extent of a similarity between the profile of the user and the profile of the first user, such that a weight generated for a measurement of a user whose profile is more similar to the profile of the first user is higher than a weight generated for a measurement of a user whose profile is less similar to the profile of the first user; and wherein the first output is indicative of the weights.

19. The non-transitory computer-readable medium of claim 17, generating the first output by clustering the at least ten of the users into clusters based on profile similarity, with each cluster comprising a single user or multiple users with similar profiles, and selecting, based on the profile of the first user, a subset comprising at most half of the clusters; wherein, on average, the profile of the first user is more similar to a profile of a user who is a member of a cluster in the subset, than it is to a profile of a user, from among the at least ten of the users, who is not a member of any of the clusters in the subset; and further comprising instruction for selecting at least eight users from among the users belonging to clusters in the subset; wherein the first output is indicative of the at least eight users.

* * * * *